(12) United States Patent
Silverbrook et al.

(10) Patent No.: US 7,466,444 B2
(45) Date of Patent: Dec. 16, 2008

(54) MOBILE TELECOMMUNICATIONS DEVICE WITH STYLUS

(75) Inventors: Kia Silverbrook, Balmain (AU); Paul Lapstun, Balmain (AU); Tobin Allen King, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 22 days.

(21) Appl. No.: 11/124,167

(22) Filed: May 9, 2005

(65) Prior Publication Data

US 2005/0197158 A1 Sep. 8, 2005

Related U.S. Application Data

(63) Continuation-in-part of application No. 10/917,436, filed on Aug. 13, 2004, which is a continuation of application No. 09/722,147, filed on Nov. 25, 2002, now Pat. No. 6,946,672.

(30) Foreign Application Priority Data

Dec. 1, 1999 (AU) .................................. PQ4392

(51) Int. Cl.
*G06F 15/00* (2006.01)
*B41J 3/36* (2006.01)
(52) U.S. Cl. ...................... 358/1.18; 358/1.15; 347/109
(58) Field of Classification Search ................. 358/1.1, 358/1.9, 1.11–1.18; 400/88, 61, 70, 76; 348/207.2; 345/179; 347/86, 42, 87, 109
See application file for complete search history.

(56) References Cited

U.S. PATENT DOCUMENTS

| | | | |
|---|---|---|---|
| 4,864,618 A | 9/1989 | Wright et al. | |
| 4,888,479 A | 12/1989 | Tamaru | |
| 5,051,736 A | 9/1991 | Bennett et al. | |
| 5,465,080 A | 11/1995 | Liddiard et al. | |
| 5,477,012 A | 12/1995 | Sekendur | |
| 5,627,349 A * | 5/1997 | Shetye et al. | 178/18.01 |
| 5,652,412 A | 7/1997 | Lazzouni et al. | |
| 5,661,506 A | 8/1997 | Lazzouni et al. | |
| 5,679,943 A * | 10/1997 | Schultz et al. | 235/472.02 |
| 5,692,073 A | 11/1997 | Cass | |
| 5,835,577 A | 11/1998 | Disanto et al. | |
| 5,852,286 A | 12/1998 | Coleman | |
| 5,852,434 A | 12/1998 | Sekendur | |
| 5,900,110 A | 5/1999 | Goodwin et al. | |

(Continued)

FOREIGN PATENT DOCUMENTS

AU 711687 B 10/1999

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner*—Edward L. Coles
*Assistant Examiner*—Thierry L Pham

(57) ABSTRACT

A mobile telecommunications device comprising: a first receiver for receiving signals from a mobile telephony system; a first transmitter for transmitting signals over the mobile telephony system; and a sylus allowing the user to use the mobile telecommunications device as a writing or drawing device.

19 Claims, 137 Drawing Sheets

U.S. PATENT DOCUMENTS

| | | | |
|---|---|---|---|
| 5,995,105 A | 11/1999 | Reber et al. | |
| 6,036,086 A | 3/2000 | Sizer, II et al. | |
| 6,076,734 A | 6/2000 | Dougherty et al. | |
| 6,138,915 A | 10/2000 | Danielson | |
| 6,152,369 A | 11/2000 | Wilz | |
| 6,179,407 B1 * | 1/2001 | Bockman | 347/40 |
| 6,330,976 B1 * | 12/2001 | Dymetman et al. | 235/487 |
| 6,357,939 B1 * | 3/2002 | Baron | 400/88 |
| 6,487,421 B2 * | 11/2002 | Hess et al. | 455/550.1 |
| 6,823,065 B1 | 11/2004 | Cook | |
| 6,964,374 B1 | 11/2005 | Djuknic et al. | |
| 2002/0143643 A1 | 10/2002 | Catan | |

FOREIGN PATENT DOCUMENTS

| | | |
|---|---|---|
| GB | 2295939 A | 6/1996 |
| GB | 2306669 A | 5/1997 |
| JP | 05040841 | 2/1993 |
| WO | WO 99/18487 A2 | 4/1999 |
| WO | WO 99/49383 A | 9/1999 |
| WO | WO 99/50787 A1 | 10/1999 |
| WO | WO01/05047 A1 | 1/2001 |
| WO | WO 01/41480 A1 | 6/2001 |

\* cited by examiner

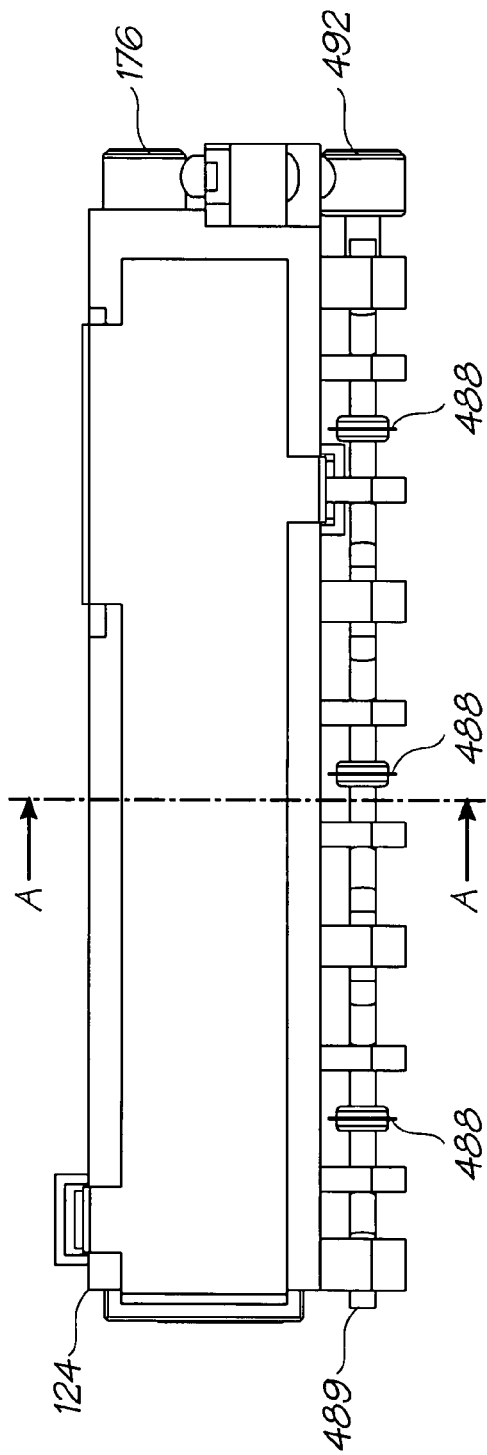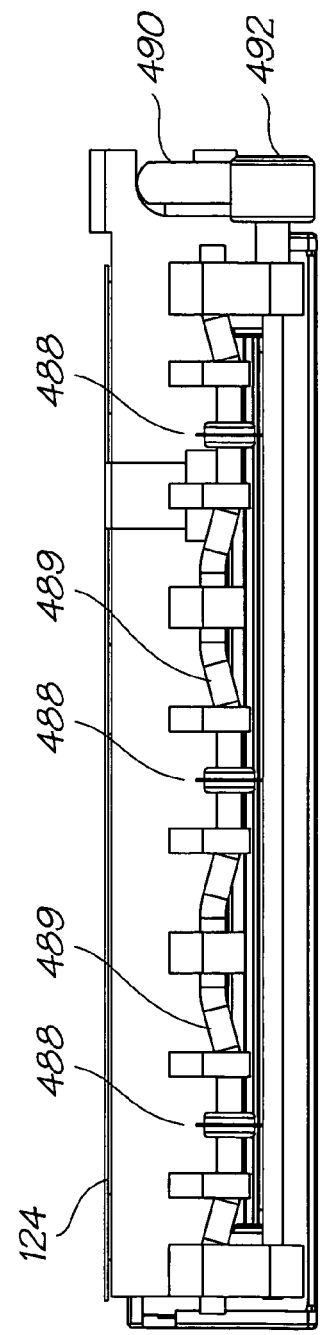

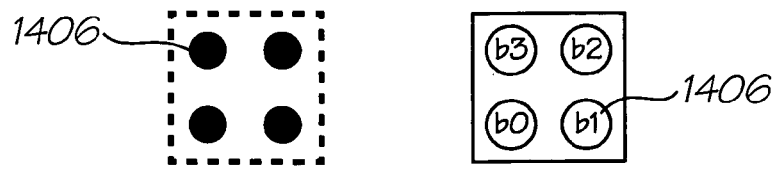
FIG. 133
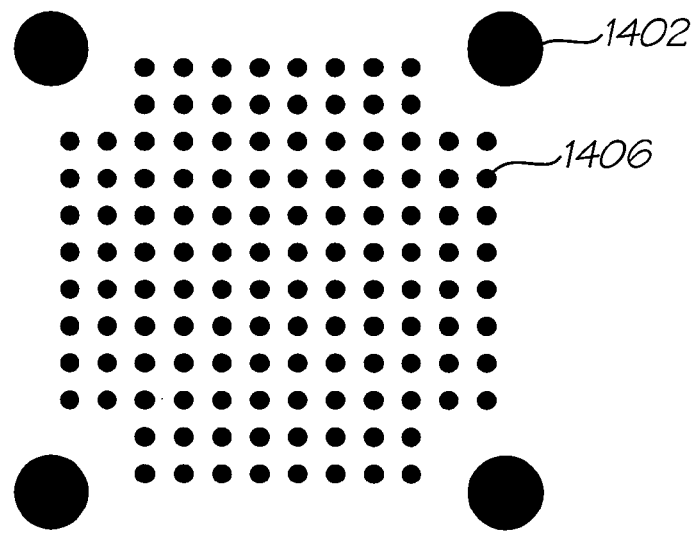
FIG. 134
| 00 | 10 |
|----|----|
| 01 | 11 |
1400
FIG. 135

| 00 | 10 | 00 | 10 | 00 | 10 | ←1400 |
|----|----|----|----|----|----|
| 01 | 11 | 01 | 11 | 01 | 11 |
| 00 | 10 | 00 | 10 | 00 | 10 |
| 01 | 11 | 01 | 11 | 01 | 11 |

MOBILE TELECOMMUNICATIONS DEVICE WITH STYLUS

CROSS REFERENCE TO RELATED APPLICATIONS

The present application is a continuation-in-part of U.S. application Ser. No. 10/917,436 filed on Aug. 13, 2004, which is a continuation of U.S. application Ser. No. 09/722,147 filed on Nov. 25, 2000, the entire contents of which are now incorporated by reference.

COPENDING APPICATIONS

The following applications have been filed by the Applicant simultaneously with the present application

| | | | | | |
|---|---|---|---|---|---|
| 11/124158 | 11/124196 | 11/124199 | 11/124162 | 11/124202 | 11/124197 |
| 11/124154 | 11/124198 | 11/124153 | 11/124151 | 11/124160 | 11/124192 |
| 11/124175 | 11/124163 | 11/124149 | 11/124152 | 11/124173 | 11/124155 |
| 11/124157 | 11/124174 | 11/124194 | 11/124164 | 11/124200 | 11/124195 |
| 11/124166 | 11/124150 | 11/124172 | 11/124165 | 11/124186 | 11/124185 |
| 11/124184 | 11/124182 | 11/124201 | 11/124171 | 11/124181 | 11/124161 |
| 11/124156 | 11/124191 | 11/124159 | 11/124175 | 11/324188 | 11/124170 |
| 11/124187 | 11/124189 | 11/124190 | 11/124180 | 11/124193 | 11/124183 |
| 11/124178 | 11/124177 | 11/124148 | 11/124168 | 11/124179 | 11/124169 |

The disclosures of these co-pending applications are incorporated herein by reference.

CROSS REFERENCES

The following patents or patent applications filed by the applicant or assignee of the present invention are hereby incorporated by cross-reference.

| | | | | | |
|---|---|---|---|---|---|
| 6405055 | 6628430 | 10/920230 | 10/920372 | 10/920229 | 10/919366 |
| 7081974 | 10/919242 | 10/919243 | 10/919380 | 10/919381 | 10/919382 |
| 10/919383 | 7075684 | 10/503924 | 7108437 | 6915140 | 6999206 |
| 10/659023 | 7092130 | 6750901 | 6476863 | 6788336 | 10/866608 |
| 10/920219 | 6967750 | 6995876 | 7099051 | 11/107942 | 11/107943 |
| 7095533 | 6914686 | 10/920221 | 7099033 | 11/003786 | 11/003616 |
| 11/003418 | 11/003334 | 11/003600 | 11/003404 | 11/003419 | 11/003700 |
| 11/003601 | 11/003618 | 11/003615 | 11/003337 | 11/003698 | 11/003420 |
| 6984017 | 11/003699 | 11/071473 | 11/003463 | 11/003701 | 11/003683 |
| 11/003614 | 11/003702 | 11/003684 | 11/003619 | 11/003617 | 10/815621 |
| 10/815612 | 10/815630 | 10/815637 | 10/815638 | 10/815640 | 10/815642 |
| 7097094 | 10/815644 | 10/815618 | 10/815639 | 10/815635 | 10/815647 |
| 10/815634 | 10/815632 | 10/815631 | 10/815648 | 10/815645 | 10/815646 |
| 10/815617 | 10/815620 | 10/815615 | 10/815613 | 10/815633 | 10/815611 |
| 10/815616 | 10/815614 | 10/815636 | 10/815649 | 11/041650 | 11/041651 |
| 11/041652 | 11/041649 | 11/041610 | 11/041609 | 11/041626 | 11/041627 |
| 11/041624 | 11/041625 | 11/041556 | 11/041580 | 11/041723 | 11/041698 |
| 11/041648 | 10/815609 | 10/815627 | 10/815626 | 10/815611 | 10/815610 |
| 7097106 | 7070110 | 10/815629 | 6623101 | 6406129 | 6505916 |
| 6457809 | 6550895 | 6457812 | 10/296434 | 6428133 | 6231148 |
| 6293658 | 6614560 | 6238033 | 6312070 | 6238111 | 6378970 |
| 6196739 | 6270182 | 6152619 | 7006143 | 6876394 | 6738096 |
| 6970186 | 6287028 | 6412993 | 11/033145 | 10/815625 | 10/815624 |
| 10/815628 | 10/913375 | 10/913373 | 10/913374 | 10/913372 | 10/913377 |
| 10/913378 | 10/913380 | 10/913379 | 10/913376 | 10/913381 | 10/986402 |
| 10/407212 | 10/760272 | 10/760273 | 7083271 | 10/760182 | 7080894 |
| 10/760218 | 7090336 | 10/760216 | 10/760233 | 10/760246 | 7083257 |
| 10/760243 | 10/760201 | 10/760185 | 10/760253 | 10/760255 | 10/760209 |
| 7118192 | 10/760194 | 10/760238 | 7077505 | 10/760235 | 7077504 |
| 10/760189 | 10/760262 | 10/760232 | 10/760231 | 10/760200 | 10/760190 |
| 10/760191 | 10/760227 | 7108353 | 7104629 | 10/728804 | 10/728952 |
| 7108355 | 6991322 | 10/728790 | 7118197 | 10/728970 | 10/728784 |
| 10/728783 | 7077493 | 6962402 | 10/728803 | 10/728780 | 10/728779 |
| 7118198 | 10/773204 | 10/773198 | 10/773199 | 6830318 | 10/773201 |
| 10/773191 | 10/773183 | 7108356 | 7118202 | 10/773186 | 10/773200 |
| 10/773185 | 10/773192 | 10/773197 | 10/773203 | 10/773187 | 10/773202 |
| 10/773188 | 7118201 | 7111926 | 10/773184 | 7018021 | 11/060751 |
| 11/060805 | 10/409876 | 10/409848 | 10/409845 | 11/084796 | 11/084742 |
| 11/084806 | 09/575197 | 7079712 | 09/575123 | 6825945 | 09/575165 |
| 6813039 | 09/693415 | 6987506 | 6824044 | 7038797 | 6980318 |
| 6816274 | 7102772 | 09/575186 | 6681045 | 6678499 | 6679420 |
| 6963845 | 6976220 | 6728000 | 7110126 | 09/575145 | 6976035 |
| 6813558 | 6766942 | 6965454 | 6995859 | 7088459 | 6720985 |
| 09/609303 | 6922779 | 6978019 | 6847883 | 09/693647 | 09/721895 |
| 09/607843 | 09/693690 | 6959298 | 6973450 | 09/609553 | 6965882 |
| 09/608022 | 09/575181 | 09/722174 | 09/721896 | 10/291522 | 6718061 |
| 10/291523 | 10/291471 | 7012710 | 6825956 | 10/291481 | 10/291509 |
| 10/291825 | 10/291519 | 7031010 | 6972864 | 6862105 | 7009738 |
| 6989911 | 6982807 | 10/291576 | 6829387 | 6714678 | 6644545 |
| 6609653 | 6651879 | 10/291555 | 10/291510 | 10/291592 | 10/291542 |
| 7044363 | 7004390 | 6867880 | 7034953 | 6987581 | 10/291556 |
| 10/291821 | 10/291525 | 10/291586 | 10/291822 | 10/291524 | 10/291553 |
| 6850931 | 6865570 | 6847961 | 10/685523 | 10/685583 | 10/685455 |
| 10/685584 | 10/757600 | 10/804034 | 10/793933 | 6889896 | 10/831232 |
| 10/884882 | 6996274 | 10/943938 | 10/943874 | 10/943872 | 10/944044 |
| 10/943942 | 10/944043 | 10/949293 | 10/943877 | 6986459 | 10/954170 |
| 10/981773 | 10/981626 | 10/981616 | 10/981627 | 10/974730 | 10/986337 |
| 10/992713 | 11/006536 | 11/020256 | 11/020106 | 11/020260 | 11/020321 |
| 11/020319 | 11/026045 | 11/059696 | 11/051032 | 11/059674 | 11/107944 |
| 11/107941 | 11/082940 | 11/082815 | 11/082827 | 11/082829 | 6991153 |
| 6991154 | 7068382 | 7007851 | 6957921 | 6457883 | 10/743671 |
| 7044381 | 7094910 | 7091344 | 09/928108 | 7038066 | 7099019 |
| 7062651 | 6789194 | 6789191 | 10/900129 | 10/900127 | 10/913328 |
| 10/913350 | 10/982975 | 10/983029 | 6644642 | 6502614 | 6622999 |
| 6669385 | 6827116 | 7011128 | 10/949307 | 6549935 | 6987573 |
| 6727996 | 6591884 | 6439706 | 6760119 | 09/575198 | 7064851 |
| 6826547 | 6290349 | 6428155 | 6785016 | 6831682 | 6741871 |
| 6927871 | 6980306 | 6965439 | 6840606 | 7036918 | 6977746 |
| 6970264 | 7068389 | 7093991 | 10/659026 | 10/884885 | 10/884883 |
| 10/901154 | 10/932044 | 10/962412 | 10/962510 | 10/962552 | 10/965733 |
| 10/965933 | 10/974742 | 10/982974 | 10/983018 | 10/986375 | 11/107817 |
| 6982798 | 6870966 | 6822639 | 6474888 | 6627870 | 6724374 |
| 6788982 | 09/722141 | 6788293 | 6946672 | 6737591 | 7091960 |
| 09/693514 | 6792165 | 7105753 | 6795593 | 6980704 | 6768821 |
| 10/291366 | 7041916 | 6797895 | 7015901 | 10/782894 | 10/782895 |
| 10/778056 | 10/178058 | 10/778060 | 10/778059 | 10/778063 | 10/778062 |
| 10/778061 | 10/778057 | 7096199 | 10/917468 | 10/917467 | 10/917466 |
| 10/917465 | 10/917356 | 10/948169 | 10/948253 | 10/948157 | 10/917436 |
| 10/943856 | 10/919379 | 7019319 | 10/943878 | 10/943849 | 7043096 |
| 11/071267 | 7055739 | 09/575109 | 6830196 | 6832717 | 09/721862 |
| 7120853 | 7082562 | 6843420 | 10/291718 | 6789731 | 7057608 |
| 6766944 | 6766945 | 10/291715 | 10/291559 | 10/291660 | 10/409864 |
| 7108192 | 7111791 | 7077333 | 6983878 | 10/786631 | 10/853782 |
| 10/893372 | 6929186 | 6994264 | 7017826 | 7014123 | 10/971051 |
| 10/971145 | 10/971146 | 7017823 | 7025276 | 10/990459 | 7080780 |
| 11/074802 | 10/492169 | 10/492152 | 10/492168 | 10/492161 | 10/492154 |
| 10/502575 | 10/683151 | 10/683040 | 10/510391 | 10/510392 | 10/919261 |
| 10/778090 | 6957768 | 09/575162 | 09/575172 | 09/575170 | 7106888 |
| 09/575161 | 6982701 | 6982703 | 10/291538 | 6786397 | 6947027 |
| 6975299 | 10/291714 | 7048178 | 7118025 | 6839053 | 7015900 |
| 7010147 | 10/291713 | 6914593 | 10/291546 | 6938826 | 10/913340 |
| 10/940668 | 6992662 | 11/039897 | 11/074800 | 11/074782 | 11/074777 |
| 10/975917 | 11/102698 | 11/02843 | 10/727181 | 10/727162 | 10/727163 |
| 10/727245 | 10/727204 | 10/727233 | 10/727280 | 10/727157 | 10/727178 |
| 7096137 | 10/727257 | 10/727238 | 10/727251 | 10/727159 | 10/727180 |
| 10/727179 | 10/727192 | 10/727274 | 10/727164 | 10/727161 | 10/727198 |
| 10/727158 | 10/754536 | 10/754938 | 10/727227 | 10/727160 | 10/934720 |
| 6795215 | 7070098 | 09/575109 | 6805419 | 6859289 | 6977751 |
| 6398332 | 6394573 | 6622923 | 6747760 | 6921144 | 10/884881 |
| 7092112 | 10/949294 | 10/854521 | 10/854522 | 10/854488 | 10/854487 |
| 10/854503 | 10/854504 | 10/854509 | 10/854510 | 7093989 | 10/854497 |
| 10/854495 | 10/854498 | 10/854511 | 10/854512 | 10/854525 | 10/854526 |
| 10/854516 | 10/854508 | 10/854507 | 10/854515 | 10/854506 | 10/854505 |
| 10/854493 | 10/854494 | 10/854489 | 10/854490 | 10/854492 | 10/854491 |
| 10/854528 | 10/854523 | 10/854527 | 10/854524 | 10/854520 | 10/854514 |
| 10/854519 | 10/854513 | 10/854499 | 10/854501 | 10/854500 | 10/854502 |
| 10/854518 | 10/854517 | 10/934628 | 10/760254 | 10/760210 | 10/760202 |
| 10/760197 | 10/760198 | 10/760249 | 10/760263 | 10/760196 | 10/760247 |
| 10/760223 | 10/760264 | 10/760244 | 7097291 | 10/760222 | 10/760248 |
| 7083273 | 10/760192 | 10/760203 | 10/760204 | 10/760205 | 10/760206 |
| 10/760267 | 10/160270 | 10/760259 | 10/760271 | 10/760275 | 10/760274 |
| 10/760268 | 10/760184 | 10/760195 | 10/760186 | 10/760261 | 7083272 |
| 11/014764 | 11/014763 | 11/014748 | 11/014747 | 11/014761 | 11/014760 |
| 11/014757 | 11/014714 | 11/014713 | 11/014762 | 11/014724 | 11/014723 |

-continued

| | | | | | |
|---|---|---|---|---|---|
| 11/014756 | 11/014736 | 11/014759 | 11/014758 | 11/014725 | 11/014739 |
| 11/014738 | 11/014737 | 11/014726 | 11/014745 | 11/014712 | 11/014715 |
| 11/014751 | 11/014735 | 11/014734 | 11/014719 | 11/014750 | 11/014749 |
| 11/014746 | 11/014769 | 11/014729 | 11/014743 | 11/014733 | 11/014754 |
| 11/014755 | 11/014765 | 11/014766 | 11/014740 | 11/014720 | 11/014753 |
| 11/014752 | 11/014744 | 11/014741 | 11/014768 | 11/014767 | 11/014718 |
| 11/014717 | 11/014716 | 11/014732 | 11/014742 | 6454482 | 6808330 |
| 6527365 | 6474773 | 6550997 | 7093923 | 6957923 | 10/309185 |
| 10/949288 | 10/962400 | 10/969121 | 10/962523 | 7079292 | |

Some applications have been listed by docket numbers. These will be replaced when application numbers are known.

FIELD OF INVENTION

The present invention relates to mobile telecommunication devices. The invention has primarily been designed for application to mobile telephones. However, it will be appreciated by those skilled in the art that the invention can be used with other types of portable device.

The invention has primarily been designed for use in a mobile telecommunications device such as a mobile telecommunications device (i.e. a mobile phone) that incorporates a printer, and will be described with reference to such an application. However, it will be appreciated by those skilled in the art that the invention can be used with other types of portable device, or even non-portable devices.

BACKGROUND OF INVENTION

The Assignee has developed mobile phones, personal data assistants (PDAs) and other mobile telecommunication devices, with the ability to print hard copies of images or information stored or accessed by the device (see for example, U.S. Pat. No. 6,405,055, filed on Nov. 9, 1999). Likewise, the Assignee has also designed digital cameras with the ability to print captured images with an inbuilt printer (see for example, U.S. Pat. No. 6,750,901 filed on Jul. 10, 1998. As the prevalence of mobile telecommunications devices with digital cameras increases, the functionality of these devices is further enhanced by the ability to print hard copies.

As these devices are portable, they must be compact for user convenience. Accordingly, any printer incorporated into the device needs to maintain a small form factor. Also, the additional load on the battery should be as little as possible. Furthermore, the consumables (ink and paper etc) should be relatively inexpensive and simple to replenish. It is these factors that strongly influence the commercial success or otherwise of products of this type. With these basic design imperatives in mind, there are on-going efforts to improve and refine the functionality of these devices.

The Assignee of the present invention has also developed the Netpage system for enabling interaction with computer software using a printed interface and a proprietary stylus-shaped sensing device.

As described in detail in U.S. Pat. No. 6,792,165, filed on Nov. 25, 2000 and U.S. patent application U.S. Ser. No. 10/778,056, filed on Feb. 17, 2004, a Netpage pen captures, identifies and decodes tags of coded data printed onto a surface such as a page. In a preferred Netpage implementation, each tag encodes a position and an identity of the document. By decoding at least one of the tags and transmitting the position (or a refined version of the position, representing a higher resolution position of the pen) and identity referred to by the decoded tag, a remote computer can determine an action to perform. Such actions can include, for example, causing information to be saved remotely for subsequent retrieval, downloading of a webpage for printing or display via a computer, bill payment or even the performance of handwriting recognition based on a series of locations of the Netpage pen relative to the surface. These and other applications are described in many of the Netpage-related applications cross-referenced by the present application.

When printing a Netpage, a printer in a mobile telecommunications device can print the Netpage tags simultaneously with visible user information. The association between the tags and information can already exist on a remote Netpage server, such as where the printer is printing a fully rendered page (including tags) provided by the Netpage server or another computer. Alternatively, the mobile telecommunications device can generate the tags (or source them remotely) and define an association between the tags and user information. The association is then recorded in the remote Netpage server.

The problem with these options is that they require the mobile telecommunications device to include Netpage tag printing capabilities. This requires an additional row of print nozzles in the printhead, and reduces the amounts of ink that can be stored for non-tag use. Whilst this is less of an issue with large, mains-powered printers, it can be an issue in small form-factor articles such as mobile telecommunications devices.

Alternatively, the mobile telecommunications device can be configured to print on print media that is pre-printed with Netpage tags. That way the printer need only print the user information and record an association between the visible information and the pre-printed tags.

One way of doing this is to use a Netpage sensing device that scans the page as it is printed to determine the content of at least one of the tags and positions of various elements of the user information relative to the tags. This requires that the printer include a Netpage sensing device, which may be somewhat bulky for use in mobile applications, and requires additional processing capacity. Even if a Netpage sensing device is provided to enable the mobile telecommunications device to act as a Netpage pen in a more general sense, it is undesirable for a user to have to separately scan a portion of the pre-printed media to determine parameters of the coded data before inserting the media for printing.

It would be desirable to overcome the problem of associating user information to be printed onto media at least partially pre-printed with Netpage tags.

SUMMARY OF INVENTION

In a first aspect the present invention provides a method of accessing at least one electronic connection address using a mobile device and an interactive printed document that includes human-readable information and machine-readable coded data, the mobile telecommunications device comprising:
  a transceiver configured to send and receive signals via a wireless telecommunications network;
  sensing means; and
  decoding means;
  the method comprising the steps of:
(a) sensing, with the sensing means, at least some of the coded data while the mobile telecommunications device is used to physically interact with the printed document;
(b) sending, with the transceiver, the indicating data to a remote computer system;

(c) receiving, with the transceiver, at least one electronic connection address in response to the indicating data; and (d) outputting the at least one connection address in a human readable manner.

Optionally, the mobile device includes an integral printer, wherein step (d) includes printing the at least one connection address onto a print medium with the printer.

Optionally, the mobile device includes a display, wherein step (d) includes displaying the at least one connection address on the display.

Optionally the mobile device further includes a user interface, the method including the steps, performed after step (d), of:

(e) receiving, via the user interface, user selection of at least one of the at least one connection address displayed on the display;

(f) establishing a connection with the selected at least one connection address, via the transceiver and the mobile telecommunications network.

Optionally the selected at least one connection address is a telephonic number, and step (f) includes establishing a telephonic connection between the mobile device and the at least one connection address.

Optionally the telephonic connection is a voice connection.

Optionally the telephonic connection is an audio-visual connection.

Optionally the mobile device further includes a user interface, the method including the steps, performed after step (d), of:

(e) receiving, via the user interface, user selection of at least one of the at least one connection address displayed on the display;

(d) sending information, or causing information to be sent, to the at least one connection address via the establishing a connection with the selected at least one connection address, via the transceiver and the mobile device.

Optionally the coded data is indicative of an identity of the print medium.

Optionally the coded data is indicative of at least one location in relation to the print medium.

Optionally the coded data is indicative of an object.

Optionally the coded data is indicative of an electronic address of the object.

Optionally the electronic connection address comprises one or more of the following:

an email address;
a fax number;
a phone number;
a network address; and
a URL.

Optionally the mobile device includes a printer, the method including printing the connection address onto a print medium.

Optionally the method further including steps of:
determining a relationship between the connection address printed or to be printed onto the print medium; and
transmitting the data indicative of the relationship to a remote computer system for storage.

Optionally the print medium is a card.

Optionally the mobile device stores one or more templates for use in generating an image to be printed, the image incorporating the connection address in human readable form.

Optionally the mobile device is configured to access a remote computer system to download one or more templates for use in generating an image to be printed, the image incorporating the connection address in human readable form.

In a first aspect there is provided method of enabling interaction with a printed schedule document using a mobile device including sensing means, processing means and a transceiver, the schedule document including human-readable first schedule information and machine-readable coded data, the method including the steps of:

(a) sensing at least some of the coded data with the sensing means while the mobile telecommunications device is used by a user to physically interact with the schedule document;

(b) decoding, with the processing means, at least some of the sensed coded data and generating indicating data on the basis of the decoded coded data;

(c) transmitting, using the transceiver, the indicating data to a remote computer system via the wireless telecommunications network;

(d) receiving, using the transceiver, response data from the computer system, the response data having been sent in reply to the indicating data;

(e) generating, using the processing means, a layout based on the response data, the response data representing further schedule information; and (f) outputting the layout in a human-readable form.

Optionally the mobile device further includes a display, the method including outputting the layout by displaying it on the display.

Optionally the mobile device further includes a printer, the method including outputting the layout by printing it using the printer.

Optionally the mobile device further includes a printer controller, the method including processing the layout with the printer controller to generate dot data, and supplying the dot data to the printer to be printed.

Optionally the mobile device further includes a printer, the method including outputting the layout by printing it using the printer.

Optionally the mobile device further includes a printer controller, the method including processing the layout with the printer controller to generate dot data, and supplying the dot data to the printer to be printed.

Optionally the print medium includes a linear-encoded data track extending in an intended direction of printing, the mobile device including:

a sensor configured to sense the data track during printing of the dot data;

a printhead for printing onto the print medium in response to a fire control signal; and fire control means connected to generate the fire control signal based on the sensed data track.

Optionally the mobile device further includes a light-emitting device for illuminating the data track while the sensor is sensing it during printing.

Optionally the data track is printed with infrared ink, the light-emitting device emits light in the infrared spectrum and the photosensor is sensitive in the infrared spectrum.

Optionally the data track is a clock track containing only a clock code, the fire control means being configured to generate the fire control signal in the form of a clock signal generated from the sensed data track.

Optionally the data track includes first information, the first information including an embedded clock signal, the fire control means being configured to generate the fire control signal in the form of a clock signal extracted from the sensed data track.

Optionally the first information is indicative of at least one physical characteristic of the print medium, the mobile device being configured to control operation of the printhead at least partially on the basis of at least one of the physical characteristics.

Optionally the mobile device further configured to use the sensed data track to determine an absolute position of the print medium with respect to the printhead, and to print onto the print medium in reliance on the determination.

Optionally the data track further encoding first information and the print medium further including second coded data that encodes second information, the first information being indicative of the second information, wherein the mobile device is configured to print onto the print medium such that there is a predetermined registration between what is being printed and the second coded data.

Optionally the mobile device further configured to receive the information indicative of the predetermined registration from a remote computer system via the transceiver.

Optionally the data track further encoding first information and the print medium further including second coded data that encodes second information, the first information being indicative of the second information, wherein the mobile device is configured to determine a registration between what is being printed and the second coded data.

Optionally the mobile device further configured to transmit the determined registration to a remote computer system via the transceiver.

In a first aspect there is provided a mobile telecommunications device including:
 a transceiver for sending and receiving signals via a wireless telecommunications network;
 a processor for processing schedule data to generate dot data representing a visual layout of the schedule data; and
 a printer configured to receive the dot data and print it onto a print medium.

Optionally the printer is configured to print coded data onto the print medium along with the visual layout represented by the dot data.

Optionally the mobile telecommunications device configured to receive, using the transceiver, the schedule data from a remote computer system via the telecommunications network.

Optionally the mobile telecommunications device configured to send, using the transceiver, a request to the remote computer system, the request identifying the schedule data, the schedule data being received in response to the request.

Optionally the coded data is indicative of an identity of a document containing the schedule data.

Optionally print medium includes a linear-encoded data track extending in an intended direction of printing, the mobile device including:
 a sensor configured to sense the data track during printing of the dot data;
 a printhead for printing onto the print medium in response to a fire control signal; and
 fire control means connected to generate the fire control signal based on the sensed data track.

Optionally the mobile device further includes a light-emitting device for illuminating the data track while the sensor is sensing it during printing.

Optionally the data track is printed with infrared ink, the light-emitting device emits light in the infrared spectrum and the photosensor is sensitive in the infrared spectrum.

Optionally the data track is a clock track containing only a clock code, the fire control means being configured to generate the fire control signal in the form of a clock signal generated from the sensed data track.

Optionally the data track includes first information, the first information including an embedded clock signal, the fire control means being configured to generate the fire control signal in the form of a clock signal extracted from the sensed data track.

Optionally the first information is indicative of at least one physical characteristic of the print medium, the mobile device being configured to control operation of the printhead at least partially on the basis of at least one of the physical characteristics.

Optionally the mobile device configured to use the sensed data track to determine an absolute position of the print medium with respect to the printhead, and to print onto the print medium in reliance on the determination.

Optionally the mobile device wherein the data track further encoding first information and the print medium further including second coded data that encodes second information, the first information being indicative of the second information, wherein the mobile device is configured to print onto the print medium such that there is a predetermined registration between what is being printed and the second coded data.

Optionally the mobile device configured to receive the information indicative of the predetermined registration from a remote computer system via the transceiver.

Optionally the mobile device wherein the data track further encoding first information and the print medium further including second coded data that encodes second information, the first information being indicative of the second information, wherein the mobile device is configured to determine a registration between what is being printed and the second coded data.

Optionally the mobile device configured to transmit the determined registration to a remote computer system via the transceiver.

In a first aspect there is provided a mobile device for enabling interaction with a printed email document, the email document including human-readable first email information and machine-readable coded data, the mobile device including:
 a transceiver for sending and receiving signals via a wireless telecommunications network;
 sensing means for sensing at least some of the coded data while the mobile device is used to interact with the email document;
 processing means for decoding at least some of the sensed coded data and generating indicating data on the basis of the decoded coded data;
 the mobile device being programmed and configured to:
 (a) transmit, using the transceiver, the indicating data to a remote computer system via the wireless telecommunications network;
 (b) receive, using the transceiver, response data from the computer system;
 (c) generating, using the processing means, a layout based on the response data, the response data representing further email information; and
 (d) outputting the layout in a human-readable form.

Optionally the mobile device further includes a display, the mobile device being configured to output the layout by displaying it on the display.

Optionally the mobile device further includes an integral printer, the mobile device being configured to output the layout by printing it using the printer.

Optionally the mobile device further includes a printer controller circuit configured to process the layout to generate dot data and supply the dot data to the printer to be printed.

Optionally the mobile device further includes an integral printer, the mobile device being configured to output the layout by printing it onto a print medium using the printer.

Optionally the mobile device further includes a printer controller circuit configured to process the layout to generate dot data and supply the dot data to the printer to be printed.

Optionally the print medium includes a linear-encoded data track extending in an intended direction of printing, the mobile device including:
- a sensor configured to sense the data track during printing of the dot data;
- a printhead for printing onto the print medium in response to a fire control signal; and
- fire control means connected to generate the fire control signal based on the sensed data track.

Optionally the mobile device further includes a light-emitting device for illuminating the data track while the sensor is sensing it during printing.

Optionally the data track is printed with infrared ink, the light-emitting device emits light in the infrared spectrum and the photosensor is sensitive in the infrared spectrum.

Optionally the data track is a clock track containing only a clock code, the fire control means being configured to generate the fire control signal in the form of a clock signal generated from the sensed data track.

Optionally the data track includes first information, the first information including an embedded clock signal, the fire control means being configured to generate the fire control signal in the form of a clock signal extracted from the sensed data track.

Optionally the first information is indicative of at least one physical characteristic of the print medium, the mobile device being configured to control operation of the printhead at least partially on the basis of at least one of the physical characteristics.

Optionally the mobile device configured to use the sensed data track to determine an absolute position of the print medium with respect to the printhead, and to print onto the print medium in reliance on the determination.

Optionally the mobile device wherein the data track further encoding first information and the print medium further including second coded data that encodes second information, the first information being indicative of the second information, wherein the mobile device is configured to print onto the print medium such that there is a predetermined registration between what is being printed and the second coded data.

Optionally the mobile device configured to receive the information indicative of the predetermined registration from a remote computer system via the transceiver.

Optionally the mobile device wherein the data track further encoding first information and the print medium further including second coded data that encodes second information, the first information being indicative of the second information, wherein the mobile device is configured to determine a registration between what is being printed and the second coded data.

Optionally the mobile device configured to transmit the determined registration to a remote computer system via the transceiver.

In a first aspect the present invention provides a mobile device configured to enable a user to play a game by interacting with an interactive gaming document, the mobile device comprising:
(a) a transceiver configured to send and receive signals via a wireless telecommunications network;
(b) a sensor configured to read at least some of coded data printed on the interactive gaming document; and
(c) decoding means for decoding the coded data read by the sensor and generating indicating data based on the decoded data;

the mobile telecommunications device being programmed and configured to:
send the indicating data to a remote computer system using the transceiver;
receive gaming data in response via the transceiver; and
based on the gaming data, output visual information to a user.

Optionally the coded data is indicative of an identity of the print medium.

Optionally the coded data is indicative of at least one location in relation to the print medium.

Optionally the coded data is indicative of an object.

Optionally the coded data is indicative of an electronic address of the object.

Optionally the gaming data includes any one or more of the following:
audio;
text;
video;
images; and
vibration patterns.

Optionally the gaming data includes printable content, and the mobile device includes a printer, the method comprising the step of printing the printable content onto a print medium using the printer.

Optionally the gaming data includes registration information indicative of a registration between the printable content and coded data, the mobile device being configured to print the printable gaming data onto the print medium in accordance with the registration information.

Optionally the printable content includes one or more maps.

Optionally the mobile device further configured to print a plurality of the print media having maps, wherein the print media having maps are printed such that they can be tiled together to form a larger map.

Optionally the mobile device further includes a user interface, the printable content including information or instructions for use by a user in interacting with the user interface.

Optionally the mobile device further configured to print one or more additional print media in response to input entered via the user interface, the input being at least partially based on the information and/or instructions on one or more of the earlier printed game cards.

Optionally the print medium to be printed on includes a linear-encoded data track extending in an intended direction of printing, the mobile device including:
- a sensor configured to sense the data track during printing of the dot data;
- a printhead for printing onto the print medium in response to a fire control signal; and
- fire control means connected to generate the fire control signal based on the sensed data track.

Optionally the mobile device further includes a light-emitting device for illuminating the data track while the sensor is sensing it during printing.

Optionally the data track is printed with infrared ink, the light-emitting device emits light in the infrared spectrum and the photosensor is sensitive in the infrared spectrum.

Optionally the data track is a clock track containing only a clock code, the fire control means being configured to generate the fire control signal in the form of a clock signal generated from the sensed data track.

Optionally the data track includes first information, the first information including an embedded clock signal, the fire control means being configured to generate the fire control signal in the form of a clock signal extracted from the sensed data track.

Optionally the first information is indicative of at least one physical characteristic of the print medium, the mobile device being configured to control operation of the printhead at least partially on the basis of at least one of the physical characteristics.

Optionally the mobile device further configured to use the sensed data track to determine an absolute position of the print medium with respect to the printhead, and to print onto the print medium in reliance on the determination.

Optionally the mobile device wherein the data track further encoding first information and the print medium further including second coded data that encodes second information, the first information being indicative of the second information, wherein the mobile device is configured to print onto the print medium such that there is a predetermined registration between what is being printed and the second coded data.

In a first aspect the present invention provides a mobile telecommunications device comprising:
(a) a transceiver configured to send and receive data via a wireless telecommunications network;
(b) processing means for processing data received via the receiver, thereby to generate dot data representing game information for generating at least one card for use in an interactive game; and
(c) a printhead operatively connected to the processing means to receive the dot data and print it onto a print medium, thereby to generate the at least one card.

Optionally the at least one card includes coded data indicative of a plurality of positions, the positions being associated, in a remote computer system, with one or more actions or instructions associated with the interactive game.

Optionally the coded data is indicative of an identity of the card.

Optionally the game information includes map data indicative of an image of at least part of a map associated with the interactive game.

Optionally the game information includes map information to be printed on a plurality of the cards.

Optionally mobile telecommunications device configured to print the cards such that the map portions can be tiled together to form a map.

Optionally a mobile telecommunications device further including a sensing device for sensing coded data while the mobile telecommunications device is being used to interact with coded data on a surface, the processing means being configured to decode at least some of the code data to determine at least an identity of the surface.

Optionally a mobile telecommunications device configured to send at least the identity to a remote computer system via the transceiver and to receive via the transceiver in reply Optionally the game information includes visible user information in the form of text, icons or images, the coded data being disposed adjacent or coincident with the user information, thereby allowing a user to interact with the user information with a sensing device.

Optionally the mobile telecommunications device includes the sensing device for sensing at least some of the coded data on the card whilst the mobile telecommunications device is used to interact with the game information on the card.

Optionally a mobile telecommunications device wherein the processing means being configured to process at least some of the sensed coded data to determine at least an identity of the card.

Optionally a mobile telecommunications device configured to:
send at least the identity of the card to a remote computer system;
receive, in response from the remote computer system, further data representing further game information.

Optionally a mobile telecommunications device configured to output the further game information to a user.

Optionally the processing means are configured to process the further data to generate further dot data, and the printhead is configured to receive the further dot data and print it onto a print medium, thereby to generate a further game card.

Optionally a mobile telecommunications device further including a user interface, and wherein the device is programmed and configured such that at least some of the game cards include information or instructions for use by a user in interacting with the user interface.

Optionally a mobile telecommunications device configured to one or more game cards in response to input entered via the user interface, the input being at least partially based on information and/or instructions on one or more of the earlier printed game cards.

Optionally the processing means further includes decompression means, wherein at least some of the game data is received in a compressed format and the decompression means is configured to decompress the data for supply to the processing means.

Optionally a mobile telecommunications device further including a sensor for sensing coded data disposed on or in the print medium before or during printing.

Optionally a mobile telecommunications device, configured to extract a clock signal from the sensed coded data, and to synchronize printing by the printhead onto the print medium in accordance with the clock signal.

Optionally a mobile telecommunications device, further including light-emitting means, the light emitting means being controlled to emit light while the coded data is being sensed by the sensor.

In a first aspect the present invention provides a cartridge for use in a mobile device including:
(a) an inkjet printhead;
(b) a print media feed path for directing print media past the printhead in a feed direction during printing; and
(c) a drive mechanism for driving the print media past the inkjet printhead for printing.

Incorporating the printhead into a cartridge ensures its regular replacement and thereby maintains print quality. Putting the drive mechanism in the cartridge means that the dimensional tolerances between the drive mechanism and the printhead can be closely controller and the fragile printhead nozzles can be safely enclosed within the cartridge casing. The only opening required in the cartridge are the media entry and exit slots which significantly limits the opportunity for tampering or contamination.

Optionally the drive mechanism is a passive mechanism with a drive shaft for engaging the print media and driving it past the inkjet printhead.

Optionally the print cartridge further comprising a drive roller for rotating the drive shaft, the drive roller being configured to be driven by a complementary drive mechanism in the mobile device when the cartridge is installed therein.

Optionally the drive roller is coaxial with the drive shaft.

Optionally the drive shaft is positioned in the print media path upstream of the printhead.

Optionally the print cartridge further comprising a printhead having an array of ink ejection nozzles and at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally the print cartridge further comprising:
(a) a capping mechanism including a capper moveable between a capping position in which the capper is urged into a capping relationship with the printhead, and an uncapped position in which the printhead is able to print onto the print media, wherein in the uncapped position the capper is displaced away from the printhead;
(b) a force transfer mechanism connected to the capper and configured such that a force provided by an edge of the media as it moves relative to the feed path is transferred to the capper by the force transfer mechanism, thereby to at least commence movement of the capper from the capped position to the uncapped position prior to the media reaching the capper.

Optionally the print cartridge further comprising:
(a) a capping mechanism including a capper moveable between a capping position in which the capper is urged into a capping relationship with the printhead, and an uncapped position in which the printhead is able to print onto the print media, wherein in the uncapped position the capper is displaced away from the printhead; and
(b) a locking mechanism configured to hold the capper in the uncapped position until after a trailing edge of the media is clear of the printhead.

Optionally the print cartridge further comprising:
(a) a capping mechanism including a capper moveable between a capping position in which the capper is urged into a capping relationship with the printhead, and an uncapped position in which the printhead is able to print onto the print media; wherein,
(b) the capper assembly is held in the uncapped position by the media such that it moves to the capped position upon disengagement with the media.

Optionally the print cartridge further comprising:
the media substrate is a sheet; wherein during use,
the sheet disengages from the drive mechanism before completion of its printing such that the trailing edge of the sheet projects past the printhead by momentum to complete its printing.

Optionally the printhead comprises:
an array of nozzles for ejecting ink;
print data circuitry for providing the nozzles with print data; and,
a photosensor for optically receiving the print data from a beacon operated by a print engine controller in the mobile device.

Optionally the mobile device comprises:
a print engine controller for operatively controlling the printhead; and,
a position sensor for providing the print engine controller with a signal indicative of the position of the media substrate relative to the printhead; such that,
the print engine controller differentiates the signal to derive the speed of the media substrate relative to the printhead and adjusts the operation of the printhead in response to variations in the speed.

Optionally the mobile device comprises:
a print engine controller for operatively controlling the printhead; wherein during use,
the print engine controller senses the number of complete and partial rotations of the drive shaft and adjusts the operation of the printhead in response to variations in the angular velocity of the drive shaft.

Optionally the print cartridge further comprising at least one ink reservoir for supplying ink to the printhead, the at least one ink reservoir comprising:
a housing defining an ink storage volume;
one or more baffles dividing the ink storage volume into sections, each of the sections having at least one ink outlet for sealed connection to the printhead; and,
at least one conduit establishing fluid communication between the ink outlets of adjacent sections.

Optionally the media substrate is a sheet with coded data on at least part of its surface; and the mobile device further comprises a print engine controller for operatively controlling the printhead; and,
a sensor for reading the coded data and generating a signal indicative of at least one dimension of the sheet, and transmitting the signal to the print engine controller; such that,
the print engine controller uses the signal to initiate the printing when the sheet is at a predetermined position relative to the printhead.

Optionally the media substrate has coded data on at least part of its surface; and,
the mobile device further comprising a print engine controller for operatively controlling the printhead; and,
a dual sensing facility for reading the coded data before, as well as after, it has past the printhead.

Optionally the mobile device is a telecommunication device.

Optionally the mobile device is a mobile phone.

In a first aspect there is provided a print medium for use in a mobile device having a printer, the print medium comprising:
a laminar substrate defining first and second opposite faces;
first coded data in a first data format disposed in a first data region on the laminar substrate, the first coded data encoding first information; and
at least one orientation indicator indicative of an orientation of the print medium.

Optionally the at least one orientation indicator is disposed at or adjacent an edge of the print medium.

Optionally the print medium having a leading edge and a trailing edge defined relative to intended feed direction of the print medium through a media feed path, at least one of the at least one orientation indicators being disposed on or in the print medium at or adjacent the leading edge.

Optionally one of the orientation indicators is positioned adjacent a first corner of the print medium on the first face.

Optionally another of the orientation indicators is positioned adjacent a second corner of the print medium on the first face, the second corner being diagonally opposite the first corner.

Optionally another of the orientation indicators is positioned adjacent a third corner of the print medium on the second face, the third corner being adjacent the second corner.

Optionally another of the orientation indicators is positioned adjacent a fourth corner of the print medium on the second face, the fourth corner being diagonally opposite the third corner.

Optionally another of the orientation indicators is positioned adjacent a second corner of the print medium on the first face, the second corner being diagonally opposite the first corner.

Optionally the print medium further including a plurality of the orientation indicators, the position and number of the orientation indicators being positioned and configured such that, when the print medium is used in a suitably equipped mobile device, the device can determine the orientation of the card without having to read all of the orientation indicators.

Optionally the first coded data a linear-encoded data track extending in an intended direction of printing.

Optionally the data track is printed with infrared ink.

Optionally the data track includes a clock track containing only a clock code from which a clock signal can be derived during printing onto the print medium.

Optionally the first information includes an embedded clock from which a clock signal can be derived during printing onto the print medium.

Optionally the print medium further including second coded data that encodes second information, the first information being indicative of the second information.

Optionally the first information is indicative of at least one physical characteristic of the print medium.

Optionally the first information is indicative of a size of the print medium.

Optionally the first information is indicative of a media type associate with the print medium.

Optionally the first information is indicative of information pre-printed onto the print medium.

Optionally the print medium further including pre-printed human-readable information printed on either or both of the first and second faces.

Optionally the first coded data is printed in infrared ink that is substantially invisible to an average unaided human eye.

In a first aspect the present invention provides a print medium for use with a mobile device having a printer, the print medium comprising:
- a laminar substrate defining first and second opposite faces; and
- an orientation indicator disposed on at least one of the first and second faces, the orientation indicator being indicative of at least one orientation of the print medium, thereby enabling the mobile device to determine the print medium's orientation prior to printing thereon.

Optionally the orientation indicator is indicative of which of the first and second faces it is disposed upon.

Optionally the orientation indicator is indicative of an absolute planar rotational orientation of the print medium.

Optionally a print medium having a leading edge and a trailing edge defined relative to intended feed direction of the print medium through the media feed path, wherein the orientation indicator is positioned at or adjacent the leading edge and is indicative of the leading edge.

Optionally a print medium further including a plurality of the orientation indicators.

Optionally a print medium wherein:
(a) each of the orientation indicators is indicative of which of the first and second faces it is disposed upon;
(b) each of the orientation indicators is indicative of an absolute planar rotational orientation of the print medium; and/or
(c) the print medium has a leading edge and a trailing edge defined relative to intended feed direction of the print medium through the media feed path, wherein the orientation indicator is positioned at or adjacent the leading edge and is indicative of the leading edge.

Optionally the orientation indicator is disposed at or adjacent an edge of the print medium.

Optionally the orientation indicator is positioned adjacent a first corner of the print medium on the first face.

Optionally another of the orientation indicators is positioned adjacent a second corner of the print medium on the first face, the second corner being diagonally opposite the first corner.

Optionally another of the orientation indicators is positioned adjacent a third corner of the print medium on the second face, the third corner being adjacent the second corner.

Optionally another of the orientation indicators is positioned adjacent a fourth corner of the print medium on the second face, the fourth corner being diagonally opposite the third corner.

Optionally the orientation indicator forms part of a coded data region on the print medium.

Optionally the coded data takes the form of a linear-encoded data track.

Optionally the data track extends along an edge of the print medium in an intended print direction of the card.

Optionally the data track encodes first information in addition to the orientation indicator.

Optionally the print medium further including second information encoded in accordance with a coding different from the linear-encoding of the data track, the first information being indicative of the second information.

Optionally the coded data is printed in infrared ink.

Optionally the first coded data is printed in infrared ink that is substantially invisible to an average unaided human eye.

Optionally a mobile device further including pre-printed human-readable information printed on either or both of the first and second faces.

In a first aspect the present invention provides a method of using a mobile device to print onto a print medium, the mobile device comprising:
- a wireless transceiver for sending and receiving data via a telecommunications network; and
- a printer;
the method comprising the steps of:
(a) determining a geographical location of the mobile device;
(b) determining a product or service available at, in or within a predetermined distance of, the geographical location;
(c) formatting a voucher containing information associated with the product or service; and
(d) printing the voucher using the printer.

Optionally the information is indicative of a location of a commercial entity.

Optionally the information is indicative of an inducement to buy the product or service.

Optionally the inducement is a price discount.

Optionally the price discount is only valid at an outlet of a commercial entity at the location.

Optionally the price discount is valid at any of a number of outlets of the commercial entity.

Optionally the method including the step of using the mobile device to determine the geographical location.

Optionally the mobile device includes a GPS receiver, the method comprising determining the geographical location using the GPS receiver.

Optionally the sensing device includes a wireless receiver for receiving radio-frequency data from a transmitter, step of determining the geographical location including the step of receiving, via the transmitter, radio-frequency data the geographical location.

Optionally the method including deriving the geographical location using an Uplink Time Difference of Arrival technique.

Optionally the providing step includes sending the information to an electronic address associated with at least one of the user of the mobile device.

Optionally the geographical location is an area.

Optionally the area is defined by a postal or zip code.

Optionally the area is a city, suburb or town.

Optionally the area is at least partially defined by a transmission footprint of one or more cells of a telecommunications network.

Optionally the area is at least partially defined by a transmission footprint of one or more cells of the telecommunications network.

Optionally the method including the steps of:
using a sensor in the mobile device to sense a data track during printing of the voucher, the data track being disposed on a face of the print medium being printed on to generate the voucher;
generating a fire control signal from the sensed data track; and
synchronizing the printing of the voucher using the fire control signal.

Optionally the data track is printed with infrared ink, the light-emitting device emits light in the infrared spectrum and the photosensor is sensitive in the infrared spectrum.

Optionally the data track is a clock track containing only a clock code, the method including the step of generating a clock signal generated from the sensed data track, the fire control signal being based on the clock signal.

Optionally the data track includes first information, the first information including an embedded clock signal, the method including the step of extracting a clock signal from the sensed data track, the fire control signal being based on the clock signal.

In a first aspect the present invention provides a mobile device including:
a printhead for printing onto a print medium, the print medium including coded data;
a media path for directing the print medium past the printhead for printing;
an optical sensor;
a first optical pathway for directing optical image information to the sensor to enable it to read at least some of the coded data from the print medium while at least some of the print medium is within the media path; and
a second optical pathway for directing optical image information to the sensor to enable it to read coded data from the print medium when the print medium is not in the media path.

Optionally the mobile device including at least one light source for illuminating the coded data to be sensed via the first optical pathway.

Optionally the mobile device including at least one light source for illuminating the coded data to be sensed via the second optical pathway.

Optionally the light source is an infrared light source.

Optionally the light source is an infrared light source.

Optionally the first optical pathway includes at least one mirror.

Optionally the first optical pathway includes a periscope arrangement of mirrors.

Optionally the mobile device further including a shutter selectively operable to reduce or prevent light from reaching the sensor via the second optical pathway during at least part of a printing procedure.

Optionally the mobile device further including a shutter-closing mechanism configured to close the shutter in response to the print medium moving through at least part of the media path.

Optionally the first and second optical pathways share a common optical pathway portion.

Optionally the mobile device further including a printer.

Optionally the printer takes the form of a replaceable cartridge.

Optionally the replaceable cartridge includes at least one ink reservoir.

Optionally the replaceable cartridge includes at least one sensor for sensing coded data on print medium intended to be used with the printer.

Optionally the replaceable cartridge includes a capping mechanism including a capper moveable between:
a capping position in which the capper is urged into a capping relationship with the printhead; and
an uncapped position in which the printhead is able to print onto the print medium, wherein in the uncapped position the capper is displaced away from the printhead;
wherein the capper is moved between the capped and uncapped position by an edge of the print medium as it moves through the media path.

Optionally in the capped position the capper is resiliently urged into the capping relationship.

Optionally the capping mechanism is configured such that the capper is displaced in the feed direction as it moves from the capped position to the uncapped position.

Optionally the replaceable cartridge includes a media drive mechanism for engaging print media to be printed by the printer.

Optionally the mobile device further including drive means for driving the media drive mechanism, the drive means not forming part of the replaceable cartridge.

Optionally the media drive mechanism includes a driven wheel configured to engage the drive means when the replaceable cartridge is installed in the mobile device.

In a first aspect the present invention provides an integrated cartridge for installation into a mobile device, the cartridge including:
an inkjet printhead including a plurality of inkjet nozzles;
at least one ink reservoir for supplying ink to the printhead for ejection by the nozzles; and
a capping mechanism for capping the printhead when it is not in use.

Incorporating the printhead into a cartridge ensures its regular replacement and thereby maintains print quality. A capper protects the delicate nozzle structures from paper dust during use. However, by having it integrated it into the cartridge, the only openings required in the cartridge are the media entry and exit slots which significantly limits the opportunity for tampering or contamination prior to installation.

Optionally the integrated circuit including a plurality of the ink reservoirs, each supplying ink to a subset of the nozzles.

Optionally the integrated circuit including reservoirs containing cyan, magenta and yellow inks, respectively.

Optionally the integrated circuit including reservoirs that respectively contain cyan, magenta, yellow inks and at least one other fluid.

Optionally the at least one other fluid includes black ink.

Optionally the at least one other fluid includes infrared ink.

Optionally the at least one other fluid includes infrared ink and black ink.

Optionally a cartridge further comprising a drive shaft for engaging the print media and driving it past the inkjet printhead.

Optionally a cartridge further comprising a drive roller for rotating the drive shaft, the drive roller being configured to be driven by a complementary drive mechanism in the mobile device when the cartridge is installed therein.

Optionally the drive roller is coaxial with the drive shaft.

Optionally the drive shaft is positioned in the print media path upstream of the printhead.

Optionally a cartridge further comprising a printhead having an array of ink ejection nozzles and at least one ink reservoir for supplying ink to the printhead for ejection by the nozzles, each of the at least one ink reservoirs including at least one absorbent structure for inducing a negative hydrostatic pressure in the ink at the nozzles.

Optionally the capping mechanism has a capper moveable between a capping position in which the capper is urged into a capping relationship with the printhead, and an uncapped position in which the printhead is able to print onto the print media, wherein in the uncapped position the capper is displaced away from the printhead; and the cartridge further comprises:

a force transfer mechanism connected to the capper and configured such that a force provided by an edge of the media as it moves relative to the feed path is transferred to the capper by the force transfer mechanism, thereby to at least commence movement of the capper from the capped position to the uncapped position prior to the media reaching the capper.

Optionally the capping mechanism has a capper moveable between a capping position in which the capper is urged into a capping relationship with the printhead, and an uncapped position in which the printhead is able to print onto the print media, wherein in the uncapped position the capper is displaced away from the printhead; and the cartridge further comprises:

a locking mechanism configured to hold the capper in the uncapped position until after a trailing edge of the media is clear of the printhead.

Optionally the capping mechanism has a capper moveable between a capping position in which the capper is urged into a capping relationship with the printhead, and an uncapped position in which the printhead is able to print onto the print media; such that during use, the capper assembly is held in the uncapped position by the media such that it moves to the capped position upon disengagement with the media.

Optionally a print cartridge further comprising:

the media substrate is a sheet; wherein during use, the sheet disengages from the drive mechanism before completion of its printing such that the trailing edge of the sheet projects past the printhead by momentum to complete its printing.

Optionally the mobile device comprises:

a print engine controller for operatively controlling the printhead; wherein during use, the print engine controller senses the number of complete and partial rotations of the drive shaft and adjusts the operation of the printhead in response to variations in the angular velocity of the drive shaft.

Optionally a print cartridge further comprising at least one ink reservoir for supplying ink to the printhead, the at least one ink reservoir comprising:

a housing defining an ink storage volume;

one or more baffles dividing the ink storage volume into sections, each of the sections having at least one ink outlet for sealed connection to the printhead; and, at least one conduit establishing fluid communication between the ink outlets of adjacent sections.

Optionally the mobile device is a telecommunication device.

Optionally the mobile device is a mobile phone.

In a first aspect the present invention provides a mobile device including:

(a) an inkjet printhead;

(b) a print media feed path for directing a print medium past the printhead in a feed direction during printing;

(c) a capping mechanism including a capper moveable between:

a capping position in which the capper is urged into a capping relationship with the printhead; and an uncapped position in which the printhead is able to print onto the print medium, wherein in the uncapped position the capper is displaced away from the printhead;

(d) a force transfer mechanism connected to the capper and configured such that a force provided by an edge of the print medium as it moves relative to the feed path is transferred to the capper by the force transfer mechanism, thereby to at least commence movement of the capper from the capped position to the uncapped position prior to the print medium reaching the capper.

Optionally the capper is moved completely into the uncapped position by the force transfer mechanism.

Optionally the force transfer device includes at least one crank member mounted to pivot about an axis, the crank member including:

a first region for engaging the print medium; and a second region, rotationally displaced from the first region, for engaging the capping mechanism;

the crank member being configured to translate linear force provided by the print medium into a torque that causes movement of the capper from the capped position towards the uncapped position.

Optionally the mobile device further including a locking mechanism for holding the capper in the uncapped position whilst the print medium is being printed on by the printhead.

Optionally the locking mechanism includes at least one cam mounted for rotation between an unlocked position and a locked position, the at least one cam being configured such that, in the unlocked position, it extends at least partially into the feed path when the print medium is not present, the at least one cam being positioned and configured to engage an edge of the print medium as the print medium is fed through the feed path such that the at least one cam is rotated by the print medium into the locked position, such that, in the locked position, the capper is held in the uncapped position until after a trailing edge of the print medium is clear of the printhead.

Optionally the cam is resiliently biased to return to the unlocked position once the print medium edge moves past a predetermined position in the feed path, thereby causing the capper to return to the capped position.

Optionally the at least one cam is mounted for rotation about an axis that is substantially normal to the print medium as it engages the cam in the feed path.

Optionally print medium for use with the device includes a linear-encoded data track extending in an intended direction of printing, the mobile device including:

a sensor configured to sense the data track during printing of the dot data;

a printhead for printing onto the print medium in response to a fire control signal; and fire control means connected to generate the fire control signal based on the sensed data track.

Optionally the data track is a clock track containing only a clock code, the fire control means being configured to generate the fire control signal in the form of a clock signal generated from the sensed data track.

Optionally the data track includes first information, the first information including an embedded clock signal, the fire control means being configured to generate the fire control signal in the form of a clock signal extracted from the sensed data track.

Optionally the first information is indicative of at least one physical characteristic of the print medium, the mobile device being configured to control operation of the printhead at least partially on the basis of at least one of the physical characteristics.

Optionally the mobile device configured to use the sensed data track to determine an absolute position of the print medium with respect to the printhead, and to print onto the print medium in reliance on the determination.

Optionally the data track further encoding first information and the print medium further including second coded data that encodes second information, the first information being indicative of the second information, wherein the mobile device is configured to print onto the print medium such that there is a predetermined registration between what is being printed and the second coded data.

Optionally the mobile device includes a transceiver, the mobile device being configured to receive the information indicative of the predetermined registration from a remote computer system via a transceiver.

Optionally the data track further encoding first information and the print medium further including second coded data that encodes second information, the first information being indicative of the second information, wherein the mobile device is configured to determine a registration between what is being printed and the second coded data.

Optionally the mobile device configured to transmit the determined registration to a remote computer system via the transceiver.

In a first aspect the present invention provides a mobile device including:
(a) an inkjet printhead;
(b) a print media feed path for directing print media past the printhead in a feed direction during printing; and
(c) a capping mechanism including a capper moveable between:
  a capping position in which the capper is urged into a capping relationship with the printhead; and
  an uncapped position in which the printhead is able to print onto the print media, wherein in the uncapped position the capper is displaced away from the printhead;
  wherein the capper is moved between the capped and uncapped position by an edge of the print media as it moves through the feed path.

De-capping the printhead by engagement with the media substrate avoids the need for a separate mechanism for actuating the capper. This permits a more compact cartridge so that the mobile device can adhere to a small form factor.

Optionally in the capped position the capper is resiliently urged into the capping relationship.

Optionally the capping mechanism is configured such that the capper is displaced in the feed direction as it moves from the capped position to the uncapped position.

Optionally the capping mechanism is further configured such that the capper is simultaneously displaced in a direction away from the printhead as it is displaced in the feed direction.

Optionally the capping mechanism is subsequently displaced in a direction opposite the feed direction in the uncapped position.

Optionally the mobile device further including a locking mechanism for holding the capper in the uncapped position whilst the print media is being printed on by the printhead.

Optionally the locking mechanism includes at least one cam mounted for rotation between an unlocked position and a locked position, the at least one cam being configured such that, in the unlocked position, it extends at least partially into the feed path when print media is not present, the at least one cam being positioned and configured to engage an edge of the print media as the print media is fed through the feed path such that the at least one cam is rotated by the print media into the locked position, such that, in the locked position, the capper is held in the uncapped position until after a trailing edge of the media is clear of the printhead.

Optionally the cam is resiliently biased to return to the unlocked position once the print media edge moves past a predetermined position in the feed path, thereby causing the capper to return to the capped position.

Optionally the at least one cam is mounted for rotation about an axis that is substantially normal to the print media as it engages the cam in the feed path.

Optionally the mobile device further comprising a drive shaft for engaging the print media and driving it past the inkjet printhead.

Optionally the mobile device further comprising a drive roller for rotating the drive shaft, the drive roller being configured to be driven by a complementary drive mechanism in the mobile device when the cartridge is installed therein.

Optionally the drive roller is coaxial with the drive shaft.

Optionally the drive shaft is positioned in the print media path upstream of the printhead.

Optionally a mobile device ftuther comprising a printhead having an array of ink ejection nozzles and at least one ink reservoir for supplying ink to the printhead for ejection by the nozzles, each of the at least one ink reservoirs including at least one absorbent structure for inducing a negative hydrostatic pressure in the ink at the nozzles.

Optionally during use,
  the sheet disengages from the drive shaft before completion of its printing such that the trailing edge of the sheet projects past the printhead by momentum to complete its printing.

Optionally the printhead comprises:
an array of nozzles for ejecting ink;
print data circuitry for providing the nozzles with print data; and,
a photosensor for optically receiving the print data from a beacon operated by a print engine controller in the mobile device.

Optionally a mobile device further comprising:
a print engine controller for operatively controlling the printhead; and,
a position sensor for providing the print engine controller with a signal indicative of the position of the media substrate relative to the printhead; such that,
the print engine controller differentiates the signal to derive the speed of the media substrate relative to the printhead and adjusts the operation of the printhead in response to variations in the speed.

Optionally a mobile device further comprising at least one ink reservoir for supplying ink to the printhead, the at least one ink reservoir comprising:

a housing defining an ink storage volume;

one or more baffles dividing the ink storage volume into sections, each of the sections having at least one ink outlet for sealed connection to the printhead; and, at least one conduit establishing fluid communication between the ink outlets of adjacent sections.

Optionally the mobile device is a telecommunication device.

Optionally the mobile device is a mobile phone.

In a first aspect the present invention provides a mobile device including:

(a) an inkjet printhead;

(b) a print media feed path for directing print media past the printhead in a feed direction during printing;

(c) a capping mechanism including a capper moveable between:

a capping position in which the capper is urged into a capping relationship with the printhead; and an uncapped position in which the printhead is able to print onto the print media, wherein in the uncapped position the capper is displaced away from the printhead;

(d) a locking mechanism configured to hold the capper in the uncapped position until after a trailing edge of the media is clear of the printhead.

Advantage: Initiating the re-capping of the printhead by disengagement with the trailing edge of the media substrate avoids the need for a separate mechanism for actuating the capper. This permits a more compact cartridge so that the mobile device can adhere to a small form factor.

Optionally the locking mechanism includes at least one cam mounted for rotation between an unlocked position and a locked position, the at least one cam being configured such that, in the unlocked position, it extends at least partially into the feed path when print media is not present, the at least one cam being positioned and configured to engage an edge of the print media as the print media is fed through the feed path such that the at least one cam is rotated by the print media into the locked position, such that, in the locked position, the capper is held in the uncapped position until after a trailing edge of the media is clear of the printhead.

Optionally the cam is resiliently biased to return to the unlocked position once the print media edge moves past a predetermined position in the feed path, thereby causing the capper to return to the capped position.

Optionally the at least one cam is mounted for rotation about an axis that is substantially normal to the print media as it engages the cam in the feed path.

Optionally the locking mechanism is configured to hold the capper in the uncapped position until after the trailing edge of the media is clear of the capper, such that the capper can be released into the capped position without capturing the print media.

Optionally a mobile device further including a locking mechanism for holding the capper in the uncapped position whilst the print media is being printed on by the printhead.

Optionally the locking mechanism includes at least one cam mounted for rotation between an unlocked position and a locked position, the at least one cam being configured such that, in the unlocked position, it extends at least partially into the feed path when print media is not present, the at least one cam being positioned and configured to engage an edge of the print media as the print media is fed through the feed path such that the at least one cam is rotated by the print media into the locked position, such that, in the locked position, the capper is held in the uncapped position until after a trailing edge of the media is clear of the printhead.

Optionally the cam is resiliently biased to return to the unlocked position once the print media edge moves past a predetermined position in the feed path, thereby causing the capper to return to the capped position.

Optionally the at least one cam is mounted for rotation about an axis that is substantially normal to the print media as it engages the cam in the feed path.

Optionally a mobile device further comprising a drive shaft for engaging the print media and driving it past the inkjet printhead.

Optionally a mobile device further comprising a drive roller for rotating the drive shaft, the drive roller being configured to be driven by a complementary drive mechanism in the mobile device when the cartridge is installed therein.

Optionally the drive roller is coaxial with the drive shaft.

Optionally the drive shaft is positioned in the print media path upstream of the printhead.

Optionally a mobile device further comprising a printhead having an array of ink ejection nozzles and at least one ink reservoir for supplying ink to the printhead for ejection by the nozzles, each of the at least one ink reservoirs including at least one absorbent structure for inducing a negative hydrostatic pressure in the ink at the nozzles.

Optionally during use, the sheet disengages from the drive shaft before completion of its printing such that the trailing edge of the sheet projects past the printhead by momentum to complete its printing.

Optionally the printhead comprises:

an array of nozzles for ejecting ink;

print data circuitry for providing the nozzles with print data; and, a photosensor for optically receiving the print data from a beacon operated by a print engine controller in the mobile device.

Optionally a mobile device further comprising:

a print engine controller for operatively controlling the printhead; and, a position sensor for providing the print engine controller with a signal indicative of the position of the media substrate relative to the printhead; such that, the print engine controller differentiates the signal to derive the speed of the media substrate relative to the printhead and adjusts the operation of the printhead in response to variations in the speed.

Optionally a mobile device further comprising at least one ink reservoir for supplying ink to the printhead, the at least one ink reservoir comprising:

a housing defining an ink storage volume;

one or more baffles dividing the ink storage volume into sections, each of the sections having at least one ink outlet for sealed connection to the printhead; and, at least one conduit establishing fluid communication between the ink outlets of adjacent sections.

Optionally the mobile device is a telecommunication device.

Optionally the mobile device is a mobile phone.

In a first aspect the present invention provides a print medium for use with a printer, the print medium comprising:

a laminar substrate defining first and second opposite faces;

first coded data in a first data format disposed in a first data region on the laminar substrate, the first coded data encoding first information; and second coded data in a second data format disposed in a second data region on the laminar substrate, the second coded data encoding second information;

wherein the first information is indicative of the second information.

Optionally the first information is the same as the second information.

Optionally the first information is a document identifier.

Optionally the first format is a linear pattern.

Optionally the second format is a two-dimensional pattern.

Optionally the first format is a linear-encoded data track.

Optionally the first format is a linear-encoded data track.

Optionally either or both of the first and second coded data are substantially invisible to the average unaided human eye.

Optionally a print medium further including one or more additional regions, each of the one or more additional regions including further coded data in the first format.

Optionally the coded data in each of the additional regions includes the first information.

Optionally the coded data in each of the first region and the additional regions includes an orientation indicator that is unique to each of the respective first and additional regions.

Optionally each orientation indicator includes sufficient bits' worth of data to uniquely identify the region within which the corresponding coded data is disposed.

Optionally there are three of the additional regions, and wherein:
the first coded data and the coded data of one of the additional regions are disposed along opposite edges on a first of the faces; and
the coded data of the remaining two additional regions are disposed along the opposite edges on the second of the faces.

Optionally the second coded data is disposed between the first coded data and the one of the additional regions on the first of the faces.

Optionally the print medium including further coded data in the second format, the further coded data being disposed between the additional regions on the second of the faces.

Optionally the print medium further including human-readable information pre-printed on at least one of the faces.

Optionally the human-readable information includes at least one direction indicator.

Optionally the human-readable information includes at least one icon indicative of a function.

Optionally the first information includes an embedded clock signal.

Optionally the print medium further including at least one clock track on at least one of the faces.

In a first aspect the present invention provides a mobile telecommunications device including:
a transceiver for sending and receiving signals via a wireless telecommunications network;
processing means for processing connection history information relating to communications sent to or from the mobile telecommunications device via the transceiver, to generate dot data representing a visual layout of the connection history information; and
a integral printer configured to receive the dot data and print it onto a print medium.

Optionally the connection history information includes an originating address of at least one previous connection or attempted connection with the mobile telecommunications device.

Optionally the connection history information includes an identity of a person or other entity associated with the originating address.

Optionally the connection history information includes a human-readable indication that a voice-mail has been received from the originating address.

Optionally the connection history information includes one or more connections or connection attempts made via the mobile telecommunications device.

Optionally the print medium includes a linear-encoded data track extending in an intended direction of printing, the mobile device including:
a sensor configured to sense the data track during printing of the dot data;
a printhead for printing onto the print medium in response to a fire control signal; and
fire control means connected to generate the fire control signal based on the sensed data track.

Optionally the mobile device further including a light-emitting device for illuminating the data track while the sensor is sensing it during printing.

Optionally the data track is printed with infrared ink, the light-emitting device emits light in the infrared spectrum and the photosensor is sensitive in the infrared spectrum.

Optionally the data track is a clock track containing only a clock code, the fire control means being configured to generate the fire control signal in the form of a clock signal generated from the sensed data track.

Optionally the data track includes first information, the first information including an embedded clock signal, the fire control means being configured to generate the fire control signal in the form of a clock signal extracted from the sensed data track.

Optionally the first information is indicative of at least one physical characteristic of the print medium, the mobile device being configured to control operation of the printhead at least partially on the basis of at least one of the physical characteristics.

Optionally a mobile device configured to use the sensed data track to determine an absolute position of the print medium with respect to the printhead, and to print onto the print medium in reliance on the determination.

Optionally the data track further encoding first information and the print medium further including second coded data that encodes second information, the first information being indicative of the second information, wherein the mobile device is configured to print onto the print medium such that there is a predetermined registration between what is being printed and the second coded data.

Optionally a mobile device configured to receive the information indicative of the predetermined registration from a remote computer system via the transceiver.

Optionally the data track further encoding first information and the print medium further including second coded data that encodes second information, the first information being indicative of the second information, wherein the mobile device is configured to determine a registration between what is being printed and the second coded data.

Optionally a mobile device configured to transmit the determined registration to a remote computer system via the transceiver.

In a first aspect the present invention provides an ink cartridge for use in a mobile device, the ink cartridge including:
at least one ink reservoir for holding ink;
at least one baffle dividing the at least one ink reservoir into a plurality of sections, each of the sections in each ink reservoir being in fluid communication with each of the other sections in that ink reservoir via an aperture; and
at least one porous insert in each of the at least one reservoirs, such that substantially all of each ink reservoir is filled with the at least one porous insert.

Optionally each reservoir includes a single porous insert including at least one recessed portion, each recessed portion being configured to engage one of the baffles in the reservoir.

Optionally a surface of each porous insert around the recessed portion sealingly engages a surface of its corresponding baffle.

Optionally the porous insert is of unitary construction.

Optionally the porous insert is formed from open-celled foam.

Optionally an ink cartridge further including a wick that extends along an edge of the at least one porous insert, the wick being configured to transport ink from the at least one porous insert to an ink distribution arrangement configured to distribute the ink to a pagewidth printhead forming part of the cartridge.

Optionally the ink distribution arrangement includes a plurality of ink ducts.

Optionally an ink cartridge configured such that ink within the at least one reservoir is held at a negative pressure with respect to ambient air pressure.

Optionally an ink cartridge further including a plurality of the ink reservoirs, the ink reservoirs containing relatively different colored inks.

Optionally an n ink cartridge comprising:
a print media feed path for directing a print medium past the printhead in a feed direction during printing; and
a drive mechanism for driving the print medium past the inkjet printhead for printing.

Optionally the drive mechanism is a passive mechanism, including a media roller for engaging the print medium to drive it past the inkjet printhead.

Optionally an ink cartridge further including a drive roller configured to be driven by a complementary drive mechanism in the mobile device when the cartridge is installed therein.

Optionally the media roller is coaxial with the drive roller.

Optionally the media roller is positioned in the print media path upstream of the printhead.

Optionally the cartridge is configured such that, in use, the media roller drives the print medium such that a trailing edge of the print medium passes the printhead after having disengaged from the media roller.

Optionally the drive roller is a cog.

Optionally the drive roller includes a resilient peripheral edge.

Optionally a cartridge comprising a capping mechanism for capping the printhead when it is not in use.

Optionally the capping mechanism includes a capper moveable between:
a capping position in which the capper is urged into a capping relationship with the printhead; and
an uncapped position in which the printhead is able to print onto the print medium, wherein in the uncapped position the capper is displaced away from the printhead;
wherein the capper is moved between the capped and uncapped position by an edge of the print medium as it is driven through the print media path.

Optionally a cartridge comprising a sensor for sensing coded data on the print medium as it is being printed.

In a first aspect the present invention provides a method of retrieving and storing a ringtone in a mobile telecommunications device, the method comprising the steps, performed in the mobile telecommunications device, of:
sensing coded data printed on a surface;
decoding the coded data to generate decoded data;
transmitting a request for the ringtone based on the decoded data, the request being transmitted via a mobile telecommunications network;
receiving the requested ringtone from a remote computer system via the mobile telecommunications network, the ringtone being in a format that is useable as a ringtone by the mobile telecommunications device; and
storing the ringtone in the mobile telecommunications device.

Optionally a method further including the step of associating the ringtone with at least one ring event in the mobile telecommunications device.

Optionally the step of associating the ringtone with at least one ring event includes receiving instructions from a user via a user interface of the mobile telecommunications device.

Optionally the ringtone is a digital sample.

Optionally the request is indicative of the mobile telecommunications device's type, such that the ringtone is received in a suitable format.

Optionally the mobile telecommunication device's type is recorded in the mobile telecommunications network and determined by the computer system to determine the correct format of ringtone to transmit.

Optionally a method of retrieving and storing a theme or wallpaper in a mobile telecommunications device, the method comprising the steps, performed in the mobile telecommunications device, of:
sensing coded data printed on a surface;
decoding the coded data to generate decoded data;
transmitting a request for the theme or wallpaper based on the decoded data, the request being transmitted via a mobile telecommunications network;
receiving the requested theme or wallpaper from a remote computer system via the mobile telecommunications network, the theme or wallpapering being in a format that is useable by the mobile telecommunications device; and
storing the wallpaper or theme in the mobile telecommunications device.

Optionally the method including the step of automatically applying the wallpaper or theme to the mobile telecommunications device upon receipt.

Optionally the request is indicative of the mobile telecommunications device's type, such that the wallpaper or theme is received in a suitable format.

Optionally the mobile telecommunication device's type is recorded in the mobile telecommunications network and determined by the computer system to determine the correct format of wallpaper or theme to transmit.

Optionally the mobile telecommunications device includes a printer, the printer being configured to print onto a print medium, such that the printed medium includes coded data that can be sensed to initiate generation and transmission of the request.

Optionally the print medium is pre-printed with the coded data, the printer being configured to print a user interface onto the print medium.

Optionally the mobile telecommunications device includes a sensor, the sensor being configured to sense at least some coded data on the print medium during printing, the mobile telecommunications device being configured to use the sensed coded data to print the user interface onto the print medium in accordance with a registration.

Optionally a method further including the step of receiving the known registration prior to commencing printing.

Optionally the coded data includes a linear-coded data track, the method including the step of extracting a clock from the data track and using the clock to synchronize printing of the user interface onto to print medium.

In a first aspect the present invention provides a print cartridge for a mobile telecommunications device, the cartridge comprising:

a drive shaft with a media engagement surface for feeding a media substrate along a feed path; and, a media guide adjacent the drive shaft for biasing the media substrate against the media engagement surface.

It is important that any mobile telecommunications device that incorporates a printhead and media feed assembly does not significantly increase the overall size. Using a single drive shaft and media guide is significantly more compact than an opposed pair of media drive rollers.

Optionally a print cartridge further comprising at least one ink reservoir, an inkjet printhead and a capper for capping the printhead when not in use.

Optionally a print cartridge further comprising a rigid outer casing enclosing the ink reservoir, the printhead, and capper, the outer casing defining a media entry slot and a media exit slot.

Optionally the media guide is a series of sprung fingers extending from one side of the media entry slot towards the media engagement surface of the drive shaft.

Optionally a print cartridge further comprising a drive roller mounted to the drive shaft, the drive roller having an elastomeric rim for abutting a drive system in the mobile telecommunications device.

Optionally a print cartridge further comprising electrical contacts for power and print data on the outer casing, the contacts and the drive roller positioned for simultaneously engaging corresponding contacts and the drive system respectively upon insertion into the mobile telecommunications device.

Optionally a print cartridge further comprising a printhead having an array of ink ejection nozzles and at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally a print cartridge further comprising:
(a) a printhead adjacent the feed path;
(b) a capping mechanism including a capper moveable between a capping position in which the capper is urged into a capping relationship with the printhead, and an uncapped position in which the printhead is able to print onto the print media, wherein in the uncapped position the capper is displaced away from the printhead;
(c) a force transfer mechanism connected to the capper and configured such that a force provided by an edge of the media as it moves relative to the feed path is transferred to the capper by the force transfer mechanism, thereby to at least commence movement of the capper from the capped position to the uncapped position prior to the media reaching the capper.

Optionally a print cartridge further comprising:
(a) a printhead adjacent the feed path;
(b) a capping mechanism including a capper moveable between a capping position in which the capper is urged into a capping relationship with the printhead, and an uncapped position in which the printhead is able to print onto the print media, wherein in the uncapped position the capper is displaced away from the printhead; and
(c) a locking mechanism configured to hold the capper in the uncapped position until after a trailing edge of the media is clear of the printhead.

Optionally a print cartridge further comprising:
(a) a printhead adjacent the feed path;
(b) a capping mechanism including a capper moveable between a capping position in which the capper is urged into a capping relationship with the printhead, and an uncapped position in which the printhead is able to print onto the print media; wherein,
(c) the capper assembly is held in the uncapped position by the media such that it moves to the capped position upon disengagement with the media.

Optionally a print cartridge further comprising:
a printhead for printing on to the media substrate; and,
the media substrate is a sheet; wherein during use,
the sheet disengages from the drive shaft before completion of its printing such that the trailing edge of the sheet projects past the printhead by momentum to complete its printing.

Optionally a print cartridge further comprising a printhead, wherein the printhead comprises:
an array of nozzles for ejecting ink;
print data circuitry for providing the nozzles with print data; and, a photosensor for optically receiving the print data from a beacon operated by a print engine controller in the mobile telecommunications device.

Optionally the mobile telecommunications device has a drive system for rotating the drive shaft by friction.

Optionally a print cartridge further comprising:
an inkjet printhead for printing to the media substrate; and,
the mobile telecommunications device comprises:
a print engine controller for operatively controlling the printhead; and,
a position sensor for providing the print engine controller with a signal indicative of the position of the media substrate relative to the printhead; such that,
the print engine controller differentiates the signal to derive the speed of the media substrate relative to the printhead and adjusts the operation of the printhead in response to variations in the speed.

Optionally a print cartridge further comprising an inkjet printhead for printing to the media substrate; and,
the mobile telecommunications device comprises:
a print engine controller for operatively controlling the printhead; wherein during use,
the print engine controller senses the number of complete and partial rotations of the drive shaft and adjusts the operation of the printhead in response to variations in the angular velocity of the drive shaft.

Optionally a print cartridge further comprising at least one ink reservoir for supplying ink to a printhead, the at least one ink reservoir comprising:
a housing defining an ink storage volume;
one or more baffles dividing the ink storage volume into sections, each of the sections having at least one ink outlet for sealed connection to the printhead; and,
at least one conduit establishing fluid communication between the ink outlets of adjacent sections.

Optionally the media substrate is a sheet with coded data on at least part of its surface; and the mobile telecommunications device further comprises a print engine controller for operatively controlling the printhead; and,
a sensor for reading the coded data and generating a signal indicative of at least one dimension of the sheet, and transmitting the signal to the print engine controller; such that, the print engine controller uses the signal to initiate the printing when the sheet is at a predetermined position relative to the printhead.

Optionally a print cartridge further comprising a printhead for printing the media substrate, the media substrate having coded data on at least part of its surface; and, The mobile telecommunications device further comprising a print engine controller for operatively controlling the printhead; and, a dual sensing facility for reading the coded data before, as well as after, it has past the printhead.

In a first aspect the present invention provides a mobile telecommunications device comprising:
- a printhead with an array of nozzles for printing a media substrate;
- a capper assembly movable between a capped position covering the nozzles and an uncapped position spaced from the nozzles; wherein,
- the capper assembly is held in the uncapped position by the media such that it moves to the capped position upon disengagement with the media.

It is important that any mobile telecommunications device that incorporates a printhead and media feed assembly does not significantly increase the overall size. Using the media substrate to move the capper from the capped position before printing avoids the need for a separate uncapping mechanism.

Optionally the sheet of media substrate is encoded and the print engine controller uses an optical sensor to determine the position of the sheet relative to the printhead.

Optionally a mobile telecommunications device further comprising a drive shaft for feeding the media past the printhead.

Optionally the media substrate is a sheet and the trailing edge of the sheet disengages from the drive shaft before it is printed and is projected past the printhead by its momentum.

Optionally the capper assembly lightly grips the sheet after it has been printed so that it partially extends from the mobile telecommunications device in readiness for manual collection.

Optionally the capper assembly moves out of the capped position and toward the uncapped position upon engagement with the leading edge of the sheet.

Optionally the printhead is incorporated into a cartridge that further comprises a print media feed path for directing the print media past the printhead in a feed direction during printing, and a drive mechanism for driving the print media past the printhead for printing.

Optionally the printhead has an array of ink ejection nozzles and is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally a mobile telecommunications device further comprising:
(a) a print media feed path for directing print media past the printhead in a feed direction during printing;
(b) a capping mechanism including a capper moveable between a capping position in which the capper is urged into a capping relationship with the printhead, and an uncapped position in which the printhead is able to print onto the print media, wherein in the uncapped position the capper is displaced away from the printhead; and
(c) a force transfer mechanism connected to the capper and configured such that a force provided by an edge of the media as it moves relative to the feed path is transferred to the capper by the force transfer mechanism, thereby to at least commence movement of the capper from the capped position to the uncapped position prior to the media reaching the capper.

Optionally a mobile telecommunications device further comprising:
(a) a print media feed path for directing print media past the printhead in a feed direction during printing;
(b) a capping mechanism including a capper moveable between a capping position in which the capper is urged into a capping relationship with the printhead, and an uncapped position in which the printhead is able to print onto the print media, wherein in the uncapped position the capper is displaced away from the printhead;
(c) a locking mechanism configured to hold the capper in the uncapped position until after a trailing edge of the media is clear of the printhead.

Optionally the drive assembly has a drive shaft with a media engagement surface for feeding a media substrate along a feed path; and, a media guide adjacent the drive shaft for biasing the media substrate against the media engagement surface.

Optionally a mobile telecommunications device 1 further comprising:
- a drive shaft for feeding the sheet of media substrate past the printhead; wherein during use,
- the sheet disengages from the drive shaft before completion of its printing such that the trailing edge of the sheet projects past the printhead by momentum to complete its printing.

Optionally the printhead comprises:
an array of nozzles for ejecting ink;
print data circuitry for providing the nozzles with print data; and, a photosensor for optically receiving the print data from a beacon operated by a print engine controller.

Optionally a mobile telecommunications device further comprising:

a drive shaft for feeding the sheet of media substrate past the printhead and a drive system to rotate the drive shaft; wherein,
the drive system rotates the drive roller by friction.

Optionally a mobile telecommunications device further comprising:
- a media feed assembly for feeding the media past the printhead;
- a print engine controller for operatively controlling the printhead; and,
- a position sensor for providing the print engine controller with a signal indicative of the position of the media substrate relative to the printhead; such that,
- the print engine controller differentiates the signal to derive the speed of the media substrate relative to the printhead and adjusts the operation of the printhead in response to variations in the speed.

Optionally a mobile telecommunications device further comprising:
- a drive shaft for feeding the media past the printhead; and,
- a print engine controller for operatively controlling the printhead; wherein during use,
- the print engine controller senses the number of complete and partial rotations of the drive shaft and adjusts the operation of the printhead in response to variations in the angular velocity of the drive shaft.

Optionally a mobile telecommunications device further comprising at least one ink reservoir, the at least one reservoir comprising:
- a housing defining an ink storage volume;
- one or more baffles dividing the ink storage volume into sections, each of the sections having at least one ink outlet for sealed connection to the printhead; and,
- at least one conduit establishing fluid communication between the ink outlets of adjacent sections.

Optionally the media substrate is a sheet with coded data disposed on at least part of its surface; the mobile telecommunications device further comprising:
- a media feed assembly for feeding the sheet of media substrate along a feed path past the printhead;
- a print engine controller for operatively controlling the printhead; and,
- a sensor for reading the coded data and generating a signal indicative of at least one dimension of the sheet, and transmitting the signal to the print engine controller; such that,
- the print engine controller uses the signal to initiate the printing when the sheet is at a predetermined position relative to the printhead.

Optionally the media substrate is a sheet with coded data disposed on at least part of its surface; the mobile telecommunications device further comprising:
- a media feed assembly for feeding the sheet of media substrate along a feed path past the printhead;
- a print engine controller for operatively controlling the printhead; and, a dual sensing facility for reading the coded data before, as well as after, it has past the printhead.

In a first aspect the present invention provides a mobile telecommunications device comprising:
- a printhead for printing a sheet of media substrate;
- a drive shaft for feeding the sheet of media substrate past the printhead; wherein during use,
- the sheet disengages from the drive shaft before completion of its printing such that the trailing edge of the sheet projects past the printhead by momentum to complete its printing.

It is important that any mobile telecommunications device that incorporates a printhead and media feed assembly does not significantly increase the overall size and compact form factor. Using a single drive shaft in a mobile telecommunications device with a printhead allows for a compact design. However, this makes full bleed printing (printing to the edges of the media sheet) difficult. If the single shaft is after the printhead, it is difficult to accurately print the leading portion of the sheet as it is manually fed past the printhead. Also, contact between the roller and the freshly printed media can degrade the print quality. Likewise, the trailing portion of the sheet can get artifacts in the print if the feed roller is before the printhead and the trailing portion is manually drawn past the printhead to complete its printing. Configuring the drive shaft so that the trailing edge of the media carries past the printhead by momentum will allow full bleed printing using a single feed roller for a compact design.

Optionally a mobile telecommunications device further comprising a media guide adjacent the drive shaft for biasing the media substrate against the drive shaft.

Optionally a mobile telecommunications device further comprising a drive system for transmitting torque to the drive shaft, the drive system having a drive wheel wherein the drive shaft can be moved into contact with the rim of the drive wheel for the transfer of torque.

Optionally a mobile telecommunications device further comprising:
- a print engine controller for controlling the operation of the printhead; and,
- a position sensor connected to the print engine controller such that the print engine controller can determine the position of the media substrate relative to the printhead.

Optionally the position sensor reads encoded data on the media substrate.

Optionally the position sensor senses the number of rotations of the drive shaft.

Optionally wherein the printhead and the drive shaft are incorporated into a replaceable cartridge for insertion into a print media feed path within the mobile telecommunications device.

Optionally the printhead has an array of ink ejection nozzles and is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally a mobile telecommunications device further comprising:
(a) a print media feed path for directing print media past the printhead in a feed direction during printing;
(b) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(c) a force transfer mechanism connected to the capper and configured such that a force provided by an edge of the media substrate as it moves relative to the feed path is transferred to the capper by the force transfer mechanism, thereby to at least commence movement of the capper from the capped position to the uncapped position prior to the media substrate reaching the capper.

Optionally a mobile telecommunications device further comprising:
(a) a print media feed path for directing media substrate past the printhead in a feed direction during printing;
(b) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(c) a locking mechanism configured to hold the capper in the uncapped position until after a trailing edge of the media substrate is clear of the printhead.

Optionally the drive shaft has a media engagement surface for enhanced contact friction with the media substrate.

Optionally a mobile telecommunications device further comprising a capping mechanism including a capper moveable between a capping position in which the capper is urged into a capping relationship with the printhead, and an uncapped position in which the printhead is able to print onto the media substrate, wherein the capper assembly is held in the uncapped position by the media substrate such that it moves to the capped position upon disengagement with the media.

Optionally a mobile telecommunications device further comprising a print engine controller with a light emitting beacon, and the printhead comprises:
    an array of nozzles for ejecting ink;
    print data circuitry for providing the nozzles with print data; and,
    a photosensor for optically receiving the print data from the beacon.

Optionally wherein the drive shaft is driven by a piezoelectric resonant linear drive system.

Optionally a mobile telecommunications further comprising:
    a print engine controller for operatively controlling the printhead; and,
    a position sensor for providing the print engine controller with a signal indicative of the position of the media substrate relative to the printhead; such that,
    the print engine controller differentiates the signal to derive the speed of the media substrate relative to the printhead and adjusts the operation of the printhead in response to variations in the speed.

Optionally a mobile telecommunications device further comprising:
    a print engine controller for operatively controlling the printhead; wherein during use,
    the print engine controller senses the number of complete and partial rotations of the drive shaft and adjusts the operation of the printhead in response to variations in the angular velocity of the drive shaft.

Optionally a mobile telecommunications device further comprising at least one ink reservoir, the at least one reservoir comprising:
    a housing defining an ink storage volume;
    one or more baffles dividing the ink storage volume into sections, each of the sections having at least one ink outlet for sealed connection to the printhead; and,
    at least one conduit establishing fluid communication between the ink outlets of adjacent sections.

Optionally a mobile telecommunications device further comprising:
    a media feed assembly for feeding the sheet of media substrate along a feed path past the printhead;
    a print engine controller for operatively controlling the printhead; and,
    a sensor for reading coded data on at least part of the media substrate and generating a signal indicative of at least one dimension of the sheet, and transmitting the signal to the print engine controller; such that,
    the print engine controller uses the signal to initiate the printing when the sheet is at a predetermined position relative to the printhead.

Optionally a mobile telecommunications device further comprising:
    a print engine controller for operatively controlling the printhead; and,
    a dual sensing facility for reading coded data on at least part of the media substrate before, as well as after, it has past the printhead.

In a first aspect the present invention provides a mobile device comprising:
    a processor for outputting print data;
    a replaceable printhead cartridge including a photosensor and a printhead for printing onto print media; and
    a light emitting device for receiving the print data and converting it into a modulated light signal;
    wherein the photosensor and the light emitting device are positioned and orientated such that, in use, the photosensor receives the modulated light signal, the printhead being configured to print on the basis of the print data encoded in the modulated light signal.

Optionally the light emitting device is a light emitting diode.

Optionally the light emitting device is an organic light emitting diode.

Optionally the photosensor is mounted directly to the printhead within the print cartridge.

Optionally a mobile device further including:
    a receptacle for holding the cartridge;
    an energy storage device;
    first electrical contacts connected to receive electrical power from the energy storage device; and
    second electrical contacts disposed on or in the printhead cartridge;
    the first and second contacts being configured and arranged to electrically engage each other when the cartridge is installed in the receptacle.

Optionally the energy storage device is a battery.

Optionally the electrical power received by the cartridge via the first and second electrical contacts is used to power ink ejection mechanisms in the printhead.

Optionally the ink ejection mechanisms are microelectromechanical systems.

Optionally each of the ink ejection mechanisms includes a thermal bend actuator.

Optionally each of the ink ejection mechanisms includes a heater for ejecting ink by vaporisation.

In a first aspect the present invention provides a printhead for an inkjet printer with a print engine controller for operatively controlling the printhead, the printhead comprising:
    an array of nozzles for ejecting ink;
    print data circuitry for providing the nozzles with print data; and,
    an optical sensor for optically receiving the print data from a beacon operated by the print engine controller.

Inkjet printhead IC's will typically receive print data as well as nozzle actuation power from a TAB film. However, with large numbers of nozzles and high nozzle firing rates, the nozzle actuation signals can generate a significant amount of noise which can interfere with the print data signal. To provide the printhead with a 'cleaner' print data signal, it can be transmitted via an optical link to a sensor on directly on the printhead IC. By pulsing a beacon in the appropriate spectrum, the optical sensor receives the signal free of any electrical noise due to the firing pulses.

Optionally the optical sensor is an IR sensor and the beacon is an IR LED.

Optionally the printhead is part of a cartridge that can be inserted into the printer.

Optionally the inkjet printer is part of a mobile telecommunications device.

Optionally a mobile telecommunications device comprising:
    a print engine controller with a light emitting beacon; and,
    a printhead with an array of nozzles for ejecting ink, print data circuitry for providing the nozzles with print data; and,
    a sensor for receiving the print data from the beacon.

Optionally a mobile telecommunications device further comprising a drive shaft wherein the printhead and drive shaft are incorporated into a replaceable cartridge for insertion into a media feed path within the mobile telecommunications device.

Optionally the printhead is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally a mobile telecommunications device further comprising:
(a) a print media feed path for directing print media past the printhead in a feed direction during printing;
(b) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(c) a force transfer mechanism connected to the capper and configured such that a force provided by an edge of the media substrate as it moves relative to the feed path is transferred to the capper by the force transfer mechanism, thereby to at least commence movement of the capper from the capped position to the uncapped position prior to the media substrate reaching the capper.

Optionally a mobile telecommunications device further comprising:
(a) a print media feed path for directing media substrate past the printhead in a feed direction during printing;
(b) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(c) a locking mechanism configured to hold the capper in the uncapped position until after a trailing edge of the media substrate is clear of the printhead.

Optionally a mobile telecommunications device further comprising a drive shaft with a media engagement surface for enhanced contact friction with the media substrate.

Optionally a mobile telecommunications device further comprising a capping mechanism including a capper moveable between a capping position in which the capper is urged into a capping relationship with the printhead, and an uncapped position in which the printhead is able to print onto the media substrate, wherein the capper assembly is held in the uncapped position by the media substrate such that it moves to the capped position upon disengagement with the media.

Optionally the sensor is a photosensor for optically receiving the print data from the beacon.

Optionally a mobile telecommunications device further comprising a drive shaft driven by a piezo-electric resonant linear drive system.

Optionally a mobile telecommunications device further comprising:
a position sensor for providing the print engine controller with a signal indicative of the position of the media substrate relative to the printhead; such that,
the print engine controller differentiates the signal to derive the speed of the media substrate relative to the printhead and adjusts the operation of the printhead in response to variations in the speed.

Optionally during use, the print engine controller senses the number of complete and partial rotations of the drive shaft and adjusts the operation of the printhead in response to variations in the angular velocity of the drive shaft.

Optionally a mobile telecommunications device further comprising at least one ink reservoir, the at least one reservoir comprising:
a housing defining an ink storage volume;
one or more baffles dividing the ink storage volume into sections, each of the sections having at least one ink outlet for sealed connection to the printhead; and,
at least one conduit establishing fluid communication between the ink outlets of adjacent sections.

Optionally a mobile telecommunications device further comprising:
a media feed assembly for feeding a sheet of the media substrate along a feed path past the printhead; and,
a sensor for reading coded data on at least part of the media substrate and generating a signal indicative of at least one dimension of the sheet, and transmitting the signal to the print engine controller; such that,
the print engine controller uses the signal to initiate the printing when the sheet is at a predetermined position relative to the printhead.

Optionally a mobile telecommunications device further comprising:
a print engine controller for operatively controlling the printhead; and,
a dual sensor facility for reading coded data on at least part of the media substrate before, as well as after, it has past the printhead.

Optionally a mobile telecommunications device further comprising:
a drive shaft for feeding a sheet of the media substrate along a feed path past the printhead, wherein the sheet disengages from the drive shaft before completion of its printing such that the trailing edge of the sheet projects past the printhead by momentum to complete its printing.

In a first aspect the present invention provides a print cartridge for an inkjet printer with a media drive assembly, the cartridge comprising:
a drive shaft for feeding a media substrate past a printhead, the drive shaft positioned such that it engages the media drive assembly upon installation of the cartridge; wherein during use,
the drive assembly transfer torque to the drive shaft by contact friction.

Transferring power from the drive assembly to the drive wheel by frictional contact makes installation of the cartridge easier. Simply sliding the drive wheel into abutment with the drive assembly removes the need for more complex couplings such as meshed gears or belt drives.

Optionally the drive shaft has a drive wheel mounted to it for the frictional engagement with the drive assembly.

Optionally the rim of the drive wheel is formed from an elastomeric material.

Optionally the drive assembly has an idler roller to provide the frictional contact with the drive wheel.

Optionally the drive assembly has an electric motor to drive the idler roller.

Optionally the drive assembly has a piezo electric resonating linear drive to drive the idler roller.

Optionally the printhead has an array of ink ejection nozzles and at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally a print cartridge further comprising:
(a) a capping mechanism with a capper moveable between a capping position in which the capper is urged into a capping relationship with the printhead, and an uncapped position in which the printhead is able to print onto the print media, wherein in the uncapped position the capper is displaced away from the printhead; and,
(b) a force transfer mechanism connected to the capper and configured such that a force provided by an edge of the media as it moves relative to the feed path is transferred to the capper by the force transfer mechanism, thereby to at least commence movement of the capper from the capped position to the uncapped position prior to the media reaching the capper.

Optionally a print cartridge further comprising:
(a) a capping mechanism with a capper moveable between a capping position in which the capper is urged into a capping relationship with the printhead, and an uncapped position in which the printhead is able to print onto the print media, wherein in the uncapped position the capper is displaced away from the printhead; and
(b) a locking mechanism configured to hold the capper in the uncapped position until after a trailing edge of the media is clear of the printhead.

Optionally a print cartridge further comprising:
(a) a capping mechanism with a capper moveable between a capping position in which the capper is urged into a capping relationship with the printhead, and an uncapped position in which the printhead is able to print onto the print media; wherein,
(b) the capper assembly is held in the uncapped position by the media such that it moves to the capped position upon disengagement with the media.

Optionally the media substrate is a sheet that, during use, disengages from the drive shaft before completion of its printing such that the trailing edge of the sheet projects past the printhead by momentum to complete its printing.

Optionally the printer has a print engine controller with a light emitting beacon, and the printhead comprises:
an array of nozzles for ejecting ink;
print data circuitry for providing the nozzles with print data; and,
a photosensor for optically receiving the print data from the beacon.

Optionally the printer is incorporated into a mobile telecommunications device.

Optionally the cartridge incorporates the printhead; and, the printer comprises:
a print engine controller for operatively controlling the printhead; and,
a position sensor for providing the print engine controller with a signal indicative of the position of the media substrate relative to the printhead; such that,
the print engine controller differentiates the signal to derive the speed of the media substrate relative to the printhead and adjusts the operation of the printhead in response to variations in the speed.

Optionally the cartridge incorporates the printhead; and, the printer comprises:
a print engine controller for operatively controlling the printhead; wherein during use,
the print engine controller senses the number of complete and partial rotations of the drive shaft and adjusts the operation of the printhead in response to variations in the angular velocity of the drive shaft.

Optionally a print cartridge further comprising at least one ink reservoir for supplying ink to the printhead, the at least one ink reservoir comprising:
a housing defining an ink storage volume;
one or more baffles dividing the ink storage volume into sections, each of the sections having at least one ink outlet for sealed connection to the printhead; and,
at least one conduit establishing fluid communication between the ink outlets of adjacent sections.

Optionally the media substrate is a sheet with coded data on at least part of its surface; and the printer further comprises a print engine controller for operatively controlling the printhead; and,
a sensor for reading the coded data and generating a signal indicative of at least one dimension of the sheet, and transmitting the signal to the print engine controller; such that,
the print engine controller uses the signal to initiate the printing when the sheet is at a predetermined position relative to the printhead.

Optionally the media substrate has coded data on at least part of its surface; and,
the printer further comprising a print engine controller for operatively controlling the printhead; and,
a dual sensing facility for reading the coded data before, as well as after, it has past the printhead.

Optionally the drive shaft has a media engagement surface for feeding a media substrate along a feed path; and,
the cartridge further comprises a media guide adjacent the drive shaft for biasing the media substrate against the media engagement surface.

In a first aspect the present invention provides a mobile telecommunications device comprising:
an inkjet printhead for printing to a media substrate;
a media feed assembly for feeding the media past the printhead;
a print engine controller for operatively controlling the printhead; and,
a position sensor for providing the print engine controller with a signal indicative of the position of the media substrate relative to the printhead; such that,
the print engine controller differentiates the signal to derive the speed of the media substrate relative to the printhead and adjusts the operation of the printhead in response to variations in the speed.

It is important that any mobile telecommunications device that incorporates a printhead and media feed assembly does not significantly increase the overall size and compact form factor of currently available mobile telecommunications devices. Using a single media feed roller in a mobile telecommunications device with a printhead allows for a compact design. However, the feed roller must be immediately before the printhead (in terms of media feed direction) so that the trailing edge of the media carries past the printhead by momentum. Because of this, the speed of the feed roller varies during the printing of the media sheet. Firstly, when the leading edge of the media sheet initially engages the feed roller the additional load decreases angular speed. Once the frictional engagement between the roller and the media has been established, the angular speed increases again. As the printhead is so close to the feed roller, the roller is still speeding up when the leading edge is being printed. If the print engine controller (PEC) assumes that the speed of the roller is constant, visible artifacts appear in the printing of the leading edge portion of the media sheet. By allowing the PEC to sense the longitudinal position of the media relative to the printhead, it can then derive its speed and adjust the operation of the nozzles in response to any variations to remove artifacts from the printing.

Optionally the media substrate is printed with encoded data and the position sensor optically reads the encoded data to generate the signal indicative of the position of the media substrate relative to printhead.

Optionally the media feed assembly has a media feed roller with encoding, such that the position sensor optically reads the encoding to sense the number of complete and partial rotations of the media feed roller to generate the signal indicative of the position of the media substrate relative to the printhead.

Optionally the printhead has an array of nozzles and a capper assembly movable between a capped position covering the printhead nozzles and an uncapped position spaced from the printhead nozzles, the capper assembly being adapted for engagement with the media substrate to move it away of the capped position and towards the uncapped position.

Optionally the media substrate is a sheet with a leading edge that engages the capper assembly and a trailing edge that disengages from the media feed roller before it is printed and is projected past the printhead by its momentum such that the media feed roller accelerates from the reduction in load and the sheet decelerates from friction.

Optionally the capper assembly lightly grips the sheet after it has been printed so that it partially extends from the mobile telecommunications device in readiness for manual collection.

Optionally the media feed assembly has a drive shaft, the drive and the printhead being incorporated into a replaceable cartridge for insertion into a print media feed path within the mobile telecommunications device.

Optionally the printhead has an array of ink ejection nozzles and is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally a mobile telecommunications device further comprising:
(a) a print media feed path for directing print media past the printhead in a feed direction during printing;
(b) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(c) a force transfer mechanism connected to the capper and configured such that a force provided by an edge of the media substrate as it moves relative to the feed path is transferred to the capper by the force transfer mechanism, thereby to at least commence movement of the capper from the capped position to the uncapped position prior to the media substrate reaching the capper.

Optionally a mobile telecommunications device further comprising:
(a) a print media feed path for directing media substrate past the printhead in a feed direction during printing;
(b) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(c) a locking mechanism configured to hold the capper in the uncapped position until after a trailing edge of the media substrate is clear of the printhead.

Optionally the media feed assembly has a drive shaft with a media engagement surface for enhanced contact friction with the media substrate.

Optionally a mobile telecommunications device further comprising a capping mechanism including a capper moveable between a capping position in which the capper is urged into a capping relationship with the printhead, and an uncapped position in which the printhead is able to print onto the media substrate, wherein the capper assembly is held in the uncapped position by the media substrate such that it moves to the capped position upon disengagement with the media.

Optionally the print engine controller has a light emitting beacon, and the printhead further comprises:
an array of nozzles for ejecting ink;
print data circuitry for providing the nozzles with print data; and,
a sensor for receiving the print data from the beacon.

Optionally the media feed assembly has a drive shaft driven by a piezo-electric resonant linear drive system.

Optionally a mobile telecommunications device further comprising at least one ink reservoir, the at least one reservoir comprising:
a housing defining an ink storage volume;
one or more baffles dividing the ink storage volume into sections, each of the sections having at least one ink outlet for sealed connection to the printhead; and,
at least one conduit establishing fluid communication between the ink outlets of adjacent sections.

Optionally a mobile telecommunications device further comprising:
a sensor for reading coded data on at least part of the media substrate and generating a signal indicative of at least one dimension of the sheet, and transmitting the signal to the print engine controller; such that,
the print engine controller uses the signal to initiate the printing when the sheet is at a predetermined position relative to the printhead.

Optionally a mobile telecommunications device further comprising a dual sensing facility for reading coded data on at least part of the media substrate before, as well as after, it has past the printhead.

In a first aspect the present invention provides a mobile telecommunications device comprising:
an inkjet printhead for printing to a media substrate;
a drive shaft for feeding the media past the printhead; and,
a print engine controller for operatively controlling the printhead; wherein during use,
the print engine controller senses the number of complete and partial rotations of the media feed roller and adjusts the operation of the printhead in response to variations in the angular velocity of the drive shaft.

Using a single media drive shaft in a mobile telecommunications device with a printhead allows for a compact design. However, the drive shaft must be immediately before the printhead (in terms of media feed direction) so that the trailing edge of the media carries past the printhead by momentum. Because of this, the speed of the drive shaft varies during the printing of the media sheet. Firstly, when the leading edge of the media sheet initially engages the feed roller the additional load decreases angular speed. Once the frictional engagement between the roller and the media has been established, the angular speed increases again. As the printhead is so close to the feed roller, the roller is still speeding up when the leading edge is being printed. If the print engine controller (PEC) assumes that the speed of the roller is constant, visible artifacts appear in the printing of the leading edge portion of the media sheet. By allowing the PEC to sense the rotations of the roller, it can determine the longitudinal position of the media relative to the printhead and adjust the operation of the nozzles in response to variations in roller speed to remove artifacts from the printing.

Optionally the drive shaft has optical encoding and the print engine controller uses an optical sensor to sense the number of complete and partial rotations of the drive shaft.

Optionally the printhead has a capper assembly movable between a capped position covering the printhead nozzles and an uncapped position spaced from the printhead nozzles, the capper assembly being adapted for engagement with the media substrate to move it away of the capped position and towards the uncapped position.

Optionally the media substrate is a sheet with a leading edge that engages the capper assembly and a trailing edge that disengages from the drive shaft before it is printed and is projected past the printhead by its momentum such that the drive shaft accelerates from the reduction in load and the sheet decelerates from friction.

Optionally the capper assembly lightly grips the sheet after it has been printed so that it partially extends from the mobile telecommunications device in readiness for manual collection.

Optionally the capper assembly returns to the capped position after the sheet has been manually collected from the mobile telecommunications device.

Optionally the printhead and the drive shaft are incorporated into a replaceable cartridge for insertion into a print media feed path within the mobile telecommunications device.

Optionally the printhead has an array of ink ejection nozzles and is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally a mobile telecommunications device further comprising:
(a) a print media feed path for directing print media past the printhead in a feed direction during printing;
(b) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(c) a force transfer mechanism connected to the capper and configured such that a force provided by an edge of the media substrate as it moves relative to the feed path is transferred to the capper by the force transfer mechanism, thereby to at least commence movement of the capper from the capped position to the uncapped position prior to the media substrate reaching the capper.

Optionally a mobile telecommunications device further comprising:
(a) a print media feed path for directing the media substrate past the printhead in a feed direction during printing;
(b) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(c) a locking mechanism configured to hold the capper in the uncapped position until after a trailing edge of the media substrate is clear of the printhead.

Optionally the drive shaft has a media engagement surface for enhanced contact friction with the media substrate.

Optionally a mobile telecommunications device further comprising a capping mechanism including a capper moveable between a capping position in which the capper is urged into a capping relationship with the printhead, and an uncapped position in which the printhead is able to print onto the media substrate, wherein the capper assembly is held in the uncapped position by the media substrate such that it moves to the capped position upon disengagement with the media.

Optionally the print engine controller has a light emitting beacon, and the printhead further comprises:
an array of nozzles for ejecting ink;
print data circuitry for providing the nozzles with print data; and,
a photosensor for optically receiving the print data from the beacon.

Optionally the drive shaft is driven by a piezo-electric resonant linear drive system.

Optionally a mobile telecommunications device further comprising:
a print engine controller for operatively controlling the printhead; and,
a position sensor for providing the print engine controller with a signal indicative of the position of the media substrate relative to the printhead; such that,
the print engine controller differentiates the signal to derive the speed of the media substrate relative to the printhead and adjusts the operation of the printhead in response to variations in the speed.

Optionally a mobile telecommunications device further comprising at least one ink reservoir, the at least one reservoir comprising:
a housing defining an ink storage volume;
one or more baffles dividing the ink storage volume into sections, each of the sections having at least one ink outlet for sealed connection to the printhead; and,
at least one conduit establishing fluid communication between the ink outlets of adjacent sections.

Optionally a mobile telecommunications device further comprising a sensor for reading coded data on at least part of the media substrate and generating a signal indicative of at least one dimension of the sheet, and transmitting the signal to the print engine controller; such that,
the print engine controller uses the signal to initiate the printing when the sheet is at a predetermined position relative to the printhead.

Optionally a mobile telecommunications device further comprising a dual sensing facility for reading coded data on at least part of the media substrate before, as well as after, it has past the printhead.

In a first aspect the present invention provides a mobile telecommunications device comprising:
a printhead for printing on a media substrate;
a drive shaft for feeding the media substrate past the printhead;
a print engine controller for operatively controlling the printhead; and, an ink reservoir for supplying ink to the printhead, the reservoir having:
a housing defining an ink storage volume;
one or more baffles dividing the ink storage volume into sections, each of the sections having at least one ink outlet for sealed connection to the printhead; and,
at least one conduit establishing fluid communication between the ink outlets of adjacent sections.

Optionally the at least one conduit has a cross sectional area small enough such that capillary action prevents ink from draining of the conduit under gravity regardless of the orientation of the housing.

Optionally the at least one conduit is defined by one or more channels formed in the exterior surface of the housing and covered by a sealing film adhered to the exterior surface, the sealing film having apertures for each of the outlets respectively for fluid communication with the printhead.

Optionally the housing defines three of the ink storage volumes, each of the ink storage volumes being elongate and having the baffles extending transversely across each of the storage volumes respectively.

Optionally each of the sections contains an ink retaining structure incorporating porous material such that, capillary action reduces the hydrostatic pressure of the ink within inactive nozzles of the printhead to less than atmospheric.

Optionally the printhead is a pagewidth printhead.

Optionally the printhead and the drive shaft are incorporated into a replaceable cartridge for insertion into a print media feed path within the mobile telecommunications device.

Optionally the printhead has an array of ink ejection nozzles and is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally a mobile telecommunications device further comprising:
(a) a print media feed path for directing print media past the printhead in a feed direction during printing;
(b) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(c) a force transfer mechanism connected to the capper and configured such that a force provided by an edge of the media substrate as it moves relative to the feed path is transferred to the capper by the force transfer mechanism, thereby to at least commence movement of the capper from the capped position to the uncapped position prior to the media substrate reaching the capper.

Optionally a mobile telecommunications device further comprising:
(a) a print media feed path for directing media substrate past the printhead in a feed direction during printing;
(b) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(c) a locking mechanism configured to hold the capper in the uncapped position until after a trailing edge of the media substrate is clear of the printhead.

Optionally the drive shaft has a media engagement surface for enhanced contact friction with the media substrate.

Optionally a mobile telecommunications device further comprising a capping mechanism including a capper moveable between a capping position in which the capper is urged into a capping relationship with the printhead, and an uncapped position in which the printhead is able to print onto the media substrate, wherein the capper assembly is held in the uncapped position by the media substrate such that it moves to the capped position upon disengagement with the media.

Optionally the print engine controller has a light emitting beacon, and the printhead further comprises:
an array of nozzles for ejecting ink;
print data circuitry for providing the nozzles with print data; and,
a photosensor for optically receiving the print data from the beacon.

Optionally the drive shaft is driven by a piezo-electric resonant linear drive system.

Optionally a mobile telecommunications device further comprising:
a position sensor for providing the print engine controller with a signal indicative of the position of the media substrate relative to the printhead; such that,
the print engine controller differentiates the signal to derive the speed of the media substrate relative to the printhead and adjusts the operation of the printhead in response to variations in the speed.

Optionally during use, the print engine controller senses the number of complete and partial rotations of the drive shaft and adjusts the operation of the printhead in response to variations in the angular velocity of the drive shaft.

Optionally a mobile telecommunications device further comprising:
a sensor for reading coded data on at least part of the media substrate and generating a signal indicative of at least one dimension of the sheet, and transmitting the signal to the print engine controller; such that,
the print engine controller uses the signal to initiate the printing when the sheet is at a predetermined position relative to the printhead.

Optionally a mobile telecommunications device further comprising:
a dual sensing facility for reading coded data on at least part of the media substrate before, as well as after, it has past the printhead.

In a first aspect the present invention provides a print medium configured to be printed on by a mobile device in a print direction, the print medium comprising:
a laminar substrate defining first and second opposite faces; and
a data track containing first information encoded in accordance with a linear encoding scheme, the data track extending in a linear read direction across a portion of the first face of the print medium, the read direction being oriented at between 45 and 135 degrees with respect to the print direction.

Optionally the read direction is orientated at about 90 degrees with respect to the print direction.

Optionally a print medium further including a leading edge and trailing edge opposite the leading edge, the print medium being designed for insertion leading-edge-first into the mobile device for printing, wherein the data track is positioned closer to the leading edge than to the trailing edge.

Optionally the data track is positioned at or adjacent the leading edge.

Optionally the data track is printed in infrared ink.

Optionally the data track is printed in infrared ink that is substantially invisible to an average unaided human eye.

Optionally a print medium further including coded data containing second information encoded in accordance with a second encoding scheme distinct from the linear encoding scheme, wherein the first information is indicative of the second information.

Optionally the first information is the same as the second information.

Optionally the first and second information are a document identifier.

Optionally a method of printing onto a print medium using a mobile device that includes a printhead and a data track reader, the method comprising the steps of:
(a) receiving the print medium into the mobile device;
(b) reading the data track;
(c) decoding the data track to obtain the first information;
(d) printing onto the print medium at least partially in reliance on first information determined from the decoded data track.

Optionally step (d) includes the substeps of:
(e) sending a first message to a remote computer system, the first message containing the first information;
(f) receiving a second message from the remote computer, the second message being indicative of whether printing is authorised for the print medium; and
(g) printing onto the print medium in the event the second message confirms that the printing is authorised.

Optionally the method including receiving print data from the remote computer system in response to the first message, step (g) including printing onto the print medium based at least partially on the print data.

Optionally the first information is indicative of a physical characteristic of the print medium.

Optionally the first information is indicative of a size of the print medium.

Optionally the first information is indicative of a media type associate with the print medium.

Optionally the first information is indicative of information pre-printed onto the print medium.

Optionally the first information is indicative of an identity of the print medium.

Optionally a print medium further including a second linear-encoded data track extending along at least a portion of at least one face of the print medium.

Optionally the second linear-encoded data track is printed in infrared ink that is substantially invisible to an average unaided human eye.

Optionally the second linear-encoded data track includes an extractable clock useable by the mobile device in synchronizing printing onto the print medium.

In a first aspect the present invention provides a method of printing onto a print medium using a mobile device with a printhead and sensor, the print medium comprising:
a laminar substrate defining first and second opposite faces; and
a data track containing first information encoded in accordance with a linear encoding scheme, the data track extending in a linear read direction across a portion of the first face of the print medium, the read direction being oriented at between 45 and 135 degrees with respect to the print direction;

the method comprising the steps of:
receiving the print medium into a media feed path of the mobile device;
using the sensor to sense the data track at least once before or during printing onto the print medium with the printhead; and
determining a lateral registration of the data track relative to the sensor.

Optionally the print medium includes coded data having a predetermined positional relationship relative to the data track, the method including determining, in the mobile device and based on the determined lateral registration, a lateral registration of the coded data with respect to the media feed path before or during printing.

Optionally the coded data encodes second information, the first information being indicative of the second information, the method including the step of decoding the data track to determine the first information.

Optionally the first information is the same as the second information.

Optionally the first and second information are a document identifier.

Optionally the method comprising the step of printing onto the print medium with the printhead at least partially in reliance on determined lateral registration.

Optionally the method comprising the step of printing onto the print medium with the printhead at least partially in reliance on first information determined from the decoded data track.

Optionally the printing step includes the substeps of:
sending a first message to a remote computer system, the first message containing the first information;
receiving a response from the remote computer, the response being indicative of whether printing is authorised for the print medium; and
printing onto the print medium in the event the response confirms that the printing is authorised.

Optionally the method comprising receiving print data from the remote computer system in response to the first message, the printing step comprising printing onto the print medium based at least partially on the print data.

Optionally the first information is indicative of a physical characteristic of the print medium.

Optionally the first information is indicative of a size of the print medium.

Optionally the first information is indicative of a media type associate with the print medium.

Optionally the first information is indicative of information pre-printed onto the print medium.

Optionally the first information is indicative of an identity of the print medium.

Optionally the print medium further including a second linear-encoded data track extending along at least a portion of at least one face of the print medium, the method including the steps of:
sensing the second data track during printing onto the print medium;
deriving a clock signal from the sensed second data track; and
synchronizing printing based on the clock signal.

Optionally the mobile device including a light emitting device, the method including illuminating the data track with the light emitting device during sensing of the data track.

Optionally the data track is printed in infrared ink, and the light emitting device emits light in the infrared spectrum.

In a first aspect the present invention provides a print medium configured to be printed on by a mobile device in a print direction, the print medium comprising:
- a laminar substrate defining first and second opposite faces; and
- a data track containing first information encoded in accordance with a linear encoding scheme, the data track extending in a linear read direction along the print medium in the print direction, the linear encoding scheme being selected to enable clock data to be extracted from it while the print medium is being moved past a printhead in the mobile device, for use in synchronizing printing onto the print medium using the printhead.

Optionally the data track is disposed at or adjacent an edge of the print medium, the edge extending in the print direction.

Optionally the data track is printed in infrared ink.

Optionally the data track is printed in infrared ink that is substantially invisible to an average unaided human eye.

Optionally the print medium further including coded data containing second information encoded in accordance with a second encoding scheme distinct from the linear encoding scheme, wherein the first information is indicative of the second information.

Optionally the first information is the same as the second information.

Optionally the first and second information are a document identifier.

Optionally the method of printing onto a print medium using a mobile device that includes a printhead and a data track reader, the method comprising the steps of:
(a) receiving the print medium into the mobile device;
(b) reading the data track using the data track reader during a printing operation;
(c) extracting a clock signal from the read data track;
(d) printing onto the print medium at least partially in reliance on the clock signal.

Optionally the method further including the steps of:
(f) extracting the first information from the read data track;
(g) sending a first message to a remote computer system, the first message containing the first information;
(h) receiving a second message from the remote computer, the second message being indicative of whether printing is authorised for the print medium; and
(i) printing onto the print medium in the event the second message confirms that the printing is authorised.

Optionally the method further including a step (j), performed prior to step (f), of reading the data track using the data track reader at a separate time to step (b), and using the data read in step (j) to perform steps (f) to (i).

Optionally the method including receiving print data from the remote computer system in response to the first message, step (g) including printing onto the print medium based at least partially on the print data.

Optionally the first information is indicative of a physical characteristic of the print medium.

Optionally the first information is indicative of a size of the print medium.

Optionally the first information is indicative of a media type associate with the print medium.

Optionally the first information is indicative of information pre-printed onto the print medium.

Optionally the first information is indicative of an identity of the print medium.

Optionally the method further including a plurality of the data tracks disposed in different places on the print medium.

Optionally the method the data track includes at least one orientation indicator.

Optionally the at least one orientation indicator is disposed at or adjacent an edge of the print medium.

Optionally the print medium having a leading edge and a trailing edge defined relative to intended feed direction of the print medium through a media feed path of the mobile device, at least one of the at least one orientation indicators being disposed on or in the print medium at or adjacent the leading edge.

In a first aspect the present invention provides a mobile device for printing onto a print medium, the print medium including a linear-encoded data track extending in an intended direction of printing, the mobile device including:
- a sensor configured to sense the data track during printing;
- a printhead for printing onto the print medium in response to a fire control signal; and
- fire control means connected to generate the fire control signal based on the sensed data track.

Optionally a mobile device further including a light-emitting device for illuminating the data track while the sensor is sensing it during printing.

Optionally the data track is printed with infrared ink, the light-emitting device emits light in the infrared spectrum and the photosensor is sensitive in the infrared spectrum.

Optionally the data track is a clock track containing only a clock code, the fire control means being configured to generate the fire control signal in the form of a clock signal generated from the sensed data track.

Optionally the data track includes first information, the first information including an embedded clock signal, the fire control means being configured to generate the fire control signal in the form of a clock signal extracted from the sensed data track.

Optionally the first information is indicative of at least one physical characteristic of the print medium, the mobile device being configured to control operation of the printhead at least partially on the basis of at least one of the physical characteristics.

Optionally a mobile device configured to use the sensed data track to determine an absolute position of the print medium with respect to the printhead, and to print onto the print medium in reliance on the determination.

Optionally the data track further encoding first information and the print medium further including second coded data that encodes second information, the first information being indicative of the second information, wherein the mobile device is configured to print onto the print medium such that there is a predetermined registration between what is being printed and the second coded data.

Optionally a mobile device further including a receiver for receiving print data to be printed and information indicative of the predetermined registration.

Optionally the data track further encoding first information and the print medium further including second coded data that encodes second information, the first information being indicative of the second information, wherein the mobile device is configured to:
- print onto the print medium;
- determine a registration between what is being printed and the second coded data.

Optionally the mobile device further including a transmitter for transmitting the determined registration to a remote computer system.

Optionally the first information is indicative of a size of the print medium.

Optionally the first information is indicative of a media type associate with the print medium.

Optionally the first information is indicative of information pre-printed onto the print medium.

Optionally the first information is indicative of an identity of the print medium.

Optionally the method further including a plurality of the data tracks disposed in different places on the print medium.

Optionally the data track includes at least one orientation indicator.

Optionally the at least one orientation indicator is disposed at or adjacent an edge of the print medium.

Optionally, the print medium having a leading edge and a trailing edge defined relative to intended feed direction of the print medium through a media feed path of the mobile device, at least one of the at least one orientation indicators being disposed on or in the print medium at or adjacent the leading edge In a first aspect the present invention provides a print medium configured to be printed on by a mobile device in a print direction, the print medium comprising:
- a laminar substrate defining first and second opposite faces; and
- coded data encoding first information, the first information being indicative of a physical characteristic of the print medium.

Optionally the first information is indicative of a size of the print medium.

Optionally the first information is indicative of a media type associate with the print medium.

Optionally the first information is indicative of information pre-printed onto the print medium.

Optionally the first information is encoded into the coded data in accordance with a linear encoding scheme.

Optionally the coded data takes the form of a data track.

Optionally the print medium according to claim 6, wherein the data track extends along an edge of the print medium.

Optionally the print medium including at least two of the data tracks, each of which encodes the first information.

Optionally the first information is identical in all the data tracks.

Optionally each of the data tracks includes at least one orientation indicator indicative of an orientation of the print medium.

Optionally the orientation indicator is different in each of the data tracks to account for differences in position and orientation of the respective data tracks relative to the print medium.

Optionally one of the orientation indicators is positioned adjacent a first corner of the print medium on the first face.

Optionally another of the orientation indicators is positioned adjacent a second corner of the print medium on the first face, the second corner being diagonally opposite the first corner.

Optionally the data track further includes at least one orientation indicator indicative of an orientation of the print medium.

Optionally the data track is printed in infrared ink.

Optionally the data track is printed in infrared ink that is substantially invisible to an average unaided human eye.

Optionally the print medium further including coded data containing second information encoded in accordance with a second encoding scheme distinct from the linear encoding scheme, wherein the first information is indicative of the second information.

In a first aspect the present invention provides a mobile device for printing onto a print medium in a print direction, the print medium including first coded data that encodes first information, mobile device comprising:
- a first sensor for sensing the first coded data;
- processing means for decoding the coded data and extracting at least the first information; and
- a printhead for printing onto the print medium, wherein the printhead is controlled to print onto the print medium at least partially on the basis of the extracted first information, and printing does not commence until all of the first information has been extracted.

Optionally the first information is indicative of an identity of the print medium.

Optionally the first coded data is encoded in a data track in accordance with a linear encoding scheme, and the print medium includes second coded data encoded in an encoding scheme different from the linear encoding scheme, at least some of the first information being indicative of second information encoded in the second coded data.

Optionally the first and second information are indicative of the identity of the print medium.

Optionally the mobile device includes a transmitter configured to transmit a first message to a remote computer system, the first message being indicative of the identity of the print medium.

Optionally the mobile device includes a receiver for receiving a second message in reply to the first message, the second message being indicative of whether the print medium can be printed on, the mobile device being configured to await the second message before determining whether to print onto the print medium.

Optionally the mobile device further including a media drive means for driving the print medium past the printhead during printing.

Optionally the mobile device defining a print path along which the print medium travels past the printhead, wherein the drive means is disposed upstream of the sensor in the print path.

Optionally the sensor is disposed between the drive means and the printhead.

Optionally the drive means is reversible, thereby enabling the print medium to be driven past the sensor in the print direction to allow reading of the first coded data, reversed until the print medium is positioned substantially upstream of the printhead, then driven in the print direction past the printhead during printing.

Optionally the mobile device configured to:
- sense the first coded data while the print medium is being driven past the printhead during printing;
- extract a clock signal from the first coded data; and
- use the clock signal the provide a fire control signal to the printhead, thereby to synchronise printing with movement of the print medium.

Optionally the mobile device defining a print path along which the print medium travels past the printhead, wherein the drive means includes first and second drive mechanisms disposed in the print path upstream and downstream, respectively, of the printhead.

Optionally the sensor is disposed between the first and second drive mechanisms.

Optionally the mobile device configured to:
- sense the first coded data while the print medium is being driven past the printhead during printing;
- extract a clock signal from the first coded data; and
- use the clock signal the provide a fire control signal to the printhead, thereby to synchronise printing with movement of the print medium.

Optionally the first coded data includes a separate clock track parallel to the linear encoded first information, the mobile device being configured to generate the clock signal from the clock track during printing.

Optionally the first coded data includes a separate clock track parallel to the linear encoded first information, the mobile device being configured to generate the clock signal from the clock track during printing.

Optionally the mobile device further including a light-emitting device positioned to output light onto the first coded data to enable sensing thereof with the sensor.

Optionally the first coded data is printed in infrared ink and the light-emitting device emits light in the infrared spectrum.

Optionally the first coded data is printed in infrared ink that is substantially invisible to an average unaided human eye.

In a first aspect the present invention provides a mobile device for printing onto a print medium in a print direction, the print medium including first coded data that encodes first information, mobile device comprising:
- a first sensor for sensing the first coded data;
- processing means for decoding the coded data and extracting at least the first information; and
- a printhead for printing onto the print medium, wherein the printhead is controlled to print onto the print medium at least partially on the basis of the extracted first information, and printing commences prior to all of the first information being extracted.

Optionally the first information is indicative of an identity of the print medium.

Optionally the first coded data is encoded in a data track in accordance with a linear encoding scheme, and the print medium includes second coded data encoded in an encoding scheme different from the linear encoding scheme, at least some of the first information being indicative of second information encoded in the second coded data.

Optionally the first and second information are indicative of the identity of the print medium.

Optionally the mobile device includes a transmitter configured to transmit a first message to a remote computer system, the first message being indicative of the identity of the print medium.

Optionally the mobile device includes a receiver for receiving a second message in reply to the first message, the second message being indicative of whether the print medium can be printed on, the mobile device being configured to halt printing in the event the second message indicates that the print medium is not to be printed on.

Optionally the mobile device further including a media drive means for driving the print medium past the printhead during printing.

Optionally the mobile device defining a print path along which the print medium travels past the printhead, wherein the drive means is disposed upstream of the sensor in the print path.

Optionally the sensor is disposed between the drive means and the printhead.

Optionally the mobile device configured to:
- sense the first coded data while the print medium is being driven past the printhead during printing;
- extract a clock signal from the first coded data; and
- use the clock signal the provide a fire control signal to the printhead, thereby to synchronise printing with movement of the print medium.

Optionally the first coded data includes a separate clock track in addition to the first information, the mobile device being configured to generate the clock signal from the clock track during printing.

Optionally the mobile device further including a light-emitting device positioned to output light onto the first coded data to enable sensing thereof with the sensor.

Optionally the first coded data is printed in infrared ink and the light-emitting device emits light in the infrared spectrum.

Optionally the first coded data is printed in infrared ink that is substantially invisible to an average unaided human eye.

Optionally the printhead forms part of a replaceable cartridge.

Optionally the cartridge includes at least one ink reservoir.

Optionally the cartridge includes at least one capping mechanism for capping the printhead when it is not printing.

Optionally the capping mechanism includes a capper moveable between:
- a capping position in which the capper is urged into a capping relationship with the printhead; and
- an uncapped position in which the printhead is able to print onto the print medium, wherein in the uncapped position the capper is displaced away from the printhead;
- wherein the capper is moved between the capped and uncapped position by an edge of the print medium as it moves through the media path.

Optionally in the capped position the capper is resiliently urged into the capping relationship.

Optionally the capping mechanism is configured such that the capper is displaced in the feed direction as it moves from the capped position to the uncapped position.

Optionally the processing means is configured to extract a clock signal from the sensed coded data, the clock signal being used to synchronize printing onto the print medium.

In a first aspect the present invention provides a mobile device comprising:
- a printer for printing document information onto one or more of a plurality of print areas, each of the print areas including identity data indicative of identity information which differentiates the print area from others of the plurality; and
- at least one sensor for sensing the identity information of the one or more print areas.

Optionally the device is a mobile telecommunications device.

Optionally the identity data is represented on the print area in a coded form and the printer includes a decoder which receives coded data from the at least one sensor and outputs decoded data representing at least the identity data or at least the identity information.

Optionally each identity information is represented on the print area by at least two discrete items of data and the decoder outputs decoded data representing at least the identity information after receiving said at least two separate items of data.

Optionally said at least one sensor is positioned to sense said identity data after printing of the document information on the respective print area has commenced.

Optionally said at least one sensor is positioned to sense said identity data before printing of the document information on the respective print area has commenced.

Optionally said at least one sensor is positioned to sense said identity data during printing of the document information on the respective print area.

Optionally the mobile device further including a transmitter for transmitting information to a computer system.

Optionally the mobile device further including a transmitter which transmits the identity data or identity information to the computer system.

Optionally the mobile device further including means to detect failure to correctly print document information onto a print area and for generating a void signal on detection of said failure, the transmitter transmitting said void signal to the computer system.

Optionally said document information is based at least partially on document data received from a computer system.

Optionally said printer derives and transmits identity data or identity information associated with a print area to a computer system prior to receiving document data associated with said print area.

Optionally said printer derives and transmits identity data or identity information associated with a print area to a computer system prior to receiving document data associated with said print area and said document data is based at least partially on the identity information of the print area.

Optionally the printer is operable to over-print a print area having existing document information to render the existing document information unreadable Optionally the printer includes a print mechanism for printing on at least two of print areas substantially simultaneously.

Optionally the at least one sensor is selected from an image sensor and a magnetic sensor and a chemical sensor.

Optionally the printer generates at least some of the information printed.

Optionally the printer generates print information indicative of the information printed.

Optionally the mobile device further including a user interface to enable a user to input identity information into the printer.

In a first aspect the present invention provides print medium configured to be printed on by a mobile device in a print direction, the print medium comprising a laminar substrate defining first and second opposite faces, the laminar substrate comprising a first portion to be printed on by the mobile device, and a second portion attached to the second portion by a relatively weak region in the substrate, the second portion being detachable from the first portion.

Optionally a print medium including a linear track from which a clock signal can be extracted by the mobile device for use in synchronising printing onto the first portion.

Optionally the linear track is at least partially disposed on the second portion.

Optionally the linear track extends on both the first and second portions in a continuous fashion.

Optionally the linear track is a linear-encoded data track containing first information extractable by the mobile device prior to or during printing.

Optionally a print medium further including coded data encoded in a format different from the linear encoding, the coded data containing second information, wherein the first information is indicative of the second information.

Optionally the linear track extends along the print medium in the print direction.

Optionally the linear track is disposed at or adjacent an edge of the print medium, the edge extending in the print direction.

Optionally the relatively weak region is a perforated line extending across the print medium in direction generally normal to the print direction.

Optionally the relatively weak region is shaped such that, once the second portion is detached from the first portion, an edge of the first portion revealed by removal of the second portion is shaped substantially the same, in plan view, as an edge of the first portion at an opposite end of the first portion.

Optionally the linear track includes at least one orientation indicator indicative of an orientation of the print medium.

Optionally the orientation indicator is disposed at or adjacent an edge of the second portion distant from the weak region.

Optionally a print medium including a further orientation indicator in the linear track, the further orientation indicator being positioned on the first portion at or adjacent the weak region.

Optionally the data track is printed in infrared ink.

Optionally the data track is printed in infrared ink that is substantially invisible to an average unaided human eye.

Optionally a print medium further including pre-printed human readable information on at least one of the faces.

Optionally the second portion includes coded data encoded in a format different from the linear encoding, the coded data containing second information.

Optionally the second portion includes pre-printed human readable information indicative of the second portion being a lottery ticket.

Optionally the first information is indicative of a physical characteristic of the print medium.

Optionally the first information is indicative of a size of the print medium.

Optionally the first information is indicative of a media type associate with the print medium.

Optionally the first information is indicative of information pre-printed onto the print medium.

In a first aspect the present invention provides a method of using a mobile device to read coded data from a print medium configured to be printed on by the mobile device in a print direction, the mobile device including a printer, a sensor and processing means, the print medium comprising a laminar substrate defining first and second opposite faces, the first face bearing coded data, the method comprising the steps of:
  using the sensor to sense at least some of the coded data from the print medium;
  using the processing means to decode the coded data; and
  printing onto the print medium only after the coded data has been decoded.

Optionally the coded data is indicative of a plurality of locations associated with the print medium, the decoding step including determining at least one of the locations.

Optionally the decoding step includes determining a position of the print medium relative to the sensor at the time the coded data was sensed, based at least partly on the determined location.

Optionally the coded data takes the form of a two-dimensional array of data, the sensor being configured to capture an image of a subset of the coded data, the subset of the coded data being sufficient to enable the location to be determined.

Optionally the processing means being configured to determine a position of the print medium relative to the sensor at the time the coded data was sensed, based at least partly on the determined location and a position of the captured coded data in a capture field of the sensor.

Optionally the mobile device further including a light emitting device, the method including the step of using the light emitting device to illuminate the print medium while the sensor senses the coded data.

Optionally the method including the steps, performed during printing onto the print medium, of:
  using the sensor to determine a clock signal; and
  using the clock signal to synchronize the printing onto the print medium.

Optionally the step of using the sensor to sense the coded data includes capturing a first image of the coded data, and the step of generating the clock signal includes using the processor to perform the steps of;

determining a position of the print medium relative to the sensor at the time the coded data was sensed, based at least partly on the determined location;

using the sensor to capture subsequent images of the coded data as the printhead is being printed;

determining movement of the print medium during printing based on the subsequently captured images; and deriving the clock signal based on the movement.

Optionally determining the movement during printing includes using the processing means to perform the steps of:

decoding the coded data captured in at least some of the subsequently captured images;

determining a position of the print medium relative to the sensor at the time each of the images was captured; and determining the movement of the print medium based on the positions determined over time.

Optionally determining the movement during printing includes the step of performing pattern recognition on at least some of the coded data in at least some of the captured images to determine movement of the print medium relative to initial position.

Optionally the method further including the step of determining movement of the print medium relative to sensor, based on the coded data sensed by the sensor.

Optionally determining the movement includes capturing a plurality of images of the coded data as the print medium moves past the sensor, and determining the movement based on the plurality of images.

Optionally determining the movement includes the steps of:

using the processing means to decode the coded data captured in at least some of the plurality of captured images;

determining a position of the print medium relative to the sensor at the time each of the images was captured; and determining the movement of the print medium based on the positions determined over time.

Optionally determining the movement includes the step of performing pattern recognition to determine movement of the print medium relative to at least one absolute position of the print medium.

Optionally including the step of obtaining the absolute position by using the processing means to decode the coded data in at least one of the captured images and obtaining the at least one absolute position from the decoded data.

Optionally the mobile device further including a light emitting device, the method including the step of using the light emitting device to illuminate the print medium while the sensor senses the coded data.

Optionally the method further including the steps of generating a clock signal based on the movement, and using the clock signal to synchronize the printing onto the print medium.

Optionally the medium includes at least one orientation indicator indicative of an orientation of the print medium, the method comprising determining the orientation from the orientation indicator before commencing printing.

Optionally the at least one orientation indicator is disposed at or adjacent an edge of the print medium.

Optionally the print medium having a leading edge and a trailing edge defined relative to intended feed direction of the print medium through a media feed path, at least one of the at least one orientation indicators being disposed on or in the print medium at or adjacent the leading edge.

In a first aspect the present invention provides a method of using a mobile device to determine movement, relative to the mobile device, of a print medium configured to be printed on by the mobile device in a print direction, the mobile device including a printer, a first sensor and processing means, the print medium comprising a laminar substrate defining first and second opposite faces, the first face bearing coded data, the method comprising the steps of:

using the first sensor to sense at least some of the coded data from the print medium;

determining movement of the print medium relative to sensor, based on the coded data sensed by the first sensor.

Optionally determining the movement includes capturing a plurality of images of the coded data as the print medium moves past the first sensor, and determining the movement based on the plurality of images.

Optionally determining the movement includes the steps of:

using the processing means to decode the coded data captured in at least one of the plurality of captured images;

determining a position of the print medium relative to the first sensor at the time each of the images was captured; and determining the movement of the print medium based on the positions determined over time.

Optionally determining the movement includes the step of performing pattern recognition to determine movement of the print medium relative to at least one absolute position of the print medium.

Optionally the method including the step of obtaining the absolute position by using the processing means to decode the coded data in at least one of the captured images and obtaining the at least one absolute position from the decoded data.

Optionally the mobile device further including a light emitting device, the method including the step of using the light emitting device to illuminate the print medium while the first sensor senses the coded data.

Optionally the method further including the steps of generating a clock signal based on the movement, and using the clock signal to synchronize the printing onto the print medium.

Optionally the coded data is indicative of a plurality of locations associated with the print medium, the decoding step including determining at least one of the locations.

Optionally the decoding step includes determining a position of the print medium relative to the first sensor at the time the coded data was sensed, based at least partly on the determined location.

Optionally the coded data takes the form of a two-dimensional array of data, the first sensor being configured to capture an image of a subset of the coded data, the subset of the coded data being sufficient to enable the position to be determined.

Optionally the processing means being configured to determine a position of the print medium relative to the first sensor at the time the coded data was sensed, based at least partly on the determined location and a position of the captured coded data in a capture field of the first sensor.

Optionally the mobile device further including a light emitting device, the method including the step of using the light emitting device to illuminate the print medium while the first sensor senses the coded data.

Optionally the method including the steps, performed during printing onto the print medium, of:

using the first sensor to sense the coded data; and using the processing means to generate a clock signal based on the sensed coded data; and using the clock signal to synchronize the printing onto the print medium.

Optionally the step of using the first sensor to sense the coded data includes capturing a first image of the coded data, and the step of generating the clock signal includes using the processor to perform the steps of;
  determining a position of the print medium relative to the first sensor at the time the coded data was sensed, based at least partly on the determined location;
  using the first sensor to capture subsequent images of the coded data as the printhead is being printed;
  determining movement of the print medium during printing based on the subsequently captured images; and
  deriving the clock signal based on the movement.

Optionally determining the movement during printing includes using the processing means to perform the steps of:
  decoding the coded data captured in at least some of the subsequently captured images;
  determining a position of the print medium relative to the first sensor at the time each of the images was captured; and
  determining the movement of the print medium based on the positions determined over time.

Optionally determining the movement during printing includes the step of performing pattern recognition on at least some of the coded data in at least some of the captured images to determine movement of the print medium relative to initial position.

Optionally the print medium includes at least one orientation indicator indicative of an orientation of the print medium, the method comprising determining the orientation from the orientation indicator before commencing printing.

Optionally the at least one orientation indicator is disposed at or adjacent an edge of the print medium.

Optionally the method further including the steps of using the processing means to determine, from a known physical orientation of the print medium and the first image, a first relative rotation of the coded data with respect to the print medium.

Optionally the method further including the steps of:
  using a second sensor to capture a second image of at least some of the coded data; and
  determining movement of the print medium relative to sensor, based on the coded data sensed by both the first and second sensors.

In a first aspect the present invention provides a method of using a mobile device to determine a first relative rotation of coded data on a print medium, the print medium configured to be printed on by the mobile device in a print direction, the mobile device including a printer, a first sensor and processing means, the print medium comprising a laminar substrate defining first and second opposite faces, the first face bearing coded data, the method comprising the steps of:
  (a) using the first sensor to capture a first image of at least some of the coded data when the print medium is at a first position;
  (b) using the processing means to determine, from a known physical orientation of the print medium and the first image, a first relative rotation of the coded data with respect to the print medium.

Optionally the mobile device further includes a transmitter, the method further including the step of transmitting, using the transmitter, the first relative rotation to a remote computer system.

Optionally the transmitter is configured to transmit the relative rotation via a mobile telecommunications network.

Optionally the method further including the steps of:
  using the first sensor to capture a second image of at least some of the coded data when the print medium is at a second position;
  using the processing means to determine, from a known physical orientation of the print medium and the second image, a second relative rotation of the coded data with respect to the print medium; and
  using the processing means to calculate, from the first and second rotations, a third rotation, the third rotation being a more accurate indication of the relative rotation of the coded data with respect to the print medium than the first or second rotations.

Optionally the mobile device further includes a transmitter, the method further including the step of transmitting, using the transmitter, the third relative rotation to a remote computer system.

Optionally the method further including the steps, performed by the processing means, of:
  decoding at least some of the coded data in the first image;
  determining a location from the decoded data; and
  determining, based on the location and a position of the coded data within the first image, a first position of the print medium relative to the first sensor at time the first image was captured.

Optionally determining the movement includes capturing a plurality of images of the coded data as the print medium moves past the first sensor, and determining the movement based on the plurality of images.

Optionally the mobile device further including a light emitting device, the method including the step of using the light emitting device to illuminate the print medium while the first sensor senses the coded data.

Optionally the method further including the steps of generating a clock signal based on the movement, and using the clock signal to synchronize the printing onto the print medium.

Optionally the coded data takes the form of a two-dimensional array of data, the first sensor being configured to capture an image of a subset of the coded data, the subset of the coded data being sufficient to enable the position to be determined.

Optionally the method including the steps, performed during printing onto the print medium, of:
  using the first sensor to sense the coded data; and
  using the processing means to generate a clock signal based on the sensed coded data; and
  using the clock signal to synchronize the printing onto the print medium.

Optionally the step of using the first sensor to sense the coded data includes capturing a first image of the coded data, and the step of generating the clock signal includes using the processor to perform the steps of;
  determining a position of the print medium relative to the first sensor at the time the coded data was sensed, based at least partly on the determined location;
  using the first sensor to capture subsequent images of the coded data as the printhead is being printed;
  determining movement of the print medium during printing based on the subsequently captured images; and
  deriving the clock signal based on the movement.

Optionally determining the movement during printing includes using the processing means to perform the steps of:
  decoding the coded data captured in at least some of the subsequently captured images;
  determining a position of the print medium relative to the first sensor at the time each of the images was captured; and determining the movement of the print medium based on the positions determined over time.

Optionally determining the movement during printing includes the step of performing pattern recognition on at least some of the coded data in at least some of the captured images to determine movement of the print medium relative to initial position.

Optionally the print medium includes at least one orientation indicator indicative of an orientation of the print medium, the method comprising determining the orientation from the orientation-indicator before commencing printing.

Optionally the at least one orientation indicator is disposed at or adjacent an edge of the print medium.

Optionally the print medium having a leading edge and a trailing edge defined relative to intended feed direction of the print medium through a media feed path, at least one of the at least one orientation indicators being disposed on or in the print medium at or adjacent the leading edge.

Optionally the method further including the steps of:
using a second sensor to capture a second image of at least some of the coded data;
using the processing means to determine, from a known physical orientation of the print medium and the second image, a second relative rotation of the coded data with respect to the print medium; and
using the processing means to calculate, from the first and second rotations, a third rotation, the third rotation being a more accurate indication of the relative rotation of the coded data with respect to the print medium than the first or second rotations.

Optionally the method including capturing the first and second images substantially simultaneously.

In a first aspect the present invention provides a method of using a mobile device to determine a position of a print medium, the print medium configured to be printed on by the mobile device in a print direction, the mobile device including a printer, a first sensor and processing means, the print medium comprising a laminar substrate defining first and second opposite faces, the first face bearing coded data indicative of at least one location, the method comprising the steps of:
(a) using the first sensor to capture a first image of at least some of the coded data when the print medium is at a position within a media feed path within the mobile device;
(b) using the processing means to decode at least some of the sensed coded data, thereby to determine at least one location; and
(c) determining the position of the print medium based on the at least one location determined in step (b).

Optionally step (c) wherein the position is determined based at least partly on the determined location and a position of the captured coded data in a capture field of the first sensor.

Optionally the method further including the steps of:
using the first sensor to capture a plurality of the images over time;
using the processing means to decode a plurality of the captured images, thereby to determine a plurality of the locations; and
determining a series of positions of the print medium based on the locations.

Optionally the mobile device comprises a second sensor, the method comprising the steps of:
(d) using the second sensor to capture a second image of at least some of the coded data;
(e) using the processing means to decode at least some of the sensed coded data, thereby to determine at least one location; and
(f) determining a position of the print medium based on the location determined in step (e).

Optionally the method including capturing the first and second images substantially simultaneously.

Optionally the method further including using the processing means to determine a position of the print medium based on the positions determined in steps (c) and (f).

Optionally the method including averaging the positions determined in steps (c) and (f).

Optionally the method further including the step of using the processing means to determine, from the sensed coded data, an identity of the print medium.

Optionally the method further including determining movement of the print medium relative to sensor, based on the coded data sensed by the first sensor.

Optionally determining the movement includes capturing a plurality of images of the coded data as the print medium moves past the first sensor, and determining the movement based on the plurality of images.

Optionally determining the movement includes the steps of:
using the processing means to decode the coded data captured in at least one of the plurality of captured images;
determining a position of the print medium relative to the first sensor at the time each of the images was captured; and
determining the movement of the print medium based on the positions determined over time.

Optionally determining the movement includes the stp of performing pattern recognition to determine movement of the print medium relative to at least one absolute position of the print medium.

Optionally the method comprising the step of using the processing means to determine, from a known physical orientation of the print medium and the first image, a first relative rotation of the coded data with respect to the print medium.

Optionally the mobile device further includes a transmitter, the method further including the step of transmitting, using the transmitter, the first relative rotation to a remote computer system.

Optionally the transmitter is configured to transmit the relative rotation via a mobile telecommunications network.

Optionally the method including the steps, performed during printing onto the print medium, of:
using the processing means to generate a clock signal based on the sensed coded data; and
using the clock signal to synchronize the printing onto the print medium.

Optionally the mobile device further including a light emitting device, the method including the step of using the light emitting device to illuminate the print medium while the first sensor senses the coded data.

In a first aspect the present invention provides a mobile telecommunications device comprising:
a printhead for printing a sheet of media substrate, the sheet of media substrate having coded data on at least part of its surface;
a media feed assembly for feeding the sheet of media substrate along a feed path past the printhead;
a print engine controller for operatively controlling the printhead; and,
a sensor for reading the coded data and generating a signal indicative of at least one dimension of the sheet, and transmitting the signal to the print engine controller; such that, the print engine controller uses the signal to initiate the printing when the sheet is at a predetermined position relative to the printhead.

Detecting the leading edge of the card is necessary for longitudinal registration of the print from the printhead with the card. Longitudinal registration of the print is particularly crucial if the printing is full bleed (printed to the very edges of the card). The print engine controller (PEC) must be able to initiate printing at the exact time the leading edge reaches the printhead. Furthermore, if the cards are pre-printed with a Netpage tag pattern, accurate longitudinal registration is necessary to ensure that any hyperlinks in the tag pattern align with the corresponding printed words or images. Using a micro switch or photo-sensor immediately prior to the printhead to detect the leading edge adds to the complexity and size the design. However, encoding the card with data specifying its relevant dimension allows the PEC to initiate printing at the correct time. Once the sensor reads the coded data, the PEC can determine the distance from the sensor to the leading edge and then using the media feed speed to determine when to initiate printing.

Optionally the at least one dimension is the distance from at least one marker in the coded data to the leading edge of the sheet with respect to the direction of media feed past the printhead.

Optionally during use, the media feed assembly feeds the sheet along the feed path in a forward direction so that the sensor can read at least some of the coded data before retracting the sheet along the path in a reverse direction and then again feeding the sheet along the path in the forward direction past the printhead for printing.

Optionally the coded data is disposed along a track extending along the sheet in a direction parallel to the feed path.

Optionally the coded data is distributed across substantially all of at least one side of the sheet.

Optionally the coded data is disposed along a track extending across the sheet in a direction normal to the feed path.

Optionally the printhead and the drive shaft are incorporated into a replaceable cartridge for insertion into a print media feed path within the mobile telecommunications device.

Optionally the printhead has an array of ink ejection nozzles and is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally the mobile telecommunications device further comprising:
(a) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(b) a force transfer mechanism connected to the capper and configured such that a force provided by an edge of the media substrate as it moves relative to the feed path is transferred to the capper by the force transfer mechanism, thereby to at least commence movement of the capper from the capped position to the uncapped position prior to the media substrate reaching the capper.

Optionally the mobile telecommunications device further comprising:

(a) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and,
(b) a locking mechanism configured to hold the capper in the uncapped position until after a trailing edge of the media substrate is clear of the printhead.

Optionally the media feed assembly has a drive shaft with a media engagement surface for enhanced contact friction with the media substrate.

Optionally the mobile telecommunications device further comprising a capping mechanism including a capper moveable between a capping position in which the capper is urged into a capping relationship with the printhead, and an uncapped position in which the printhead is able to print onto the media substrate, wherein the capper assembly is held in the uncapped position by the media substrate such that it moves to the capped position upon disengagement with the media.

Optionally the print engine controller has a light emitting beacon, and the printhead comprises:
an array of nozzles for ejecting ink;
print data circuitry for providing the nozzles with print data; and,
a photosensor for optically receiving the print data from the beacon.

Optionally the media feed assembly has a drive shaft driven by a piezo-electric resonant linear drive system.

Optionally the mobile telecommunications device further comprising:
a position sensor for providing the print engine controller with a signal indicative of the position of the media substrate relative to the printhead; such that,
the print engine controller differentiates the signal to derive the speed of the media substrate relative to the printhead and adjusts the operation of the printhead in response to variations in the speed.

Optionally the mobile telecommunications device further wherein during use,
the print engine controller senses the number of complete and partial rotations of the drive shaft and adjusts the operation of the printhead in response to variations in the angular velocity of the drive shaft.

Optionally the mobile telecommunications device further comprising at least one ink reservoir, the at least one reservoir comprising:
a housing defining an ink storage volume;
one or more baffles dividing the ink storage volume into sections, each of the sections having at least one ink outlet for sealed connection to the printhead; and,
at least one conduit establishing fluid communication between the ink outlets of adjacent sections.

Optionally the mobile telecommunications device further comprising:
a dual sensing facility for reading coded data on at least part of the media substrate before, as well as after, it has past the printhead.

Optionally the media feed assembly has a drive shaft for feeding the sheet of media substrate past the printhead; wherein during use,
the sheet disengages from the drive shaft before completion of its printing such that the trailing edge of the sheet projects past the printhead by momentum to complete its printing.

In a first aspect the present invention provides a mobile telecommunications device comprising:

a printhead for printing a sheet of media substrate, the sheet of media substrate having coded data on at least part of its surface;

a media feed assembly for feeding the sheet of media substrate along a feed path past the printhead;

a print engine controller for operatively controlling the printhead; and, a dual sensor facility for reading the coded data before, as well as after, it has past the printhead.

The print engine controller (PEC) need a line sync signal to control the firing of each line of print data from the nozzles. The line sync signal essentially indicates when the card has moved along the feed path by the necessary amount and the next line of print can be fired from the nozzles. There are different ways of generating the line sync signal. However, to minimize components and reduce overall form factor, the media can be encoded with clock data that is optically sensed to derive a clock signal which is in turn used to generate the line sync signal. While the clock data sensor can be positioned very close to the printhead (on the media entry side), it can not read the clock data on trailing edge of the media once it had passed by on its way to the printhead. This presents a problem as to how to generate the line sync signal needed to print the trailing portion. By configuring the sensing device to conduct dual reading of the clock data, once prior to the printhead, and then again after the printhead, a line sync signal can be produced from the leading edge to the trailing edge of the media. It will be appreciated that this is necessary for 'full bleed' printing (printing to the very edges of the card).

Optionally the sensor facility has a first photosensor positioned adjacent the feed path before the printhead, and a second photosensor positioned adjacent the feed path after the printhead.

Optionally the coded data includes clock data configured in a longitudinal clock track extending along the sheet of media substrate such that, the first photosensor reads the clock track before the second photosensor.

Optionally the first and second photosensors both generate a clock signal when they are simultaneously reading the clock track and the print engine controller synchronizes the clock signal from the second photosensor with the signal from the first phototsensor.

Optionally the print engine controller has a phase lock loop for the first and second photosensor signals respectively in order to generate first and second phase locked clock signals, the print engine controller also having a phase difference calculator to determine any phase difference between the first and second phase locked clock signals, and a delay to delay the second phase locked clock signal by an amount that synchronizes it with the first phase locked signal.

Optionally the print engine controller generates a line sync signal for the printhead using the first phase locked clock signal prior to synchronization with the second phase locked clock signal, and then uses the second phase locked clock signal to generate the line sync signal after synchronization.

Optionally the printhead and the drive shaft are incorporated into a replaceable cartridge for insertion into a print media feed path within the mobile telecommunications device.

Optionally the printhead has an array of ink ejection nozzles and is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally the mobile telecommunications device further comprising:

(a) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and (b) a force transfer mechanism connected to the capper and configured such that a force provided by an edge of the media substrate as it moves relative to the feed path is transferred to the capper by the force transfer mechanism, thereby to at least commence movement of the capper from the capped position to the uncapped position prior to the media substrate reaching the capper.

Optionally the mobile telecommunications device further comprising:

(a) a capping mechanism including a capper moveable between a capping position in which the capper is urged into a capping relationship with the printhead, and an uncapped position in which the printhead is able to print onto the media substrate, wherein in the uncapped position the capper is displaced away from the printhead; and, (b) a locking mechanism configured to hold the capper in the uncapped position until after a trailing edge of the media substrate is clear of the printhead.

Optionally the media feed assembly has a drive shaft with a media engagement surface for enhanced contact friction with the media substrate.

Optionally the mobile telecommunications device further comprising a capping mechanism including a capper moveable between a capping position in which the capper is urged into a capping relationship with the printhead, and an uncapped position in which the printhead is able to print onto the media substrate, wherein the capper assembly is held in the uncapped position by the media substrate such that it moves to the capped position upon disengagement with the media.

Optionally the mobile telecommunications device further comprising a print engine controller with a light emitting beacon, and the printhead further comprises:

an array of nozzles for ejecting ink;

print data circuitry for providing the nozzles with print data; and, a photosensor for optically receiving the print data from the beacon.

Optionally the media feed assembly has a drive shaft driven by a piezo-electric resonant linear drive system.

Optionally the dual sensing facility provides the print engine controller with a signal indicative of the position of the media substrate relative to the printhead; such that, the print engine controller differentiates the signal to derive the speed of the media substrate relative to the printhead and adjusts the operation of the printhead in response to variations in the speed.

Optionally the media feed assembly has a drive shaft and the print engine controller senses the number of complete and partial rotations of the drive shaft and adjusts the operation of the printhead in response to variations in the angular velocity of the drive shaft.

Optionally the mobile telecommunications device further comprising at least one ink reservoir, the at least one reservoir comprising:

a housing defining an ink storage volume;
one or more baffles dividing the ink storage volume into sections, each of the sections having at least one ink outlet for sealed connection to the printhead; and,
at least one conduit establishing fluid communication between the ink outlets of adjacent sections.

Optionally the coded data includes data indicative of at least one dimension of the sheet of media substrate; such that,
the print engine controller initiates the printing when the sheet is at a predetermined position relative to the printhead.

Optionally the media feed assembly has a drive shaft for feeding the sheet of media substrate past the printhead; wherein during use,
the sheet disengages from the drive shaft before completion of its printing such that the trailing edge of the sheet projects past the printhead by momentum to complete its printing.

In a first aspect the present invention provides a replaceable print cartridge for installation in a mobile device, the print cartridge comprising:
a printhead;
at least one ink reservoir; and
a first integrated circuit that permanently stores an identifier that is relatively unique to that integrated circuit;
such that, upon installation in the mobile device, the mobile device is able to determine the identifier.

Optionally the print cartridge further including one or more contacts for operative connection with one or more corresponding complementary contacts in the mobile device upon installation, the mobile device being able to interrogate the first integrated circuit via the at least one contact.

Optionally the mobile device includes a second integrated circuit for interrogating the first integrated circuit to determine the identifier, the first integrated circuit being configured to enable authenticated communication between itself and the second integrated circuit.

Optionally the first integrated circuit includes non-volatile memory that stores a first bit-pattern, the first bit pattern having been generated by:
(a) applying a one way function to a second bit-pattern associated with the device, thereby to generate a first result;
(b) applying a second function to the first result and the first bit-pattern, thereby to generate a second result; and
(c) storing the second result in the memory, thereby indirectly storing the first bit-pattern.

Optionally the one way function is more cryptographically secure than the second function.

Optionally each of the first integrated circuits includes secret information used in authentication by the mobile device of the cartridge associated with that integrated circuit, the secret information in each chip being located in a different location in the memory relative to a plurality of the other chips.

Optionally the printhead is a pagewidth printhead.

Optionally the printhead prints in at least three colors.

Optionally the printhead prints in cyan, magenta and yellow.

Optionally the print cartridge further comprising a capping mechanism including a capper moveable between:
a capping position in which the capper is urged into a capping relationship with the printhead; and
an uncapped position in which the printhead is able to print onto the print medium, wherein in the uncapped position the capper is displaced away from the printhead;
wherein the capper is moved between the capped and uncapped position by an edge of the print medium as it moves through the feed path.

Optionally in the capped position the capper is resiliently urged into the capping relationship.

Optionally the capping mechanism is configured such that the capper is displaced in the feed direction as it moves from the capped position to the uncapped position.

Optionally the capping mechanism is further configured such that the capper is simultaneously displaced in a direction away from the printhead as it is displaced in the feed direction.

Optionally the capping mechanism is subsequently displaced in a direction opposite the feed direction in the uncapped position.

Optionally the print cartridge further including a locking mechanism for holding the capper in the uncapped position whilst the print medium is being printed on by the printhead.

Optionally the locking mechanism includes at least one cam mounted for rotation between an unlocked position and a locked position, the at least one cam being configured such that, in the unlocked position, it extends at least partially into the feed path when print medium is not present, the at least one cam being positioned and configured to engage an edge of the print medium as the print medium is fed through the feed path such that the at least one cam is rotated by the print medium into the locked position, such that, in the locked position, the capper is held in the uncapped position until after a trailing edge of the print medium is clear of the printhead.

Optionally the cam is resiliently biased to return to the unlocked position once the print medium edge moves past a predetermined position in the feed path, thereby causing the capper to return to the capped position.

Optionally the at least one cam is mounted for rotation about an axis that is substantially normal to the print medium as it engages the cam in the feed path.

Optionally the print cartridge further comprising:
at least one baffle dividing the at least one ink reservoir into a plurality of sections, each of the sections in each ink reservoir being in fluid communication with each of the other sections in that ink reservoir via an aperture; and at least one porous insert in each of the at least one reservoirs, such that substantially all of each ink reservoir is filled with the at least one porous insert.

Optionally each reservoir includes a single porous insert including at least one recessed portion, each recessed portion being configured to engage one of the baffles in the reservoir.

In a first aspect the present invention provides a replaceable cartridge for installation in a mobile device, the cartridge comprising:
a printhead;
one or more ink reservoirs for supplying ink to the printhead; and
an integrated circuit for enabling validation of the cartridge upon installation of the cartridge into the mobile device, the integrated circuit including non-volatile memory for storing secret information.

Optionally a cartridge further including communication means for enabling communication between the mobile device and the integrated circuit during validation.

Optionally the communication means includes first contacts for engaging complementary second contacts of the mobile device when the cartridge is installed therein.

Optionally the integrated circuit is configured to communicate with an entity in the mobile device in a secure fashion.

Optionally the integrated circuit is configured to store data indicative of a number of prints remaining, the integrated circuit including one or more security features for preventing unauthorised tampering with the data.

Optionally the data includes an ink counter, the integrated circuit being configured to decrement the ink counter as ink is used in printing.

Optionally the integrated circuit is designed to prevent incrementing of the ink counter.

Optionally the data includes a print counter, the integrated circuit being configured to decrement the print counter each time a print is made.

Optionally the integrated circuit is designed to prevent incrementing of the print counter.

Optionally a cartridge further including a sensor, the sensor being configured to sense coded data on a print medium to be printed on by the printhead.

Optionally the sensor is configured to output the sensed coded data to the mobile device.

Optionally a cartridge configured to use a clock derived from the sensed coded data to synchronize printing onto the print medium.

Optionally the coded data includes a linear-encoded clock track, the clock being derived from the clock track during printing.

Optionally the coded data includes a linear-encoded data track, the data track being indicative of an identity of the print medium, the cartridge being configured to output the sensed coded data to the mobile device to enable determination of the identity.

Optionally a cartridge further including a capping mechanism including a capper moveable between:
  a capping position in which the capper is urged into a capping relationship with the printhead; and
  an uncapped position in which the printhead is able to print onto the print medium, wherein in the uncapped position the capper is displaced away from the printhead;
  wherein the capper is moved between the capped and uncapped position by an edge of the print medium as it moves through the feed path.

Optionally in the capped position the capper is resiliently urged into the capping relationship.

Optionally the capping mechanism is configured such that the capper is displaced in the feed direction as it moves from the capped position to the uncapped position.

Optionally the capping mechanism is further configured such that the capper is simultaneously displaced in a direction away from the printhead as it is displaced in the feed direction.

Optionally the capping mechanism is subsequently displaced in a direction opposite the feed direction in the uncapped position.

Optionally a cartridge further including a locking mechanism for holding the capper in the uncapped position whilst the print medium is being printed on by the printhead.

In a first aspect the present invention provides a replaceable print cartridge for installation in a mobile device, the print cartridge comprising:
  a printhead;
  at least one ink reservoir;
  storage means configured to store data; and
  a data changing mechanism for changing a value of the data, the data being prevented from being changed to a value that the storage means has previously stored.

Optionally the storage means stores the data in the form of a plurality of units, the value of the data being changeable by permanently altering one or more of the units.

Optionally the units are bits.

Optionally the value of each of the bits is stored in a one-time alterable form, the print cartridge being configured to selectively alter the value of one or more of the bits in response to a predetermined event.

Optionally the print cartridge including a plurality of fusible links, each of the fusible links storing one of the bits, each fusible link being configured to selectively be blown in response to the event.

Optionally wherein the printhead includes a plurality of unit cells, each of the unit cells being provided with data from a corresponding data register, wherein a majority of the unit cells are associated with a corresponding plurality of respective print nozzles for outputting ink, and a minority of the unit cells are associated with a corresponding plurality of the bits, such that the value of one or more of the bits can be altered by loading appropriate data into the register.

Optionally the print cartridge further including one or more contacts for operative connection with one or more corresponding complementary contacts in the mobile device upon installation, the mobile device being able to control alteration of the value of one or more of the bits via the at least one contact.

Optionally the data is indicative of a number of prints remaining.

Optionally the data is indicative of an amount of ink used by, or remaining in, the print cartridge.

Optionally the data is indicative of a number of prints made, or remaining to be printed, by the print cartridge.

Optionally the print cartridge further including a sensor, the sensor being configured to sense coded data on a print medium to be printed on by the printhead.

Optionally the sensor is configured to output the sensed coded data to the mobile device.

Optionally the print cartridge configured to use a clock derived from the sensed coded data to synchronize printing onto the print medium.

Optionally the coded data includes a linear-encoded clock track, the clock being derived from the clock track during printing.

Optionally the coded data includes a linear-encoded data track, the data track being indicative of an identity of the print medium, the cartridge being configured to output the sensed coded data to the mobile device to enable determination of the identity.

Optionally the print cartridge further including a capping mechanism including a capper moveable between:
  a capping position in which the capper is urged into a capping relationship with the printhead; and
  an uncapped position in which the printhead is able to print onto the print medium, wherein in the uncapped position the capper is displaced away from the printhead;
  wherein the capper is moved between the capped and uncapped position by an edge of the print medium as it moves through the feed path.

Optionally in the capped position the capper is resiliently urged into the capping relationship.

Optionally the capping mechanism is configured such that the capper is displaced in the feed direction as it moves from the capped position to the uncapped position.

Optionally the capping mechanism is further configured such that the capper is simultaneously displaced in a direction away from the printhead as it is displaced in the feed direction.

Optionally the print cartridge further including a locking mechanism for holding the capper in the uncapped position whilst the print medium is being printed on by the printhead.

In a first aspect the present invention provides a replaceable print cartridge for installation in a mobile device, the print cartridge comprising:
- a printhead;
- at least one ink reservoir;
- storage means configured to store information indicative of an amount of printing that can be achieved by the cartridge based on the amount of ink in the at least one ink reservoir; and
- an information changing mechanism for changing a value of the information.

Optionally the information is indicative of a volume of ink remaining in the at least one ink reservoir.

Optionally the print cartridge including a plurality of the ink cartridges, the information being indicative of an amount of ink remaining in each of the reservoirs individually.

Optionally the print cartridge including a plurality of the ink cartridges, the information being indicative of an average amount of ink remaining in the reservoirs in aggregate.

Optionally the information is indicative of an estimated number of typical prints the print cartridge can achieve based on the amount of ink in the at least one ink reservoir.

Optionally the storage means stores the information in the form of a plurality of sub-value units, the value of the information being changeable by permanently altering the one or more of the sub-value units.

Optionally the sub-value units are bits.

Optionally the print cartridge configured to automatically change a value of one of the bits each time a predetermined amount of ink is consumed by printing.

Optionally the print cartridge configured to automatically change a value of one of the bits each time a predetermined number of prints has been printed.

Optionally the print cartridge the value of each of the bits is stored in a one-time alterable form, the print cartridge being configured to selectively alter the value of one or more of the bits in response to a predetermined event.

Optionally the print cartridge including a plurality of fusible links, each of the fusible links storing one of the bits, each fusible link being configured to selectively be blown by the cartridge in response to the event.

Optionally the printhead includes a plurality of unit cells, each of the unit cells being provided with data from a corresponding data register, wherein a majority of the unit cells are associated with a corresponding plurality of respective print nozzles for outputting ink, and a minority of the unit cells are associated with a corresponding plurality of the bits, such that the value of one or more of the bits can be altered by loading appropriate data into the register.

Optionally the print cartridge further including one or more contacts for operative connection with one or more corresponding complementary contacts in the mobile device upon installation, the mobile device being able to control alteration of the value of one or more of the bits via the at least one contact.

Optionally the print cartridge further including a sensor, the sensor being configured to sense coded data on a print medium to be printed on by the printhead.

Optionally the print cartridge the sensor is configured to output the sensed coded data to the mobile device.

Optionally the print cartridge configured to use a clock derived from the sensed coded data to synchronize printing onto the print medium.

Optionally the print cartridge the coded data includes a linear-encoded clock track, the clock being derived from the clock track during printing.

Optionally the coded data includes a linear-encoded data track, the data track being indicative of an identity of the print medium, the cartridge being configured to output the sensed coded data to the mobile device to enable determination of the identity.

Optionally the print cartridge further including a capping mechanism including a capper moveable between:
- a capping position in which the capper is urged into a capping relationship with the printhead; and
- an uncapped position in which the printhead is able to print onto the print medium, wherein in the uncapped position the capper is displaced away from the printhead;
- wherein the capper is moved between the capped and uncapped position by an edge of the print medium as it moves through the feed path.

Optionally wherein in the capped position the capper is resiliently urged into the capping relationship.

In a first aspect the present invention provides a mobile device including:
- a printhead disposed in a print path along which a print medium travels while being printed; and
- a sensor in the print path to sense when a print medium has been inserted therein;
- the mobile device being configured to:
- sense, using the sensor, that a print medium has been inserted;
- without further user intervention, commence printing onto the print medium.

Optionally the mobile device includes a display for displaying visible information to a user, the mobile device being configured to automatically print data associated with a current document or other type of information being displayed on the display.

Optionally the mobile device is configured to automatically print the next job in a print queue maintained by mobile device.

Optionally printing without user intervention is associated with a mode in which a user can place the mobile device.

Optionally the mobile device further including drive means for driving the print medium past the printhead during printing, the drive means being configured to commence driving the print medium as part of the printing process.

Optionally the drive means includes at least one roller positioned in the print path before the printhead.

Optionally the sensor is configured to read coded data on the print medium.

Optionally the mobile device includes a transmitter and a receiver, the transmitter being configured to transmit a message to a remote computer based on the read coded data, the receiver being configured to receive a reply from the remote computer indicative of whether the print medium can be printed on.

Optionally the mobile device further including drive means, the drive means being configured to:
- drive the print medium along the print path while the sensor reads the coded data;
- drive the print medium backwards along the print path into a printing commencement position; and
- drive the print medium along the print path while the printer prints onto the print medium.

Optionally the sensor senses the coded data as the print medium is being printed, the mobile device being configured to extract a clock signal from the coded data and to use the clock signal to synchronize printing onto the print medium.

Optionally the sensor senses at least some of the coded data upon initial insertion of the print medium, the mobile device being configured to determine from the sensed coded data an orientation of the print medium and prevent printing in the event the print medium is not inserted correctly.

Optionally the mobile device is configured to output an indication to a user in the event the print medium is inserted incorrectly.

Optionally the print medium including a linear-encoded data track extending in an intended direction of printing, the mobile device including:
- a sensor configured to sense the data track during printing;
- a printhead for printing onto the print medium in response to a fire control signal; and
- fire control means connected to generate the fire control signal based on the sensed data track.

Optionally the mobile device further including a light-emitting device for illuminating the data track while the sensor is sensing it during printing.

Optionally photosensor is sensitive in the infrared spectrum.

Optionally the data track is a clock track containing only a clock code, the fire control means being configured to generate the fire control signal in the form of a clock signal generated from the sensed data track.

Optionally the data track includes first information, the first information including an embedded clock signal, the fire control means being configured to generate the fire control signal in the form of a clock signal extracted from the sensed data track.

Optionally the first information is indicative of at least one physical characteristic of the print medium, the mobile device being configured to control operation of the printhead at least partially on the basis of at least one of the physical characteristics.

Optionally the mobile device configured to use the sensed data track to determine an absolute position of the print medium with respect to the printhead, and to print onto the print medium in reliance on the determination.

Optionally the data track further encoding first information and the print medium further including second coded data that encodes second information, the first information being indicative of the second information.

In a first aspect the present invention provides a method of using a mobile device to authenticate a print medium before completing printing onto the print medium, the mobile device including processing means, a printhead and a sensor, the print medium comprising a substrate, the method comprising the steps of:
- using the sensor to sense coded data provided on a surface of the substrate;
- using the processing means to interpret the coded data to authenticate the print medium; and
- in the event the authentication step is successful, using the printhead to print onto the print medium.

Optionally the step of using the processor means to interpret the coded data further comprises:
- determining, from the sensed coded data:
  - an identity of the print medium;
  - a plurality of signature fragments, the signature being a digital signature of at least part of the identity;
- determining, using the plurality of signature fragments, a determined signature;
- generating, using the determined signature and a key, a generated identity;
- comparing the identity to the generated identity; and authenticating the print medium using the results of the comparison.

Optionally the coded data includes a plurality of coded data portions, each coded data portion encoding:
- the identity; and,
- at least a signature fragment;
- wherein the method includes sensing a plurality of coded data portions to thereby determine the plurality of signature fragments.

Optionally the plurality of coded data portions are sensed as the print medium moves past the sensor whilst moving along a print path defined in the mobile device.

Optionally each coded data portion encodes a signature fragment identity, and wherein the method includes:
- determining the signature fragment identity of each determined signaturefragment; and
- determining, using the determined signature fragment identities, the determined signature.

Optionally the coded data includes a plurality of layouts, each layout defining the position of a plurality of first symbols encoding the identity, and a plurality of second symbols defining at least one signature fragment.

Optionally the coded data includes a plurality of tags, each coded data portion being formed from at least one of the tags.

Optionally the coded data is printed on the surface using at least one of an invisible ink and an infrared-absorptive ink, and wherein the method includes, sensing the coded data using an infrared sensor.

Optionally the plurality of signature fragments are indicative of the entire signature.

Optionally the mobile device includes a transmitter and a receiver, the method comprising the steps of:
- using the transmitter to send a first message to a remote computer system, the first message being indicative of the identity;
- using the receiver to receive a second message from the remote computer system, the second message including data indicative of at least one of:
  - padding associated with the signature;
  - a private key; and
  - a public key; and generating, using the determined signature and the data, private key or public key, the generated identity.

Optionally the signature is a digital signature of at least part of the identity and at least part of predetermined padding, and wherein the method includes:
- determining, using the identity, the predetermined padding; and,
- generating, using the predetermined padding and the determined signature, the generated identity.

Optionally the sensed coded data is further indicative of at least one of:
- a location of at least one of the data portions;
- a position of at least one of the data portions on the print medium;
- a size of the data portions;
- a size of the signature;
- a size of the signature fragment;
- an identity of a signature fragment;
- units of indicated locations;
- redundant data;
- data allowing error correction;
- Reed-Solomon data; and
- Cyclic Redundancy Check (CRC) data.

Optionally the digital signature includes at least one of:
- a random number associated with the identity;
- a keyed hash of at least the identity;

a keyed hash of at least the identity produced using a private key, and verifiable using a corresponding public key;

cipher-text produced by encrypting at least the identity;

cipher-text produced by encrypting at least the identity and a random number; and, cipher-text produced using a private key, and verifiable using a corresponding public key.

Optionally the identity includes an identity of at least one of:

the print medium; and a region of the print medium.

Optionally the coded data includes a number of coded data portions, each coded data portion encoding:

an identity; and at least part of a signature, the signature being a digital signature of at least part of the identity.

Optionally the method further including the step of commencing printing prior to determining whether the authentication step is successful, and halting printing in the event authentication is not successful.

In a further aspect there is provided a method of using a mobile device to authenticate a print medium before completing printing onto the print medium, the mobile device including processing means, a printhead, a transmitter, a receiver and a sensor, the print medium comprising a substrate, the method comprising the steps of:

using the sensor to sense coded data provided on a surface of the substrate;

using the processing means to determine from the sensed coded data, an identity of the print medium;

using the transmitter to send a first message to a remote computer system, the first message being indicative of the identity;

using the receiver to receive a second message from the remote computer system, the second message being including data indicative of whether the identity is associated with a print medium that can be printed upon; and using the printhead to print onto the print medium in reliance on the data.

Optionally the print medium includes an orientation indicator, the method including the steps of:

sensing the orientation indicator prior to sensing the coded data; and preventing printing in the event the medium is inserted incorrectly.

Optionally the method including the step, in the event the medium is inserted incorrectly, of providing an indication to a user of the mobile device that the orientation of the medium needs to changed.

Optionally the substrate is a laminar substrate.

In a first aspect the present invention provides a method of using a mobile device to authenticate a print medium online before completing printing onto the print medium, the mobile device including processing means, a printhead, a sensor, a transmitter and a receiver, the print medium comprising a laminar substrate, the method comprising the steps of:

using the sensor to sense coded data provided on a surface of the substrate;

using the processing means to determine, from the sensed coded data:

an identity of the print medium; and at least part of a signature, the signature being a digital signature of at least part of the identity;

using the transmitter to send first data to a remote computer system, the first data being indicative of the identity and the at least part of the signature;

using the receiver to receive second data from the remote computer system in reply to the first data, the second data being indicative of whether the print medium is authentic based on the identity and the at least part of the signature; and in the event the print medium is authentic, using the printhead to print onto the print medium.

Optionally the coded data includes a plurality of coded data portions, each coded data portion encoding:

the identity; and, at least a signature fragment;

wherein the method includes sensing a plurality of coded data portions to thereby determine a plurality of signature fragments representing the at least part of the signature.

Optionally plurality of coded data portions are sensed as the print medium moves past the sensor whilst moving along a print path defined in the mobile device.

Optionally each coded data portion encodes a signature fragment identity, and wherein the method includes:

determining the signature fragment identity of each determined signature fragment; and determining, using the determined signature fragment identities and the corresponding signature fragments, the at least part of the signature.

Optionally the plurality of signature fragments are indicative of the entire signature.

Optionally the coded data includes a plurality of tags, each coded data portion being formed from at least one of the tags.

Optionally the second data is further indicative of at least one of:

padding associated with the signature;

a private key; and a public key.

Optionally the sensed coded data is further indicative of at least one of:

a location of at least one of the data portions;

a position of at least one of the data portions on the print medium;

a size of at least one of the data portions;

a size of the signature;

a size of the signature fragment;

an identity of the signature fragment;

units of indicated locations;

redundant data;

data allowing error correction;

Reed-Solomon data; and

Cyclic Redundancy Check (CRC) data.

Optionally the digital signature includes at least one of:

a random number associated with the identity;

a keyed hash of at least the identity;

a keyed hash of at least the identity produced using a private key, and verifiable using a corresponding public key;

cipher-text produced by encrypting at least the identity;

cipher-text produced by encrypting at least the identity and a random number; and, cipher-text produced using a private key, and verifiable using a corresponding public key.

Optionally the identity includes an identity of at least one of:

the print medium; and a region of the print medium.

Optionally the coded data includes a number of coded data portions, each coded data portion encoding:
the identity; and,
at least part of a signature, the signature being a digital signature of at least part of the identity.

Optionally the method further including the step of commencing printing prior to determining whether the authentication step is successful, and halting printing in the event authentication is not successful.

Optionally the print medium includes an orientation indicator, the method including the steps of:
sensing the orientation indicator prior to sensing the coded data; and
preventing printing in the event the medium is inserted incorrectly.

Optionally the method further including the step, in the event the medium is inserted incorrectly, of providing an indication to a user of the mobile device that the orientation of the medium needs to changed.

Optionally the coded data is printed on the surface using at least one of an invisible ink and an infrared-absorptive ink, and wherein the method includes, sensing the coded data using an infrared sensor.

Optionally the print medium includes at least one longitudinally extending data track, the method comprising deriving a clock signal from the data track as the print medium is being printed and using the clock signal to synchronize the printing onto the print medium.

Optionally the data track further includes first information, the first information being indicative of the identity.

Optionally the data track is linear encoded.

Optionally the clock signal is embedded in data encoded in the data track, the method including extracting the clock signal from the data track.

Optionally the coded data is printed on the surface using at least one of an invisible ink and an infrared-absorptive ink, and wherein the method includes, sensing the coded data using an infrared sensor.

In a first aspect the present invention provides a method of using a mobile device to authenticate a print medium offline before completing printing onto the print medium, the mobile device including processing means, a printhead and a sensor, the print medium comprising a laminar substrate, the method comprising the steps of:
using the sensor to sense coded data provided on a surface of the substrate;
using the processing means:
determining, from the sensed coded data:
an identity of the print medium; and
at least part of a signature, the signature being a digital signature of at least part of the identity;
determining, using the at least part of the signature, a determined signature;
generating, using the determined signature and a public key stored in the mobile device, a generated identity;
comparing the identity to the generated identity; and
authenticating the print medium using the results of the comparison; and
in the event the authentication step is successful, using the printhead to print onto the print medium.

Optionally the mobile device includes a receiver, the method comprising the steps, performed before the step of generating the generated identity, of:
using the receiver to receive data indicative of the public key; and
storing the public key in memory of the mobile device.

Optionally the mobile device includes a transmitter, the method comprising the step of transmitting to a remote computer system a request for the public key, the receiver receiving the data indicative of the public key from the computer system in response to the request.

Optionally the method further including the step of retrieving the key from a remote computer system prior to generating the generated identity.

Optionally the coded data includes a plurality of fragments of the signature, the method comprising determining a plurality of the signature fragments from the sensed coded data.

Optionally the coded data includes a plurality of coded data portions, each coded data portion encoding:
the identity; and
at least a signature fragment;
wherein the method includes sensing a plurality of coded data portions to thereby determine the plurality of signature fragments.

Optionally the plurality of coded data portions are sensed as the print medium moves past the sensor whilst moving along a print path defined in the mobile device.

Optionally each coded data portion encodes a signature fragment identity, and wherein the method includes:
determining the signature fragment identity of each determined signature fragment; and
determining, using the determined signature fragment identities, the determined signature.

Optionally each coded data portion being formed from at least one of the tags.

Optionally the plurality of signature fragments are indicative of the entire signature.

Optionally the signature is a digital signature of at least part of the identity and at least part of predetermined padding, and wherein the method includes:
determining, using the identity, the predetermined padding; and,
generating, using the predetermined padding and the determined signature, the generated identity.

Optionally the mobile device includes a transmitter and a receiver, the method comprising the steps of:
using the transmitter to send a first message to a remote computer system, the first message being indicative of the identity;
using the receiver to receive a second message from the remote computer system, the second message being including data indicative of padding associated with the signature; and
generating, using the determined signature and the padding, the generated identity.

Optionally the coded data is further indicative of at least one of:
a location of at least one of the data portions;
a position of at least one of the data portions on the print medium;
a size of at least one of the data portions;
a size of the signature;
a size of the signature fragment;
an identity of the signature fragment;
units of indicated locations;
redundant data;
data allowing error correction;
Reed-Solomon data; and
Cyclic Redundancy Check (CRC) data.

Optionally the digital signature includes at least one of:
a random number associated with the identity;
a keyed hash of at least the identity;

a keyed hash of at least the identity produced using a private key, and verifiable using a corresponding public key;

cipher-text produced by encrypting at least the identity;

cipher-text produced by encrypting at least the identity and a random number; and, cipher-text produced using a private key, and verifiable using a corresponding public key.

Optionally the identity includes an identity of at least one of:

the print medium; and a region of the print medium.

Optionally the coded data includes a number of coded data portions, each coded data portion encoding:

an identity; and, at least part of a signature, the signature being a digital signature of at least part of the identity.

Optionally the method further including the step of commencing printing prior to determining whether the authentication step is successful, and halting printing in the event authentication is not successful.

Optionally the print medium includes an orientation indicator, the method including the steps of:

sensing the orientation indicator prior to sensing the coded data; and preventing printing in the event the medium is inserted incorrectly.

Optionally the coded data is printed on the surface using at least one of an invisible ink and an infrared-absorptive ink, and wherein the method includes, sensing the coded data using an infrared sensor.

In a first aspect the present invention provides method of using a mobile device to authenticate a printed token and output an image associated with the token, the mobile device comprising a sensor and processing means, the method comprising the steps of:

using the sensor to sense coded data on the printed token;

using the processing means to determine, from the sensed coded data, at least an identity of the token;

authenticating the token using the identity;

based on at least the identity, determining an image associated with the token; and outputting the image from the mobile device in a visible form.

Optionally the mobile device includes a display and the outputting step includes displaying the image on the display.

Optionally the mobile device includes a printhead and the outputting step includes printing the image onto a print medium with the printhead.

Optionally mobile device includes a transmitter and a receiver, the step of determining the image associated with the token comprising:

sending first data to a remote computer system using the transmitter, the first data being indicative of at least the identity; and receiving second data from the computer system via the receiver, the second data being indicative of the image.

Optionally the mobile device includes a transmitter and a receiver, the method comprising:

using the processing means to determine, from the sensed coded data, at least part of a signature, the signature being a digital signature of at least part of the identity;

using the transmitter to send first data to a remote computer system, the first data being indicative of the identity and the at least part of the signature;

using the receiver to receive second data from the remote computer system in reply to the first data, the second data being indicative of whether the print medium is authentic based on the identity and the at least part of the signature.

Optionally the coded data includes a plurality of coded data portions, each coded data portion encoding:

the identity; and, at least a signature fragment;

wherein the method includes sensing a plurality of coded data portions thereby to determine a plurality of signature fragments representing the at least part of the signature.

Optionally the method comprising sensing the plurality of coded data portions as the print medium moves past the sensor whilst moving along a print path defined in the mobile device.

Optionally each coded data portion encodes a signature fragment identity, and wherein the method includes:

determining the signature fragment identity of each determined signature fragment; and determining, using the determined signature fragment identities and the corresponding signature fragments, the at least part of the signature.

Optionally the plurality of signature fragments are indicative of the entire signature.

Optionally the coded data includes a plurality of tags, each coded data portion being formed from at least one of the tags.

Optionally the second data is further indicative of at least one of:

padding associated with the signature;

a private key; and a public key.

Optionally the method further comprising:

using the processing means to determine, from the sensed coded data, at least part of a signature, the signature being a digital signature of at least part of the identity;

determining, using the at least part of the signature, a determined signature;

generating, using the determined signature and a public key stored in the mobile device, a generated identity;

comparing the identity to the generated identity; and authenticating the print medium using the results of the comparison.

Optionally the mobile device includes a receiver, the method comprising the steps, performed before the step of generating the generated identity, of:

using the receiver to receive data indicative of the public key; and storing the public key in memory of the mobile device.

Optionally the mobile device includes a transmitter, the method comprising the step of transmitting to a remote computer system a request for the public key, the receiver receiving the data indicative of the public key from the computer system in response to the request.

Optionally the method further including the step of retrieving the key from a remote computer system prior to generating the generated identity.

Optionally the method the coded data includes a plurality of fragments of the signature, the method comprising determining a plurality of the signature fragments from the sensed coded data.

Optionally the coded data includes a plurality of coded data portions, each coded data portion encoding:

the identity; and at least a signature fragment;

wherein the method includes sensing a plurality of coded data portions to thereby determine the plurality of signature fragments.

Optionally the plurality of coded data portions are sensed as the print medium moves past the sensor whilst moving along a print path defined in the mobile device.

Optionally each coded data portion encodes a signature fragment identity, and wherein the method includes:
- determining the signature fragment identity of each determined signature fragment; and
- determining, using the determined signature fragment identities, the determined signature.

Optionally the print medium includes second coded data, the method comprising the step of printing the image onto the print medium, such that the print medium becomes a further token associated with the image.

In a first aspect the present invention provides a mobile device including:
- a printer for printing onto a print medium; and
- a stylus having a printhead tip for allowing a user to use the mobile device as a writing or drawing device;
- the stylus and the printer sharing at least one common ink reservoir.

Optionally the stylus is supplied ink from the at least one common reservoir via at least one ink supply conduit.

Optionally the at least one ink supply conduit is flexible.

Optionally the at least one supply conduit includes power and data connections for the printhead chip.

Optionally the mobile device further including a stylus retraction mechanism.

Optionally the conduit include a flexible PCB carrying the power and data connections, the flexible PCB forming one wall of at least one ink supply tube.

Optionally the conduit comprises a plurality of the ink supply tubes.

Optionally the printer includes a replaceable cartridge, the cartridge including the at least one reservoir.

Optionally the cartridge includes a plurality of the ink reservoirs.

Optionally the cartridge includes a pagewidth printhead.

Optionally mobile device includes a cradle for receiving the cartridge, the cartridge includes a plurality of contacts for receiving power and data from corresponding complementary contacts in a cradle.

Optionally the stylus forming part of the cartridge.

Optionally the printhead tip includes an array of radially extending printhead nozzle rows.

Optionally the rows extend in a straight radial line from a central region of the printhead tip.

Optionally the rows curve outwardly from a central region of the printhead tip.

Optionally the stylus includes a pressure sensor for determining when the stylus is in contact with a surface, the stylus being configured to print only when in contact with the surface.

Optionally the pressure sensor is a switch.

Optionally the printer further includes a capping mechanism including a capper moveable between:
- a capping position in which the capper is urged into a capping relationship with the printhead; and
- an uncapped position in which the printhead is able to print onto the print medium, wherein in the uncapped position the capper is displaced away from the printhead;
- wherein the capper is moved between the capped and uncapped position by an edge of the print medium as it moves through the feed path.

Optionally in the capped position the capper is resiliently urged into the capping relationship.

Optionally the capping mechanism is configured such that the capper is displaced in the feed direction as it moves from the capped position to the uncapped position.

In a first aspect the present invention provides a mobile telecommunications device comprising:
- a first receiver for receiving signals from a mobile telephony system;
- a first transmitter for transmitting signals over the mobile telephony system; and
- a sylus allowing the user to use the mobile device as a writing or drawing device.

Incorporating a writing stylus or pen into the mobile device allows the user to write on the cards, fill out forms or otherwise mark documents that have been printed by the device or another printer.

Optionally a mobile telecommunications device further comprising:
- a first sensor device for sensing coded data and for outputting raw data based on said sensed data; and
- a transmitter controller operable to control the first transmitter to transmit output data based at least partially on said sensed data via the mobile telephony system to a computer system.

Optionally the first sensing device is positioned on the stylus.

Optionally the stylus has a printhead tip with an array of nozzles to effect the writing or drawing.

Optionally a mobile telecommunications device further comprising a printer mechanism with a pagewidth printhead for printing on a media substrate, the printhead positioned adjacent a media feed path through the device.

Optionally the printer mechanism is adapted to receive document data and to print an interface onto a surface, the interface being at least partially based on the document data, the document data including identity data indicative of at least one identity, the identity being associated with a region of the interface, the interface including coded data.

Optionally a mobile telecommunications device further comprising at least one ink reservoir wherein the printhead tip in the stylus and the printer mechanism share the at least one ink reservoir.

Optionally a mobile telecommunications device further comprising a second transmitter and a second receiver adapted to transmit data to and to receive data from one or more sensor devices, the sensor devices transmitting data.

Optionally a mobile telecommunications device further comprising a second transmitter and a second receiver adapted to transmit data to and to receive data from one or more sensor devices, the sensor devices transmitting data.

Optionally a mobile telecommunications device further comprising a transmitter controller adapted to cause the mobile telephone unit to transmit data based on the first data to a computer system via the first transmitter.

Optionally the printer mechanism further comprises a capper assembly movable between a capped position covering the nozzles and an uncapped position spaced from the nozzles; wherein,
- the capper assembly is held in the uncapped position by the media such that it moves to the capped position upon disengagement with the media.

Optionally the sheet of media substrate is encoded with the coded data and the print engine controller uses a sensor to determine the position of the sheet relative to the printhead.

Optionally a mobile telecommunications device further comprising a media feed roller for feeding the media past the printhead.

Optionally the media substrate is a sheet and the trailing edge of the sheet disengages from the media feed roller before it is printed and is projected past the printhead by its momentum.

Optionally the capper assembly lightly grips the sheet after it has been printed so that it partially extends from the mobile telecommunications device in readiness for manual collection.

Optionally the capper assembly moves out of the capped position and toward the uncapped position upon engagement with the leading edge of the sheet.

Optionally the printhead is incorporated into a cartridge that further comprises a print media feed path for directing the print media past the printhead in a feed direction during printing, and a drive mechanism for driving the print media past the printhead for printing.

Optionally the printhead has an array of ink ejection nozzles and is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally the mobile telecommunications device further comprising a drive shaft with a media engagement surface for feeding a media substrate along a feed path; and
 a media guide adjacent the drive shaft for biasing the media substrate against the media engagement surface.

Optionally a mobile telecommunications device further comprising:
 a drive shaft for feeding the sheet of media substrate past the printhead; wherein during use,
 the sheet disengages from the drive shaft before completion of its printing such that the trailing edge of the sheet projects past the printhead by momentum to complete its printing.

In a first aspect the present invention provides a mobile telecommunications device comprising:
 a first transmitter for transmitting signals over a mobile telephony system, and
  a first receiver for receiving signals from a mobile telephony system;
  a first monochrome image sensor device for sensing coded data and for outputting raw data based on said sensed data; and
  a transmitter controller operable to control the first transmitter to transmit output data based at least partially on said sensed data via the mobile telephony system to a computer system.

Optionally the mobile telecommunications device further comprising a stylus allowing the user to use the mobile telecommunications device as a writing or drawing device.

Optionally the first monochrome image sensor device is positioned on the stylus.

Optionally the stylus has a printhead tip with an array of nozzles to effect the writing or drawing.

Optionally the mobile telecommunications device further comprising a printer mechanism with a pagewidth printhead for printing on a media substrate, the printhead positioned adjacent a media feed path through the device.

Optionally the printer mechanism is adapted to receive document data and to print an interface onto a surface, the interface being at least partially based on the document data, the document data including identity data indicative of at least one identity, the identity being associated with a region of the interface, the interface including coded data.

Optionally the mobile telecommunications device further comprising at least one ink reservoir wherein the printhead tip in the stylus and the printer mechanism share the at least one ink reservoir.

Optionally the mobile telecommunications device further comprising a second transmitter and a second receiver adapted to transmit data to and to receive data from one or more monochrome image sensor devices, the sensor devices transmitting data.

Optionally the mobile telecommunications device further comprising a second transmitter and a second receiver adapted to transmit data to and to receive data from one or more monochrome image sensor devices, the sensor devices transmitting data.

Optionally the mobile telecommunications device further comprising a transmitter controller adapted to cause the mobile telephone unit to transmit data based on the first data to a computer system via the first transmitter.

Optionally the printer mechanism further comprises a capper assembly movable between a capped position covering the nozzles and an uncapped position spaced from the nozzles; wherein, the capper assembly is held in the uncapped position by the media such that it moves to the capped position upon disengagement with the media.

Optionally the sheet of media substrate is encoded with the coded data and the print engine controller uses a sensor to determine the position of the sheet relative to the printhead.

Optionally the mobile telecommunications device further comprising a media feed roller for feeding the media past the printhead.

Optionally the media substrate is a sheet and the trailing edge of the sheet disengages from the media feed roller before it is printed and is projected past the printhead by its momentum.

Optionally the capper assembly lightly grips the sheet after it has been printed so that it partially extends from the mobile telecommunications device in readiness for manual collection.

Optionally the capper assembly moves out of the capped position and toward the uncapped position upon engagement with the leading edge of the sheet.

Optionally the printhead is incorporated into a cartridge that further comprises a print media feed path for directing the print media past the printhead in a feed direction during printing, and a drive mechanism for driving the print media past the printhead for printing.

Optionally the printhead has an array of ink ejection nozzles and is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally the mobile telecommunications device further comprising a drive shaft with a media engagement surface for feeding a media substrate along a feed path; and,
 a media guide adjacent the drive shaft for biasing the media substrate against the media engagement surface.

Optionally the mobile telecommunications device further comprising:
a drive shaft for feeding the sheet of media substrate past the printhead; wherein during use,
the sheet disengages from the drive shaft before completion of its printing such that the trailing edge of the sheet projects past the printhead by momentum to complete its printing.

In a first aspect the present invention provides a mobile telecommunications device comprising:
- a first receiver for receiving signals from a mobile telephony system;
- a first transmitter for transmitting signals over the mobile telephony system; and
- a sylus allowing the user to use the mobile telecommunications device as a writing or drawing device.

Incorporating a writing stylus or pen into the phone or PDA allows the user to write on the cards, fill out forms or otherwise mark documents that have been printed by the device or another printer.

Optionally the mobile telecommunications device further comprising:
- a first sensor device for sensing coded data and for outputting raw data based on said sensed data; and
  - a transmitter controller operable to control the first transmitter to transmit output data based at least partially on said sensed data via the mobile telephony system to a computer system.

Optionally the first sensing device is positioned on the stylus.

Optionally the stylus has a printhead tip with an array of nozzles to effect the writing or drawing.

Optionally the mobile telecommunications device further comprising a printer mechanism with a pagewidth printhead for printing on a media substrate, the printhead positioned adjacent a media feed path through the device.

Optionally the printer mechanism is adapted to receive document data and to print an interface onto a surface, the interface being at least partially based on the document data, the document data including identity data indicative of at least one identity, the identity being associated with a region of the interface, the interface including coded data.

Optionally the mobile telecommunications device further comprising at least one ink reservoir wherein the printhead tip in the stylus and the printer mechanism share the at least one ink reservoir.

Optionally the mobile telecommunications device further comprising a second transmitter and a second receiver adapted to transmit data to and to receive data from one or more sensor devices, the sensor devices transmitting data.

Optionally the mobile telecommunications device further comprising a second transmitter and a second receiver adapted to transmit data to and to receive data from one or more sensor devices, the sensor devices transmitting data.

Optionally the mobile telecommunications device further comprising a transmitter controller adapted to cause the mobile telephone unit to transmit data based on the first data to a computer system via the first transmitter.

Optionally the printer mechanism further comprises a capper assembly movable between a capped position covering the nozzles and an uncapped position spaced from the nozzles; wherein,
the capper assembly is held in the uncapped position by the media such that it moves to the capped position upon disengagement with the media.

Optionally the sheet of media substrate is encoded with the coded data and the print engine controller uses a sensor to determine the position of the sheet relative to the printhead.

Optionally the mobile telecommunications device further comprising a media feed roller for feeding the media past the printhead.

Optionally the media substrate is a sheet and the trailing edge of the sheet disengages from the media feed roller before it is printed and is projected past the printhead by its momentum.

Optionally the capper assembly lightly grips the sheet after it has been printed so that it partially extends from the mobile telecommunications device in readiness for manual collection.

Optionally the capper assembly moves out of the capped position and toward the uncapped position upon engagement with the leading edge of the sheet.

Optionally the printhead is incorporated into a cartridge that further comprises a print media feed path for directing the print media past the printhead in a feed direction during printing, and a drive mechanism for driving the print media past the printhead for printing.

Optionally the printhead has an array of ink ejection nozzles and is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

Optionally the mobile telecommunications device further comprising a drive shaft with a media engagement surface for feeding a media substrate along a feed path; and,
a media guide adjacent the drive shaft for biasing the media substrate against the media engagement surface.

Optionally the mobile telecommunications device further comprising:
- a drive shaft for feeding the sheet of media substrate past the printhead; wherein during use,
- the sheet disengages from the drive shaft before completion of its printing such that the trailing edge of the sheet projects past the printhead by momentum to complete its printing.

In a first aspect there is provided a method of producing a printed business card using a mobile telecommunications device, the mobile telecommunications device including processing means, a mobile transceiver for communicating with a mobile telecommunications network, and a printhead, the method comprising the steps, performed in the mobile telecommunications device, of:
(a) determining a business card to print;
(b) providing dot data to the printhead based on the business card determined in step (a); and
(c) printing the dot data onto a print medium using the printhead, thereby to produce the printed business card.

Optionally mobile telecommunications device including a memory for storing information related to at least one business card, step (a) including accessing the information related to the at least one of the business cards stored in the memory.

Optionally the print medium includes pre-printed coded data and step (a) includes determining a relationship between coded data and the dot data, and step (c) includes printing the coded data in accordance with the determined relationship.

Optionally the method including the step of determining a position of the print medium relative to the printhead prior to commencing printing, thereby to enable the printing to be performed in accordance with the relationship.

Optionally the medium includes a linear-encoded data track extending in a direction of intended printing, the method comprising the steps of:
using a sensor in the mobile telecommunications device, sensing the data track during printing;
deriving a clock signal from the sensed data track; and
synchronizing the printing based on the clock signal.

Optionally the data track includes only a clock code.

Optionally the data track encodes first information, the clock code being embedded in the data track for extraction with the first information.

Optionally the data track includes parallel first and second tracks, the first track including a clock code and the second track encoding first information.

Optionally the print medium includes further coded data encoding second information, wherein the first information is indicative of the second information.

Optionally the further coded data is indicative of a plurality of reference points of the business card.

Optionally the further coded data is indicative of an identity of the print medium.

Optionally the coded data takes the form of a two-dimensional array of data, the sensor being configured to capture an image of a subset of the coded data, the subset of the coded data being sufficient to enable the location to be determined.

Optionally the processing means being configured to determine a position of the print medium relative to the sensor at the time the coded data was sensed, based at least partly on the determined location and a position of the captured coded data in a capture field of the sensor.

Optionally the mobile device further including a light emitting device, the method including the step of using the light emitting device to illuminate the print medium while the sensor senses the coded data.

Optionally the determining step includes retrieving, from a remote computer system and using the transceiver, information related to the business card.

Optionally the information includes personal information related to a user of the mobile telecommunications device.

Optionally the method further including a step of determining a registration between the printed dot data and pre-printed coded data on the print medium, and using the transceiver to send, to a remote computer system, data indicative of the registration.

Optionally the method further comprising determining the registration during printing.

Optionally the method further comprising determining the registration prior to printing.

In a first aspect the present invention provides a method of using a mobile device to print onto a print medium, the method comprising the steps of:
(a) determining print data;
(b) determining a first orientation of a print medium inserted into the mobile device; and
(c) modifying a second orientation of the print data prior to printing onto the print medium, to take into account the first orientation.

Optionally the print medium includes at least one orientation indicator and the mobile device includes at least one sensor, step (b) comprising using the sensor to sense the orientation indicator and determining the orientation of the print medium from the sensed orientation indicator.

Optionally the print medium including at least two of the orientation indicators, one on each alternate face of the print medium, the method comprising sensing one of the orientation indicators.

Optionally the method comprising the step, prior to step (b), of determining whether the orientation of the print medium is a valid orientation to be printed upon, and preventing printing in the event it is not.

Optionally the print data is intended to be printed on a predetermined one of the alternate faces of the print medium the method including preventing printing if the print medium is inserted upside down such that the predetermined one of the faces cannot be printed onto.

Optionally step (c) includes rotating the print data by 180 degrees to take into account the first orientation.

Optionally one of the at least one orientation indicators is positioned adjacent a first corner of the print medium.

Optionally another of the at least one orientation indicators is positioned adjacent a second corner of the print medium on the first face, the second corner being diagonally opposite the first corner.

Optionally at least one orientation indicator is printed in infrared ink.

Optionally the at least one orientation indicator is printed in infrared ink that is substantially invisible to an average unaided human eye.

Optionally the print medium further comprises first coded data encoding first information, the first information being indicative of a physical characteristic of the print medium.

Optionally the first information is indicative of a size of the print medium.

Optionally the first information is indicative of a media type associate with the print medium.

Optionally the first information is indicative of information pre-printed onto the print medium.

Optionally the first information is encoded into the coded data in accordance with a linear encoding scheme.

Optionally the first coded data takes the form of a data track.

Optionally the data track extends along an edge of the print medium.

Optionally the method includes at least two of the data tracks, each of which encodes the first information.

Optionally the method further including second coded data containing second information encoded in accordance with a second encoding scheme distinct from the linear encoding scheme, wherein the first information is indicative of the second information Terminology Mobile device: When used herein, the phrase "mobile device" is intended to cover all devices that by default operate on a portable power source such as a battery. As well as including the mobile telecommunications device defined above, mobile devices include devices such as cameras, non telecommunications-enabled PDAs and hand-held portable game units. "Mobile devices" implicitly includes "mobile telecommunications devices", unless the converse is clear from the context.

Mobile telecommunications device: When used herein, the phrase "mobile telecommunications device" is intended to cover all forms of device that enable voice, video, audio and/or data transmission and/or reception. Typical mobile telecommunications devices include:

GSM and 3G mobile phones (cellphones) of all generational and international versions, whether or not they incorporate data transmission capabilities; and PDAs incorporating wireless data communication protocols such as GPRS/EDGE of all generational and international versions.

M-Print: The assignee's internal reference for a mobile printer, typically incorporated in a mobile device or a mobile telecommunications device. Throughout the specification, any reference made to the M-Print printer is intended to broadly include the printing mechanism as well as the embedded software which controls the printer, and the reading mechanism(s) for the media coding.

M-Print mobile telecommunications device: a mobile telecommunications device incorporating a Memjet printer.

Netpage mobile telecommunications device: a mobile telecommunications device incorporating a Netpage-enabled Memjet printer and/or a Netpage pointer.

Throughout the specification, the blank side of the medium intended to be printed on by the M-Print printer is referred to as the front side. The other side of the medium, which may be pre-printed or blank, is referred to as the back side.

Throughout the specification, the dimension of the medium parallel to the transport direction is referred to as the longitudinal dimension. The orthogonal dimension is referred to as the lateral dimension.

Furthermore, where the medium is hereafter referred to as a card, it should be understood that this is not meant to imply anything specific about the construction of the card. It may be made of any suitable material including paper, plastic, metal, glass and so on. Likewise, any references to the card having been pre-printed, either with graphics or with the media coding itself, is not meant to imply a particular printing process or even printing per se. The graphics and/or media coding can be disposed on or in the card by any suitable means.

BRIEF DESCRIPTION OF THE DRAWINGS

Preferred embodiments of the invention will now be described by way of example only, with reference to the accompanying drawings, in which:

FIGS. 111, 112 and 113 are front, side and plans views respectively of the assembly shown in FIG. 110;

FIG. 133 shows the ordering of the bits within the symbol;

FIG. 134 shows a single Netpage tag with every bit set;

FIG. 135 shows a tag group of four tags;

FIG. 136 shows the tag groups repeated in a continuous tile pattern;

FIG. 137 shows the contiguous tile pattern of tag groups, each with four different tag types;

FIG. 138 is an architectural overview of a Netpage enabled mobile phone within the broader Netpage system;

FIG. 139 shows an architectural overview of the mobile phone microserver as a relay between the stylus and the Netpage server;

FIG. 140 is a perspective of a Netpage enabled mobile phone with the rear moulding removed;

FIG. 141 is a partial enlarged perspective of the phone shown in FIG. 140 with the Netpage clicker partially sectioned;

FIG. 142 is a system level diagram of the Jupiter monolithic integrated circuit;

FIG. 143 is a simplified circuit diagram of the Ganymede image sensor and analogue to digital converter;

FIG. 144 shows the basic configuration of a two dimensional tag sensor;

Figure 145:
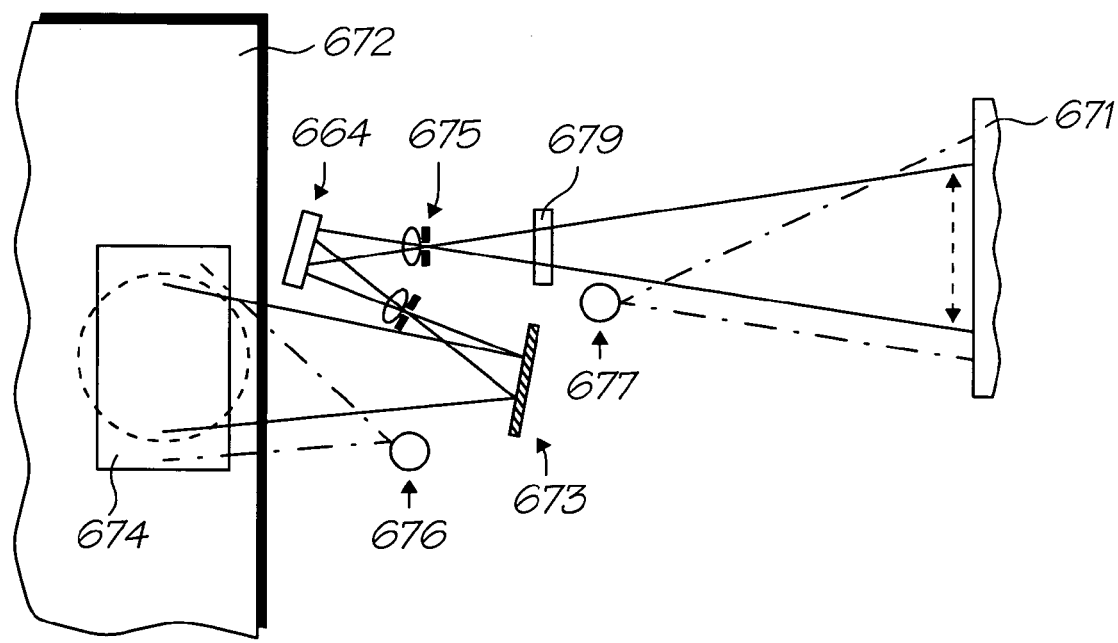
Figure 146:
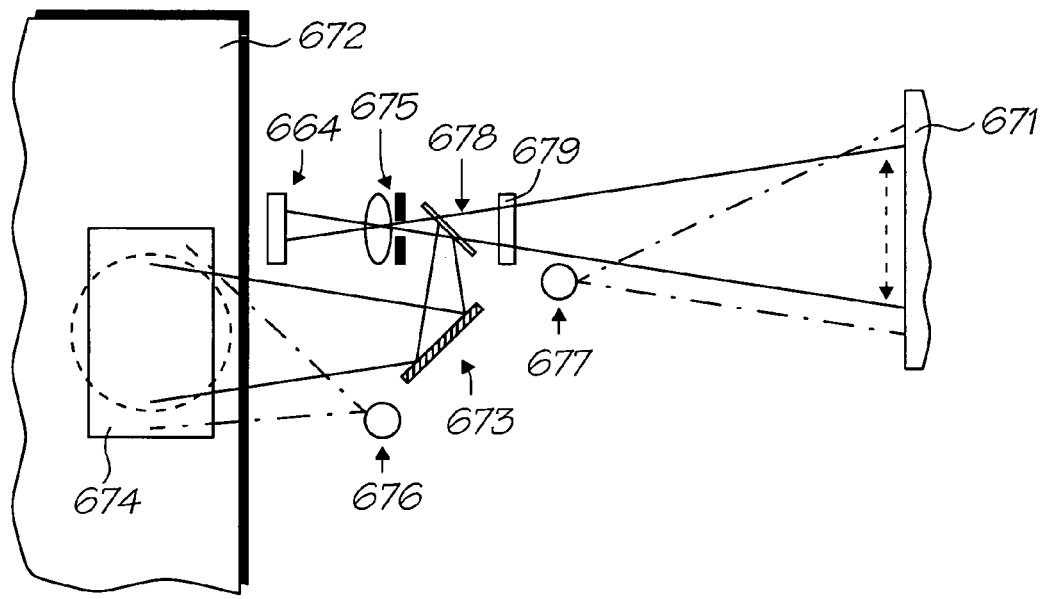
Figure 147:
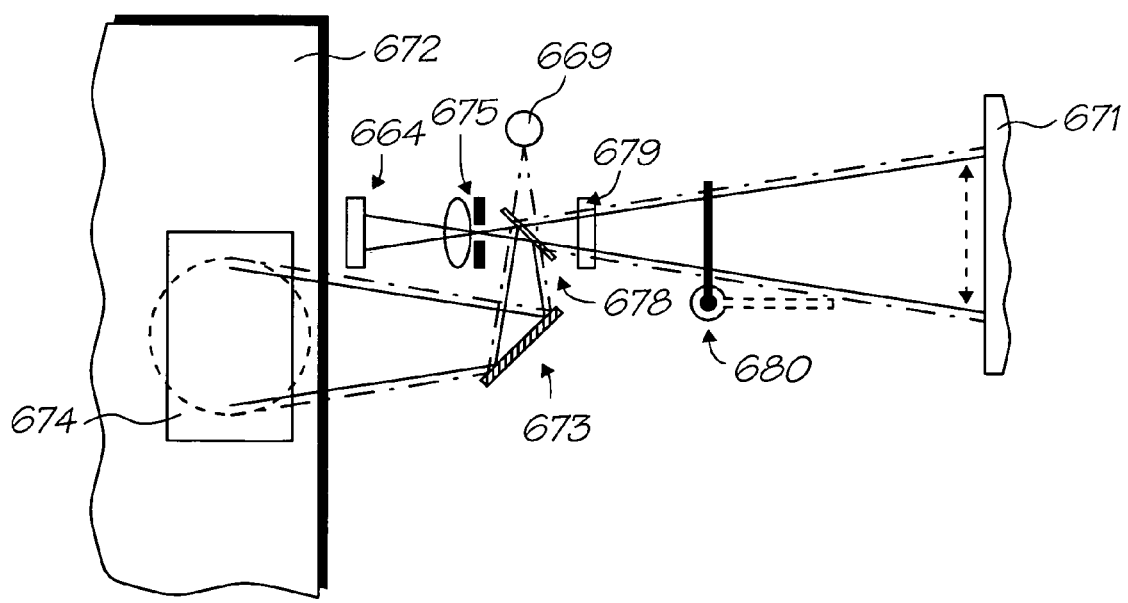
Figure 148:
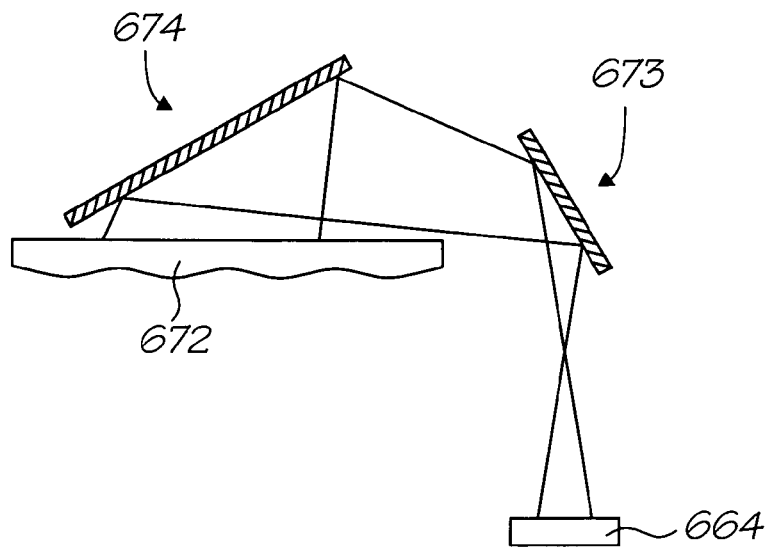
Figure 149:
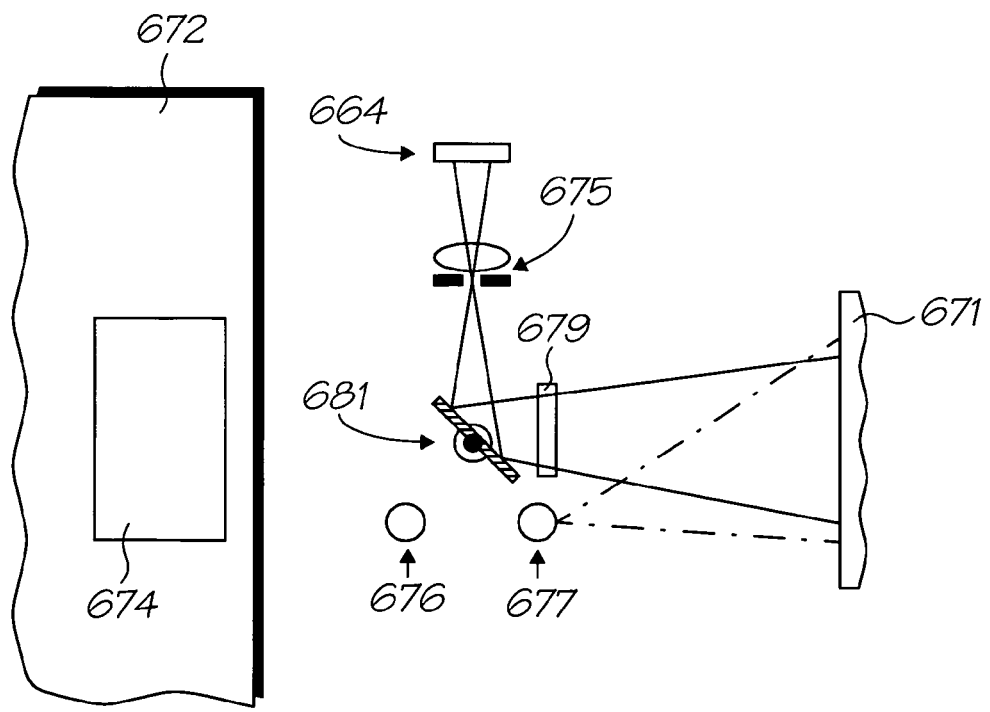
Figure 150:
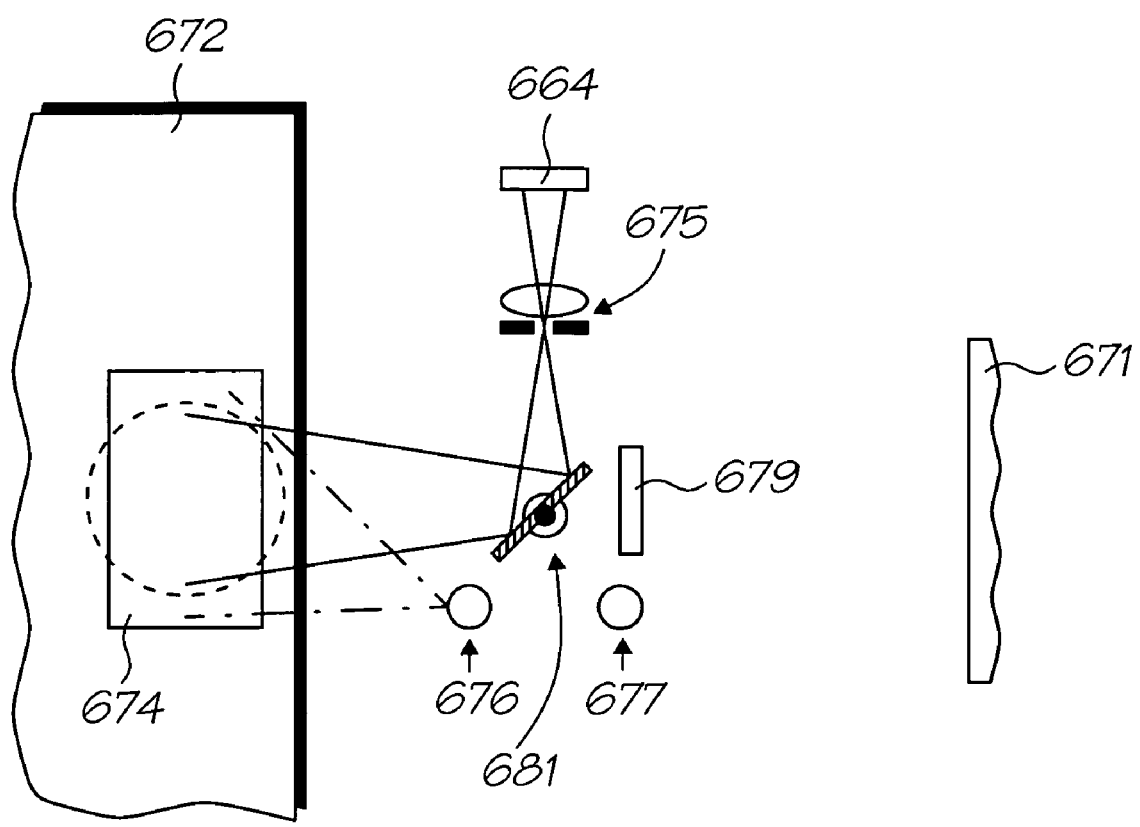
Figure 151:
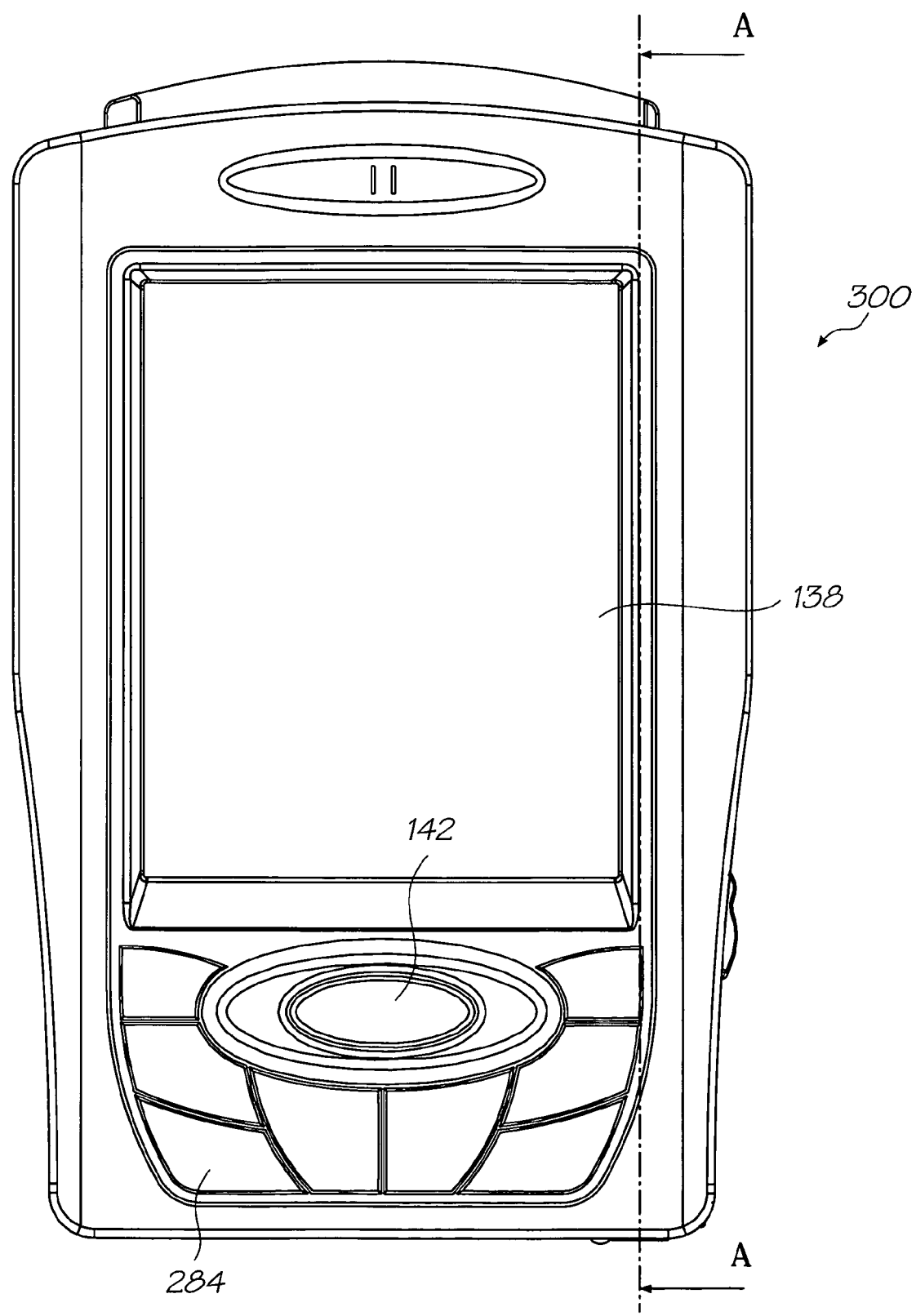
Figure 152:
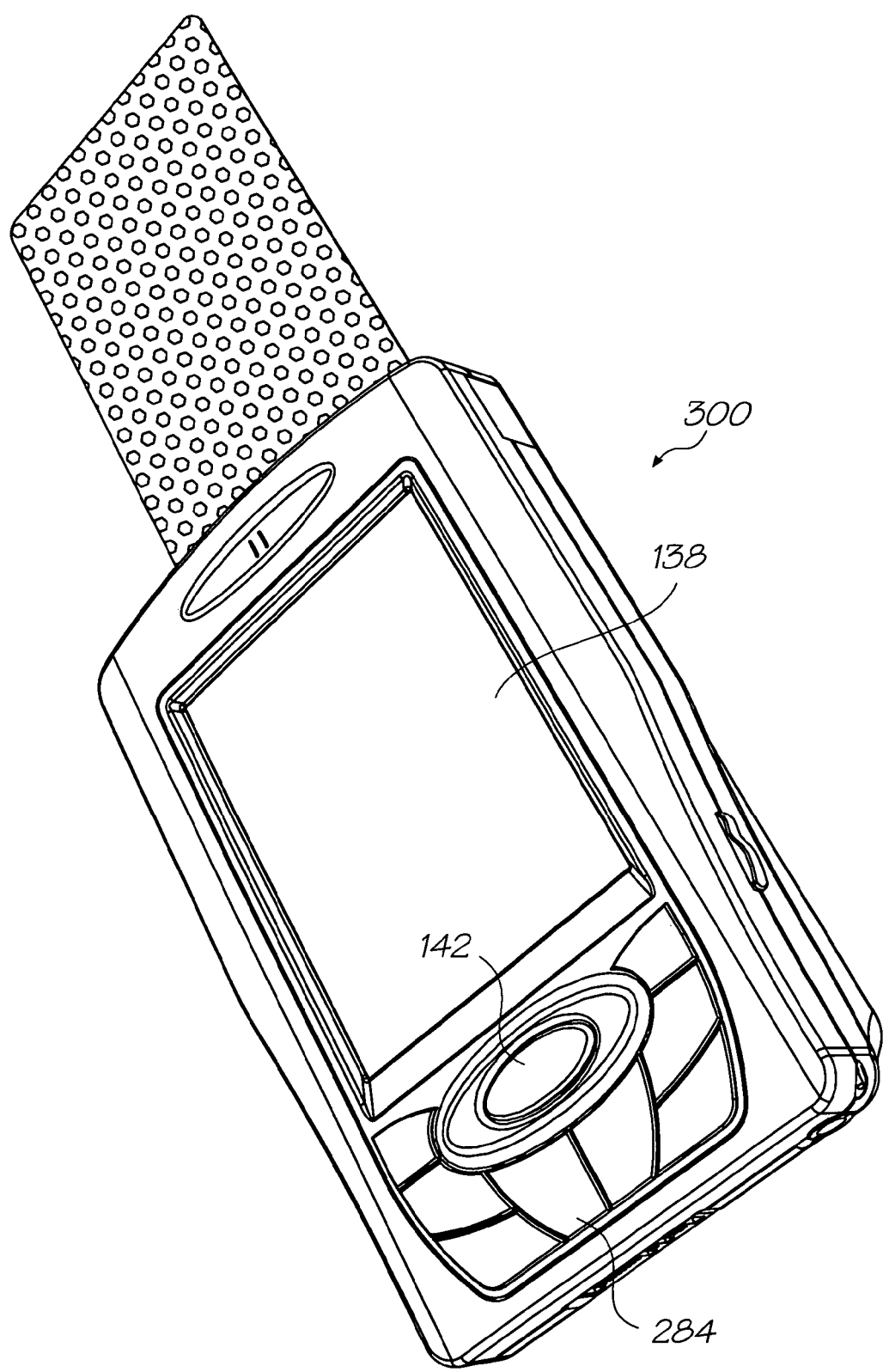
Figure 153:
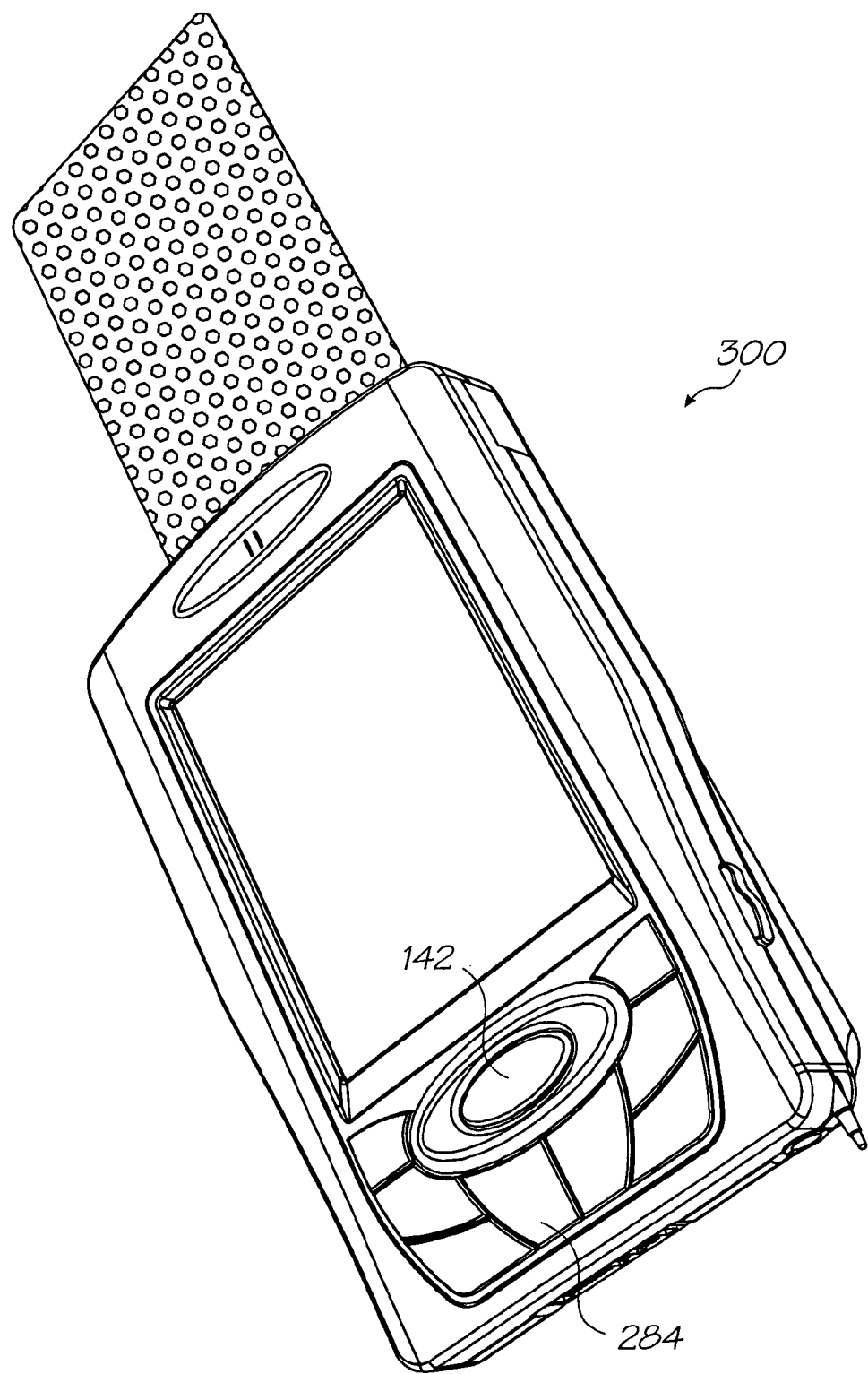
Figure 154:
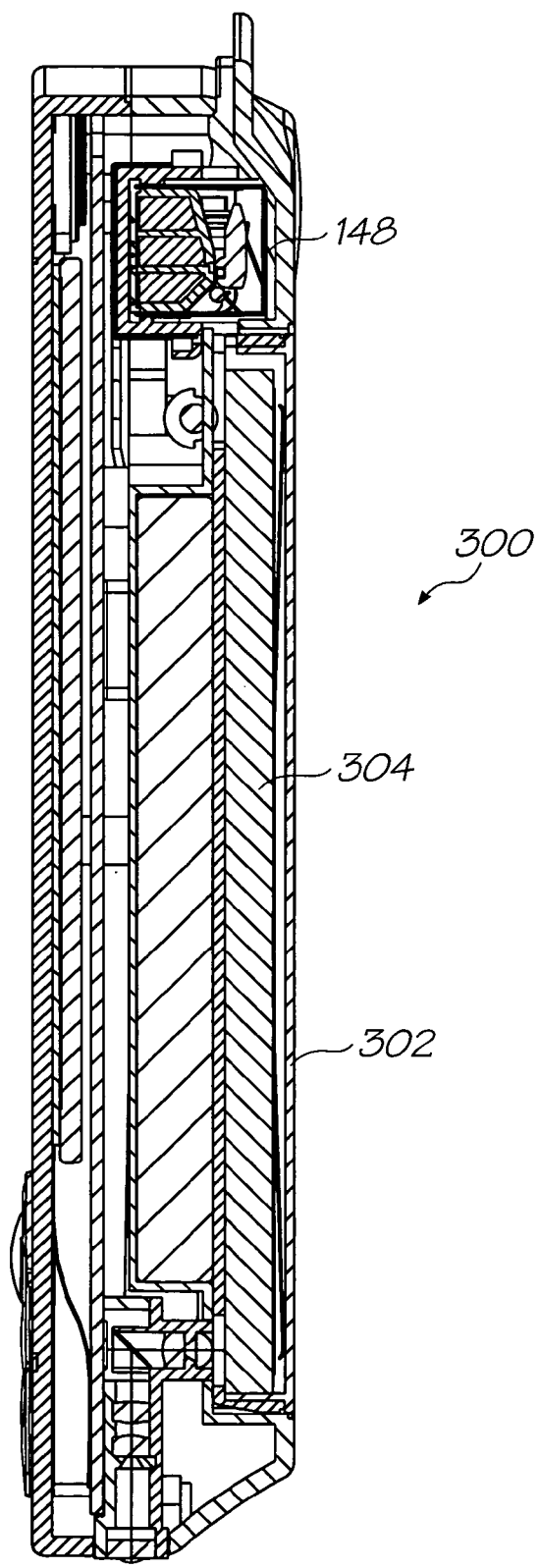
Figure 155:
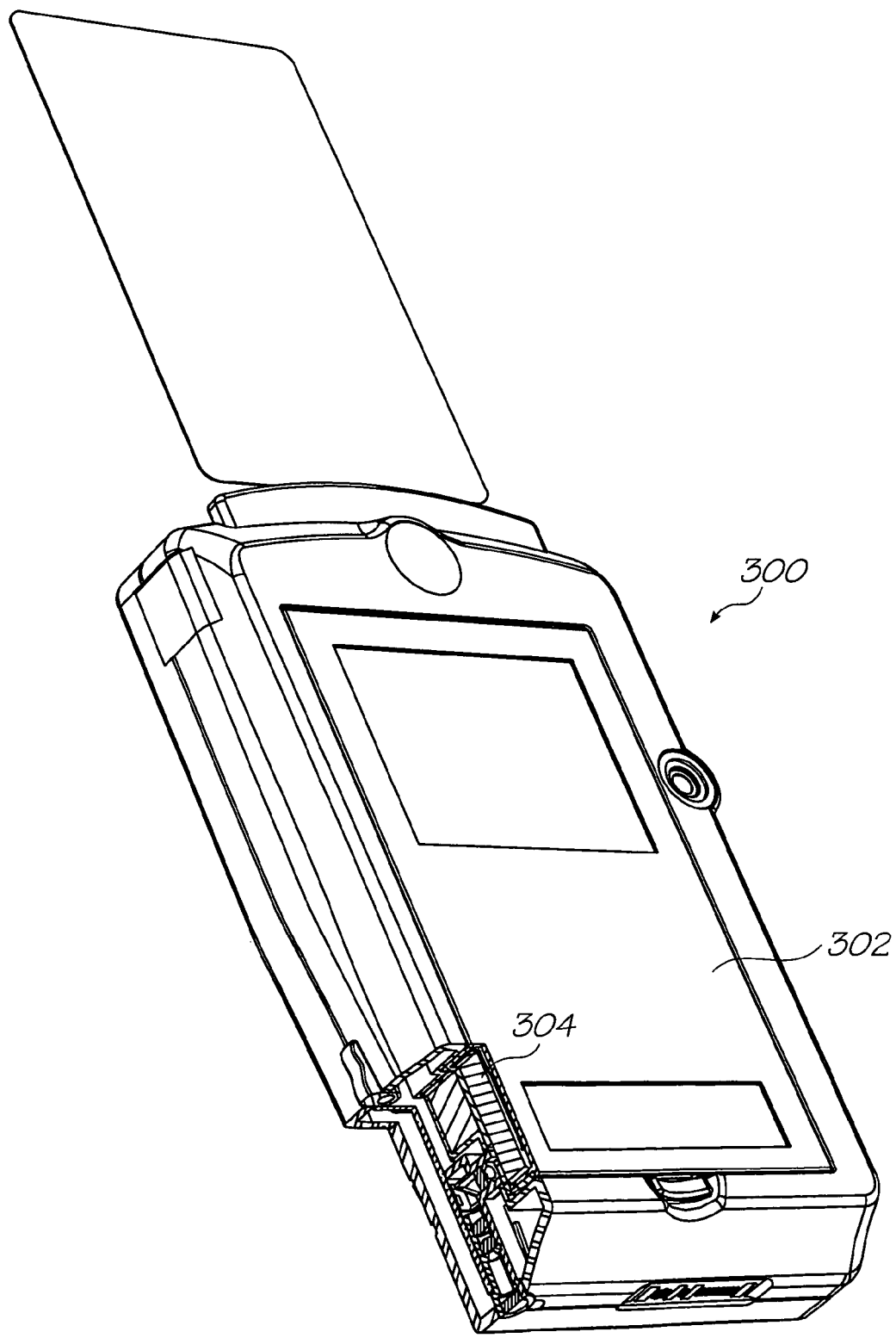
Figure 156:
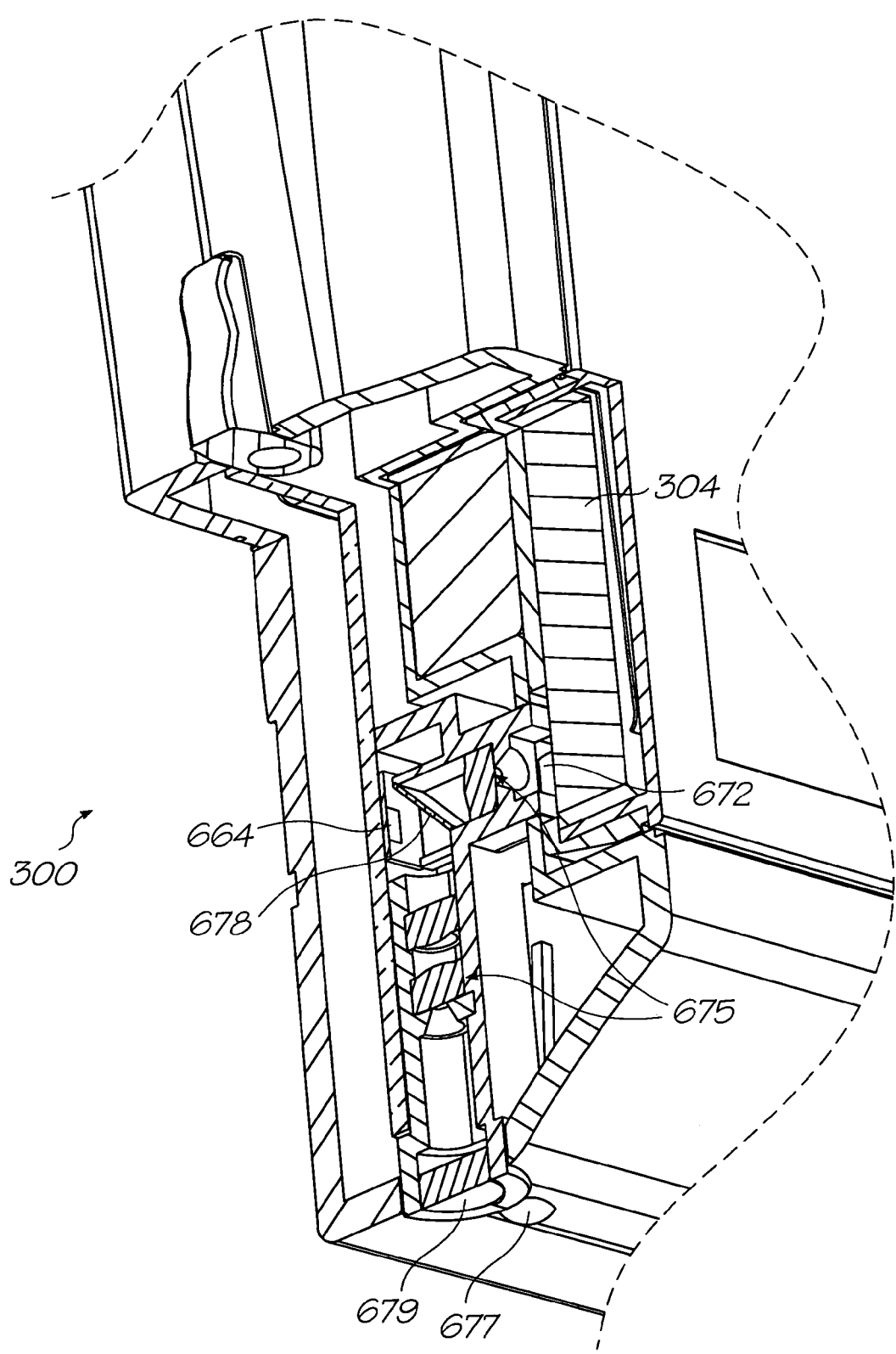
Figure 157:
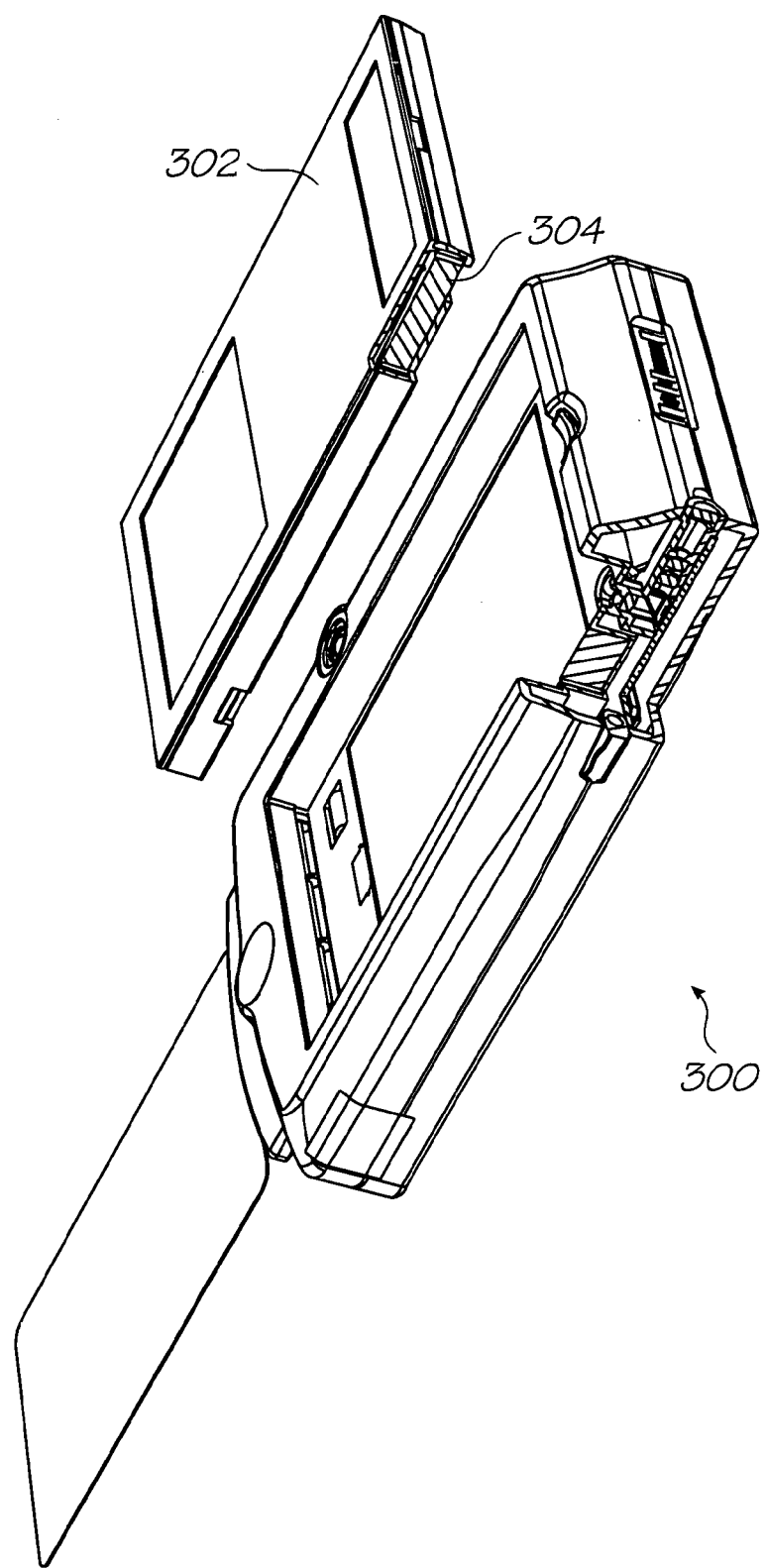
Figure 158:
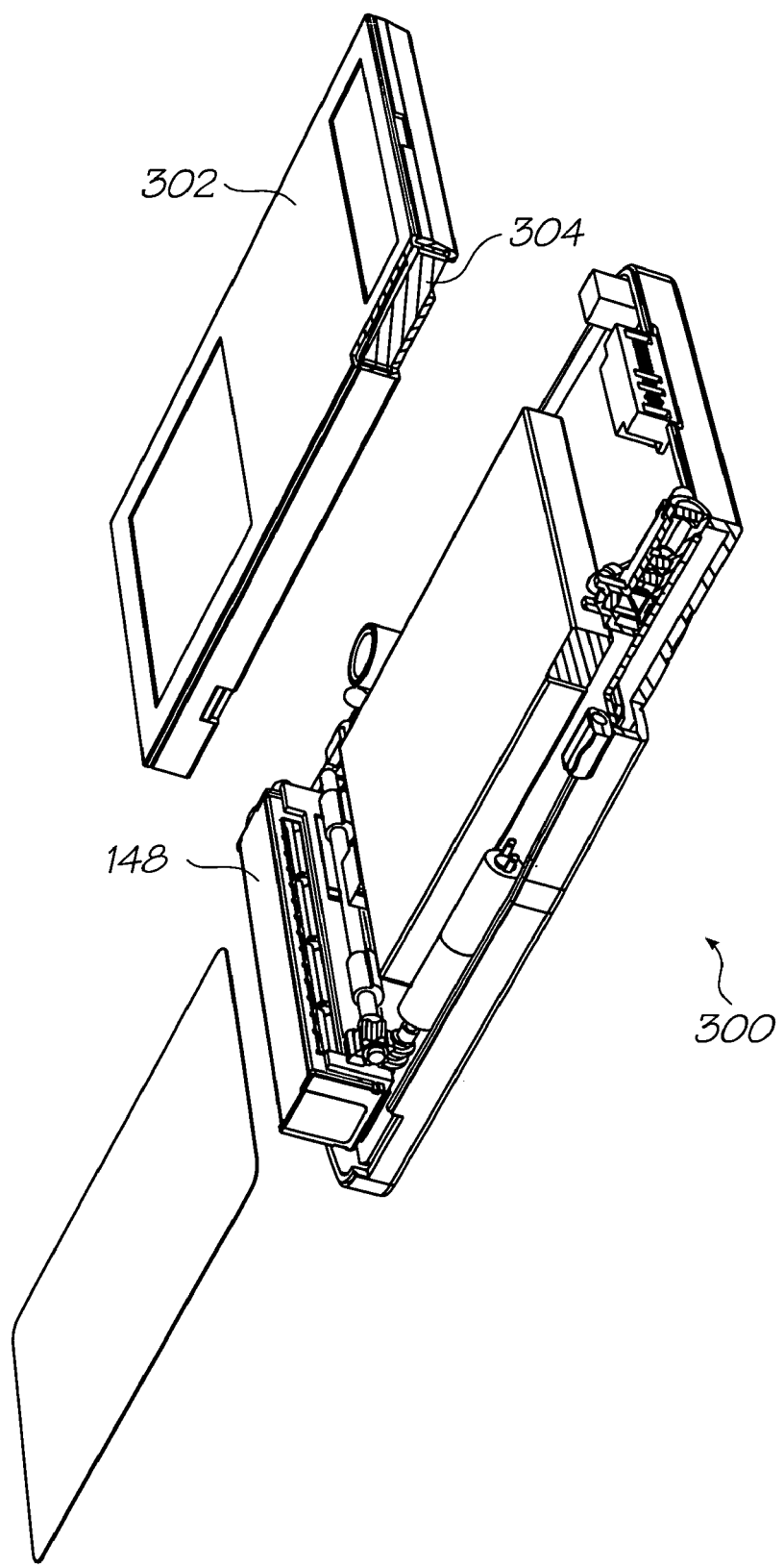
Figure 159:
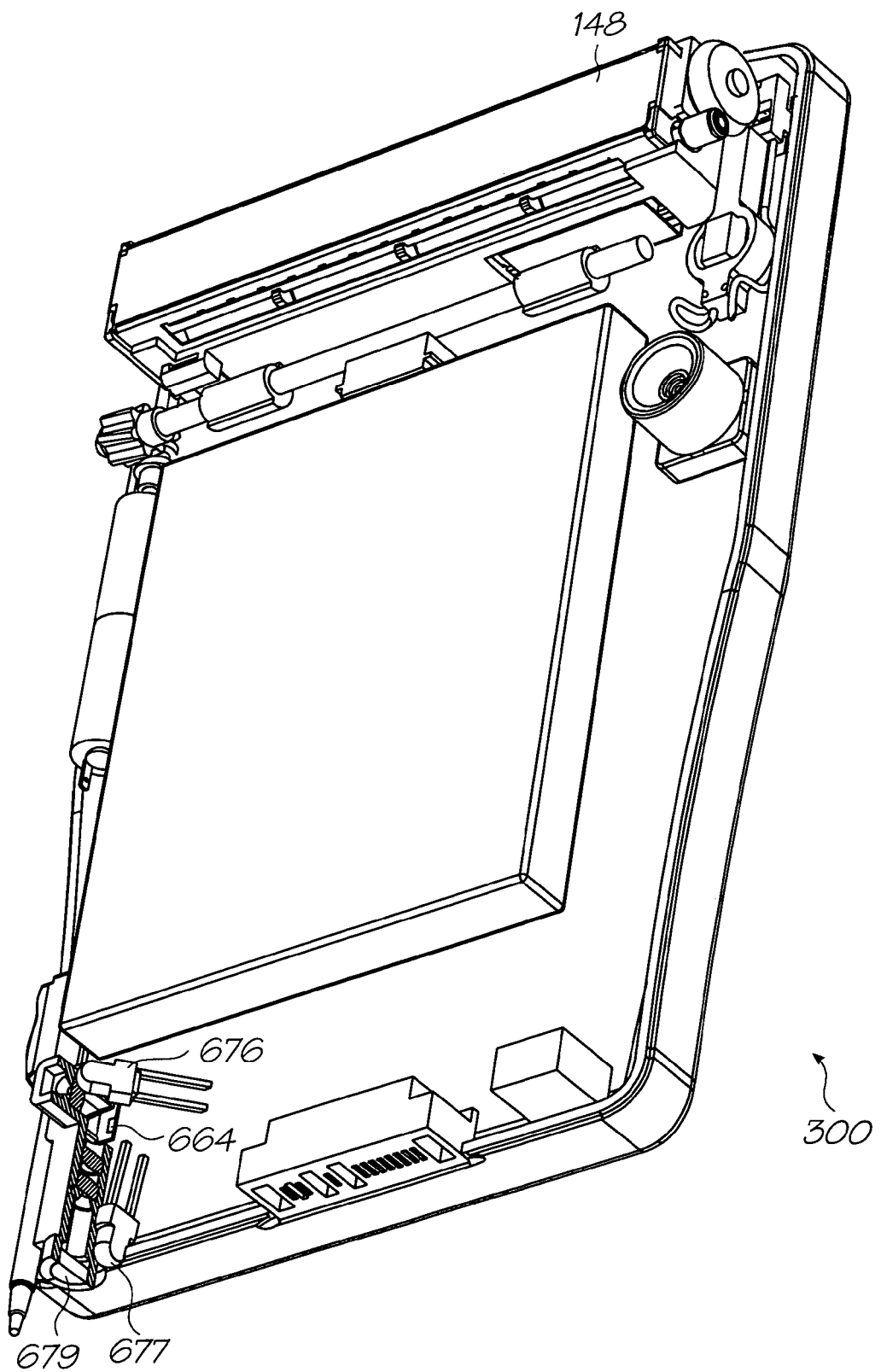
Figure 160:
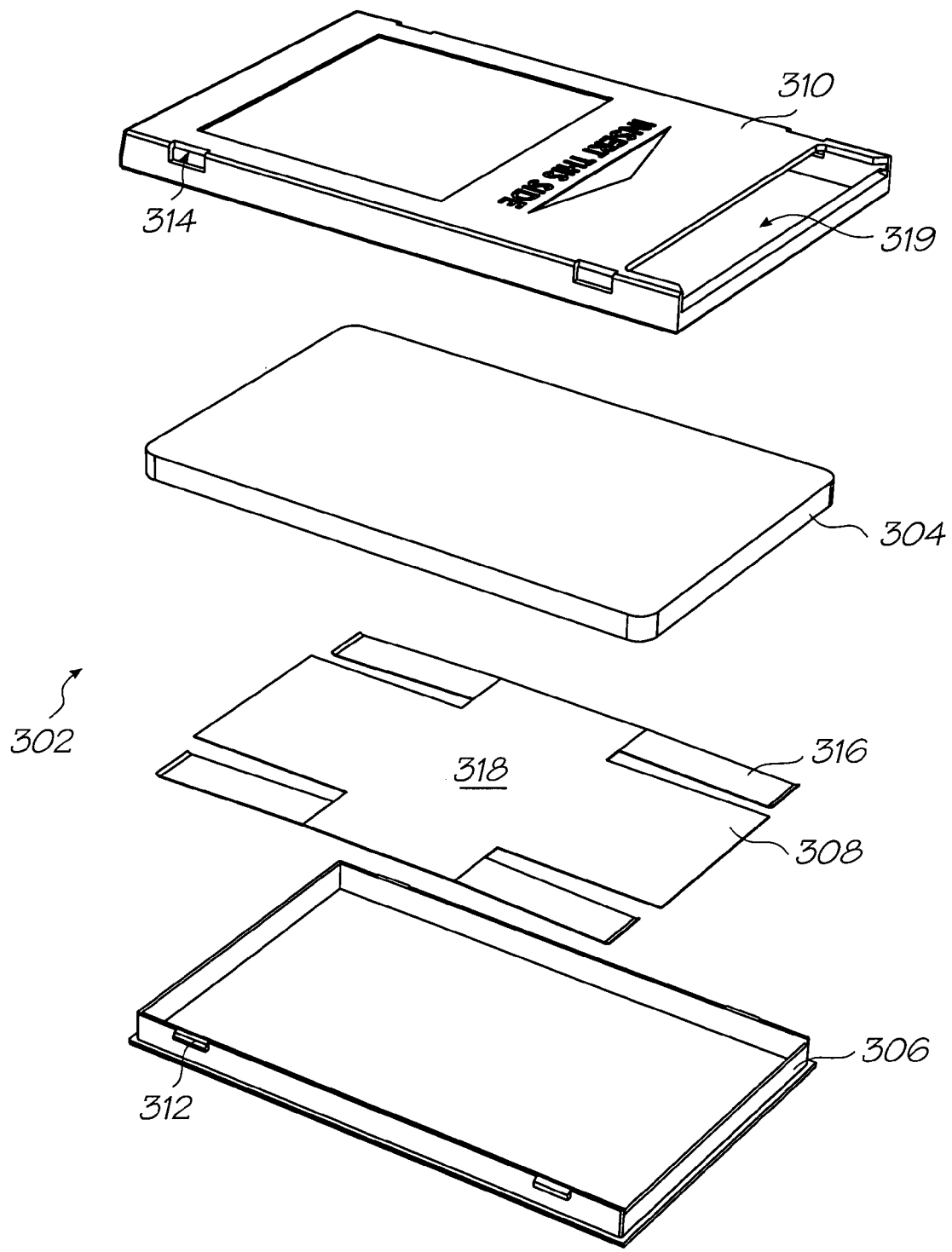
Figure 161:
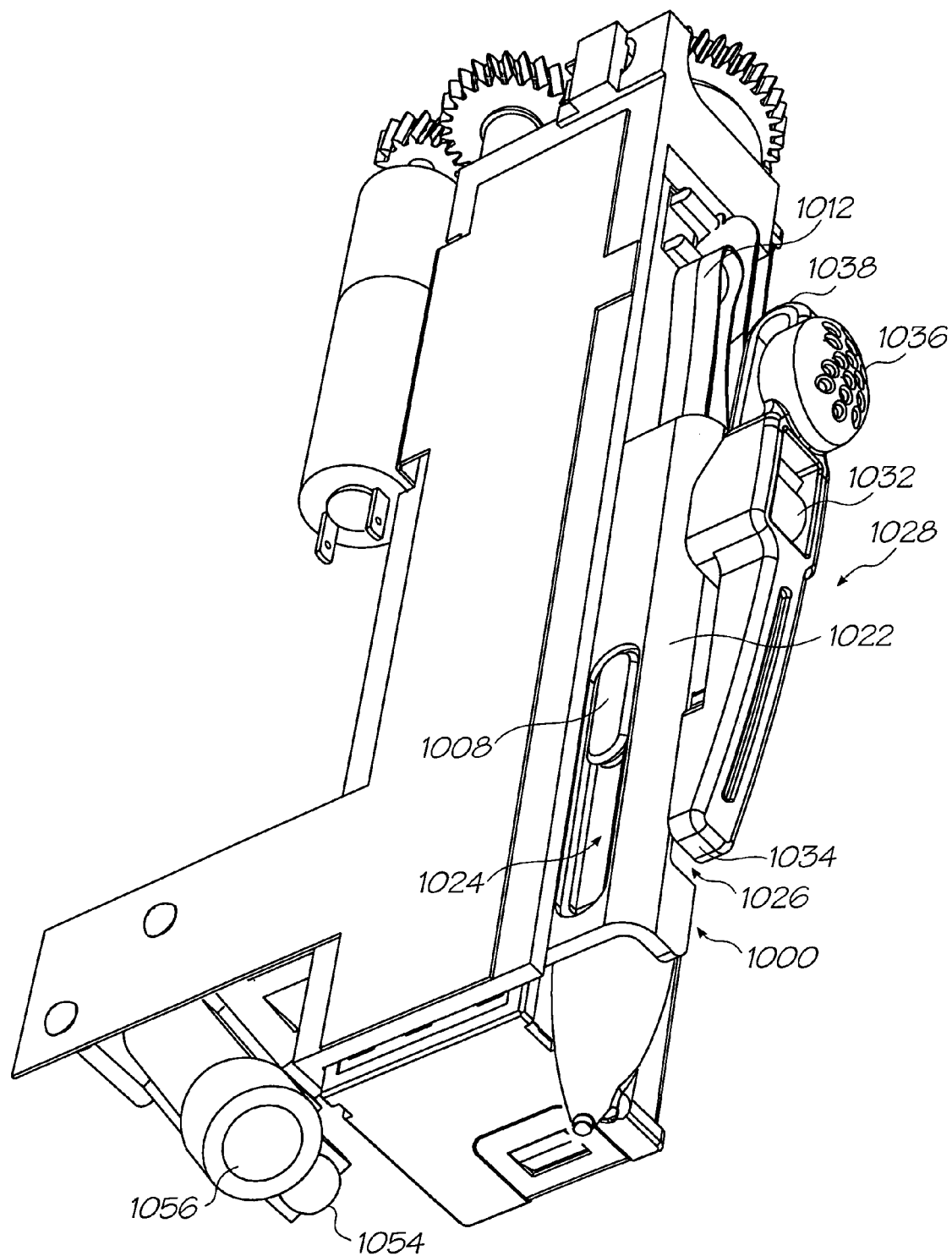
Figure 162:
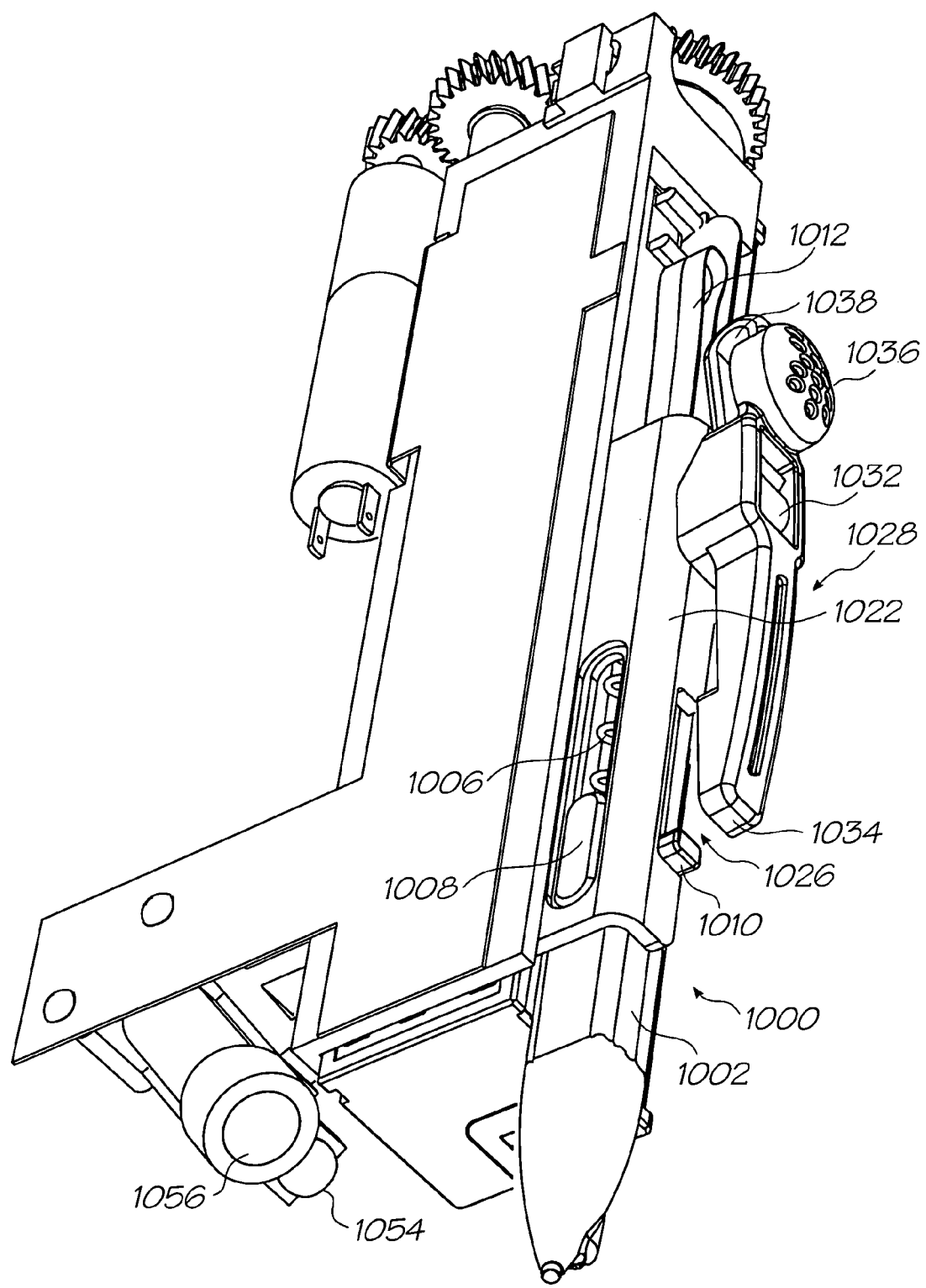
Figure 163:
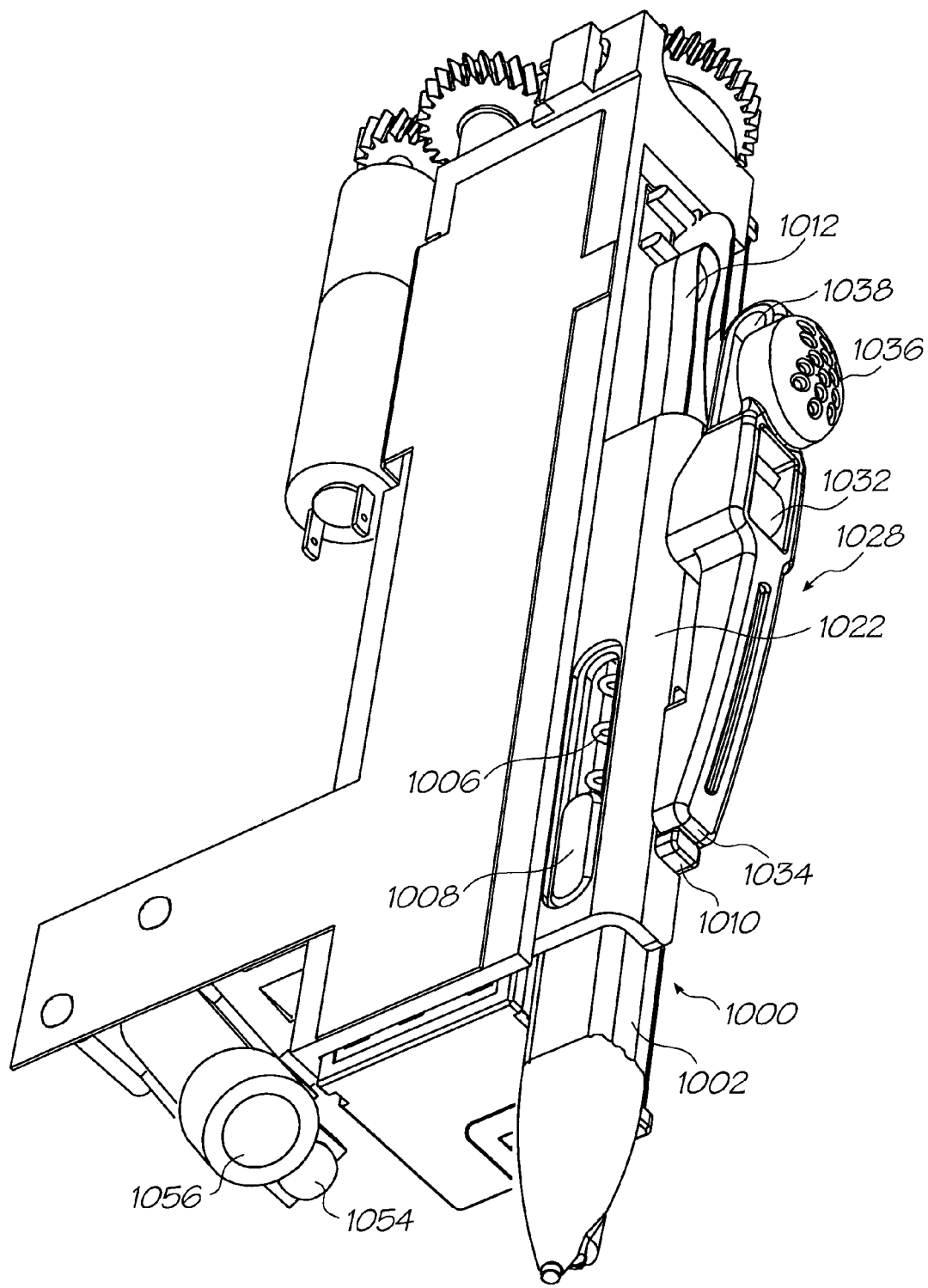
Figure 164:
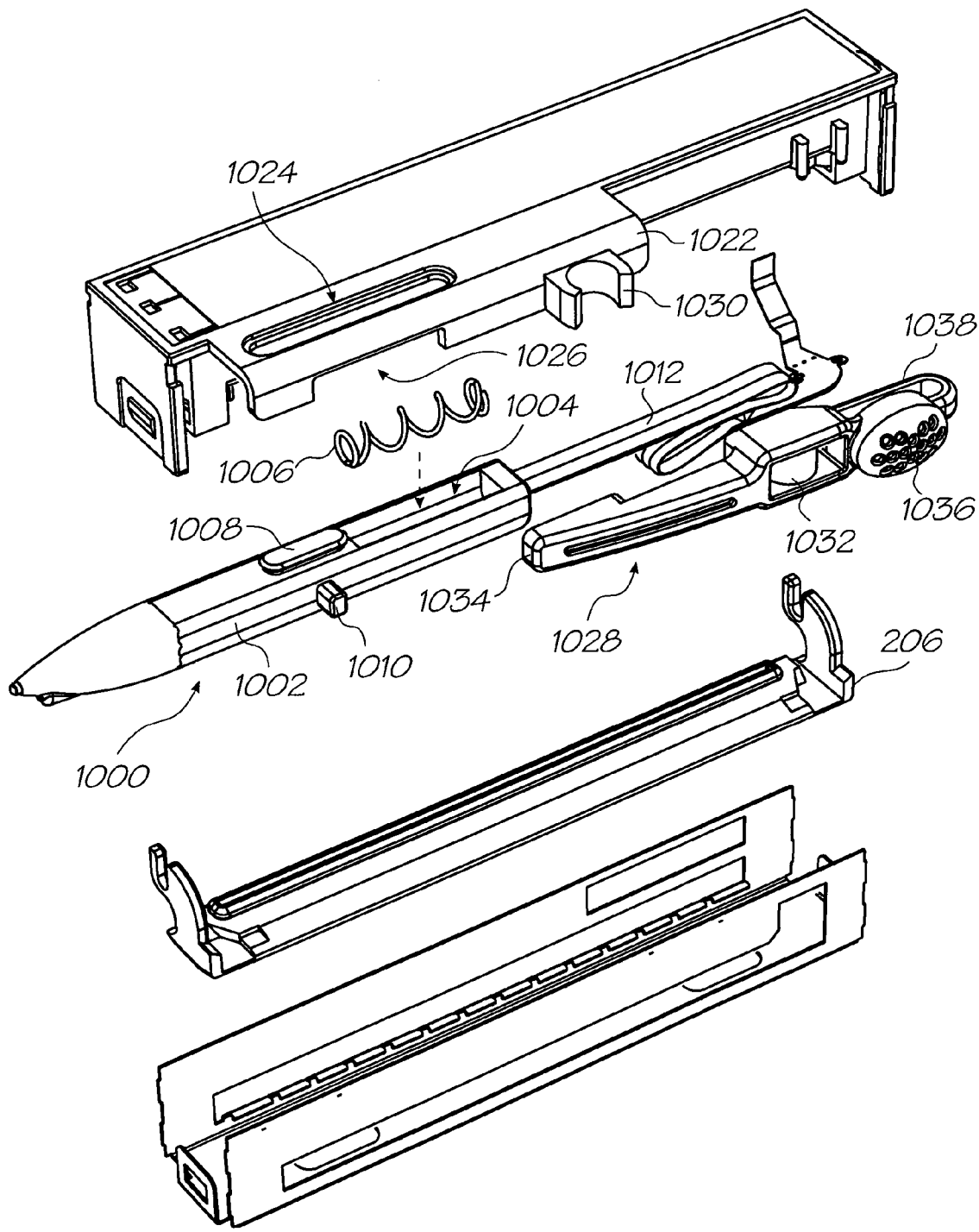
Figure 165:
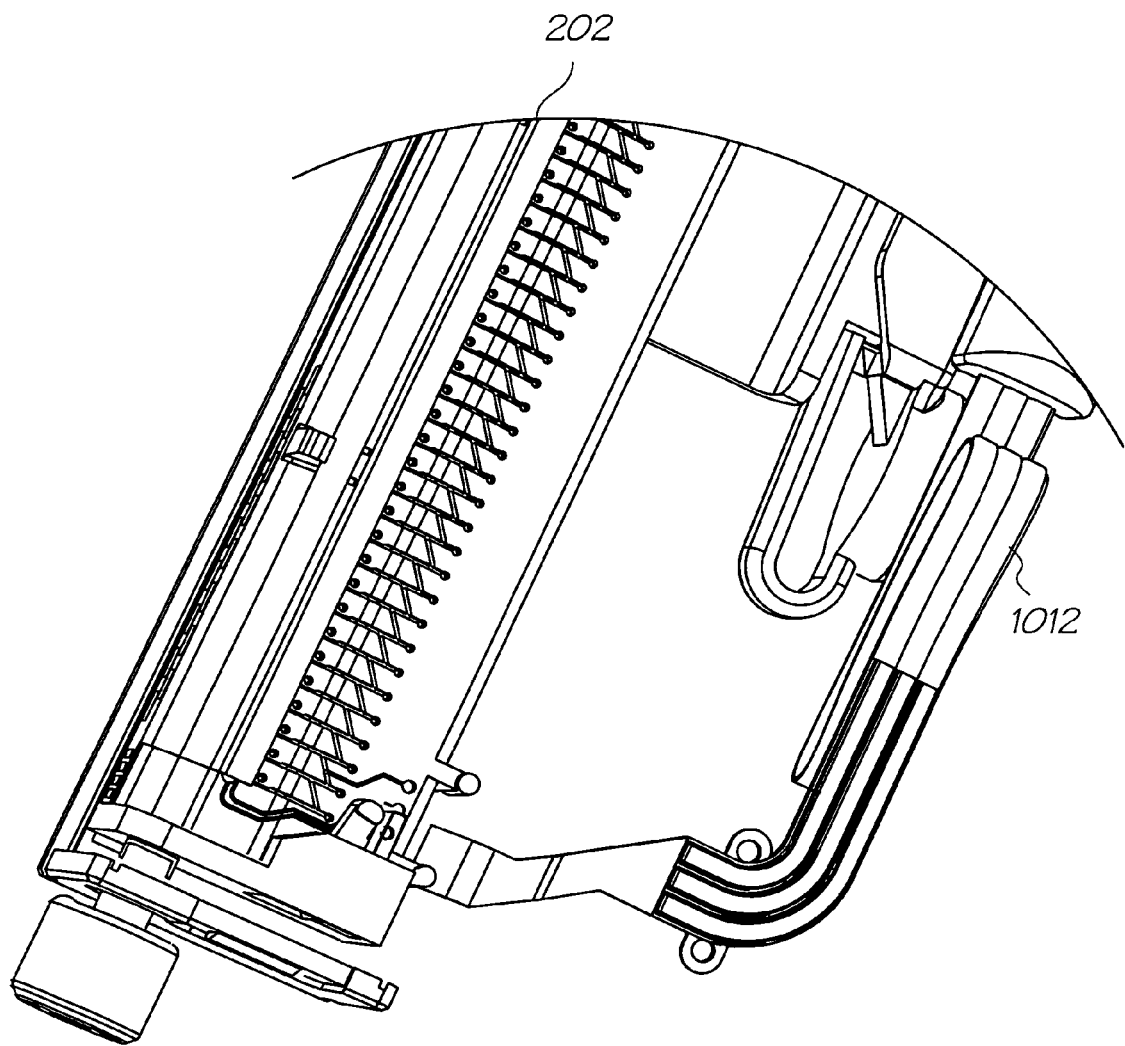
Figure 166:
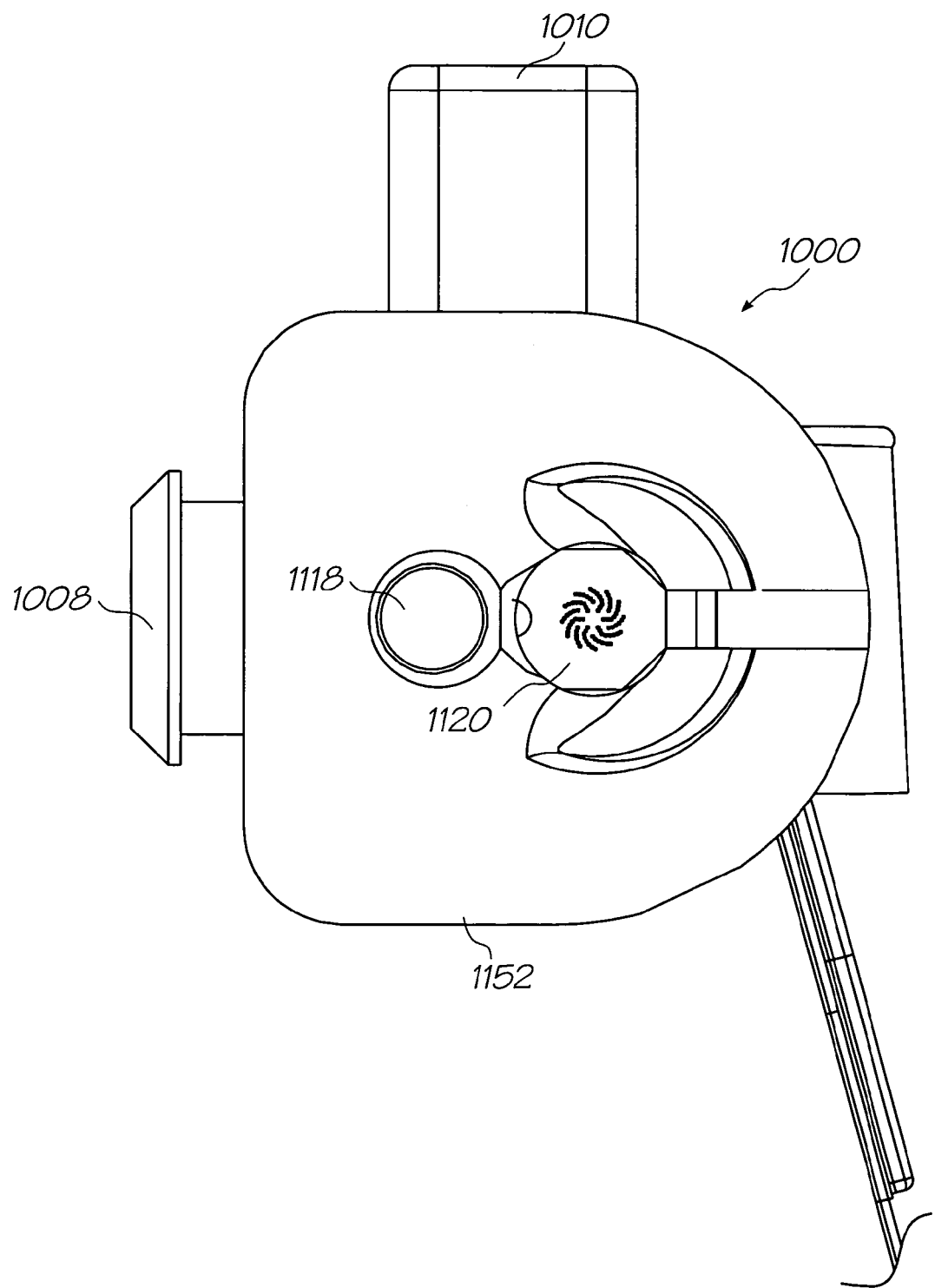
Figure 167:
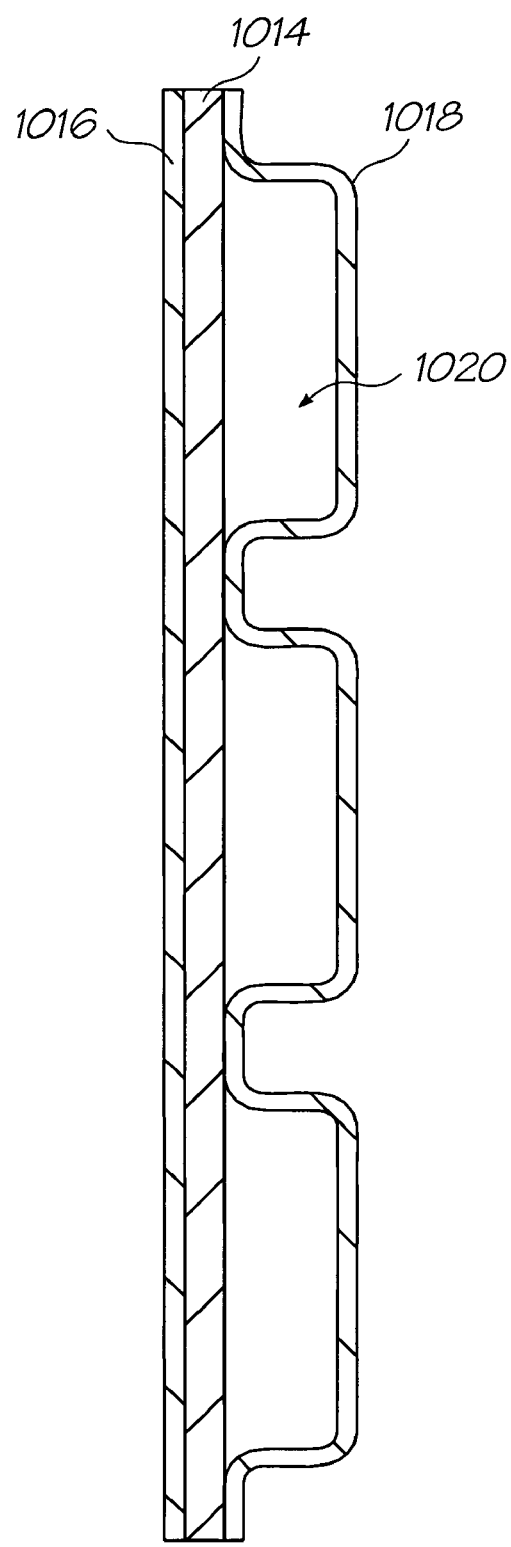
Figure 168:
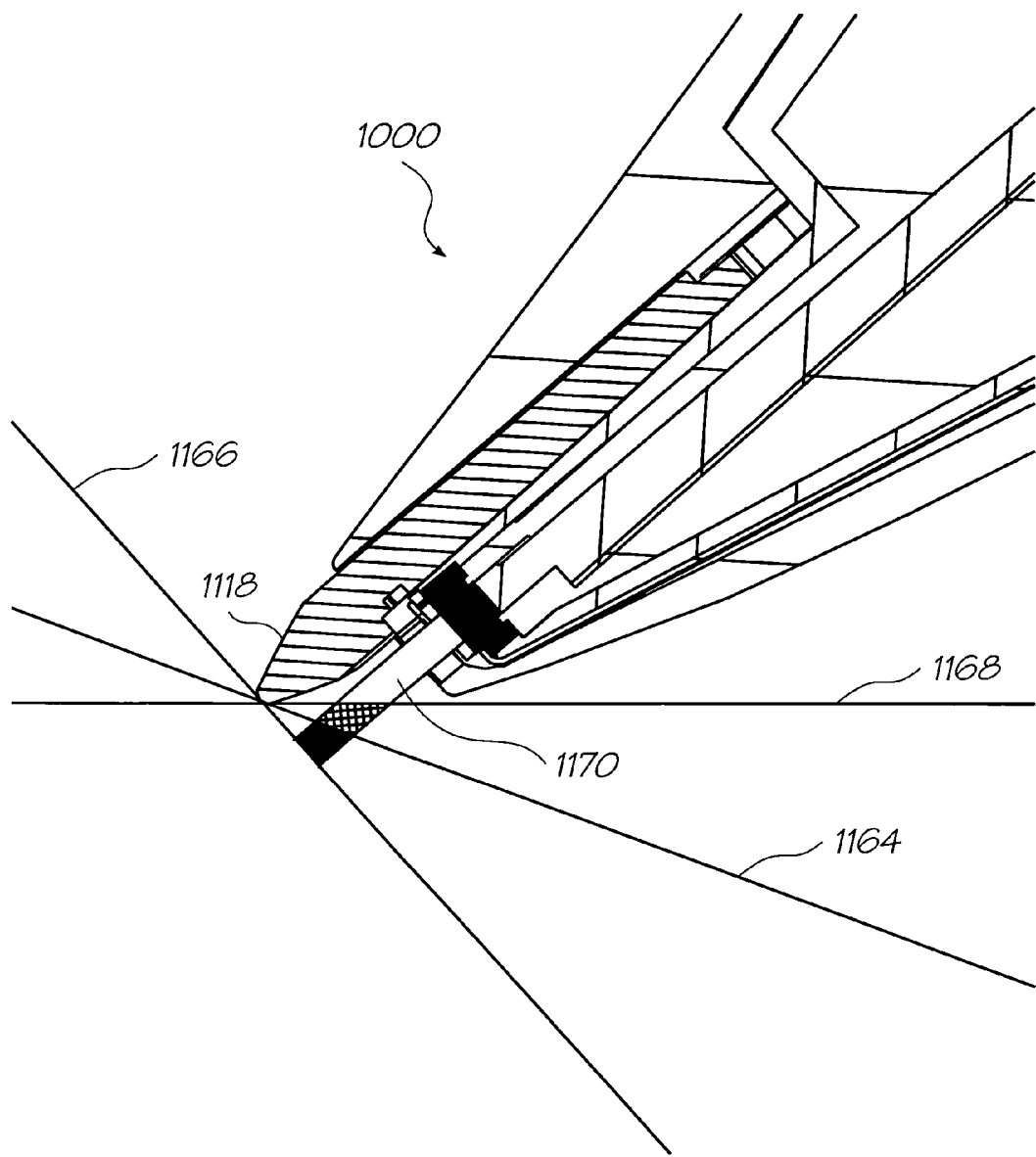
Figure 169:
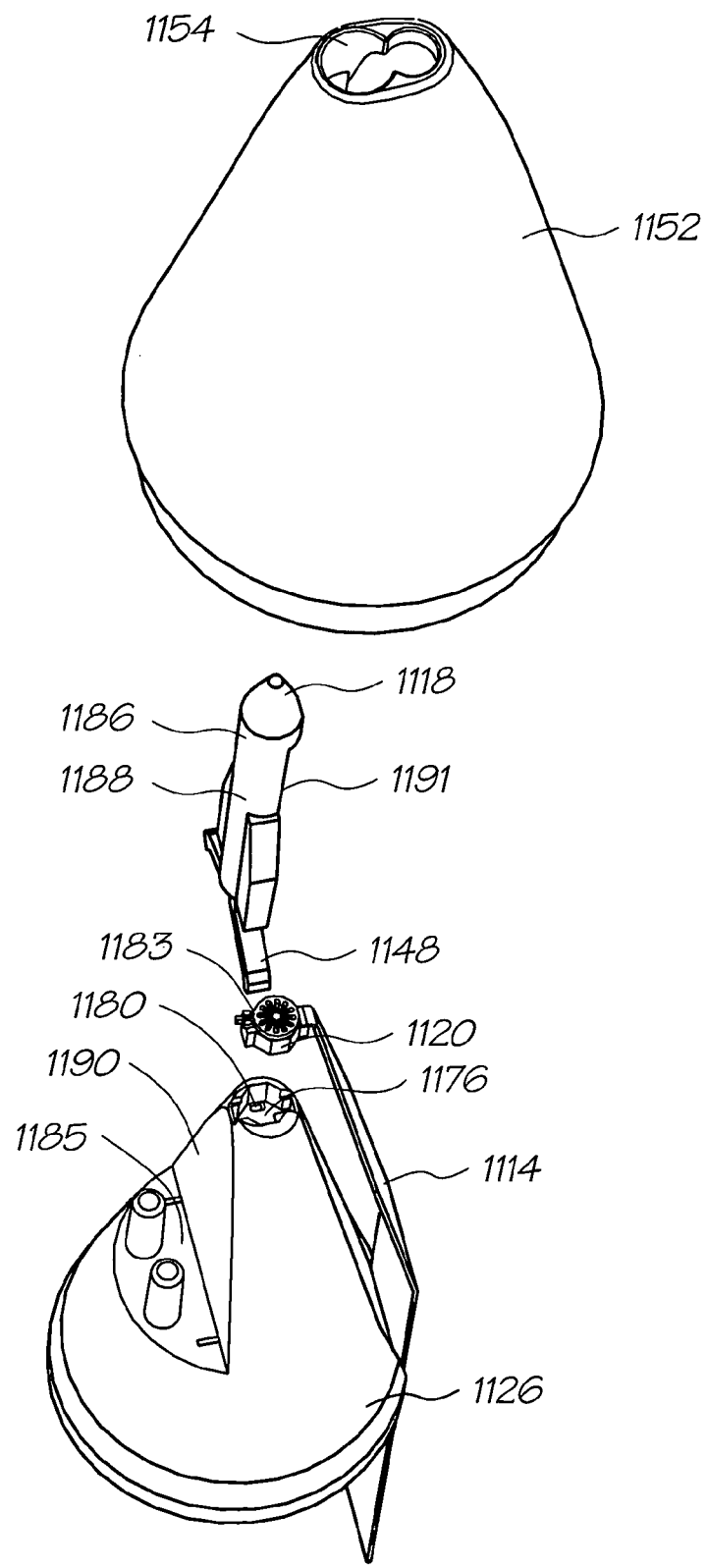
Figure 170:
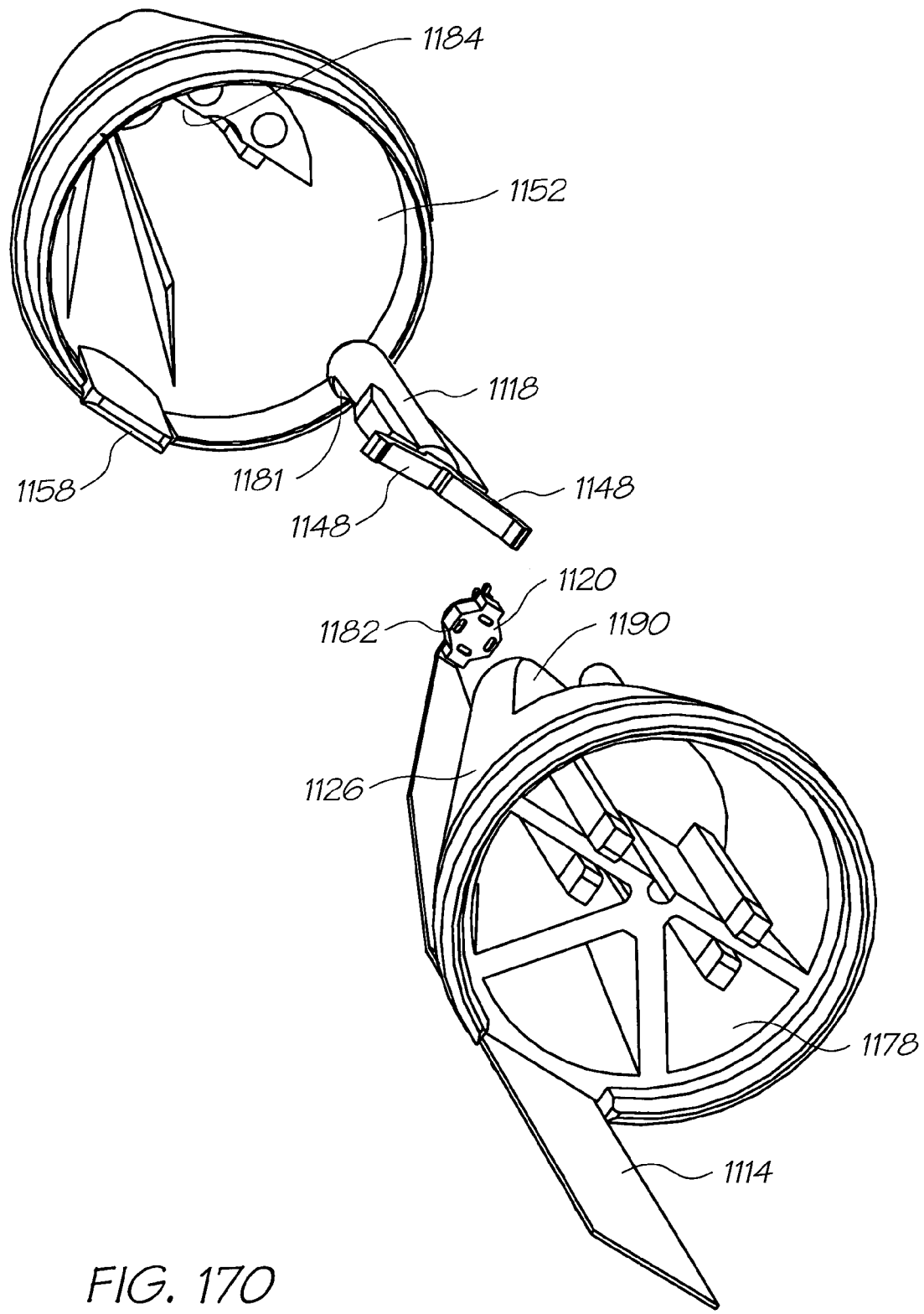
Figure 171:
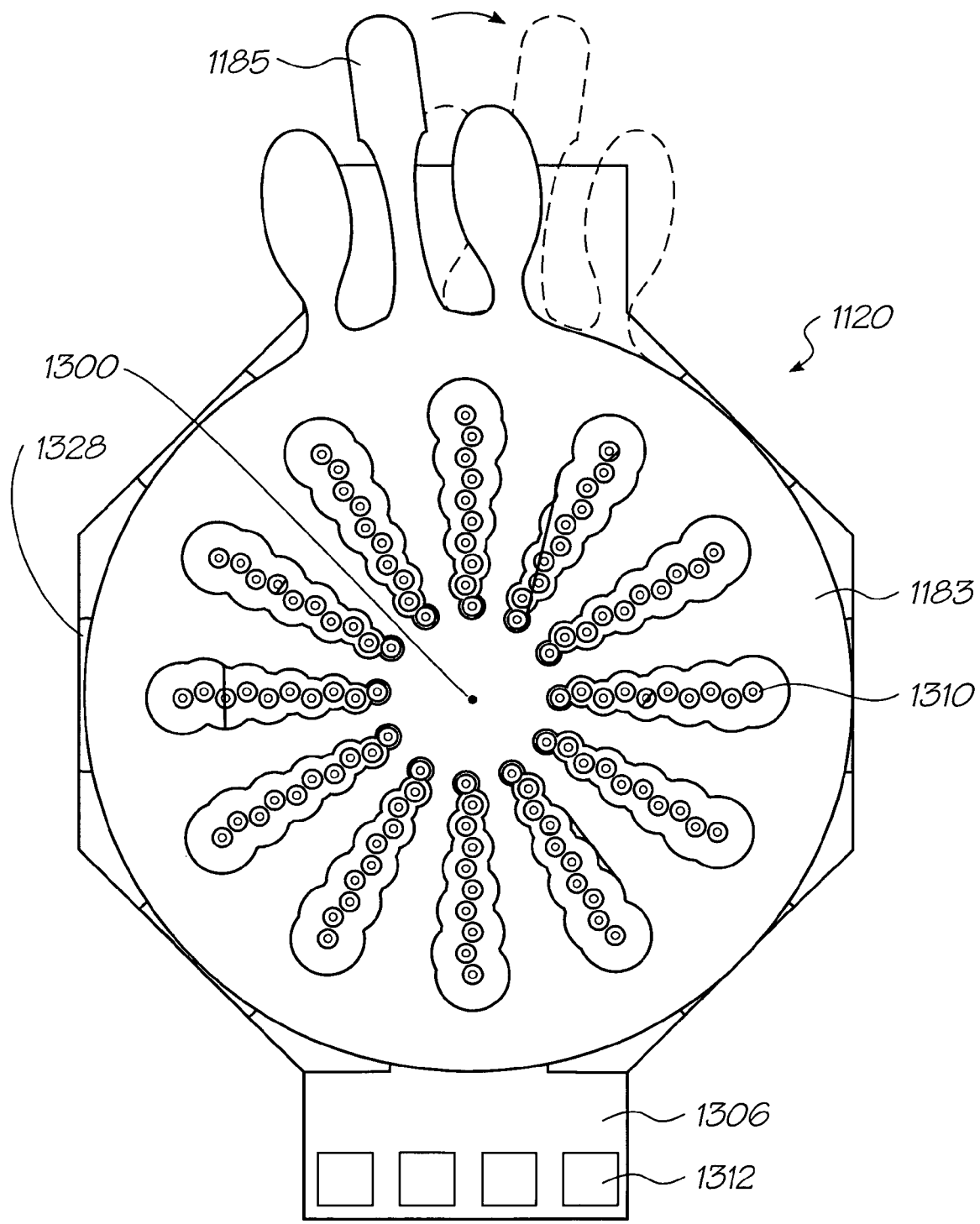
Figure 172:
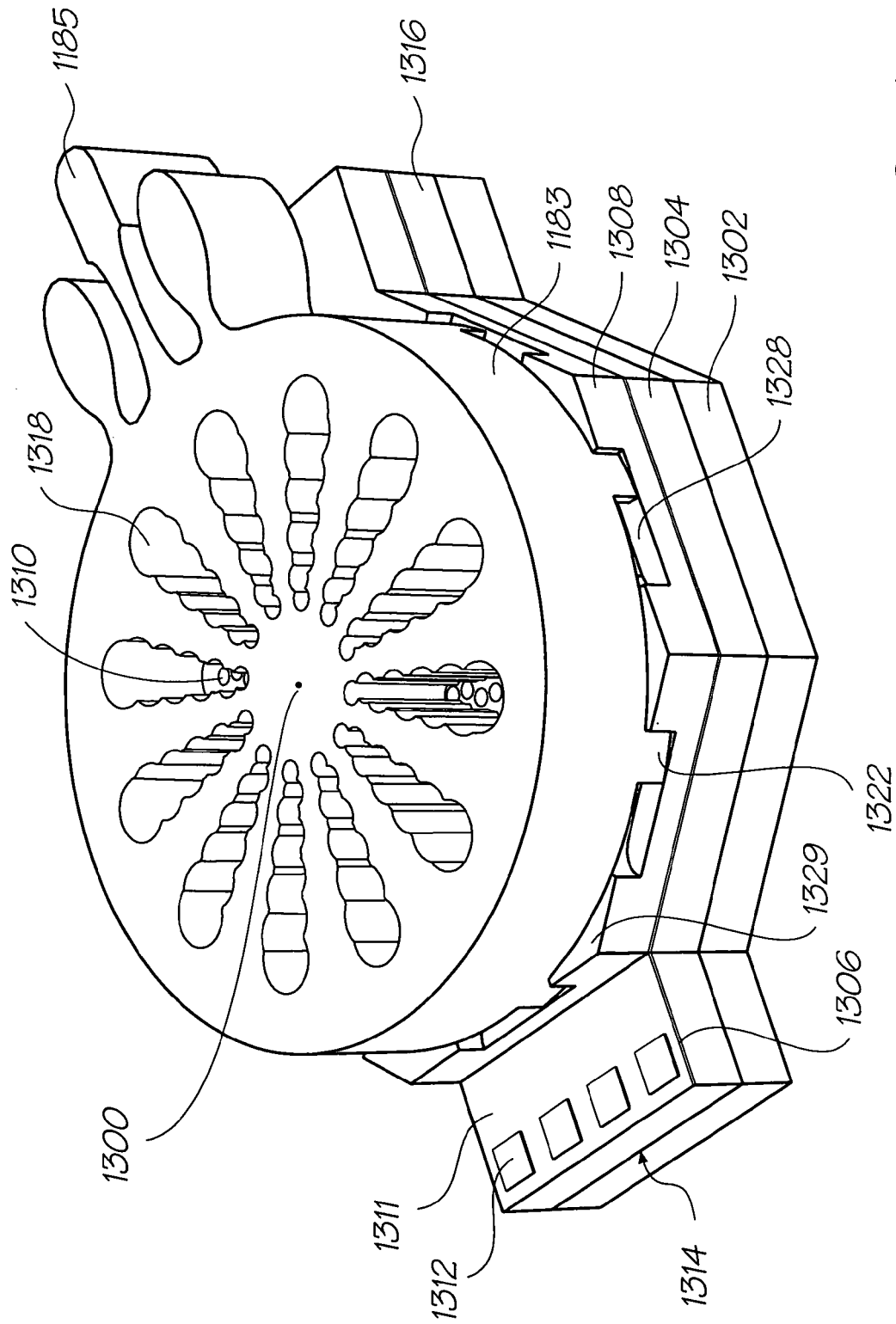
Figure 173:
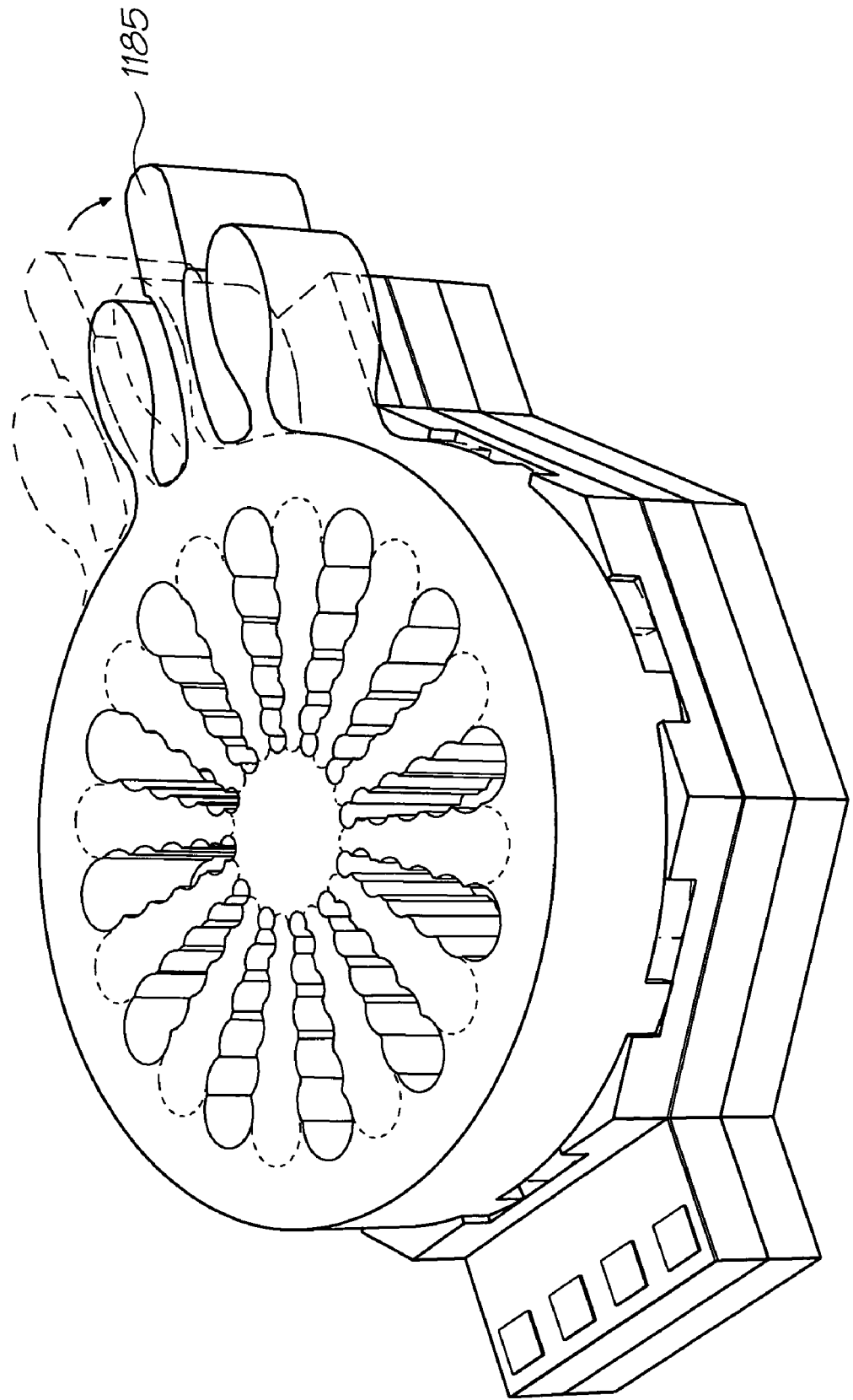
Figure 174:
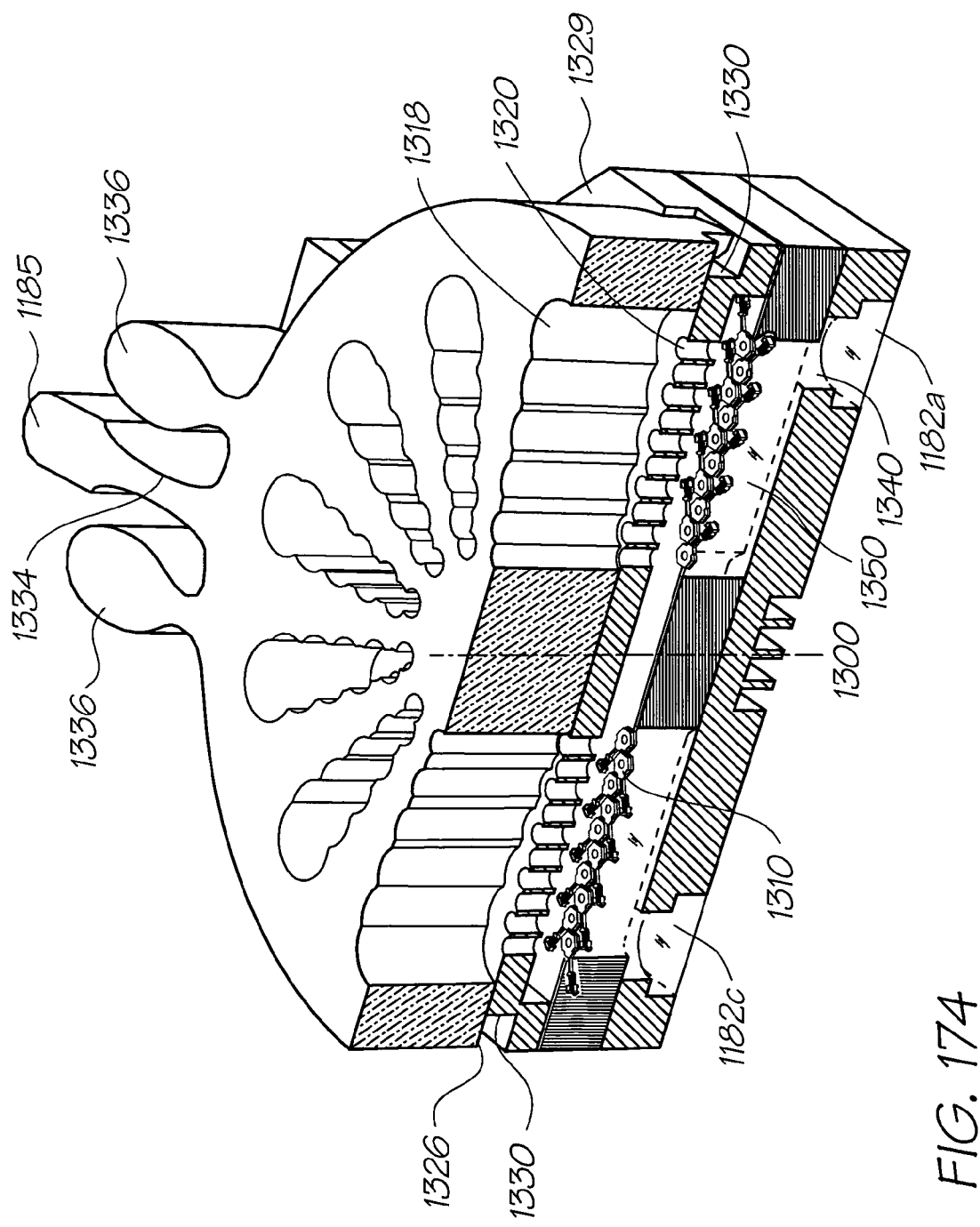
Figure 175:
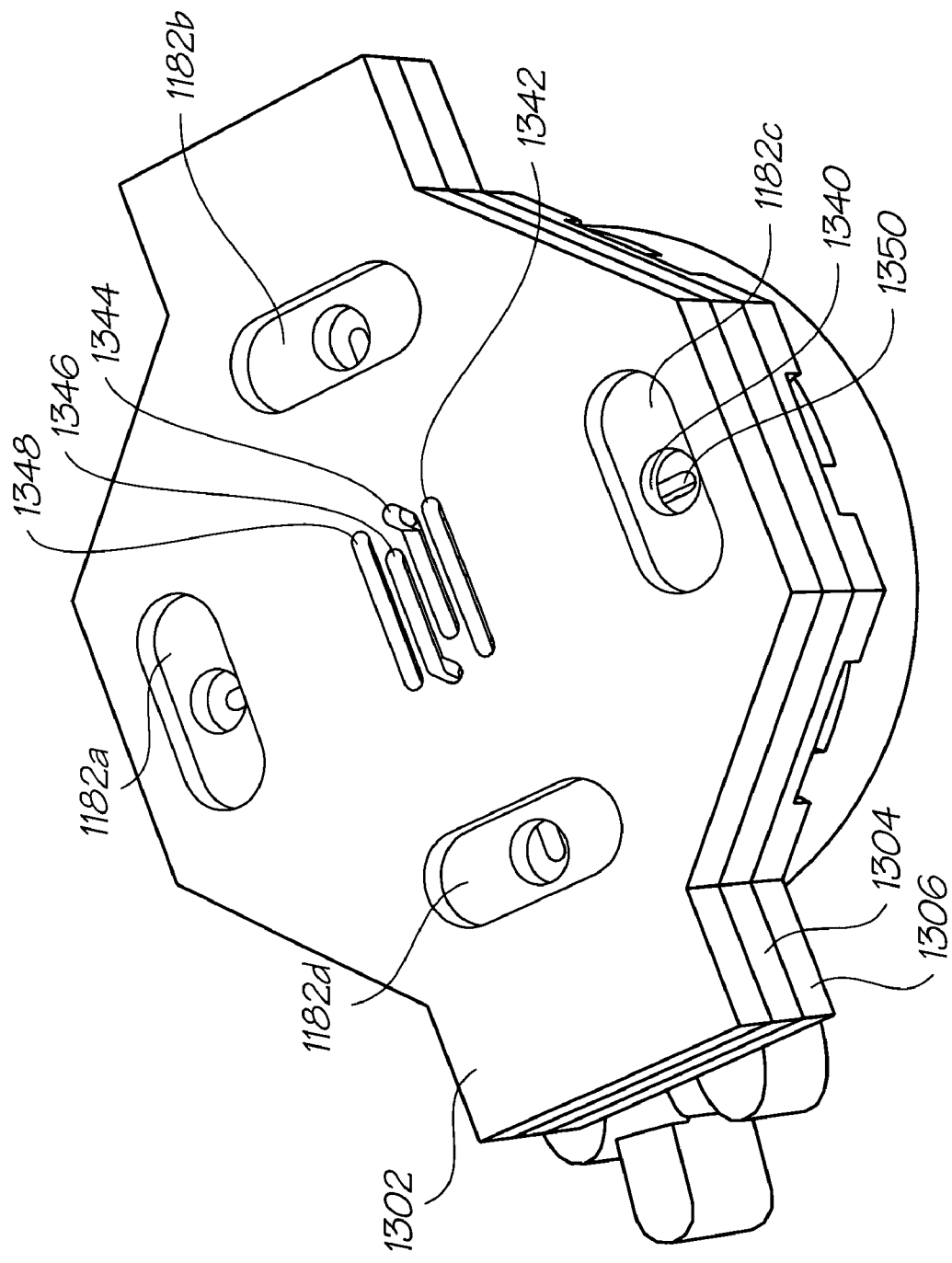
Figure 176:
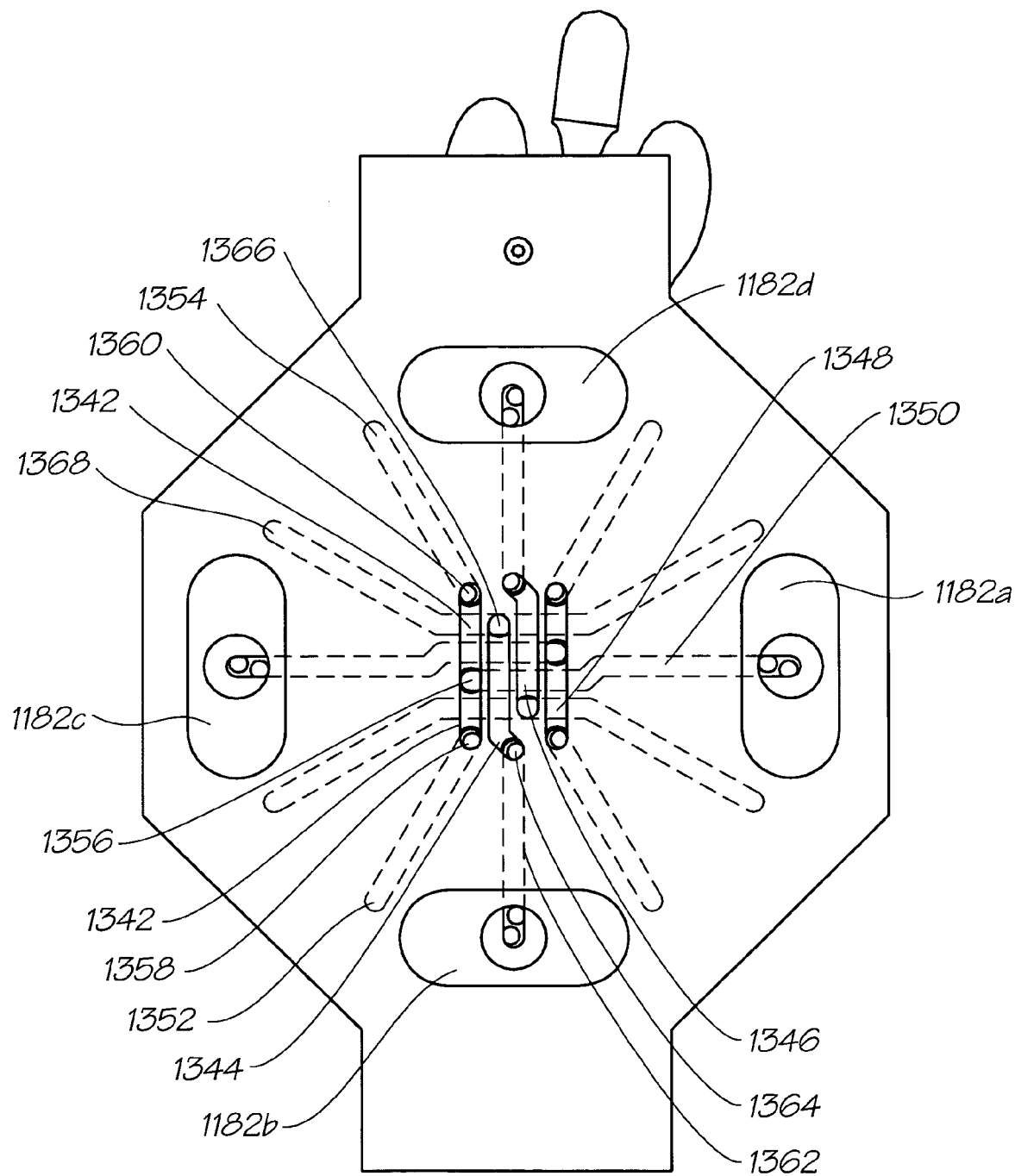
Figure 177:
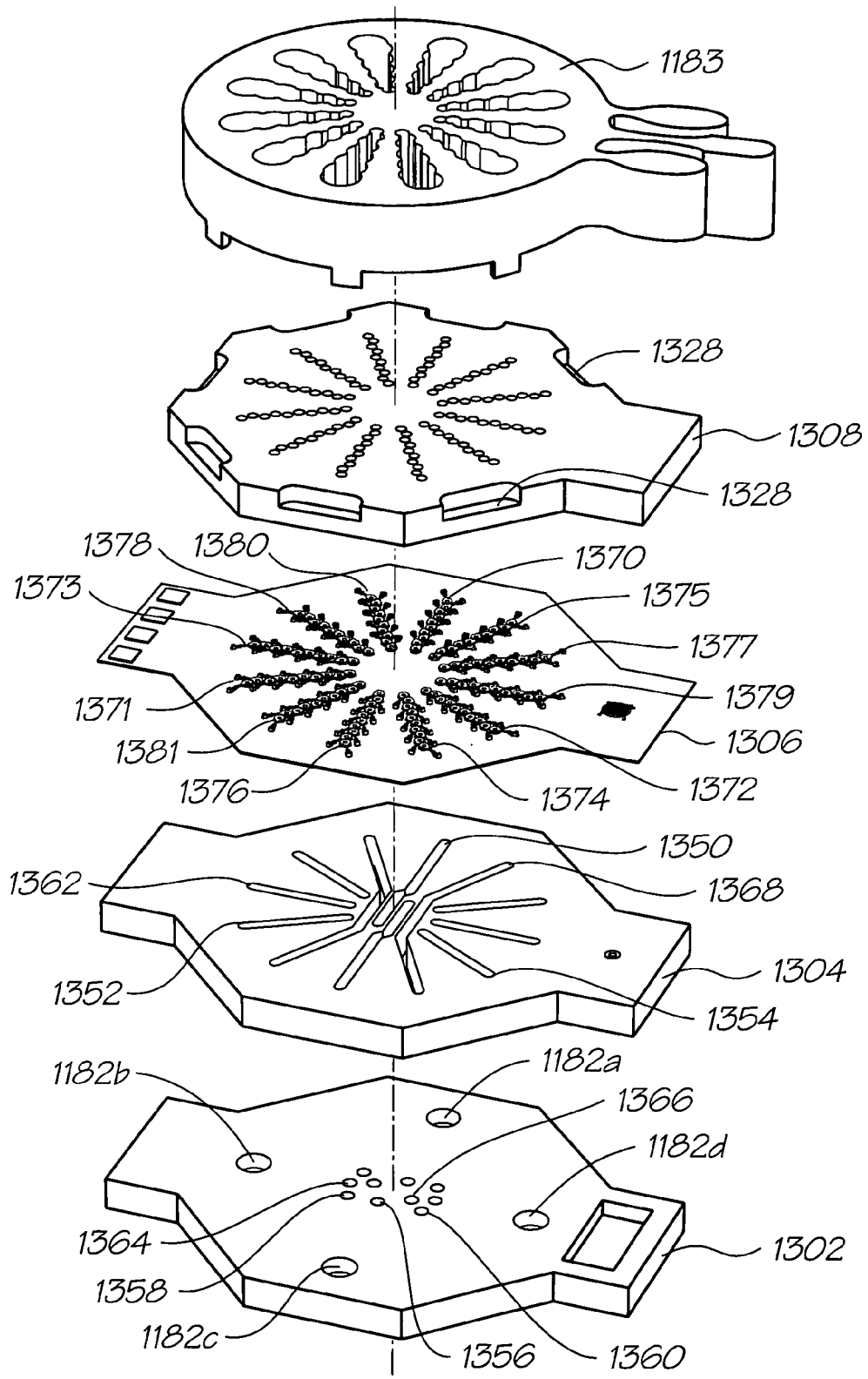
Figure 178:
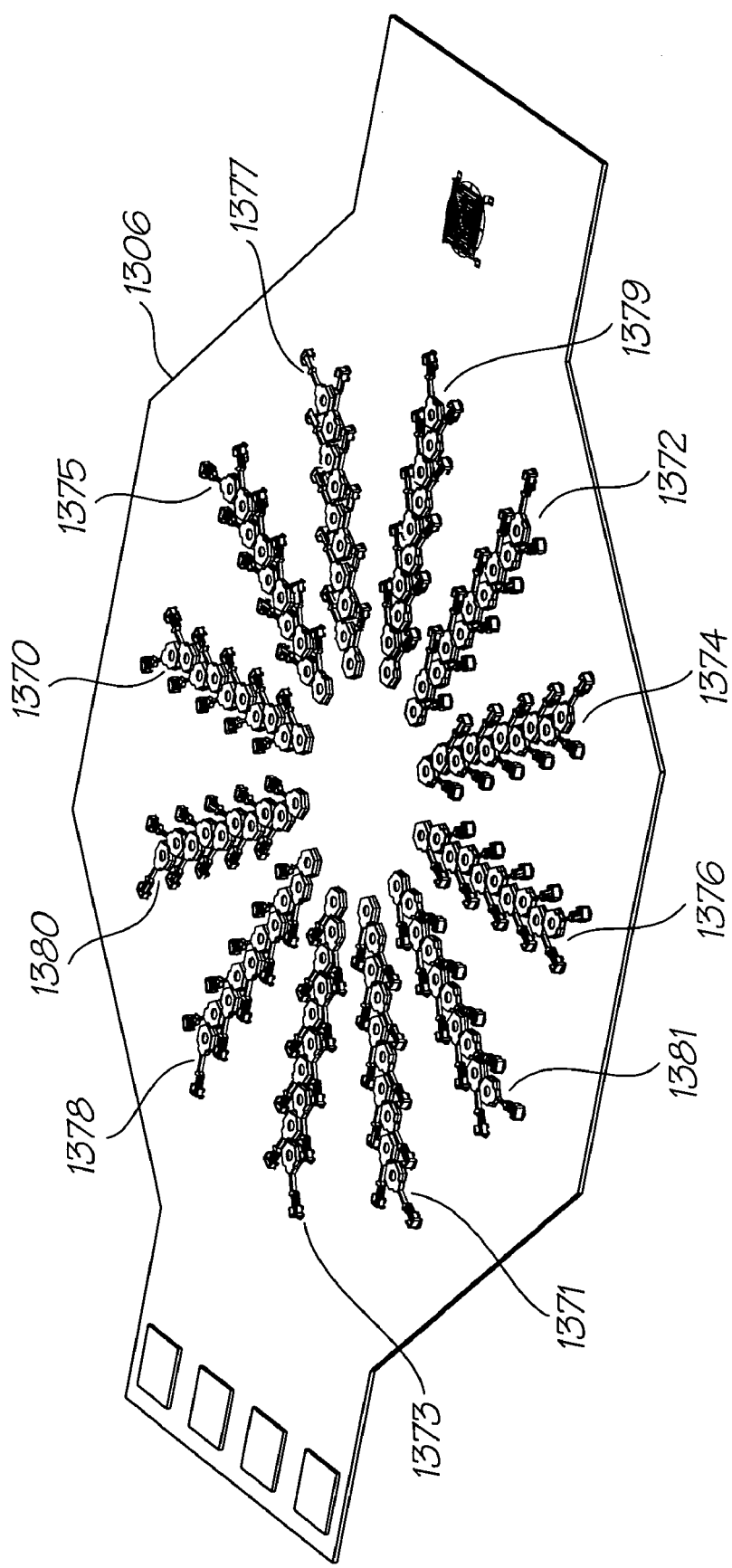
Figure 179:
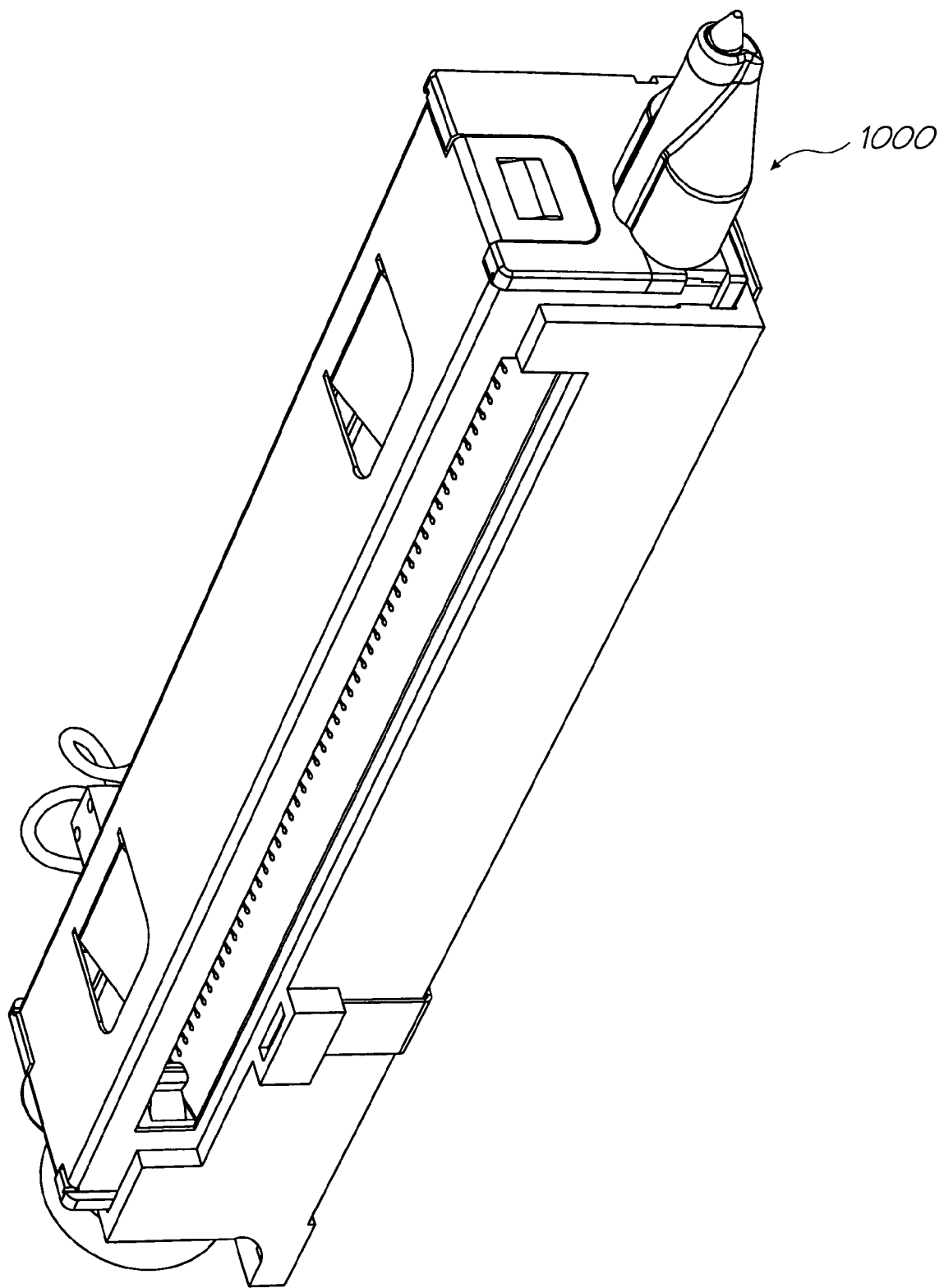
Figure 180:
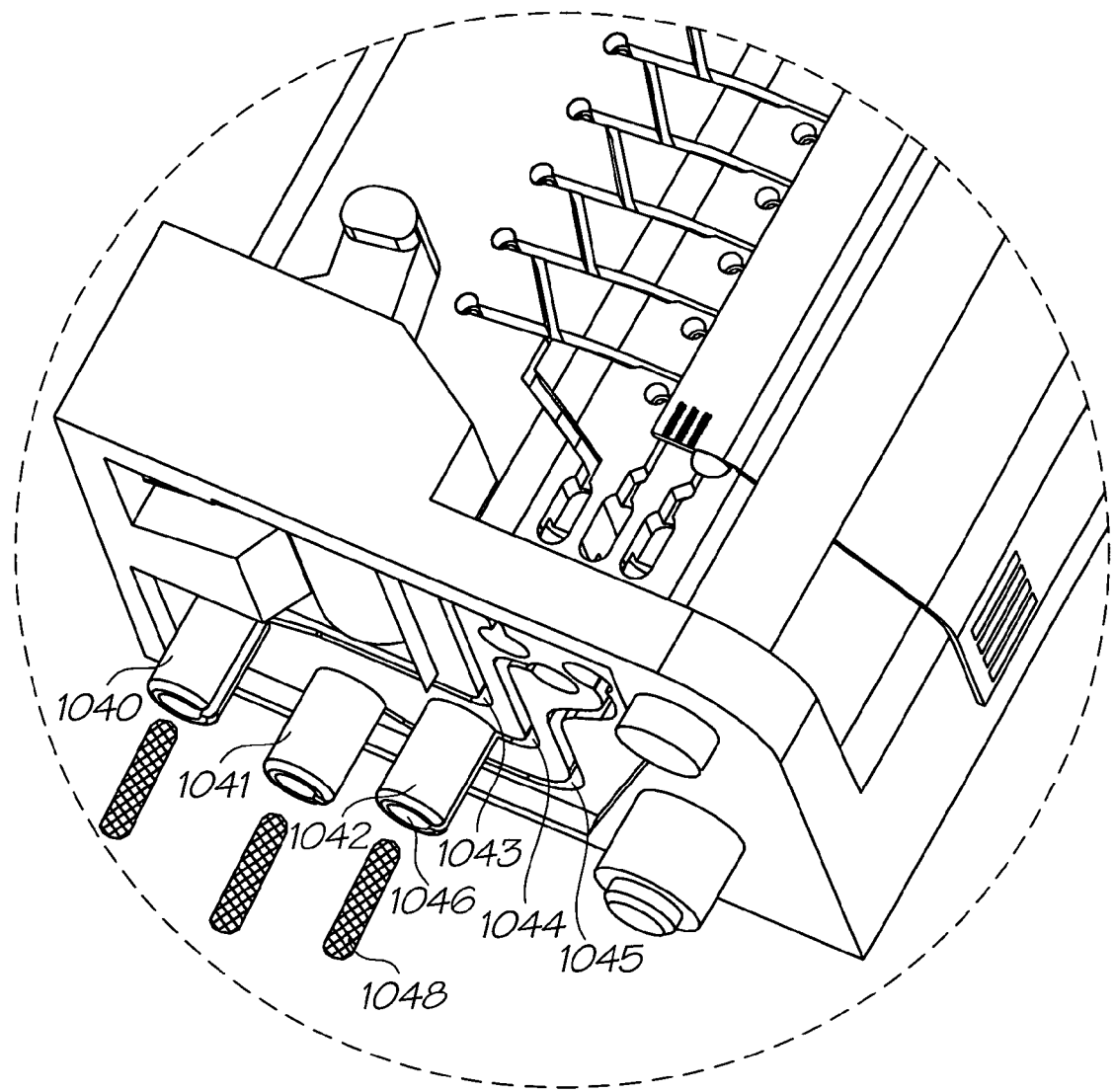
Figure 181:
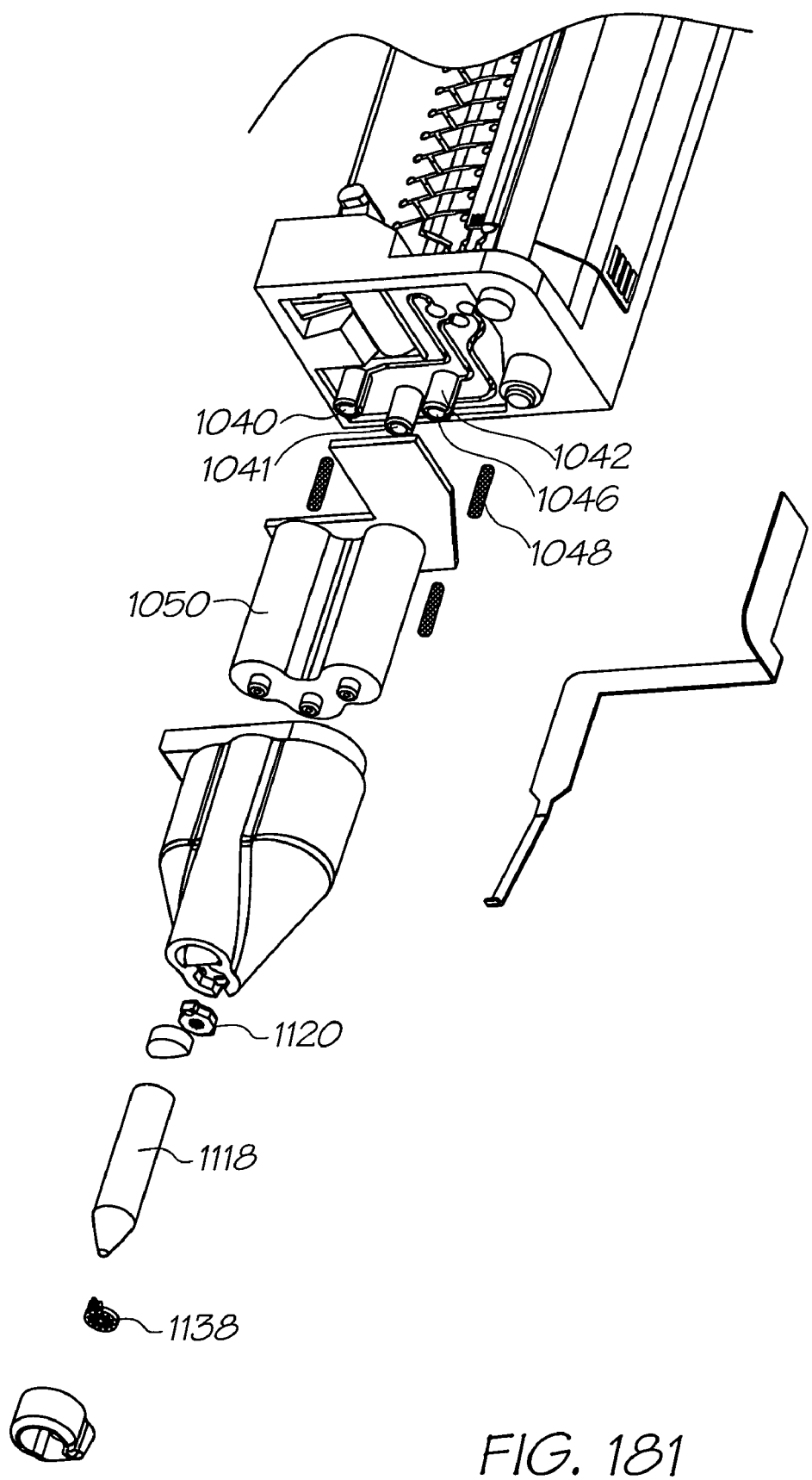
Figure 182:
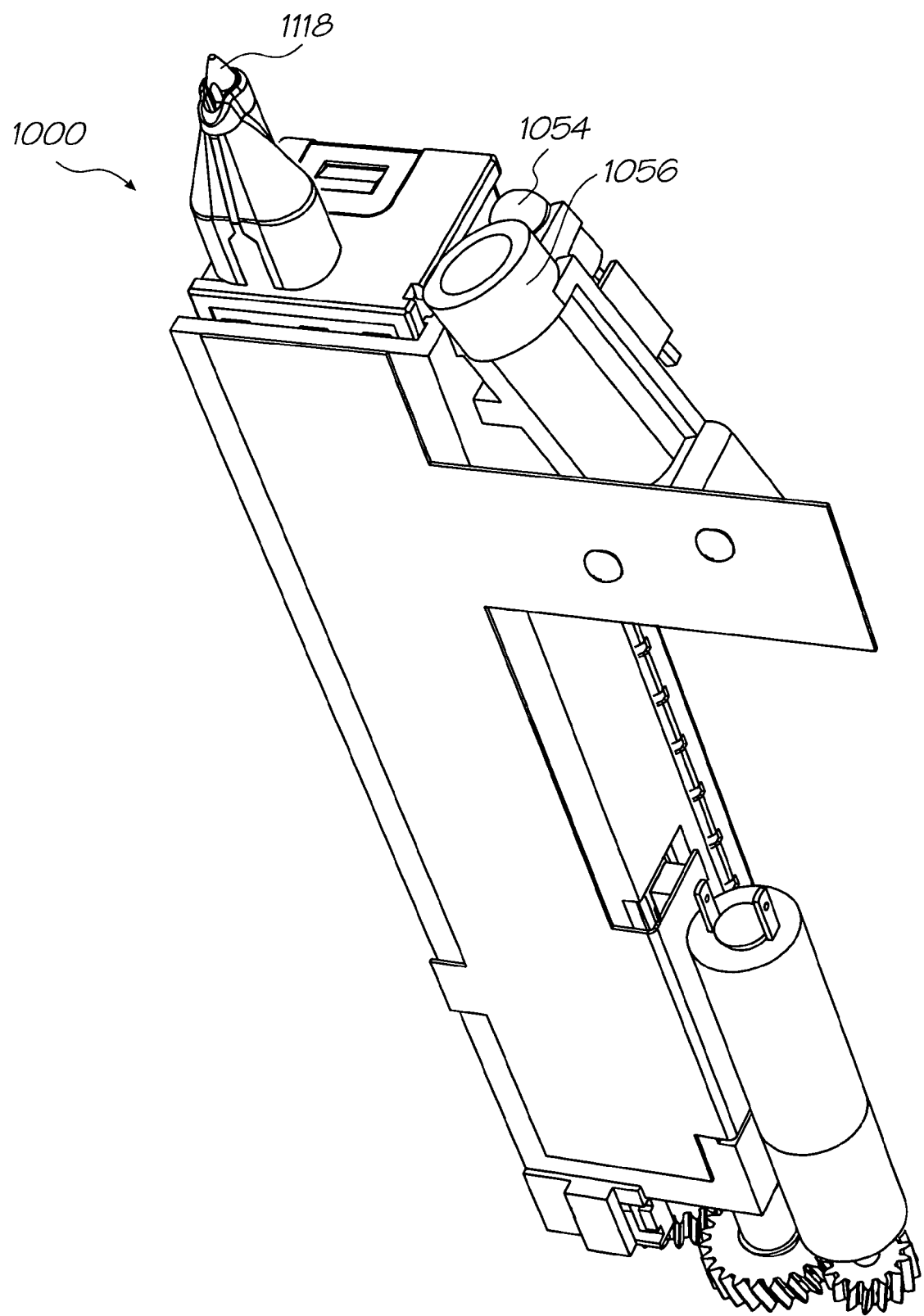
Figure 183:
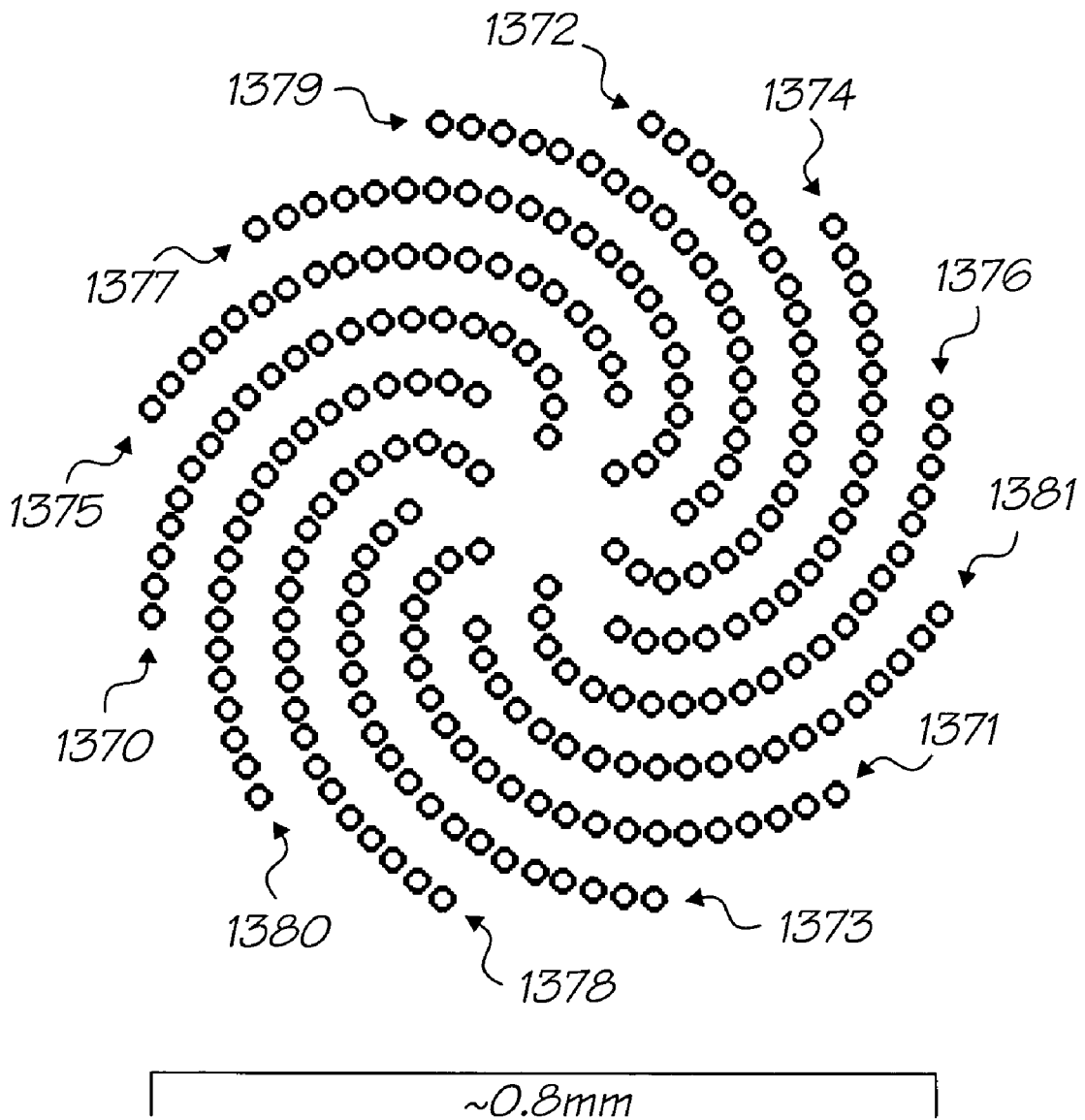
Figure 184:
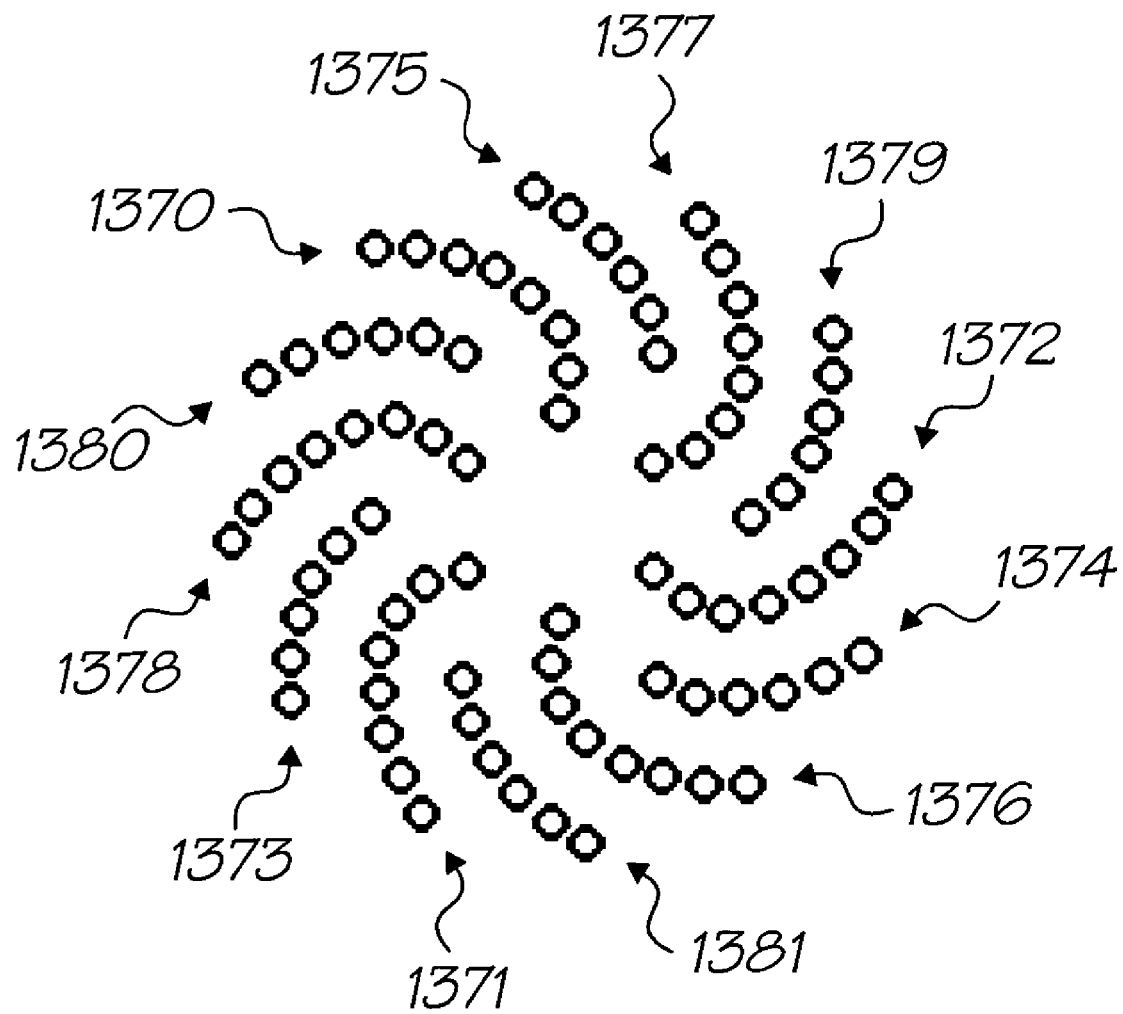

FIG. 145 shows a possible configuration of a multiplexed tag sensor with dual optical paths and single image sensor;

FIG. 146 shows a variant of the tag sensor shown in FIG. 145;

FIG. 147 shows a variant of the tag sensor shown in FIG. 146;

FIG. 148 shows a variant of the tag sensor shown in FIG. 147;

FIGS. 149 and 150 show a multiplexed tag sensor with a pivoting mirror for internal or external image;

FIG. 151 is a front elevation of a personal data assistant (PDA) embodiment;

FIG. 152 is a front perspective of the PDA shown in FIG. 151 with media protruding from the exit slot;

FIG. 153 is a front perspective of the PDA shown in FIG. 151 with media protruding from the exit slot and the Netpage pointer extended;

FIG. 154 is a longitudinal cross section of the PDA taken through A-A of FIG. 151;

FIG. 155 is a partially sectioned rear perspective of the PDA shown in FIG. 151;

FIG. 156 is an enlarged, partially sectioned, partial perspective of the PDA shown in FIG. 151;

FIG. 157 is a rear perspective of the PDA with the media cartridge removed;

FIG. 158 is the PDA of FIG. 157 without the rear moulding;

FIG. 159 is an enlarged rear and bottom perspective of the PDA of FIG. 158;

FIG. 160 is an exploded perspective of the media cartridge;

FIG. 161 is a perspective of the cartridge with universal pen in its retracted configuration;

FIG. 162 is a perspective of the cartridge with universal pen in its unlocked extended configuration;

FIG. 163 is a perspective of the cartridge with universal pen in its locked extended configuration;

FIG. 164 is an exploded perspective of the cartridge with universal pen;

FIG. 165 is a partial perspective showing the pen TAB film connection to the main cartridge TAB film;

FIG. 166 is an end elevation showing the nozzle pattern at the nib of the pen;

FIG. 167 is a lateral cross section through the flexible data, power and ink conduit to the stylus;

FIG. 168 shows the stylus nib contacting the substrate at three different angles;

FIG. 169 is an exploded top perspective of the stylus nib;

FIG. 170 is an exploded bottom perspective of the stylus nib;

FIG. 171 is a plan view of the nib printhead;

FIG. 172 is a perspective view of the nib printhead with the capper in the open position;

FIG. 173 is a perspective view of the nib printhead with the capper in the closed position;

FIG. 174 is an axial cross section of the nib printhead;

FIG. 175 is a bottom perspective of the nib printhead;

FIG. 176 is a bottom perspective of the nib printhead;

FIG. 177 is an exploded top perspective of the nib printhead;

FIG. 178 is the layer of electrically active semiconductor elements within the nib printhead;

FIG. 179 is a perspective another embodiment of the stylus nib printhead and cartridge assembly, where the stylus is mounted to the cartridge;

FIG. 180 is an enlarged partial perspective of a cutaway end of the cartridge showing the ink connection to the stylus nib;

FIG. 181 is an exploded perspective of the assembly of FIG. 179;

FIG. 182 is a perspective of the assembly of FIG. 179 with an optional IR LED and and CCD photosensor;

FIG. 183 shows a first alternative arrangement for the nozzles on the nib printhead; and, FIG. 184 shows a second alternative arrangement for the nozzles on the nib printhead.

DETAILED DESCRIPTION OF THE PREFERRED EMBODIMENTS

Mobile Telecommunications Device Overview

Whilst the main embodiment includes both Netpage and printing functionality, only one or the other of these features is provided in other embodiments.

Figure 1:
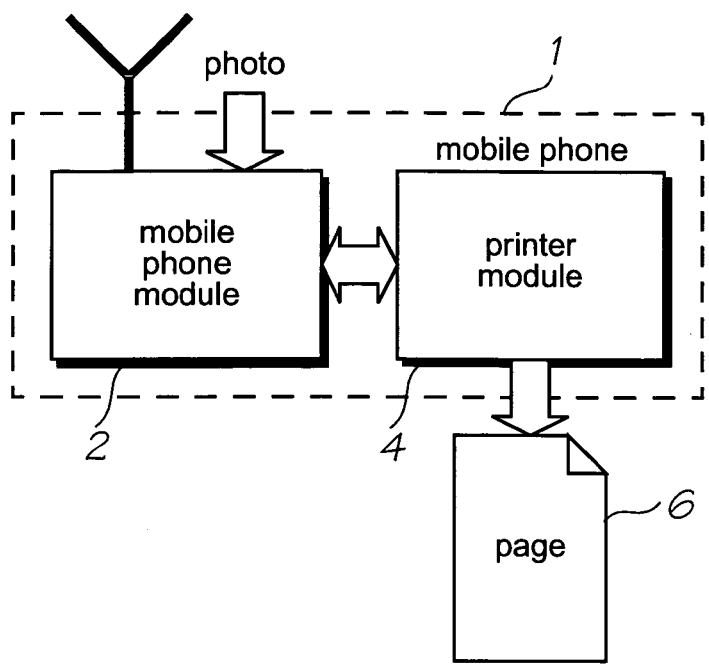
FIG. 1 is a schematic representation of the modular interaction in a printer/mobile phone.

One such embodiment is shown in FIG. 1, in which a mobile telecommunications device in the form of a mobile phone 1 (also known as a "cellphone") includes a mobile phone module 2 and a printer module 4. The mobile phone module is configured to send and receive voice and data via a telecommunications network (not shown) in a conventional manner known to those skilled in the art. The printer module 4 is configured to print a page 6. Depending upon the particular implementation, the printer module 4 can be configured to print the page 6 in color or monochrome.

The mobile telecommunications device can use any of a variety of known operating systems, such as Symbian (with UIQ and Series 60 GUIs), Windows Mobile, PalmOS, and Linux.

In the preferred embodiment (described in more detail below), the print media is pre-printed with tags, and the printer module 4 prints visible information onto the page 6 in registration with the tags. In other embodiments, Netpage tags are printed by the printer module onto the page 6 along with the other information. The tags can be printed using either the same visible ink as used to print visible information, or using an infrared or other substantially invisible ink.

The information printed by the printer module 4 can include user data stored in the mobile phone 1 (including phonebook and appointment data) or text and images received via the telecommunications network or from another device via a communication mechanism such as Bluetooth™ or infrared transmission. If the mobile phone 1 includes a camera, the printer module 4 can be configured to print the captured images. In the preferred form, the mobile phone module 2 provides at least basic editing capabilities to enable cropping, filtering or addition of text or other image data to the captured image before printing.

The configuration and operation of the printer module 4 is described in more detail below in the context of various types of mobile telecommunication device that incorporate a printhead.

Figure 2:
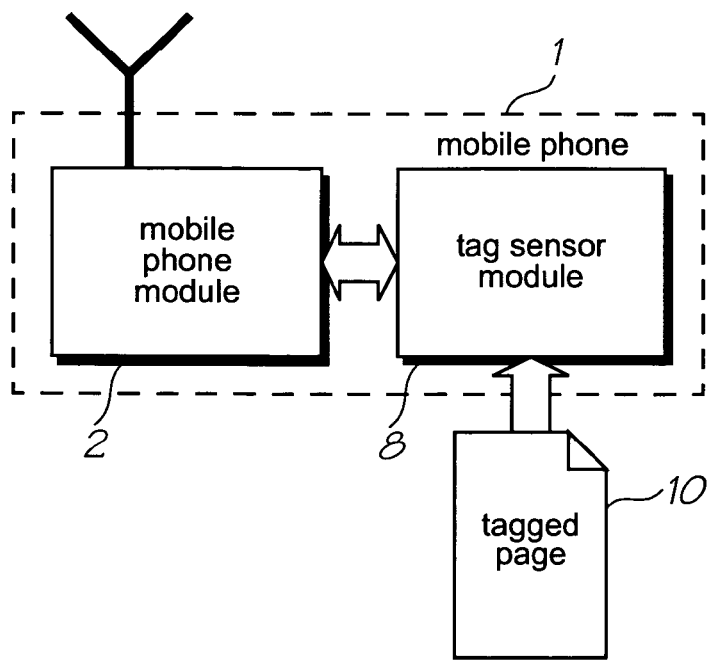
FIG. 2 is a schematic representation of the modular interaction in a tag sensor/mobile phone.

FIG. 2 shows another embodiment of a mobile telecommunications device, in which the printer module 4 is omitted, and a Netpage tag sensor module 8 is included. The Netpage module 8 enables interaction between the mobile phone 1 and a page 10 including Netpage tags. The configuration and operation of the Netpage pointer in a mobile phone 1 is described in more detail below. Although not shown, the mobile phone 1 with Netpage module 8 can include a camera.

Figure 3:
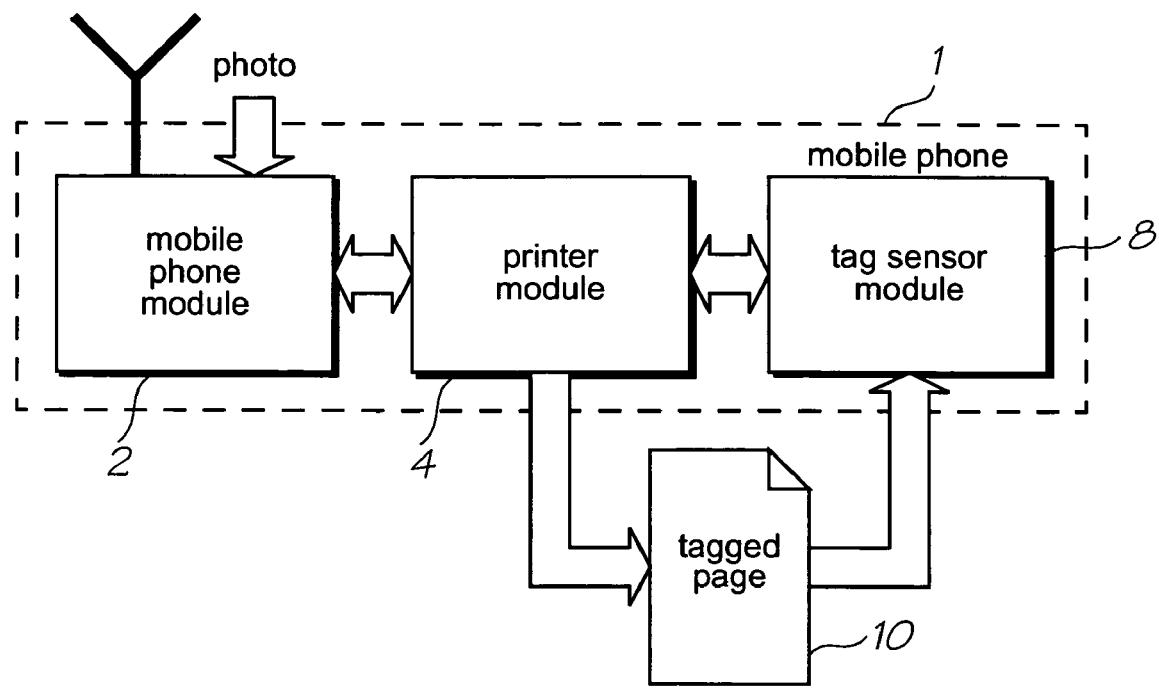
FIG. 3 is a schematic representation of the modular interaction in a printer/tag sensor/mobile phone.

FIG. 3 shows a mobile phone 1 that includes both a printer module 4 and a Netpage tag sensor module 8. As with the embodiment of FIG. 2, the printer module 4 can be configured to print tagged or untagged pages. As shown in FIG. 3, where tagged pages 10 are produced (and irrespective of whether the tags were pre-printed or printed by the printer module 4), the Netpage tag sensor module 8 can be used to interact with the resultant printed media.

Figure 4:
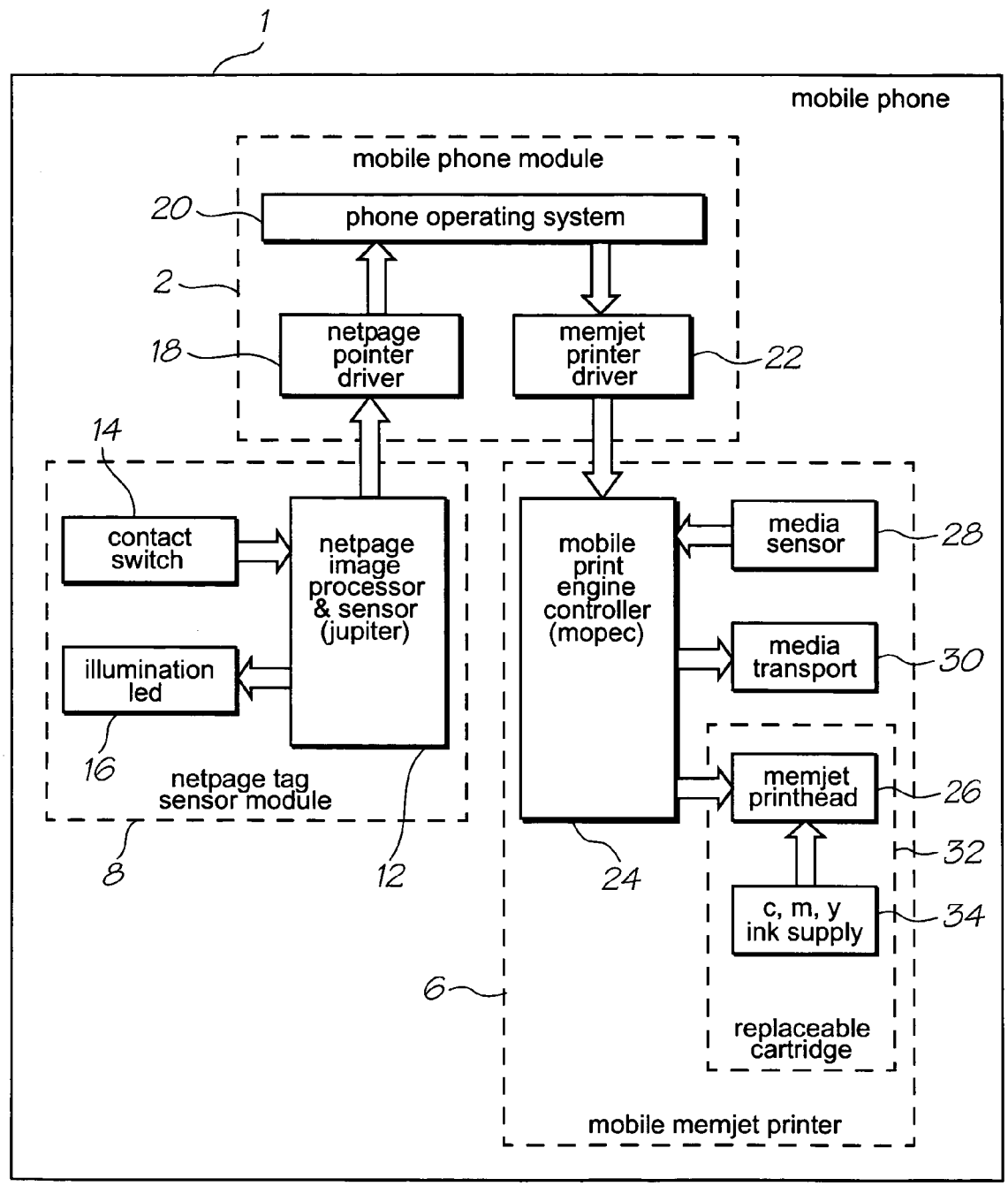
FIG. 4 is a more detailed schematic representation of the architecture within the mobile phone of FIG. 3.

A more detailed architectural view of the mobile phone 1 of FIG. 3 is shown in FIG. 4, in which features corresponding to those shown in FIG. 3 are indicated with the same reference numerals. It will be appreciated that FIG. 4 deals only with communication between various electronic components in the mobile telecommunications device and omits mechanical features. These are described in more detail below.

The Netpage tag sensor module 8 includes a monolithically integrated Netpage image sensor and processor 12 that captures image data and receives a signal from a contact switch 14. The contact switch 14 is connected to a nib (not shown) to determine when the nib is pressed into contact with a surface. The sensor and processor 12 also outputs a signal to control illumination of an infrared LED 16 in response to the stylus being pressed against the surface.

The image sensor and processor 12 outputs processed tag information to a Netpage pointer driver 18 that interfaces with the phone operating system 20 running on the mobile telecommunications device's processor (not shown).

Output to be printed is sent by the phone operating system 20 to a printer driver 22, which passes it on to a MoPEC chip 24. The MoPEC chip processes the output to generate dot data for supply to the printhead 26, as described in more detail below. The MoPEC chip 24 also receives a signal from a media sensor 28 indicating when the media is in position to be printed, and outputs a control signal to a media transport 30.

The printhead 26 is disposed within a replaceable cartridge 32, which also includes ink 34 for supply to the printhead.

Mobile Telecommunications Device Module

Figure 5:
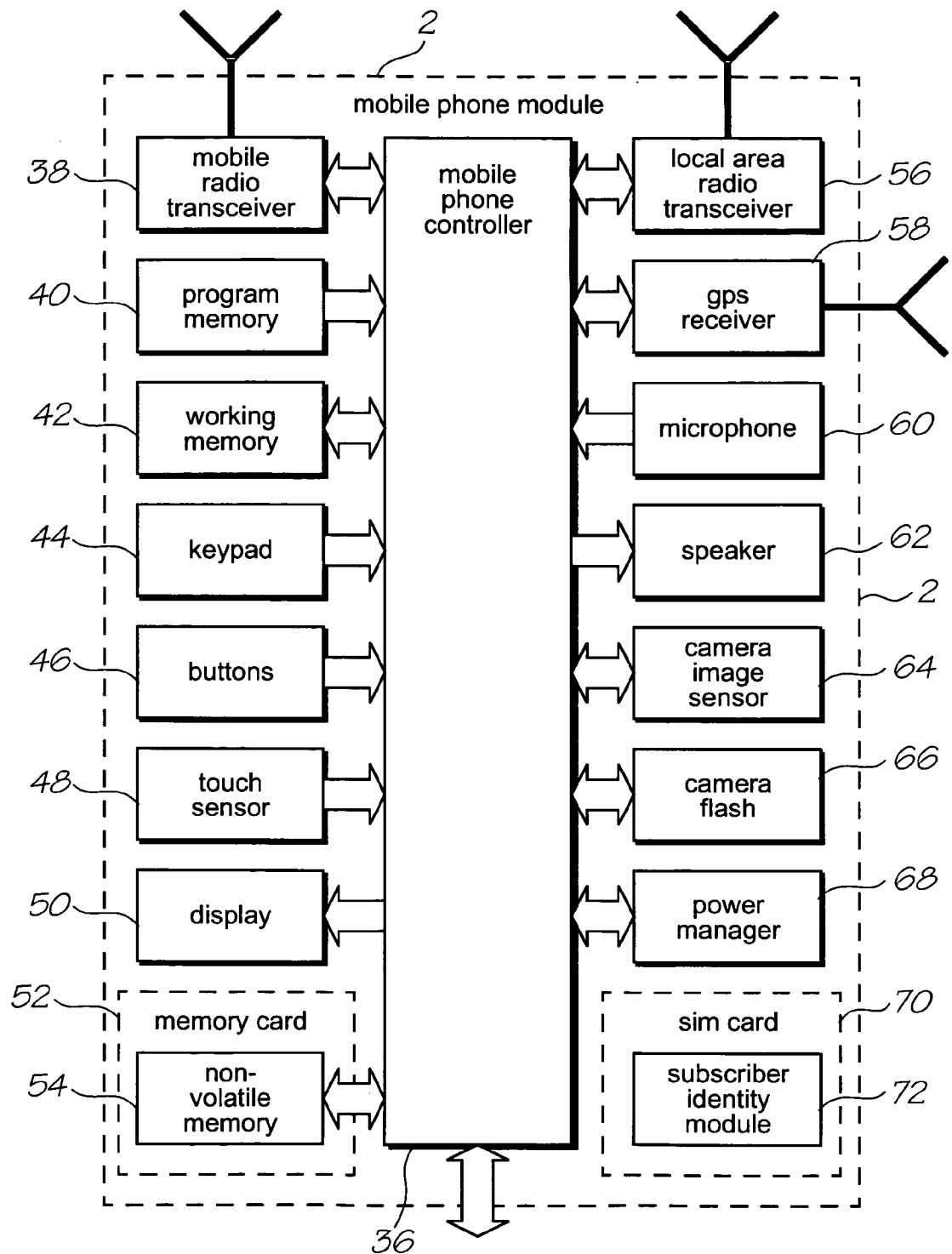
FIG. 5 is a more detailed schematic representation of the architecture within the mobile phone module of FIG. 4.

FIG. 5 shows the mobile phone module 2 in more detail. The majority of the components other than those directly related to printing and Netpage tag sensing are standard and well known to those in the art. Depending upon the specific implementation of the mobile phone 1, any number of the illustrated components can be included as part of one or more integrated circuits.

Operation of, and communication between, the mobile phone module 2 components is controlled by a mobile phone controller 36. The components include:
  mobile radio transceiver 38 for wireless communication with a mobile telecommunications network;
  program memory 40 for storing program code for execution on the mobile phone controller 36;
  working memory 42 for storing data used and generated by the program code during execution. Although shown as separate from the mobile phone controller 36, either or both memories 40 and 42 may be incorporated in the package or silicon of the controller;
  keypad 44 and buttons 46 for accepting numerical and other user input;
  touch sensor 48 which overlays display 50 for accepting user input via a stylus or fingertip pressure;
  removable memory card 52 containing non-volatile memory 54 for storing arbitrary user data, such as digital photographs or files;
  local area radio transceiver 56, such as a Bluetooth™ transceiver;
  GPS receiver 58 for enabling determination of the location of the mobile telecommunications device (alter-natively the phone may rely on mobile network mechanisms for determining its location);
  microphone 60 for capturing a user's speech;
  speaker 62 for outputting sounds, including voice during a phone call;
  camera image sensor 64 including a CCD for capturing images;
  camera flash 66;
  power manager 68 for monitoring and controlling power consumption of the mobile telecommunications device and its components; and
  SIM (subscriber Identity Module) card 70 including SIM 72 for identifying the subscriber to mobile networks.

The mobile phone controller 36 implements the baseband functions of mobile voice and data communications protocols such as GSM, GSM modem for data, GPRS and CDMA, as well as higher-level messaging protocols such as SMS and MMS.

The one or more local-area radio transceivers 56 enable wireless communication with peripherals such as headsets and Netpage pens, and hosts such as personal computers. The mobile phone controller 36 also implements the baseband functions of local-area voice and data communications protocols such as IEEE 802.11, IEEE 802.15, and Bluetooth™.

The mobile phone module 2 may also include sensors and/or motors (not shown) for electronically adjusting zoom, focus, aperture and exposure in relation to the digital camera.

Figure 6:
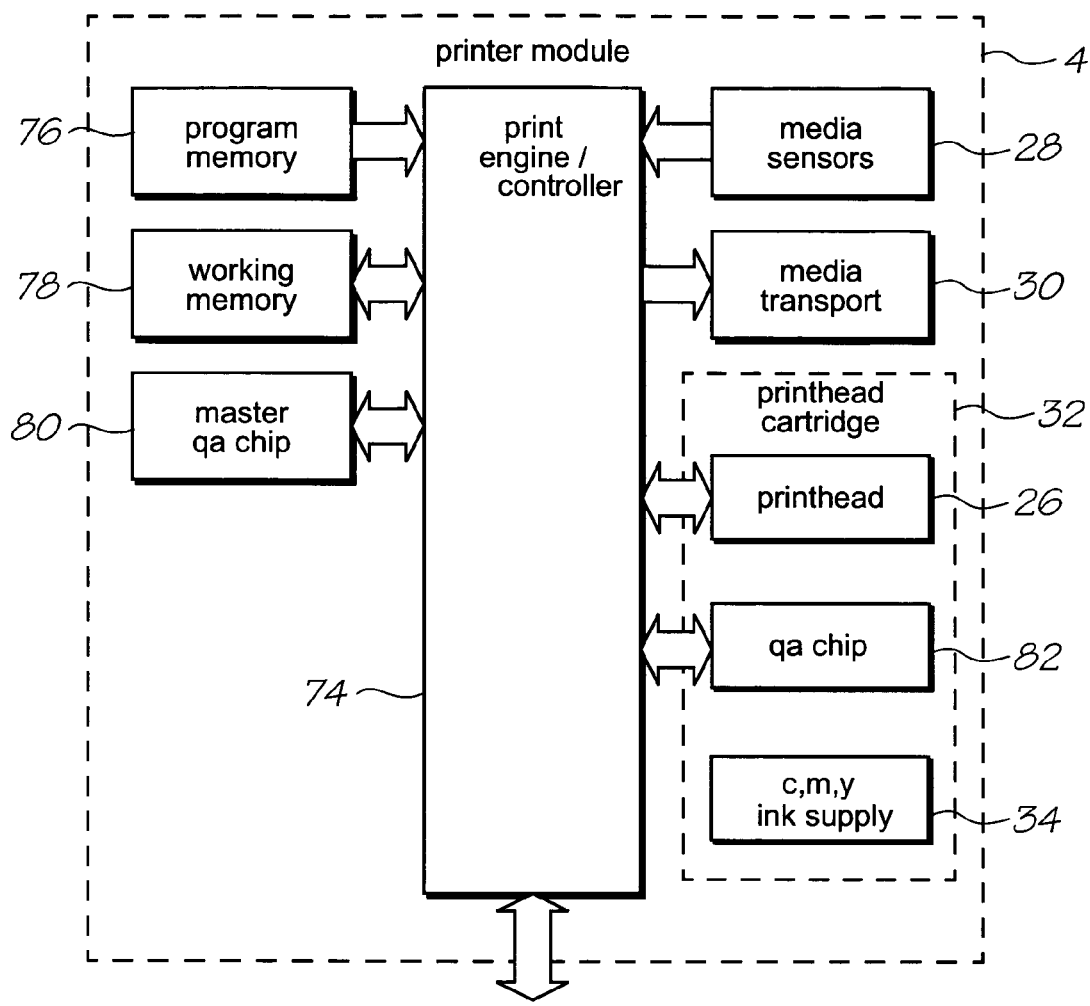
FIG. 6 is a more detailed schematic representation of the architecture within the printer module of FIG. 4.

Similarly, as shown in FIG. 6, components of the printer module 4 include:
  print engine controller (PEC) 74 in the form of a MoPEC device;
  program memory 76 for storing program code for execution by the print engine controller 74;
  working memory 78 for storing data used and generated by the program code during execution by the print engine controller 74; and
  a master QA chip 80 for authenticating printhead cartridge 32 via its QA chip 82.

Whilst the printhead cartridge in the preferred form includes the ink supply 34, the ink reservoirs can be housed in a separate cartridge in alternative embodiments.

Figure 7:
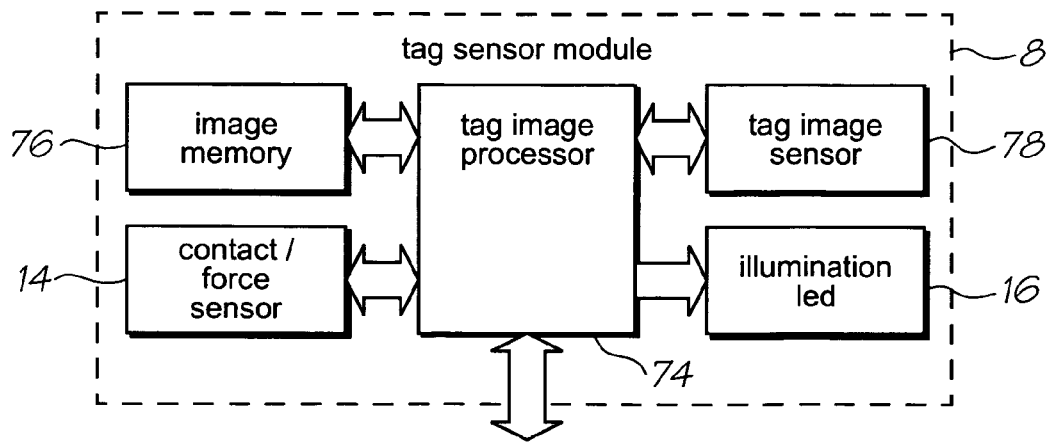
FIG. 7 is a more detailed schematic representation of the architecture within the tag sensor module of FIG. 4.

FIG. 7 shows the components of the tag sensor module 8, which includes a CMOS tag image processor 74 that communicates with image memory 76. A CMOS tag image sensor 78 sends captured image data to the processor 74 for processing. The contact sensor 14 indicates when a nib (not shown) is brought into contact with a surface with sufficient force to close a switch within the contact sensor 14. Once the switch is closed, the infrared LED 16 illuminates the surface, and the image sensor 78 captures at least one image and sends it to the image processor 74 for processing. Once processed (as described below in more detail), image data is sent to the mobile phone controller 36 for decoding.

Figure 8:
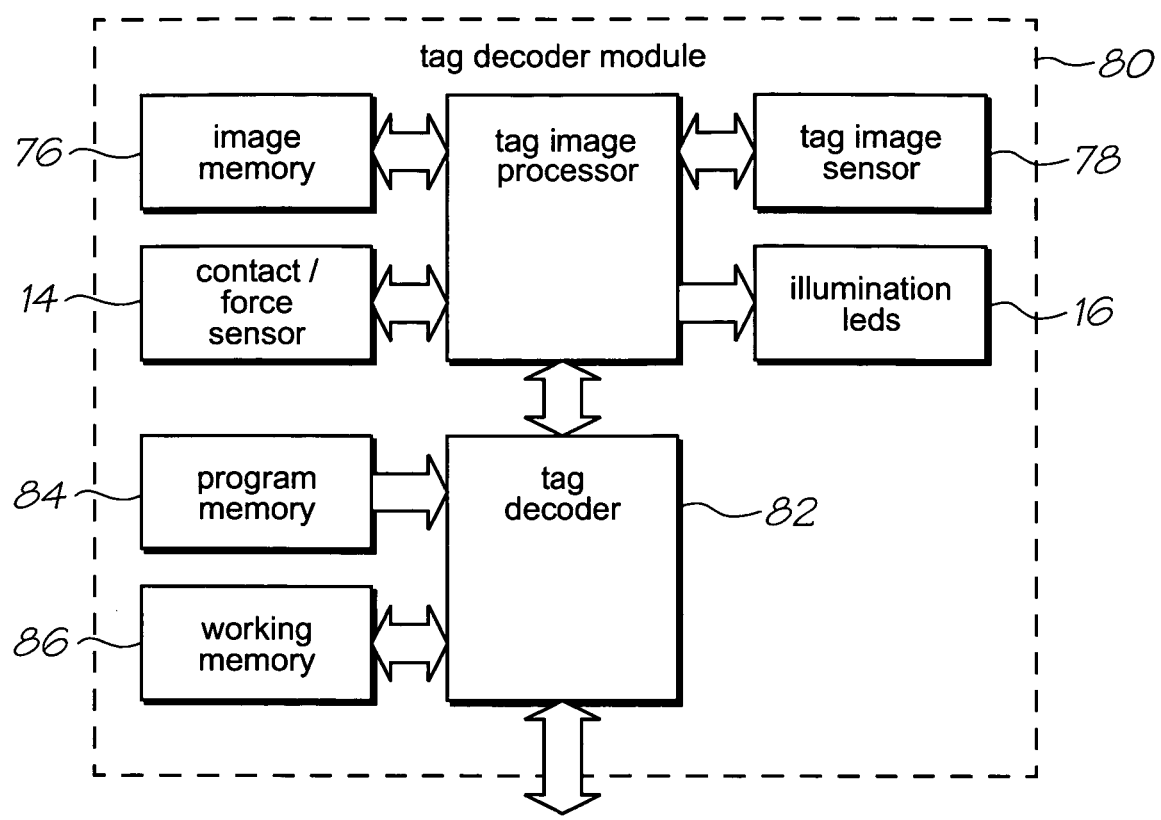
FIG. 8 is a schematic representation of the architecture within a tag decoder module for use instead of the tag sensor module of FIG. 4.

In an alternative embodiment, shown in FIG. 8, the tag sensor module 8 is replaced by a tag decoder module 84. The tag decoder module 80 includes all the elements of the tag sensor module 8, but adds a hardware-based tag decoder 86, as well as program memory 88 and working memory 90 for the tag decoder. This arrangement reduces the computational load placed on the mobile phone controller, with a corresponding increase in chip area compared to using the tag sensor module 8.

The Netpage sensor module can be incorporated in the form of a Netpage pointer, which is a simplified Netpage pen suitable mostly for activating hyperlinks. It preferably incorporates a non-marking stylus in place of the pen's marking nib (described in detail later in the specification); it uses a surface contact sensor in place of the pen's continuous force sensor; and it preferably operates at a lower position sampling rate, making it unsuitable for capturing drawings and handwriting. A Netpage pointer is less expensive to implement than a Netpage pen, and tag image processing and tag decoding can potentially be performed by software without hardware support, depending on sampling rate.

The various aspects of the invention can be embodied in any of a number of mobile telecommunications device types. Several different devices are described here, but in the interests of brevity, the detailed description will concentrate on the mobile telecommunications device embodiment.

Mobile Phone

One preferred embodiment is the non-Netpage enabled 'candy bar' mobile telecommunications device in the form of a mobile phone shown in FIGS. 9 to 14. A Netpage enabled version is described in a later section of this specification.

While a candy bar style phone is described here, it could equally take the form of a "flip" style phone, which includes a pair of body sections that are hinged to each other. Typically, the display is disposed on one of the body sections, and the keypad is disposed on the other, such that the display and keypad are positioned adjacent to each other when the device is in the closed position.

In further embodiments, the device can have two body sections that rotate or slide relative to each other. Typically, the aim of these mechanical relationships between first and second body sections is to protect the display from scratches and/or the keypad from accidental activation.

Photo printing is considered one of the most compelling uses of the mobile Memjet printer. A preferred embodiment of the invention therefore includes a camera, with its attendant processing power and memory capacity.

Figure 9:
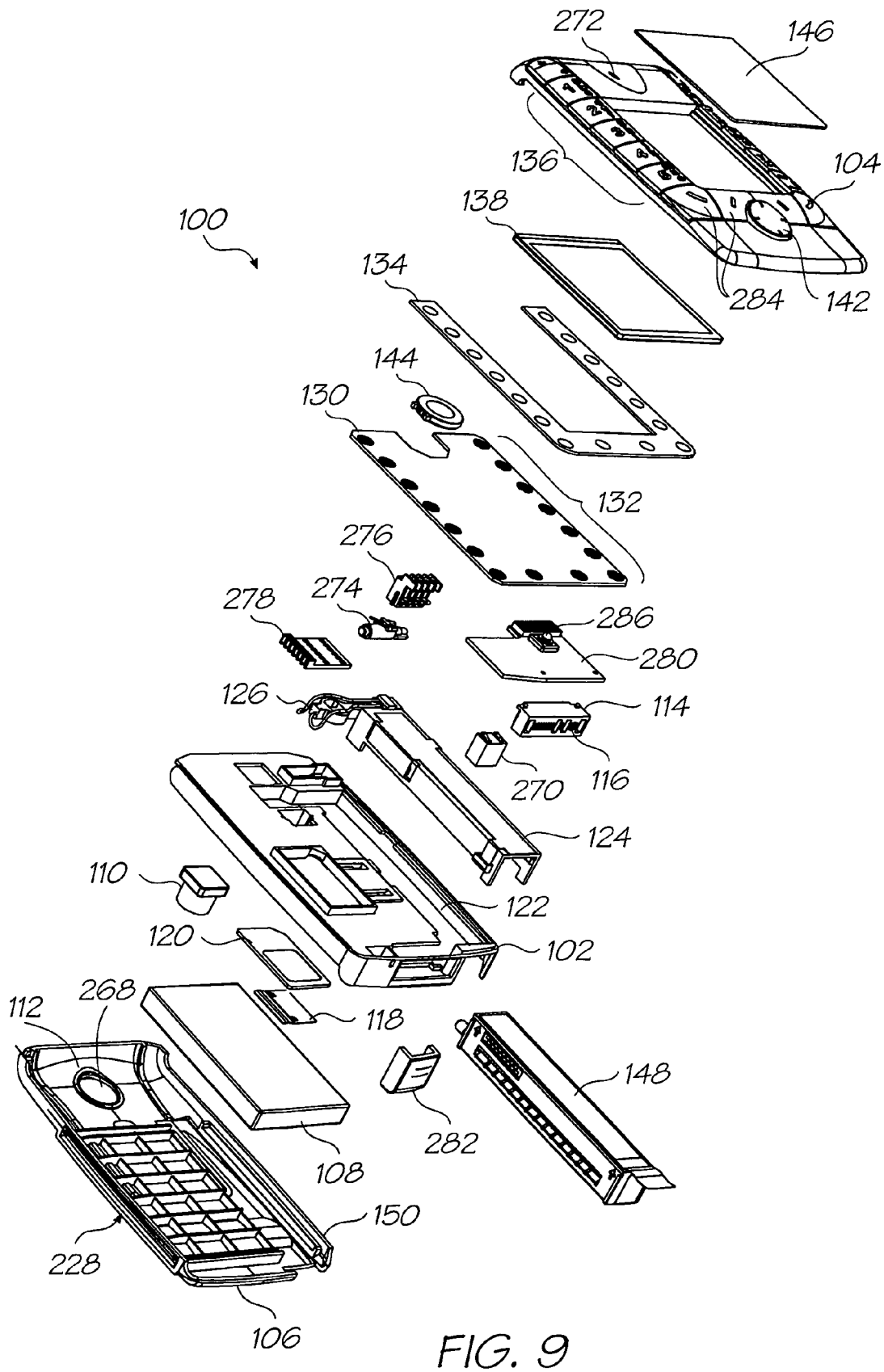
FIG. 9 is an exploded perspective view of a 'candy bar' type mobile phone embodiment of the present invention.
Figure 10:
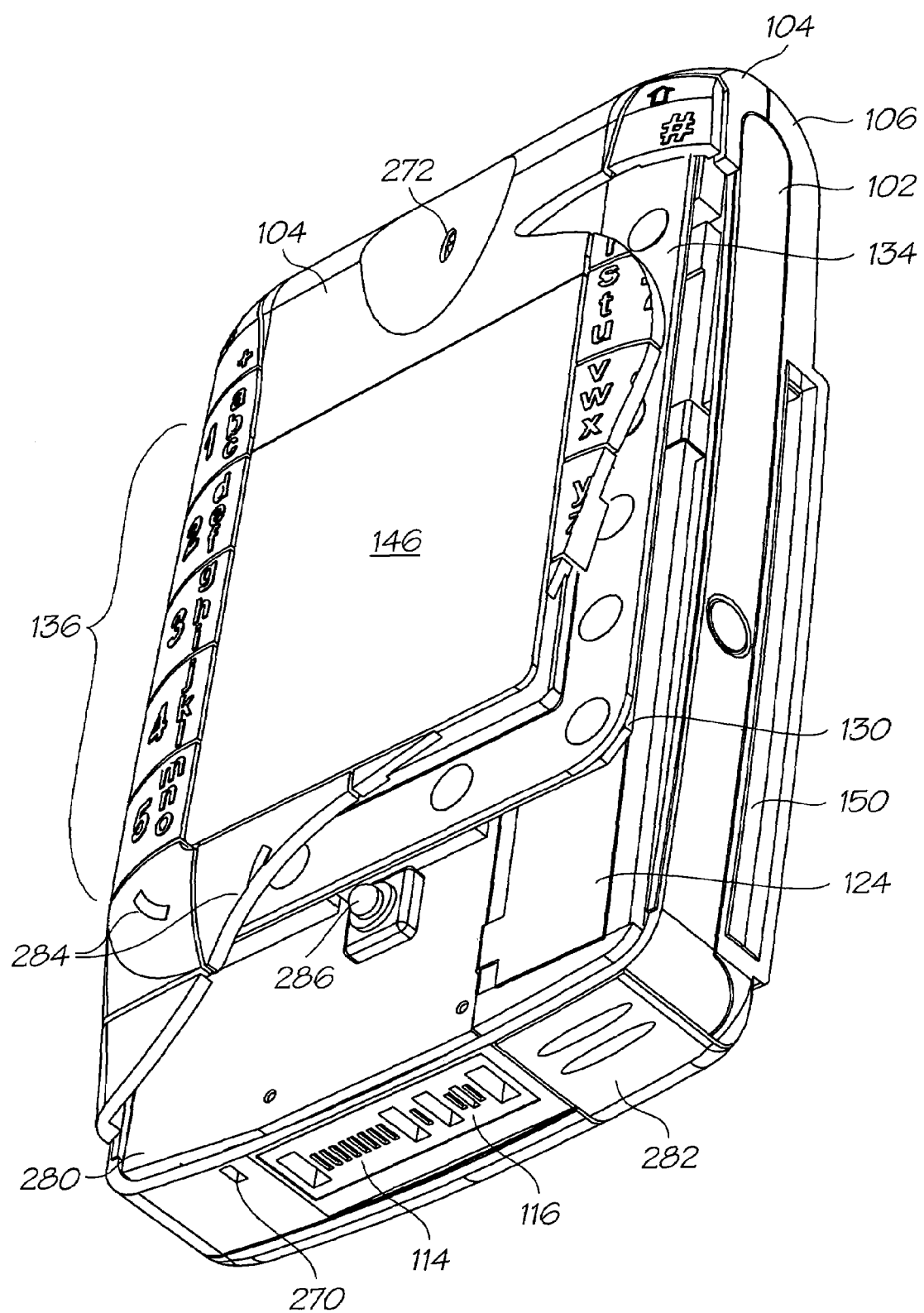
FIG. 10 is a partially cut away front and bottom perspective of the embodiment shown in FIG. 9.
Figure 11:
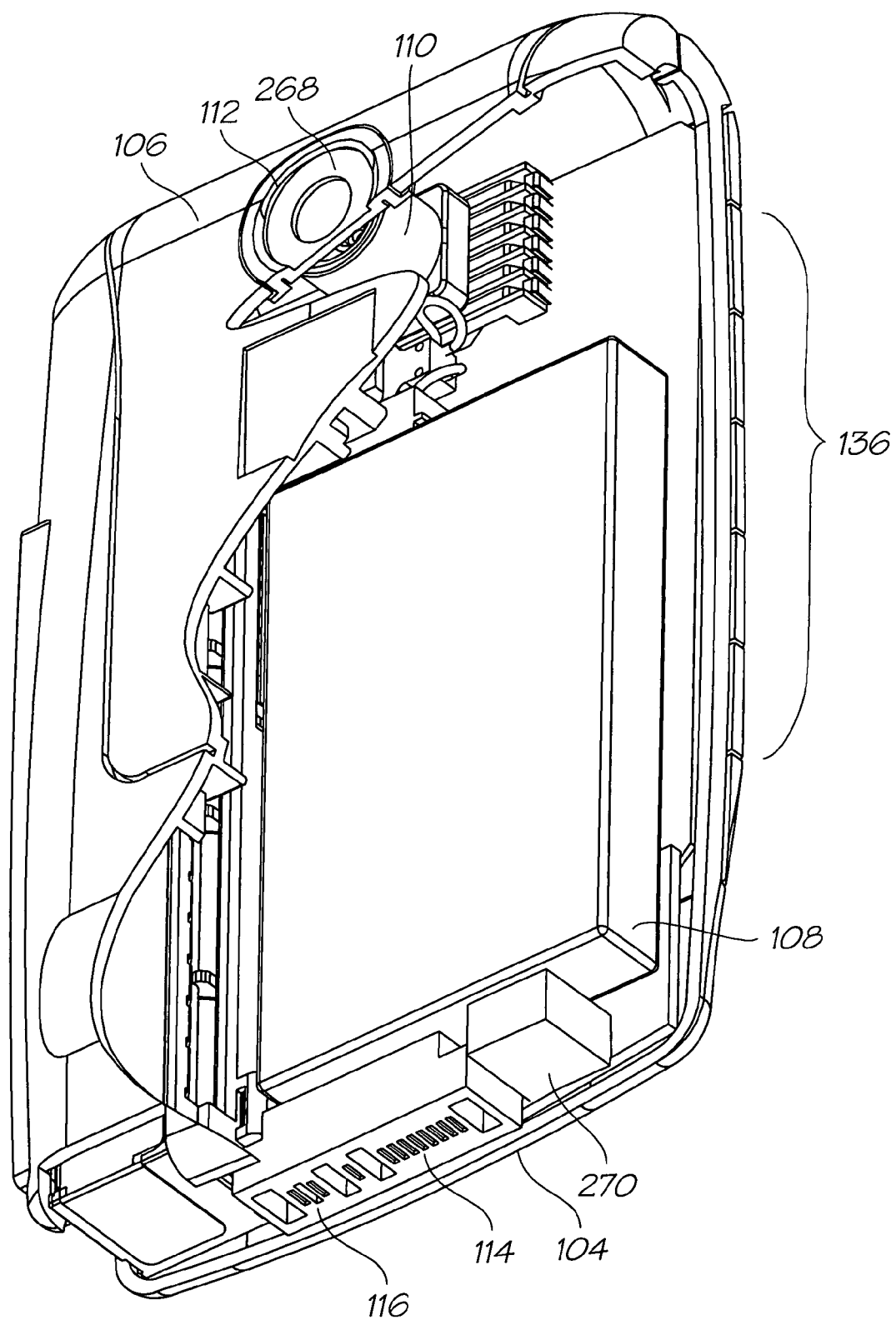
FIG. 11 is a partially cut away rear and bottom perspective of the embodiment shown in FIG. 9.

The elements of the mobile telecommunications device are best shown in FIG. 9, which (for clarity) omits minor details such as wires and hardware that operatively connect the various elements of the mobile telecommunications device together. The wires and other hardware will be well known to those skilled in the art.

The mobile phone 100 comprises a chassis moulding 102, a front moulding 104 and a rear cover moulding 106. A rechargeable battery 108, such as a lithium ion or nickel metal hydride battery, is mounted to the chassis moulding 102 and covered by the rear cover moulding 106. The battery 108 powers the various components of the mobile phone 100 via battery connector 276 and the camera and speaker connector 278.

The front moulding 104 mounts to the chassis to enclose the various components, and includes numerical interface buttons 136 positioned in vertical rows on each side of the display 138. A multi-directional control pad 142 and other control buttons 284 enable menu navigation and other control inputs. A daughterboard 280 is mounted to the chassis moulding 102 and includes a directional switch 286 for the multi directional control pad 142.

The mobile telecommunications device includes a cartridge access cover 132 that protects the interior of the mobile telecommunications device from dust and other foreign objects when a print cartridge 148 is not inserted in the cradle 124.

An optional camera module 110 is also mounted to the chassis moulding 102, to enable image capture through a hole 112 in the rear cover moulding 106. The camera module 110 includes a lens assembly and a CCD image sensor for capturing images. A lens cover 268 in the hole 112 protects the lens of the camera module 110. The rear cover moulding 106 also includes an inlet slot 228 and an outlet slot 150 through which print media passes.

The chassis moulding 102 supports a data/recharge connector 114, which enables a proprietary data cable to be plugged into the mobile telecommunications device for uploading and downloading data such as address book information, photographs, messages, and any type of information that might be sent or received by the mobile telecommunications device. The data/recharge connector 114 is configured to engage a corresponding interface in a desktop stand (not shown), which holds the mobile telecommunications device in a generally upright position whilst data is being sent or received by the mobile telecommunications device. The data/recharge connector also includes contacts that enable recharging of the battery 108 via the desktop stand. A separate recharge socket 116 in the data/recharge connector 114 is configured to receive a complimentary recharge plug for enabling recharging of the battery when the desktop stand is not in use.

A microphone 170 is mounted to the chassis moulding 102 for converting sound, such as a user's voice, into an electronic signal to be sampled by the mobile telecommunications device's analog to digital conversion circuitry. This conversion is well known to those skilled in the art and so is not described in more detail here.

A SIM (Subscriber Identity Module) holder 118 is formed in the chassis moulding 102, to receive a SIM card 120. The chassis moulding is also configured to support a print cartridge cradle 124 and a drive mechanism 126, which receive a replaceable print cartridge 148. These features are described in more detail below.

Another moulding in the chassis moulding 102 supports an aerial (not shown) for sending and receiving RF signals to and from a mobile telecommunications network.

A main printed circuit board (PCB) 130 is supported by the chassis moulding 102, and includes a number of momentary pushbuttons 132. The various integrated and discrete components that support the communications and processing (including printing processing) functions are mounted to the main PCB, but for clarity are not shown in the diagram.

A conductive elastomeric overlay 134 is positioned on the main PCB 130 beneath the keys 136 on the front moulding 104. The elastomer incorporates a carbon impregnated pill on a flexible profile. When one of the keys 136 is pressed, it pushes the carbon pill to a 2-wire open circuit pattern 132 on the PCB surface. This provides a low impedance closed circuit. Alternatively, a small dome is formed on the overlay corresponding to each key 132. Polyester film is screen printed with carbon paint and used in a similar manner to the carbon pills. Thin adhesive film with berylium copper domes can also be used.

A loudspeaker 144 is installed adjacent apertures 272 in the front moulding 104 to enable a user to hear sound such as voice communication and other audible signals.

A color display 138 is also mounted to the main PCB 130, to enable visual feedback to a user of the mobile telecommunications device. A transparent lens moulding 146 protects the display 138. In one form, the transparent lens is touch-sensitive (or is omitted and the display 138 is touch sensitive), enabling a user to interact with icons and input text displayed on the display 138, with a finger or stylus.

A vibration assembly 274 is also mounted to the chassis moulding 102, and includes a motor that drives an eccentrically mounted weight to cause vibration. The vibration is transmitted to the chassis 102 and provides tactile feedback to a user, which is useful in noisy environments where ringtones are not audible.

MoPEC—High Level

Documents to be printed must be in the form of dot data by the time they reach the printhead.

Before conversion to dot data, the image is represented by a relatively high spatial resolution bilevel component (for text and line art) and a relatively low spatial resolution contone component (for images and background colors). The bilevel component is compressed in a lossless format, whilst the contone component is compressed in accordance with a lossy format, such as JPEG.

Figure 15:
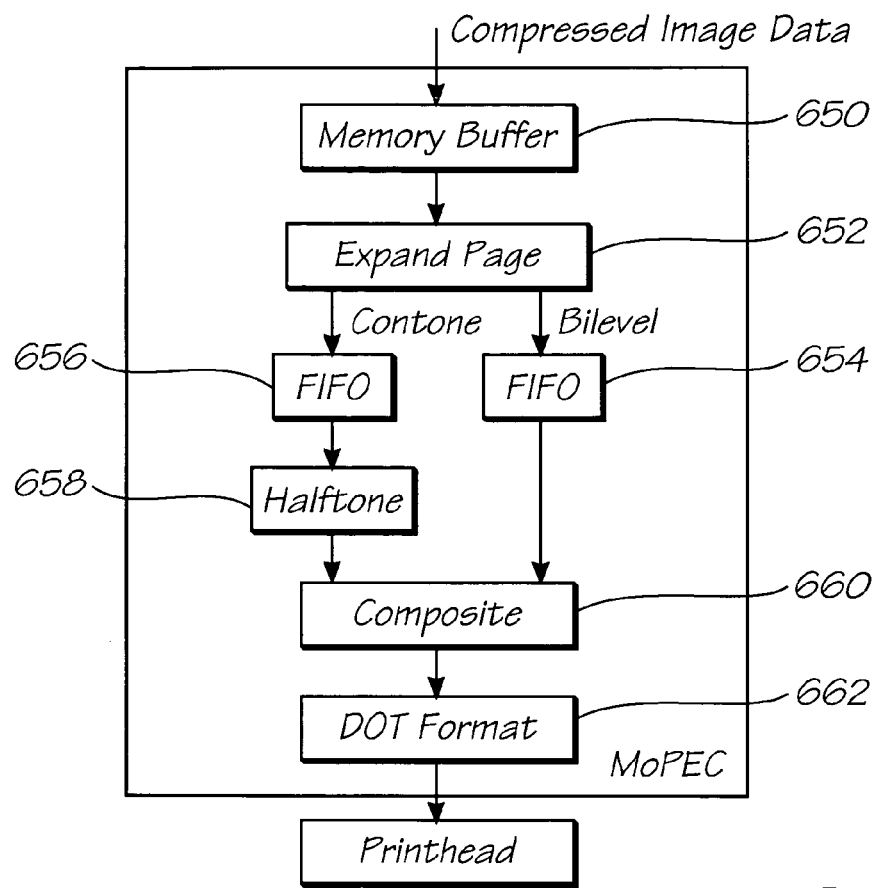
FIG. 15 is a schematic representation of a first mode of operation of MoPEC.

The preferred form of MoPEC is configurable to operate in either of two modes. In the first mode, as shown in FIG. 15, an image to be printed is received in the form of compressed image data. The compressed image data can arrive as a single bundle of data or as separate bundles of data from the same or different sources. For example, text can be received from a first remote server and image data for a banner advertisement can be received from another. Alternatively, either or both of the forms of data can be retrieved from local memory in the mobile device.

Upon receipt, the compressed image data is buffered in memory buffer 650. The bilevel and contone components are decompressed by respective decompressors as part of expand page step 652. This can either be done in hardware or software, as described in more detail below. The decompressed bilevel and contone components are then buffered in respective FIFOs 654 and 656.

The decompressed contone component is halftoned by a halftoning unit 658, and a compositing unit 660 then composites the bilevel component over the dithered contone component. Typically, this will involve compositing text over images. However, the system can also be run in stencil mode, in which the bilevel component is interpreted as a mask that is laid over the dithered contone component. Depending upon what is selected as the image component for the area in which the mask is being applied, the result can be text filled with the underlying image (or texture), or a mask for the image. The advantage of stencil mode is that the bilevel component is not dithered, enabling sharp edges to be defined. This can be useful in certain applications, such as defining borders or printing text comprising colored textures.

After compositing, the resultant image is dot formatted 662, which includes ordering dots for output to the printhead and taking into account any spatial or operative compensation issues, as described in more detail below. The formatted dots are then supplied to the printhead for printing, again as described in more detail below.

Figure 16:
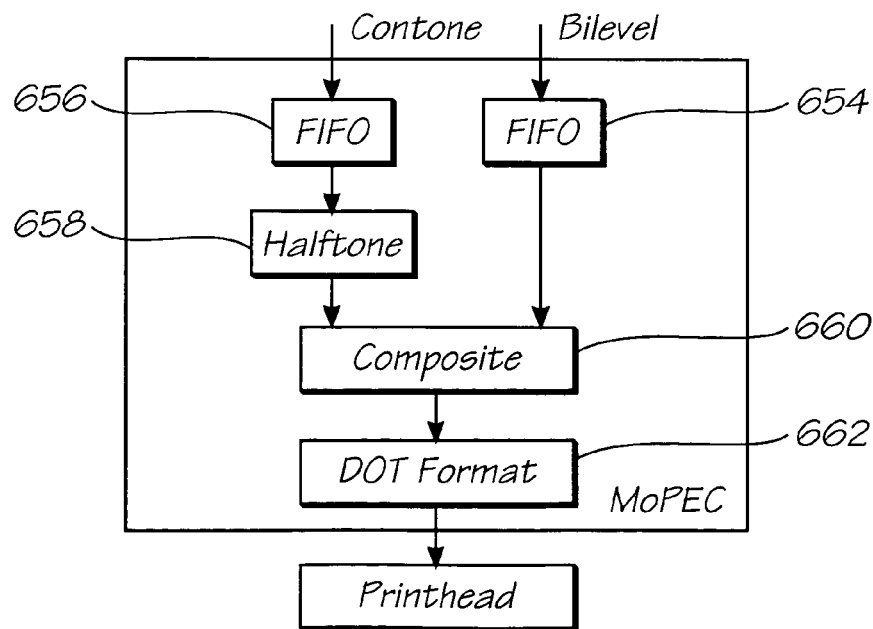
FIG. 16 is a schematic representation of a second mode of operation of MoPEC.

In the second mode of operation, as shown in FIG. 16, the contone and bilevel components are received in uncompressed form by MoPEC directly into respective FIFOs 656 and 654. The source of the components depends on the application. For example, the host processor in the mobile telecommunications device can be configured to generate the decompressed image components from compressed versions, or can simply be arranged to receive the uncompressed components from elsewhere, such as the mobile telecommunications network or the communication port described in more detail elsewhere.

Once the bilevel and contone components are in their respective FIFOs, MoPEC performs the same operations as described in relation to the first mode, and like numerals have therefore been used to indicate like functional blocks.

Figure 18:
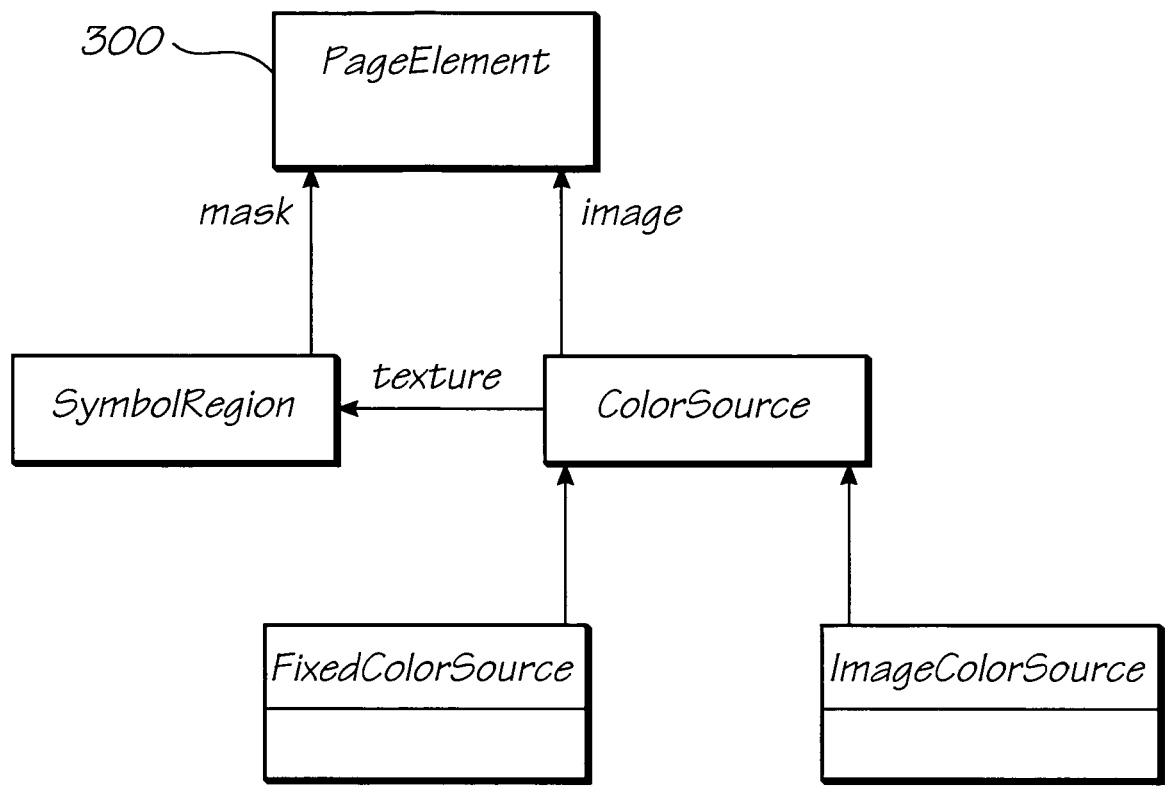
FIG. 18 shows a simplified UML diagram of a page element.

As shown in FIG. 18, the central data structure for the preferred printing architecture is a generalised representation of the three layers, called a page element. A page element can be used to represent units ranging from single rendered elements emerging from a rendering engine up to an entire page of a print job. FIG. 18 shows a simplified UML diagram of a page element 300. Conceptually, the bi-level symbol region selects between the two color sources.

MoPEC Device—Low Level

Figure 17:
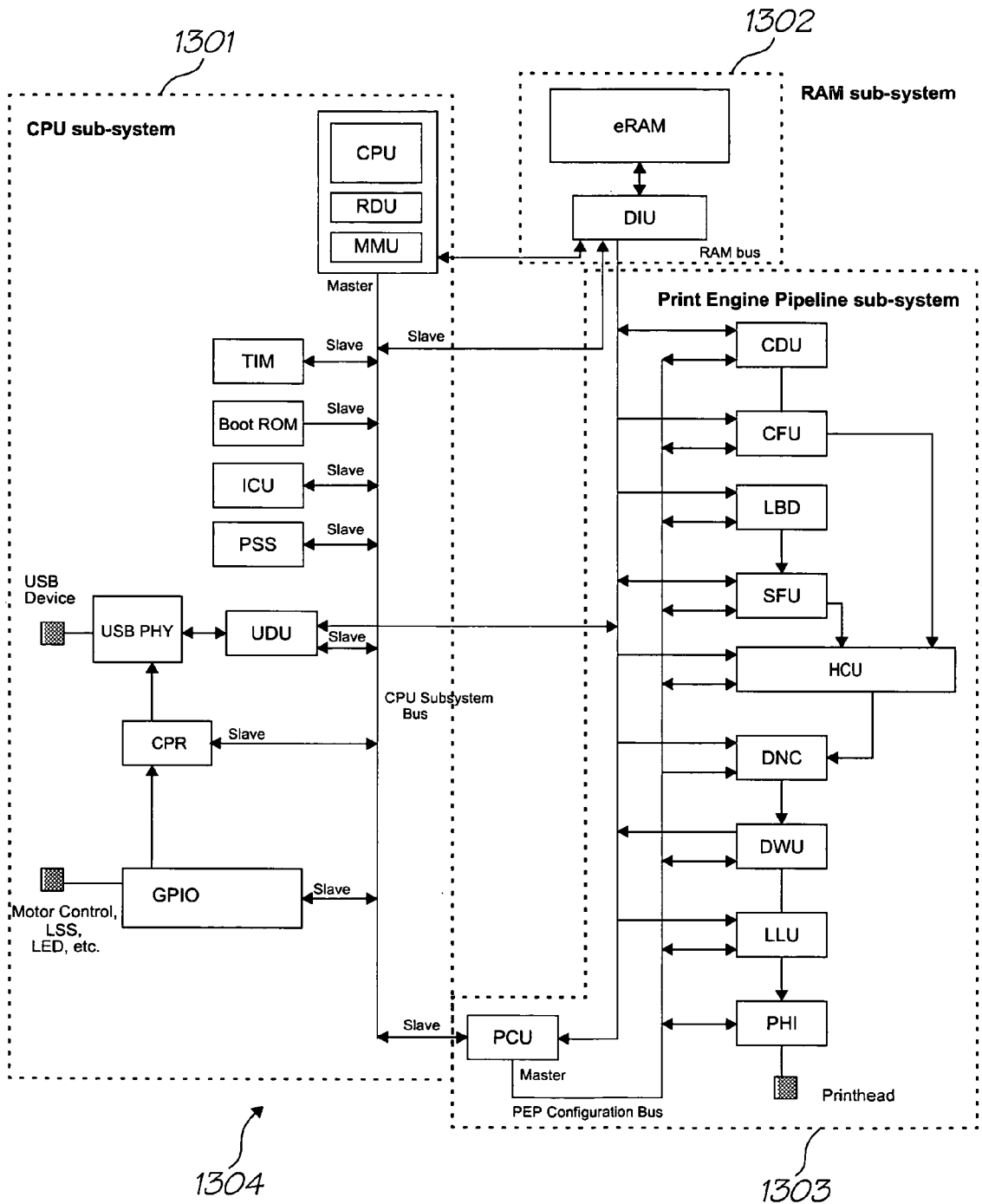
FIG. 17 is a schematic representation of the hardware components of a MoPEC device.

The hardware components of a preferred MoPEC device 326 are shown in FIG. 17 and described in more detail below.

Conceptually, a MoPEC device is simply a SoPEC device (ie, as described in cross-referenced application U.S. Ser. No. 10/727,181 filed on Dec. 2, 2003) that is optimized for use in a low-power, low print-speed environment of a mobile phone. Indeed, as long as power requirements are satisfied, a SoPEC device is capable of providing the functionality required of MoPEC. However, the limitations on battery power in a mobile device make it desirable to modify the SoPEC design.

As shown in FIG. 17, from the high level point of view a MoPEC consists of three distinct subsystems: a Central Processing Unit (CPU) subsystem 1301, a Dynamic Random Access Memory (DRAM) subsystem 1302 and a Print Engine Pipeline (PEP) subsystem 1303.

MoPEC has a much smaller eDRAM requirement than SoPEC. This is largely due to the considerably smaller print media for which MoPEC is designed to generate print data.

In one form, MoPEC can be provided in the form of a stand-alone ASIC designed to be installed in a mobile telecommunications device. Alternatively, it can be incorporated onto another ASIC that incorporates some or all of the other functionality required for the mobile telecommunications device.

The CPU subsystem 1301 includes a CPU that controls and configures all aspects of the other subsystems. It provides general support for interfacing and synchronizing the external printer with the internal print engine. It also controls low-speed communication to QA chips (which are described elsewhere in this specification) in cases where they are used. The preferred embodiment does not utilize QA chips in the cartridge or the mobile telecommunications device.

The CPU subsystem 1301 also contains various peripherals to aid the CPU, such as General Purpose Input Output (GPIO, which includes motor control), an Interrupt Controller Unit (ICU), LSS Master and general timers. The USB block provides an interface to the host processor in the mobile telecommunications device, as well as to external data sources where required. The selection of USB as a communication standard is a matter of design preference, and other types of communications protocols can be used, such as Firewire or SPI.

The DRAM subsystem 1302 accepts requests from the CPU, USB and blocks within the Print Engine Pipeline (PEP) subsystem. The DRAM subsystem 1302, and in particular the DRAM Interface Unit (DIU), arbitrates the various requests and determines which request should win access to the DRAM. The DIU arbitrates based on configured parameters, to allow sufficient access to DRAM for all requestors. The DIU also hides the implementation specifics of the DRAM such as page size, number of banks and refresh rates. It will be appreciated that the DRAM can be considerably smaller than in the original SoPEC device, because the pages being printed are considerably smaller.

Also, if the host processor can supply decompressed print data at a high enough rate, the DRAM can be made very small (of the order of 128-256 kbytes), since there is no need to buffer an entire page worth of information before commencing printing.

The Print Engine Pipeline (PEP) subsystem 1303 accepts compressed pages from DRAM and renders them to bi-level dots for a given print line destined for a printhead interface that communicates directly with the printhead. The first stage of the page expansion pipeline is the Contone Decoder Unit (CDU) and Lossless Bi-level Decoder (LBD). The CDU expands the JPEG-compressed contone (typically CMYK) layers and the LBD expands the compressed bi-level layer (typically K). The output from the first stage is a set of buffers: the Contone FIFO unit (CFU) and the Spot FIFO Unit (SFU). The CFU and SFU buffers are implemented in DRAM.

The second stage is the Halftone Compositor Unit (HCU), which halftones and dithers the contone layer and composites the bi-level spot layer over the resulting bi-level dithered layer.

A number of compositing options can be implemented, depending upon the printhead with which the MoPEC device is used. Up to six channels of bi-level data are produced from this stage, although not all channels may be present on the printhead. For example, in the preferred embodiment, the printhead is configured to print only CMY, with K pushed into the CMY channels, and IR omitted.

In the third stage, a Dead Nozzle Compensator (DNC) compensates for dead nozzles in the printhead by color redundancy and error diffusing of dead nozzle data into surrounding dots.

The resultant bi-level dot-data (being CMY in the preferred embodiment) is buffered and written to a set of line buffers stored in DRAM via a Dotline Writer Unit (DWU).

Finally, the dot-data is loaded back from DRAM, and passed to the printhead interface via a dot FIFO. The dot FIFO accepts data from a Line Loader Unit (LLU) at the system clock rate, while the PrintHead Interface (PHI) removes data from the FIFO and sends it to the printhead.

The amount of DRAM required will vary depending upon the particular implementation of MoPEC (including the system in which it is implemented). In this regard, the preferred MoPEC design is capable of being configured to operate in any of three modes. All of the modes available under the preferred embodiment assume that the received image data will be preprocessed in some way. The preprocessing includes, for example, color space conversion and scaling, where necessary.

In the first mode, the image data is decompressed by the host processor and supplied to MoPEC for transfer directly to the HCU. In this mode, the CDU and LBD are effectively bypassed, and the decompressed data is provided directly to the CFU and SFU to be passed on to the HCU. Because decompression is performed outside MoPEC, and the HCU and subsequent hardware blocks are optimized for their jobs, the MoPEC device can be clocked relatively slowly, and there is no need for the MoPEC CPU to be particularly powerful. As a guide, a clock speed of 10 to 20 MHz is suitable.

In the second mode, the image data is supplied to MoPEC in compressed form. To begin with, this requires an increase in MoPEC DRAM, to a minimum of about 256 kbytes (although double that is preferable). In the second mode, the CDU and LBD (and their respective buffers) are utilized to perform hardware decompression of the compressed contone and bilevel image data. Again, since these are hardware units optimized to perform their jobs, the system can be clocked relatively slowly, and there is still no need for a particularly powerful MoPEC processor. A disadvantage with this mode, however, is that the CDU and LBD, being hardware, are somewhat inflexible. They are optimized for particular decompression jobs, and in the preferred embodiment, cannot be reconfigured to any great extent to perform different decompression tasks.

In the third mode, the CDU and LBD are again bypassed, but MoPEC still receives image data in compressed form. Decompression is performed in software by the MoPEC CPU. Given that the CPU is a general-purpose processor, it must be relatively powerful to enable it to perform acceptably quick decompression of the compressed contone and bilevel image data. A higher clock speed will also be required, of the order of 3 to 10 times the clock speed where software decompression is not required. As with the second mode, at least 256 kbytes of DRAM are required on the MoPEC device. The third mode has the advantage of being programmable with respect to the type of decompression being performed. However, the need for a more powerful processor clocked at a higher speed means that power consumption will be correspondingly higher than for the first two modes.

It will be appreciated that enabling all of these modes to be selected in one MoPEC device requires the worst case features for all of the modes to be implemented. So, for example, at least 256 kbytes of DRAM, the capacity for higher clock speeds, a relatively powerful processor and the ability to selectively bypass the CDU and LBD must all be implemented in MoPEC. Of course, one or more of the modes can be omitted for any particular implementation, with a corresponding removal of the limitations of the features demanded by the availability of that mode.

In the preferred form, the MoPEC device is color space agnostic. Although it can accept contone data as CMYX or RGBX, where X is an optional 4th channel, it also can accept contone data in any print color space. Additionally, MoPEC provides a mechanism for arbitrary mapping of input channels to output channels, including combining dots for ink optimization and generation of channels based on any number of other channels. However, inputs are preferably CMY for contone input and K (pushed into CMY by MOPEC) for the bi-level input.

In the preferred form, the MoPEC device is also resolution agnostic. It merely provides a mapping between input resolutions and output resolutions by means of scale factors. The preferred resolution is 1600 dpi, but MoPEC actually has no knowledge of the physical resolution of the printhead to which it supplies dot data.

| Sub-system | Unit Acronym | Unit Name | Description |
|---|---|---|---|
| DRAM | DIU | DRAM interface unit | Provides interface for DRAM read and write access for the various MoPEC units, CPU and the USB block. The DIU provides arbitration between competing units and controls DRAM access. |
|  | DRAM | Embedded DRAM | 128 kbytes (or greater, depending upon implementation) of embedded DRAM. |
| CPU | CPU | Central Processing Unit | CPU for system configuration and control |
|  | MMU | Memory Management Unit | Limits access to certain memory address areas in CPU user mode |
|  | RDU | Real-time Debug Unit | Facilitates the observation of the contents of most of the CPU addressable registers in MoPEC, in addition to some pseudo-registers in real time |
|  | TIM | General Timer | contains watchdog and general system timers |
|  | LSS | Low Speed Serial Interface | Low level controller for interfacing with QA chips |
|  | GPIO | General Purpose IOs | General IO controller, with built-in motor control unit, LED pulse units and de-glitch circuitry |
|  | ROM | Boot ROM | 16 KBytes of System Boot ROM code |
|  | ICU | Interrupt Controller Unit | General Purpose interrupt controller with configurable priority, and masking. |
|  | CPR | Clock, Power and Reset block | Central Unit for controlling and generating the system clocks and resets and powerdown mechanisms |
|  | PSS | Power Save Storage | Storage retained while system is powered down |
|  | USB | Universal Serial Bus Device | USB device controller for interfacing with the host USB. |
| Print Engine Pipeline (PEP) | PCU | PEP controller | Provides external CPU with the means to read and write PEP Unit registers, and read and write DRAM in single 32-bit chunks. |
|  | CDU | Contone Decoder Unit | Expands JPEG compressed contone layer and writes decompressed contone to DRAM |
|  | CFU | Contone FIFO Unit | Provides line buffering between CDU and HCU |
|  | LBD | Lossless Bi-level Decoder | Expands compressed bi-level layer. |
|  | SFU | Spot FIFO Unit | Provides line buffering between LBD and HCU |
|  | HCU | Halftoner Compositor Unit | Dithers contone layer and composites the bi-level spot and position tag dots. |
|  | DNC | Dead Nozzle Compensator | Compensates for dead nozzles by color redundancy and error diffusing dead nozzle data into surrounding dots. |
|  | DWU | Dotline Writer Unit | Writes out dot data for a given printline to the line store DRAM |
|  | LLU | Line Loader Unit | Reads the expanded page image from line store, formatting the data appropriately for the bi-lithic printhead. |
|  | PHI | PrintHead Interface | Responsible for sending dot data to the printhead and for providing line synchronization between multiple MoPECs. Also provides test interface to printhead such as temperature monitoring and Dead Nozzle Identification. |

Software Dot Generation

Whilst speed and power consumption considerations make hardware acceleration desirable, it is also possible for some, most or all of the functions performed by the MoPEC integrated circuit to be performed by a general purpose processor programmed with suitable software routines. Whilst power consumption will typically increase to obtain similar performance with a general purpose processor (due to the higher overheads associated with having a general purpose processor perform highly specialized tasks such as decompression and compositing), this solution also has the advantage of easy customization and upgrading. For example, if a new or updated JPEG standard becomes widely used, it may be desirable to simply update the decompression algorithm performed by a general purpose processor. The decision to move some or all of the MoPEC integrated circuit's functionality into software needs to be made commercially on a case by case basis.

QA Chips

The preferred form of the invention does not use QA chips to authenticate the cartridge when it is inserted. However, in alternative embodiments, the print cartridge has a QA chip 82 that can be interrogated by a master QA chip 80 installed in the mobile device (see FIG. 6). QA chips in this context are designed to ensure the quality of the ink supply so the printhead nozzles will not be damaged during prints, and the quality of the software to ensure printheads and mechanics are not damaged.

There are a number of ways that QA chips can be used with MoPEC. For example, each MoPEC can have an associated printer QA, which stores printer attributes such as maximum print speed. An ink cartridge for use with the system can also contain an ink QA chip, which stores cartridge information such as the amount of ink remaining. The cartridge can also have a QA chip configured to act as a ROM (effectively as an EEPROM) that stores printhead-specific information such as dead nozzle mapping and printhead characteristics. The CPU in the MoPEC device can optionally load and run program code from a QA Chip that effectively acts as a serial EEPROM. Finally, the CPU in the SoPEC device can run a logical QA chip (ie, a software QA chip).

Usually, all QA chips in the system are physically identical, with only the contents of flash memory differentiating one from the other.

Each MoPEC device has an LSS system bus that can communicate with QA devices for system authentication and ink usage accounting. A large number of QA devices can be communicated with via the bus.

Data passed between the QA chips is authenticated by way of digital signatures. In the preferred embodiment, HMAC-SHA1 authentication is used for data, and RSA is used for program code, although other schemes could be used instead.

The QA chips preferably include some or all of the possible protections mechanisms that make the QA chip relatively difficult to attack. Many of these features are associated with the way in which secret information (in the form of bit-patterns) is stored in non-volatile memory of the QA chip (which in the preferred form is flash memory). Others deal with hard-coded limitations in the way software is loaded from flash memory. Yet others deal with the hard-coded manner in which data in certain registers can be modified; for example, registers containing data representing remaining ink levels in a reservoir can only be decremented.

Any of a number of techniques can be used to make it more difficult for potential hackers to extract key data (in the form of bit-patterns) from non-volatile memory. For example:

- keys are stored in different places in memory across multiple instances of the QA device (the software for each device being customized with the knowledge of that location);
- one or more of the keys are stored as a key/inverse-key pair in the memory; and/or
- a second key is stored indirectly in the non-volatile memory in the form of a result of applying a function to the outcome of a first function. The first function is applied to a first key (which is stored in the non-volatile memory) and the outcome of applying a one-way function to the second key. The by storing the first key and result of the first function in the non-volatile memory, the second key is stored only indirectly. The one way function will usually be selected to be more cryptographically secure than the first function.

Restrictions can be made on the way that communications are handled and processed. For example:

- communications between the QA chip in the cartridge and the QA chip in the mobile device can be made relatively secure through the use of digital signatures (preferably using variant keys, as described in various applications and patents cross-referenced by assignee); and/or
- signed messages between the QA chips can include, as part of the payload, an indication of the type of instruction in the payload;

There are also physical mechanisms protecting each QA chip. For example, an anti-tamper line formed in a layer of the integrated circuit causes resetting of the integrated circuit and/or erasure of memory contents in the event it is tampered with. This prevents attempts to shave off covering layers of semiconductor to access memory contents using various scanning mechanisms.

Another feature is the use of relatively unique identities within a related series of QA chips. For example, each QA chip, or at least each QA used in a particular range of products, stores its own identity. The identity is relatively unique, which means that it is either completely unique (i.e. it only ever appears on that one QA chip and is never repeated on another QA chip), or it is rare enough that it is highly unlikely an attacker learning the key of one integrated circuit will be able to use it in compromising another randomly selected integrated circuit.

All of these features are described in more detail in assignee's published patent application U.S. Ser. No. 10/754,536 filed on Jan. 12, 2004, the contents of which are incorporated herein by cross-reference.

Piezoelectric Drive System

Figure 19:
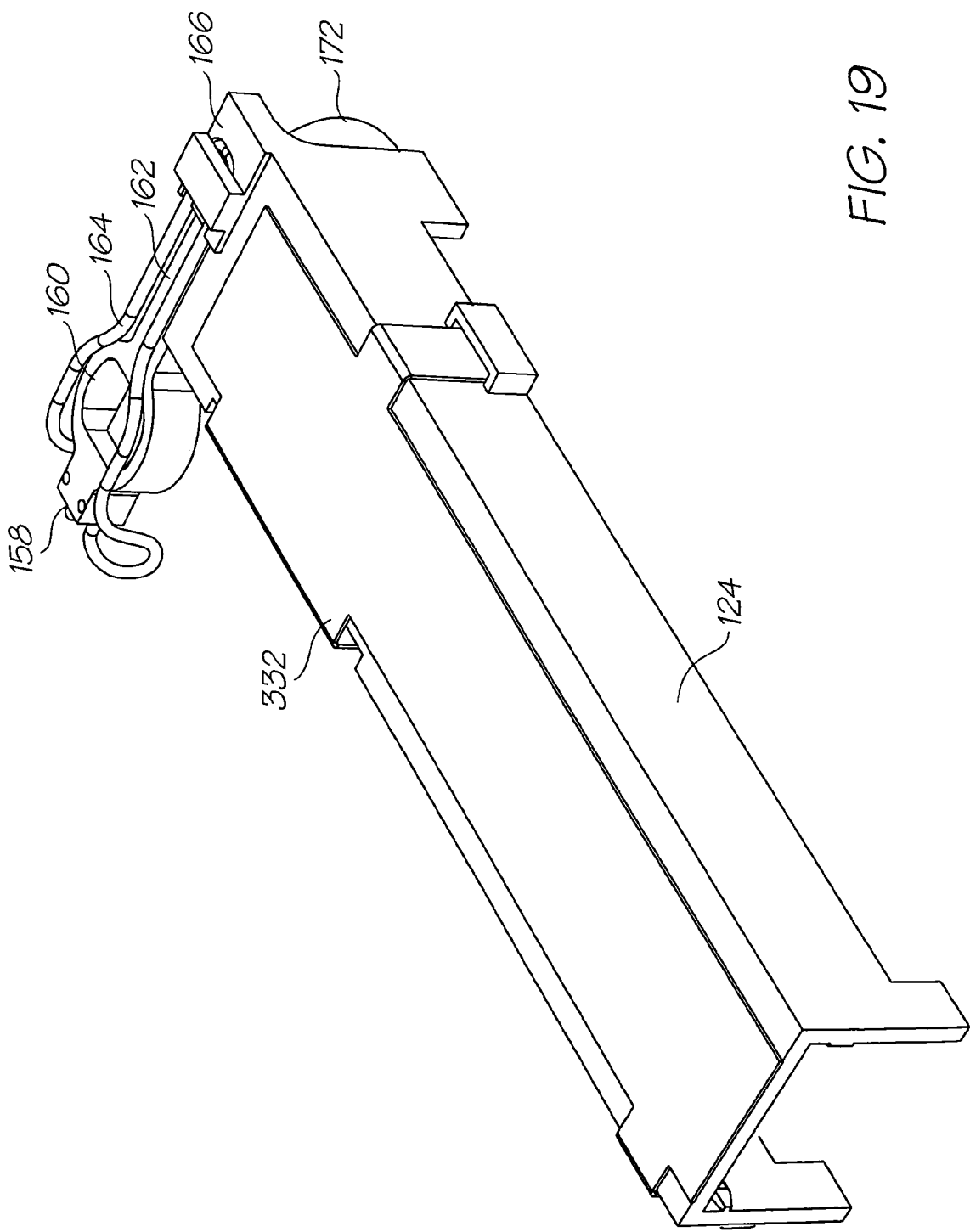
FIG. 19 is a top perspective of the cradle assembly and piezoelectric drive system.
Figure 20:
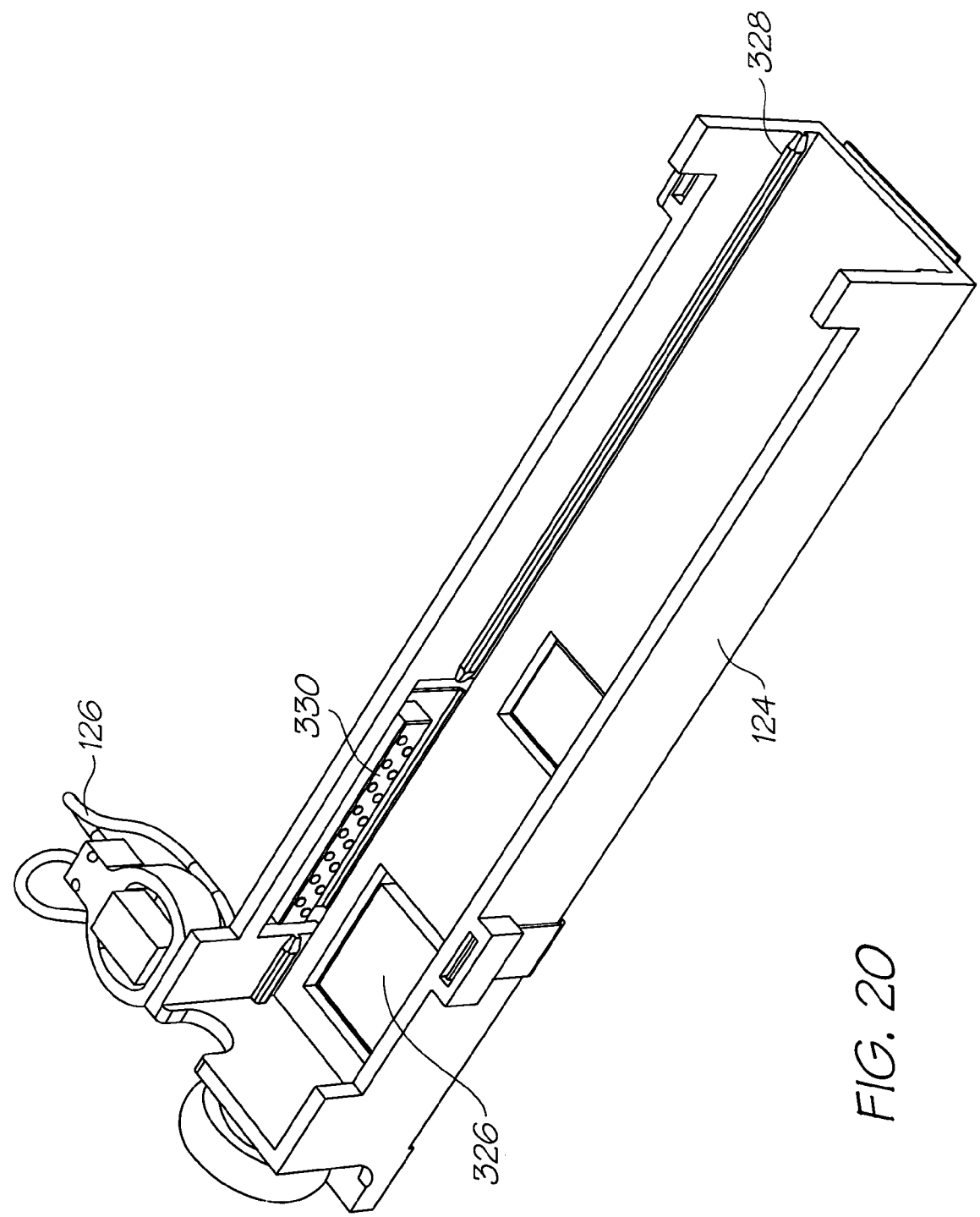
FIG. 20 is a bottom perspective of the cradle assembly and piezoelectric drive system.
Figure 21:
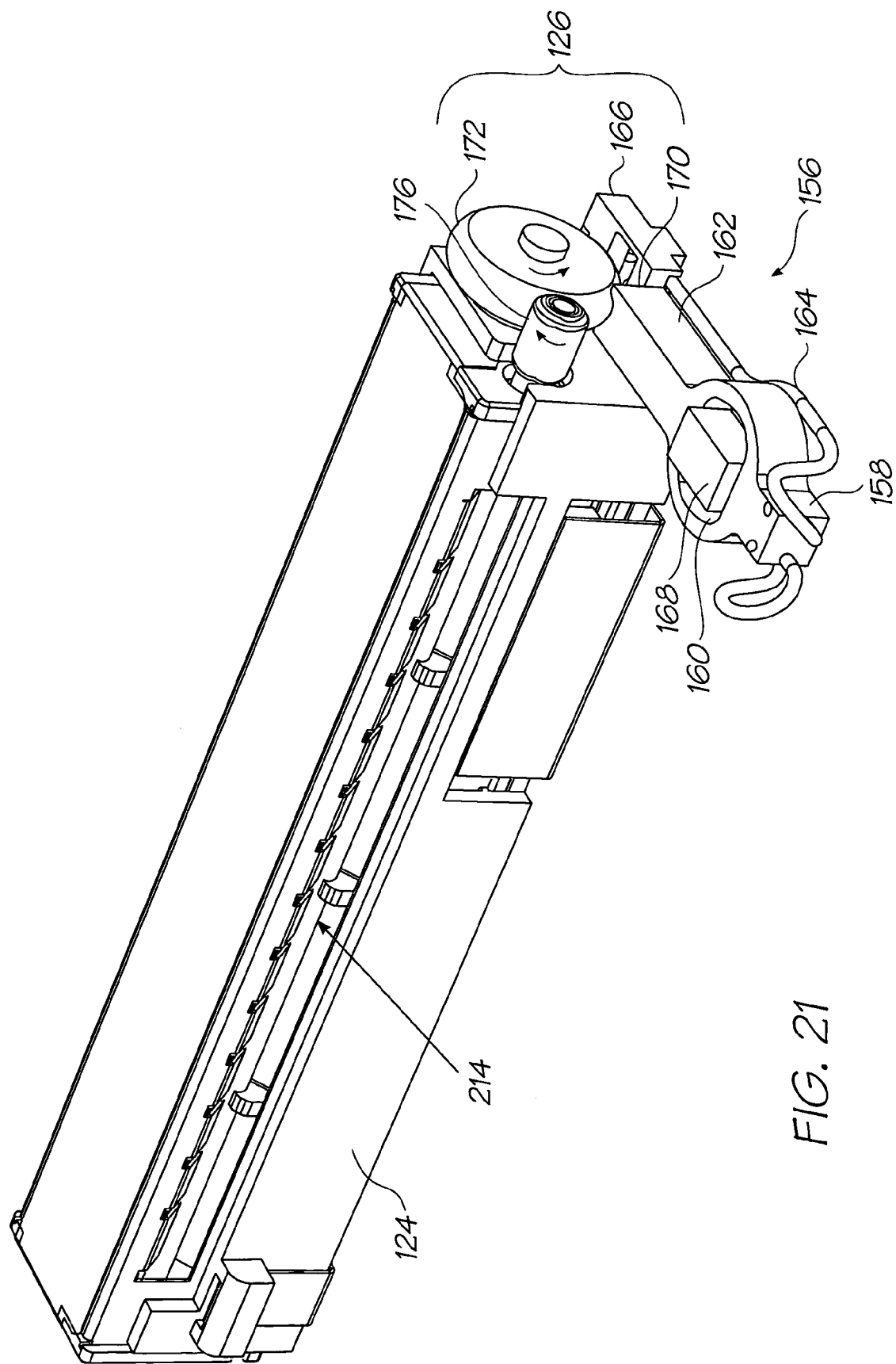
FIG. 21 is a bottom perspective of the print cartridge installed in the cradle assembly.
Figure 22:
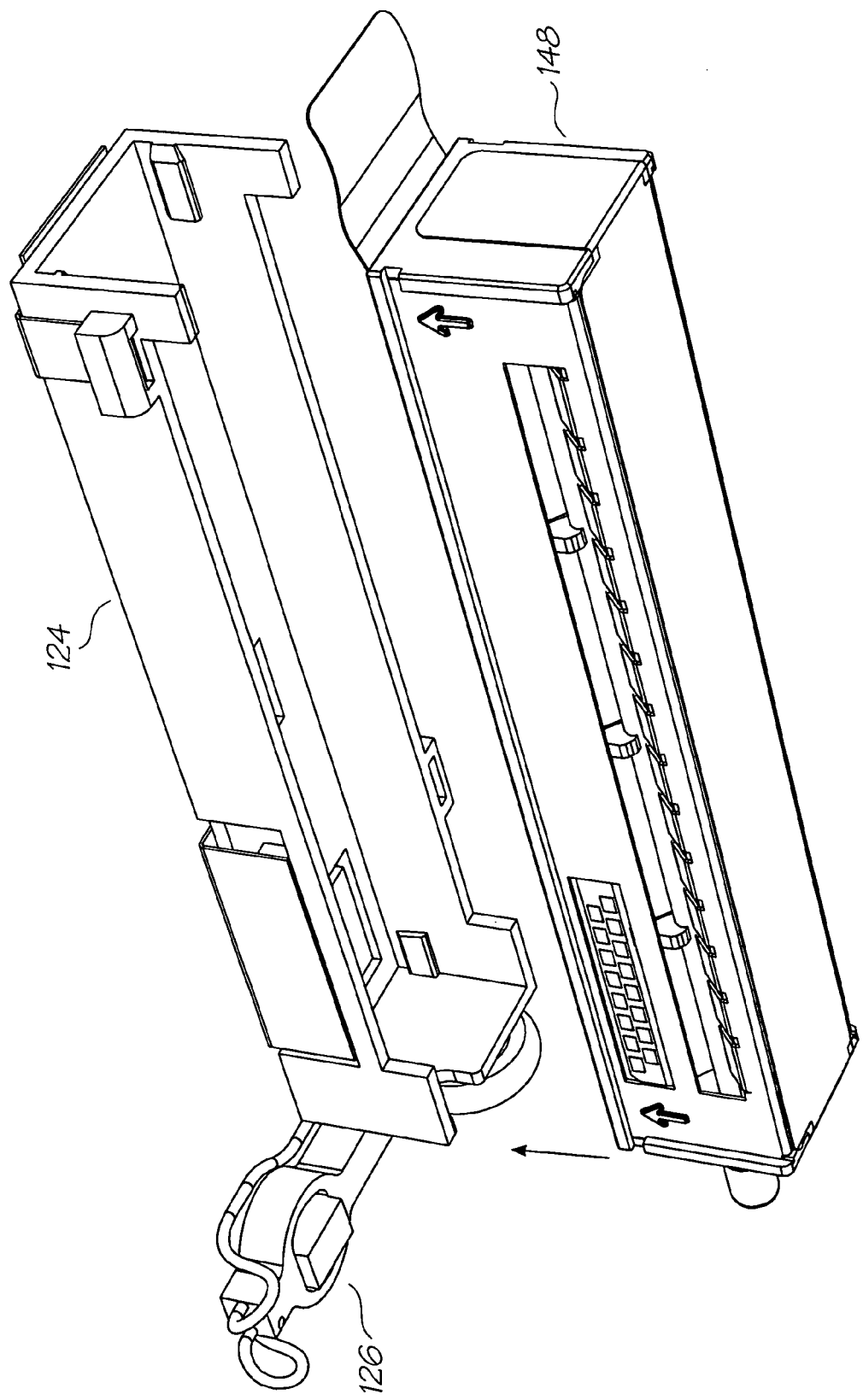
FIG. 22 is a bottom perspective of the print cartridge removed from the cradle assembly.

FIGS. 19 to 22 show a piezoelectric drive system 126 for driving print media past the printhead. As best shown in FIG. 21, the drive system 126 includes a resonator 156 that includes a support end 158, a through hole 160, a cantilever 162 and a spring 164. The support 158 is attached to the spring 164, which in turn is attached to a mounting point 166 on the cradle 124. A piezoelectric element 168 is disposed within the through hole 160, extending across the hole to link the support end 158 with the cantilever 162. The element 168 is positioned adjacent one end of the hole so that when it deforms, the cantilever 162 deflects from its quiescent position by a minute amount.

A tip 170 of the cantilever 162 is urged into contact with a rim of a drive wheel 172 at an angle of about 50 degrees.

In turn, the drive wheel 172 engages a rubber roller 176 at the end of the drive shaft 178. The drive shaft 178 engages and drives the print media past the printhead (described below with reference to FIGS. 12 and 14).

Drive wires (not shown) are attached to opposite sides of the piezoelectric element 168 to enable supply of a drive signal. The spring, piezo and cantilever assembly is a structure with a set of resonant frequencies. A drive signal excites the structure to one of the resonant modes of vibration and causes the tip of the cantilever 162 to move in such a way that the drive wheel 172 rotates. In simple terms, when piezoelectric element expands, the tip 170 of the cantilever pushes into firmer contact with the rim of the drive wheel. Because the rim and the tip are relatively stiff, the moving tip causes slight rotation of the drive wheel in the direction shown. During the rest of the resonant oscillation, the tip 170 loses contact with the rim and withdraws slightly back towards the starting position. The subsequent oscillation then pushes the tip 170 down against the rim again, at a slightly different point, to push the wheel through another small rotation. The oscillatory motion of the tip 170 repeats in rapid succession and the drive wheel is moved in a series of small angular displacements. However, as the resonant frequency is high (of the order of kHz), the wheel 172, for all intents and purposes, has a constant angular velocity.

In the embodiment shown, a drive signal at about 85 kHz rotates the drive wheel in the anti-clockwise direction (as shown in FIG. 21).

Although the amount of movement per cycle is relatively small (of the order of a few micrometers), the high rate at which pulses are supplied means that a linear movement (i.e. movement of the rim) of up to 300 mm per second can be achieved. A different mode of oscillation can be caused by increasing the drive signal frequency to 95 kHz, which causes the drive wheel to rotate in the reverse direction. However, the preferred embodiment does not take advantage of the reversibility of the piezoelectric drive.

Precise details of the operation of the piezoelectric drive can be obtained from the manufacturer, Elliptec AG of Dortmund, Germany.

Motor Drive System

Figure 23:
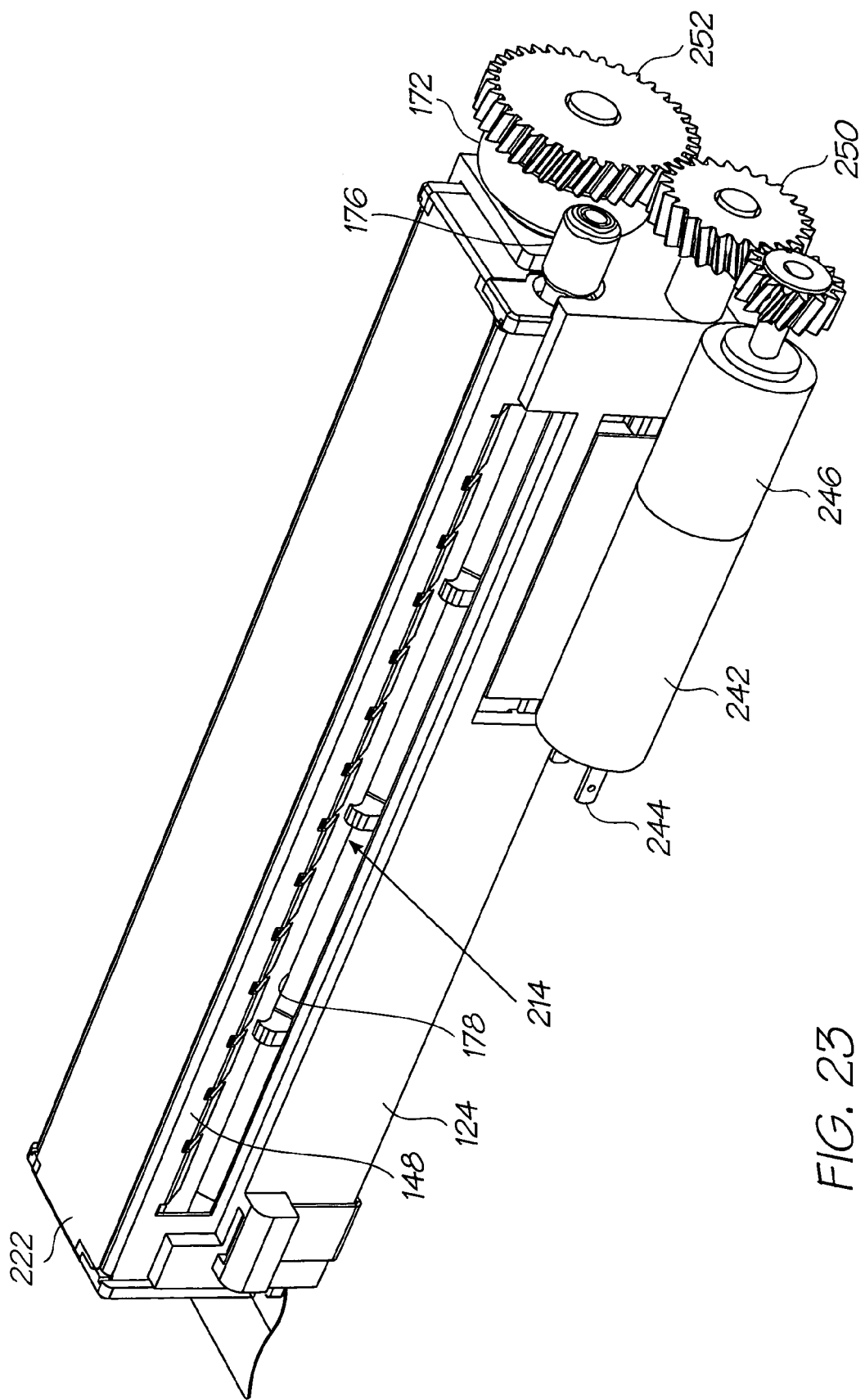
FIG. 23 is a perspective of the print cartridge and the cradle assembly with 6 mm diameter DC motor.
Figure 24:
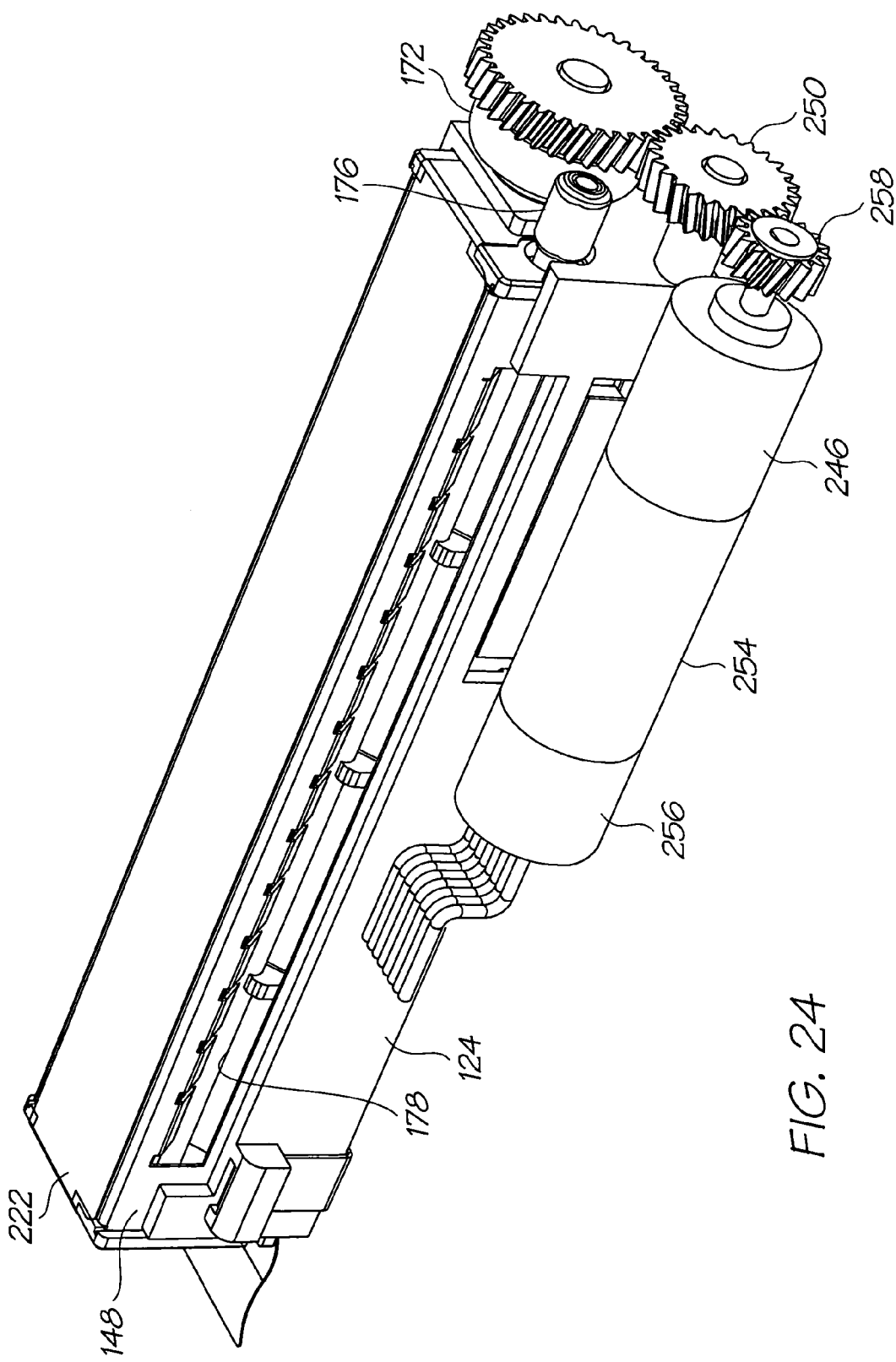
FIG. 24 is a perspective of the print cartridge and the cradle assembly with 8 mm diameter DC motor and magnetic encoder.
Figure 25:
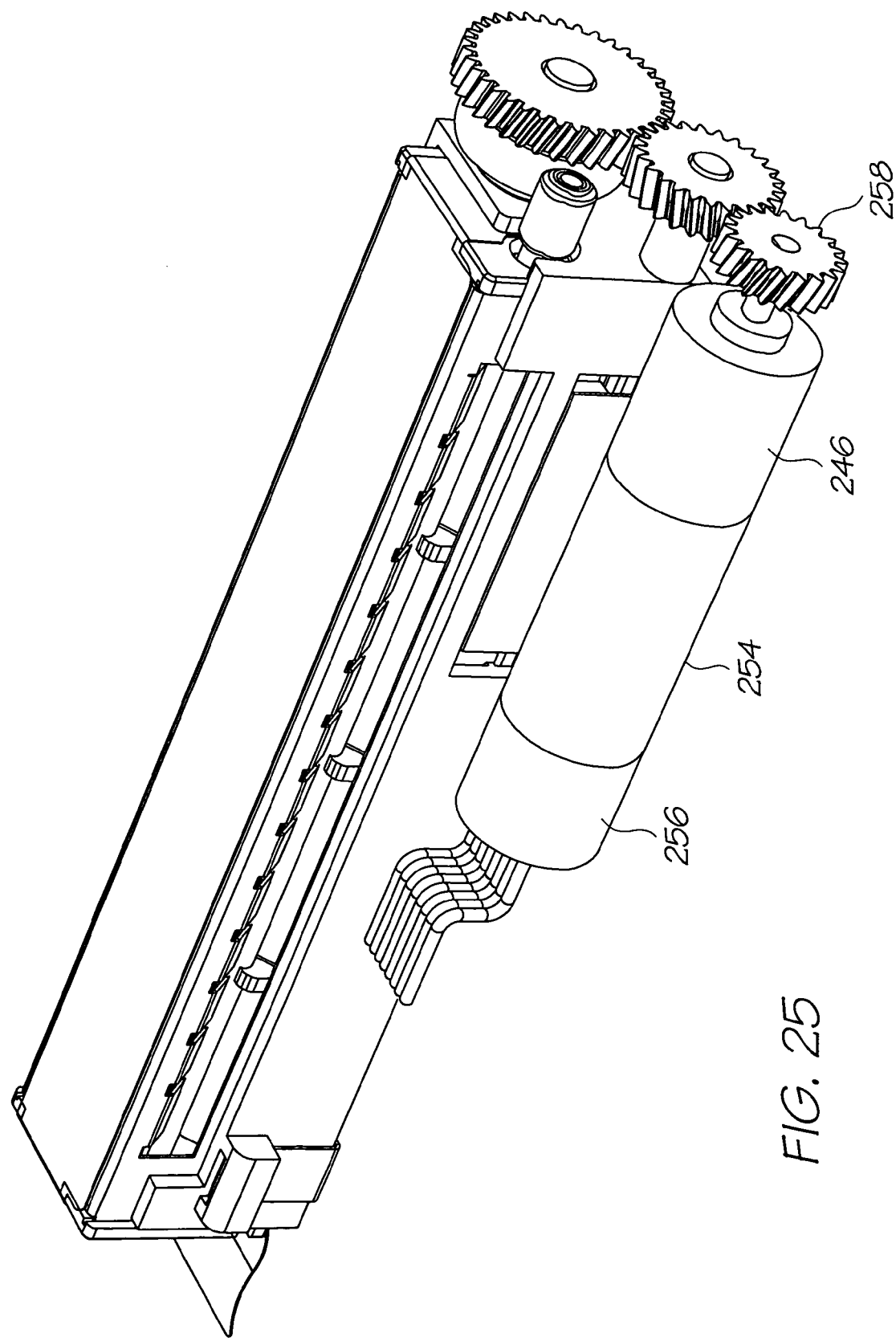
FIG. 25 shows the arrangement to FIG. 24 except with an alternative gear drive train.
Figure 26:
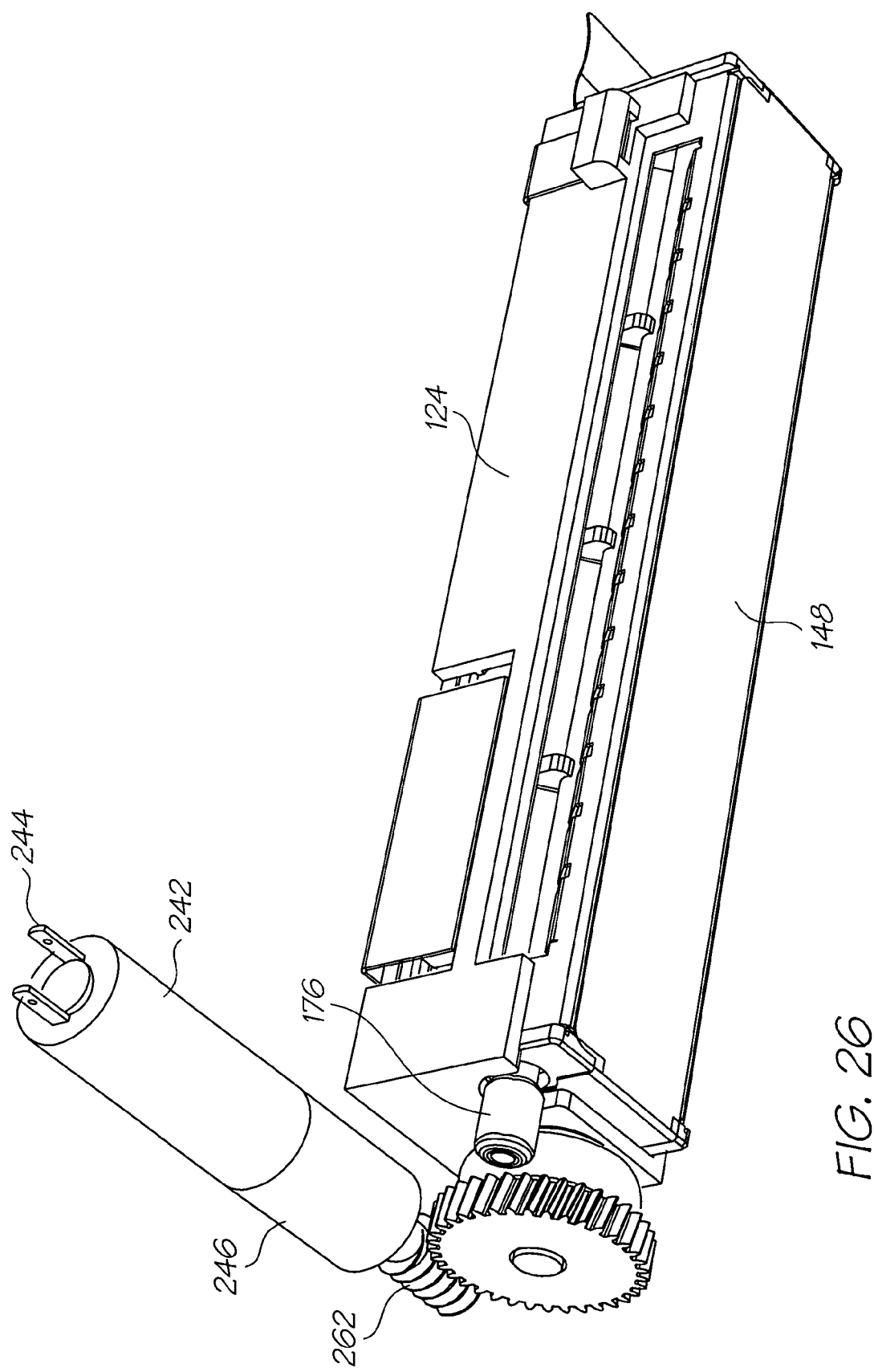
FIG. 26 is a perspective of the print cartridge and the cradle assembly with 6 mm diameter DC motor with worm gear transmission.
Figure 27:
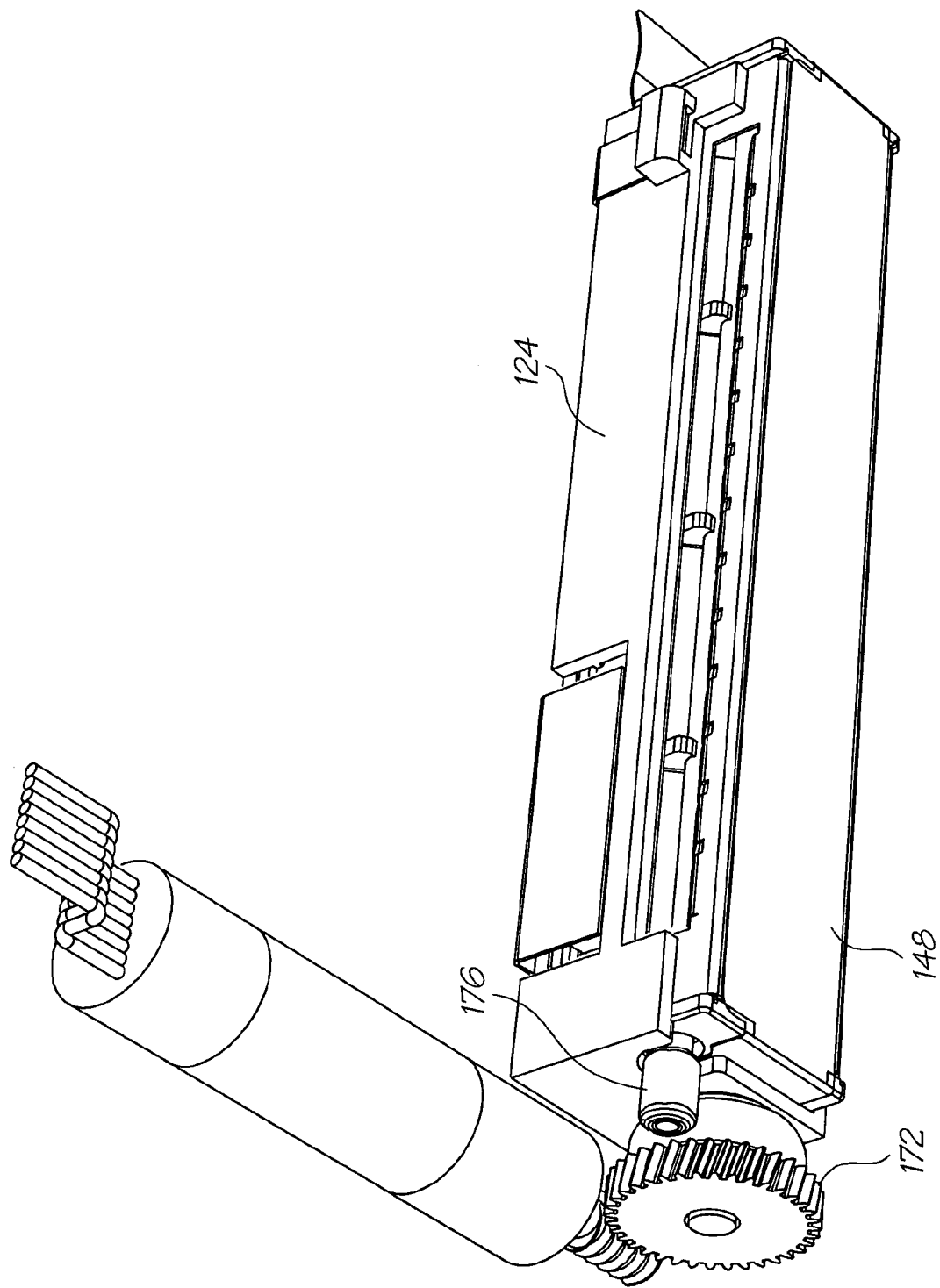
FIG. 27 is a perspective of the print cartridge and the cradle assembly with 8 mm diameter DC motor with worm gear transmission.

FIGS. 23 to 27 show other embodiments of the print cartridge 148 and cradle 124 with DC motor drive systems for feeding the medium 226 past the printhead 202. The print cartridge and cradle of FIG. 23 uses a 6 mm diameter DC motor 242 with spur gears, while FIG. 24 shows an 8 mm diameter DC motor and a range of spur gear drive systems. FIGS. 26 and 27 also show 6 mm and 8 mm motors respectively, but use a worm gear system to power the drive wheel 172. These embodiments show that motor and gear drive systems offer a wider range of configurations and gearing ratios to suit different devices, e.g. mobile phones, personal data assistants etc.

Referring to FIG. 23, the longitudinal axis of the DC motor 242 is parallel with the longitudinal extent of the cartridge 148 and cradle 124. Spade terminals 244 extend from one end of the motor for connection to the battery power supply. At the other end of the motor 242 is a planetary gearbox 246 with a 4:1 reduction. The output shaft of the gearbox is keyed to a drive gear 248. The drive gear is a spur gear that meshes with and drive an intermediate gear 250 on a stub axle mounted to the cradle 124. In turn, the intermediate gear 250 drives the drive roller spur gear 252 that is mounted for fixed rotation with the elastomeric drive roller 172.

As described above in relation to the piezo drive embodiment, the elastomeric drive roller 172 engages the rubber roller at the end of the drive shaft 178 in order to drive the medium 226 past the printhead.

In FIG. 24, the 8 mm diameter DC motor 254 is again parallel to the length of the cradle 124, but powered by a magnetic encoder 256 with 1+8 digital lines per revolution. This allows the print engine controller (PEC) to register the number of revolutions, and fractions of revolutions, of the motor 254. The PEC can use this to gauge the position of the medium 226 relative to the printhead and adjust the operation of the nozzles accordingly.

A planetary gearbox 246 is coupled to the output of the motor 254. A 15 tooth drive gear 258 is keyed to the output shaft of the gearbox 246. As with the 6 mm diameter motor, the drive gear 258 drives the drive roller spur gear 252 via the intermediate gear 250. This in turn powers the media drive shaft 178 via the rubber roller 176 and the elastomeric drive roller 172.

The arrangement shown in FIG. 25 is the same as that shown in FIG. 24 except the output shaft of the gearbox 246 has a 20 tooth drive gear 260. By changing the gear ratios, the print speed (i.e. the speed of the drive shaft 178) can be varied. This, in turn, affects the torque of the drive shaft 178 and therefore the force with which the card 226 moves along the media feed path.

Print Cartridge

Figure 28:
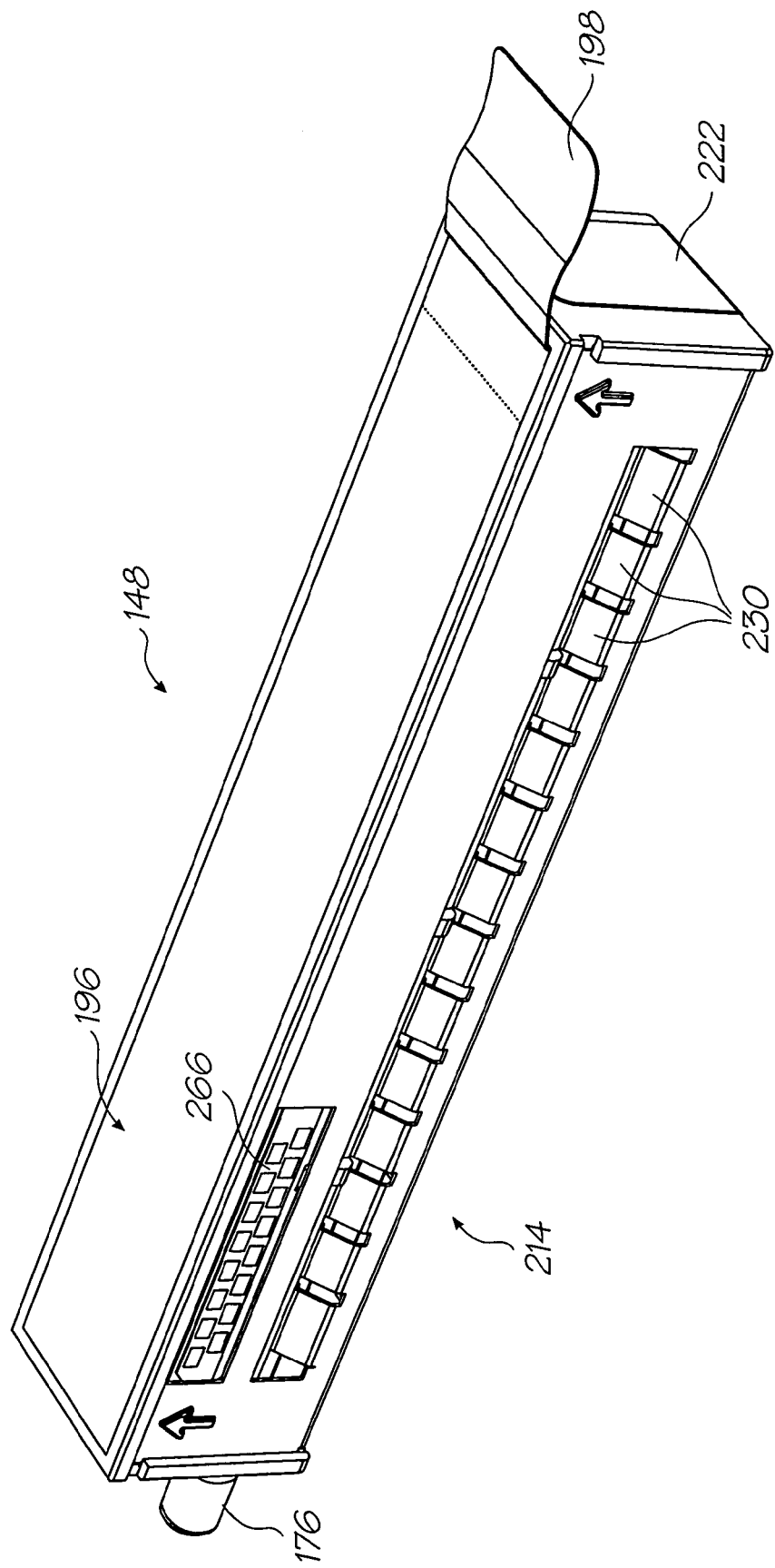
FIG. 28 is a perspective view of a print cartridge for an M-Print device.
Figure 29:
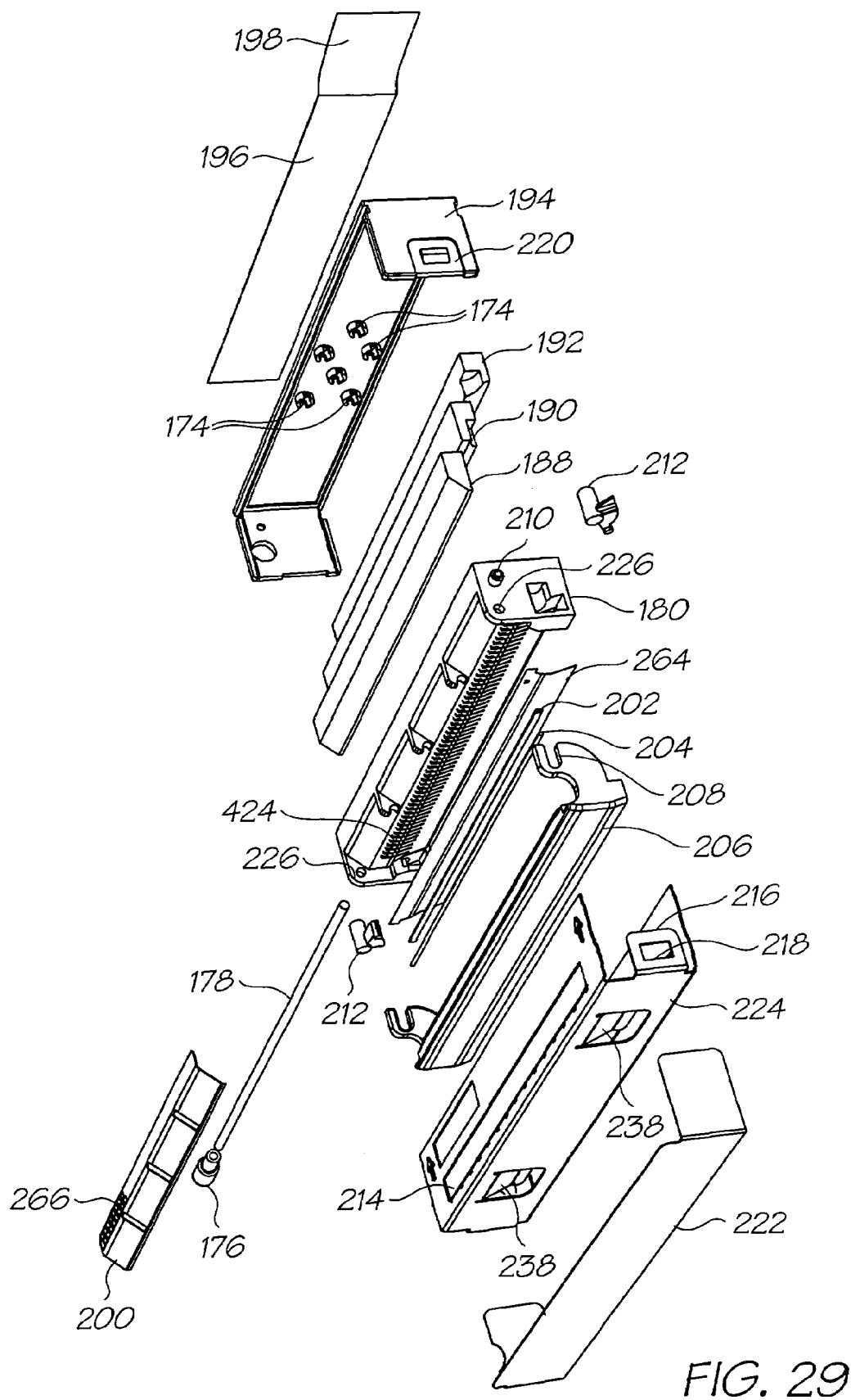
FIG. 29 is an exploded perspective of the print cartridge shown in FIG. 28.
Figure 30:
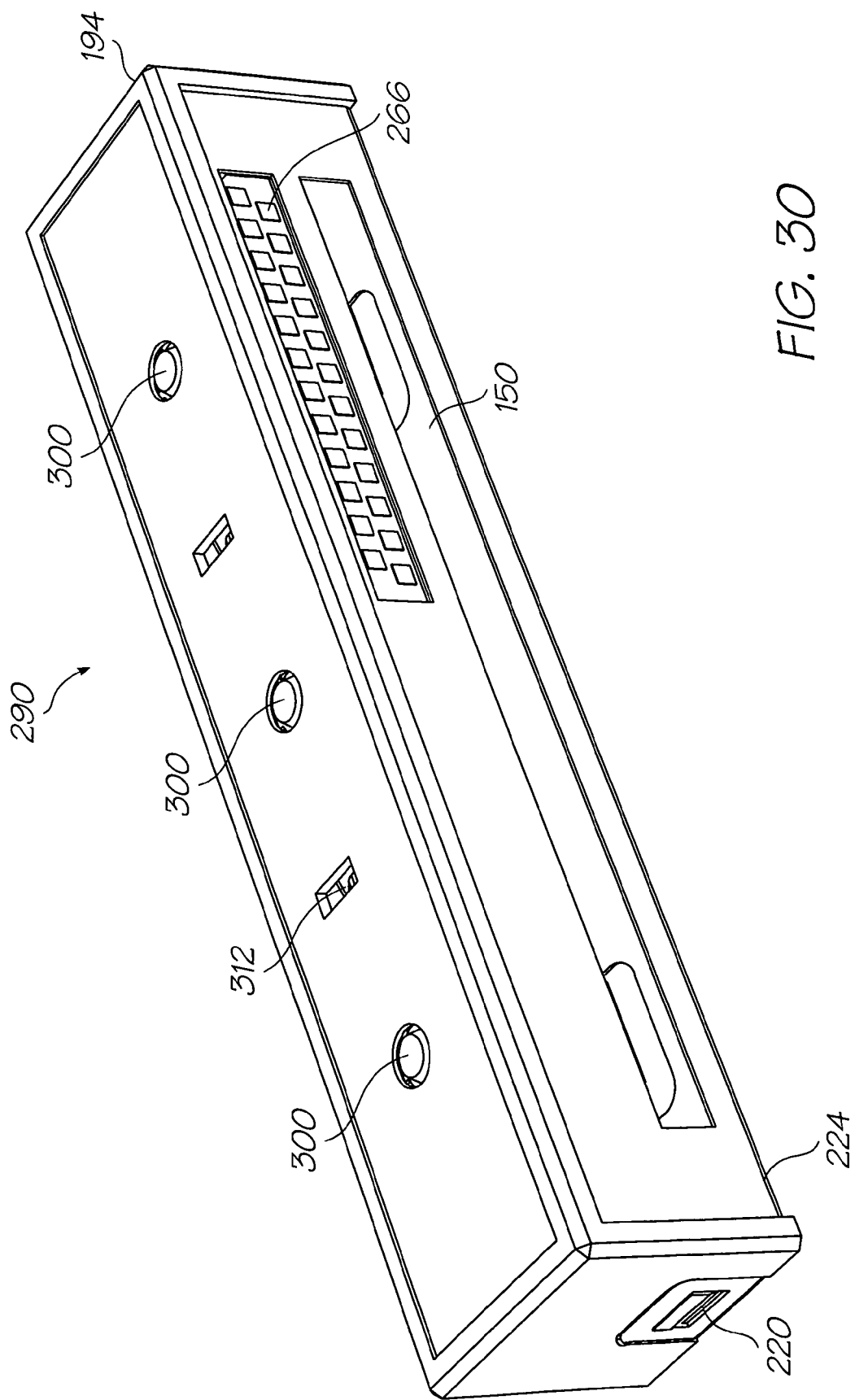
FIG. 30 is a perspective view of an alternative print cartridge.

The print cartridge 148 is best shown in FIGS. 28 and 29, and takes the form of an elongate, generally rectangular box. The cartridge is based around a moulded housing 180 that includes three elongate slots 182, 184 and 186 configured to hold respective ink-bearing structures 188, 190, and 192. Each ink-bearing structure is typically a block of sponge-like material or laminated fibrous sheets. For example, these structures can be foam, a fibre and perforated membrane laminate, a foam and perforated membrane laminate, a folded perforated membrane, or sponge wrapped in perforated membrane. The ink bearing structures 188, 190 and 192 contain substantial void regions that contain ink, and are configured to prevent the ink moving around when the cartridge (or mobile telecommunications device in which it is installed) is shaken or otherwise moved. The amount of ink in each reservoir is not critical, but a typical volume per color would be of the order of 0.5 to 1.0 mL.

The porous material also has a capillary action that establishes a negative pressure at the in ejection nozzles (described in detail below). During periods of inactivity, the ink is retained in the nozzle chambers by the surface tension of the ink meniscus that forms across the nozzle. If the meniscus bulges outwardly, it can 'pin' itself to the nozzle rim to hold the ink in the chamber. However, if it contacts paper dust or other contaminants on the nozzle rim, the meniscus can be unpinned from the rim and ink will leak out of the printhead through the nozzle.

To address this, many ink cartridges are designed so that the hydrostatic pressure of the ink in the chambers is less than atmospheric pressure. This causes the meniscus at the nozzles to be concave or drawn inwards. This stops the meniscus from touching paper dust on the nozzle rim and removes the slightly positive pressure in the chamber that would drive the ink to leak out.

A housing lid 194 fits onto the top of the print cartridge to define ink reservoirs in conjunction with the ink slots 182, 184 and 186. The lid can be glued, ultra-sonically welded, or otherwise form a seal with the upper edges of the ink slots to prevent the inks from moving between reservoirs or exiting the print cartridge. Ink holes 174 allow the reservoirs to be filled with ink during manufacture. Microchannel vents 140 define tortuous paths along the lid 196 between the ink holes 174 and the breather holes 154. These vents allow pressure equalisation within the reservoirs when the cartridge 148 is in use while the tortuous path prevents ink leakage when the mobile phone 100 is moved through different orientations. A label 196 covers the vents 140, and includes a tear-off portion 198 that is removed before use to expose breather holes 154 to vent the slots 182, 184 and 186 to atmosphere.

A series of outlets (not shown) in the bottom of each of the slots 182, 184 and 186, lead to ink ducts 262 formed in the housing 180. The ducts are covered by a flexible sealing film 264 that directs ink to a printhead IC 202. One edge of the printhead IC 202 is bonded to the conductors on a flexible TAB film 200. The bonds are covered and protected by an encapsulant strip 204. Contacts 266 are formed on the TAB film 200 to enable power and data to be supplied to the printhead IC 202 via the conductors on the TAB film. The printhead IC 202 is mounted to the underside of the housing 180 by the polymer sealing film 264. The film is laser drilled so that ink in the ducts 262 can flow to the printhead IC 202. The sealing and ink delivery aspects of the film as discussed in greater detail below.

A capper 206 is attached to the chassis 180 by way of slots 208 that engage with corresponding moulded pins 210 on the housing. In its capped position, the capper 206 encloses and protects exposed ink in the nozzles (described below) of the printhead 202. A pair of co-moulded elastomeric seals 240 on either side of the printhead IC 202 reduces its exposure to dust and air that can cause drying and clogging of the nozzles.

A metal cover 224 snaps into place during assembly to cover the capper 206 and hold it in position. The metal cover is generally U-shaped in cross section, and includes entry and exit slots 214 and 152 to allow media to enter and leave the print cartridge. Tongues 216 at either end of the metal cover 224 includes holes 218 that engages with complementary moulded pawls 220 in the lid 194. A pair of capper leaf springs 238 are pressed from the bottom of the U-shape to bias the capper 206 against the printhead 202. A tamper resistant label 222 is applied to prevent casual interference with the print cartridge 148.

As discussed above, the media drive shaft 178 extends across the width of the housing 180 and is retained for rotation by corresponding holes 226 in the housing. The elastomeric drive wheel 176 is mounted to one end of the drive shaft 178 for engagement with the linear drive mechanism 126 when the print cartridge 148 is inserted into the mobile telecommunications device prior to use.

Alternative Print Cartridges

An alternative cartridge 290 is shown in FIGS. 30 to 36. This cartridge design shares a number of features with that shown in FIGS. 28 and 29, and corresponding components are designated with the same reference numerals.

Figure 31:
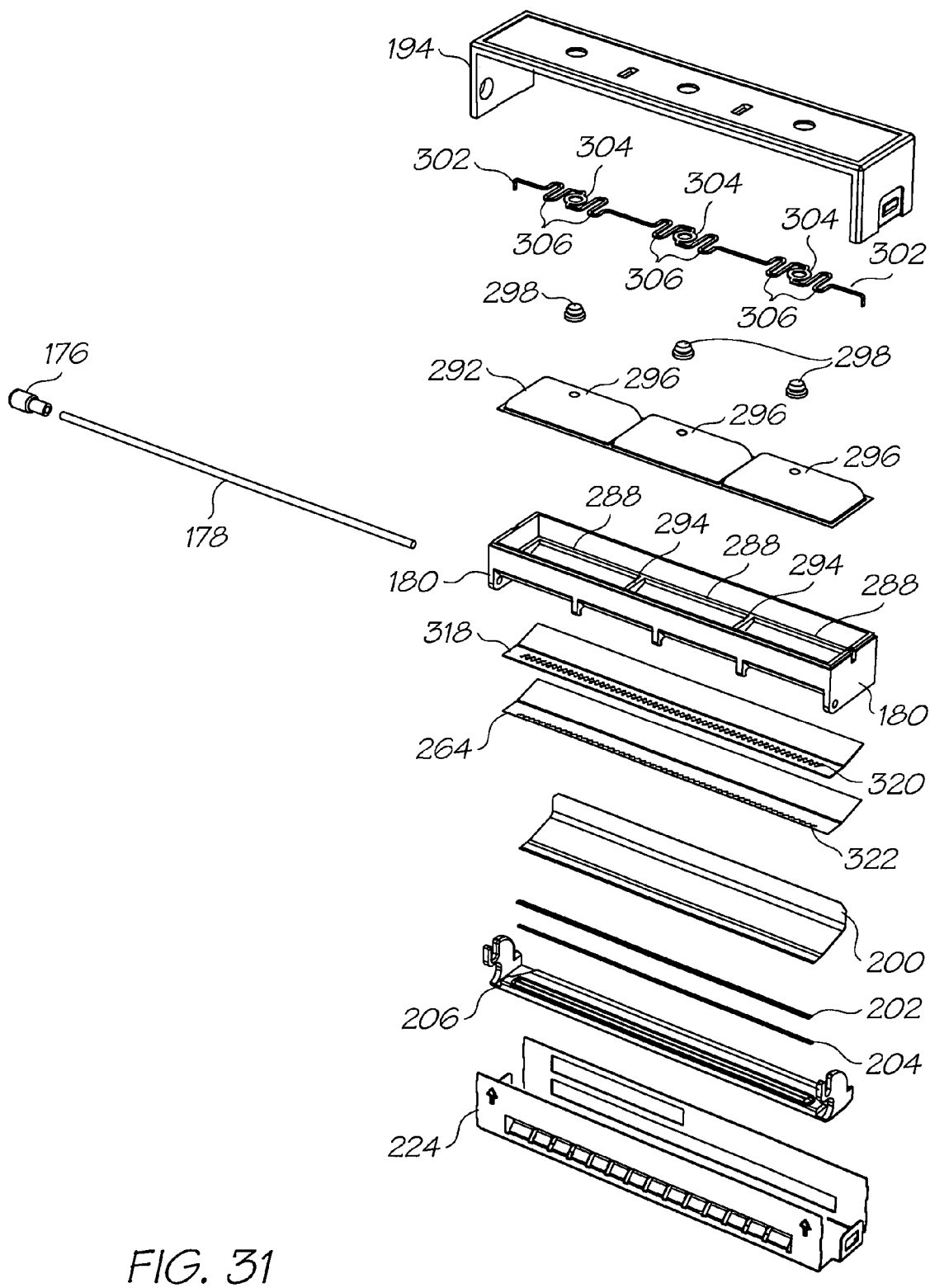
FIG. 31 is an exploded top perspective of the print cartridge shown in FIG. 30.
Figure 32:
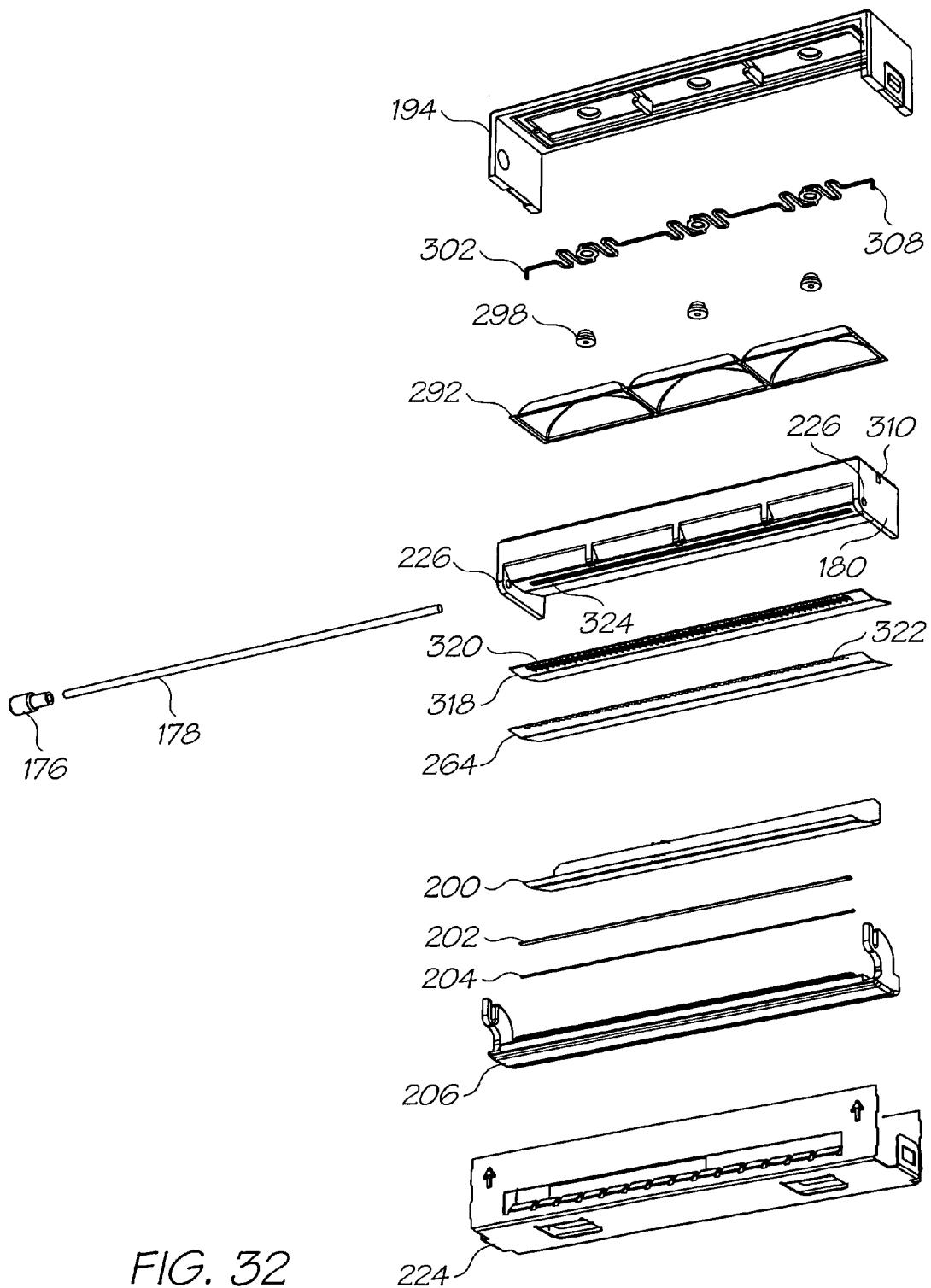
FIG. 32 is an exploded bottom perspective of the print cartridge shown in FIG. 30.
Figure 33:
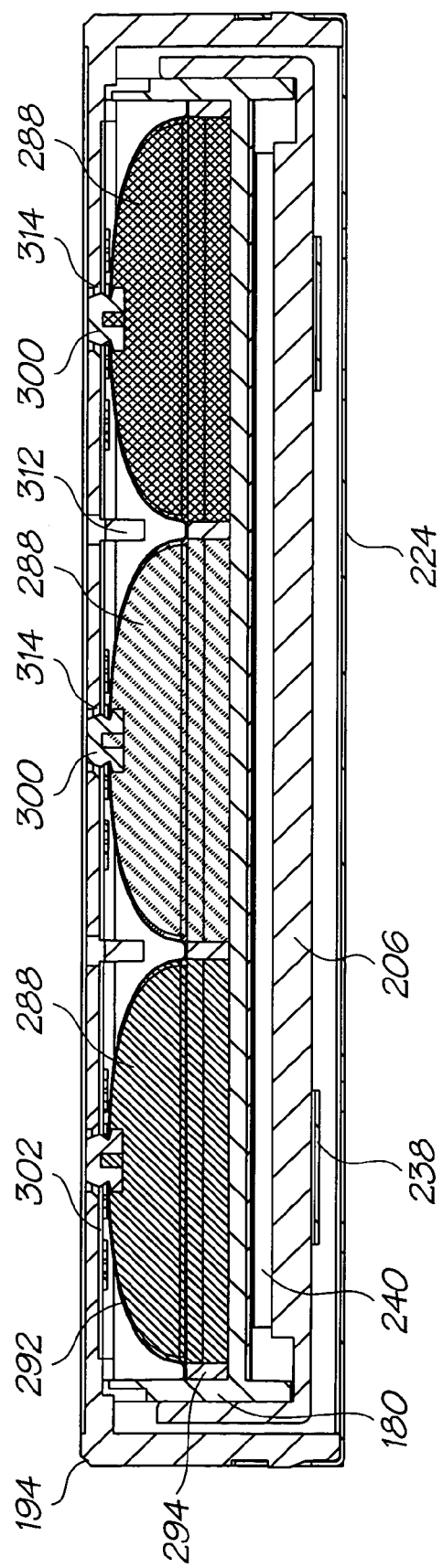
FIG. 33 is a longitudinal cross section of the print cartridge shown in FIG. 30.

The primary difference of the alternative cartridge is that the negative pressure in the reservoirs 288 (see FIG. 33) is provided by biasing a flexible membrane wall towards increasing the ink storage volume. As discussed above, the negative pressure is necessary to guard against ink leakage from the nozzles. As best shown in FIGS. 31 and 32, the negative pressure reservoirs 288 are arranged in a series across the print width of the cartridge 290. A preformed membrane 294 is attached to corresponding formations 294 in housing 180 to define the three reservoirs 288. The membrane 292 includes apertures 296 communicating with the respective reservoirs, each aperture 296 being fitted with a closed cell neoprene or self-sealing silicon bung 298. To fill the reservoirs, a hollow needle (not shown) penetrates the bung 298 to inject the ink. When the needle is withdrawn, the bung 298 reseals the reservoir. It may be desirable to introduce two needles for refilling, one of the needles being used to allow air from within the reservoir to exit as it is replaced by ink.

Figure 34:
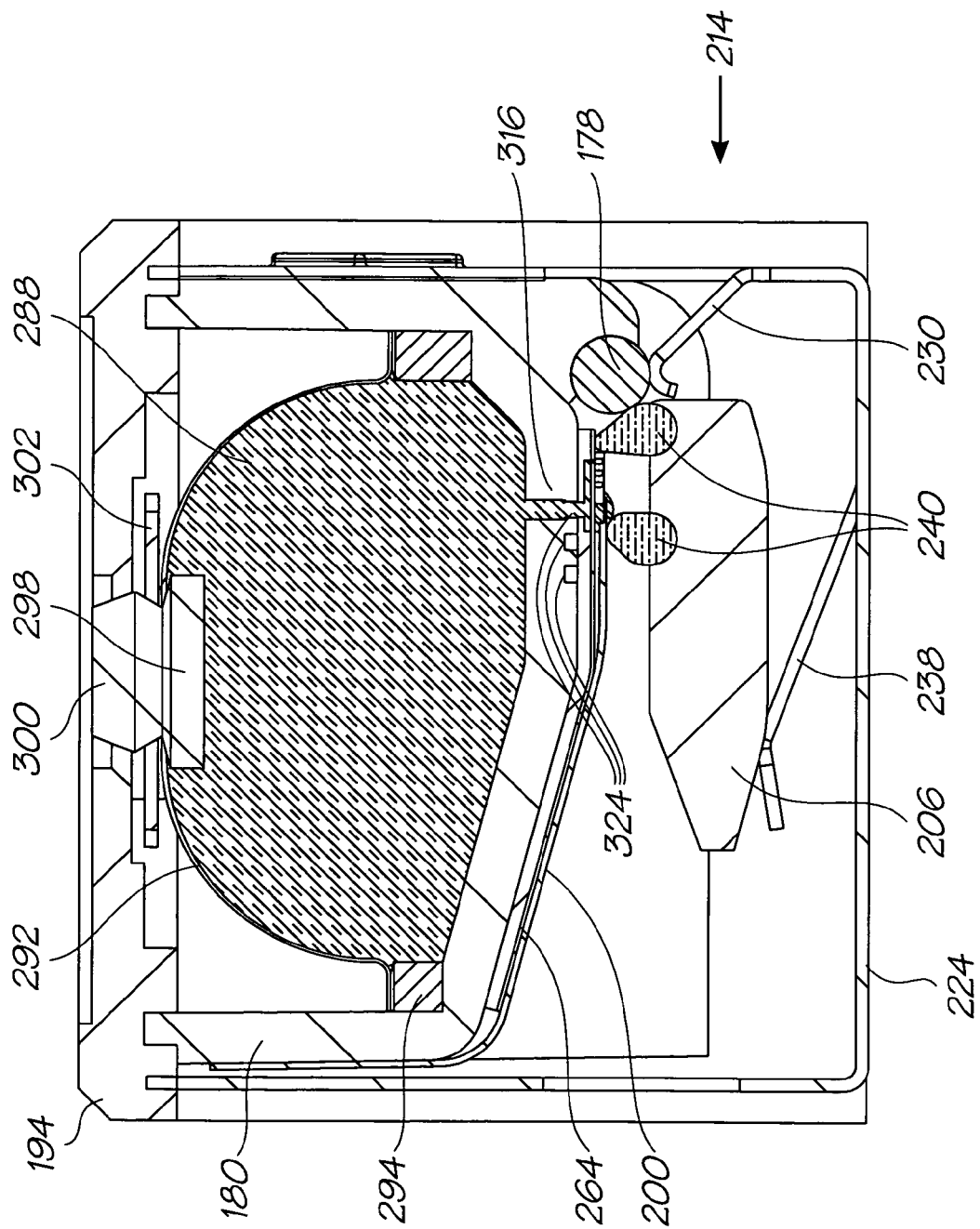
FIG. 34 is a lateral cross section of the print cartridge shown in FIG. 30 viewed from the left.
Figure 35:
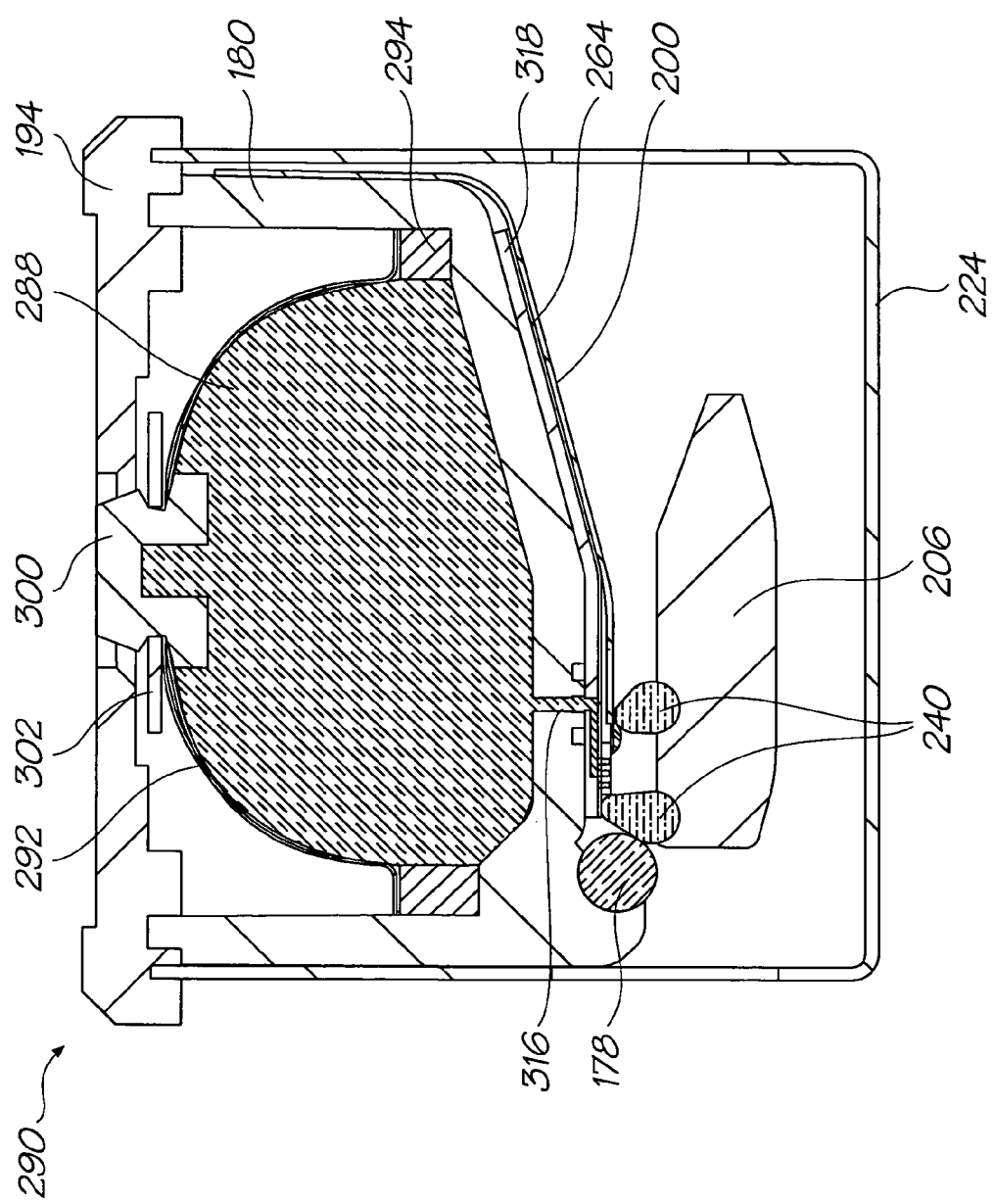
FIG. 35 is a partial lateral cross section of the print cartridge shown in FIG. 30 viewed from the right with a full ink reservoir.
Figure 36:
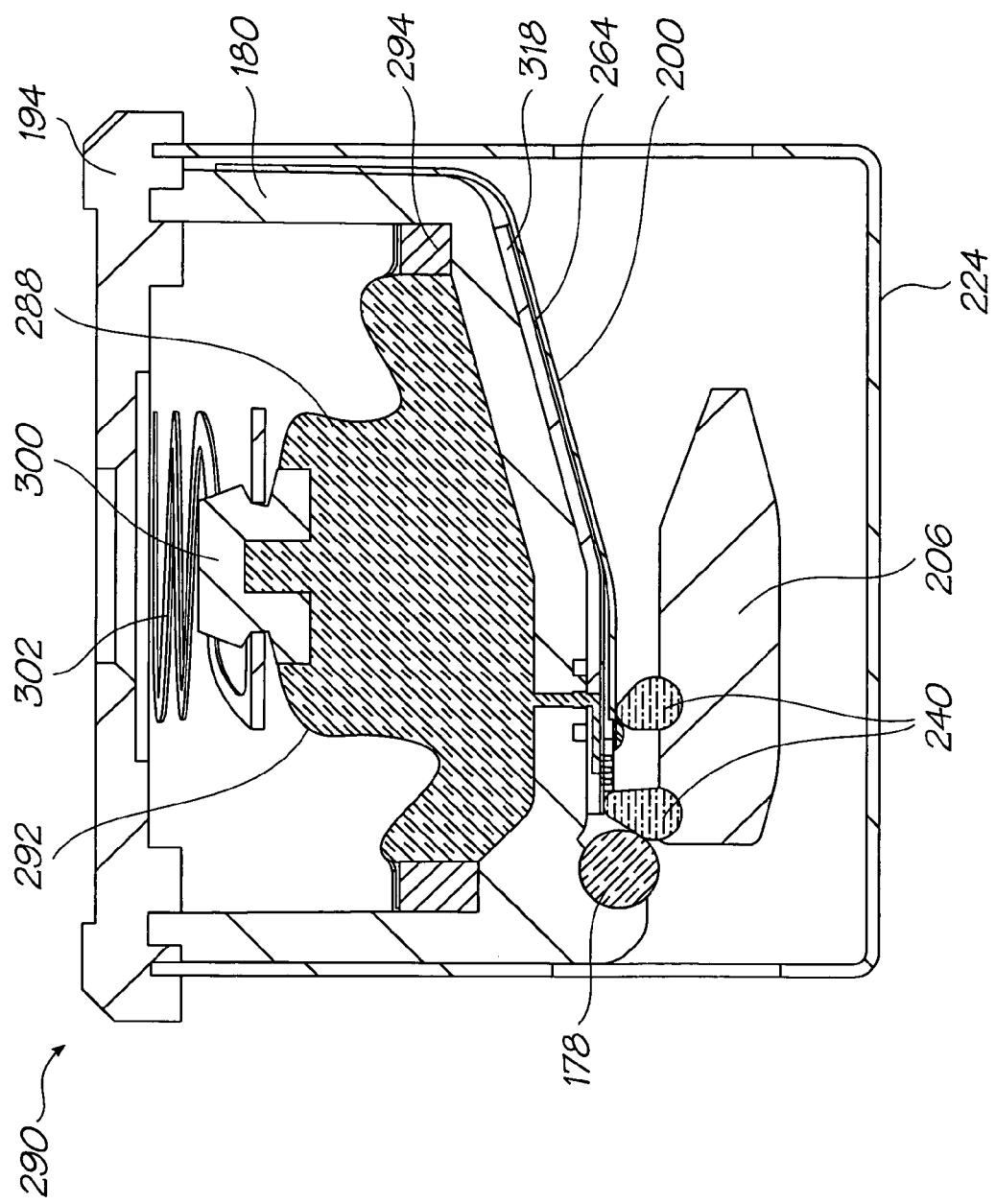
FIG. 36 is a partial lateral cross section of the print cartridge shown in FIG. 30 viewed from the right with a depleted ink reservoir.

Referring to FIGS. 34, 35 and 36, each bung 298 includes a cap formation 300 that sits proud of the corresponding reservoir 288, to engage a spring 302 that extends across the print width of the cartridge. In the embodiment shown, the spring 302 includes collars 304 spaced along its length for engaging the respective formations 300, and serpentine portions 306 each side of the respective apertures 304 to provide resilience. At each end of the spring 302, a portion is bent to form a short finger 308 that engages a complementary notch 310 formed in the housing 180.

A lid 194 encloses the membrane 292 and includes spring supports 312 for locating and supporting corresponding sections of the spring 302. Apertures 314 in the lid expose the cap formations 300 for filling.

The ink distribution system is different in the alternative cartridge because of the different way the reservoirs 288 are set out with respect to the print width. In particular, the alternative cartridge includes two ink distribution layers that distribute the inks from the respective reservoirs along the print width of the cartridge and to the respective rows of print nozzles. As best shown in FIG. 35, each of the reservoirs have two ink outlets 316. The ink outlets 316 feed ink to ink distribution channels 324 in bottom of the housing 180. There are three channels 324; one for the cyan, magenta and yellow ink respectively. Each channel 324 extends the length of the printhead IC 202 as the different color in each reservoir 288 needs to be delivered across the entire printing width. The distribution channels 324 are overlaid by an ink duct film layer 318. This layer 318 has holes in its top surface connecting a series of ducts 320 in its lower surface. The ducts 320 are sealed by the sealing film 264. Laser drilled holes 322 through the sealing film direct the ink from the ducts to the reverse side of the printhead IC 202.

Figure 37:
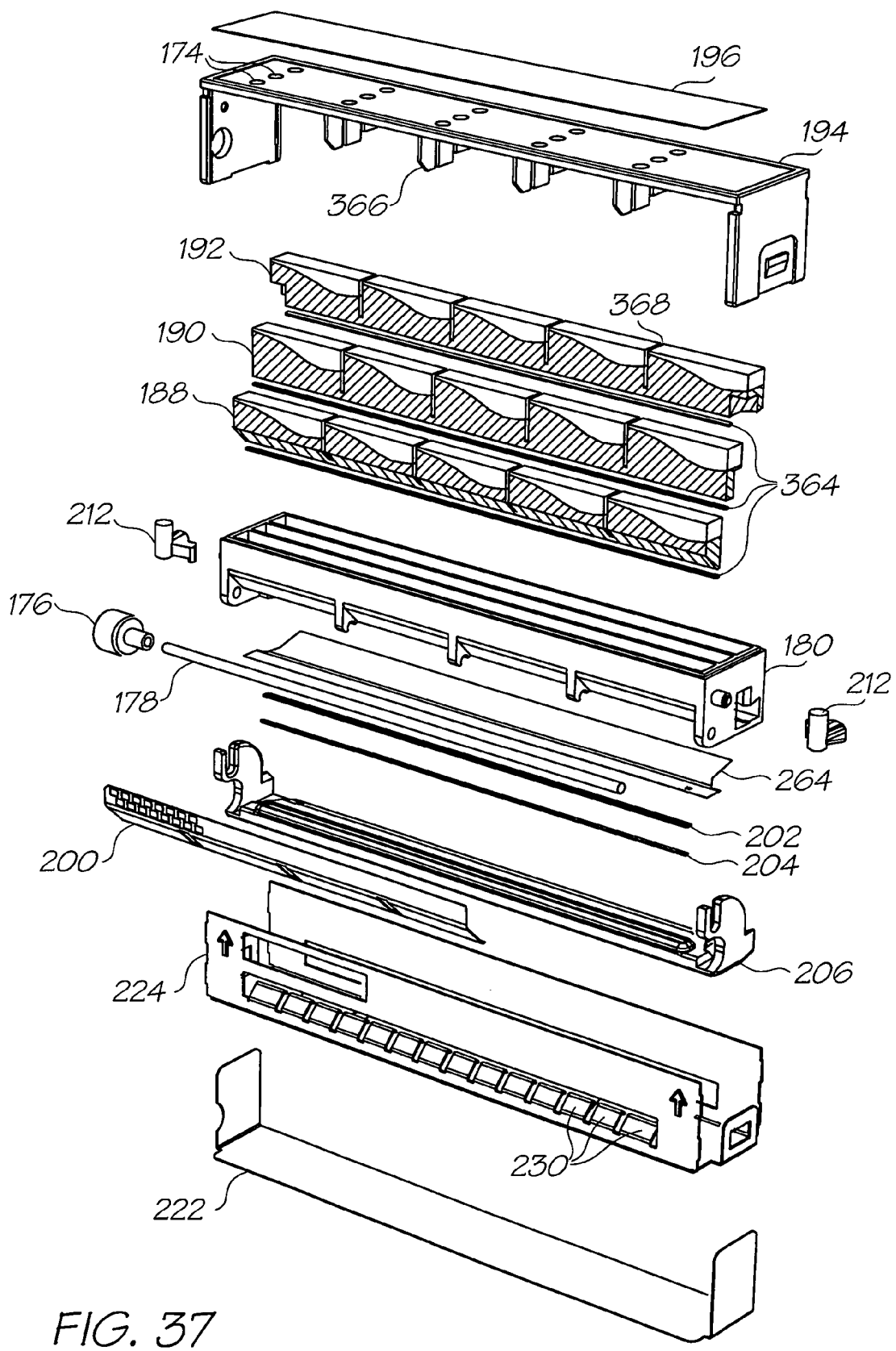
FIG. 37 is an exploded top perspective of another alternative print cartridge.
Figure 38:
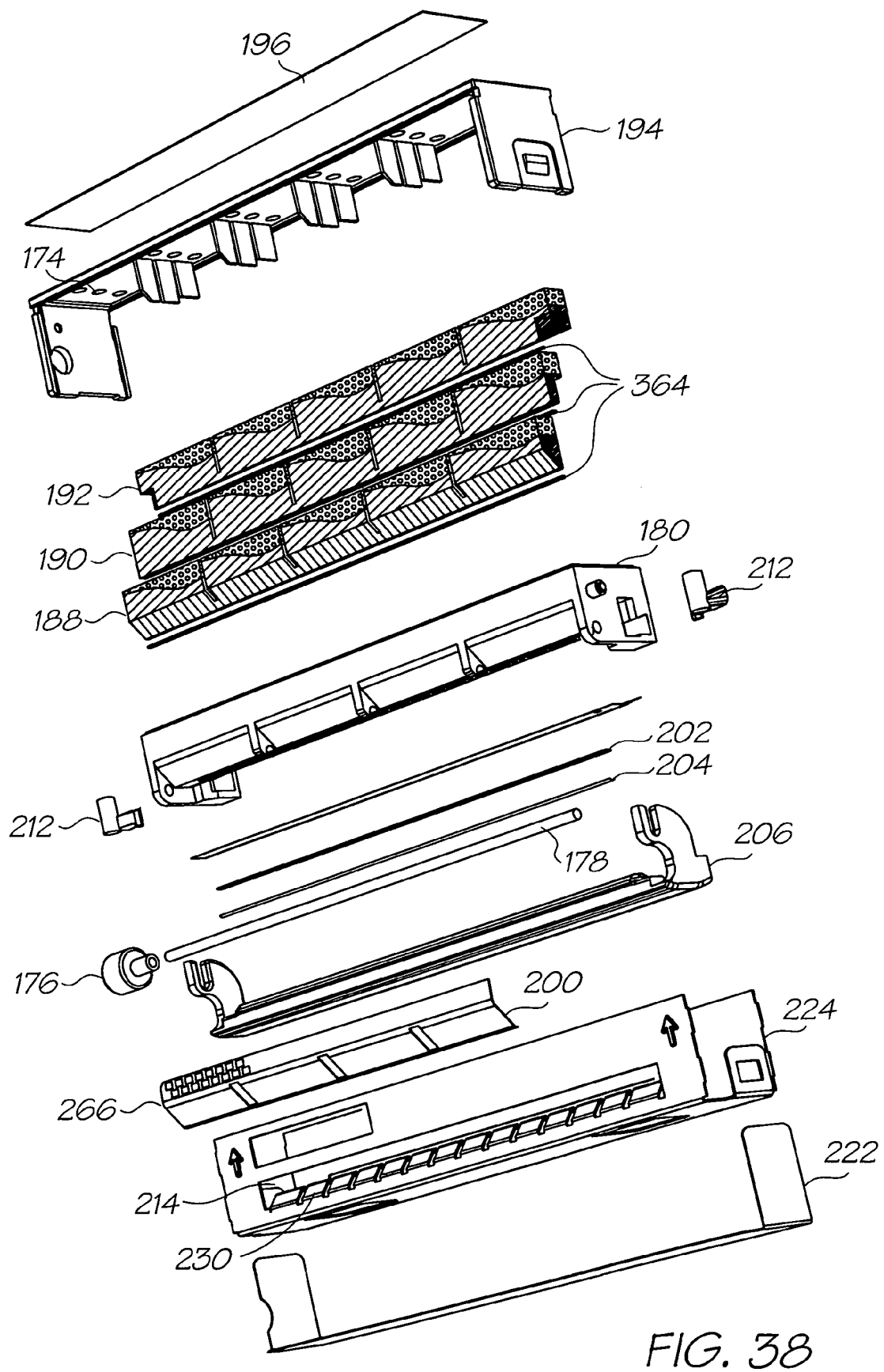
FIG. 38 is an exploded bottom perspective of the print cartridge shown in FIG. 37.
Figure 39:
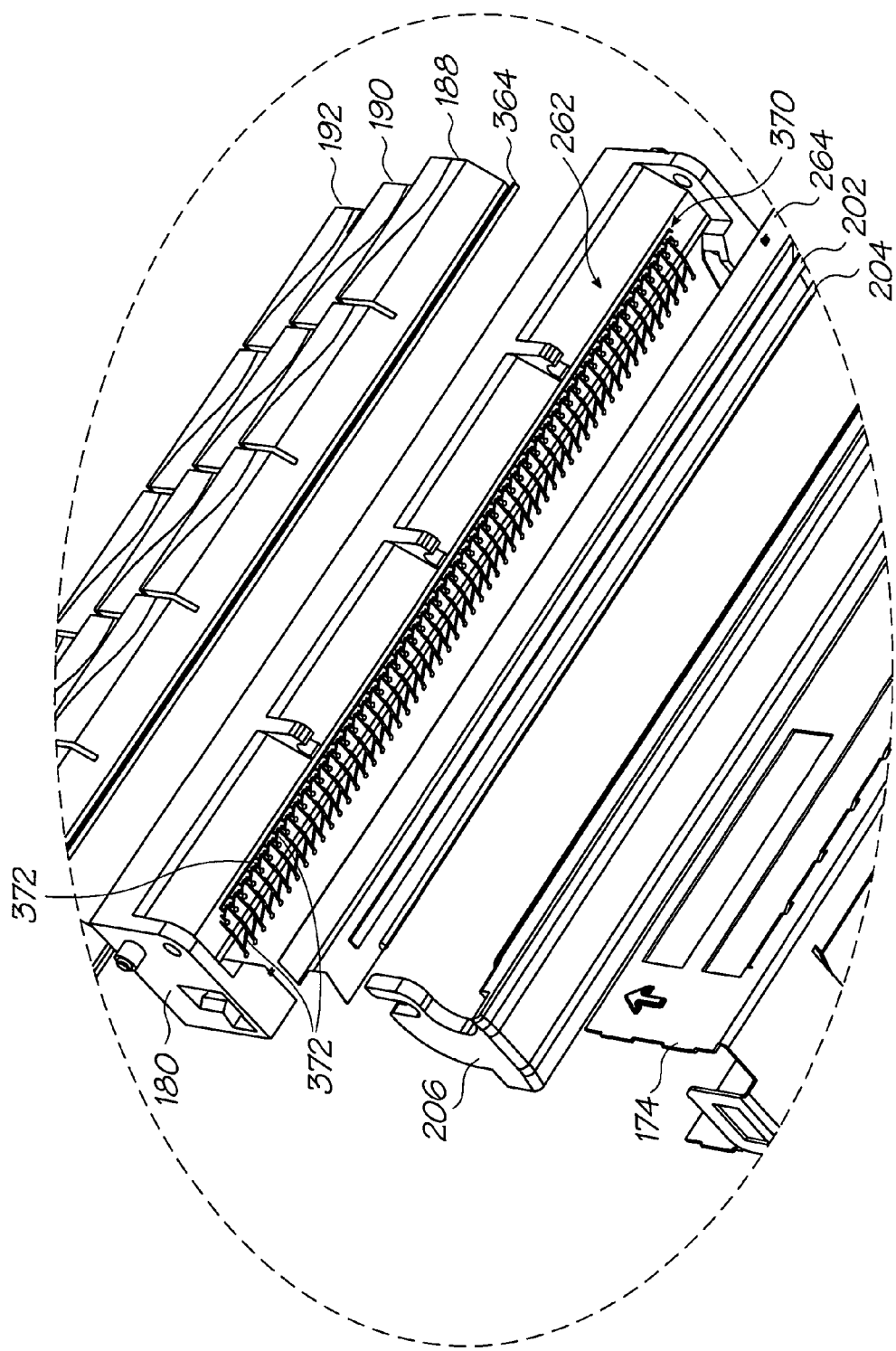
FIG. 39 is a partial enlargement of the bottom of the housing showing the ink balance ducts between the outlets.

Another cartridge design is shown in FIGS. 37 to 39. This cartridge is very similar to that shown FIGS. 28 and 29 with the main differences residing in the ink retaining structures 188, 190 and 192. The ink retaining structures are compressed foam divided into sections by partial cuts 368 extending the majority of the way through the thickness of the structures. Ink baffles 366 depend from the underside of the cartridge lid 194 and slot into the partial cuts 368 to provide solid barriers between adjacent sections of the ink retaining structures 188, 190 and 192.

The baffles 366 resist the ink pooling at one end of the cartridge if it happens to be held in a substantially vertical orientation for extended periods of time. If the ink pools at one end of the cartridge, the other end can prematurely run out of ink during use. While there is still some communication between adjacent sections (the cross section below each of the partial cuts 368), the capillary action of the porous structures and the relatively small area of the communicating section retards the ink draining to the lower end. The rate that the ink drains to the lower end is at least slow enough to keep ink in all sections of the ink retaining structure in the cartridge is left in an upright orientation over night.

Completely sealing adjacent sections from each other reduces the amount of ink that is used before the cartridge needs to be replaced. Without any ink flow between adjacent sections, one color will deplete from one of the sections before the others because ink usage along the length of the printhead IC 202 is rarely uniform. To assist the ink from one section to flow to the nozzles fed by a depleted section, a wick 364 at the bottom of each of the slots 182, 184 and 186 keeps ink over the ink outlets (not shown) in the housing 180. The outlets communicate with a series of ink delivery ducts formed in the underside of the housing 180. As best shown in FIG. 39, the ink delivery ducts 262 direct the ink to a central ink delivery section 370 where it can be fed to the back of the printhead IC 202. Between each of the ink delivery ducts 262 lead are ink balance ducts 372. The balance ducts 372 put each of the ink outlets in fluid communication with its adjacent outlets. Depletion of ink in one section is addressed by drawing ink from adjacent sections through the balance ducts 372. The ducts 262 and 372 must be small enough so as to always retain ink regardless of whether the cartridge is in an upright orientation.

The ducts 262 and 372 are sealed by a flexible sealing film 264 adhered to the underside of the housing 180. The printhead IC 202 is adhered to the other side of the sealing film 264. The printhead IC 202 has ink inlets for its nozzles (described below) on its reverse side (the side adhered to the film 264). The printhead IC 202 is adhered to the film 264 so that its inlets are in registration with an array of laser drilled holes in the film. The laser drilled holes connect the printhead IC 202 ink inlets with the ink deliver points spaced along the ink delivery section 370 of the housing 180. The sealing and ink delivery aspects of the film as discussed in greater detail below.

One edge of the printhead IC 202 is bonded to the conductors on a flexible TAB film 200. The bonds are covered and protected by an encapsulant strip 204. Contacts 266 are formed on the TAB film 200 to supply power to the printhead IC 202 via the power/ground contacts 382 (c.f. the power/data connector 330 in other cartridges).

Printhead Mechanical

In the preferred form, a Memjet printer includes a monolithic pagewidth printhead. The printhead is a three-color 1600 dpi monolithic chip with an active print length of 2.165" (55.0 mm). The printhead chip is about 800 microns wide and about 200 microns thick.

Power and ground are supplied to the printhead chip via two copper busbars approximately 200 microns thick, which are electrically connected to contact points along the chip with conductive adhesive. One end of the chip has several data pads that are wire bonded or ball bonded out to a small flex PCB and then encapsulated, as described in more detail elsewhere.

In alterative embodiments, the printhead can be constructed using two or more printhead chips, as described in relation to the SoPEC-based bilithic printhead arrangement described U.S. Ser. No. 10/754536 filed on Jan. 12, 2004, the contents of which are incorporated herein by cross-reference. In yet other embodiments, the printhead can be formed from one or more monolithic printheads comprising linking printhead modules as described U.S. Ser. No. 10/754536 filed on Jan. 12, 2004, the contents of which are incorporated herein by cross-reference.

In the preferred form, the printhead is designed to at least partially self-destruct in some way to prevent unauthorized refilling with ink that might be of questionable quality. Self-destruction can be performed in any suitable way, but the preferred mechanism is to include at least one fusible link within the printhead that is selectively blown when it is determined that the ink has been consumed or a predetermined number of prints has been performed.

Alternatively or additionally, the printhead can be designed to enable at least partial re-use of some or all of its components as part of a remanufacturing process.

Fusible links on the printhead integrated circuit (or on a separate integrated circuit in the cartridge) can also be used to store other information that the manufacturer would prefer not to be modified by end-users. A good example of such information is ink-remaining data. By tracking ink usage and selectively blowing fusible links, the cartridge can maintain an unalterable record of ink usage. For example, ten fusible links can be provided, with one of the fusible links being blown each time it is determined that a further 10% of the total remaining ink has been used. A set of links can be provided for each ink or for the inks in aggregate. Alternatively or additionally, a fusible link can be blown in response to a predetermined number of prints being performed.

Fusible links can also be provided in the cartridge and selectively blown during or after manufacture of the cartridge to encode an identifier (unique, relatively unique, or otherwise) in the cartridge.

The fusible links can be associated with one or more shift register elements in the same way as data is loaded for printing (as described in more detail below). Indeed, the required shift register elements can form part of the same chain of register elements that are loaded with dot data for printing. In this way, the MoPEC chip is able to control blowing of fusible links simply by changing data that is inserted into the stream of data loaded during printing.

Alternatively or additionally, the data for blowing one or more fusible links can be loaded during a separate operation to dot-data loading (ie, dot data is loaded as all zeros). Yet another alternative is for the fusible links to be provided with their own shift register which is loaded independently of the dot data shift register.

Figure 40:
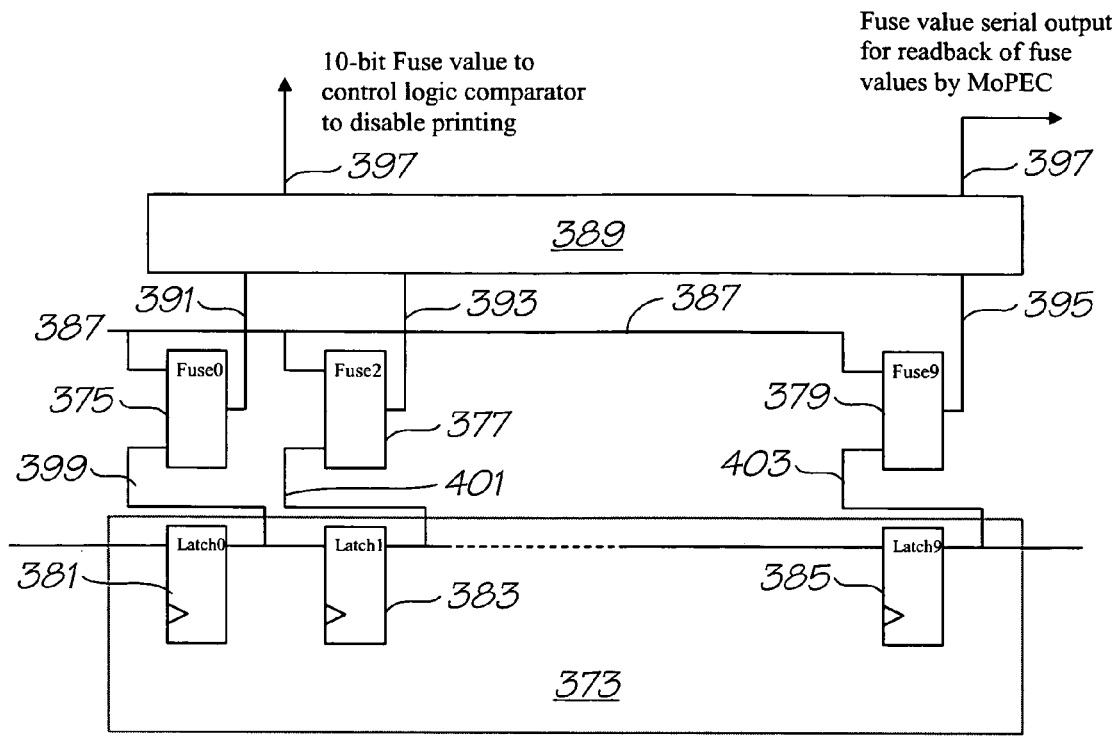
FIG. 40 is a circuit diagram of a fusible link on the printhead IC.
Figure 41:
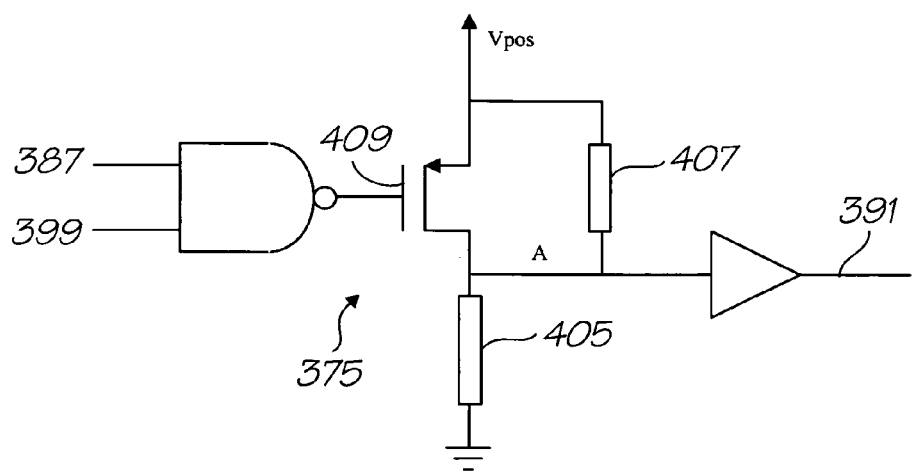
FIG. 41 is a circuit diagram of a single fuse cell.

FIGS. 40 and 41 show basic circuit diagrams of a 10-fuse link and a single fuse cell respectively. FIG. 40 shows a shift register 373 that can be loaded with values to be programmed into the 1-bit fuse cells 375, 377 and 379. Each shift register latch 381, 383 and 385 connects to a 1-bit fuse cell respectively, providing the program value to its corresponding cell. The fuses are programmed by setting the fuse_program_enable signal 387 to 1. The fuse cell values 391, 393 and 395 are loaded into a 10-bit register 389. This value 389 can be accessed by the printhead IC control logic, for example to inhibit printing when the fuse value is all ones. Alternatively or additionally, the value 397 can be read serially by MoPEC, to see the state of the fuses 375, 377 and 379 after MoPEC is powered up.

A possible fuse cell 375 is shown in FIG. 41. Before being blown, the fuse element structure itself has a electrical resistance 405, which is substantially lower than the value of the pullup resistor 407. This pulls down the node A, which is buffered to provide the fuse_value output 391, initially a zero. A fuse is blown when fuse_program_enable 387 and fuse_program_value 399 are both 1. This causes the PFET 409 connecting node A to Vpos is turn on, and current flows that causes the fuse element to go open circuit, i.e. resistor 405 becomes infinite. Now the fuse_value output 391 will read back as a one.

Sealing the Printhead

As briefly mentioned above, the printhead IC 202 is mounted to the underside of the housing 180 by the polymer sealing film 264 (see FIG. 29). This film may be a thermoplastic film such as a PET or Polysulphone film, or it may be in the form of a thermoset film, such as those manufactured by AL technologies and Rogers Corporation. The polymer sealing film 264 is a laminate with adhesive layers on both sides of a central film, and laminated onto the underside of the moulded housing 180. A plurality of holes (not shown) are laser drilled through the sealing film 264 to coincide with ink delivery points in the ink ducts 262 (or in the case of the alternative cartridge, the ink ducts 320 in the film layer 318) so that the printhead IC 202 is in fluid communication with the ink ducts 262 and therefore the ink retaining structures 188, 190 and 192.

The thickness of the polymer sealing film 264 is critical to the effectiveness of the ink seal it provides. The film seals the ink ducts 262 on the housing 180 (or the ink ducts 320 in the film layer 318) as well as the ink conduits (not shown) on the reverse side of the printhead IC 202. However, as the film 264 seals across the ducts 262, it can also bulge into one of conduits on the reverse side of the printhead IC 202. The section of film bulging into the conduit, may run across several of the ink ducts 262 in the printhead IC 202. The sagging may cause a gap that breaches the seal and allows ink to leak from the printhead IC 202 and or between the conduits on its reverse side.

To guard against this, the polymer sealing film 264 should be thick enough to account for any bulging into the ink ducts 262 (or the ink ducts 320 in the film layer 318) while maintaining the seal on the back of the printhead IC 202. The minimum thickness of the polymer sealing film 264 will depend on:

the width of the conduit into which it sags;
the thickness of the adhesive layers in the film's laminate structure;
the 'stiffness' of the adhesive layer as the printhead IC 202 is being pushed into it; and,
the modulus of the central film material of the laminate.

A polymer sealing film 264 thickness of 25 microns is adequate for the printhead IC and cartridge assembly shown. However, increasing the thickness to 50, 100 or even 200 microns will correspondingly increase the reliability of the seal provided.

Printhead CMOS

Turning now to FIGS. 42 to 47, a preferred embodiment of the printhead 420 (comprising printhead IC 425) will be described.

Figure 42:
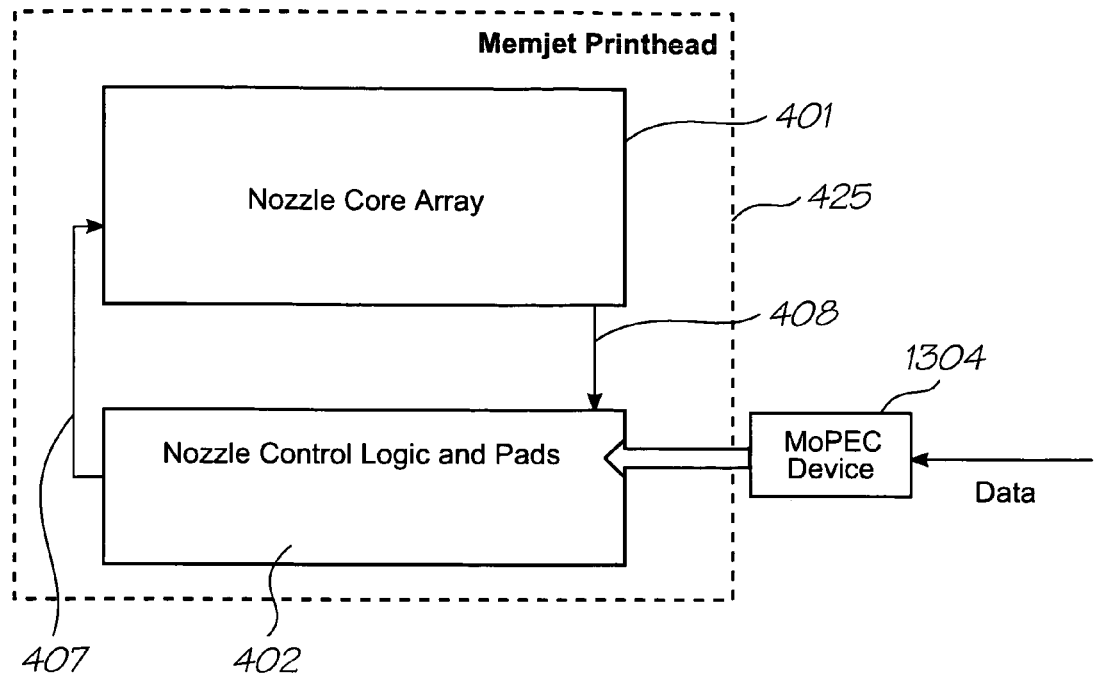
FIG. 42 is a schematic overview of the printhead IC and its connection to MoPEC.

FIG. 42 shows an overview of printhead IC 425 and its connections to the MoPEC device 166. Printhead IC 425 includes a nozzle core array 401 containing the repeated logic to fire each nozzle, and nozzle control logic 402 to generate the timing signals to fire the nozzles. The nozzle control logic 402 receives data from the MoPEC chip 166 via a high-speed link. In the preferred form, a single MoPEC chip 166 feeds the two printhead ICs 425 and 426 with print data.

The nozzle control logic is configured to send serial data to the nozzle array core for printing, via a link 407, which for printhead 425 is the electrical connector 428. Status and other operational information about the nozzle array core 401 is communicated back to the nozzle control logic via another link 408, which is also provided on the electrical connector 428.

Figure 43:
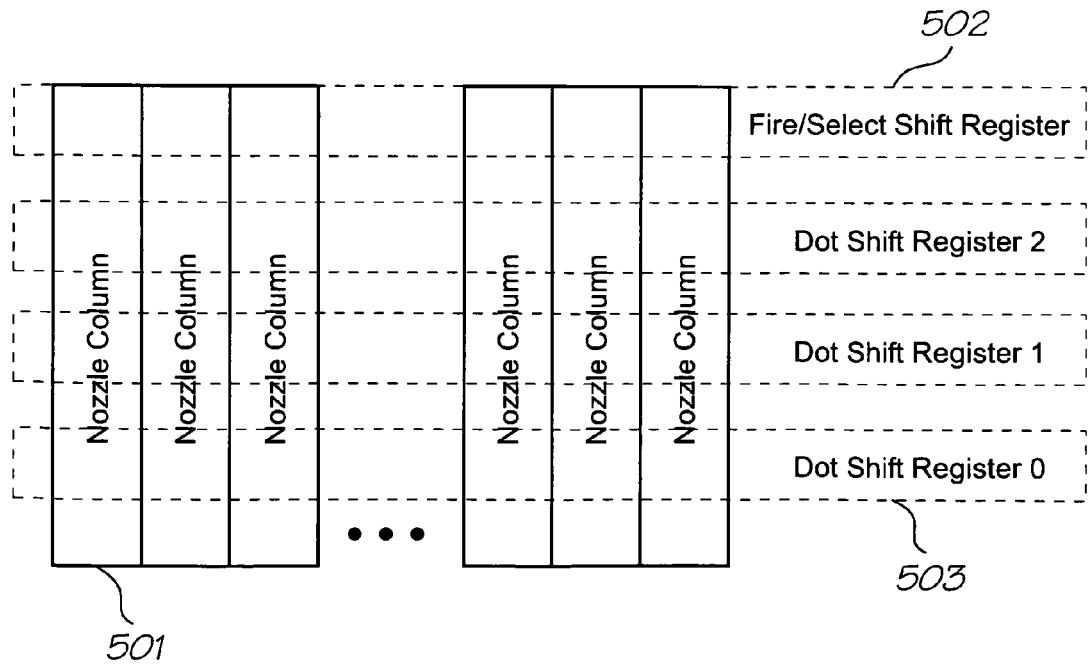
FIG. 43 is a schematic representation showing the relationship between nozzle columns and dot shift registers in the CMOS blocks of FIG. 42.
Figure 44:
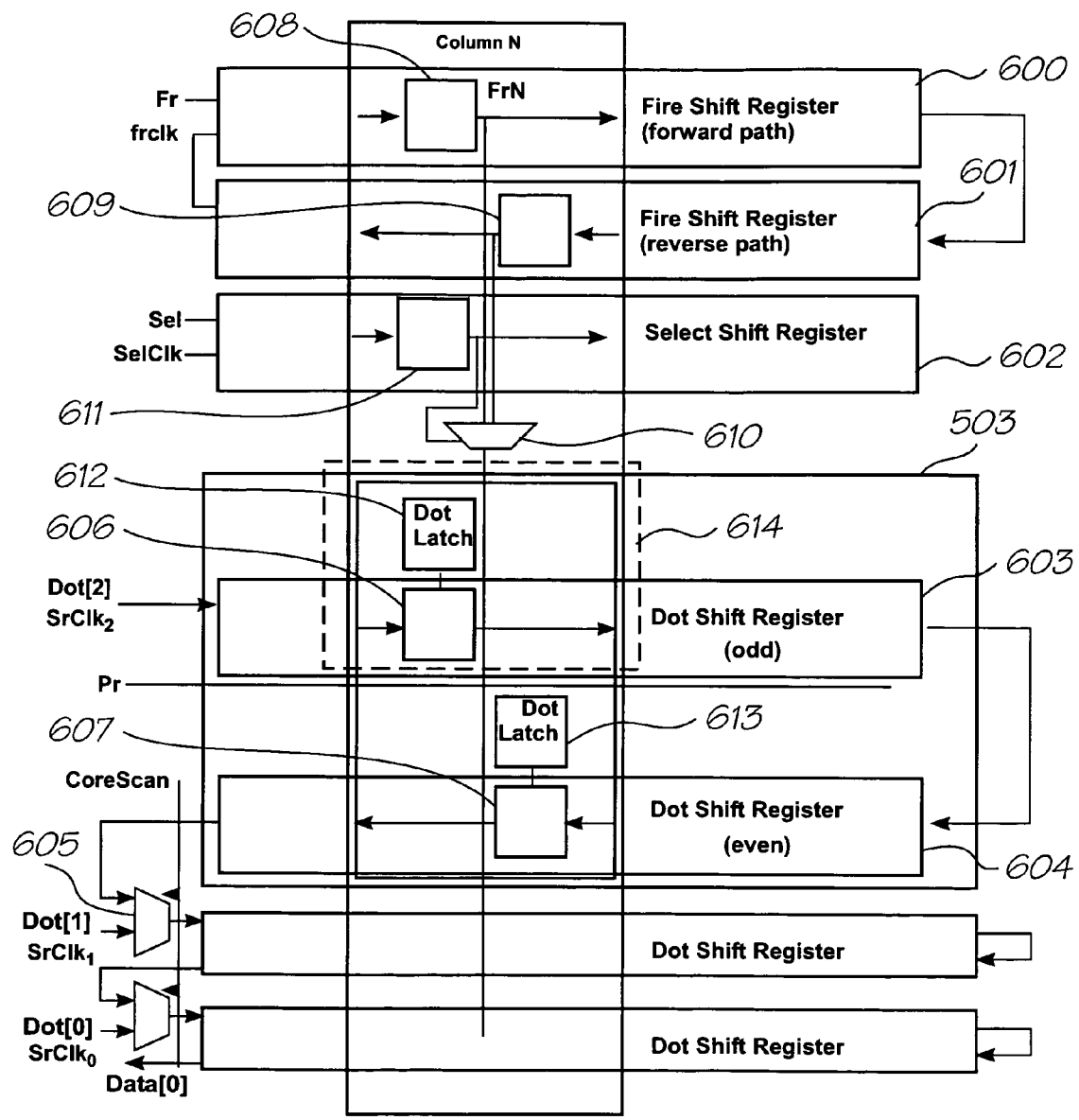
FIG. 44 shows a more detailed schematic showing a unit cell and its relationship to the nozzle columns and dot shift registers of FIG. 43.

The nozzle array core 401 is shown in more detail in FIGS. 43 and 44. In FIG. 43, it will be seen that the nozzle array core comprises an array of nozzle columns 501. The array includes a fire/select shift register 502 and three color channels, each of which is represented by a corresponding dot shift register 503.

As shown in FIG. 44, the fire/select shift register 502 includes a forward path fire shift register 600, a reverse path fire shift register 601 and a select shift register 602. Each dot shift register 503 includes an odd dot shift register 603 and an even dot shift register 604. The odd and even dot shift registers 603 and 604 are connected at one end such that data is clocked through the odd shift register 603 in one direction, then through the even shift register 604 in the reverse direction. The output of all but the final even dot shift register is fed to one input of a multiplexer. 605. This input of the multiplexer is selected by a signal (corescan) during post-production testing. In normal operation, the corescan signal selects dot data input Dot[x] supplied to the other input of the multiplexer 605. This causes Dot[x] for each color to be supplied to the respective dot shift registers 503.

A single column N will now be described with reference to FIG. 44. In the embodiment shown, the column N includes six data values, comprising an odd data value held by an element 606 of the odd shift register 603, and an even data value held by an element 607 of the even shift register 604, for each of the three dot shift registers 503. Column N also includes an odd fire value 608 from the forward fire shift register 600 and an even fire value 609 from the reverse fire shift register 601, which are supplied as inputs to a multiplexer 610. The output of the multiplexer 610 is controlled by the select value 611 in the select shift register 602. When the select value is zero, the odd fire value is output, and when the select value is one, the even fire value is output.

The values from the shift register elements 606 and 607 are provided as inputs to respective odd and even dot latches 612 and 613 respectively.

Figure 45:
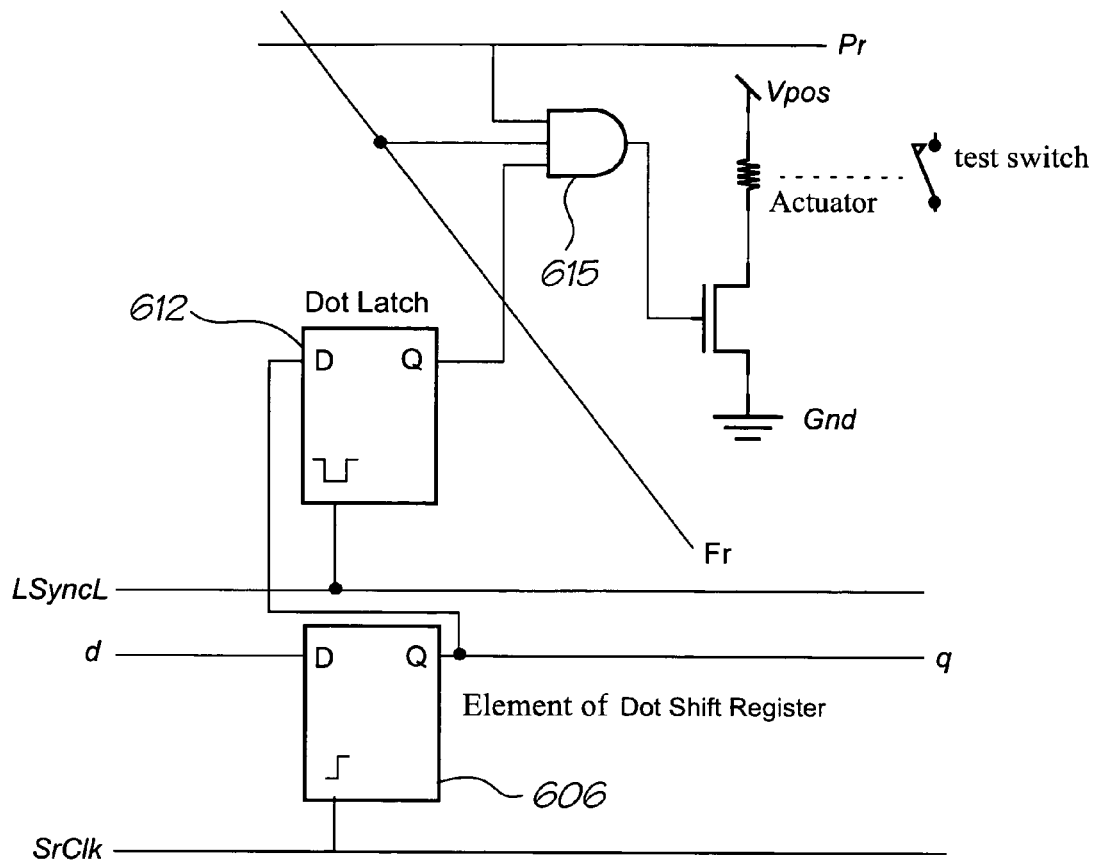
FIG. 45 shows a circuit diagram showing logic for a single printhead nozzle.

Each of dot latch 612 and 613 and their respective associated shift register elements form a unit cell 614, which is shown in more detail in FIG. 45. The dot latch 612 is a D-type flip-flop that accepts the output of the shift register element 606. The data input d to the shift register element 606 is provided from the output of a previous element in the odd dot shift register (unless the element under consideration is the first element in the shift register, in which case its input is the Dot[x] value). Data is clocked from the output of flip-flop 606 into latch 612 upon receipt of a negative pulse provided on LsyncL.

The output of latch 612 is provided as one of the inputs to a three-input AND gate 65. Other inputs to the AND gate 615 are the Fr signal (from the output of multiplexer 610) and a pulse profile signal Pr. The firing time of a nozzle is controlled by the pulse profile signal Pr, and can be, for example, lengthened to take into account a low voltage condition that arises due to low battery (in a battery-powered embodiment). This is to ensure that a relatively consistent amount of ink is efficiently ejected from each nozzle as it is fired. In the embodiment described, the profile signal Pr is the same for each dot shift register, which provides a balance between complexity, cost and performance. However, in other embodiments, the Pr signal can be applied globally (ie, is the same for all nozzles), or can be individually tailored to each unit cell or even to each nozzle.

Once the data is loaded into the latch 612, the fire enable Fr and pulse profile Pr signals are applied to the AND gate 615, combining to the trigger the nozzle to eject a dot of ink for each latch 612 that contains a logic 1.

The signals for each nozzle channel are summarized in the following table:

| Name | Direction | Description |
| --- | --- | --- |
| d | Input | Input dot pattern to shift register bit |
| q | Output | Output dot pattern from shift register bit |
| SrClk | Input | Shift register clock in - d is captured on rising edge of this clock |
| LsyncL | Input | Fire enable - needs to be asserted for nozzle to fire |
| Pr | Input | Profile - needs to be asserted for nozzle to fire |

As shown in FIG. 45, the fire signals Fr are routed on a diagonal, to enable firing of one color in the current column, the next color in the following column, and so on. This averages the current demand by spreading it over the three nozzle columns in time-delayed fashion.

The dot latches and the latches forming the various shift registers are fully static in this embodiment, and are CMOS-based. The design and construction of latches is well known to those skilled in the art of integrated circuit engineering and design, and so will not be described in detail in this document.

Figure 46:
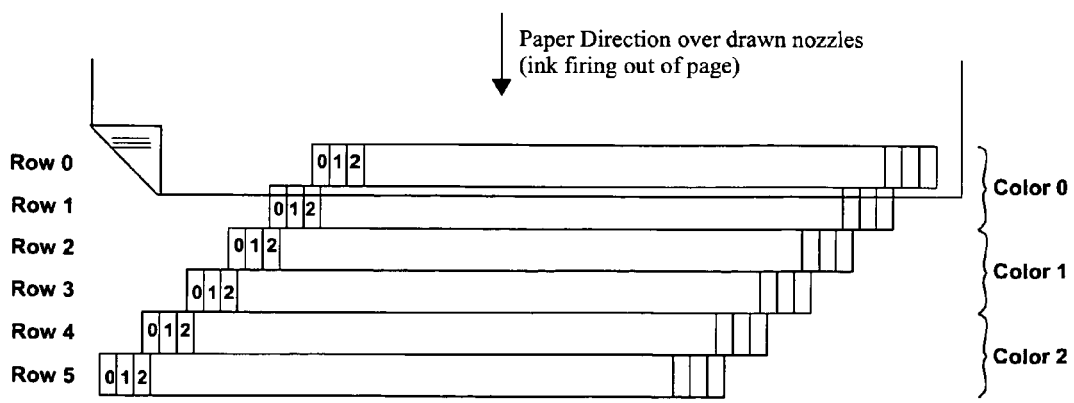
FIG. 46 is a schematic representation of the physical positioning of the odd and even nozzle rows.

The combined printhead ICs define a printhead having 13824 nozzles per color. The circuitry supporting each nozzle is the same, but the pairing of nozzles happens due to physical positioning of the MEMS nozzles; odd and even nozzles are not actually on the same horizontal line, as shown in FIG. 46.

Nozzle Design—Mechanical Actuator

Figure 47:
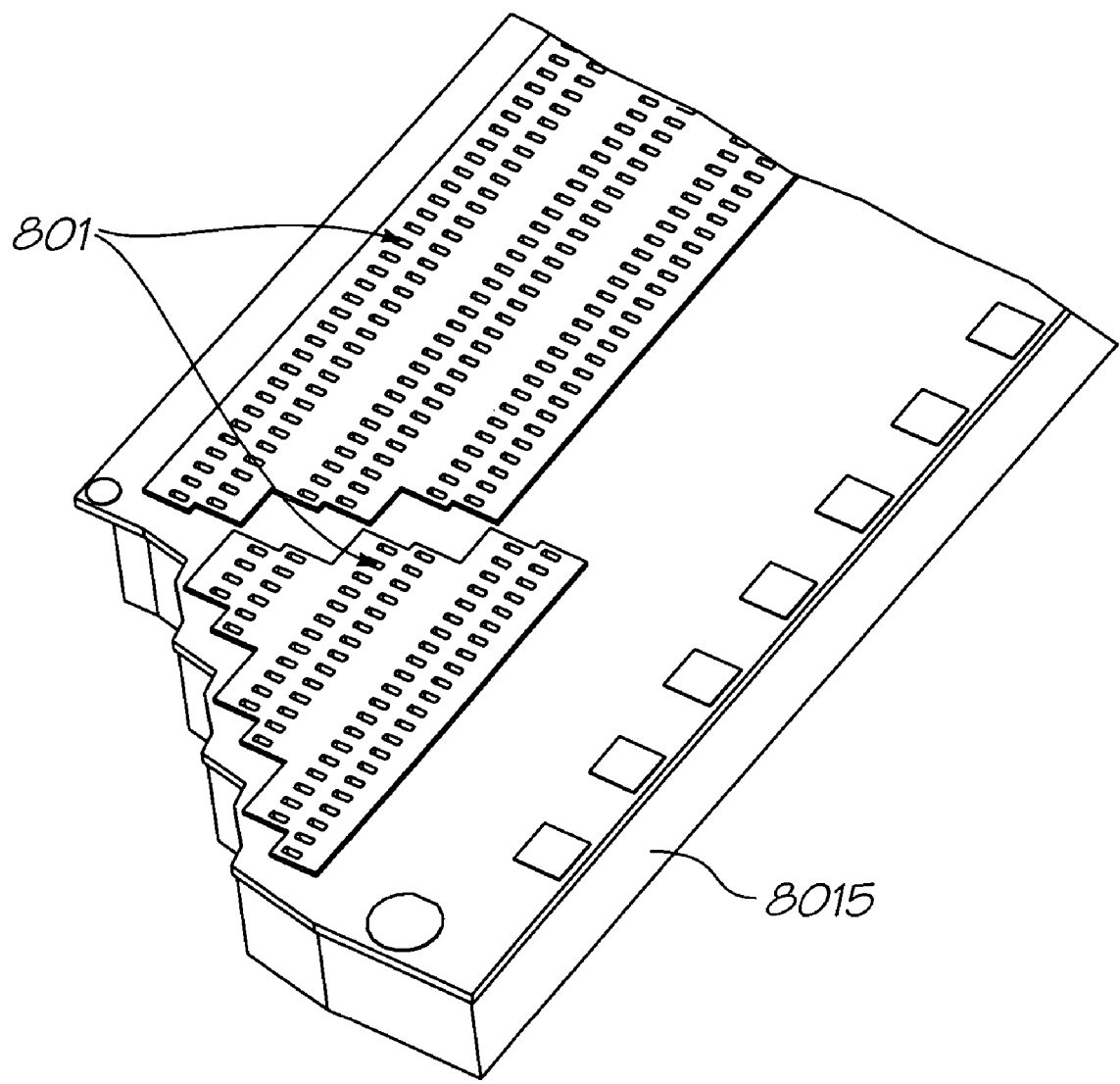
FIG. 47 shows a magnified partial perspective view of the printhead IC.
Figure 48:
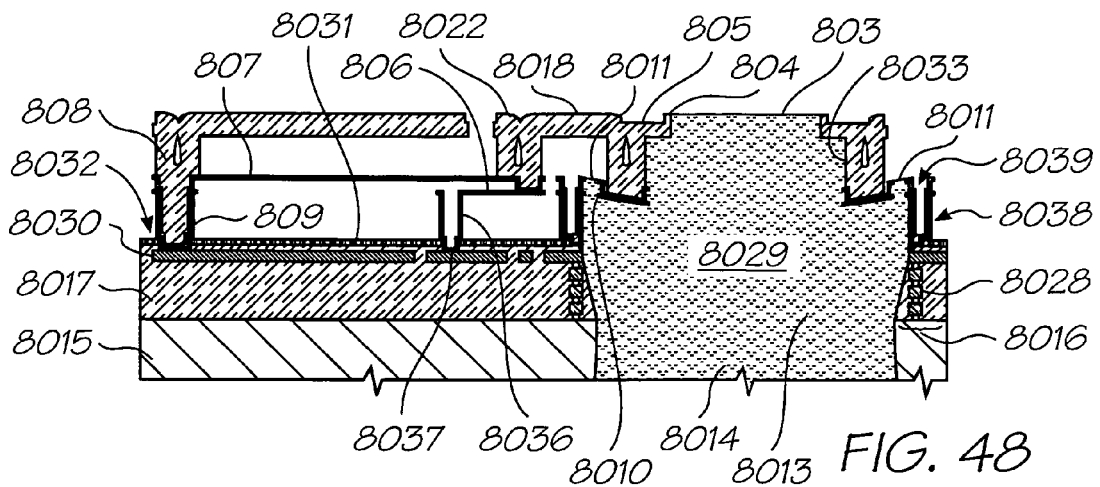
FIG. 48 shows a vertical sectional view of a single nozzle for ejecting ink in a quiescent state.

A preferred nozzle design (comprising nozzle and corresponding actuator) for use in the printhead chip 216 will now be described with reference to FIGS. 21.1-46 to 21.1-55. FIG. 47 shows an array of the nozzles 801 formed on a silicon substrate 8015. All the nozzles 810 in the printhead chip 216 are the same as each other, but are grouped together into rows, each row being fed a particular ink color. It will be appreciated that the particular number/resolution of the nozzles, the number of rows of the nozzles, their position and offset relative to each other, and the specific combination of inks and fixatives output by a particular cartridge will vary from embodiment to embodiment.

It will be noted that in the embodiment illustrated, rows of the nozzles 801 are staggered with respect to each other, allowing closer spacing of ink dots during printing than would be possible with a single row of nozzles.

Each nozzle arrangement 801 is the product of an integrated circuit fabrication technique. In particular, the nozzle arrangement 801 defines a micro-electromechanical system (MEMS).

For clarity and ease of description, the construction and operation of a single nozzle arrangement 801 will be described with reference to FIGS. 48 to 57.

The ink jet printhead chip 12 includes a silicon wafer substrate 801. 0.35 Micron 1 P4M 12 volt CMOS microprocessing circuitry is positioned on the silicon wafer substrate 8015.

A silicon dioxide (or alternatively glass) layer 8017 is positioned on the wafer substrate 8015. The silicon dioxide layer 8017 defines CMOS dielectric layers. CMOS top-level metal defines a pair of aligned aluminium electrode contact layers 8030 positioned on the silicon dioxide layer 8017. Both the silicon wafer substrate 8015 and the silicon dioxide layer 8017 are etched to define an ink inlet channel 8014 having a generally circular cross section (in plan). An aluminium diffusion barrier 8028 of CMOS metal 1, CMOS metal 2/3 and CMOS top level metal is positioned in the silicon dioxide layer 8017 about the ink inlet channel 8014. The diffusion barrier 8028 serves to inhibit the diffusion of hydroxyl ions through CMOS oxide layers of the drive circuitry layer 8017.

A passivation layer in the form of a layer of silicon nitride 8031 is positioned over the aluminium contact layers 8030 and the silicon dioxide layer 8017. Each portion of the passivation layer 8031 positioned over the contact layers 8030 has an opening 8032 defined therein to provide access to the contacts 8030.

Figure 50:
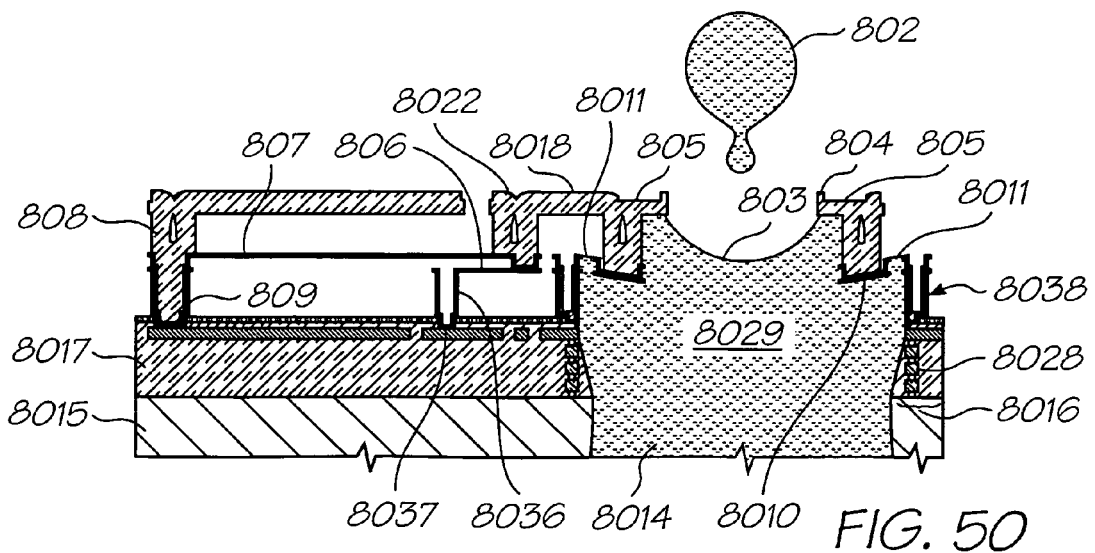
FIG. 50 shows a vertical sectional view of the nozzle of FIG. 48 later in the actuation phase.

The nozzle arrangement 801 includes a nozzle chamber 8029 defined by an annular nozzle wall 8033, which terminates at an upper end in a nozzle roof 8034 and a radially inner nozzle rim 804 that is circular in plan. The ink inlet channel 8014 is in fluid communication with the nozzle chamber 8029. At a lower end of the nozzle wall, there is disposed a moving rim 8010, that includes a moving seal lip 8040. An encircling wall 8038 surrounds the movable nozzle, and includes a stationary seal lip 8039 that, when the nozzle is at rest as shown in FIG. 50, is adjacent the moving rim 8010. A fluidic seal 8011 is formed due to the surface tension of ink trapped between the stationary seal lip 8039 and the moving seal lip 8040. This prevents leakage of ink from the chamber whilst providing a low resistance coupling between the encircling wall 8038 and the nozzle wall 8033.

Figure 57:
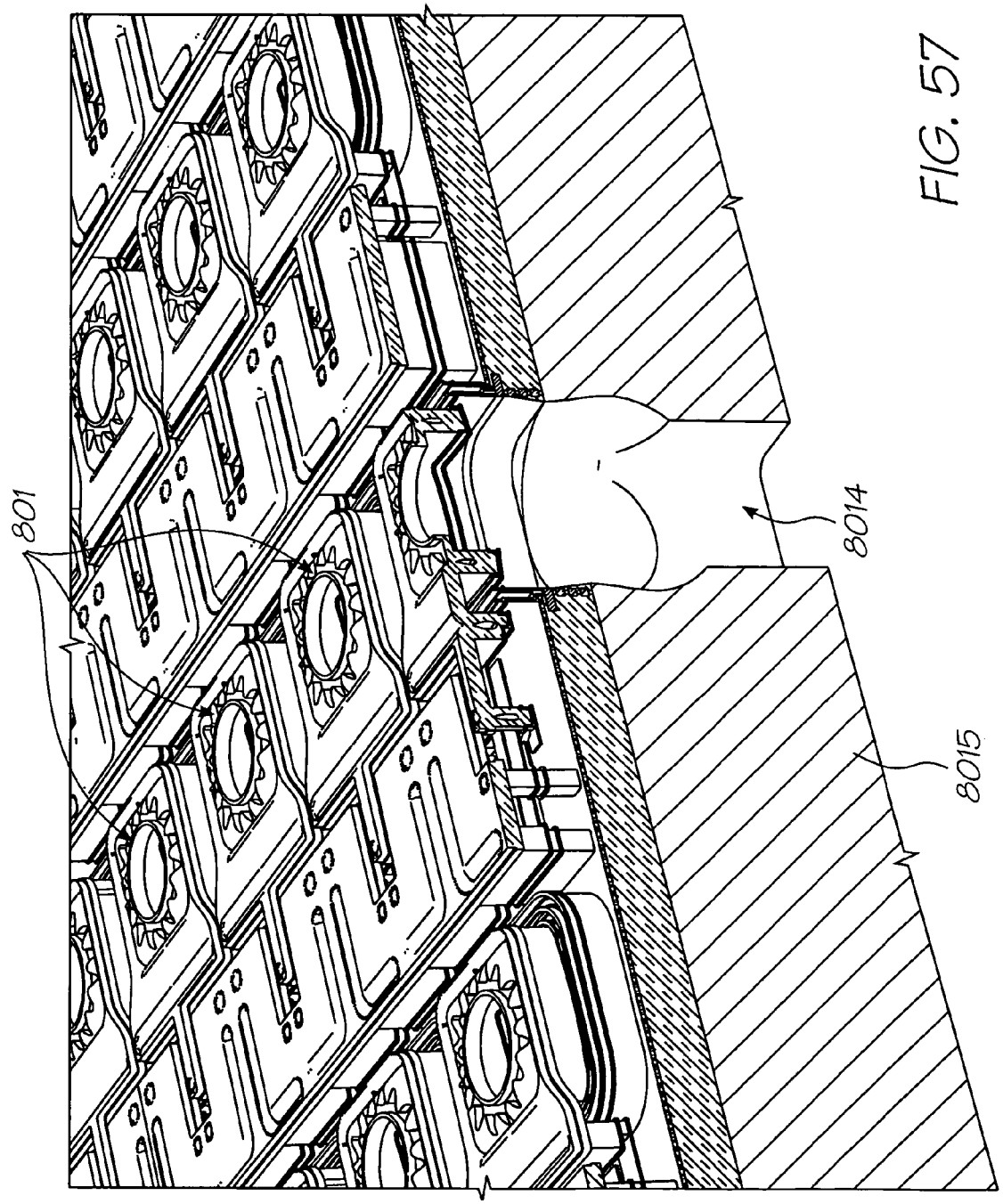
FIG. 57 shows a perspective vertical sectional view of a part of a printhead chip incorporating a plurality of the nozzle arrangements of the type shown in FIG. 48.

As best shown in FIG. 57, a plurality of radially extending recesses 8035 is defined in the roof 8034 about the nozzle rim 804. The recesses 8035 serve to contain radial ink flow as a result of ink escaping past the nozzle rim 804.

The nozzle wall 8033 forms part of a lever arrangement that is mounted to a carrier 8036 having a generally U-shaped profile with a base 8037 attached to the layer 8031 of silicon nitride.

Figure 51:
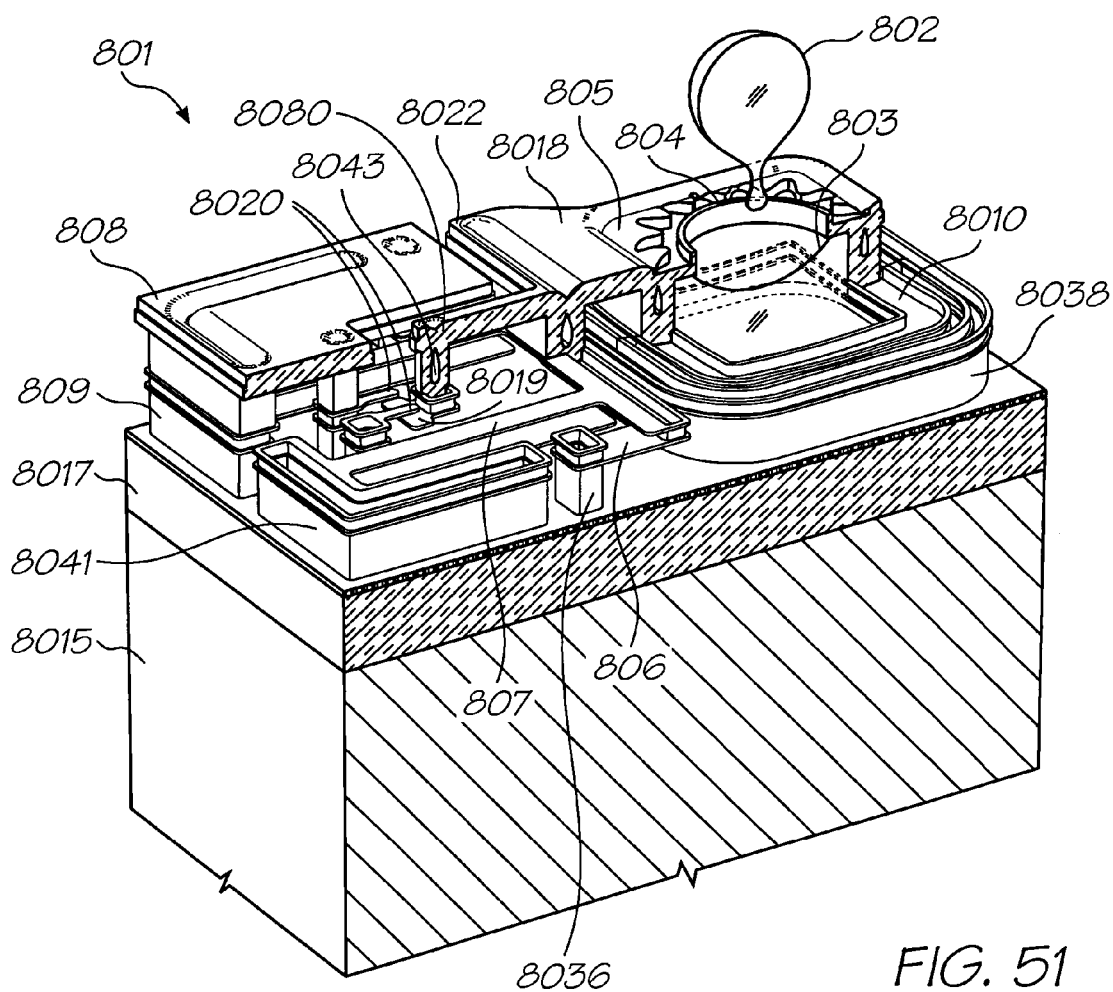
FIG. 51 shows a perspective partial vertical sectional view of the nozzle of FIG. 48, at the actuation state shown in FIG. 50.

The lever arrangement also includes a lever arm 8018 that extends from the nozzle walls and incorporates a lateral stiffening beam 8022. The lever arm 8018 is attached to a pair of passive beams 806, formed from titanium nitride (TiN) and positioned on either side of the nozzle arrangement, as best shown in FIGS. 50 and 51. The other ends of the passive beams 806 are attached to the carrier 8036.

The lever arm 8018 is also attached to an actuator beam 807, which is formed from TiN. It will be noted that this attachment to the actuator beam is made at a point a small but critical distance higher than the attachments to the passive beam 806.

Figure 56:
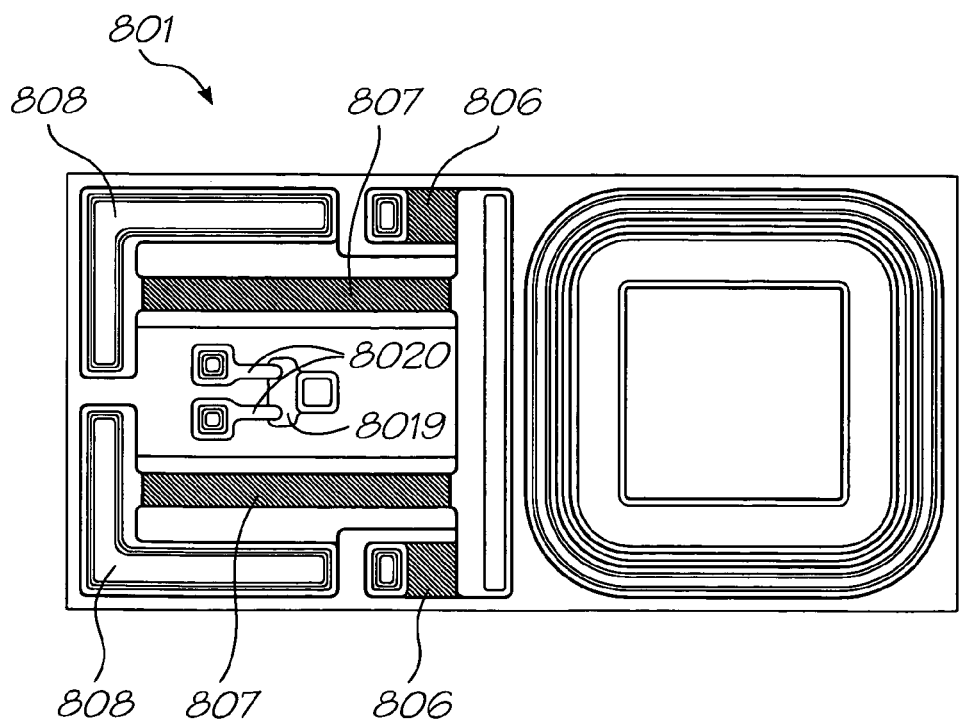
FIG. 56 shows a plan view of the nozzle of FIG. 48 with the lever arm and movable nozzle removed for clarity.

As best shown in FIGS. 51 and 56, the actuator beam 807 is substantially U-shaped in plan, defining a current path between the electrode 809 and an opposite electrode 8041. Each of the electrodes 809 and 8041 are electrically connected to respective points in the contact layer 8030. As well as being electrically coupled via the contacts 809, the actuator beam is also mechanically anchored to anchor 808. The anchor 808 is configured to constrain motion of the actuator beam 807 to the left of FIGS. 21.1-52 to 54 when the nozzle arrangement is in operation.

The TiN in the actuator beam 807 is conductive, but has a high enough electrical resistance that it undergoes self-heating when a current is passed between the electrodes 809 and 8041. No current flows through the passive beams 806, so they do not expand.

In use, the device at rest is filled with ink 8013 that defines a meniscus 803 under the influence of surface tension. The ink is retained in the chamber 8029 by the meniscus, and will not generally leak out in the absence of some other physical influence.

As shown in FIG. 50, to fire ink from the nozzle, a current is passed between the contacts 809 and 8041, passing through the actuator beam 807. The self-heating of the beam 807 due to its resistance causes the beam to expand. The dimensions and design of the actuator beam 807 mean that the majority of the expansion is in a horizontal direction with respect to FIGS. 50 to 53. The expansion is constrained to the left by the anchor 808, so the end of the actuator beam 807 adjacent the lever arm 8018 is impelled to the right.

The relative horizontal inflexibility of the passive beams 806 prevents them from allowing much horizontal movement the lever arm 8018. However, the relative displacement of the attachment points of the passive beams and actuator beam respectively to the lever arm causes a twisting movement that causes the lever arm 8018 to move generally downwards. The movement is effectively a pivoting or hinging motion. However, the absence of a true pivot point means that the rotation is about a pivot region defined by bending of the passive beams 806.

Figure 49:
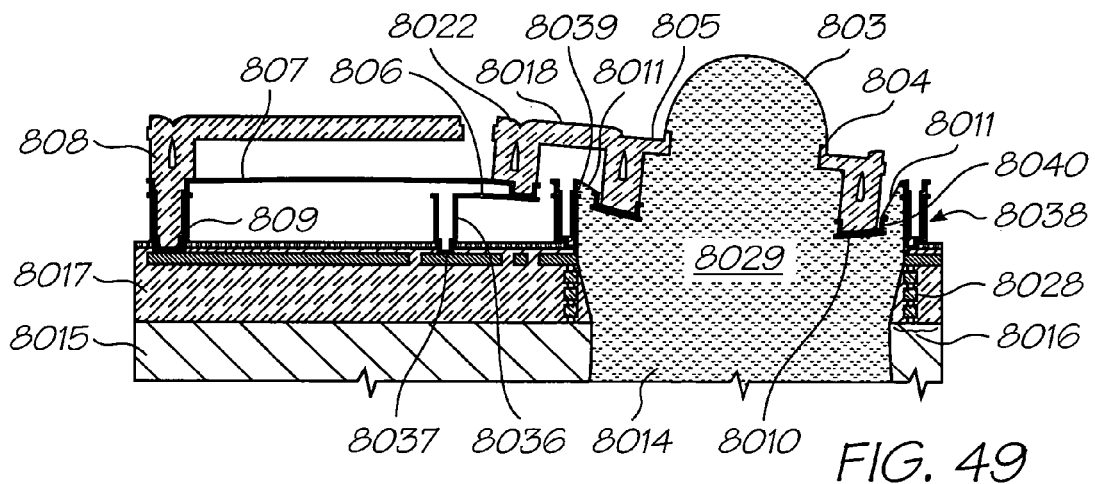
FIG. 49 shows a vertical sectional view of the nozzle of FIG. 48 during an initial actuation phase.

The downward movement (and slight rotation) of the lever arm 8018 is amplified by the distance of the nozzle wall 8033 from the passive beams 806. The downward movement of the nozzle walls and roof causes a pressure increase within the chamber 29, causing the meniscus to bulge as shown in FIG. 49. It will be noted that the surface tension of the ink means the fluid seal 11 is stretched by this motion without allowing ink to leak out.

As shown in FIG. 50, at the appropriate time, the drive current is stopped and the actuator beam 807 quickly cools and contracts. The contraction causes the lever arm to commence its return to the quiescent position, which in turn causes a reduction in pressure in the chamber 8029. The interplay of the momentum of the bulging ink and its inherent surface tension, and the negative pressure caused by the upward movement of the nozzle chamber 8029 causes thinning, and ultimately snapping, of the bulging meniscus to define an ink drop 802 that continues upwards until it contacts an adjacent print medium.

Immediately after the drop 802 detaches, the meniscus forms the concave shape shown in FIG. 50. Surface tension causes the pressure in the chamber 8029 to remain relatively low until ink has been sucked upwards through the inlet 8014, which returns the nozzle arrangement and the ink to the quiescent situation shown in FIG. 50.

Figure 52:
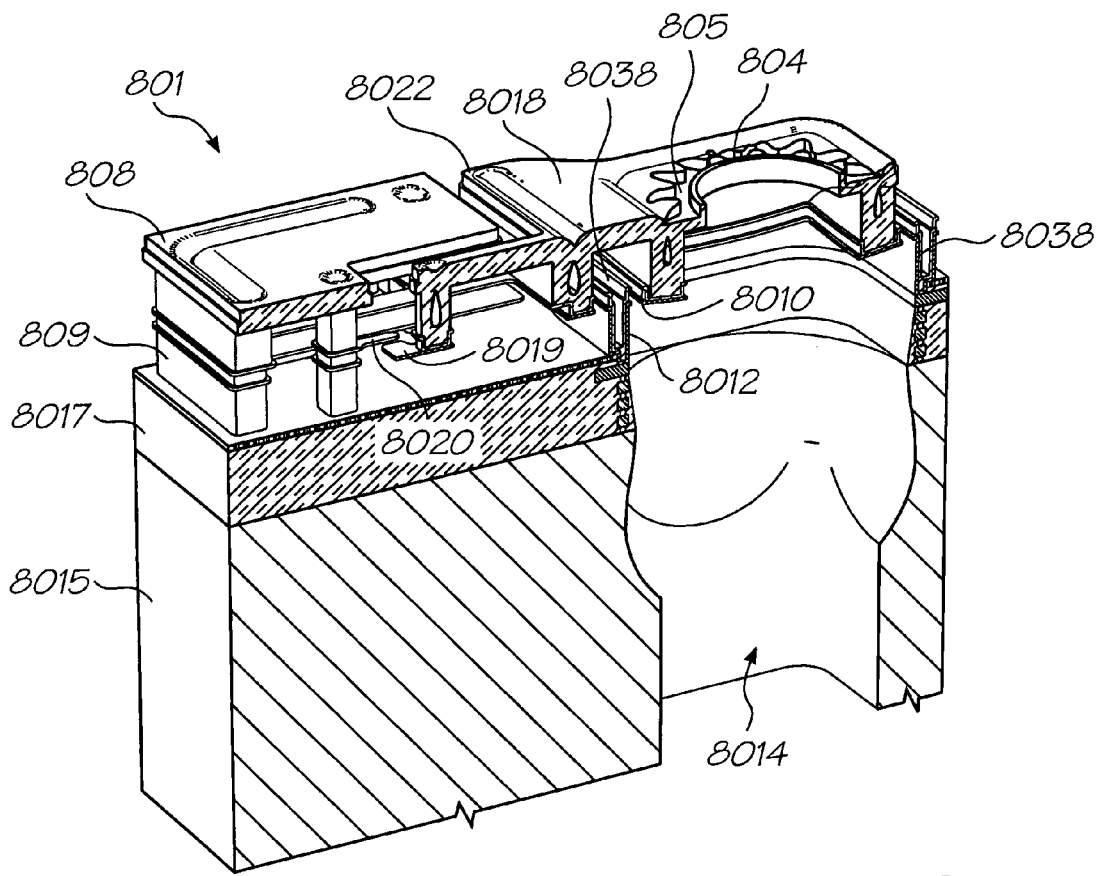
FIG. 52 shows a perspective vertical section of the nozzle of FIG. 48, with ink omitted.
Figure 53:
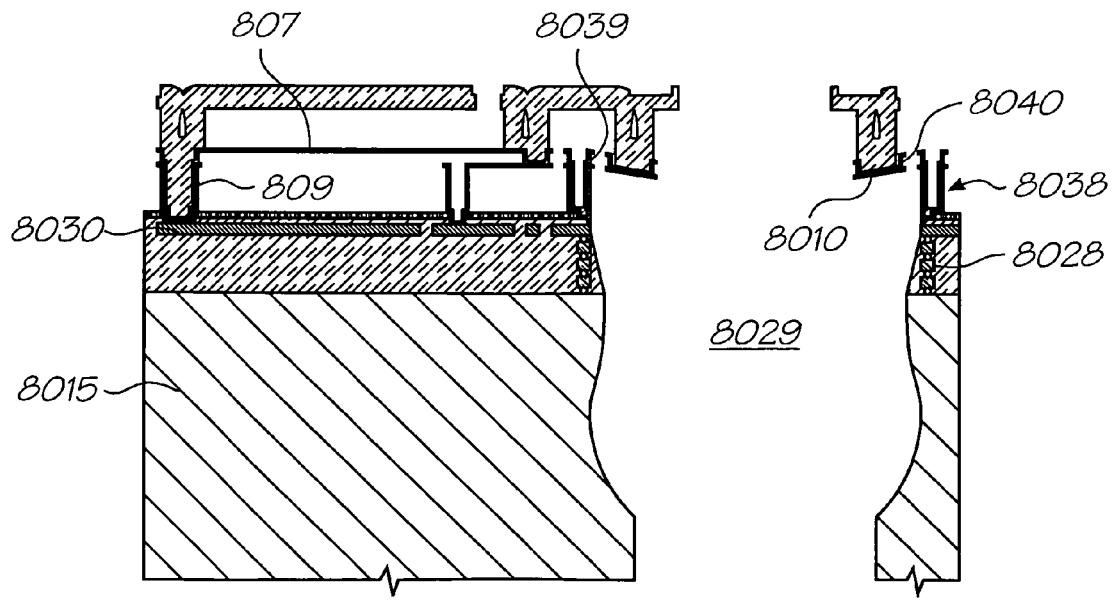
FIG. 53 shows a vertical sectional view of the of the nozzle of FIG. 52.
Figure 54:
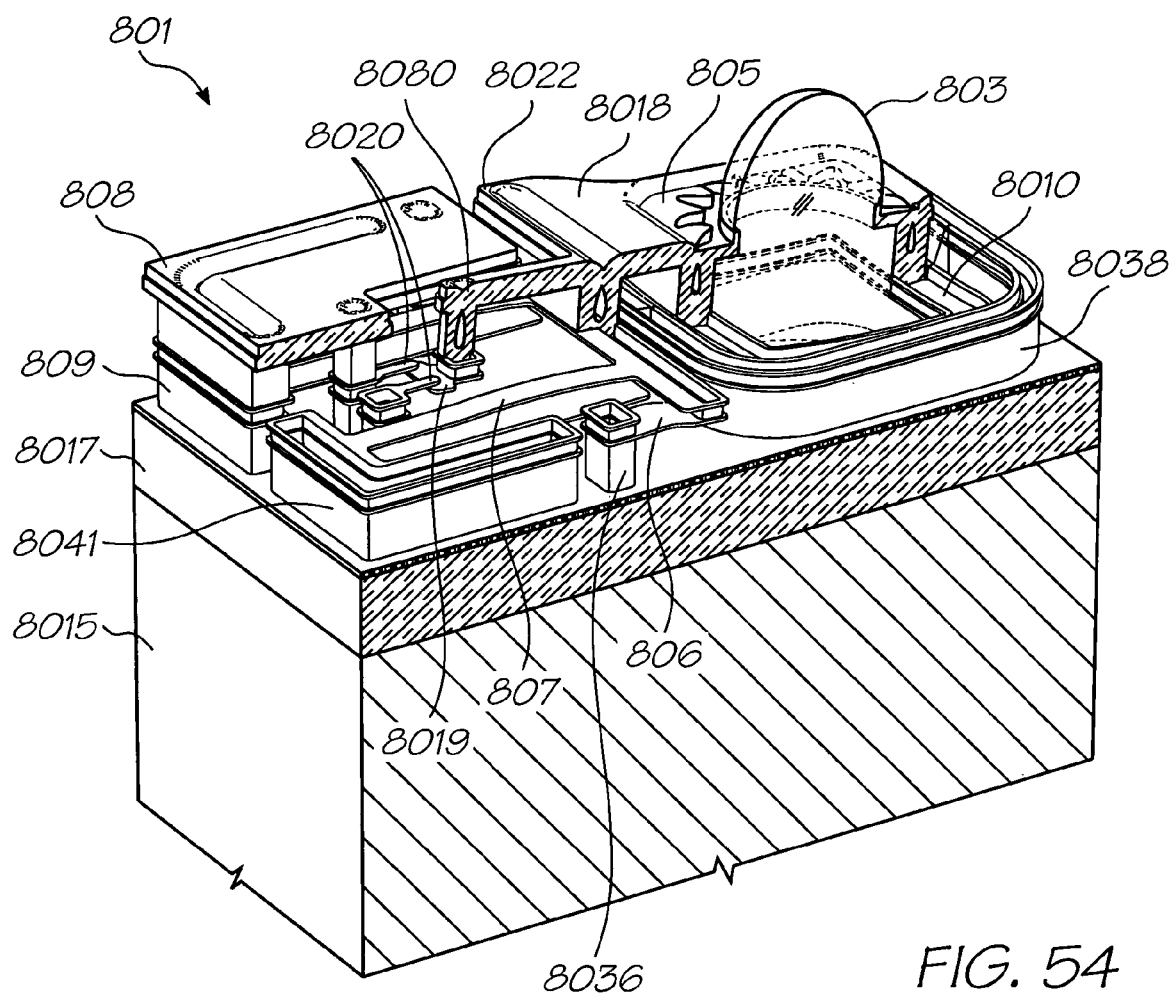
FIG. 54 shows a perspective partial vertical sectional view of the nozzle of FIG. 48, at the actuation state shown in FIG. 49.
Figure 55:
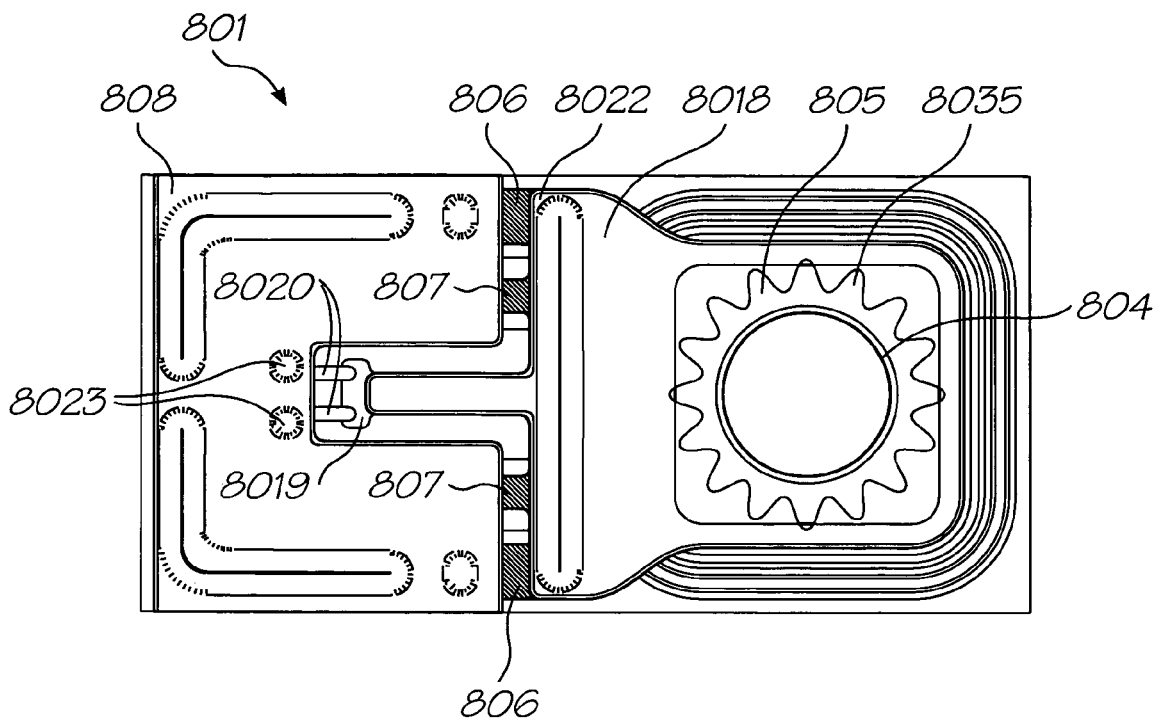
FIG. 55 shows a plan view of the nozzle of FIG. 48.

As best shown in FIG. 52, the nozzle arrangement also incorporates a test mechanism that can be used both post-manufacture and periodically after the printhead is installed. The test mechanism includes a pair of contacts 8020 that are connected to test circuitry (not shown). A bridging contact 8019 is provided on a finger 8043 that extends from the lever arm 8018. Because the bridging contact 8019 is on the opposite side of the passive beams 806, actuation of the nozzle causes the priding contact to move upwardly, into contact with the contacts 8020. Test circuitry can be used to confirm that actuation causes this closing of the circuit formed by the contacts 8019 and 8020. If the circuit closed appropriately, it can generally be assumed that the nozzle is operative.

Nozzle Design—Thermal Actuator

An alternative nozzle design utilises a thermal inkjet mechanism for expelling ink from each nozzle. The thermal nozzles are set out similarly to their mechanical equivalents, and are supplied by similar control signals by similar CMOS circuitry, albeit with different pulse profiles if required by any differences in drive characteristics need to be accounted for.

With reference to FIGS. 58 to 62, the nozzle of a printhead according to an embodiment of the invention comprises a nozzle plate 902 with nozzles 903 therein, the nozzles having nozzle rims 904, and apertures 905 extending through the nozzle plate. The nozzle plate 902 is plasma etched from a silicon nitride structure which is deposited, by way of chemical vapor deposition (CVD), over a sacrificial material which is subsequently etched.

The printhead also includes, with respect to each nozzle 903, side walls 906 on which the nozzle plate is supported, a chamber 907 defined by the walls and the nozzle plate 902, a multi-layer substrate 908 and an inlet passage 909 extending through the multi-layer substrate to the far side (not shown) of the substrate. A looped, elongate heater element 910 is suspended within the chamber 907, so that the element is in the form of a suspended beam. The printhead as shown is a microelectromechanical system (MEMS) structure, which is formed by a lithographic process which is described in more detail below.

Figure 58:
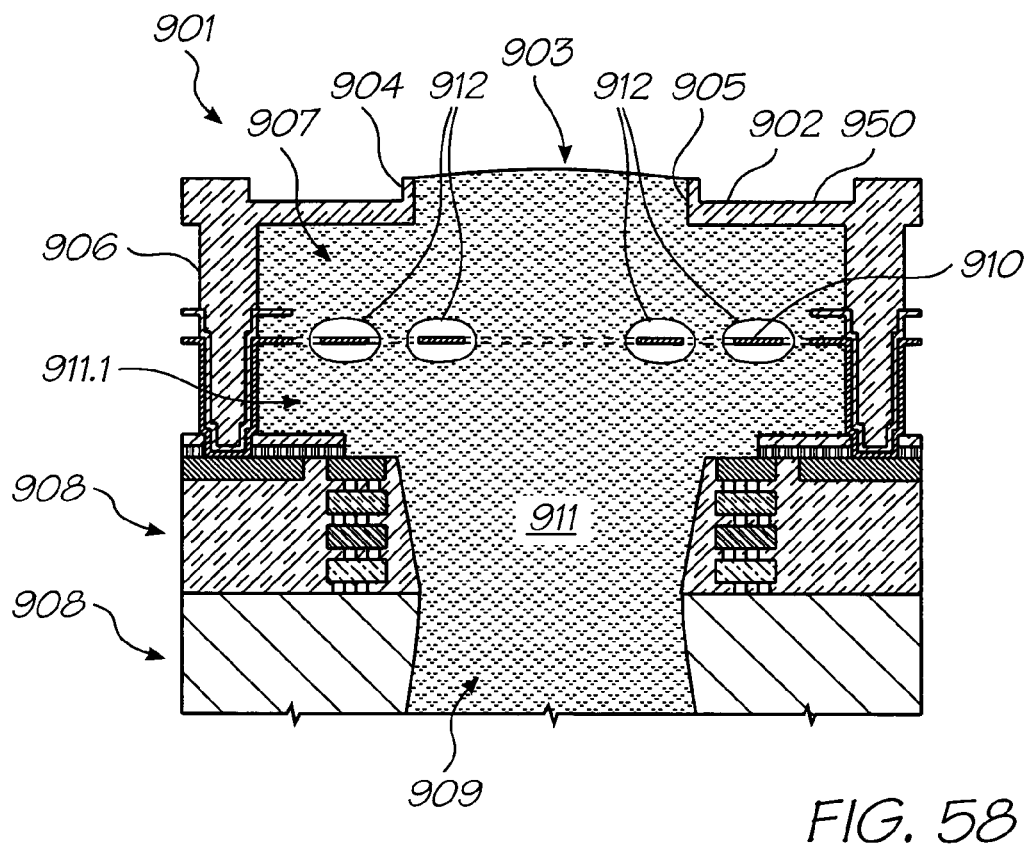
FIG. 58 shows a schematic cross-sectional view through an ink chamber of a single bubble forming type nozzle with a bubble nucleating about heater element.

When the printhead is in use, ink 911 from a reservoir (not shown) enters the chamber 907 via the inlet passage 909, so that the chamber fills to the level as shown in FIG. 58. Thereafter, the heater element 910 is heated for somewhat less than 1 micro second, so that the heating is in the form of a thermal pulse. It will be appreciated that the heater element 910 is in thermal contact with the ink 911 in the chamber 907 so that when the element is heated, this causes the generation of vapor bubbles 912 in the ink. Accordingly, the ink 911 constitutes a bubble forming liquid. FIG. 58 shows the formation of a bubble 912 approximately 1 microsecond after generation of the thermal pulse, that is, when the bubble has just nucleated on the heater elements 910. It will be appreciated that, as the heat is applied in the form of a pulse, all the energy necessary to generate the bubble 12 is to be supplied within that short time.

In operation, voltage is applied across electrodes (not shown) to cause current to flow through the elements 910. The electrodes 915 are much thicker than the element 910 so that most of the electrical resistance is provided by the element. Thus, nearly all of the power consumed in operating the heater 914 is dissipated via the element 910, in creating the thermal pulse referred to above.

When the element 910 is heated as described above, the bubble 912 forms along the length of the element, this bubble appearing, in the cross-sectional view of FIG. 58, as four bubble portions, one for each of the element portions shown in cross section.

The bubble 912, once generated, causes an increase in pressure within the chamber 97, which in turn causes the ejection of a drop 916 of the ink 911 through the nozzle 903. The rim 904 assists in directing the drop 916 as it is ejected, so as to minimize the chance of drop misdirection.

The reason that there is only one nozzle 903 and chamber 907 per inlet passage 909 is so that the pressure wave generated within the chamber, on heating of the element 910 and forming of a bubble 912, does not affect adjacent chambers and their corresponding nozzles.

The advantages of the heater element 910 being suspended rather than being embedded in any solid material, is discussed below.

Figure 59:
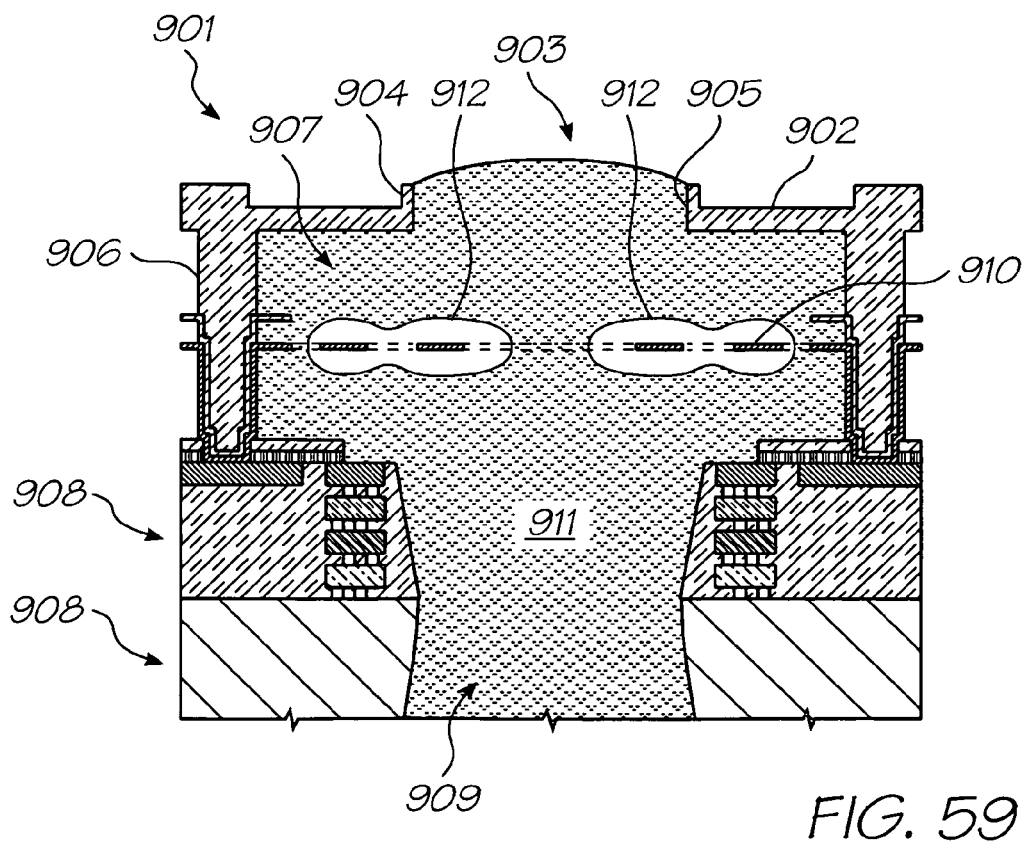
FIG. 59 shows the bubble growing in the nozzle of FIG. 58.
Figure 60:
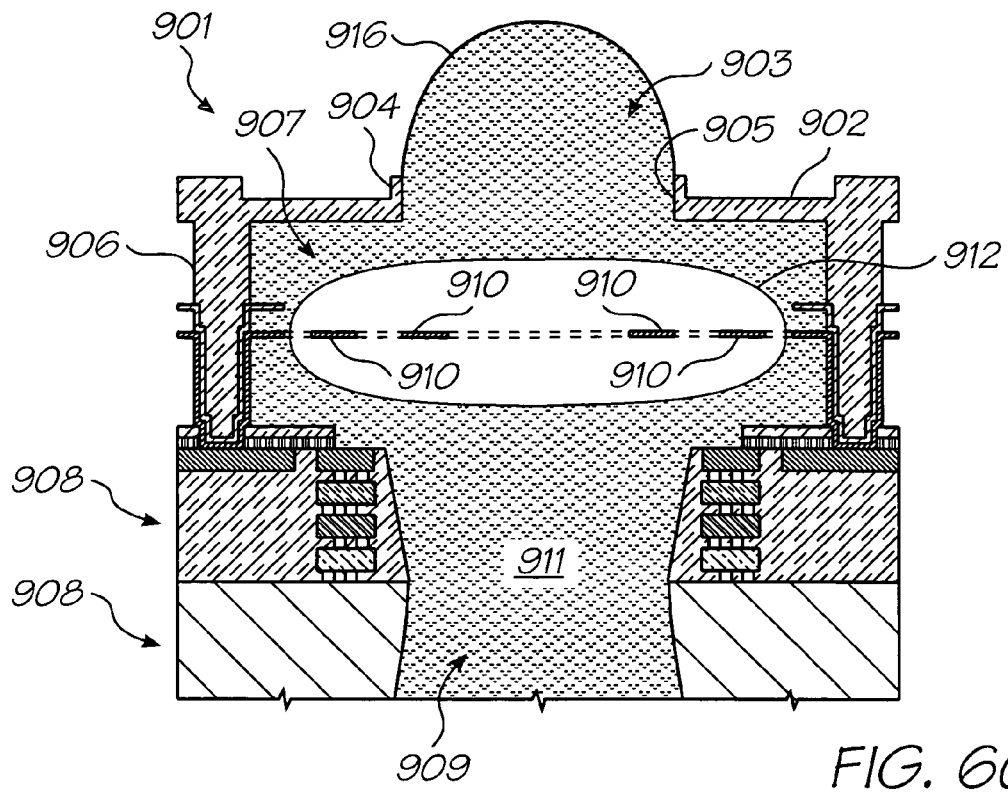
FIG. 60 shows further bubble growth within the nozzle of FIG. 58.

FIGS. 59 and 60 show the unit cell 901 at two successive later stages of operation of the printhead. It can be seen that the bubble 912 generates further, and hence grows, with the resultant advancement of ink 911 through the nozzle 903. The shape of the bubble 912 as it grows, as shown in FIG. 60, is determined by a combination of the inertial dynamics and the surface tension of the ink 911. The surface tension tends to minimize the surface area of the bubble 912 so that, by the time a certain amount of liquid has evaporated, the bubble is essentially disk-shaped.

The increase in pressure within the chamber 907 not only pushes ink 911 out through the nozzle 903, but also pushes some ink back through the inlet passage 909. However, the inlet passage 909 is approximately 200 to 300 microns in length, and is only approximately 16 microns in diameter. Hence there is a substantial viscous drag. As a result, the predominant effect of the pressure rise in the chamber 907 is to force ink out through the nozzle 903 as an ejected drop 916, rather than back through the inlet passage 909.

Figure 61:
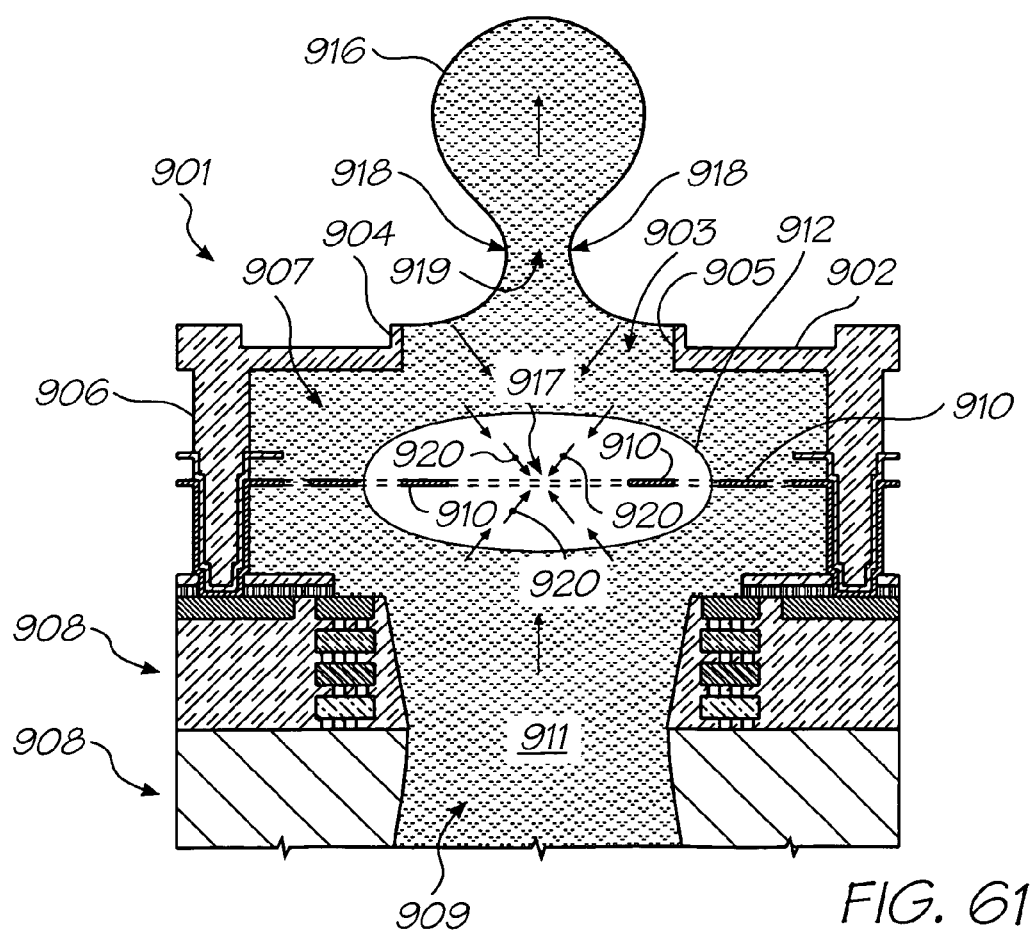
FIG. 61 shows the formation of the ejected ink drop from the nozzle of FIG. 58.
Figure 62:
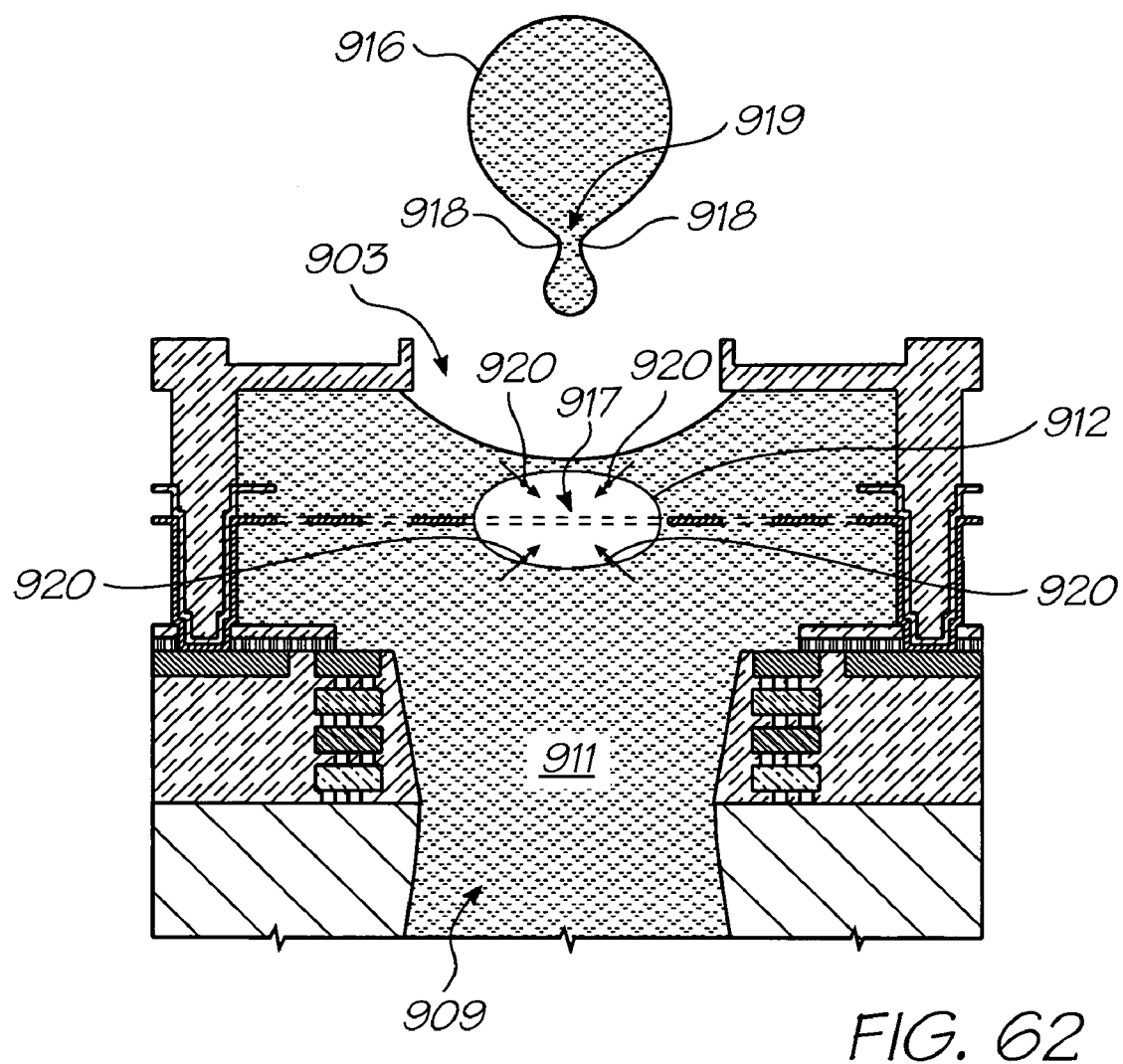
FIG. 62 shows the detachment of the ejected ink drop and the collapse of the bubble in the nozzle of FIG. 58.

Turning now to FIG. 61, the printhead is shown at a still further successive stage of operation, in which the ink drop 916 that is being ejected is shown during its "necking phase" before the drop breaks off. At this stage, the bubble 912 has already reached its maximum size and has then begun to collapse towards the point of collapse 917, as reflected in more detail in FIG. 62.

The collapsing of the bubble 912 towards the point of collapse 917 causes some ink 911 to be drawn from within the nozzle 903 (from the sides 918 of the drop), and some to be drawn from the inlet passage 909, towards the point of collapse. Most of the ink 911 drawn in this manner is drawn from the nozzle 903, forming an annular neck 919 at the base of the drop 916 prior to its breaking off.

The drop 916 requires a certain amount of momentum to overcome surface tension forces, in order to break off. As ink 911 is drawn from the nozzle 903 by the collapse of the bubble 912, the diameter of the neck 919 reduces thereby reducing the amount of total surface tension holding the drop, so that the momentum of the drop as it is ejected out of the nozzle is sufficient to allow the drop to break off.

When the drop 916 breaks off, cavitation forces are caused as reflected by the arrows 920, as the bubble 912 collapses to the point of collapse 917. It will be noted that there are no solid surfaces in the vicinity of the point of collapse 917 on which the cavitation can have an effect.

Cradle

The various cartridges described above are used in the same way, since the mobile device itself cannot tell which ink supply system is in use. Hence, the cradle will be described with reference to the cartridge 148 only.

Figure 63:
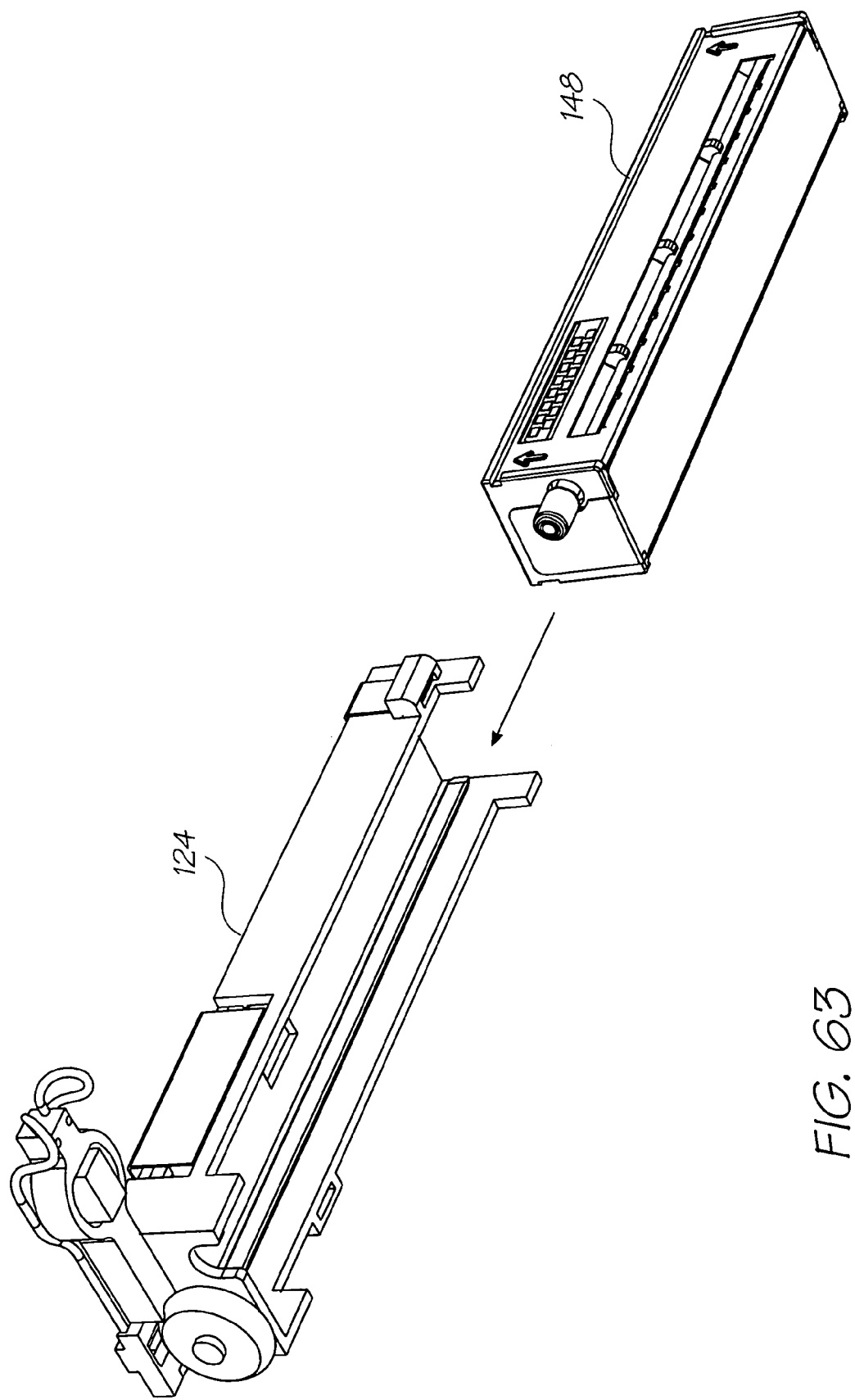
FIG. 63 is a perspective showing the longitudinal insertion of the print cartridge into the cradle assembly.
Figure 64:
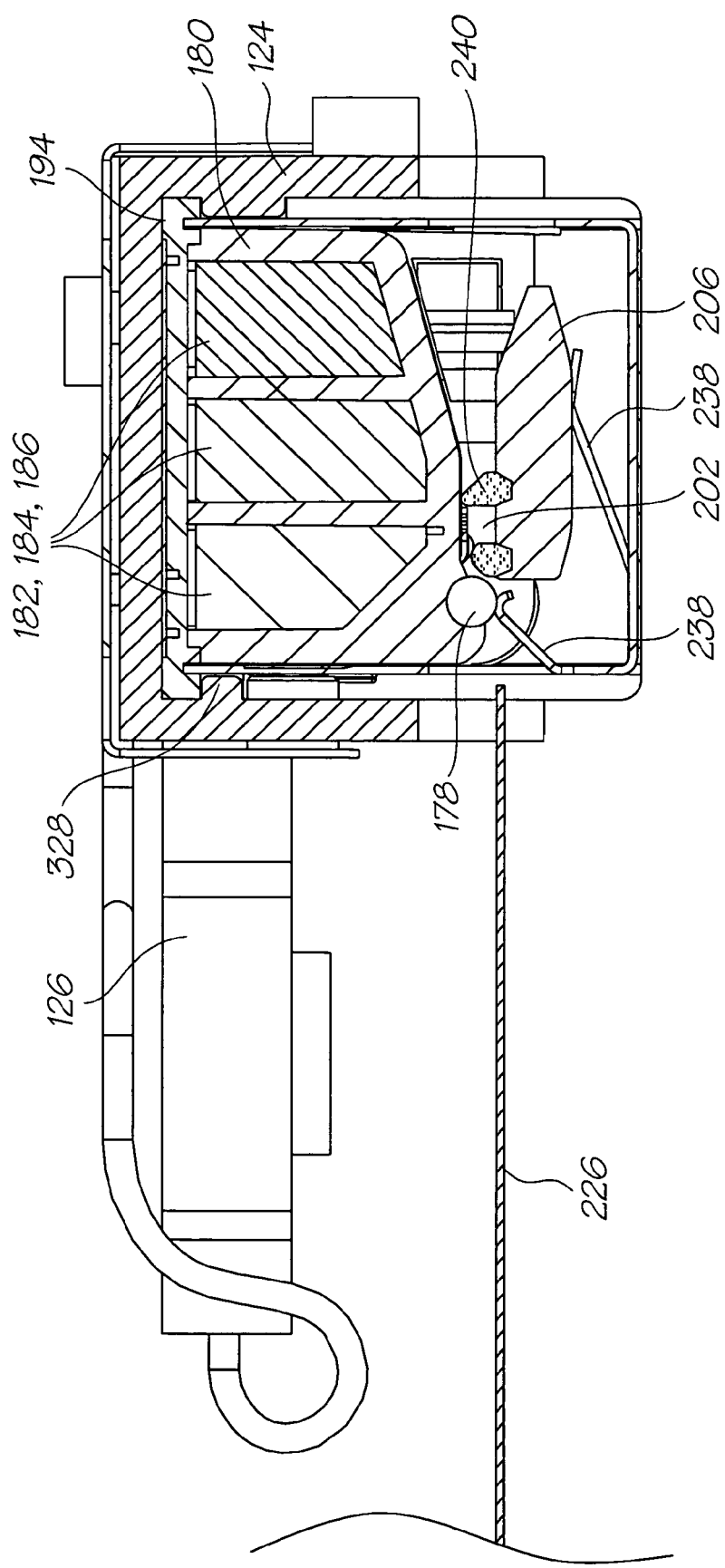
FIG. 64 is a lateral cross section of the print cartridge inserted into the cradle assembly.

Referring to FIG. 63, the cartridge 148 is inserted axially into the mobile phone 100 via the access cover 282 and into engagement with the cradle 124. As previously shown in FIGS. 19 and 21, the cradle 124 is an elongate U-shaped moulding defining a channel that is dimensioned to closely correspond to the dimensions of the print cartridge 148. Referring now to FIG. 64, the cartridge 148 slides along the rail 328 upon insertion into the mobile phone 100. The edge of the lid moulding 194 fits under the rail 328 for positional tolerance control. As shown in FIGS. 19 to 21 the contacts 266 on the cartridge TAB film 200 are urged against the data/power connector 330 in the cradle. The other side of the data/power connector 330 contacts the cradle flex PCB 332. This PCB connects the cartridge and the MoPEC chip to the power and the host electronics (not shown) of the mobile phone, to provide power and dot data to the printhead to enable it to print. The interaction between the MoPEC chip and the host electronics of the mobile telecommunications device is described in the Netpage and Mobile Telecommunications Device Overview section above.

Media Feed

Figure 12:
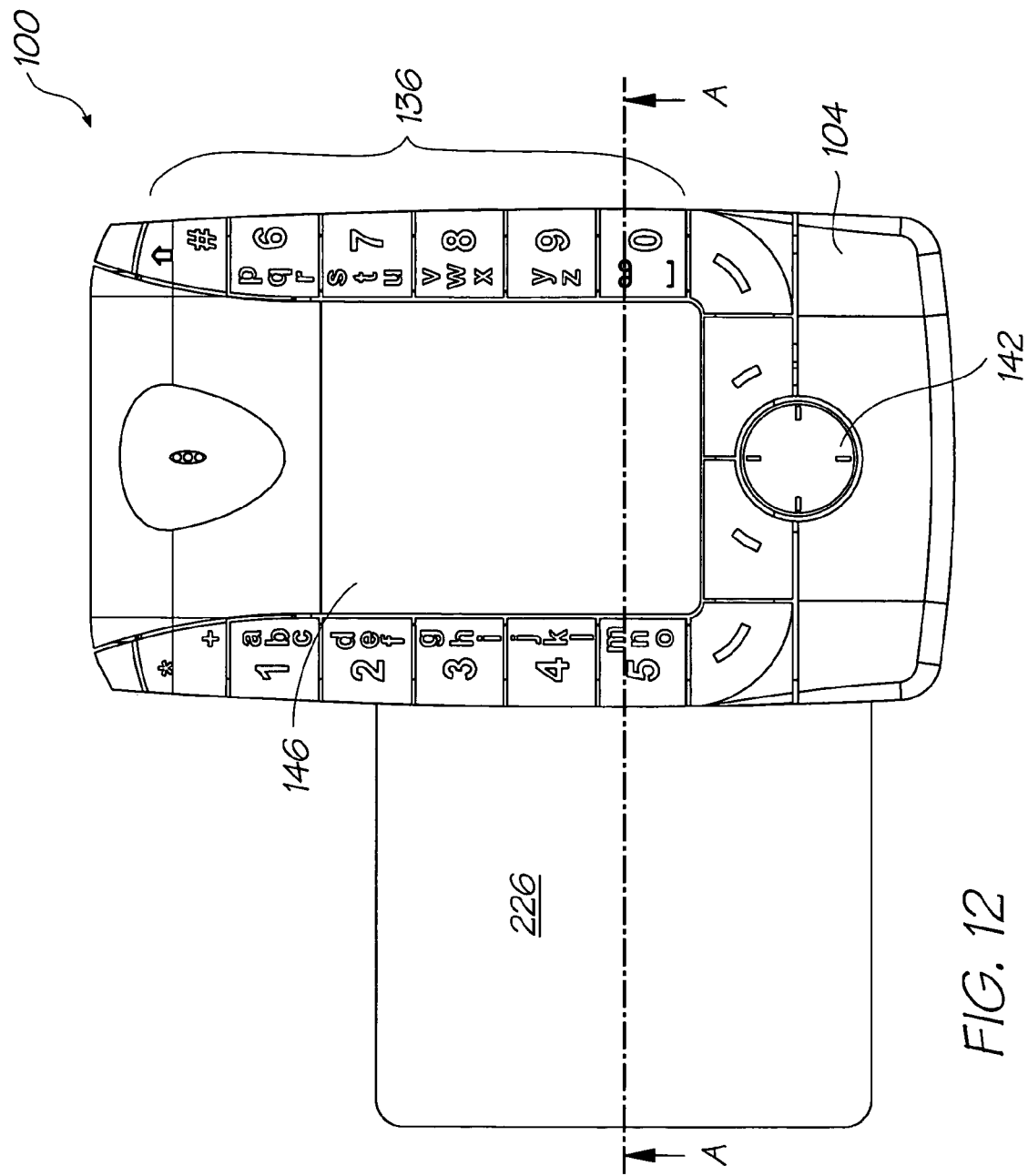
FIG. 12 is a front elevation of the embodiment shown in FIG. 9 with a card being fed into its media entry slot.
Figure 13:
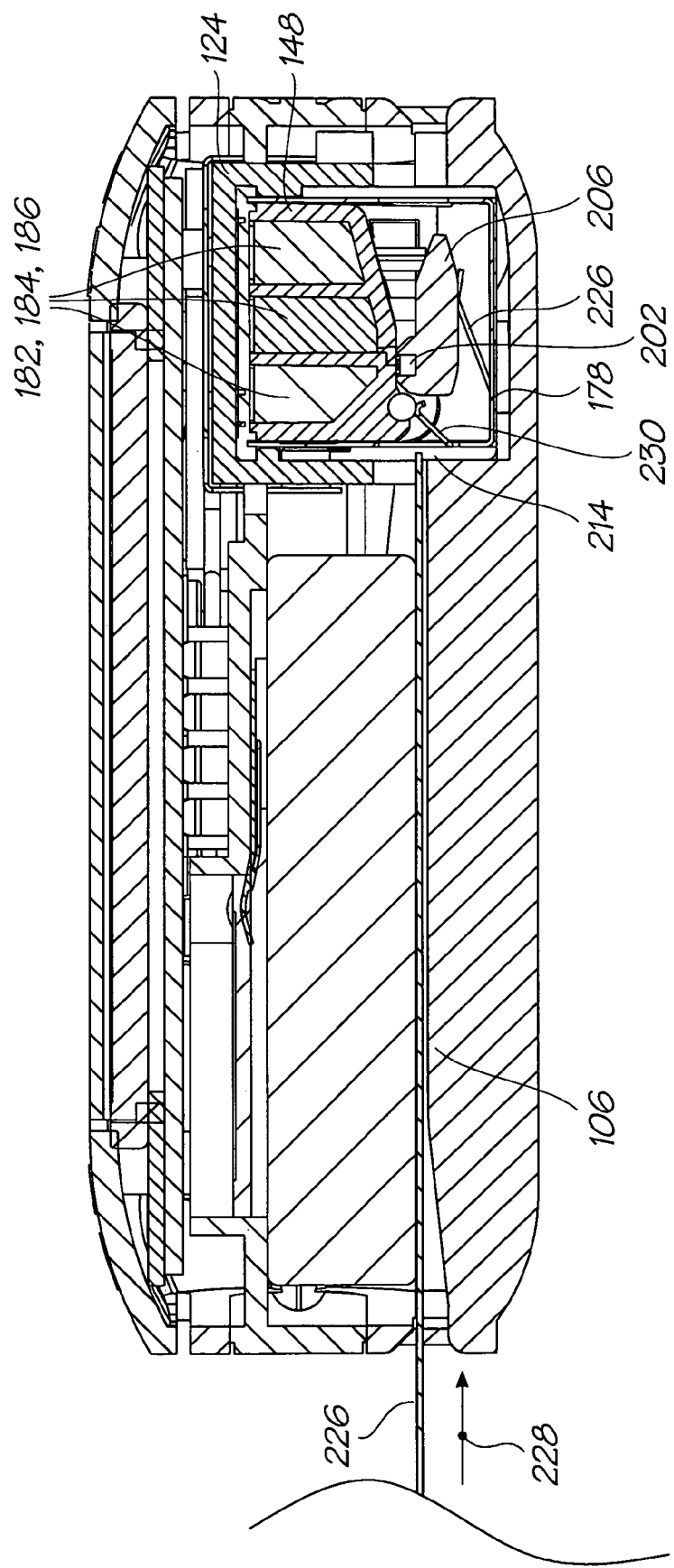
FIG. 13 is a cross section view taken along line A-A of FIG. 12.
Figure 14:
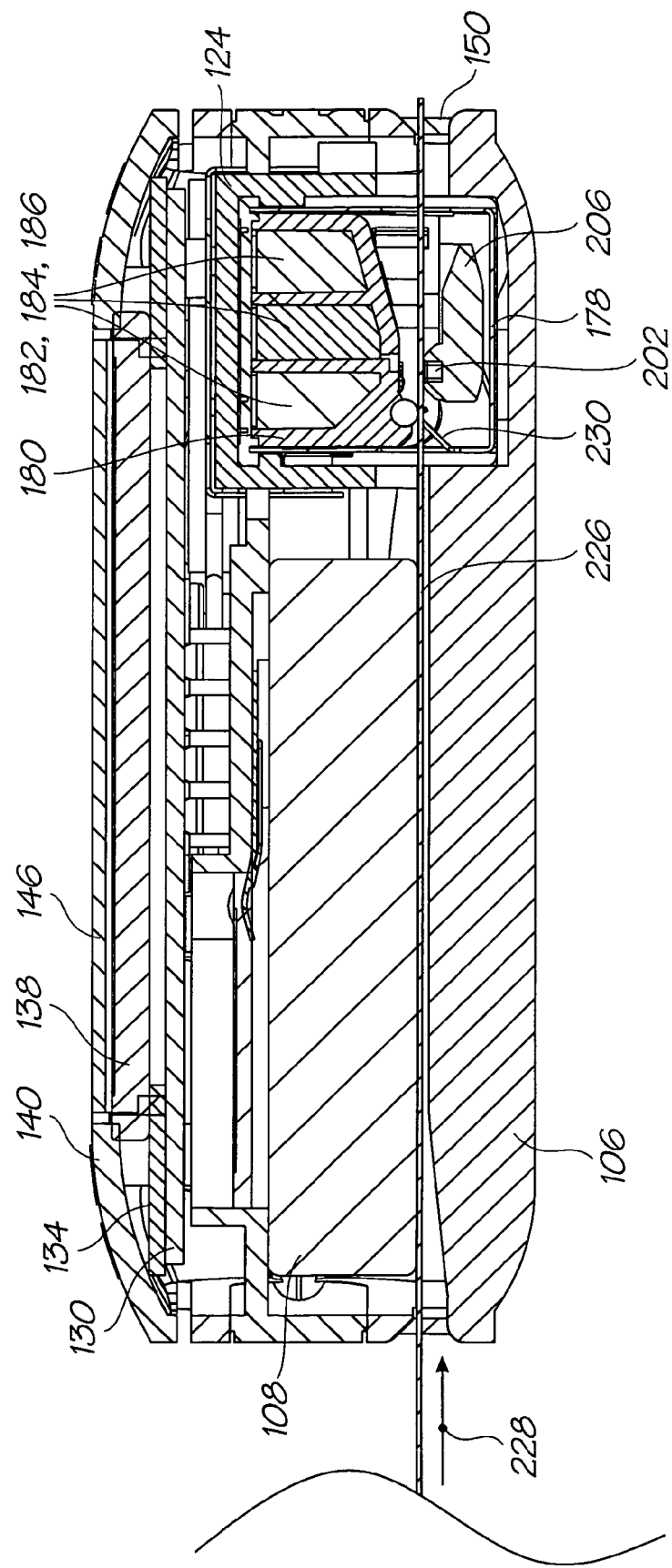
FIG. 14 is a cross section view taken along line A-A of FIG. 12 with the card emerging from the media exit slot of the mobile phone.

FIGS. 12 to 14 show the medium being fed through the mobile telecommunications device and printed by the printhead. FIG. 12 shows the blank medium 226, in this case a card, being fed into the left side of the mobile phone 100. FIG. 13 is section view taken along A-A of FIG. 12. It shows the card 226 entering the mobile 40 telecommunications device through a card insertion slot 228 and into the media feed path leading to the print cartridge 148 and print cradle 124. The rear cover moulding 106 has guide ribs that taper the width of the media feed path into a duct slightly thicker than the card 226. In FIG. 13 the card 226 has not yet entered the print cartridge 148 through the slot 214 in the metal cover 224. The metal cover 224 has a series of spring fingers 230 (described in more detail below) formed along one edge of the entry slot 214. These fingers 230 are biased against the drive shaft 178 so that when the card 226 enters the slot 214, as shown in FIG. 14, the fingers guide it to the drive shaft 178. The nip between the drive shaft 178 and the fingers 230 engages the card 226 and it is quickly drawn between them. The fingers 230 press the card 226 against the drive shaft 178 to drive it past the printhead 202 by friction. The drive shaft 178 has a rubber coating to enhance its grip on the medium 226. Media feed during printing is described in a later section.

It is preferred that the drive mechanism be selected to print the print medium in about 2 to 4 seconds. Faster speeds require relatively higher drive currents and impose restrictions on peak battery output, whilst slower speeds may be unacceptable to consumers. However, faster or slower speeds can certainly be catered for where there is commercial demand.

Decapping

Figure 65:
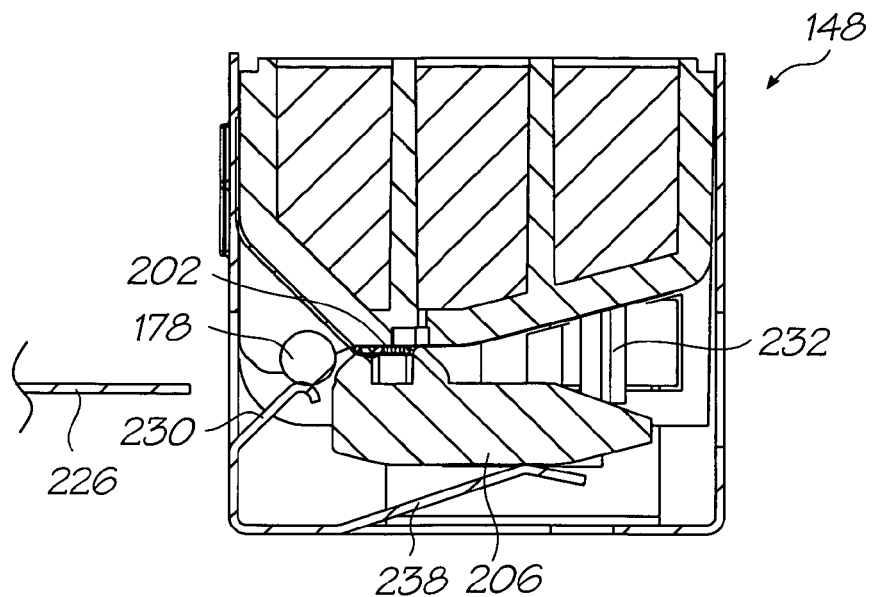
FIGS. 65 to 74 are lateral cross sections through the print cartridge showing the decapping and capping of the printhead.
Figure 66:
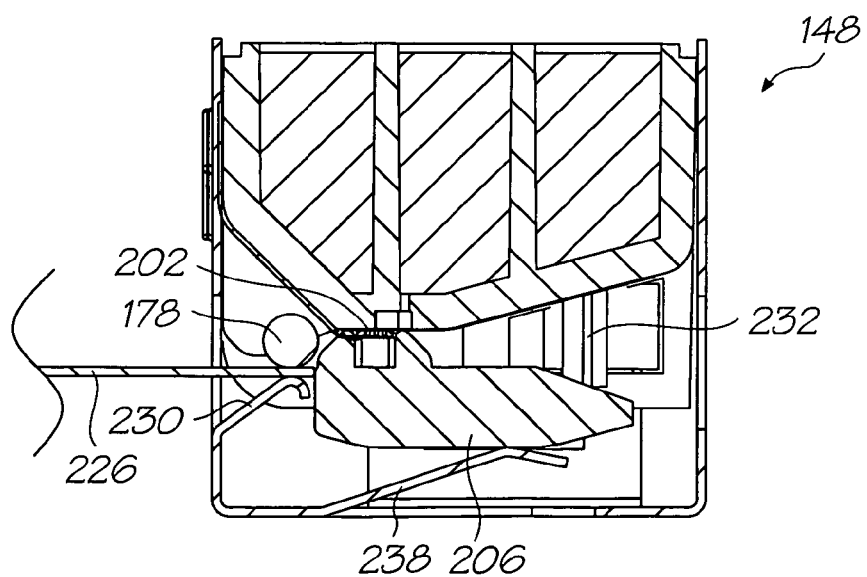
Figure 67:
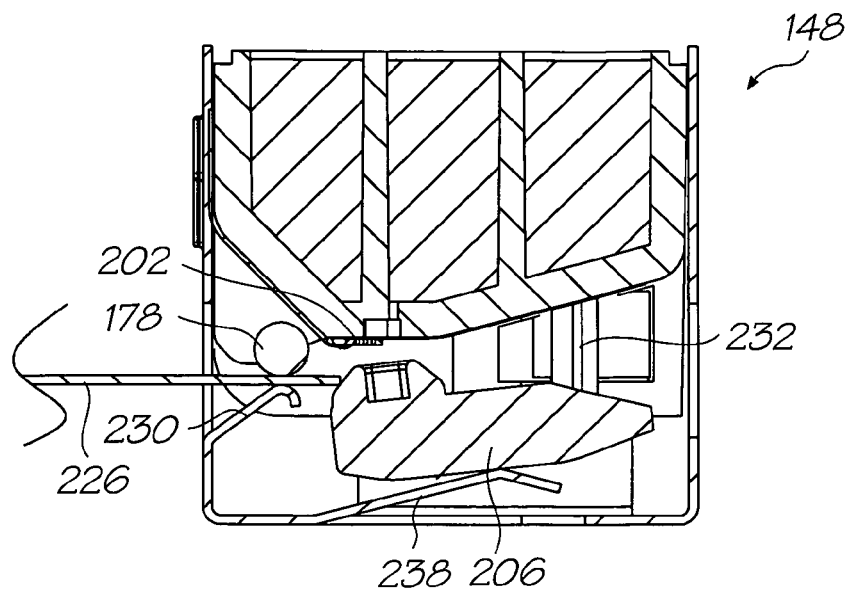

The decapping of the printhead 202 is shown in FIGS. 65 to 74. FIG. 65 shows print cartridge 148 immediately before the card 226 is fed into the entry slot 214. The capper 206 is biased into the capped position by the capper leaf springs 238. The capper's elastomeric seal 240 protects the printhead from paper dust and other contaminants while also stoppping the ink in the nozzles from drying out when the printhead is not in use.

Figure 68:
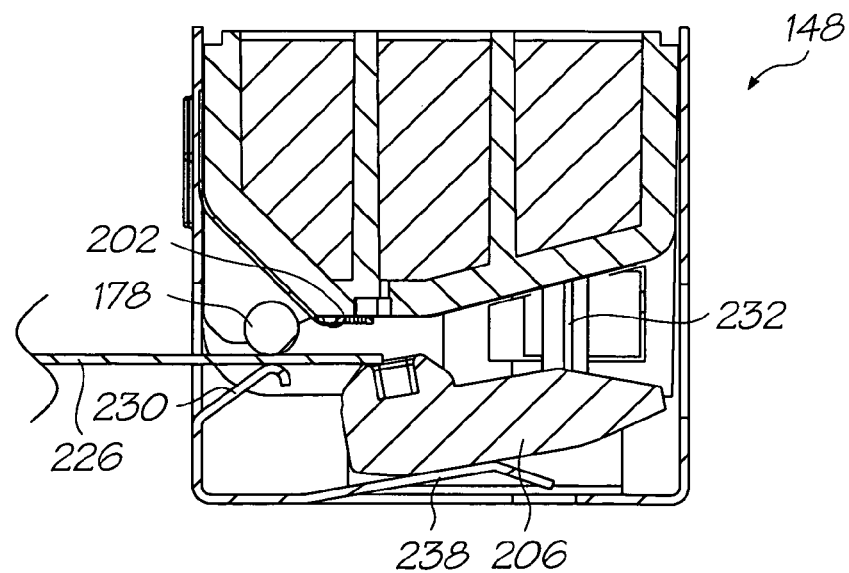
Figure 69:
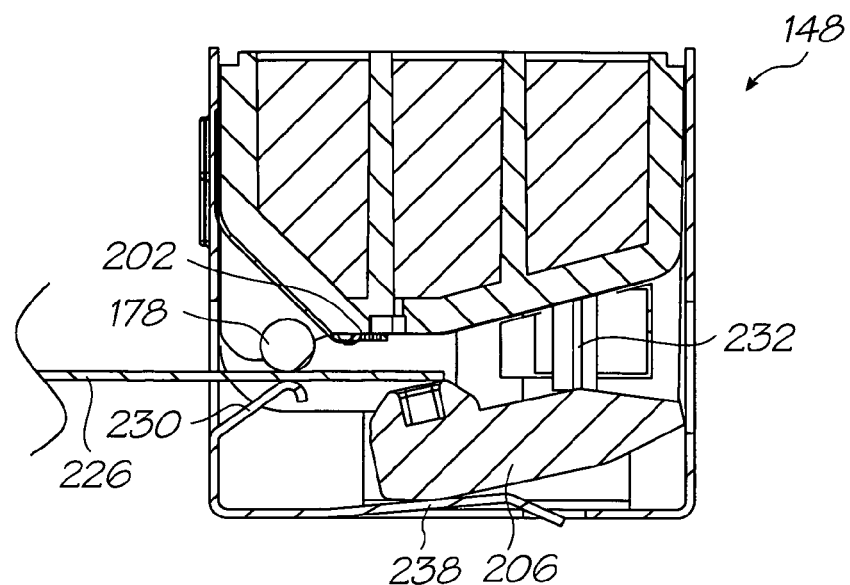
Figure 70:
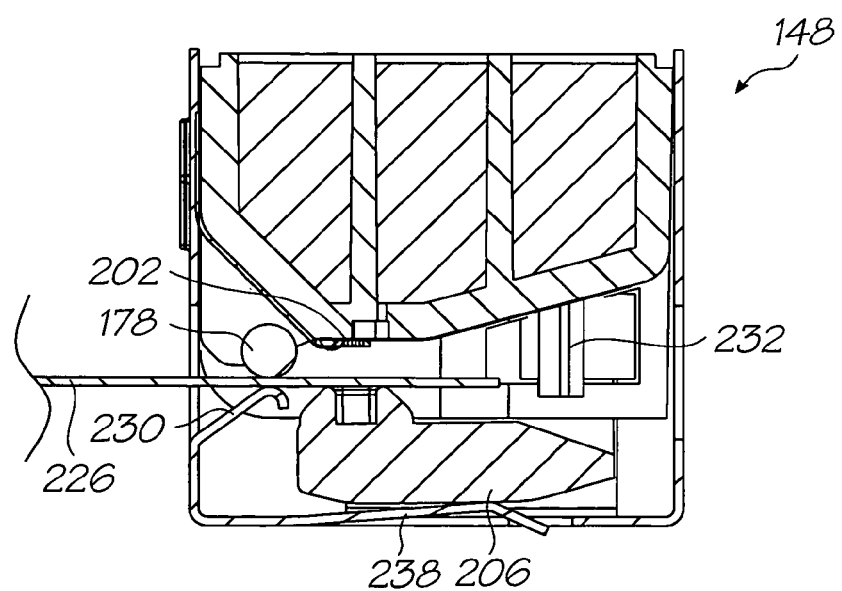
Figure 71:
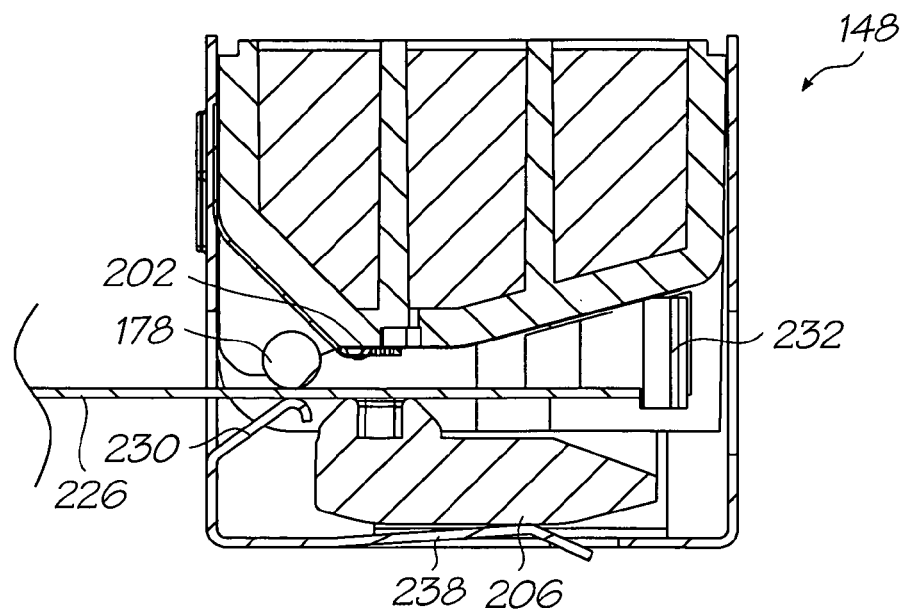

Referring to FIGS. 65 and 68, the card 226 has been fed into the print cartridge 148 via the entry slot 214. The spring fingers 230 urge the card against the drive shaft 178 as it driven past the printhead. Immediately downstream of the drive shaft 178, the leading edge of the card 226 engages the inclined front surface of the capper 206 and pushes it to the uncapped position against the bias of the capper leaf springs 238. The movement of the capper is initially rotational, as the linear movement of the card causes the capper 206 to rotate about the pins 210 that sit in its slots 208 (see FIG. 29). However, as shown in FIGS. 69 to 71, the capper is constrained such that further movement of the card begins to cause linear movement of the capper directly down and away from the printhead chip 202, against the biasing action of spring 238. Ejection of ink from the printhead IC 202 onto the card commences as the leading edge of the card reaches the printhead.

As best shown in FIG. 71, the card 226 continues along the media path until it engages the capper lock actuating arms 232. This actuates the capper lock to hold the capper in the uncapped position until printing is complete. This is described in greater detail below.

Capping

Figure 72:
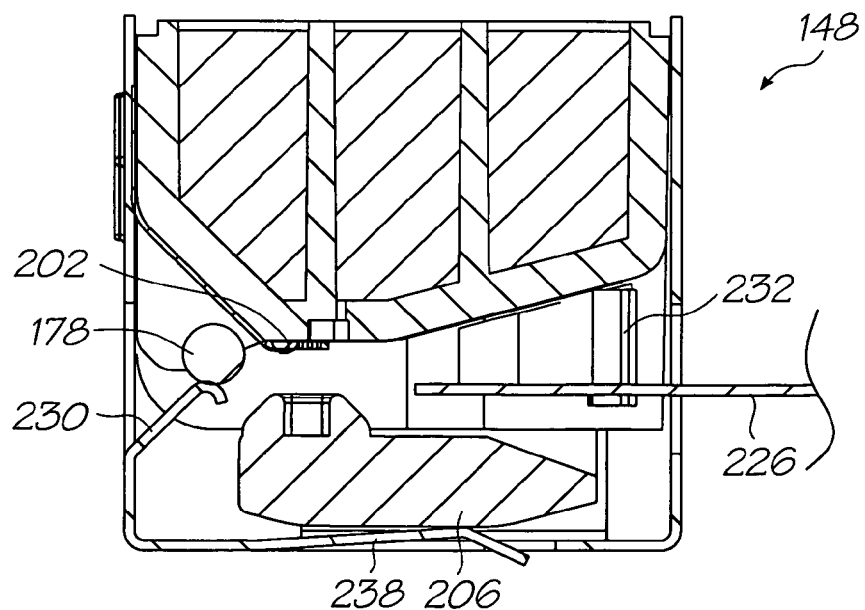
Figure 73:
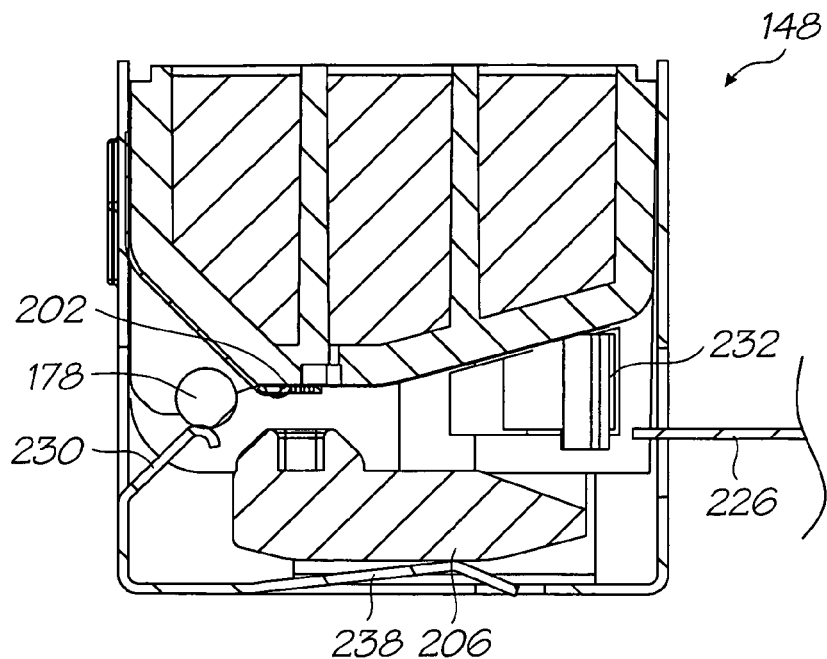
Figure 74:
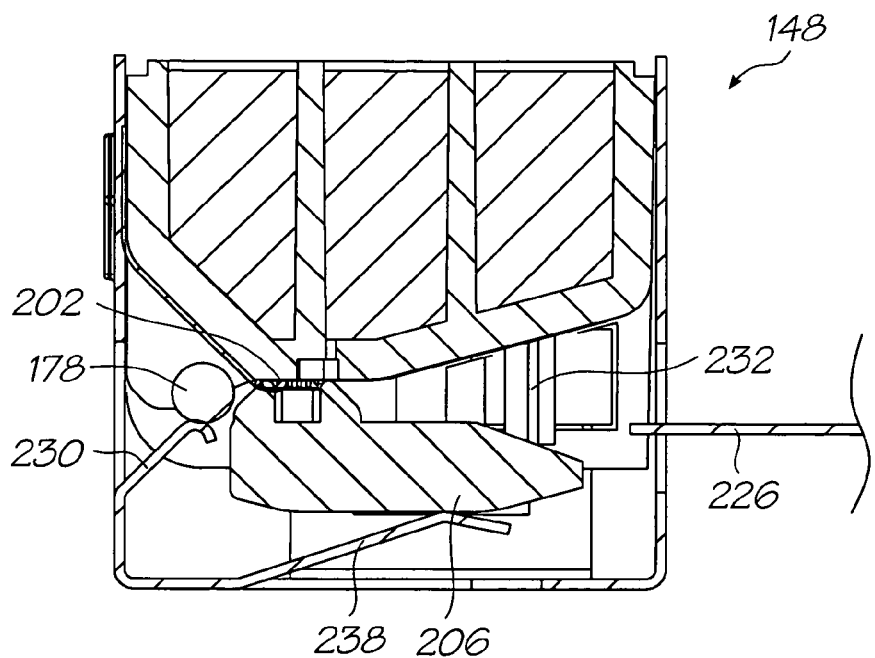

As shown in FIGS. 72 to 74, the capper remains in the uncapped position until the card 226 disengages from the actuation arms 232. At this point the capper 206 is unlocked and returns to its capped position by the leaf spring 230.

Capper Locking and Unlocking

Referring to FIGS. 75 to 79, the card 226 slides over the elastomeric seal 240 as it is driven past the printhead 202. The leading edge of the card 226 then engages the pair of capper locking mechanisms 212 at either side of the media feed path. The capper locking mechanisms 212 are rotated by the card 226 so that its latch surfaces 234 engage lock engagement faces 236 of the capper 206 to hold it in the uncapped position until the card is removed from the print cartridge 148.

Figure 75:
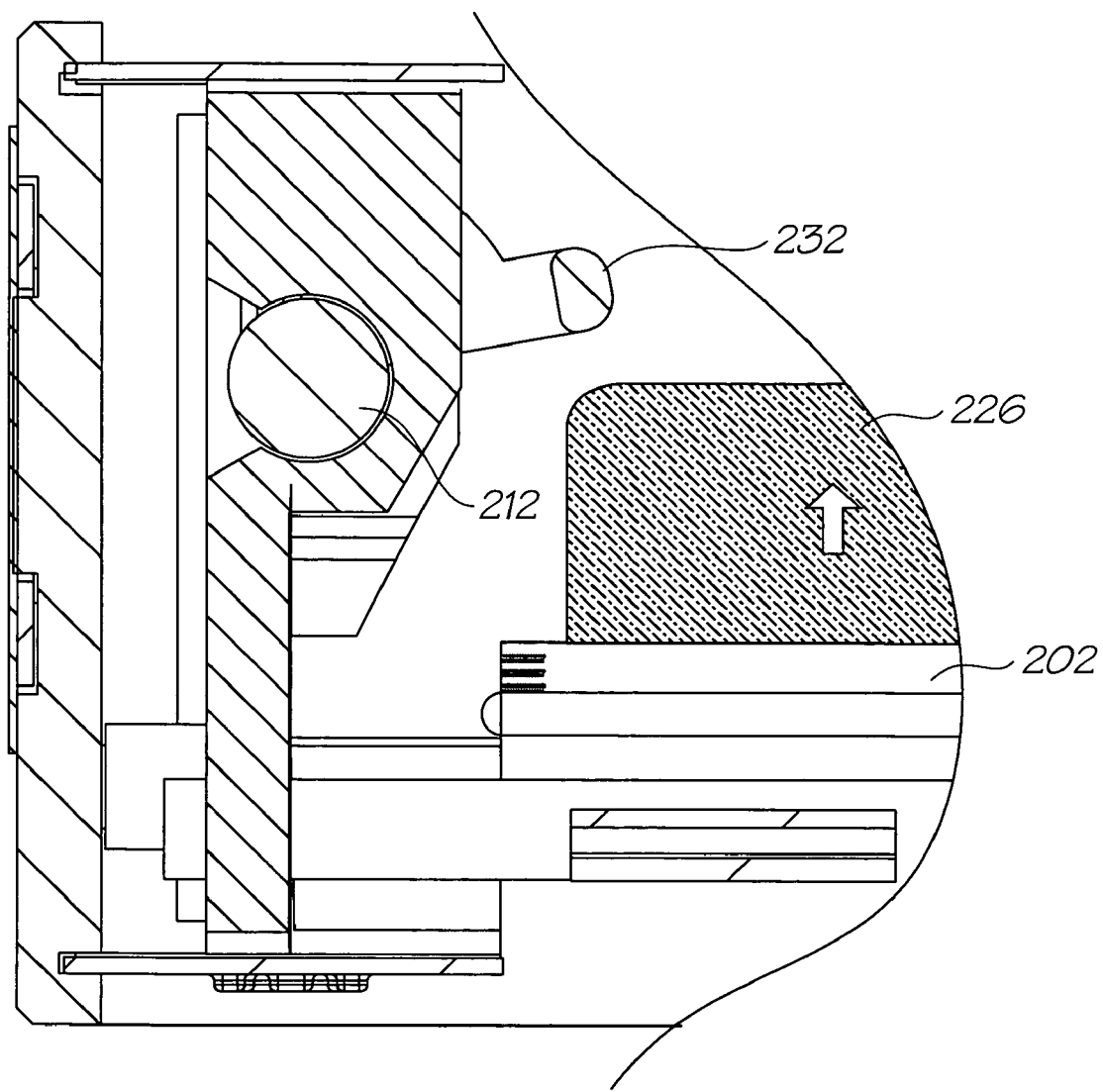
FIG. 75 is an enlarged partial sectional view of the end of the print cartridge indicated by the dotted line in FIG. 77B.
Figure 76:
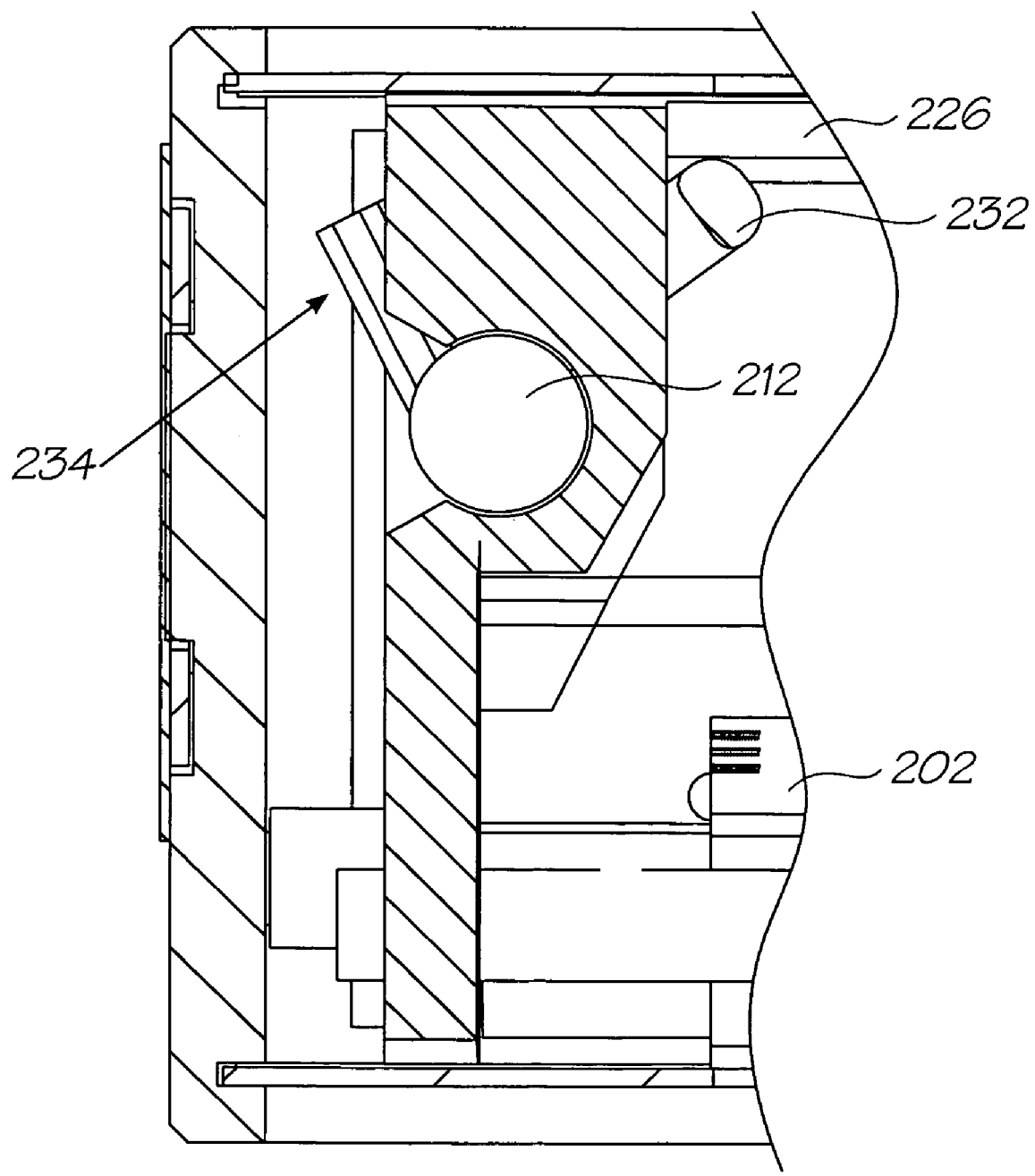
FIG. 76 is a similar sectional view with the locking mechanism rotated to the locked position.
Figure 77:
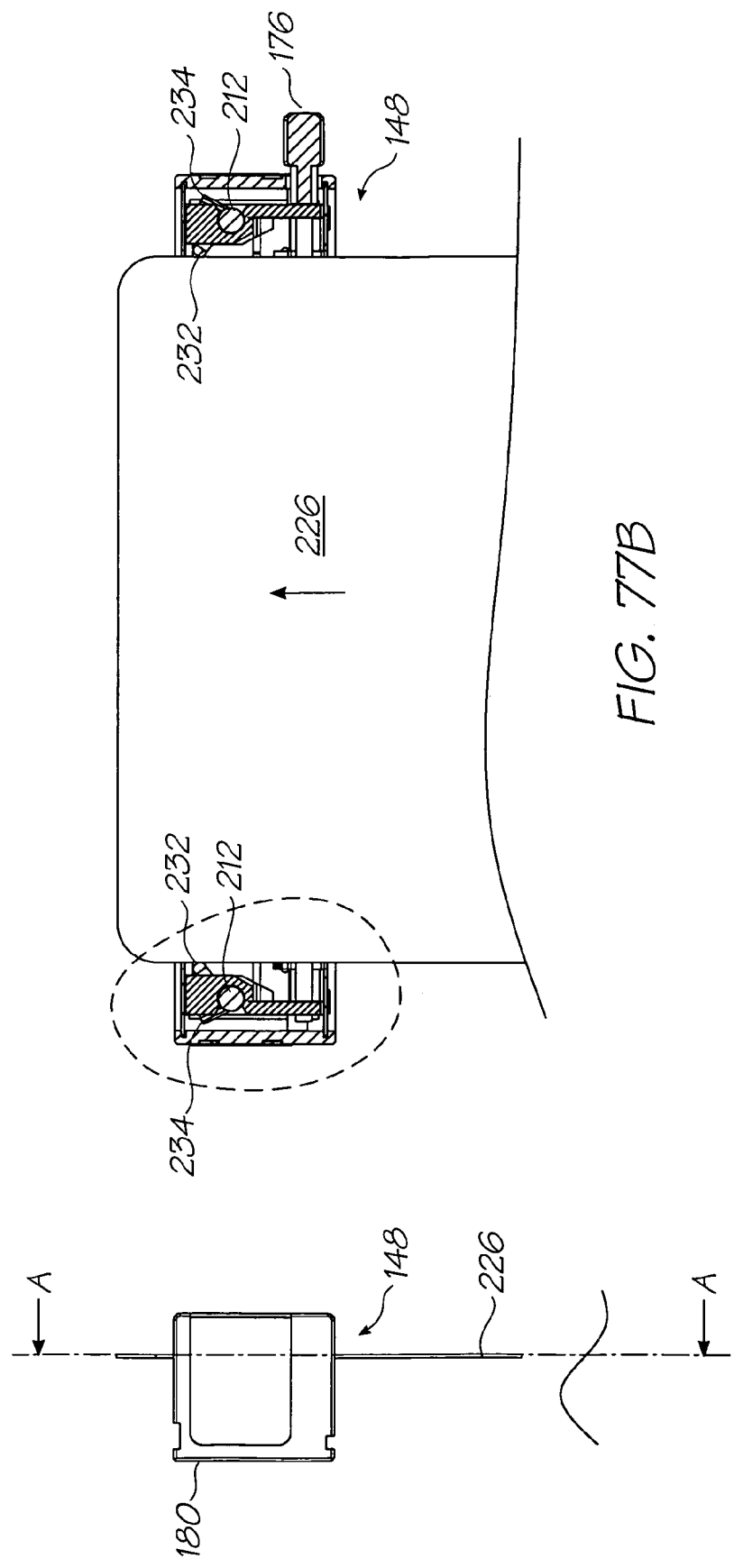
FIG. 77A is an end view of the print cartridge with a card partially along the feed path.
FIG. 77B is a longitudinal section of the print cartridge through A-A of FIG. 77A.
Figure 78:
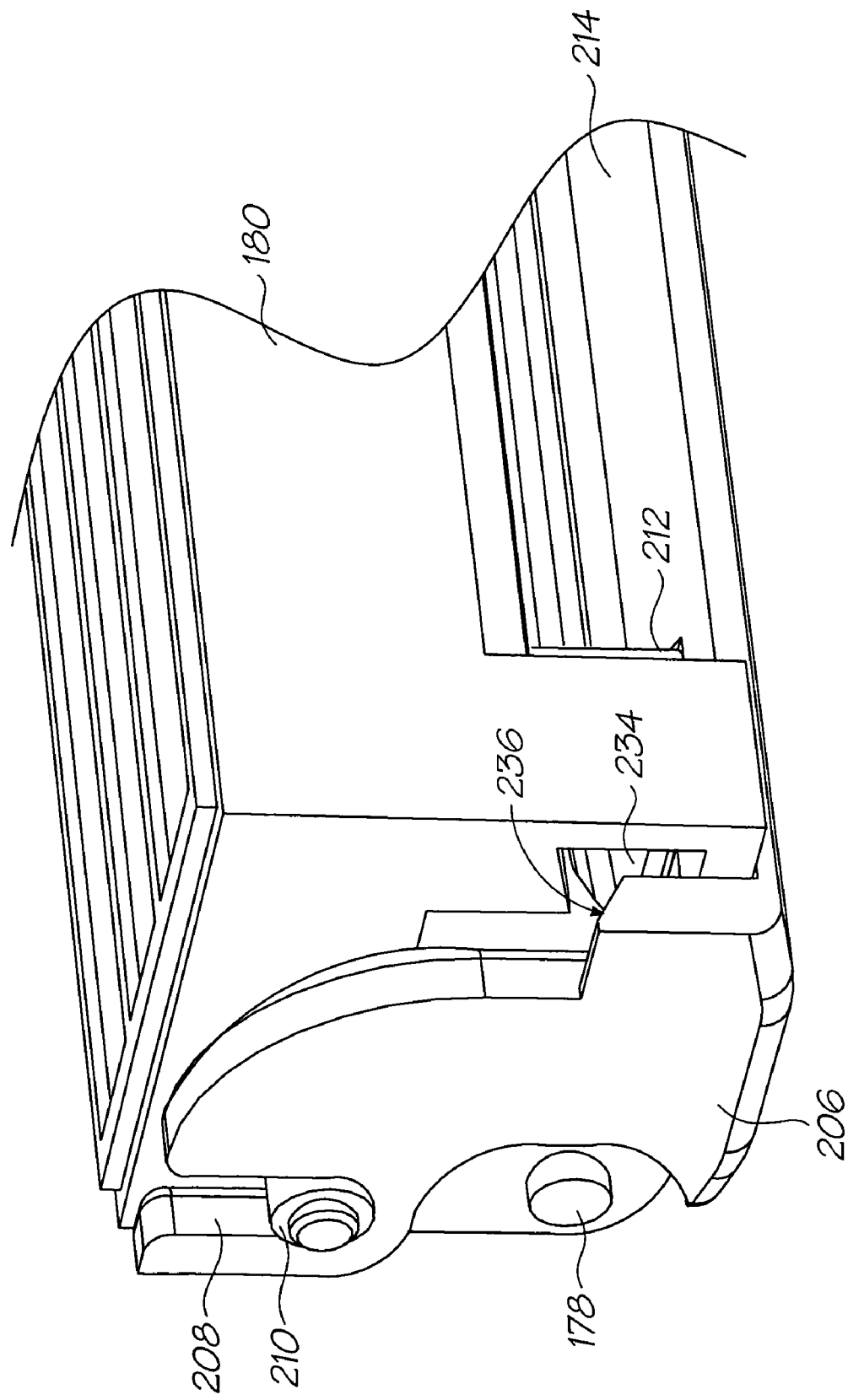
FIG. 78 is a partial enlarged perspective of one end the print cartridge with the capper in the capped position.
Figure 79:
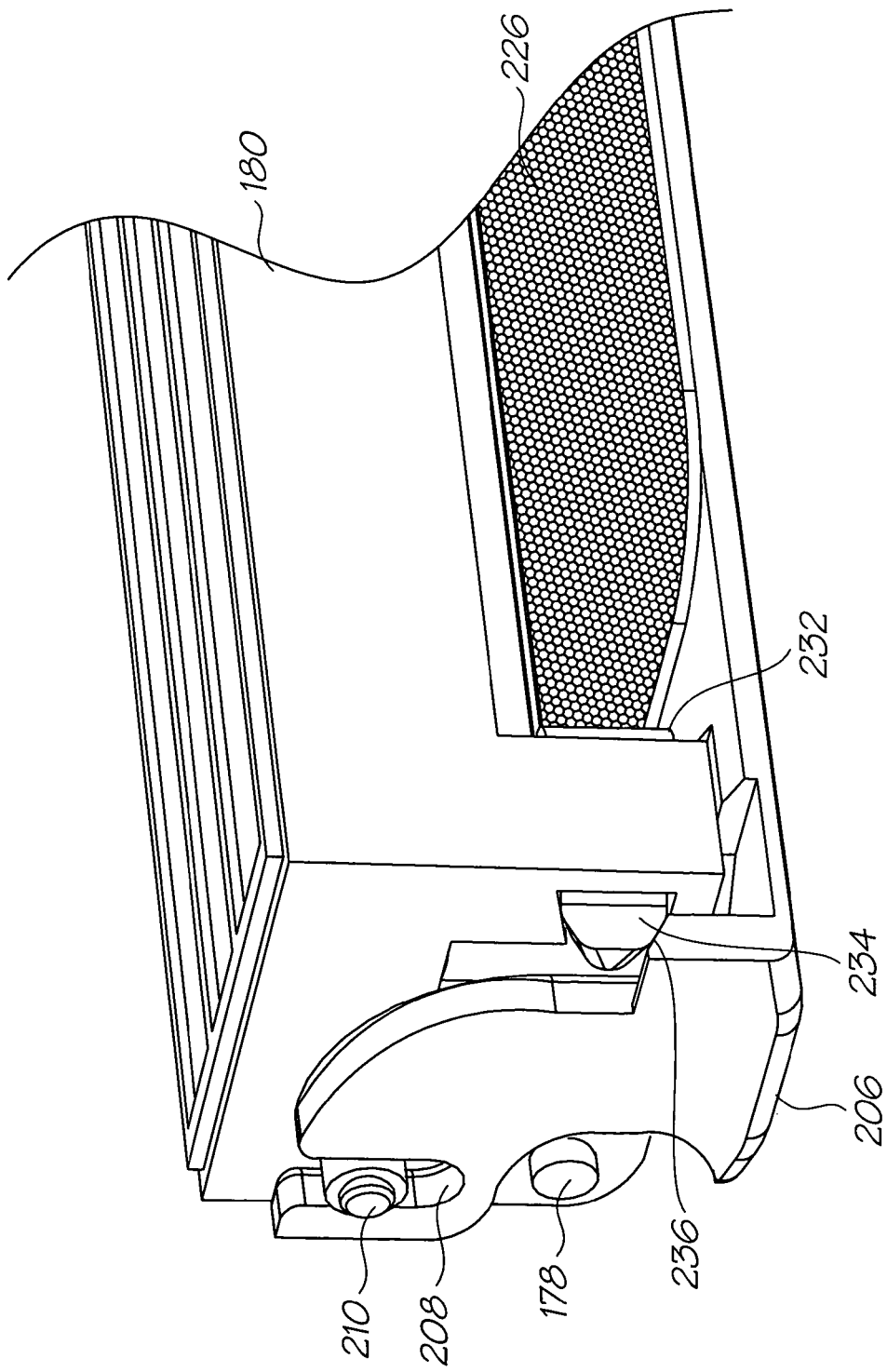
FIG. 79 is a partial enlarged perspective of one end the print cartridge with the capper in the uncapped position.
Figure 80:
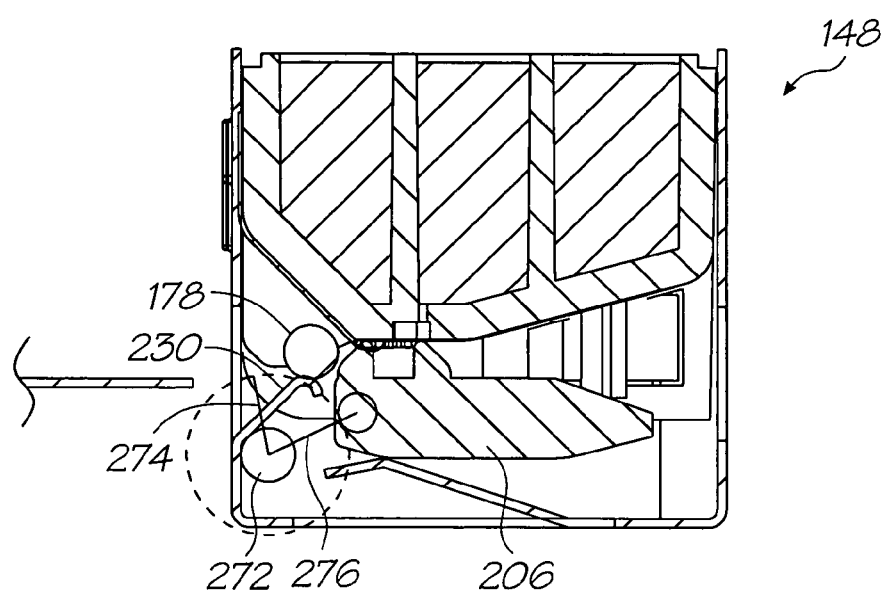
FIGS. 80 to 84 are lateral cross sections of an alternative print cartridge showing the actuation of the capper by a force transfer mechanism.
Figure 81:
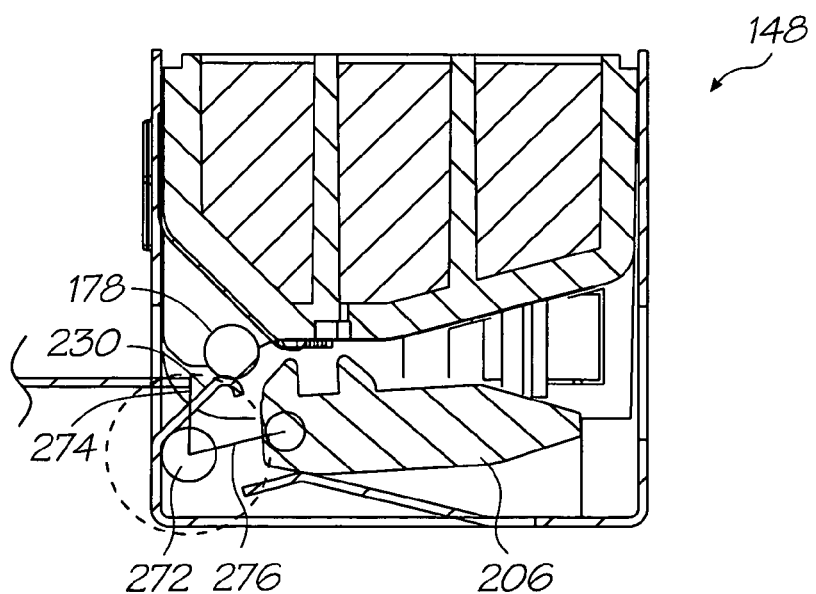
Figure 82:
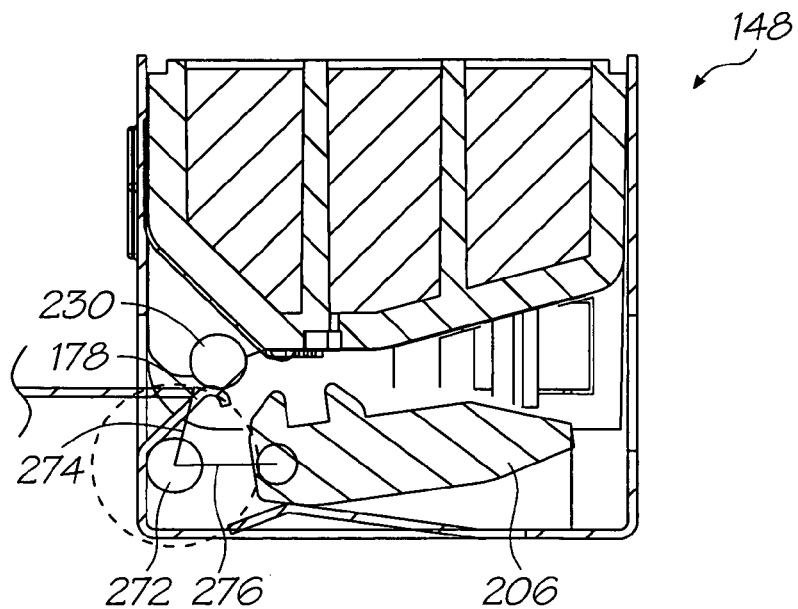
Figure 83:
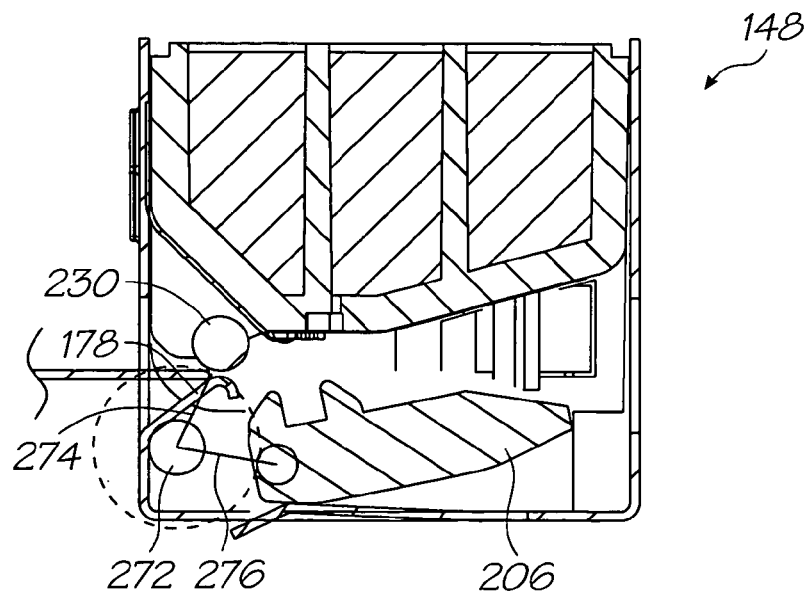
Figure 84:
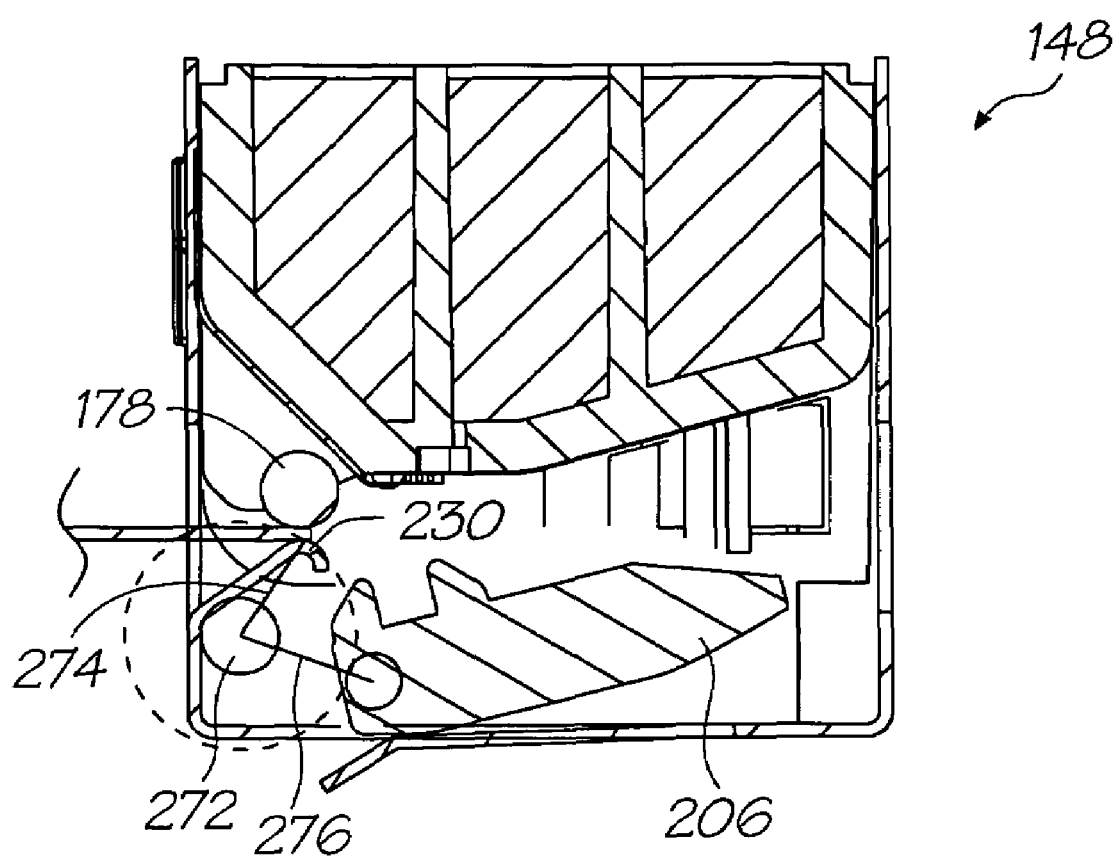

FIGS. 75 and 78 show the locking mechanisms 212 in their unlocked condition and the capper 206 in the capped position. The actuation arms 232 of each capper lock mechanism 212 protrude into the media path. The sides of the capper 206 prevent the actuation arms from rotating out of the media feed path. Referring to FIGS. 76, 77A, 77B and 79, the leading edge of the card 226 engages the arms 232 of the capper lock mechanisms 212 protruding into the media path from either side. When the leading edge has reached the actuation arms 232, the card 226 has already pushed the capper 206 to the uncapped position so the locking mechanisms 212 are now free to rotate. As the card pushes past the arms 232, the lock mechanisms 212 rotate such that their respective chamfered latch surfaces 234 slidingly engage the angled lock engagement face 238 on either side of the capper 206. The sliding engagement of between these faces pushes the capper 206 clear of the card 226 so that it no longer touches the elastomeric seals 240. This reduces the drag retarding the media feed. The sides of the card 226 sliding against the actuation arms 232 prevent the locking mechanisms 212 from rotating so the capper 206 is locked in the uncapped position by the latch surfaces 234 pressing against the lock engagement face 238.

When the printed card 226 is retrieved by the user (described in more detail below), the actuation arms 232 are released and free to rotate. The capper leaf springs 238 return the capper 206 to the capped position, and in so doing, the latch surfaces 234 slide over the lock engagement faces 236 so that the actuation arms 232 rotate back out into the media feed path.

Alternative Capping Mechanism

An alternative capping mechanism is shown in FIGS. 81 to 84 in which the initial retraction of the capper away from the printhead chip takes place before the card is pinch between the roller and the spring fingers. In this embodiment, the cartridge includes a crankshaft 272 mounted parallel to the drive shaft. The crankshaft is connected to a first crank 274 and a second crank 276, which are angularly spaced from each other.

As the card is inserted by the user and enters the cartridge, its leading edge comes into contact with the first crank 274. Pushing the card further into the cartridge causes the first crank 274 to convert the card's linear motion into rotation of the crankshaft 272. This, in turn, causes the second crank 276 to pull the capper 206 arcuately away from the printhead chip, as shown in FIGS. 81 to 84. By the time the card is pinched between the drive shaft 178 and the spring fingers 230, the capper 206 is already retracted away from the printhead chip so as to allow the card complete freedom to move past the printhead. Preferably, the locking mechanism described in relation to the earlier capping mechanism is incorporated, to ensure the capper is kept retracted until the card clears the printhead chip.

It will be appreciated that the crankshaft 272 can be positioned further along the card's feed path, to the point where some or all of the rotation of the crankshaft takes place as a result of the drive shaft driving the card. However, this has the effect of lengthening the overall feed path and moving the drive shaft further from the outlet slot, and so is not the preferred option.

Cartridge with Marking Nib

Figure 85:
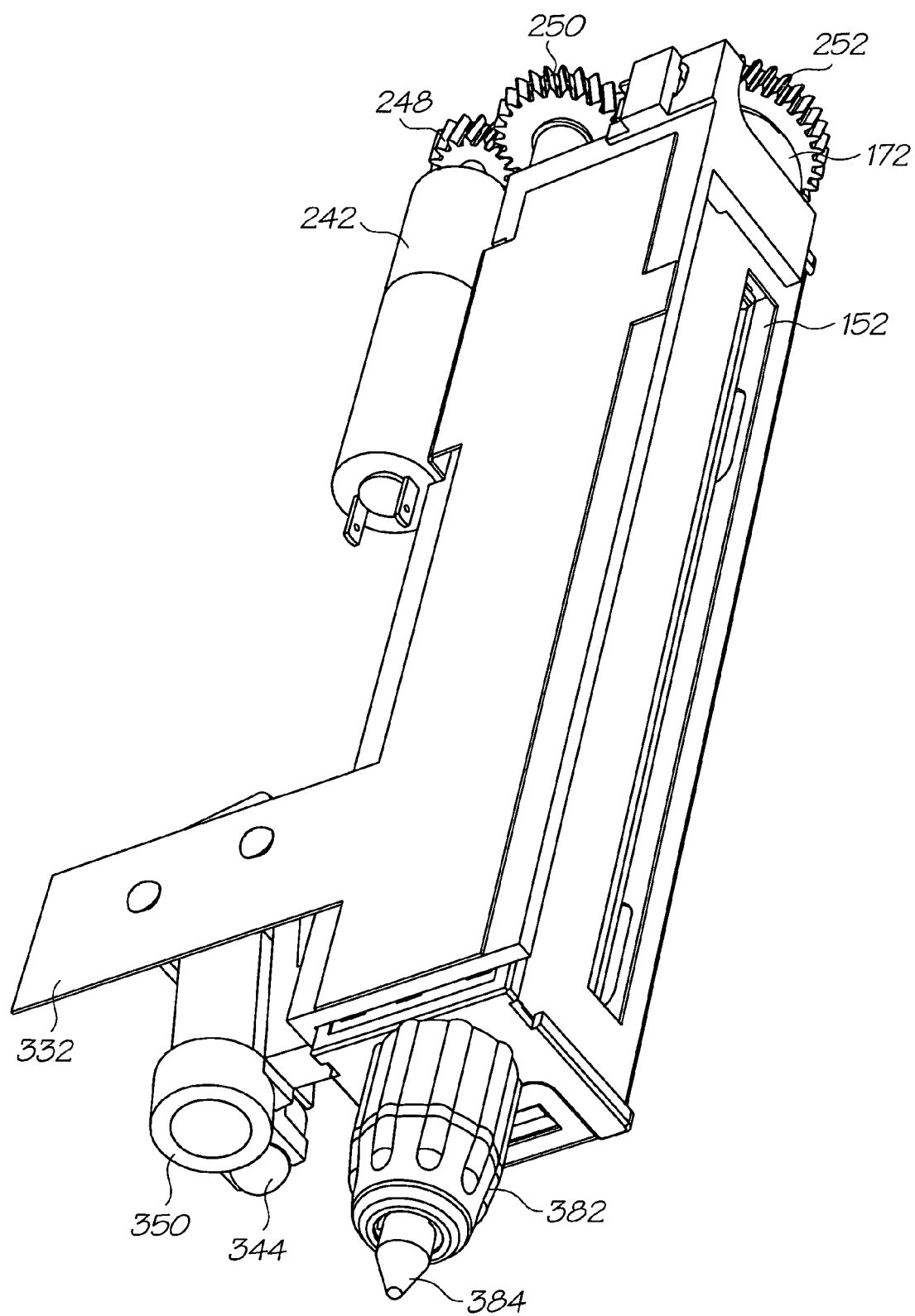
FIG. 85 is a perspective of a marking nib version of the cartridge/cradle assembly.
Figure 86:
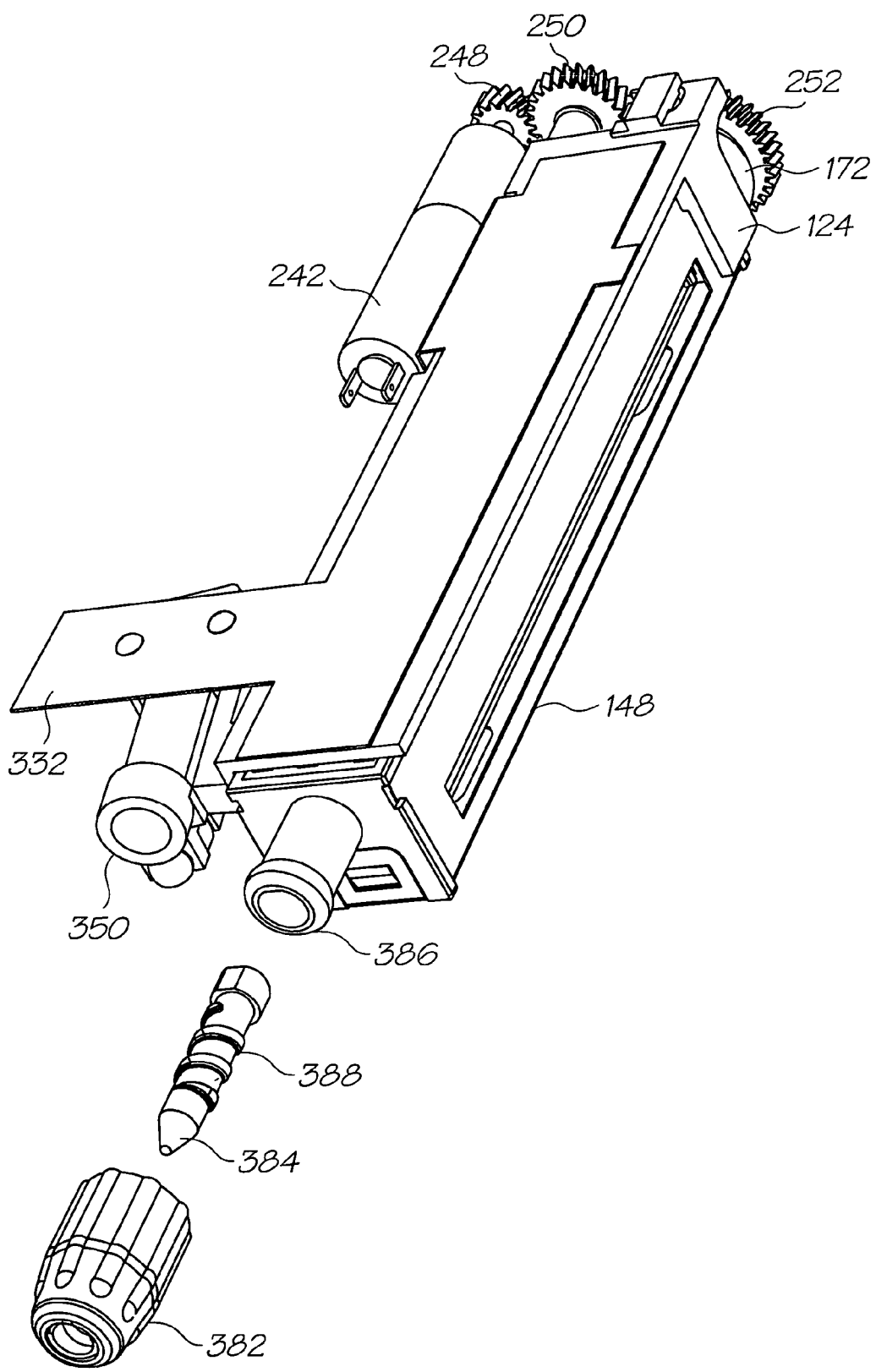
FIG. 86 is the assembly of FIG. 85 with the nib mechanism exploded.
Figure 87:
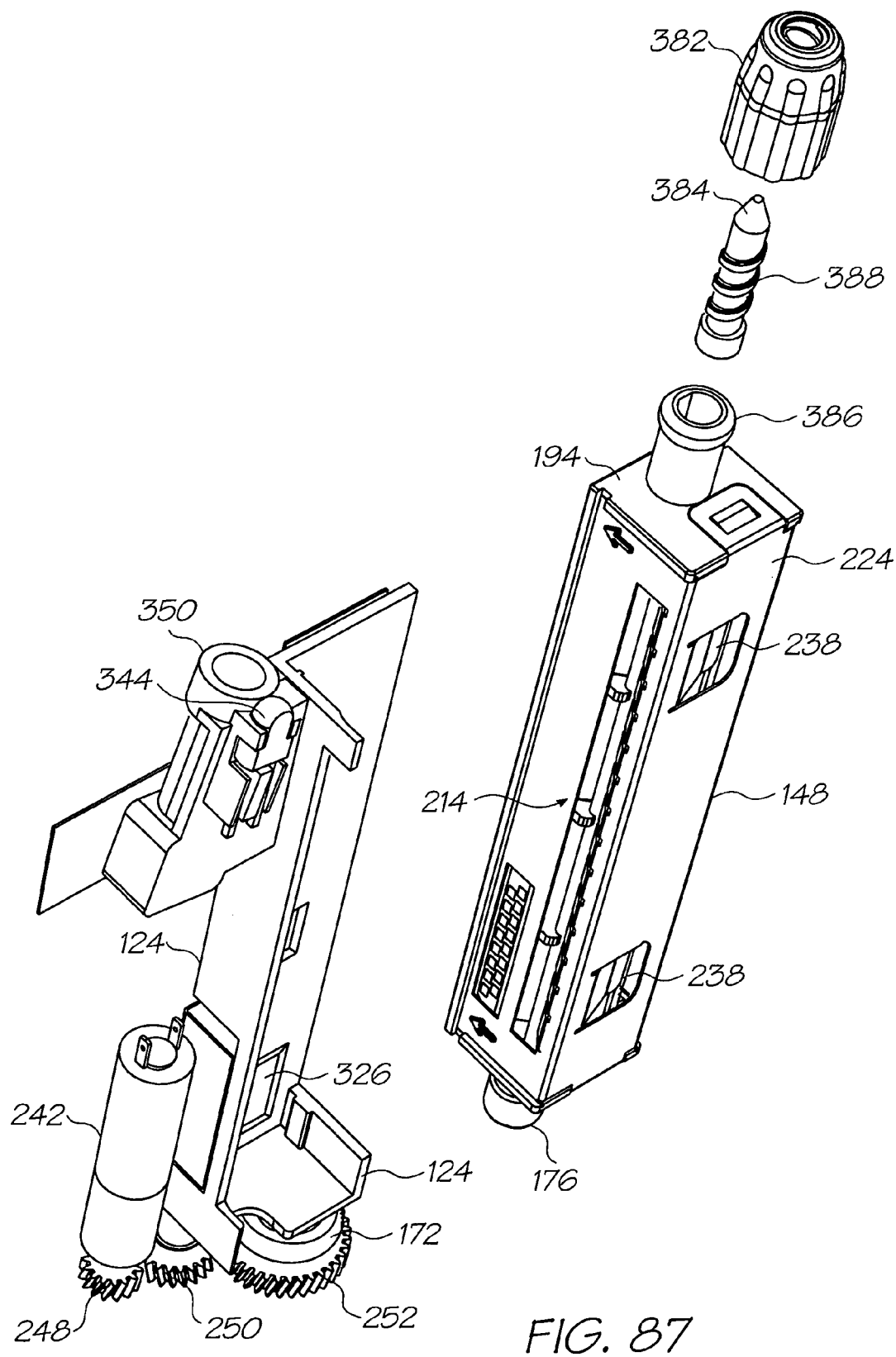
FIG. 87 is the assembly of FIG. 86 with the cartridge separated from the cradle.

FIGS. 85 to 87 show a version of the cartridge/cradle assembly with a marking nib 384 extending from one end of the cartridge 148 and a Netpage optics module 350 is integrated into the cradle 124. As best shown in FIG. 87, the marking nib 384 is a ball point pen with a coarse screw thread 388 for engagement with the internal thread of twist knob 382. The twist knob is retained on the tubular detail 386 on the cartridge lid 194 by snapping over the end flange. Rotating the twist knob 382 extends the nib 384 for use as a pen or retracts it to avoid inadvertently marking clothing and so on.

In this embodiment, the switch is simply omitted and the device operates continuously. To reduce power consumption, the optics module 350 and IR LED 344 only operates when placed into a capture mode. Alternatively, the switch can take the form of a pressure sensor, such as a piezo-electric or semiconductor-based transducer. In one form, a multi-level or continuous pressure sensor is utilized, which enables capture of the actual force of the nib against the writing surface during writing. This information can be included with the position information and ID that comprises the digital ink generated by the device. However, this is an optional capability.

Optical Print Data Transmission

Figure 88:
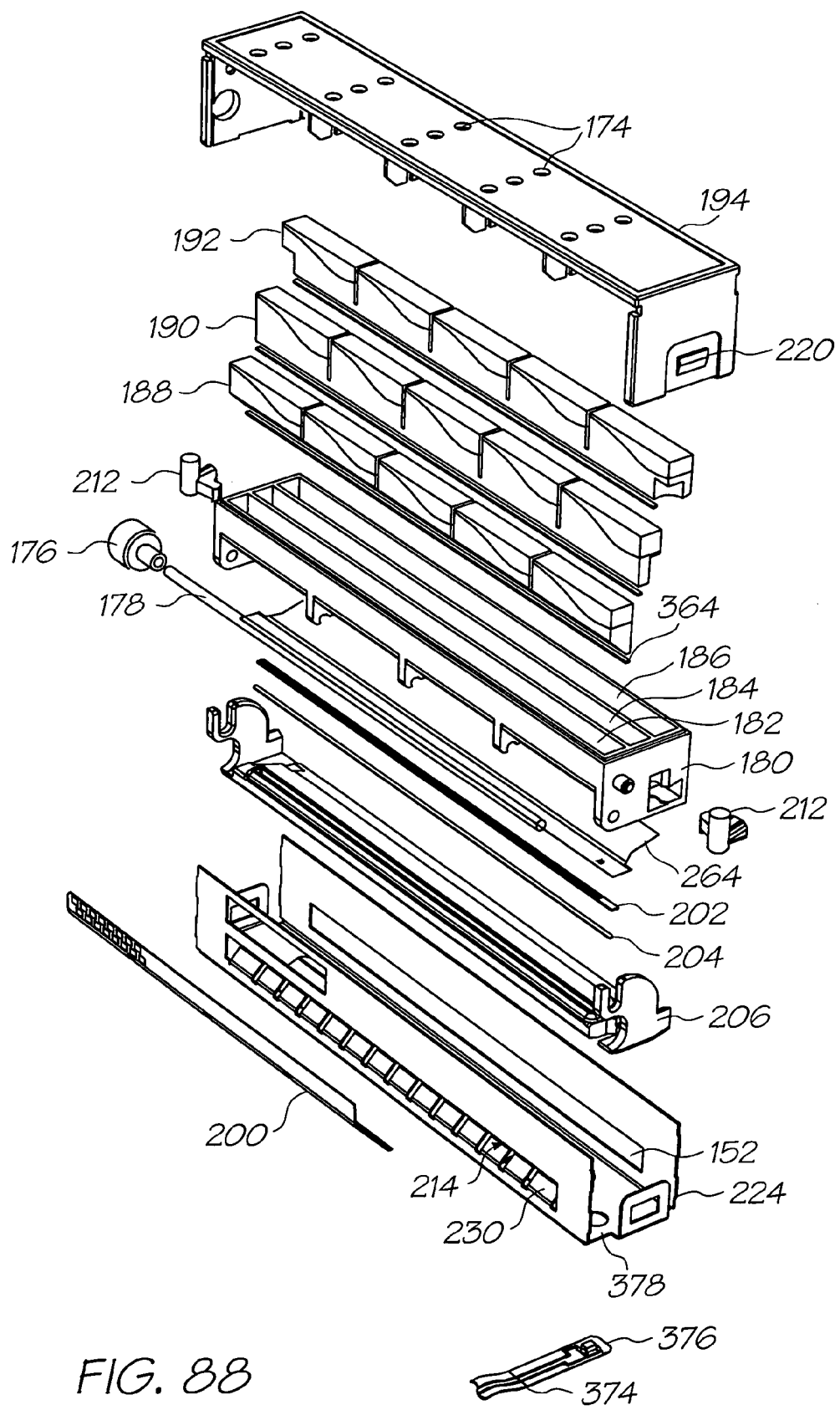
FIG. 88 is an exploded perspective of a further print cartridge with optical transmission of the print data to the printhead.
Figure 89:
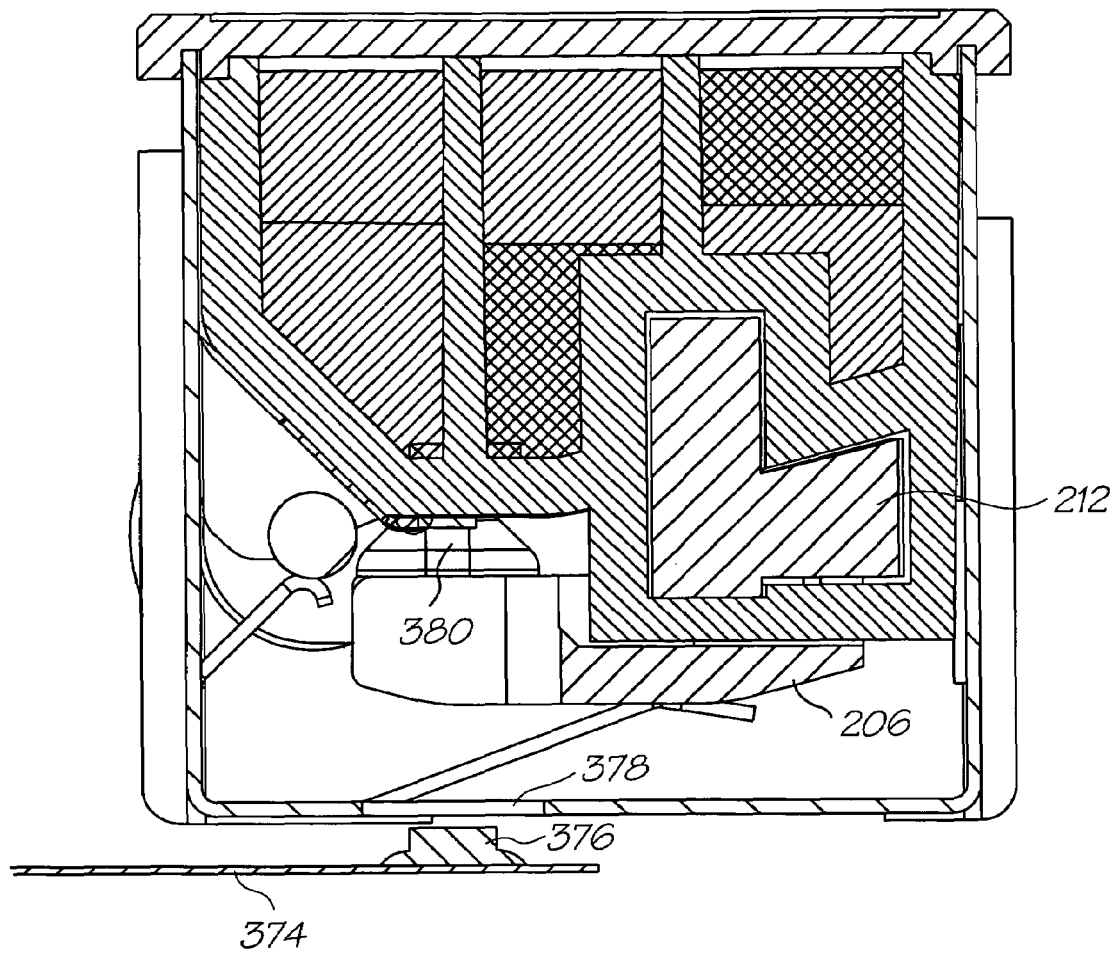
FIG. 89 is a lateral cross section through the cartridge of FIG. 88 showing the LED beacon for generating the modulated IR signal.
Figure 90:
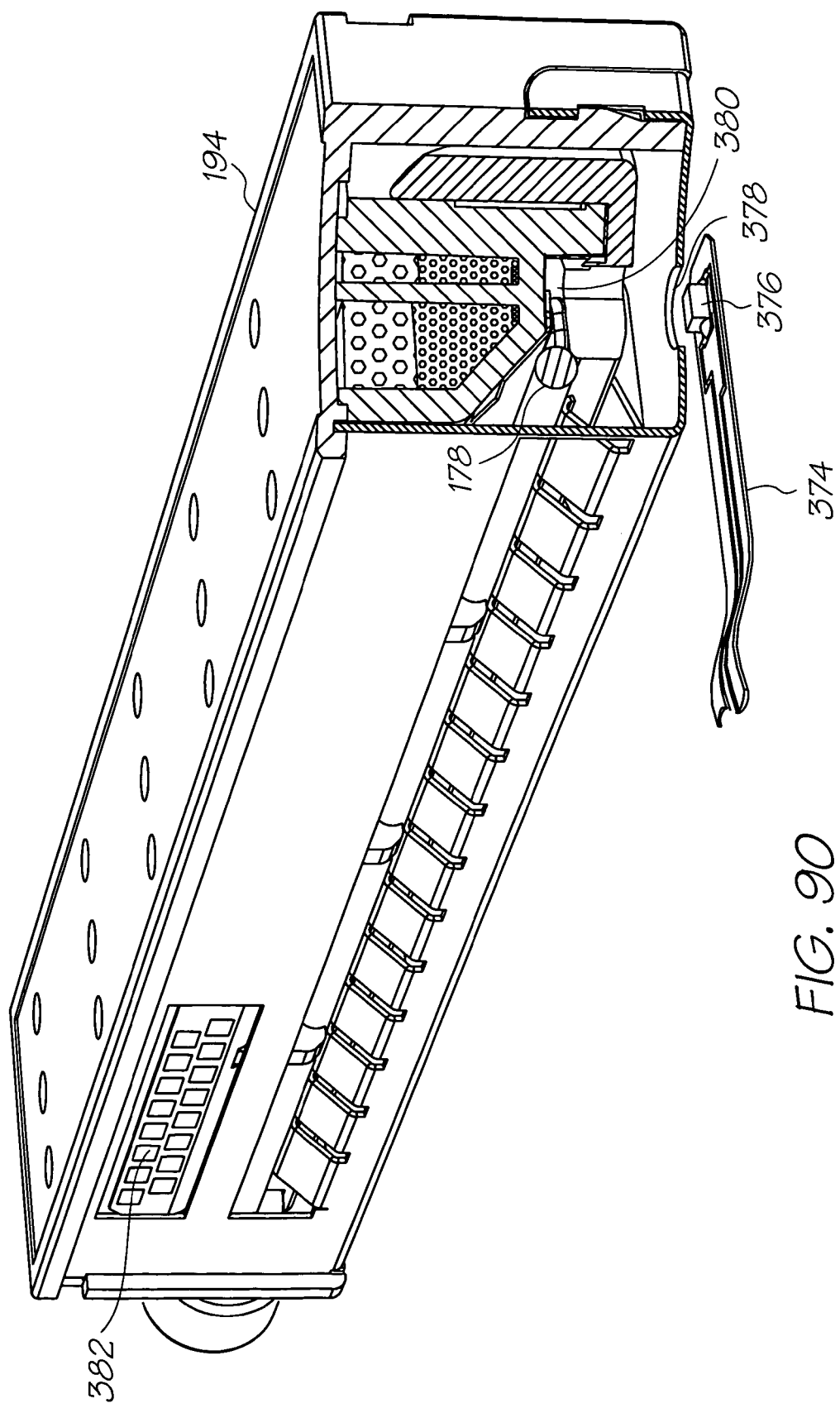
FIG. 90 is a partially cut away perspective showing the LED beacon and the photosensor on the printhead.

In this embodiment, shown in FIGS. 88 to 90, print data from the MoPEC chip 326 is not sent to the printhead IC 202 by the TAB film 200 as it is in the other cartridge designs. Instead, the data is sent via a separate flex film 374 to a data LED 376. As best shown in FIGS. 89 and 90, the printhead IC 202 has been extended to accommodate a photosensor 380 for receiving the data signal from the data LED 376. An aperture 378 is cut into the metal cover 224 so that the data LED 376 can illuminate the photosensor 380. Transmitting the print data separately from the power removes a lot of noise from the data signal. Back EMF from the many and frequent actuations of each nozzle produces a high frequency noise that can partially obscure the data signal. Furthermore, the nature of the print data signal is well suited to optical transmission.

Print Media and Printing

A Netpage printer normally prints the tags which make up the surface coding on demand, i.e. at the same time as it prints graphic page content. As an alternative, in a Netpage printer not capable of printing tags such as the preferred embodiment, pre-tagged but otherwise blank Netpages can be used. The printer, instead of being capable of tag printing, typically incorporates a Netpage tag sensor. The printer senses the tags and hence the region ID of a blank either prior to, during, or after the printing of the graphic page content onto the blank. It communicates the region ID to the Netpage server, and the server associates the page content and the region ID in the usual way.

A particular Netpage surface coding scheme allocates a minimum number of bits to the representation of spatial coordinates within a surface region. If a particular media size is significantly smaller than the maximum size representable in the minimum number of bits, then the Netpage code space may be inefficiently utilised. It can therefore be of interest to allocate different sub-areas of a region to a collection of blanks. Although this makes the associations maintained by the Netpage server more complex, and makes subsequent routing of interactions more complex, it leads to more efficient code space utilisation. In the limit case the surface coding may utilise a single region with a single coordinate space, i.e. without explicit region IDs.

If regions are sub-divided in this way, then the Netpage printer uses the tag sensor to determine not only the region ID but also the surface coding location of a known physical position on the print medium, i.e. relative to two edges of the medium. From the surface coding location and its corresponding physical position on the medium, and the known (or determined) size of the medium, it then determines the spatial extent of the medium in the region's coordinate space, and communicates both the region ID and the spatial extent to the server. The server associates the page content with the specified sub-area of the region.

A number of mechanisms can be used to read tag data from a blank. A conventional Netpage tag sensor incorporating a two-dimensional image sensor can be used to capture an image of the tagged surface of the blank at any convenient point in the printer's paper path. As an alternative, a linear image sensor can be used to capture successive line images of the tagged surface of the blank during transport. The line images can be used to create a two-dimensional image which is processed in the usual way. As a further alternative, region ID data and other salient data can be encoded linearly on the blank, and a simple photodetector and ADC can be used to acquire samples of the linear encoding during transport.

One important advantage of using a two-dimensional image sensor is that tag sensing can occur before motorised transport of the print medium commences. I.e. if the print medium is manually inserted by the user, then tag sensing can occur during insertion. This has the further advantage that if the tag data is validated by the device, then the print medium can be rejected and possibly ejected before printing commences. For example, the print medium may have been pre-printed with advertising or other graphic content on the reverse side from the intended printing side. The device can use the tag data to detect incorrect media insertion, i.e. upside-down or back-to-front. The device can also prevent accidental overprinting of an already-printed medium. And it can detect the attempted use of an invalid print medium and refuse printing, e.g. to protect print quality. The device can also derive print medium characteristics from the tag data, to allow it to perform optimal print preparation.

If a linear image sensor is used, or if a photodetector is used, then image sensing must occur during motorised transport of the print medium to ensure accurate imaging. Unless there are at least two points of contact between the transport mechanism and the print medium in the printing path, separated by a minimum distance equal to the tag data acquisition distance, tag data cannot be extracted before printing commences, and the validation advantages discussed above do not obtain. In the case of a linear image sensor, the tag data acquisition distance equals the diameter of the normal tag imaging field of view. In the case of a photodetector, the tag data acquisition distance is as long as the required linear encoding.

If the tag sensor is operable during the entire printing phase at a sufficiently high sampling rate, then it can also be used to perform accurate motion sensing, with the motion data being used to provide a line synchronisation signal to the print engine. This can be used to eliminate the effects of jitter in the transport mechanism.

FIGS. 91 to 97 show one embodiment of the encoded medium and the media sensing and printing system within the mobile telecommunications device. While the encoding of the cards is briefly discussed here, it is described in detail in the Coded Media sub-section of this specification. Likewise, the optical sensing of the encoded data is described elsewhere in the specification and a comprehensive understanding of the M-Print media and printing system requires the specification to be read in its entirety.

Figure 91:
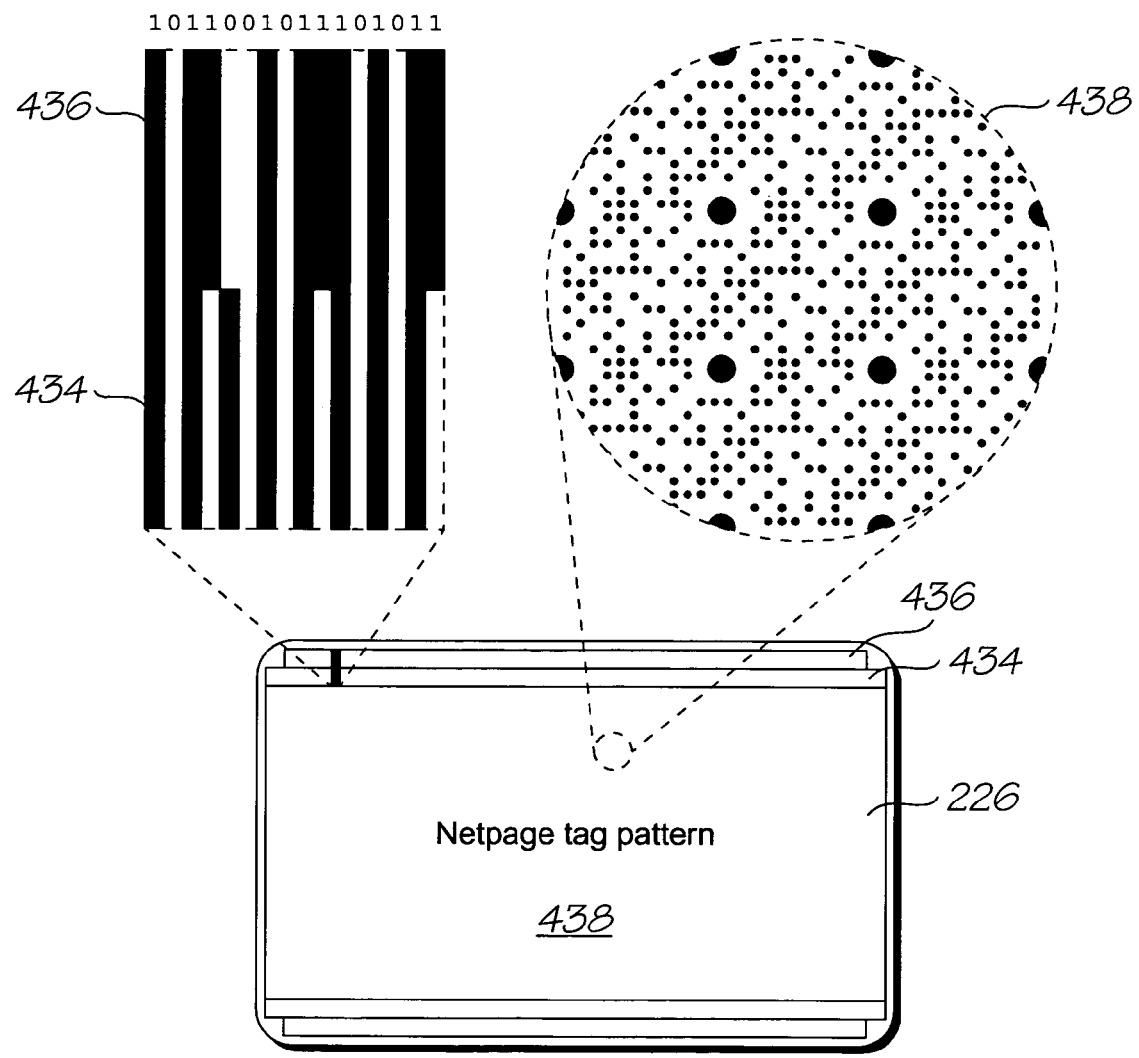
FIG. 91 shows the media coding on the 'back-side' of the card with separate clock and data tracks.

Referring to FIG. 91, the 'back-side' of one of the cards 226 is shown. The back-side of the card has two coded data tracks: a 'clock track' 434 and a 'data track' 436 running along the longitudinal sides of the cards. The cards are encoded with data indicating, inter alia:

the orientation of the card;

the media type and authenticity;

the longitudinal size;

the pre-printed side;

detection of prior printing on the card; and, the position of the card relative to the printhead IC.

Ideally, the encoded data is printed in IR ink so that it is invisible and does not encroach on the space available for printing visible images.

In a basic form, the M-Print cards 226 are only encoded with a data track and clocking (as a separate clock track or a self-clocking data track). However, in the more sophisticated embodiment shown in the figures, the cards 226 have a pre-printed Netpage tag pattern 438 covering the majority of the back-side. The front side may also have a pre-printed tag pattern. It is preferred in these embodiments that the data track encodes first information that is at least indicative of second information encoded in the tags. Most preferably, the first information is simply the document identity that is encoded in each of the tags.

The clock track 434 allows the MoPEC 326 (see FIG. 92) to determine, by its presence, that the front of the card 226 is facing the printhead 202, and allows the printer to sense the motion of the card 226 during printing. The clock track 434 also provides a clock for the densely coded data track 436.

The data track 436 provides the Netpage identifier and optionally associated digital signatures (as described elsewhere in the specification) which allows Mopec 326 to reject fraudulent or un-authorised media 226, and to report the Netpage identifier of the front-side Netpage tag pattern to a Netpage server.

Figure 92:
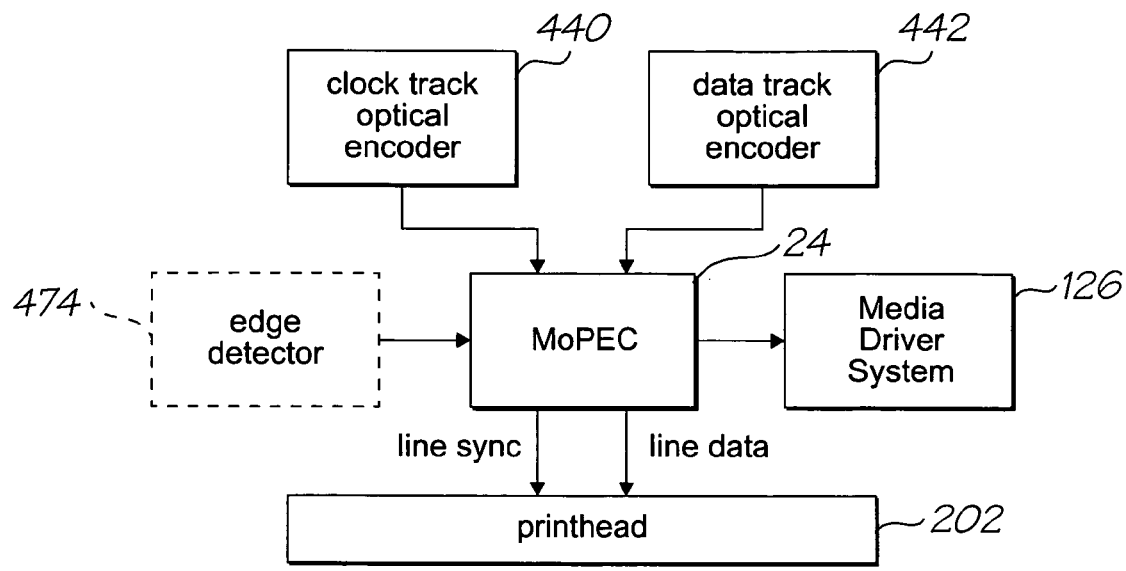
FIG. 92 is a block diagram of an M-Print system that uses media with separate clock and data tracks.

FIG. 92 shows a block diagram of an M-Print system that uses media encoded with separate clock and data tracks. The clock and data tracks are read by separate optical encoders. The system may optionally have an explicit edge detector 474 which is discussed in more detail below in relation to FIG. 95.

Figure 93:
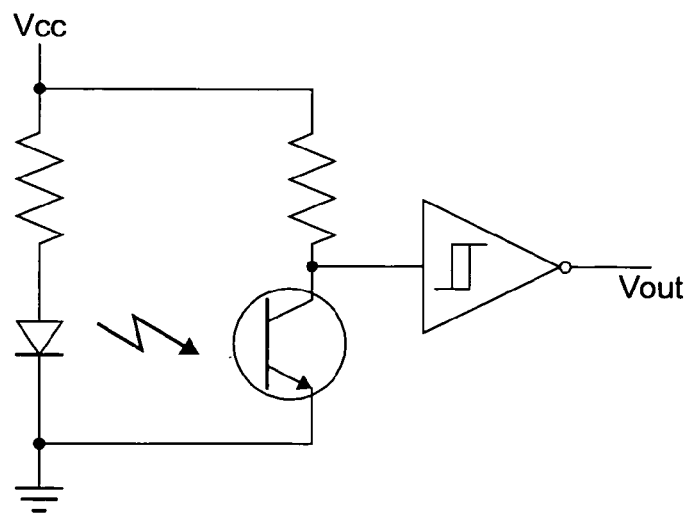
FIG. 93 is a simplified circuit diagram for an optical encoder.

FIG. 93 shows a simplified circuit for an optical encoder which may be used as the clock track or data track optical encoder. It incorporates a Schmitt trigger 466 to provide the MoPEC 326 with an essentially binary signal representative of the marks and spaces encountered by the encoder in the clock or data track. An IR LED 472 is configured to illuminate a mark-sized area of the card 226 and a phototransistor 468 is configured to capture the light 470 reflected by the card. The LED 472 has a peak wavelength matched to the peak absorption wavelength of the infrared ink used to print the media coding.

As an alternative, the optical encoders can sense the direction of media movement by configuring them to be 'quadrature encoders'. A quadrature encoder contains a pair of optical encoders spatially positioned to read the clock track 90 degrees out of phase. Its in-phase and quadrature outputs allow the MoPEC 326 to identify not just the motion of the clock track 434 but also the direction of the motion. A quadrature encoder is generally not required, since the media transport direction is known a priori because the printer controller also controls the transport motor. However, the use of a quadrature encoder can help decouple a bi-directional motion sensing mechanism from the motion control mechanism.

Figure 94:
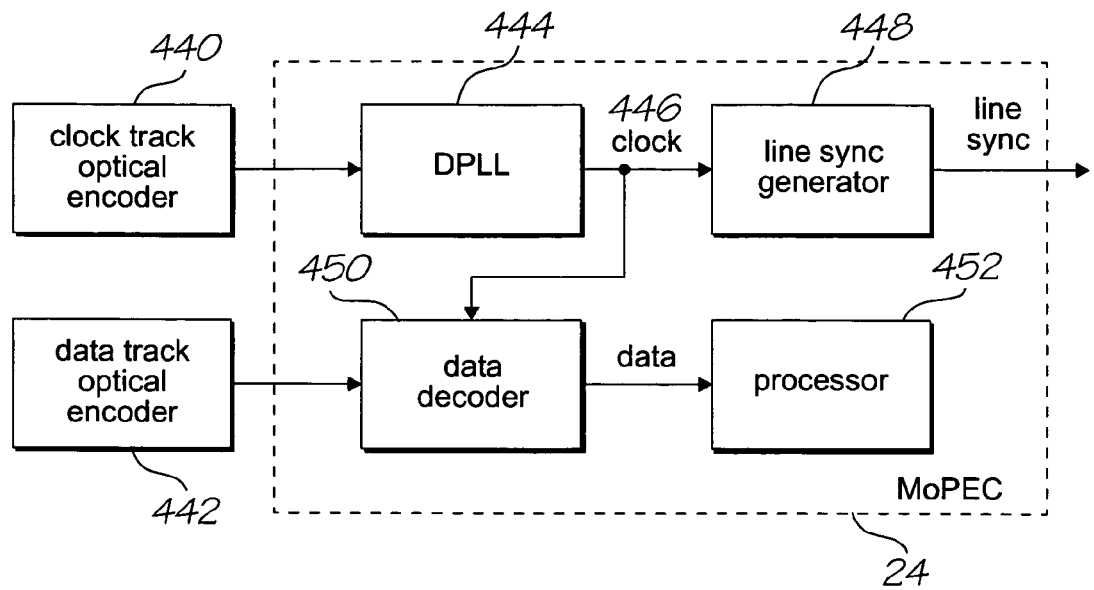
FIG. 94 is a block diagram of the MoPEC with the clock and data inputs.

FIG. 94 shows a block diagram of the MoPEC 326. It incorporates a digital phase lock loop (DPLL) 444 to track the clock inherent in the clock track 434 (see FIG. 91), a line sync generator 448 to generate the line sync signal 476 from the clock 446, and a data decoder 450 to decode the data in the data track 436. De-framing, error detection and error correction may be performed by software running on MoPEC's general-purpose processor 452, or it may be performed by dedicated hardware in MoPEC.

The data decoder 450 uses the clock 446 recovered by the DPLL 444 to sample the signal from the data track optical encoder 442. It may either sample the continuous signal from the data track optical encoder 442, or it may actually trigger the LED of the data track optical encoder 442 for the duration of the sample period, thereby reducing the total power consumption of the LED.

The DPLL 444 may be a PLL, or it may simply measure and filter the period between successive clock pulses.

The line sync generator 456 consists of a numerically-controlled oscillator which generates line sync pulses 476 at a rate which is a multiple of the rate of the clock 446 recovered from the clock track 434.

Figure 95:
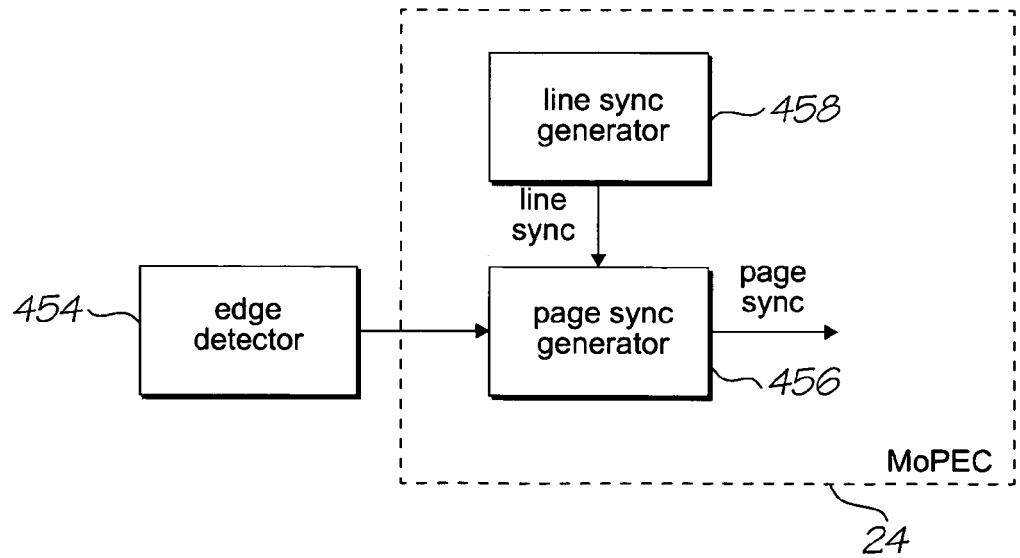
FIG. 95 is a block diagram of the optional edge detector and page sync generator for the M-Print system of FIG. 92.

As shown in FIG. 92, the print engine may optionally incorporate an explicit edge detector 474 to provide longitudinal registration of the card 226 with the operation of the printhead 202. In this case, as shown in FIG. 95, it generates a page sync signal 478 to signal the start of printing after counting a fixed number of line syncs 476 after edge detection. Longitudinal registration may also be achieved by other card-in detection mechanisms ranging from opto-sensors, de-capping mechanical switches, drive shaft/tension spring contact switch and motor load detection.

Figure 96:
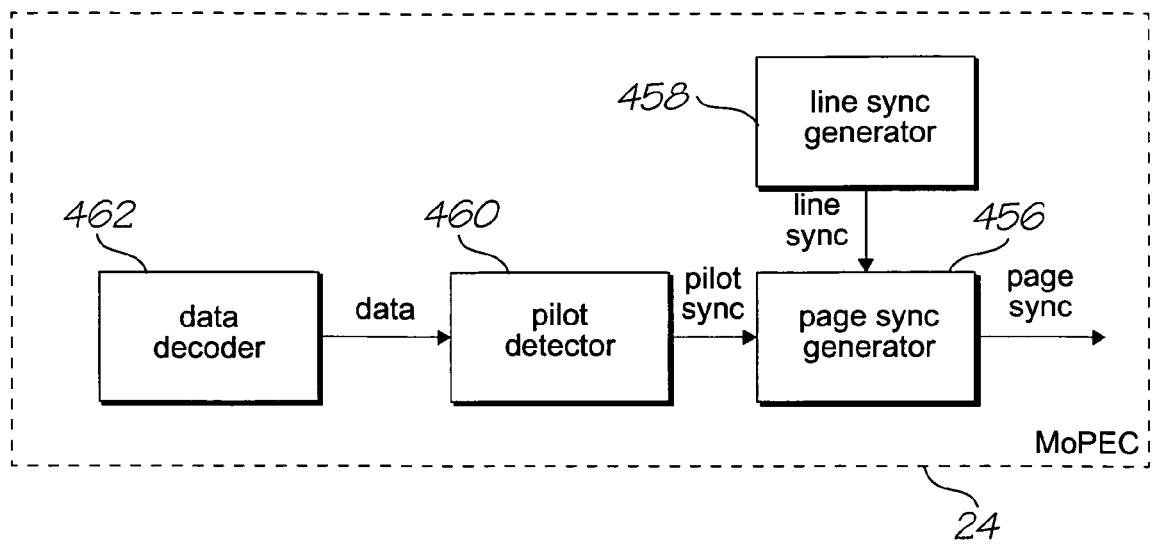
FIG. 96 is a block diagram of a MoPEC that uses media with a pilot sequence in the data track to generate a page sync signal.

Optionally, the printer can rely on the media coding itself to obtain longitudinal registration. For example, it may rely on acquisition of a pilot sequence on the data track 436 to obtain registration. In this case, as shown in FIG. 96, it generates a page sync signal 478 to signal the start of printing after counting a fixed number of line syncs 476 after pilot detection. The pilot detector 460 consists of a shift register and combinatorial logic to recognise the pilot sequence 480 provided by the data decoder 450, and generate the pilot sync signal 482. Relying on the media coding itself can provide superior information for registering printed content with the Netpage tag pattern 438 (see FIG. 91).

Figure 97:
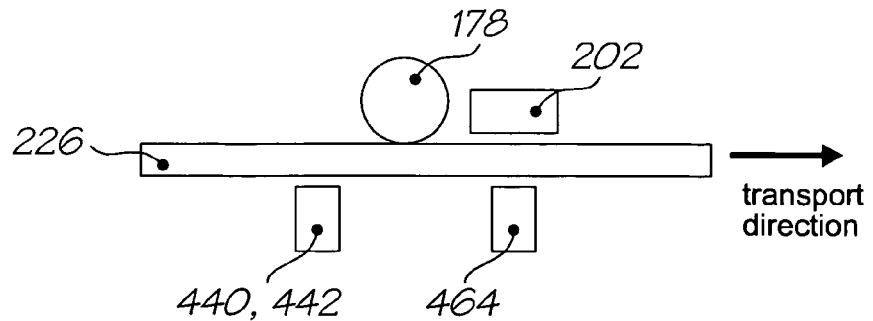
FIG. 97 is a schematic representation of the position of the encoders along media feed path.

As shown in FIG. 97, the data track optical encoder 442 is positioned adjacent to the first clock data encoder 440, so that the data track 436 (see FIG. 91) can be decoded as early as possible and using the recovered clock signal 446. The clock must be acquired before printing can commence, so a first optical encoder 440 is positioned before the printhead 202 in the media feed path. However, as the clock needs to be tracked throughout the print, a second clock optical encoder 464 is positioned coincident with or downstream of the printhead 202. This is described in more detail below.

FIG. 73 shows the printed card 226 being withdrawn from the print cartridge 148. It will be appreciated that the printed card 226 needs to be manually withdrawn by the user. Once the trailing edge of the card 226 has passed between the drive shaft 178 and the spring fingers 238, it is no longer driven along the media feed path. However, as the printhead 202 is less than 2 mm from the drive shaft 178, the momentum of the card 226 projects the trailing edge of past the printhead 202.

While the momentum of the card is sufficient to carry the trailing edge past the printhead, it is not enough to fling it out of the exit slot 150 (FIG. 14). Instead, the card 226 is lightly gripped by the opposed lock actuator arms 232 as it protrudes from the exit slot 150 in the side of the mobile phone 100. This retains the card 226 so it does not simply fall from exit slot 150, but rather allows users to manually remove the printed card 226 from the mobile phone 100 at their convenience. This is important to the practicality of the mobile telecommunications device because the card 226 is fed into one side of the mobile telecommunications device and retrieved from the other, so users will typically want to swap the hand that holds the mobile telecommunications device when collecting the printed card. By lightly retaining the printed card, users do not need to swap hands and be ready to collect the card before completion of the print job (approximately 1-2 secs).

Alternatively, the velocity of the card as it leaves the roller can be made high enough that the card exits the outlet slot 123 under its own inertia.

Dual Clock Sensor Synchronization

For full bleed printing, the decoder needs to generate a line sync signal for the entire longitudinal length of the card. Unless the card has a detachable strip (described elsewhere in the specification), the print engine will need two clock track sensors; one either side of printhead. Initially the line sync signal is generated from the clock signal from the pre-printhead sensor and then, before the trailing edge of the card passes the pre-printhead sensor, the line sync signal needs to be generated by the post-printhead sensor. In order to switch from the first clock signal to the second, the second needs to be synchronized with the first to avoid any discontinuity in the line sync signal (which cause artefacts in the print).

Figure 99:
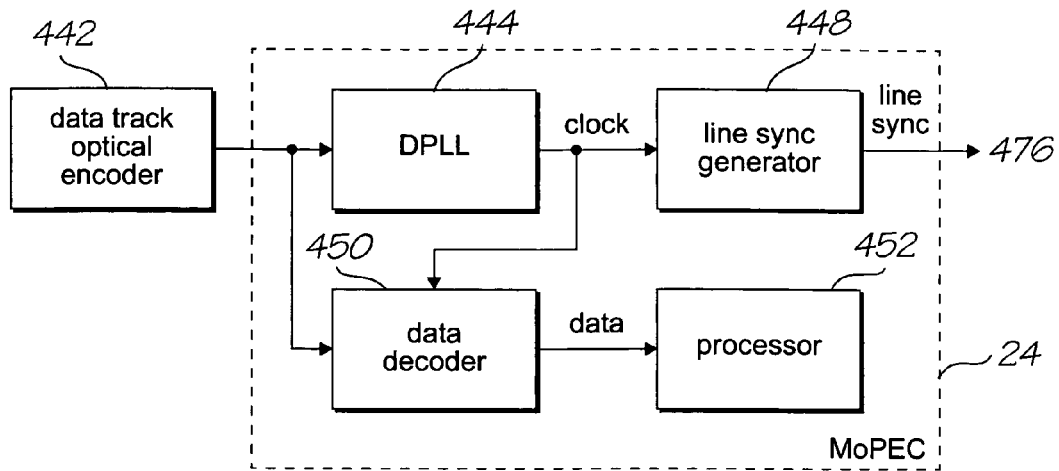
FIG. 99 is a block diagram of the decoder for a self clocking data track.
Figure 100:
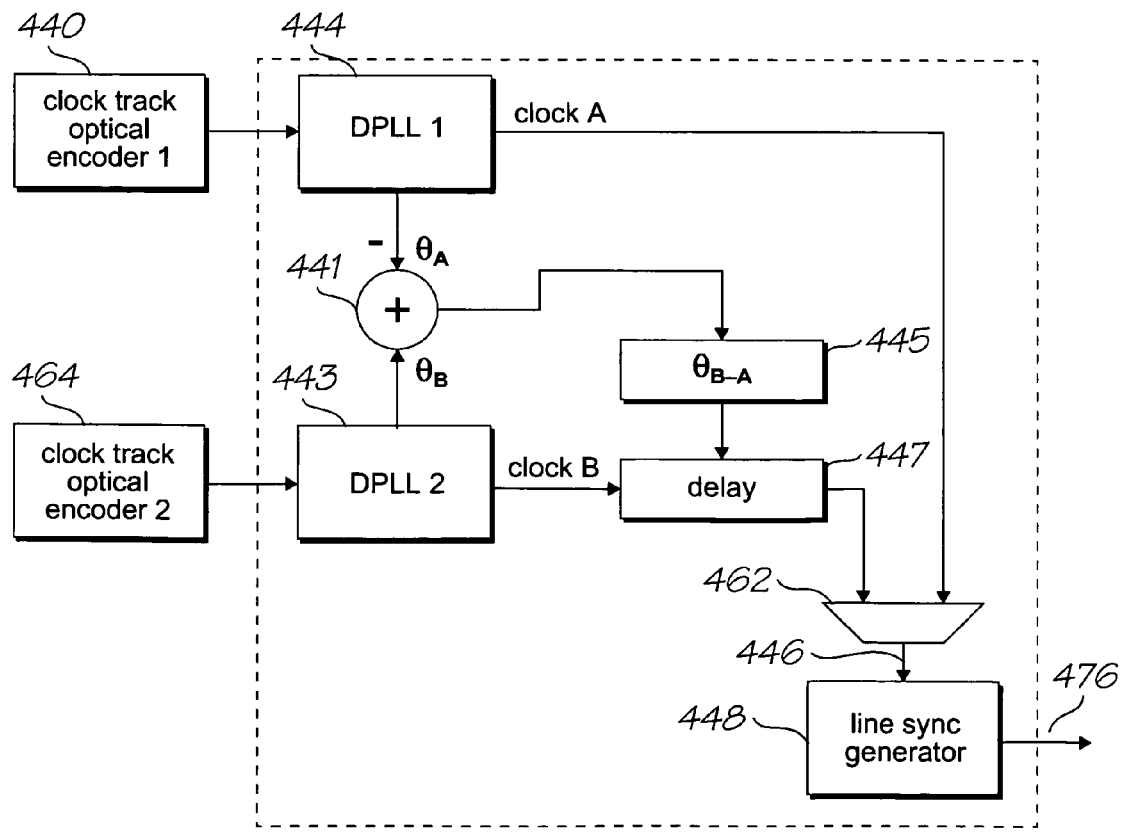
FIG. 100 is a block diagram of the phase lock loop synchronization of the dual clock track sensors.

Referring to FIG. 99, a pair of DPLL's 443 and 444 track the clock inherent in the clock track, via respective first and second clock track optical encoders 440 and 464. During the initial phase of the print only the first encoder 440 will be seeing the clock track and only the first PLL 443 will be locked. The card is printed as it passes the printhead and then the second clock track optical encoder 464 sees the clock track. At this stage, both encoders will be seeing the clock track and both DPLL's will be locked. During the final phase of the print only the second encoder will be seeing the clock track and only the second DPLL 443 will be locked.

During the initial phase the output from the first DPLL 440 must be used to generate the line sync signal 476, but before the end of the middle phase the decoder must start using the output from the second DPLL 444 to generate the line sync signal 476. Since it is not generally practical to space the encoders an integer number of clock periods apart, the output from the second DPLL 444 must be phase-aligned with the output of the first DPLL 443 before the transition occurs.

For the purposes of managing the transition, there are four clock tracking phases of interest. During the first phase, when only the first DPLL 443 is locked, the clock from the first DPLL 443 is selected via a multiplexer 462 and fed to the line sync generator 448. During the second phase, which starts when the second DPLL 444 locks, the phase difference between the two DPLLs is computed 441 and latched into a phase difference register 445. During the third phase, which starts a fixed time after the start of the second phase, the signal from the second DPLL 444, is fed through a delay 447 set by the latched phase difference in the latch register 445. During the fourth phase, which starts a fixed time after the start of the third phase, the delayed clock from the second DPLL 447 is selected via the multiplexer 462 and fed to the line sync generator 448.

Figure 101:
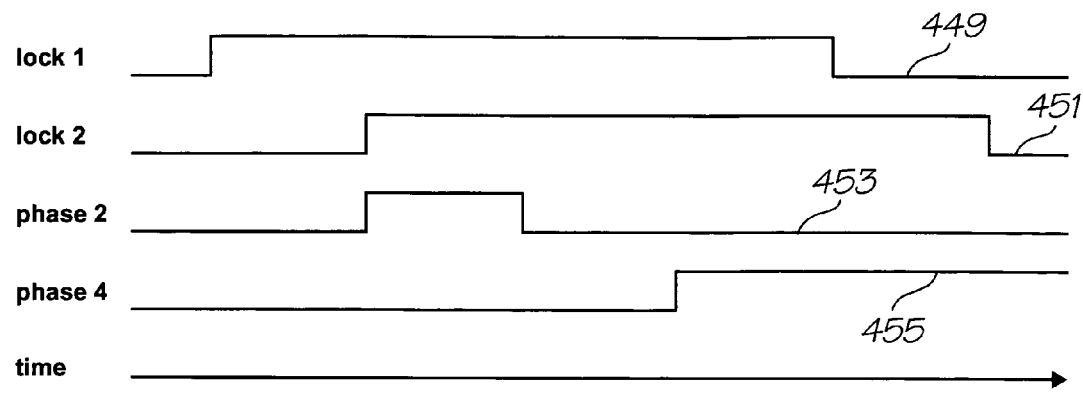
FIG. 101 shows the dual phase lock loop signals at different phases of the media feed.

FIG. 101 shows the signals which control the clock tracking phases. The lock signals 449 and 451 are generated using lock detection circuits in the DPLL's 443 and 444. Alternatively, PLL lock is assumed according to approximate knowledge of the position of the card relative to the two encoders 440 and 464. The two phase control signals 453 and 455 are triggered by the lock signals 449 and 451 and controlled by timers.

Note that in practice, rather than explicitly delaying the second PLL's clock, the delayed clock can be generated directly by a digital oscillator which takes into account the phase difference.

Two Drive Shaft Version

Projecting the card 226 past the printhead 202 by momentum, permits a compact single drive shaft design. However, the deceleration of the card 226 once it disengages from the drive shaft 178 makes the generation of an accurate line sync signal 476 for the trailing edge much more difficult. If the compactness of the device is not overly critical, a second drive shaft after the printhead can keep the speed of the card constant until printing is complete.

Figure 110:
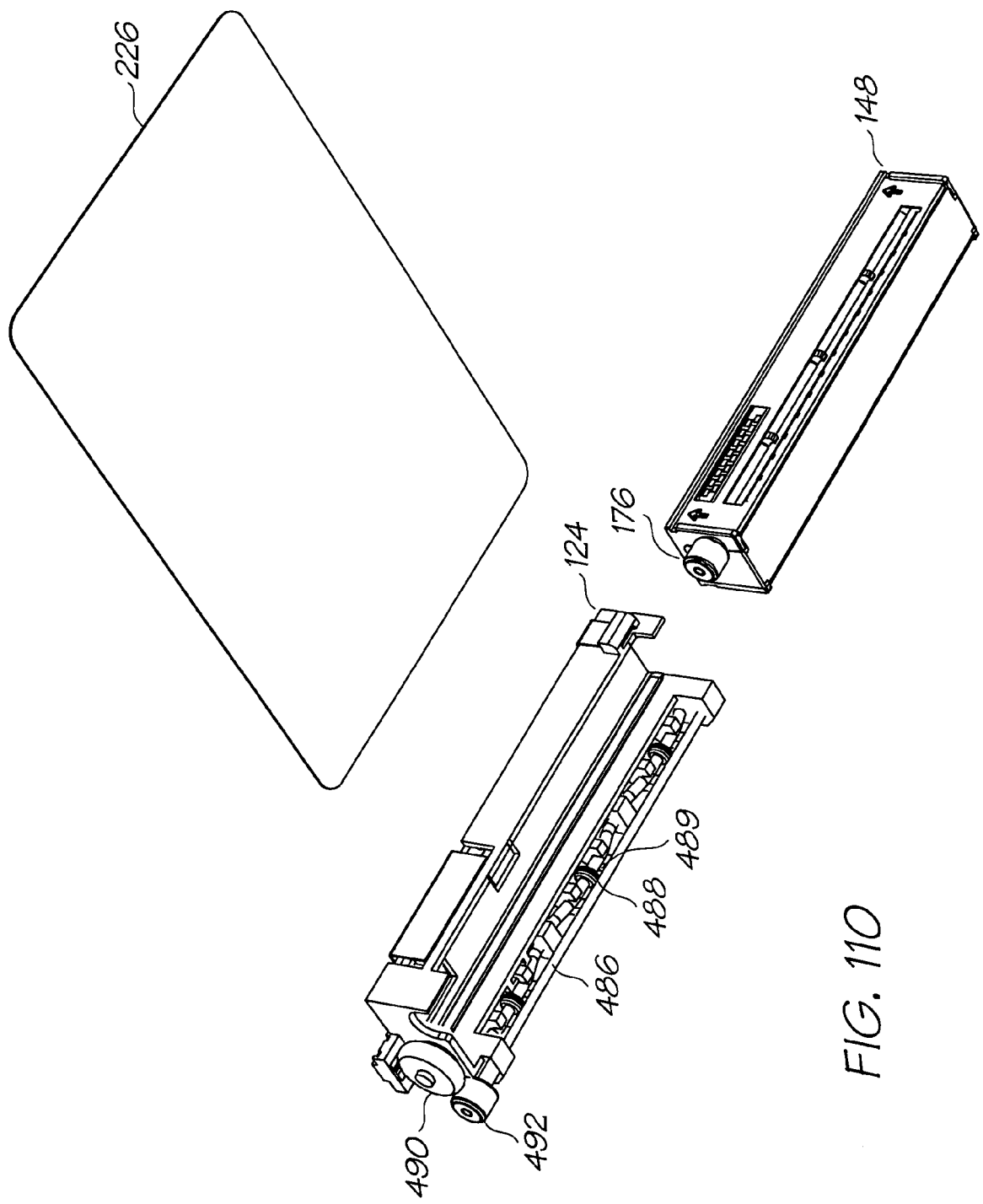
FIG. 110 is a perspective of a dual drive shaft version of the cartridge cradle assembly.
Figure 114:
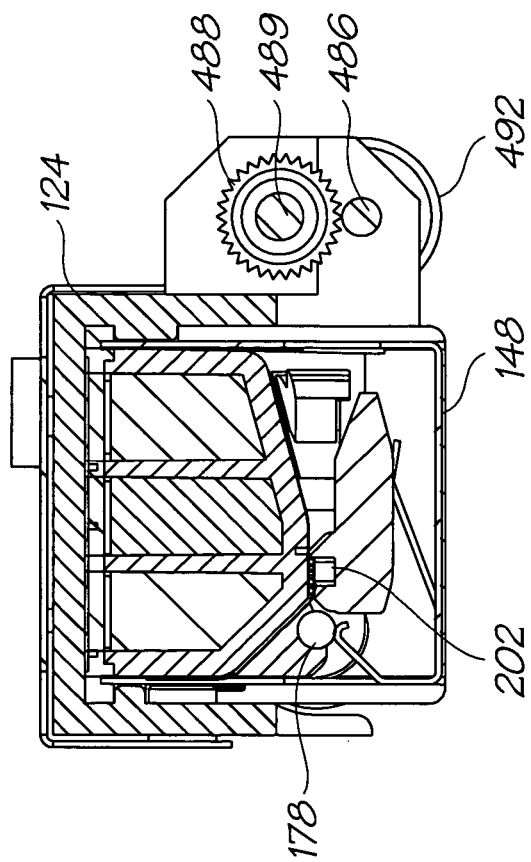
FIGS. 114 is a cross section of the cartridge taken along A-A of FIG. 113.
Figure 112:
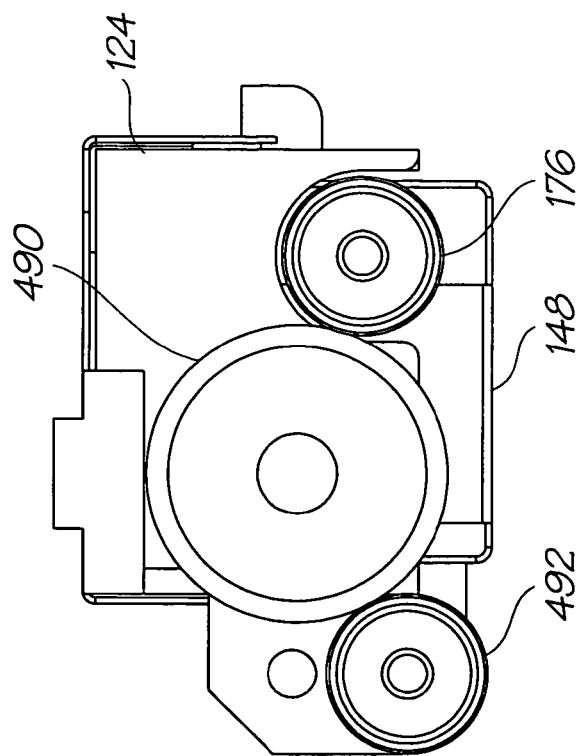

FIGS. 110 and 114 show a dual drive shaft embodiment. Referring firstly to FIG. 110, the print cartridge 148 has the first drive shaft 178 and drive roller 176 and as with the previous embodiments, the cartridge 148 is carried by the cradle 124. However, the cradle 124 carries a second drive shaft 486, drive roller 492, and miniature spikewheels 488 on a sprung shaft 489. The second drive shaft 486 uses the spikewheels 488 instead of a media guide similar to the spring fingers 230 of first drive shaft 178, to avoid smudging any wet ink. FIGS. 111 to 113 show the cartridge installed in the cradle. A central drive roller 490 mounted at the end of the cradle, abuts both first and second drive rollers 176 and 492 simultaneously. This ensures a synchronized drive speed. The central drive roller 490 can be driven by the piezo electric or electric motor drive systems discussed above.

Section A-A shown in FIG. 114 best shows the media feed path through the cartridge/cradle assembly. When the trailing edge of the card 226 disengages from the first drive shaft 178, the second drive shaft 486 continues to draw it past the printhead 202 at essentially the same speed. The line sync signal generated using the clock track is constant and therefore it is less difficult for the MoPEC chip to longitudinally register the printing with the trailing edge. Upon completion of the printing, the MoPEC chip can stop the central drive roller 490 so that the card is held in the nip between the second drive shaft 486 and the spikewheeks 488 for user retrieval. Alternatively, it can be fed back in the reverse direction for user retrieval from the inlet slot.

It will be appreciated, of course, that in some embodiments there will be no provision for a clock track and/or coded data such as a linear track or Netpage tags. Where no (implicit or explicit) clock track is provided, other mechanisms such as optical, magnetic or electrical feedback, including feedback from one or more transducers associated with one or more rollers or other mechanisms can be used to determine the position and speed of the card before and/or during printing. Where no form of coded data is provided, the printer simply prints onto any form of print medium that is inserted and is capable of being printed on. Both options open a variety of issues related to quality control of printed output, including media jamming, ink bleeding, and undue mechanical stress and wear on the printer components.

Media Coding

The card 226 shown in FIG. 91 has coded data in the form of the clock track 434, the data track 436 and the Netpag tag pattern 438. This coded data can serve a variety of functions and these are described below. However, the functions listed below are not exhaustive and the coded media (together with the appropriate mobile telecommunications device) can implement many other functions as well. Similarly, it is not necessary for all of these features to be incorporated into the coded data on the media. Any one or more can be combined to suit the application or applications for which a particular print medium and/or system is designed.

Side

The card can be coded to allow the printer to determine, prior to commencing printing, which side of the card is facing the printhead, i.e. the front or the back. This allows the printer to reject the card if it is inserted back-to-front, in case the card has been pre-printed with graphics on the back (e.g. advertising), or in case the front and the back have different surface treatments (e.g. to protect the graphics pre-printed on the back and/or to facilitate high-quality printing on the front). It also allows the printer to print side-dependent content (e.g. a photo on the front and corresponding photo details on the back).

Orientation

The card can be coded to allow the printer to determine, prior to commencing printing, the orientation of the card in relation to the printhead. This allows the printhead to print graphics rotated to match the rotation of pre-printed graphics on the back. It also allows the printer to reject the card if it is inserted with the incorrect orientation (with respect to pre-printed graphics on the back). Orientation can be determined by detecting an explicit orientation indicator, or by using the known orientation of information printed for another purpose, such as Netpage tags or even pre-printed user information or advertising.

Media Type/Size

The card can be coded to allow the printer to determine, prior to commencing printing, the type of the card. This allows the printer to prepare print data or select a print mode specific to the media type, for example, color conversion using a color profile specific to the media type, or droplet size modulation according to the expected absorbance of the card. The card can be coded to allow the printer to determine, prior to commencing printing, the longitudinal size of the card. This allows the printer to print graphics formatted for the size of the card, for example, a panoramic crop of a photo to match a panoramic card.

Prior Printing

The card can be coded to allow the printer to determine, prior to commencing printing, if the side of the card facing the printhead is pre-printed. The printer can then reject the card, prior to commencing printing, if it is inserted with the pre-printed side facing the printhead. This prevents over-printing. It also allows the printer to prepare, prior to commencing printing, content which fits into a known blank area on an otherwise pre-printed side (for example, photo details on the back of a photo, printed onto a card with pre-printed advertising on the back, but with a blank area for the photo details).

The card can be coded to allow the printer to detect, prior to commencing printing, whether the side facing the printhead has already been printed on demand (as opposed to pre-printed). This allows the printer to reject the card, prior to commencing printing, if the side facing the printhead has already been printed on demand, rather than overprinting the already-printed graphics.

The card can be coded to allow the printer to determine, ideally prior to commencing printing, if it is an authorised card. This allows the printer to reject, ideally prior to commencing printing, an un-authorised card, as the quality of the card will then be unknown, and the quality of the print cannot be guaranteed.

Position

The card can be coded to allow the printer to determine, prior to commencing printing, the absolute longitudinal position of the card in relation to the printhead. This allows the printer to print graphics in registration with the card.

This can also be achieved by other means, such as by directly detecting the leading edge of the card.

The card can be coded to allow the printer to determine, prior to commencing printing, the absolute lateral position of the card in relation to the printhead. This allows the printer to print graphics in registration with the card. This can also be achieved by other means, such as by providing a snug paper path, and/or by detecting the side edge(s) of the card.

The card can be coded to allow the printer to track, during printing, the longitudinal position of the card in relation to the printhead, or the longitudinal speed of the card in relation to the printhead. This allows the printer to print graphics in registration with the card. This can also be achieved by other means, such as by coding and tracking a moving part in the transport mechanism.

The card can be coded to allow the printer to track, during printing, the lateral position of the card in relation to the printhead, or the lateral speed of the card in relation to the printhead. This allows the printer to print graphics in registration with the card. This can also be achieved by other means, such as by providing a snug paper path, and/or by detecting the side edge(s) of the card.

Invisibility

The coding can be disposed on or in the card so as to render it substantially invisible to an unaided human eye. This prevents the coding from detracting from printed graphics.

Fault Tolerance

The coding can be sufficiently fault-tolerant to allow the printer to acquire and decode the coding in the presence of an expected amount of surface contamination or damage. This prevents an expected amount of surface contamination or damage from causing the printer to reject the card or from causing the printer to produce a sub-standard print.

Card and Printer Alternatives

In light of the broad ranging functionality that a suitable M-Print printer with compatible cards can provide, several design alternatives for the printer, the cards and the coding are outlined below. Again, this list is not intended to be exhaustive, but instead is merely illustrative of some possible variations to the embodiments shown elsewhere in this specification.

Self-Clocking Data Track

Figure 98:
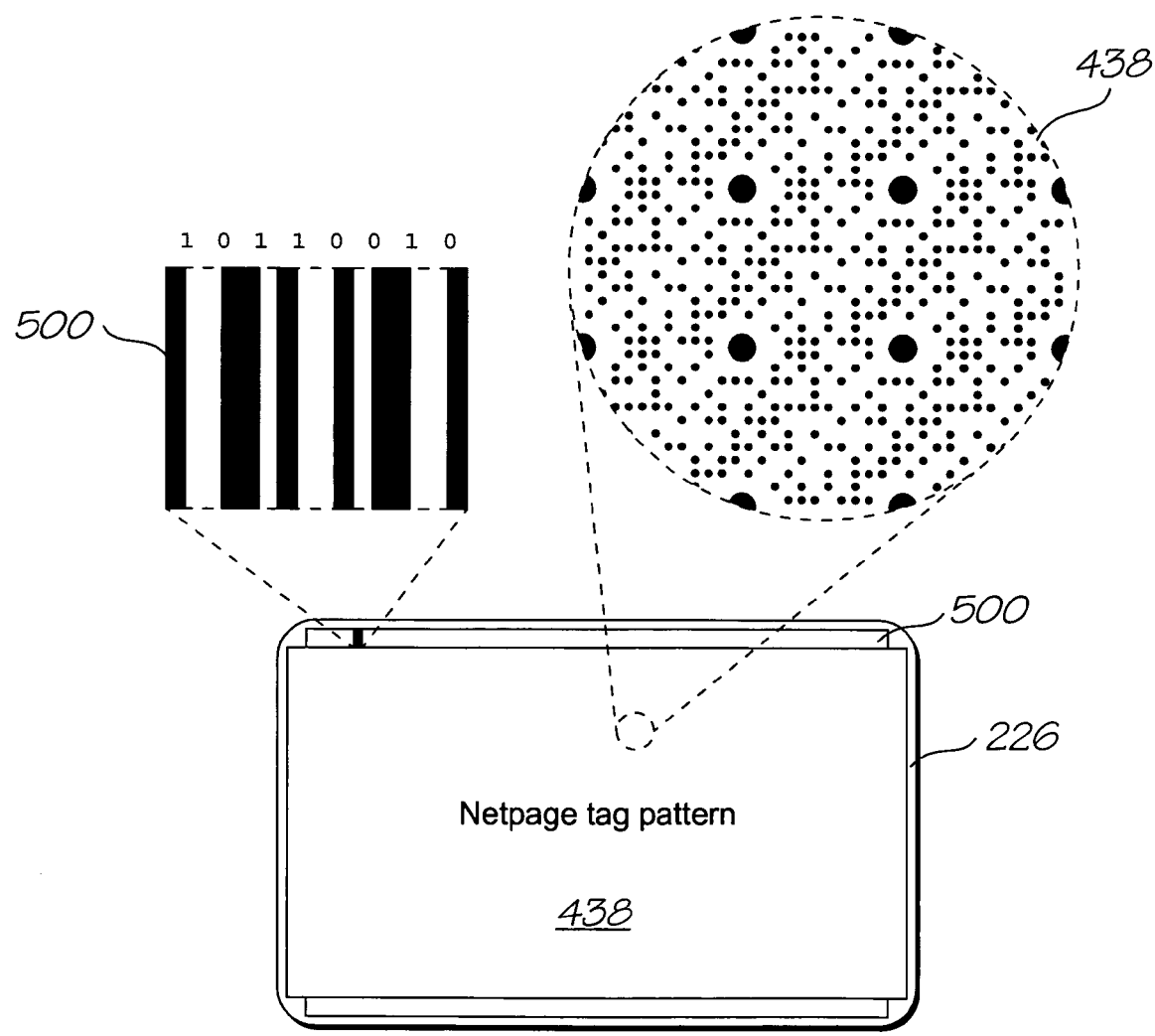
FIG. 98 shows the 'back-side' of a card with a self clocking data track.

As an alternative to using separate clock and data tracks, the data track can be self-clocking and the clock can be recovered from the data track for other purposes such as line sync generation. FIG. 98 shows the layout of the same coding as described in relation to the card 226 shown in FIG. 91, but using a self-clocking data track 500. The self-clocking data track 500 can use a Manchester phase encoding, or another self-clocking scheme such as return-to-zero (RZ). Encoding of the data is described in greater detail in the "Linear Encoding" sub-section below.

FIG. 99 shows a block diagram of the corresponding MoPEC chip, where the DPLL 444 operates on the self clocking data track 500 rather than a separate clock track.

The self-clocking data track 500 eliminates the need for separate clock and data optical encoders, and reduces the impact that separate clock and data tracks have on the area of Netpage interactivity. The disadvantage of a self-clocking data track is that it encodes data at half the rate of an explicitly-clocked data track.

In subsequent media coding variations which include a separate clock and data track, a self-clocking data track 500 can also be used, even when not explicitly mentioned.

Reading Phase Before Printing Phase

The minimal media coding is designed to be read during printing rather than prior to printing. Information encoded in the data track 436 is generally not available until after printing is complete. For example, the printer typically cannot use the Netpage identifier and digital signature to validate the card 226 before printing.

The printer can gain access to data track information prior to printing by transporting the card 226 in a forward direction past the data track optical encoder 442, decoding some or all of the data track 436, and then transporting the card back to its starting position. This can also provide the printer with more space to recognize a robust page sync indicator in the data track 436, as discussed above in relation to the card shown in FIG. 91. The information in the data track can then be usefully expanded to serve some or all of the other functions in the Media Coding subsection.

Explicit Side and Orientation Indicators

The minimal media coding does not explicitly encode the side of the card 226. The printer determines from the presence of the clock track 434 that the front of the card is facing the printhead. The minimal media coding does not make the orientation of the card accessible to the printer prior to printing, unless the printer implements a reading phase as described above. Instead, the minimal encoding assumes that it is advantageous for the user to be able to present the card in either orientation (but not upside-down).

Figure 102:
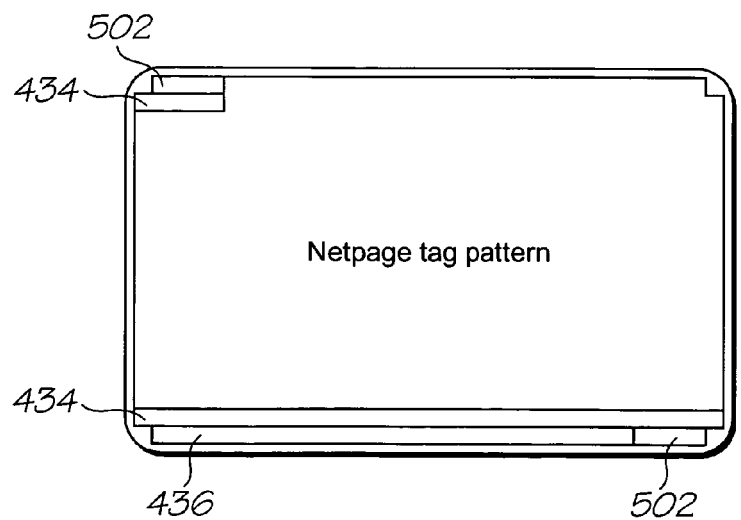
FIG. 102 shows the 'back-side' of a card with side and orientation indicators.

Rather than allow printing in both orientations, the printer can reject the card 226 if presented in the wrong orientation. To allow this, the media coding must include an orientation indicator accessible to the printer prior to printing. As shown in FIG. 102, the benefit of this is that a smaller area of the card is dedicated to the clock 434 and data tracks 436, and a larger area is therefore available for Netpage interactivity.

Instead of relying on the absence of a clock track on the front of the card to indicate side, the media coding can instead include explicit side indicators on the front side as well. The following table gives an example of an 8-bit code which can be used to fault-tolerantly encode the side and orientation indicator:

| Codeword | Side | Orientation |
|---|---|---|
| 00000000 | Front | Normal |
| 00011111 | | Rotated |
| 11100011 | Back | Normal |
| 11111100 | | Rotated |

The code has a minimum distance of five, so it can correct two errors. Longer and more robust codes are obviously possible.

The indicator 502 can be included in the data track immediately after the pilot. The side & orientation indicator 502 can also be combined with the pilot by designing a code of suitable length whose four codewords are maximally separated from each other as well as from preamble-prefixed shifts of themselves.

Like the data track 436, the side & orientation indicator 502 can be explicitly clocked by the clock track 434, or self-clocking.

Rather than being clocked at the same rate as the remainder of the data track 436, the side & orientation indicators 502 can be gross markers which can be recognised given only rough longitudinal registration. For example, the two bits required to encode the side and orientation can be pulse-position modulated (PPM) using gross marks (e.g. 0.5 mm long) for each pulse.

The following table defines some possible PPM schemes. In the table, a zero indicates a gross space and a one indicates a gross mark.

| 2PPM | 4PPM | Side | Orientation |
|---|---|---|---|
| 0101 | 0001 | Front | Normal |
| 0110 | 0010 | | Rotated |
| 1001 | 0100 | Back | Normal |
| 1010 | 1000 | | Rotated |

Data Track on Both Sides

Rather than relying on all possible future printers having optical encoders mounted to face the back of the card 226, the media coding can instead include clock 434 and data tracks 436 on the front as well.

Card with Detachable Strip

Figure 103:
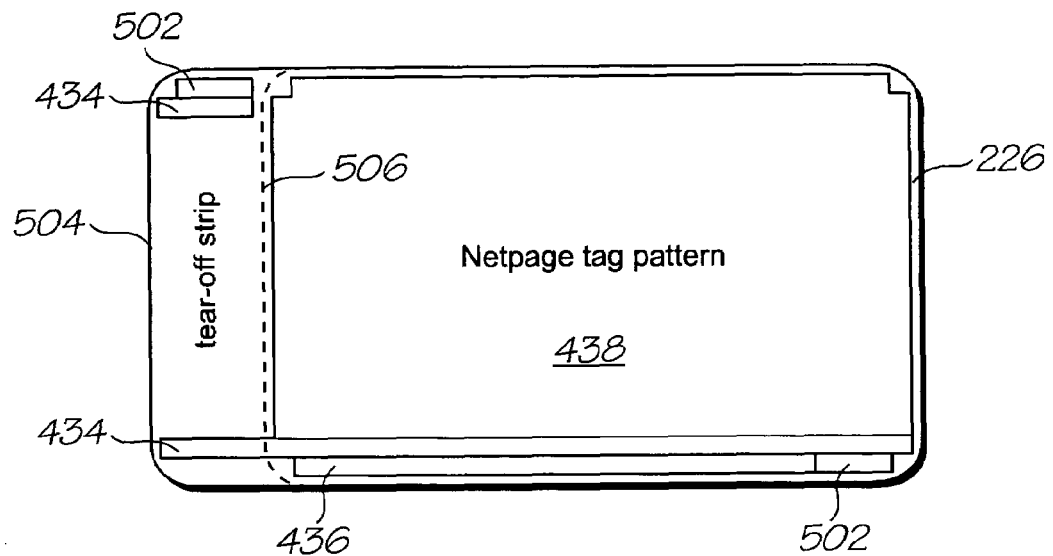
FIG. 103 shows the 'back-side' of a card with a detachable strip.

The arrangement shown in FIGS. 91 to 97 uses two clock track optical decoders 440 and 464, one to ensure that the clock is acquired before printing commences, and the other to ensure clock tracking continues till the end of the print. As an alternative, the card 226 can be extended with a tear-off strip 504, as shown in FIG. 103, with the clock track 434 extending onto the strip.

Figure 104:
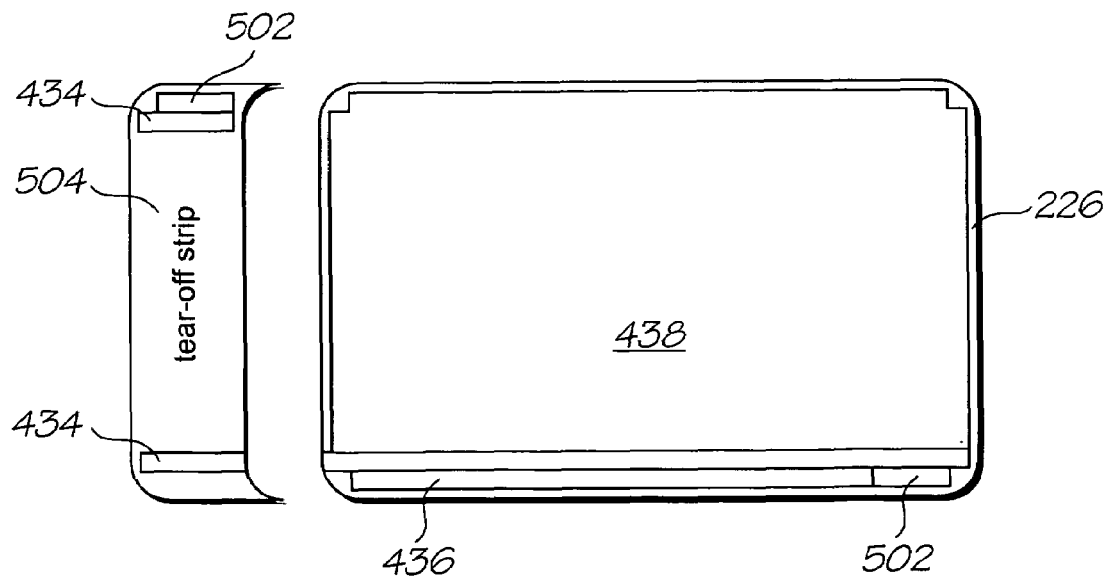
FIG. 104 shows the card of FIG. MC11 with the detachable strip detached from the card proper.
Figure 105:
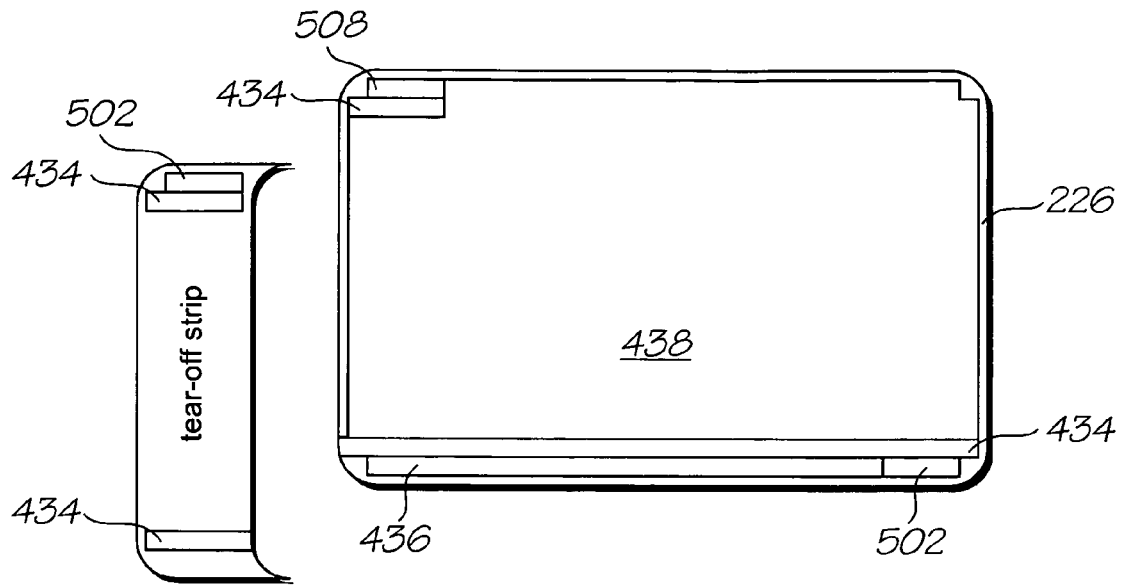
FIG. 105 shows the 'back-side' of a card with a detachable strip detached and additional side and orientation indicator.

The tear-off strip 504 is manufactured as part of the card 226, and remains joined to the card by a perforation until detached by the user, as shown in FIG. 104. The perforation is fine enough to leave an edge which is smooth to the touch.

By extending the length of the card via a strip attached to the card's trailing edge, a single clock track linear encoder 464 located upstream of the printhead 202 (see FIG. 97) is sufficient to support clock acquisition before printing starts as well as clock tracking throughout the entire print.

A second important benefit of the strip 504 is that a single drive shaft 178 can drive the card past the printhead throughout the print, i.e. without requiring a second drive shaft 486, or without expecting the card to "fly" un-driven for a final short distance using only its momentum.

To ensure correct recognition of the card 226 after the tear-off strip 504 is removed, the media coding can include a second side & orientation indicator 508 which is exposed when the tear-off strip 504 is removed. This is shown in FIG. 103.

The tear-off strip 504 may create a source of litter. To counteract this, each tear-off strip can act as a lottery ticket when presented to a retailer which sells M-Print media. The retailer can check a presented strip using any of the many Netpage-enabled devices described in the assignee's cross-referenced Netpage applications and patents.

Card with Square Corners

Figure 106:
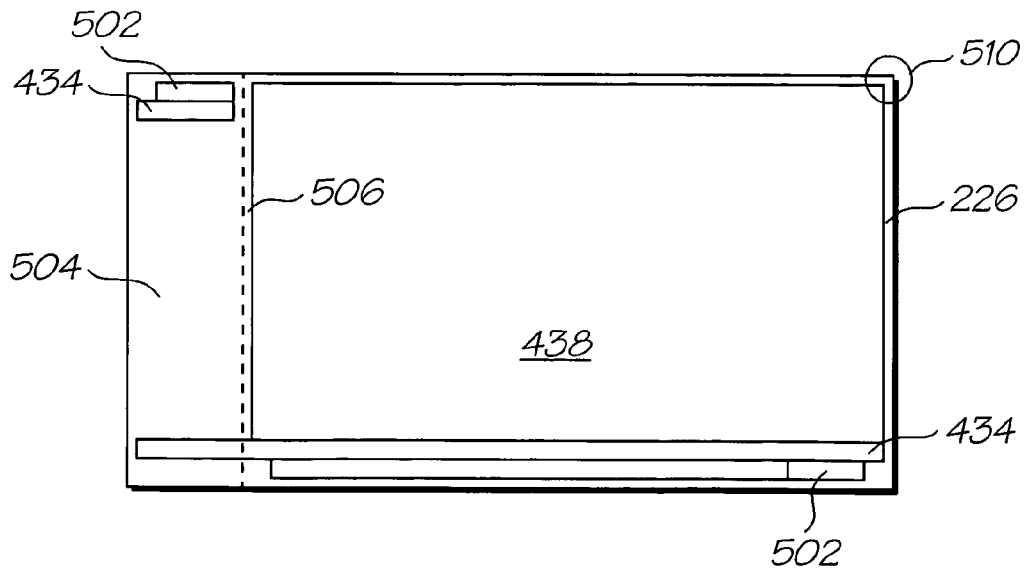
FIG. 106 shows a square-cornered card with detachable strip.
Figure 107:
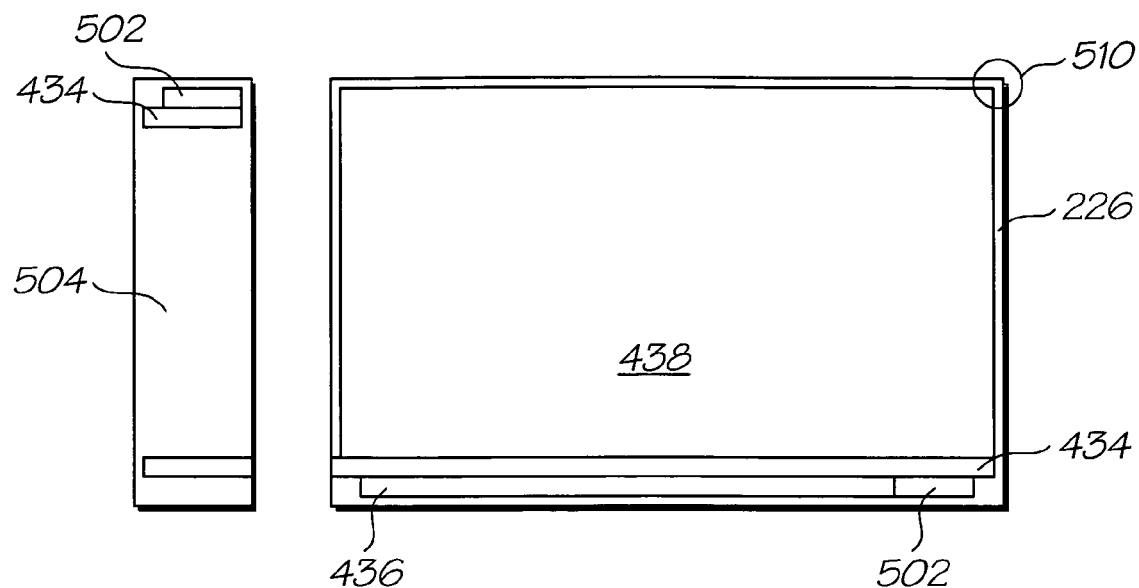
FIG. 107 shows the card of FIG. MC14 with the detachable strip detached from the card proper.

Whether the card 226 has a detachable strip 504 or not, a card shape with square rather than rounded corners may be preferable. Photo printing is arguably the most compelling application of M-Print. Both photos and business cards usually have square corners. Furthermore, the presence of a tear-off strip 504 creates an additional motivation to use square rather than round corners. FIGS. 106 and 107 show a card 226 with square corners 510 and a tear-off strip 504.

Lateral Data Track

Rather than transporting the card 226 forward twice to effect a reading phase before printing phase (as described above), the media coding can incorporate a lateral rather than a longitudinal data track.

Figure 108:
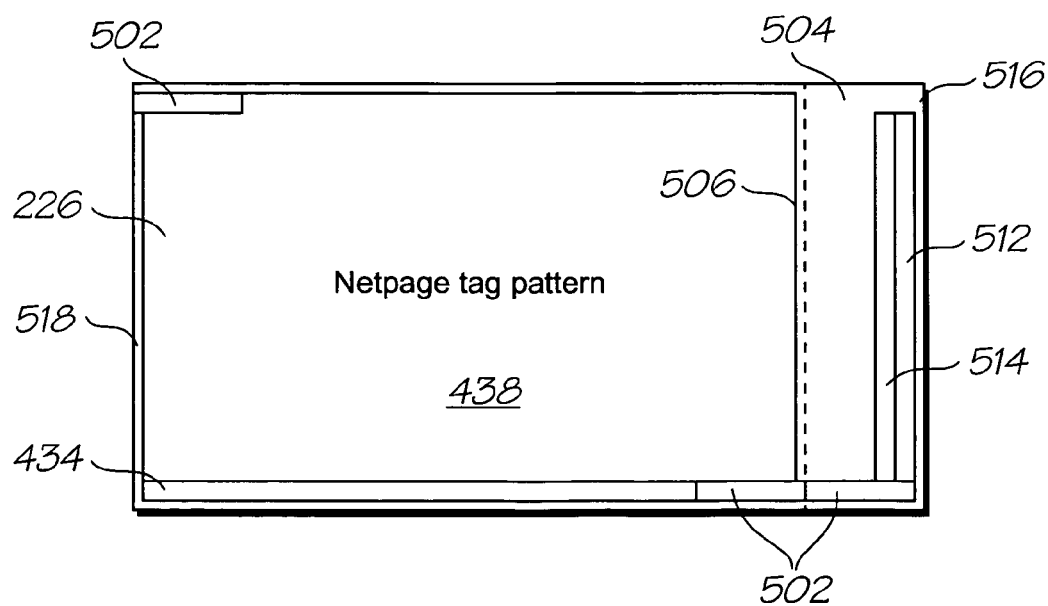
FIG. 108 shows a card with lateral data track on the detachable strip at the leading edge.

As shown in FIG. 108, a lateral data track 514, whether explicitly clocked 512 or self-clocked, can be read by a linear image sensor. Relevant techniques and devices are described in the Applicant's co-pending applications U.S. Ser. No. 11/084,796, filed on Mar. 21, 2005. The lateral data track 514 is ideally placed along the leading edge 516 of the card, so it can be fully decoded prior to printing. It can be placed on the tear-off strip 504, thus eliminating the impact of the data track 514 on the Netpage tag pattern 438 on the card proper (that is, the retained portion of the card 226). In this case, the tear-off strip 504 needs to be on the leading edge 516 of the card, rather than the trailing edge 518. This in turn dictates that the clock track optical encoder 464 is positioned downstream of the printhead 202 rather than upstream (see FIG. 97). The card proper still has self-clocking side & orientation indicators 502 and a single clock track 434 on each side, but no data track. The lateral data track 514 can provide the basis for accurate lateral registration, in particular to provide accurate lateral registration between the Netpage tag pattern 438 and the printed visual content.

A lateral track can also be added to non-tear-off versions of the card.

Figure 109:
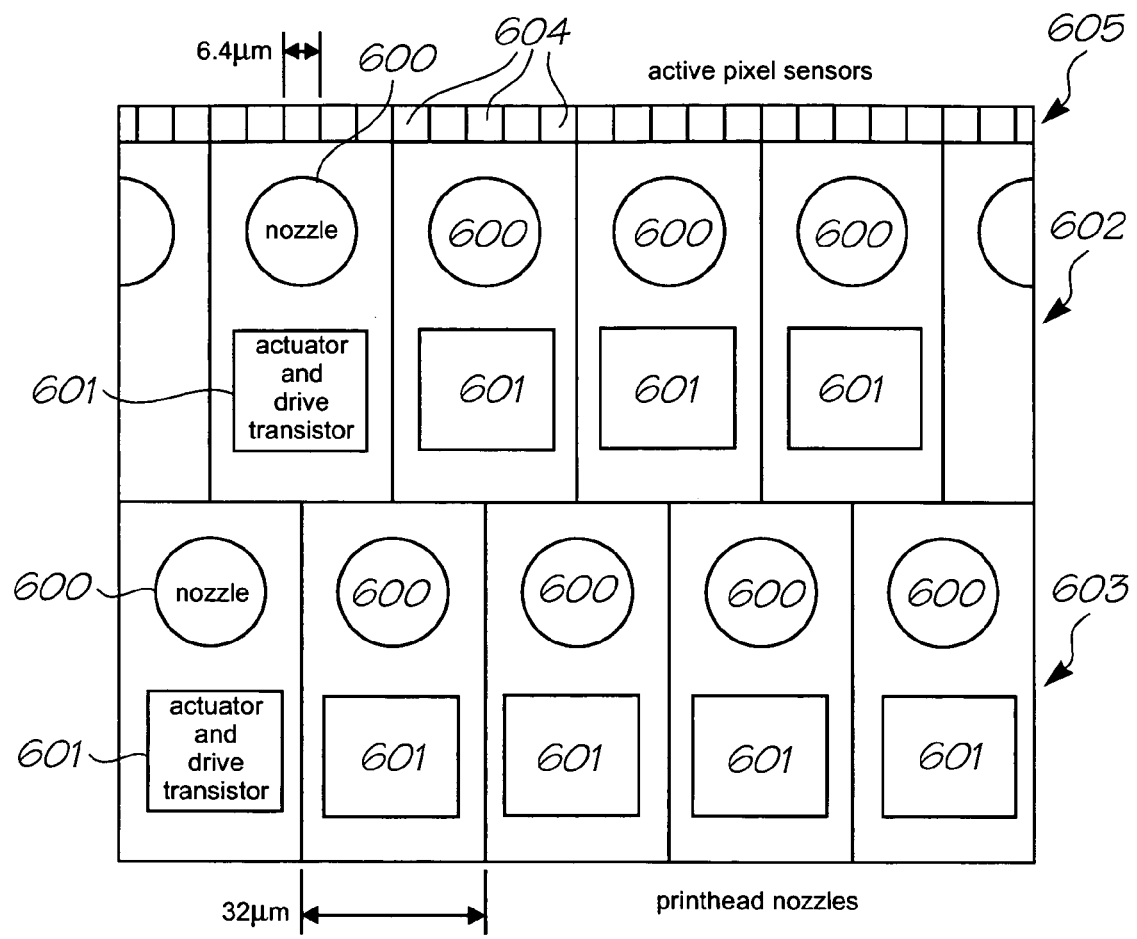
FIG. 109 is a detailed physical view of a Memjet printhead IC with an integral image sensor for reading a lateral data track.

The linear image sensor extends laterally across the media feed path in front of the printhead with respect to the media feed direction. The image sensor is a linear array of active pixel sensors, each sensor reading the coded data within a sample area on the card. The sample area corresponds to the 'Mnem area' described in detail in the Applicant's co-pending U.S. patent-application Ser. No. 11/084,796 filed on 21 Mar. 2005, the contents of which are incorporated herein be cross reference. FIG. 109 shows a detailed physical view of a Memjet printhead IC with an integral image sensor. For simplicity the figure only shows a single row of 1600dpi nozzles 600, mounted adjacent associated actuators and drive circuitry shown generally at 601. Note that because the 32-micron width of each nozzle unit cell exceeds the 16-micron dot pitch required for 1600 dpi printing, each row of nozzles is composed of two staggered half-rows 602, 603. The sampling rate N is 2.5 in the arrangement shown.

Although a sample area may utilize a single printed dot to represent a single encoded bit, it may also utilize more than one printed dot to represent a single encoded bit. For example, a sample area may utilize a 2×2 array of printed dots to represent a single bit. Thus if the printer resolution is 1600 dpi, the sample area resolution is only 800 dpi. In certain applications, reducing the print resolution of a sample area may provide more robust performance, such as in the presence of particular sources of surface degradation or damage.

If the area resolution is lower than the printer resolution, then the ratio of the pixel count to the nozzle count can be reduced accordingly, and larger pixel sensors can be employed. For example, in the case of the Memjet printhead shown in FIG. 109, a 12.8 micron pixel sensor can be utilized in place of two 6.4 micron pixel sensors.

Automatic Printing

In one form, the mobile device is configured to automatically commence printing once the print medium is inserted into the feed path. A mechanical or optical sensor (or combination thereof) can be used to determine when this has happened.

The device can print automatically in a number of ways. In one example, the device automatically prints the current document or file presently in use by the user. This will, in the majority of cases, be the document or application presently being viewed on the device's display. For example, if the user is reading an email or SMS shown on the display, inserting a print medium will cause the email or SMS to be printed.

Alternatively, the user can instruct the mobile device to print a document or file and subsequently insert the print medium. The mobile device will then cause automatic printing of the next print job in the queue. Optionally, the device can ask for confirmation of the job to be printed, particularly if an excessive amount of time has passed since the job was placed in the queue.

Preferably, the printing mode is selectable by the user, thereby enabling automatic printing to be activated (print immediately without confirmation), partially activated (wait for confirmation) or deactivated (wait for explicit instruction from user to print).

Possible M-Print Configurations.

From the above alternatives, there are a number of possibilities for the physical configuration of the components in an M-Print printer. Each possibility has inherent advantages and disadvantages which can be assessed when choosing a configuration for a particular M-Print application. A selection of the possible configurations and their associated advantages is set out below with reference to the schematic representations shown in FIGS. 115 to 120.

These figures position the components with reference to the media feed path and the following M-Print parameters: Tracking Tail Fly Period (TTFP): a period of time during which MoPEC does not receive card tracking information from the coding.

Drive Tail Fly Period (DTFP): the period of time between the disengagement of the card from the drive shaft and it coming to rest within the media path.

Drive Settling Period (DSP): the period of time between the initial engagement of the card with the drive shaft and the card accelerating to it's steady state speed.

Tracking Settling Period (TSP): the period of time that the optical encoder requires to lock onto the markings of the clock track.

Media Coding Dead Zone (MCDZ): the portion of the data track that is visible to the data encoder while the card is not being driven. Reading data from the MCDZ can be unpredictable.

Ink Drying Time (IDT): the minimum period of time after a drop of ink is printed to the card, that the printed dot can be contacted without degrading print quality.

Figure 115:
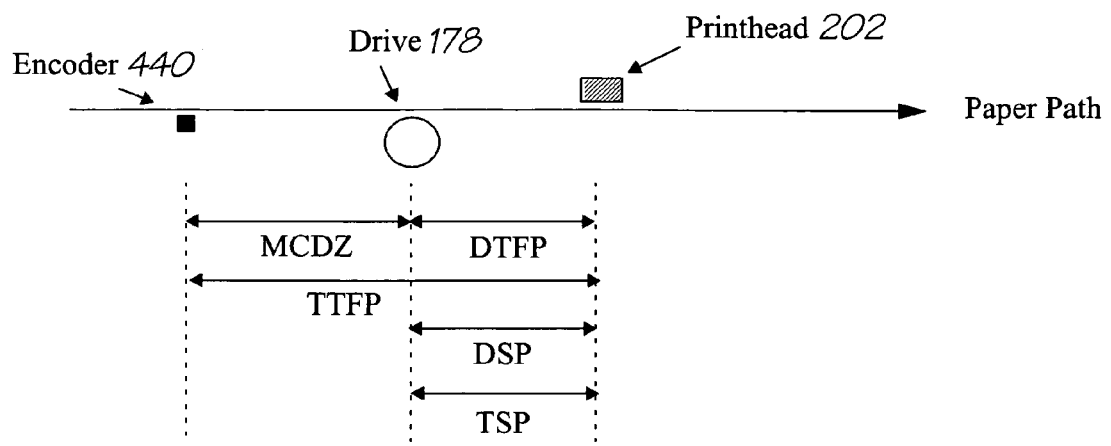
FIG. 115 is a schematic representation of an encoder-drive-printhead configuration.

Encoder-Drive-Printhead: As shown in FIG. 115, positioning the encoder 440 before the drive shaft 178, which in turn is before the printhead 202 minimizes the distance between the printhead and drive. This configuration also uses minimum components. This allows a compact design.

Figure 116:
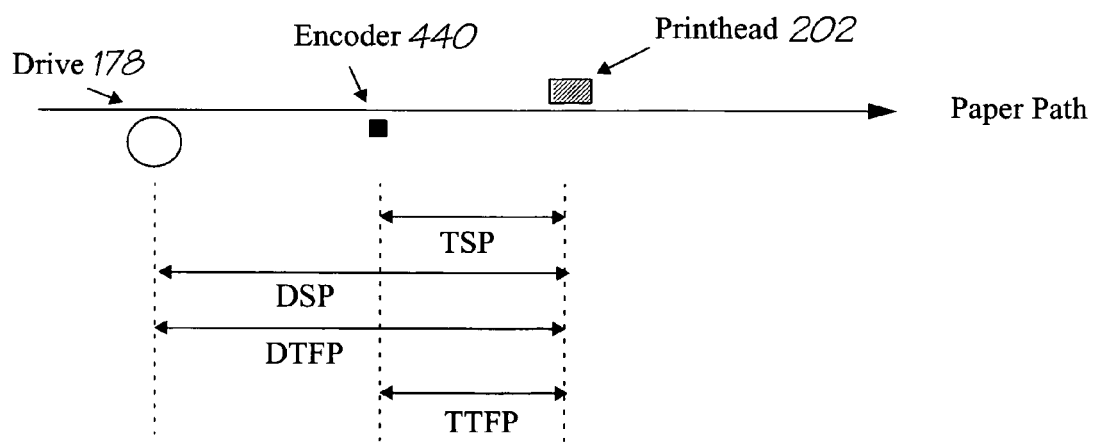
FIG. 116 is a schematic representation of a drive-encoder-printhead configuration.

Drive-Encoder-Printhead: Referring to FIG. 116, positioning the drive shaft 178, the encoder 440 and the printhead 202 sequentially along the media path simplifies leading edge detection.

Figure 117:
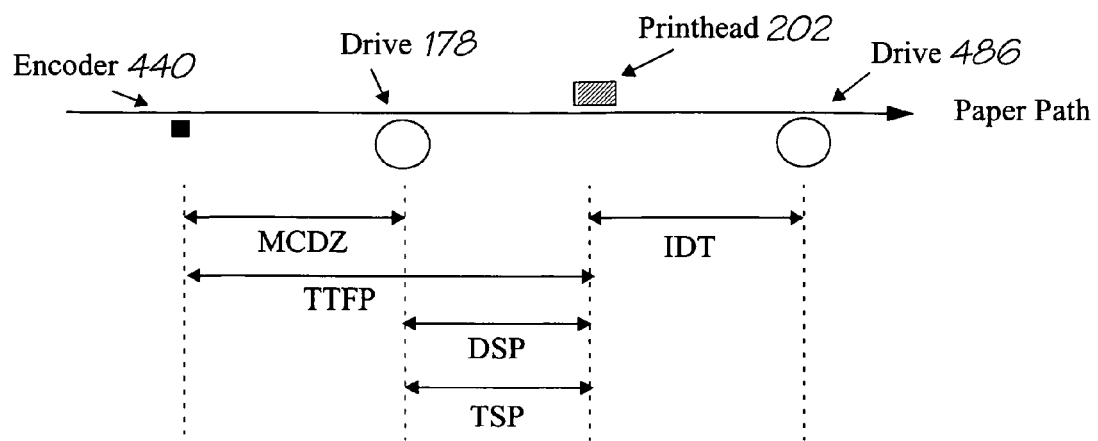
FIG. 117 is a schematic representation of an encoder-printhead-drive configuration.

Encoder-Drive-Printhead-Drive: The configuration shown in FIG. 117 is the same as that of FIG. 115 with the addition of the second drive shaft 486. This removes DTFP and simplifies handling of TTFP.

Figure 118:
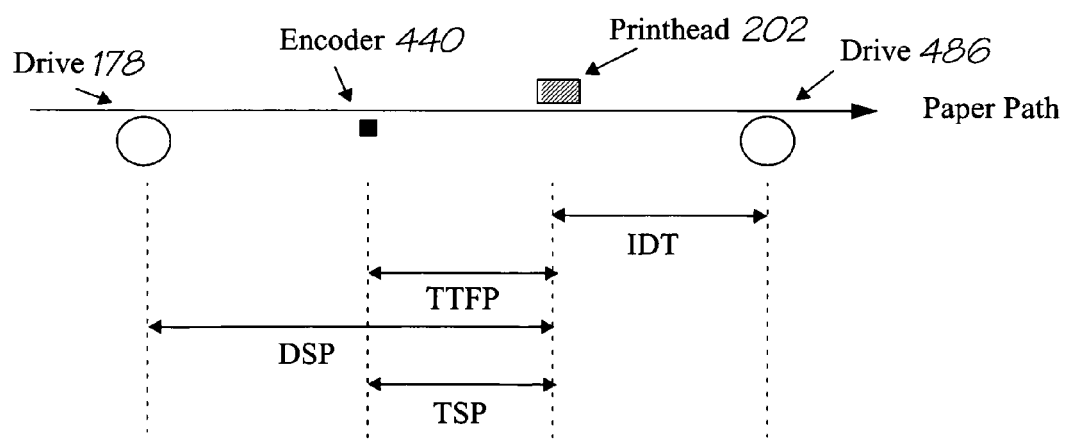
FIG. 118 is a schematic representation of an encoder-drive-printhead-drive configuration.

Encoder-Drive-Printhead-Drive: The configuration shown in FIG. 118 is the same as that of FIG. 116 with the addition of the second drive shaft 486. This removes DTFP, MCDZ and simplifies handling of TTFP.

Figure 119:
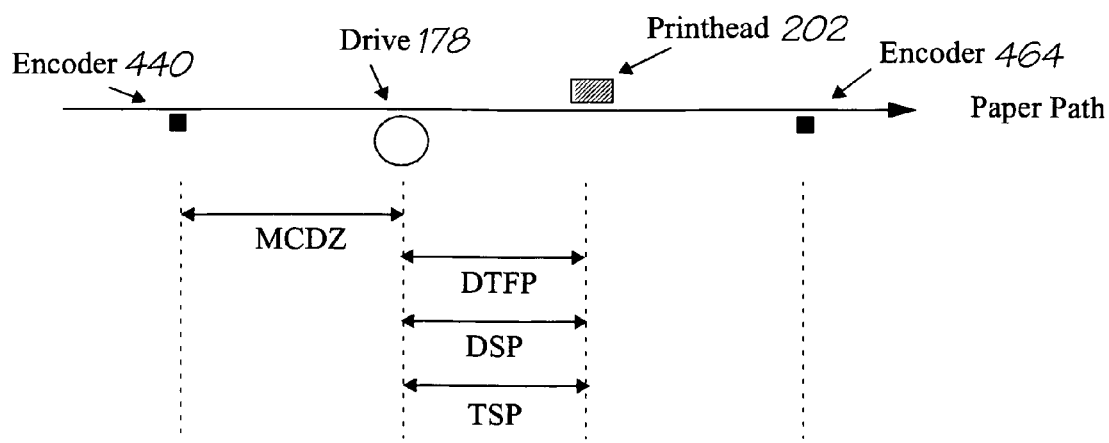
FIG. 119 is a schematic representation of an encoder-drive-printhead-encoder configuration.

Encoder-Drive-Printhead-Encoder: The configuration shown in FIG. 119 is the same as that of FIG. 115 with the addition of the second encoder 464. This removes TTFP and simplifies handling of DTFP.

Figure 120:
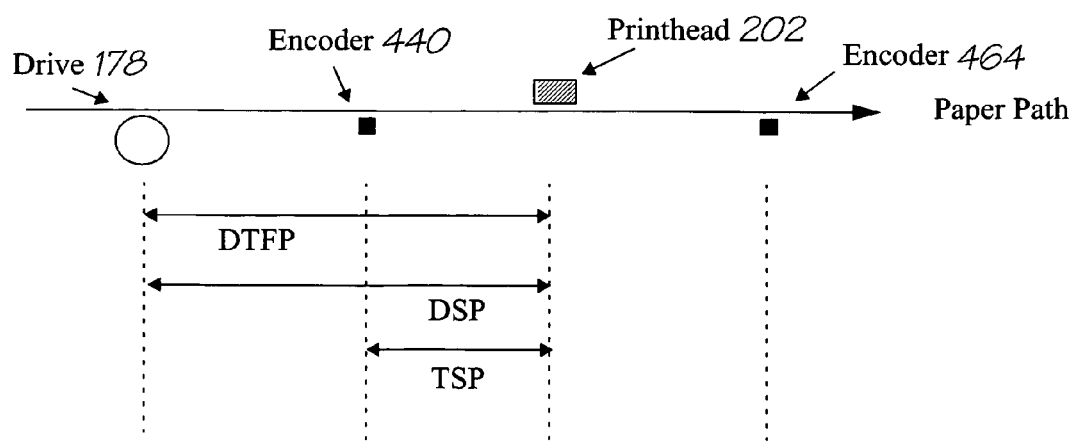
FIG. 120 is a schematic representation of a drive-encoder-printhead-drive configuration.

Drive-Encoder-Printhead-Encoder: The configuration shown in FIG. 120 is the same as that of FIG. 116 with the addition of the second encoder 464. This removes TTFP, MCDZ and simplifies handling of DTFP plus leading edge detection.

It should be noted that maximizing DSP and TSP, minimizing TTFP and DTFP, and avoiding MCDZ and IDT, are general design objectives for these configurations.

Linear Encoding

Kip is the assignee's internal name for a template for a class of robust one-dimensional optical encoding schemes for storing small quantities of digital data on physical surfaces. It optionally incorporates error correction to cope with real-world surface degradation.

A particular encoding scheme is defined by specializing the Kip template described below. Parameters include the data capacity, the clocking scheme, the physical scale, and the level of redundancy. A Kip reader is typically also specialized for a particular encoding scheme.

A Kip encoding is designed to be read via a simple optical detector during transport of the encoded medium past the detector. The encoding therefore typically runs parallel to the transport direction of the medium. For example, a Kip encoding may be read from a print medium during printing. In the preferred embodiment, Kip encoded data is provided along at least one (and preferably two or more) of the longitudinal edges of the print media to be printed in a mobile device, as described above. In the preferred form, the Kip encoded data is printed in infrared ink, rendering it invisible or at least difficult to see with the unaided eye.

A Kip encoding is typically printed onto a surface, but may be disposed on or in a surface by other means.

Summary of Kip Parameters

The following tables summarize the parameters required to specialize Kip. The parameters should be understood in the context of the entire document.

The following table summarizes framing parameters:

| parameter | units | description |
|---|---|---|
| $L_{data}$ | bits | Length of bitstream data. |

The following table summarizes clocking parameters:

| parameter | units | description |
|---|---|---|
| $b_{clock}$ | {0, 1} | Flag indicating whether the clock is implicit (0) or explicit (1). |
| $C_{clocksync}$ | clock periods | Length of clock synchronization interval required before data. |

The following table summarizes physical parameters:

| Parameter | Units | Description |
|---|---|---|
| $l_{clock}$ | mm | Length of clock period. |
| $l_{mark}$ | mm | Length of mark. |
| $l_{preamble}$ | mm | Length of preamble. Equals or exceeds decoder's uncertainty in longitudinal position of strip. |
| $w_{mintrack}$ | mm | Minimum width of track. |
| $w_{misreg}$ | mm | Maximum lateral misregistration of strip with respect to reader. |
| $\alpha$ | radians | Maximum rotation of strip with respect to reader. |

The following table summarizes error correction parameters:

| Parameter | Units | Description |
|---|---|---|
| m | bits | Size of Reed-Solomon symbol. |
| k | symbols | Size of Reed-Solomon codeword data. |
| t | symbols | Error-correcting capacity of Reed-Solomon code. |

Kip Encoding

Figure 121:
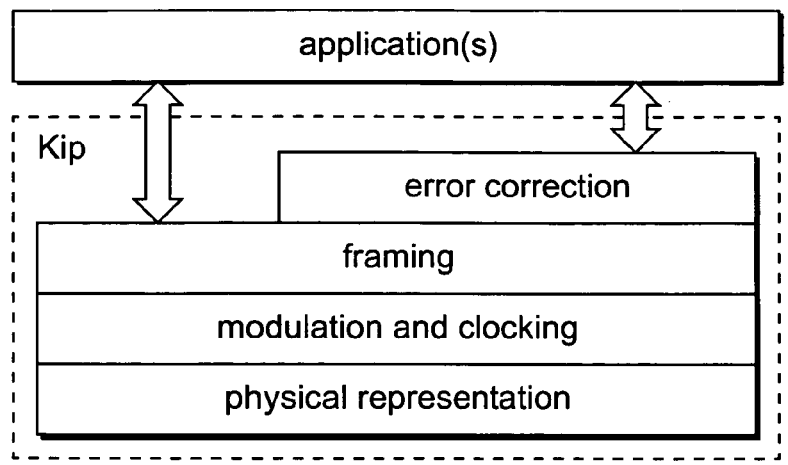
FIG. 121 is a block diagram of the Kip encoding layers.

A Kip encoding encodes a single bitstream of data, and includes a number of discrete and independent layers, as illustrated in FIG. 121. The framing layer frames the bitstream to allow synchronization and simple error detection. The modulation and clocking layer encodes the bits of the frame along with clocking information to allow bit recovery. The physical layer represents the modulated and clocked frame using optically-readable marks.

An optional error correction layer encodes the bitstream to allow error correction. An application can choose to use the error correction layer or implement its own.

A Kip encoding is designed to allow serial decoding and hence has an implied time dimension. By convention in this document the time axis points to the right. However, a particular Kip encoding may be physically represented at any orientation that suits the application.

Framing

Figure 122:
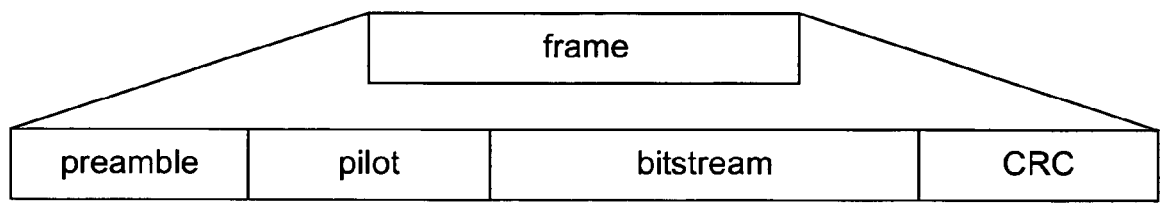
FIG. 122 is a schematic representation of the Kip frame structure.

A Kip frame consists of a preamble, a pilot, the bitstream data itself, and a cyclic redundancy check (CRC) word, as illustrated in FIG. 122.

The preamble consists of a sequence of zeros of length $L_{preamble}$. The preamble is long enough to allow the application to start the Kip decoder somewhere within the preamble, i.e. it is long enough for the application to know a priori the location of at least part of the preamble. The length of the preamble sequence in bits is therefore derived from an application-specific preamble length $l_{preamble}$ (see EQ8).

The pilot consists of a unique pattern that allows the decoder to synchronize with the frame. The pilot pattern is designed to maximize its binary Hamming distance from arbitrary shifts of itself prefixed by preamble bits. This allows the decoder to utilize a maximum-likelihood decoder to recognize the pilot, even in the presence of bit errors.

The preamble and pilot together guarantee that any bit sequence the decoder detects before it detects the pilot is maximally separated from the pilot.

The pilot sequence is 1110 1011 0110 0010. Its length $L_{pilot}$ is 16. Its minimum distance from preamble-prefixed shifts of itself is 9. It can therefore be recognized reliably in the presence of up to 4 bit errors.

The length $L_{data}$ of the bitstream is known a priori by the application and is therefore a parameter. It is not encoded in the frame. The bitstream is encoded most-significant bit first, i.e. leftmost.

The CRC (cyclic redundancy code) is a CCITT CRC-16 (known to those skilled in the art, and so not described in detail here) calculated on the bitstream data, and allows the decoder to determine if the bitstream has been corrupted.

The length $L_{CRC}$ of the CRC is 16. The CRC is calculated on the bitstream from left to right. The bitstream is padded with zero bits during calculation of the CRC to make its length an integer multiple of 8 bits. The padding is not encoded in the frame.

The length of a frame in bits is:

$$L_{frame} = L_{preamble} + L_{pilot} + L_{data} + L_{CRC} \quad\quad (EQ\ 1)$$

$$L_{frame} = L_{preamble} + L_{data} + 32 \quad\quad (EQ\ 2)$$

Modulation and Clocking

The Kip encoding modulates the frame bit sequence to produce a sequence of abstract marks and spaces. These are realized physically by the physical layer.

Figure 123:
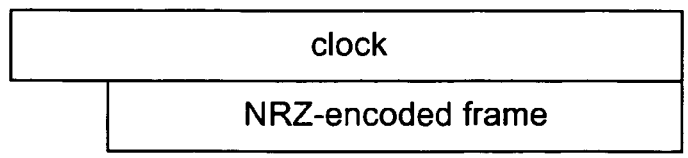
FIG. 123 is a schematic representation of an encoded frame with explicit clocking.
Figure 124:
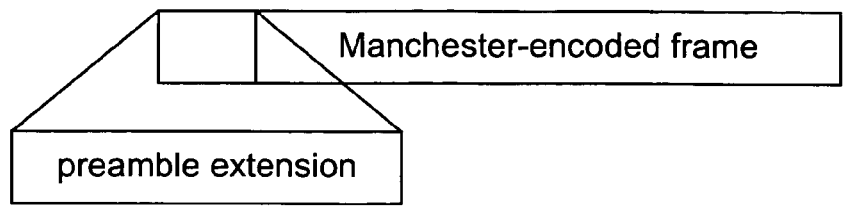
FIG. 124 is a schematic representation of an encoded frame with implicit clocking.

The Kip encoding supports both explicit and implicit clocking. When the frame is explicitly clocked, the encoding includes a separate clock sequence encoded in parallel with the frame, as illustrated in FIG. 123. The bits of the frame are then encoded using a conventional non-return-to-zero (NRZ) encoding. A zero bit is represented by a space, and a one bit is represented by a mark.

The clock itself consists of a sequence of alternating marks and spaces. The center of a clock mark is aligned with the center of a bit in the frame. The frame encodes two bits per clock period, i.e. the bitrate of the frame is twice the rate of the clock.

The clock starts a number of clock periods $C_{clocksync}$ before the start of the frame to allow the decoder to acquire clock synchronization before the start of the frame. The size of $C_{clocksync}$ depends on the characteristics of the PLL used by the decoder, and is therefore a reader-specific parameter.

When the encoding is explicitly clocked, the corresponding decoder incorporates an additional optical sensor to sense the clock.

When the frame is implicitly clocked, the bits of the frame are encoded using a Manchester phase encoding. A zero bit is represented by space-mark transition, and a one bit is represented by mark-space transition, with both transitions defined left-to-right. The Manchester phase encoding allows the decoder to extract the clock signal from the modulated frame.

In this case the preamble is extended by $C_{clocksync}$ bits to allow the decoder to acquire clock synchronization before searching for the pilot.

Assuming the same marking frequency, the bit density of the explicitly-clocked encoding is twice the bit density of the implicitly-clocked encoding.

The choice between explicit and implicit clocking depends on the application. Explicit clocking has the advantage that it provides greater longitudinal data density than implicit clocking. Implicit clocking has the advantage that it only requires a single optical sensor, while explicit clocking requires two optical sensors.

The parameter $b_{clock}$ indicates whether the clock is implicit ($b_{clock}=0$) or explicit ($b_{clock}=1$).

The length, in clock periods, of the modulated and clocked Kip frame is:

$$C_{frame} = C_{clocksync} + L_{frame}/(1+b_{clock}) \quad\quad (EQ\ 3)$$

Physical Representation

The Kip encoding represents the modulated and clocked frame physically as a strip that has both a longitudinal extent (i.e. in the coding direction) and a lateral extent.

A Kip strip always contains a data track. It also contains a clock track if it is explicitly clocked rather than implicitly clocked.

The clock period $l_{clock}$ within a Kip strip is nominally fixed, although a particular decoder will typically be able to cope with a certain amount of jitter and drift. Jitter and drift may also be introduced by the transport mechanism in a reader. The amount of jitter and drift supported by a decoder is decoder specific.

A suitable clock period depends on the characteristics of the medium and the marking mechanism, as well as on the characteristics of the reader. It is therefore an application-specific parameter.

Abstract marks and spaces have corresponding physical representations which give rise to distinct intensities when sampled by a matched optical sensor, allowing the decoder to distinguish marks and spaces. The spectral characteristics of the optical sensor, and hence the corresponding spectral characteristics of the physical marks and spaces, are application specific.

The transition time between a mark and a space is nominally zero, but is allowed to be up to 5% of the clock period.

An abstract mark is typically represented by a physical mark printed using an ink with particular absorption characteristics, such as an infrared-absorptive ink, and an abstract space is typically represented by the absence of such a physical mark, i.e. by the absorption characteristics of the substrate, such as broadband reflective (white) paper. However, Kip does not prescribe this.

The length $l_{mark}$ of a mark and length $l_{space}$ of a space are nominally the same. Suitable marks and spaces depend on the characteristics of the medium and the marking mechanism, as well as on the characteristics of the reader.

Their lengths are therefore application-specific parameters.

Figure 125:
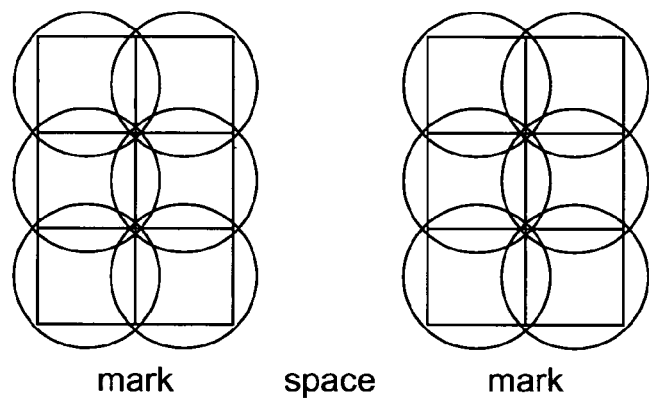
FIG. 125 shows Kip coding marks and spaces that are nominally two dots wide.

The length of a mark and the length of a space may differ by up to a factor of $((2+(\sqrt{2}-1))/(2-(\sqrt{2}-1)))$ to accommodate printing of marks at up to half the maximum dot resolution of a particular printer, as illustrated in FIG. 125. The factor may vary between unity and the limit according to vertical position, as illustrated in the figure.

The sum of the length of a mark and the length of a space equals the clock period:

$$l_{clock}=l_{mark}+l_{space} \quad (EQ\ 4)$$

The overall length of the strip is:

$$l_{strip}=l_{clock} \times C_{frame} \quad (EQ\ 5)$$

The minimum width $w_{mintrack}$ of a data track (or clock track) within a strip depends on the reader. It is therefore an application-specific parameter.

The required width $w_{track}$ of a data track (or clock track) within a strip is determined by the maximum allowable lateral misregistration $w_{misreg}$ and maximum allowable rotation α of the strip with respect to the transport path past the corresponding optical sensor:

$$w_{track}=w_{mintrack}+w_{misreg}+l_{strip}\tan\alpha \quad (EQ\ 6)$$

The maximum lateral misregistration and rotation depend on the characteristics of the medium and the marking mechanism, as well as on the characteristics of the reader. They are therefore application-specific parameters.

The width of a strip is:

$$w_{strip}=(1+b_{clock}) \times w_{track} \quad (EQ\ 7)$$

The length of the preamble sequence in bits is derived from a parameter which specifies the length of the preamble:

$$L_{preamble} = \left\lceil \frac{l_{preamble}}{l_{clock}} \right\rceil \times (1 + b_{clock}) \quad (EQ\ 8)$$

Figure 126:
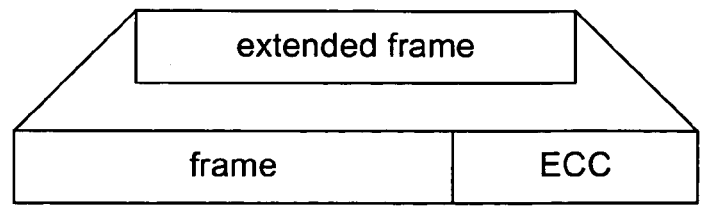
FIG. 126 is a schematic representation of the extended Kip frame structure.

Error Correction The Kip encoding optionally includes error correcting coding (ECC) information to allow the decoder to correct bitstream data corrupted by surface damage or dirt. Reed-Solomon redundancy data is appended to the frame to produce an extended frame, as illustrated in FIG. 126.

A Kip Reed-Solomon code is characterized by its symbol size m (in bits), data size k (in symbols), and error-correcting capacity t (in symbols), as described below. A Reed-Solomon code is chosen according to the size $L_{data}$ of the bitstream data and the expected bit error rate. The parameters of the code are therefore application-specific.

Redundancy data is calculated on the concatenation of the bitstream data and the CRC. This allows the CRC to be corrected as well.

The bitstream data and the CRC are padded with zero bits during calculation of the redundancy data to make their length an integer multiple of the symbol size m. The padding is not encoded in the extended frame.

A decoder verifies the CRC before performing Reed-Solomon error correction. If the CRC is valid, then error correction may potentially be skipped. If the CRC is invalid, then the decoder performs error correction. It then verifies the CRC again to check that error correction succeeded.

The length of a Reed-Solomon codeword in bits is:

$$L_{codeword}=(2t+k) \times m \quad (EQ\ 9)$$

The number of Reed-Solomon codewords is:

$$s = \frac{(L_{data} + L_{CRC}) - 1}{L_{codeword}} + 1 \quad (EQ\ 10)$$

The length of the redundancy data is:

$$L_{ECC}=s \times (2t \times m) \quad (EQ\ 11)$$

The length of an extended frame in bits is:

$$L_{extendedframe}=L_{frame}+L_{ECC} \quad (EQ\ 12)$$

Reed-Solomon Coding

A $2^m$-ary Reed-Solomon code (n, k) is characterized by its symbol size m (in bits), codeword size n (in symbols), and data size k (in symbols), where:

$$n=2^m-1 \quad (EQ\ 13)$$

The error-correcting capacity of the code is t symbols, where:

$$t = \left\lfloor \frac{n-k}{2} \right\rfloor \quad (EQ\ 14)$$

To minimize the redundancy overhead of a given error-correcting capacity, the number of redundancy symbols n−k is chosen to be even, i.e. so that:

$$2t=n-k \quad (EQ\ 15)$$

Reed-Solomon codes are well known and understood in the art of data storage, and so are not described in great detail here.

Figure 127:
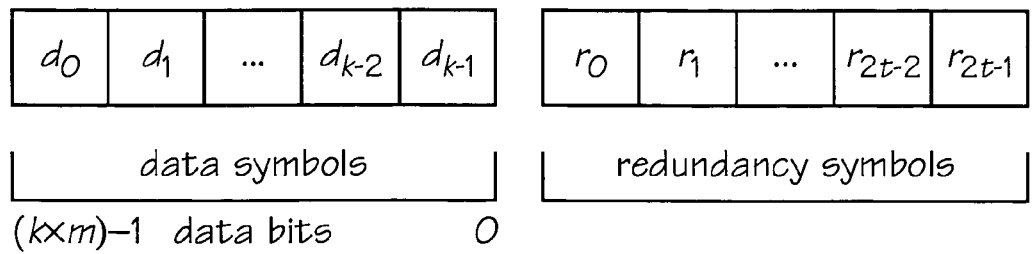
FIG. 127 shows the data symbols and the redundancy symbols of the Reed-Solomon codeword layout.

Data symbols $d_i$ and redundancy symbols $r_j$ of the code are indexed from left to right according to the power of their corresponding polynomial terms, as illustrated in FIG. 127. Note that data bits are indexed in the opposite direction, i.e. from right to left.

The data capacity of a given code may be reduced by puncturing the code, i.e. by systematically removing a subset of data symbols. Missing symbols can then be treated as erasures during decoding. In this case:

$$n=k+2t<2^m-1 \quad (EQ\ 16)$$

Longer codes and codes with greater error-correcting capacities are computationally more expensive to decode than shorter codes or codes with smaller error-correcting capacities. Where application constraints limit the complexity of the code and the required data capacity exceeds the capacity of the chosen code, multiple codewords can be used to encode the data. To maximize the codewords' resilience to burst errors, the codewords are interleaved.

To maximize the utility of the Kip encoding, the bitstream is encoded contiguously and in order within the frame. To reconcile the requirement for interleaving and the requirement for contiguity and order, the bitstream is de-interleaved for the purpose of computing the Reed-Solomon redundancy data, and is then re-interleaved before being encoded in the frame. This maintains the order and contiguity of the bitstream, and produces a separate contiguous block of interleaved redundancy data which is placed at the end of the extended frame. The Kip interleaving scheme is defined in detail below.

Kip Reed-Solomon codes have the primitive polynomials given in the following table:

| Symbol size (m) | Primitive polynomial |
|---|---|
| 3 | 1011 |
| 4 | 10011 |
| 5 | 100101 |
| 6 | 1000011 |
| 7 | 10000011 |

-continued

| Symbol size (m) | Primitive polynomial |
|---|---|
| 8 | 101110001 |
| 9 | 1000010001 |
| 10 | 10000001001 |
| 11 | 100000000101 |
| 12 | 1000001010011 |
| 13 | 10000000011011 |
| 14 | 100000001010011 |

The entries in the table indicate the coefficients of the primitive polynomial with the highest-order coefficient on the left. Thus the primitive polynomial for m=4 is:

$$p(x)=x^4+x+1 \quad \text{(EQ 17)}$$

Kip Reed-Solomon codes have the following generator polynomials:

$$g(x) = (x+\alpha)(x+\alpha^2)\ldots(x+\alpha^{2t}) = \prod_{i=1}^{2t}(x+\alpha^i) \quad \text{(EQ 18)}$$

For the purposes of interleaving, the source data D is partitioned into a sequence of m-bit symbols and padded on the right with zero bits to yield a sequence of u symbols, consisting of an integer multiple s of k symbols, where s is the number of codewords:

$$u=s\times k \quad \text{(EQ 19)}$$

$$D=\{D_0,\ldots,D_{u-1}\} \quad \text{(EQ 20)}$$

Each symbol in this sequence is then mapped to a corresponding ($i_{th}$) symbol $d_{w,i}$ of an interleaved codeword w:

$$d_{w,i}=D_{(i\times s)+w} \quad \text{(EQ 21)}$$

Figure 128:
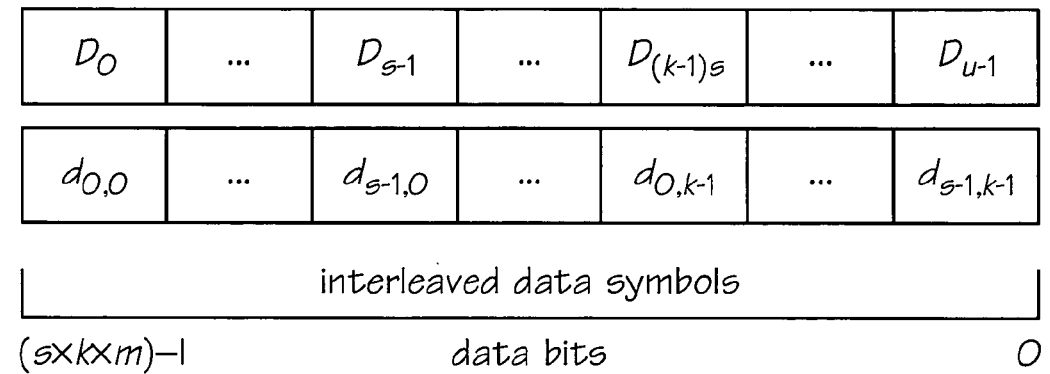
FIG. 128 shows the interleaving of the data symbols of the Reed-Solomon codewords.

The resultant interleaved data symbols are illustrated in FIG. 128. Note that this is an in situ mapping of the source data to codewords, not a re-arrangement of the source data.

Figure 129:
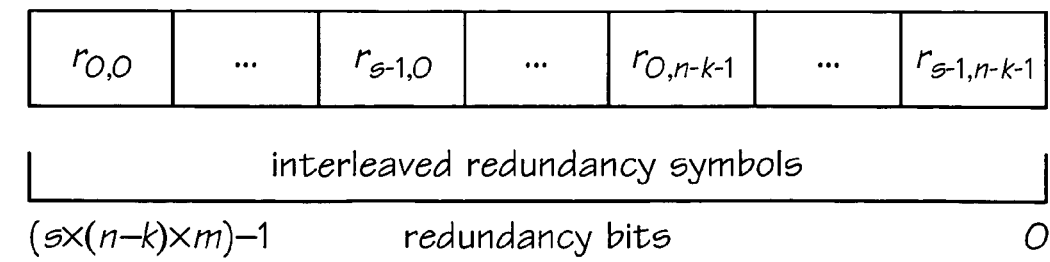
FIG. 129 shows the interleaving of the redundancy symbols of the Reed-Solomon codewords.

The symbols of each codeword are de-interleaved prior to encoding the codeword, and the resultant redundancy symbols are re-interleaved to form the redundancy block. The resultant interleaved redundancy symbols are illustrated in FIG. 129.

General Netpage Description

Netpage interactivity can be used to provide printed user interfaces to various phone functions and applications, such as enabling particular operational modes of the mobile telecommunications device or interacting with a calculator application, as well as providing general "keypad", "keyboard" and "tablet" input to the mobile telecommunications device. Such interfaces can be pre-printed and bundled with a phone, purchased separately (as a way of customizing phone operation, similar to ringtones and themes) or printed on demand where the phone incorporates a printer.

A printed Netpage business card provides a good example of how a variety of functions can be usefully combined in a single interface, including:

loading contact details into an address book
displaying a Web page
displaying an image
dialing a contact number
bringing up an e-mail, SMS or MMS form
loading location info into a navigation system
activating a promotion or special offer Any of these functions can be made single-use only.

A business card may be printed by the mobile telecommunications device user for presentation to someone else, or may be printed from a Web page relating to a business for the mobile telecommunications device user's own use. It may also be pre-printed.

As described below, the primary benefit of incorporating a Netpage pointer or pen in another device is synergy. A Netpage pointer or pen incorporated in a mobile phone, smartphone or telecommunications-enabled PDA, for example, allows the device to act as both a Netpage pointer and as a relay between the pointer and the mobile phone network and hence a Netpage server. When the pointer is used to interact with a page, the target application of the interaction can display information on the phone display and initiate further interaction with the user via the phone touchscreen. The pointer is most usefully configured so that its "nib" is in a corner of the phone body, allowing the user to easily manipulate the phone to designate a tagged surface.

The phone can incorporate a marking nib and optionally a continuous force sensor to provide full Netpage pen functionality.

An exemplary Netpage interaction will now be described to show how a sensing device in the form of a Netpage enabled mobile device interacts with the coded data on a print medium in the form of a card. Whilst in the preferred form the print medium is a card generated by the mobile device or another mobile device, it can also be a commercially pre-printed card that is purchased or otherwise provided as part of a commercial transaction. The print medium can also be a page of a book, magazine, newspaper or brochure, for example.

The mobile device senses a tag using an area image sensor and detects tag data. The mobile device uses the sensed data tag to generate interaction data, which is sent via a mobile telecommunications network to a document server. The document server uses the ID to access the document description, and interpret the interaction. In appropriate circumstances, the document server sends a corresponding message to an application server, which can then perform a corresponding action.

Typically Netpage pen and Netpage-enabled mobile device users register with a registration server, which associates the user with an identifier stored in the respective Netpage pen or Netpage enabled mobile device. By providing the sensing device identifier as part of the interaction data, this allows users to be identified, allowing transactions or the like to be performed.

Netpage documents are generated by having an ID server generate an ID which is transferred to the document server. The document server determines a document description and then records an association between the document description and the ID, to allow subsequent retrieval of the document description using the ID.

The ID is then used to generate the tag data, as will be described in more detail below, before the document is printed by a suitable printer, using the page description and the tag map.

Each tag is represented by a pattern which contains two kinds of elements. The first kind of element is a target.

Targets allow a tag to be located in an image of a coded surface, and allow the perspective distortion of the tag to be inferred. The second kind of element is a macrodot. Each macrodot encodes the value of a bit by its presence or absence.

The pattern is represented on the coded surface in such a way as to allow it to be acquired by an optical imaging system, and in particular by an optical system with a narrowband response in the near-infrared. The pattern is typically printed onto the surface using a narrowband near-infrared ink.

In the preferred embodiment, the region typically corresponds to the entire surface of an M-Print card, and the region ID corresponds to the unique M-Print card ID. For clarity in the following discussion we refer to items and IDs, with the understanding that the ID corresponds to the region ID.

The surface coding is designed so that an acquisition field of view large enough to guarantee acquisition of an entire tag is large enough to guarantee acquisition of the ID of the region containing the tag. Acquisition of the tag itself guarantees acquisition of the tag's two-dimensional position within the region, as well as other tag-specific data.

The surface coding therefore allows a sensing device to acquire a region ID and a tag position during a purely local interaction with a coded surface, e.g. during a "click" or tap on a coded surface with a pen.

Example Tag Structure

A wide range of different tag structures (as described in the assignee's various cross-referenced Netpage applications) can be used. The preferred tag will now be described in detail.

Figure 130:
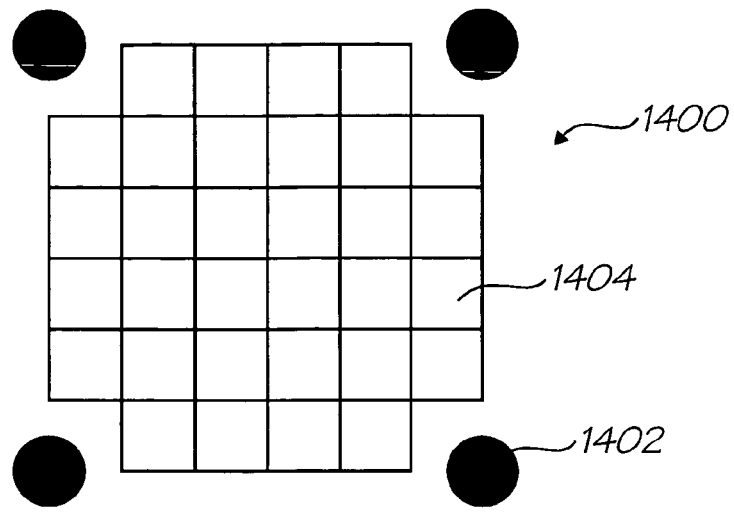
FIG. 130 shows the structure of a single Netpage tag.

FIG. 130 shows the structure of a complete tag 1400. Each of the four black circles 1402 is a target. The tag 1400, and the overall pattern, has four-fold rotational symmetry at the physical level. Each square region 1404 represents a symbol, and each symbol represents four bits of information.

Figure 131:
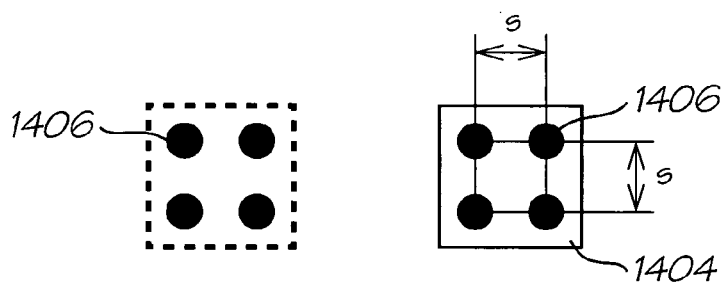
FIG. 131 shows the structure of a single symbol within a Netpage tag.

FIG. 131 shows the structure of a symbol. It contains four macrodots 1406, each of which represents the value of one bit by its presence (one) or absence (zero). The macrodot spacing is specified by the parameter s throughout this document. It has a nominal value of 143 µm, based on 9 dots printed at a pitch of 1600 dots per inch. However, it is allowed to vary by ±10% according to the capabilities of the device used to produce the pattern.

Figure 132:
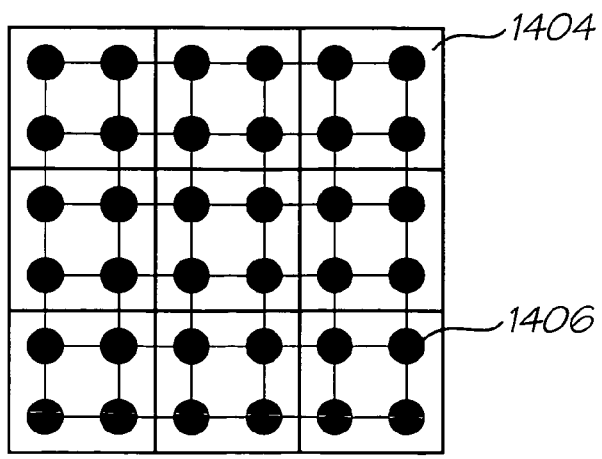
FIG. 132 shows an array of nine adjacent symbols.

FIG. 132 shows an array of nine adjacent symbols. The macrodot spacing is uniform both within and between symbols.

FIG. 133 shows the ordering of the bits within a symbol. Bit zero (b0) is the least significant within a symbol; bit three (b3) is the most significant. Note that this ordering is relative to the orientation of the symbol. The orientation of a particular symbol within the tag 1400 is indicated by the orientation of the label of the symbol in the tag diagrams. In general, the orientation of all symbols within a particular segment of the tag have the same orientation, consistent with the bottom of the symbol being closest to the centre of the tag.

Only the macrodots 1406 are part of the representation of a symbol in the pattern. The square outline 1404 of a symbol is used in this document to more clearly elucidate the structure of a tag 1400. FIG. 134, by way of illustration, shows the actual pattern of a tag 1400 with every bit set. Note that, in practice, every bit of a tag 1400 can never be set.

A macrodot 1406 is nominally circular with a nominal diameter of (5/9)s. However, it is allowed to vary in size by ±10% according to the capabilities of the device used to produce the pattern.

A target 1402 is nominally circular with a nominal diameter of (17/9)s. However, it is allowed to vary in size by ±10% according to the capabilities of the device used to produce the pattern.

The tag pattern is allowed to vary in scale by up to ±10% according to the capabilities of the device used to produce the pattern. Any deviation from the nominal scale is recorded in the tag data to allow accurate generation of position samples.

Each symbol shown in the tag structure in FIG. 130 has a unique label. Each label consists an alphabetic prefix and a numeric suffix.

Tag Group

Tags are arranged into tag groups. Each tag group contains four tags arranged in a square. Each tag therefore has one of four possible tag types according to its location within the tag group square. The tag types are labelled 00, 10, 01 and 11, as shown in FIG. 135.

Figures 136, 137:
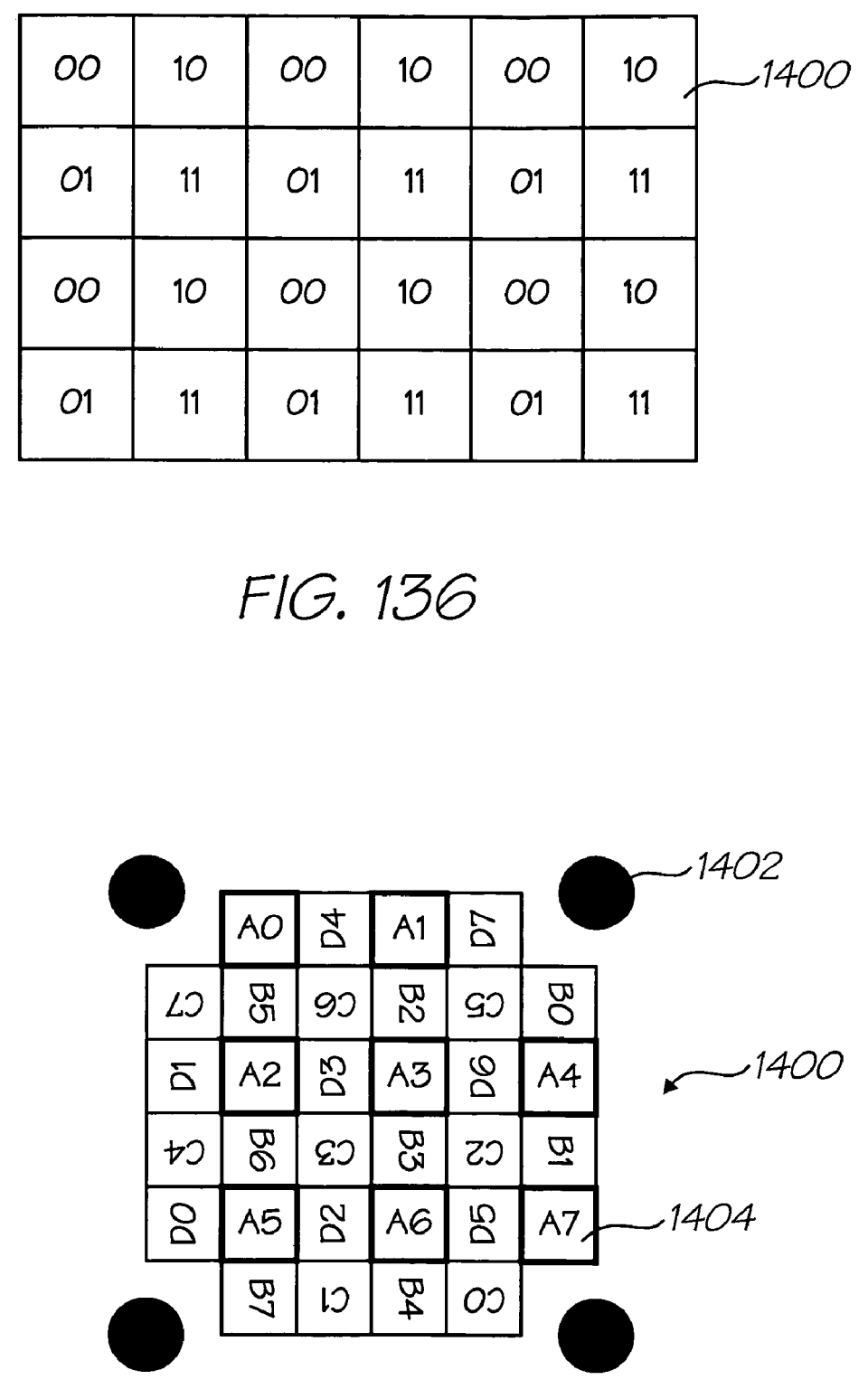

FIG. 136 shows how tag groups are repeated in a continuous tiling of tags. The tiling guarantees the any set of four adjacent tags contains one tag of each type.

Codewords

The tag contains four complete codewords. Each codeword is of a punctured $2^4$-ary (8,5) Reed-Solomon code. Two of the codewords are unique to the tag. These are referred to as local and are labelled A and B. The tag therefore encodes up to 40 bits of information unique to the tag.

The remaining two codewords are unique to a tag type, but common to all tags of the same type within a contiguous tiling of tags. These are referred to as global and are labelled C and D, subscripted by tag type. A tag group therefore encodes up to 160 bits of information common to all tag groups within a contiguous tiling of tags. The layout of the four codewords is shown in FIG. 137.

Reed-Solomon Encoding

Codewords are encoded using a punctured $2^4$-ary (8,5) Reed-Solomon code. A $2^4$-ary (8,5) Reed-Solomon code encodes 20 data bits (i.e. five 4-bit symbols) and 12 redundancy bits (i.e. three 4-bit symbols) in each codeword. Its error-detecting capacity is three symbols. Its error-correcting capacity is one symbol. More information about Reed-Solomon encoding in the Netpage context is provide in U.S. Ser. No. 10/815,647, filed on Apr. 2, 2004, the contents of which are herein incorporated by cross-reference.

Netpage in a Mobile Environment

Figure 138:
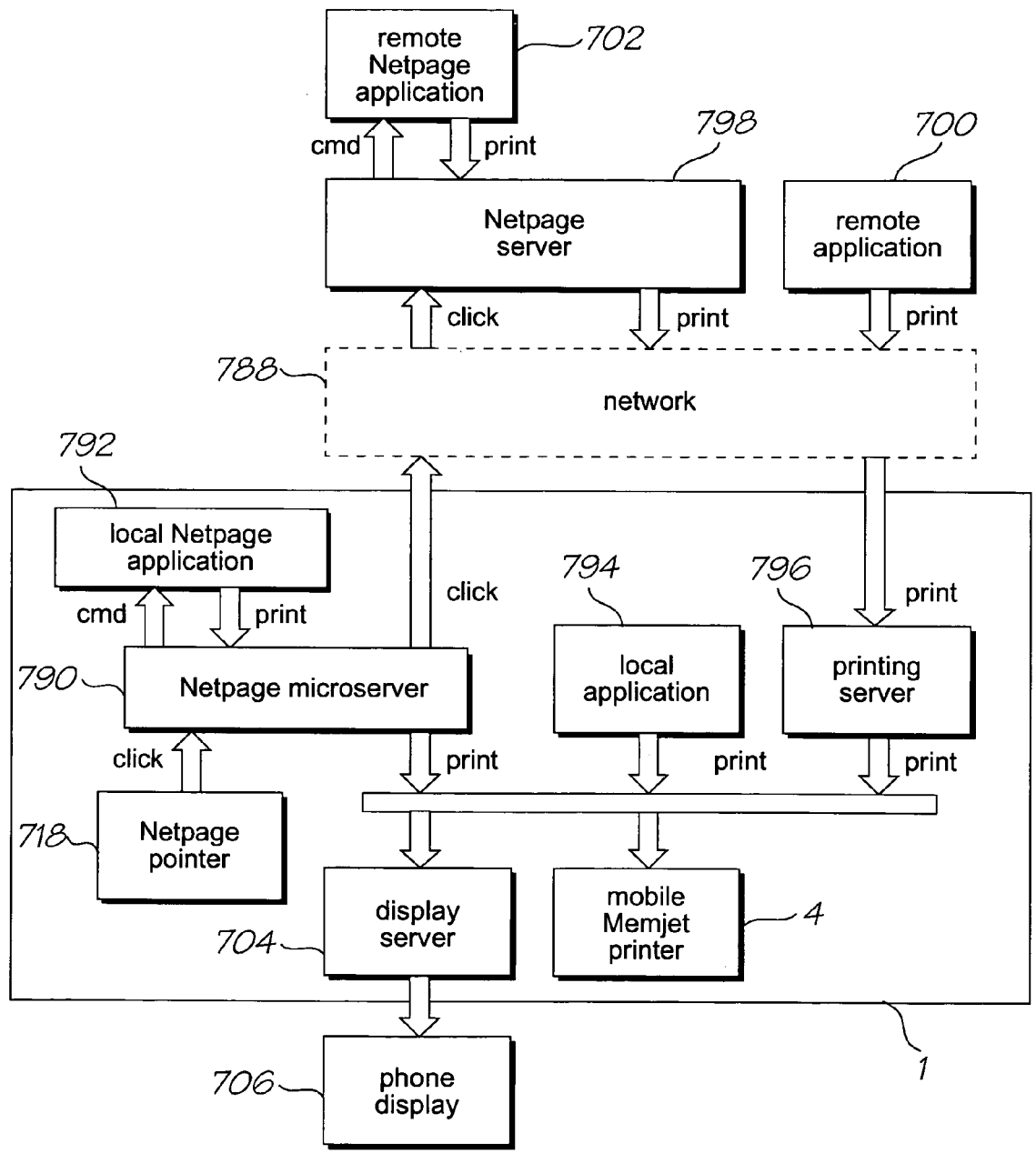

FIG. 138 provides an overview of the architecture of the Netpage system, incorporating local and remote applications and local and remote Netpage servers. The generic Netpage system is described extensively in many of the assignee's patents and co-pending applications, (such as U.S. Ser. No. 09/722,174, and so is not described in detail here. However, a number of extensions and alterations to the generic Netpage system are used as part of implementing various Netpage-based functions into a mobile device. This applies both to Netpage-related sensing of coded data on a print medium being printed (or about to be printed) and to a Netpage-enabled mobile device with or without a printer.

Referring to FIG. 138, a Netpage microserver 790 running on the mobile phone 1 provides a constrained set of Netpage functions oriented towards interpreting clicks rather than interpreting general digital ink. When the microserver 790 accepts a click event from the pointer driver 718 it interprets it in the usual Netpage way. This includes retrieving the page description associated with the click impression ID, and hit testing the click location against interactive elements in a page description. This may result in the microserver identifying a command element and sending the command to the application specified by the command element. This functionality is described in many of the earlier Netpage applications cross-referenced above.

The target application may be a local application 792 or a remote application 700 accessible via the network 788. The microserver 790 may deliver a command to a running application or may cause the application to be launched if not already running.

If the microserver 790 receives a click for an unknown impression ID, then it uses the impression ID to identify a network-based Netpage server 798 capable of handling the click, and forwards the click to that server for interpretation. The Netpage server 798 may be on a private intranet accessible to the mobile telecommunications device, or may be on the public Internet.

For a known impression ID the microserver 790 may interact directly with a remote application 700 rather than via the Netpage server 798.

In the event that the mobile device includes a printer 4, an optional printing server 796 is provided. The printing server 796 runs on the mobile phone 1 and accepts printing requests from remote applications and Netpage servers. When the printing server accepts a printing request from an untrusted application, it may require the application to present a single-use printing token previously issued by the mobile telecommunications device.

A display server 704 running on the mobile telecommunications device accepts display requests from remote applications and Netpage servers. When the display server 704 accepts a display request from an untrusted application, it may require the application to present a single-use display token previously issued by the mobile telecommunications device. The display server 704 controls the mobile telecommunications device display 750.

Figure 139:
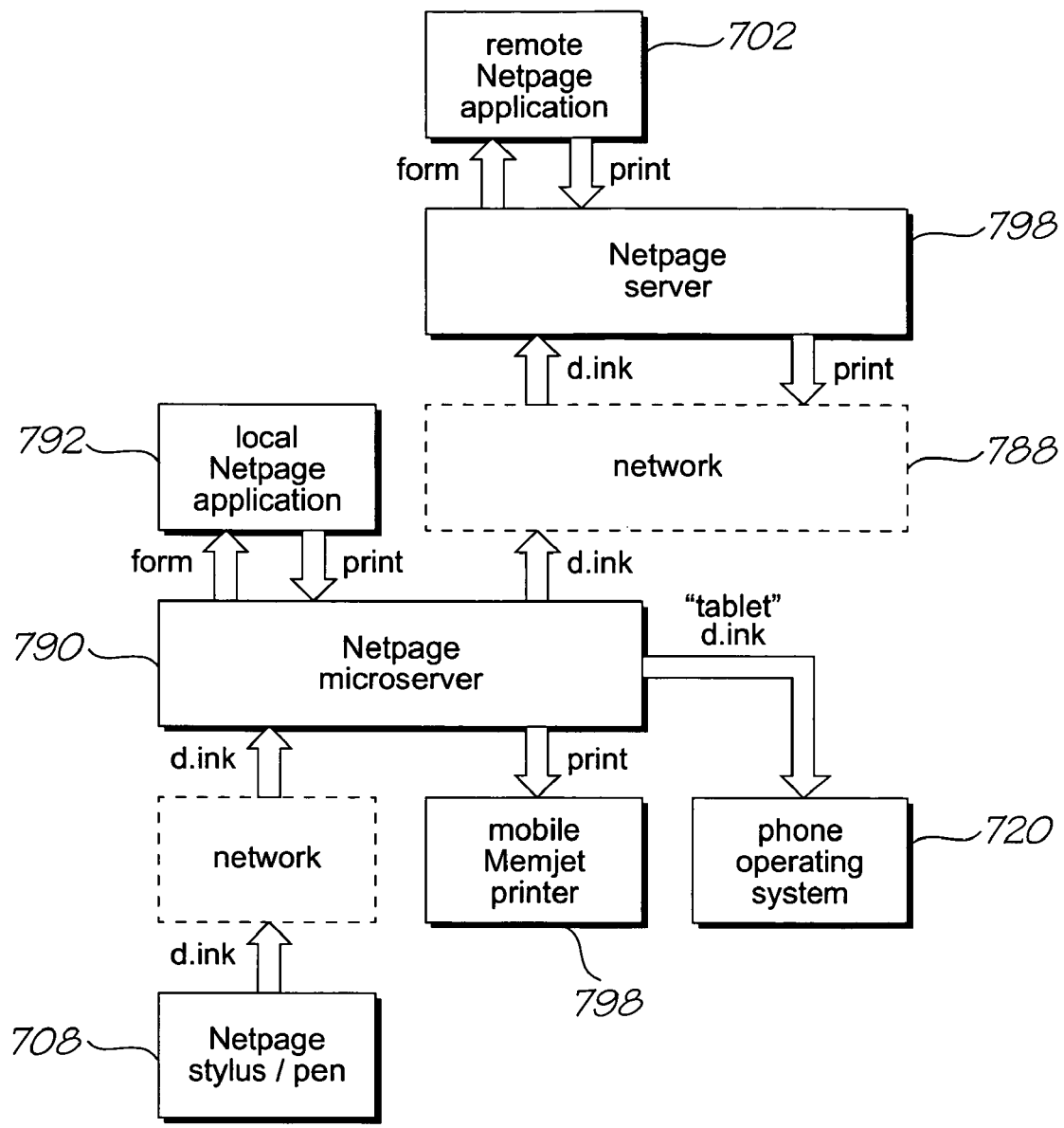

As illustrated in FIG. 139, the mobile telecommunications device may act as a relay for a Netpage stylus, pen, or other Netpage input device 708. If the microserver 790 receives digital ink for an unknown impression ID, then it uses the impression ID to identify a network-based Netpage server 798 capable of handling the digital ink, and forwards the digital ink to that server for interpretation.

Although not required to, the microserver 790 can be configured to have some capability for interpreting digital ink. For example, it may be capable of interpreting digital ink associated with checkboxes and drawings fields only, or it may be capable of performing rudimentary character recognition, or it may be capable of performing character recognition with the help of a remote server.

The microserver can also be configured to enable routing of digital ink captured via a Netpage "tablet" to the mobile telecommunications device operating system. A Netpage tablet may be a separate surface, pre-printed or printed on demand, or it may be an overlay or underlay on the mobile telecommunications device display.

The Netpage pointer incorporates the same image sensor and image processing ASIC (referred to as "Jupiter", and described in detail below) developed for and used by the Netpage pen. Jupiter responds to a contact switch by activating an illumination LED and capturing an image of a tagged surface. It then notifies the mobile telecommunications device processor of the "click". The Netpage pointer incorporates a similar optical design to the Netpage pen, but ideally with a smaller form factor. The smaller form factor is achieved with a more sophisticated multi-lens design, as described below.

Obtaining Media Information Directly from Netpage Tags

Media information can be obtained directly from the Netpage tags. It has the advantage that no data track is required, or only a minimal data track is required, since the Netpage identifier and digital signatures in particular can be obtained from the Netpage tag pattern.

The Netpage tag sensor is capable of reading a tag pattern from a snapshot image. This has the advantage that the image can be captured as the card enters the paper path, before it engages the transport mechanism, and even before the printer controller is activated, if necessary.

A Netpage tag sensor capable of reading tags as the media enters or passes through the media feed path is described in detail in the Netpage Clicker sub-section below (see FIGS. 140 and 141).

Conversely, the advantage of reading the tag pattern during transport (either during a reading phase or during the printing phase), is that the printer can obtain exact information about the lateral and longitudinal registration between the Netpage tag pattern and the visual content printed by the printer. Whilst a single captured image of a tag can be used to determine registration in either or both directions, it is preferred to determine the registration based on at least two captured images. The images can be captured sequentially by a single sensor, or two sensors can capture them simultaneously or sequentially. Various averaging approaches can be taken to determine a more accurate position in either or both direction from two or more captured images than would be available by replying on a single image.

If the tag pattern can be rotated with respect to the printhead, either due to the manufacturing tolerances of the card itself or tolerances in the paper path, it is advantageous to read the tag pattern to determine the rotation. The printer can then report the rotation to the Netpage server, which can record it and use it when it eventually interprets digital ink captured via the card. Whilst a single captured image of a tag can be used to determine the rotation, it is preferred to determine the rotation based on at least two captured images. The images can be captured sequentially by a single sensor, or two sensors can capture them simultaneously or sequentially. Various averaging approaches can be taken to determine a more accurate rotation from two or more captured images than would be available by replying on a single image.

Netpage Options

The following media coding options relate to the Netpage tags. Netpage is described in more detail in a later section.

Netpage Tag Orientation

The card can be coded to allow the printer to determine, possibly prior to commencing printing, the orientation of Netpage tags on the card in relation to the printhead. This allows the printer to rotate page graphics to match the orientation of the Netpage tags on the card, prior to commencing printing. It also allows the printer to report the orientation of the Netpage tags on the card for recording by a Netpage server.

Netpage Tag Position

If lateral and longitudinal registration and motion tracking, as discussed above, is achieved by means other than via the media coding, then any misregistration between the media coding itself and the printed content, either due to manufacturing tolerances in the card itself or due to paper path tolerances in the printer, can manifest themselves as a lateral and/or longitudinal registration error between the Netpage tags and the printed content. This in turn can lead to a degraded user experience. For example, if the zone of a hyperlink may fail to register accurately with the visual representation of the hyperlink.

As discussed above in relation to card position, the media coding can provide the basis for accurate lateral and longitudinal registration and motion tracking of the media coding itself, and the printer can report this registration to the Netpage server alongside the Netpage identifier. The Netpage server can record this registration information as a two-dimensional offset which corrects for any deviation between the nominal and actual registration, and correct any digital ink captured via the card accordingly, before interpretation.

Netpage Identity

The card can be coded to allow the printer to determine the unique 96-bit Netpage identifier of the card. This allows the printer to report the Netpage identifier of the card for recording by a Netpage server (which associates the printed graphics and input description with the identity).

The card can be coded to allow the printer to determine the unique Netpage identifier of the card from either side of the card. This allows printer designers the flexibility of reading the Netpage identifier from the most convenient side of the card.

The card can be coded to allow the printer to determine if it is an authorised Netpage card. This allows the printer to not perform the Netpage association step for an un-authorised card, effectively disabling its Netpage interactivity.

This prevents a forged card from preventing the use of a valid card with the same Netpage identifier.

The card can be coded to allow the printer to determine both the Netpage identifier and a unique digital signature associated with the Netpage identifier. This allows the printer to prevent forgery using a digital signature verification mechanism already in place for the purpose of controlling interactions with Netpage media.

Netpage Interactivity

Substantially all the front side of the card can be coded with Netpage tags to allow a Netpage sensing device to interact with the card subsequent to printing. This allows the printer to print interactive Netpage content without having to include a tag printing capability. If the back side of the card is blank and printable, then substantially the entire back side of the card can be coded with Netpage tags to allow a Netpage sensing device to interact with the card subsequent to printing. This allows the printer to print interactive Netpage content without having to include a tag printing capability.

The back side of the card can be coded with Netpage tags to allow a Netpage sensing device to interact with the card. This allows interactive Netpage content to be pre-printed on the back of the card.

Cryptography

Background

Blank media designed for use with the preferred embodiment are pre-coded to satisfy a number of requirements, supporting motion sensing and Netpage interactivity, and protecting against forgery.

The following section describes authentication mechanisms that can be used to detect and reject forged or un-coded blank media. Forged or un-coded media are hereafter referred to as invalid media.

The need for protection against invalid media derives from a number of requirements. Only genuine media are guaranteed to maximize print quality, since color management is closely tied to actual media characteristics. Rejecting invalid media therefore ensures that print quality is maximized. Conversely, print quality guarantees cannot be made for invalid media.

Netpage interactivity is a fundamental property of print media in the preferred embodiment. Rejecting invalid media ensures that Netpage interactivity is properly enabled, i.e. that a valid and unique Netpage tag pattern is always present.

Media identification and authentication can also be used to control media expiry, e.g. for quality control purposes.

A medium, once printed, can act as a secure token which provides the holder of the medium with privileged access to information associated with the medium. For example, the medium may bear a printout of a photo, and the medium may then act as a token that gives the holder access to a digital image corresponding to the photo.

This mechanisms described in this document can also be used to authenticate media as secure tokens.

Media Identifier and Digital Signatures

In the preferred embodiment, media coding includes a unique media identifier and two digital signatures associated with the media identifier. The digital signatures are described in detail below. The media identifier and the digital signatures are encoded in both the Netpage tag pattern, as described below, and in the data track, if present.

The short digital signature is a digital signature associated with the media identifier in a way known only to an authentication server. For example, the short signature may be a random number explicitly recorded by the authentication server, indexed by the media identifier. The short digital signature must therefore be authenticated by the server.

The long digital signature is a public-key digital signature of the media identifier. The media identifier is optionally padded with a random number before being signed. The public-key digital signature can be authenticated without reference to the authentication server, so long as the authenticator is in possession of the publicly-available public key associated with the media identifier. The padding can be authenticated with reference to the server, if desired.

The short and long signatures may also be used in combination.

When a blank pre-coded medium is duplicated exactly, it results in a copy which cannot be identified as a forgery per se. However, by tracking the production, movement and/or usage of media identifiers, the authentication server can detect multiple uses of the same media identifier and reject such uses as probably fraudulent. Since a forger is unable to guess valid digital signatures for novel (i.e. un-seen) media identifiers, rejection of duplicates does not penalize users of valid media.

Authentication During Printing

An M-Print printing device is configured to obtain the media identifier and one or both of the digital signatures before, during or after completion of printing. The M-Print device obtains this information from the Netpage tag pattern and/or the data track, if present.

The M-Print device can use the information to authenticate the medium. It can authenticate the media identifier and short signature by querying the authentication server, or it can authenticate the media identifier and long signature locally if it is already in possession of the appropriate public key. It can obtain a public key associated with a range of media identifiers the first time it encounters a media identifier in the range, and can then cache the public key locally for future use, indexed by range. It can flush the cache at any time to regain space, e.g. on a least-recently-used or least-frequently-used basis. It can obtain the public key from the authentication server itself or from any other trusted source.

If the M-Print device is unable to authenticate the medium before or during printing, then it can abort printing to prevent use of the medium. If it is only able to authenticate the medium after printing, then it can still provide the user with feedback indicating that the medium is a forgery.

If the M-Print device fails to obtain coded information from the medium at all, then it can abort printing and/or signal to the user that the medium is invalid.

If the source of printed content is network-based, and the M-Print device itself is not trusted, then the server which is providing the printed content can predicate delivery of that content on media authentication. I.e. the medium itself can act as a secure token for enabling printing.

Authentication During Netpage Interaction

A Netpage pointing device (such as an M-Print device incorporating a Netpage pointer), when tapped on (or swiped over) a Netpage-enabled medium such as a printed M-Print medium, is configured to obtain the media identifier and one or both of the digital signatures from the Netpage tag pattern.

The device is thereby able to authenticate the medium, using the mechanisms described earlier, should it need to do so.

More importantly, it is able to prove to a Netpage server that it is being used to interact with a valid medium by providing the server with a copy of the media identifier and one or both of the digital signatures (or fragments thereof). The server is thereby able to authenticate the medium, and is therefore able to reject attempted interactions with an invalid medium. For example, it is able to reject an attempt to download the digital image associated with a printed photo, preventing fraudulent access to photo images based on merely guessing valid media identifiers.

A medium, once printed, can act as a secure token which provides the holder of the medium with privileged access to information associated with the medium. For example, the medium may bear a printout of a photo, and the medium may then act as a token that gives the holder access to a digital image corresponding to the photo.

This mechanisms described in this document can also be used to authenticate media as secure tokens.

Security in M-Print in Mobile Netpage Contexts

As described above, authentication relies on verifying the correspondence between data and a signature of that data.

The greater the difficulty in forging a signature, the greater the trustworthiness of signature-based authentication.

The Netpage ID is unique and therefore provides a basis for a signature. If online authentication access is assumed, then the signature may simply be a random number associated with the ID in an authentication database accessible to the trusted online authenticator. The random number may be generated by any suitable method, such as via a deterministic (pseudo-random) algorithm, or via a stochastic physical process. A keyed hash or encrypted hash may be preferable to a random number since it requires no additional space in the authentication database. However, a random signature of the same length as a keyed signature is more secure than the keyed signature since it is not susceptible to key attacks. Equivalently, a shorter random signature confers the same security as a longer keyed signature.

In the limit case no signature is actually required, since the mere presence of the ID in the database indicates authenticity. However, the use of a signature limits a forger to forging items he has actually sighted.

To prevent forgery of a signature for an unsighted ID, the signature must be large enough to make exhaustive search via repeated accesses to the online authenticator intractable. If the signature is generated using a key rather than randomly, then its length must also be large enough to prevent the forger from deducing the key from known ID-signature pairs. Signatures of a few hundred bits are considered secure, whether generated using private or secret keys.

While it may be practical to include a reasonably secure random signature in a tag (or local tag group), particularly if the length of the ID is reduced to provide more space for the signature, it may be impractical to include a secure ID-derived signature in a tag. To support a secure ID-derived signature, we can instead distribute fragments of the signature across multiple tags. If each fragment can be verified in isolation against the ID, then the goal of supporting authentication without increasing the sensing device field of view is achieved. The security of the signature can still derive from the full length of the signature rather than from the length of a fragment, since a forger cannot predict which fragment a user will randomly choose to verify. A trusted authenticator can always perform fragment verification since they have access to the key and/or the full stored signature, so fragment verification is always possible when online access to a trusted authenticator is available.

Fragment verification requires that we prevent brute force attacks on individual fragments, otherwise a forger can determine the entire signature by attacking each fragment in turn. A brute force attack can be prevented by throttling the authenticator on a per-ID basis. However, if fragments are short, then extreme throttling is required. As an alternative to throttling the authenticator, the authenticator can instead enforce a limit on the number of verification requests it is willing to respond to for a given fragment number. Even if the limit is made quite small, it is unlikely that a normal user will exhaust it for a given fragment, since there will be many fragments available and the actual fragment chosen by the user can vary. Even a limit of one can be practical. More generally, the limit should be proportional to the size of the fragment, i.e. the smaller the fragment the smaller the limit. Thus the experience of the user would be somewhat invariant of fragment size. Both throttling and enforcing fragment verification limits imply serialisation of requests to the authenticator. A fragment verification limit need only be imposed once verification fails, i.e. an unlimited number of successful verifications can occur before the first failure. Enforcing fragment verification limits further requires the authenticator to maintain a per-fragment count of satisfied verification requests.

A brute force attack can also be prevented by concatenating the fragment with a random signature encoded in the tag. While the random signature can be thought of as protecting the fragment, the fragment can also be thought of as simply increasing the length of the random signature and hence increasing its security. A fragment verification limit can make verification subject to a denial of service attack, where an attacker deliberately exceeds the limit with invalid verification request in order to prevent further verification of the ID in question. This can be prevented by only enforcing the fragment verification limit for a fragment when the accompanying random signature is correct.

Fragment verification may be made more secure by requiring the verification of a minimum number of fragments simultaneously.

Fragment verification requires fragment identification. Fragments may be explicitly numbered, or may more economically be identified by the two-dimensional coordinate of their tag, modulo the repetition of the signature across a continuous tiling of tags.

The limited length of the ID itself introduces a further vulnerability. Ideally it should be at least a few hundred bits.

In the Netpage surface coding scheme it is 96 bits or less. To overcome this, the ID may be padded. For this to be effective the padding must be variable, i.e. it must vary from one ID to the next. Ideally the padding is simply a random number, and must then be stored in the authentication database indexed by ID. If the padding is deterministically generated from the ID then it is worthless.

Offline authentication of secret-key signatures requires the use of a trusted offline authentication device. The QA chip (which is the subject of a number of US patents, including U.S. Pat. Nos. 6,566,858, 6,331,946, 6,246,970, and 6,442,525, all filed on Jun. 8, 1998 provides the basis for such a device, although of limited capacity. The QA chip can be programmed to verify a signature using a secret key securely held in its internal memory. In this scenario, however, it is impractical to support per-ID padding, and it is impractical even to support more than a very few secret keys. Furthermore, a QA chip programmed in this manner is susceptible to a chosen-message attack. These constraints limit the applicability of a QA-chip-based trusted offline authentication device to niche applications.

In general, despite the claimed security of any particular trusted offline authentication device, creators of secure items are likely to be reluctant to entrust their secret signature keys to such devices, and this is again likely to limit the applicability of such devices to niche applications (although such niche applications are still important).

By contrast, offline authentication of public-key signatures (i.e. generated using the corresponding private keys) is highly practical. An offline authentication device utilising public keys can trivially hold any number of public keys, and may be designed to retrieve additional public keys on demand, via a transient online connection, when it encounters an ID for which it knows it has no corresponding public signature key. Untrusted offline authentication is likely to be attractive to most creators of secure items, since they are able to retain exclusive control of their private signature keys.

A disadvantage of offline authentication of a public-key signature is that the entire signature must be acquired from the coding, which is at odds with the general desire to support authentication with a minimal field of view. A corresponding advantage of offline authentication of a public-key signature is that access to the ID padding is no longer required, since decryption of the signature using the public signature key generates both the ID and its padding, and the padding can then be ignored. A forger can not take advantage of the fact that the padding is ignored during offline authentication, since the padding is not ignored during online authentication.

Acquisition of an entire distributed signature is not particularly onerous. Any random or linear swipe of a hand-held sensing device across a coded surface allows it to quickly acquire all of the fragments of the signature. The sensing device can easily be programmed to signal the user when it has acquired a full set of fragments and has completed authentication. The device may be programmed to only perform authentication when the tags indicate the presence of a signature.

The need for swiping is of less concern in the context of authenticating a print medium prior to or during printing with the preferred embodiment of a mobile device incorporating a printer. In the preferred form, the print medium is inserted into a media feed path for printing. Either during this insertion, or subsequently while the print medium is being moved by the device's drive mechanism, a sensing device can read a series of tags sufficient to obtain all the required signature fragments.

Although the use of authentication has been described with reference to Netpage tags, similar principles can be applied to the linear encoding scheme (or any other encoding scheme) used to encode data on pre-printed print media.

Note that a public-key signature may be authenticated online via any of its fragments in the same way as any signature, whether generated randomly or using a secret key. The trusted online authenticator may generate the signature on demand using the private key and ID padding, or may store the signature explicitly in the authentication database. The latter approach obviates the need to store the ID padding.

Note also that signature-based authentication may be used in place of fragment-based authentication even when online access to a trusted authenticator is available.

Table 13 provides a summary of which signature schemes are workable using the coded data structures in the preferred encoding scheme. It will be appreciated that these limitations do not apply to all encoding schemes that can be used with the invention.

| Encoding in tags | Acquisition from tags | Signature generation | Online authentication | Offline authentication |
| --- | --- | --- | --- | --- |
| Local | full | random | ok | Impractical to store per ID information |
| | | secret key | Signature too short to be secure | Undesirable to store secret keys |
| | | private key | Signature too short to be secure | |
| Distributed | fragment(s) | random | ok | impractical[b] |
| | | secret key | ok | impractical[c] |
| | | private key | ok | impractical[b] |
| | full | random | ok | impractical[b] |
| | | secret key | ok | impractical[c] |
| | | private key | ok | ok |

Key:
a: It is impractical to store per-ID information in the offline authentication device
[b]The signature is too short to be secure.
[c]It is undesirable to store secret keys in the offline authentication device.

Cryptographic Algorithms

When the public-key signature is authenticated offline, the user's authentication device typically does not have access to the padding used when the signature was originally generated. The signature verification step must therefore decrypt the signature to allow the authentication device to compare the ID in the signature with the ID acquired from the tags. This precludes the use of algorithms which don't perform the signature verification step by decrypting the signature, such as the standard Digital Signature Algorithm U.S. Department of Commerce/National Institute of Standards and Technology, Digital Signature Standard (DSS), FIPS 186-2, 27 Jan. 2000.

RSA encryption is described in:
  Rivest, R. L., A. Shamir, and L. Adleman, "A Method for Obtaining Digital Signatures and Public-Key Cryptosystems", Communications of the ACM, Vol. 21, No.2, Feb. 1978, pp. 120-126
  Rivest, R. L., A. Shamir, and L. M. Adleman, "Cryptographic communications system and method", U.S. Pat. No. 4,405,829, issued 20 Sep. 1983
  RSA Laboratories, PKCS #1 v2.0: RSA Encryption Standard, Oct. 1, 1998.

RSA provides a suitable public-key digital signature algorithm that decrypts the signature. RSA provides the basis for the ANSI X9.31 digital signature standard American National Standards Institute, ANSI X9.31-1998, Digital Signatures Using Reversible Public Key Cryptography for the Financial Services Industry (rDSA), Sep. 8, 1998. If no padding is used, then any public-key signature algorithm can be used.

In the preferred Netpage surface coding scheme the ID is 96 bits long or less. It is padded to 160 bits prior to being signed.

The padding is ideally generated using a truly random process, such as a quantum process, or by distilling randomness from random events. For more information on these issues, see Schneier, B., Applied Cryptography, Second Edition, John Wiley & Sons 1996.

In the preferred Netpage surface coding scheme the random signature, or secret, is 36 bits long or less. It is also ideally generated using a truly random process. If a longer random signature is required, then the length of the ID in the surface coding can be reduced to provide additional space for the signature.

Authentication

Each object ID has a signature. Limited space within the preferred tag structure makes it impractical to include a full cryptographic signature in a tag so signature fragments are distributed across multiple tags. A smaller random signature, or secret, can be included in a tag.

To avoid any vulnerability due to the limited length of the object ID, the object ID is padded, ideally with a random number. The padding is stored in an authentication database indexed by object ID. The authentication database may be managed by the manufacturer, or it may be managed by a third-party trusted authenticator.

Each tag contains a signature fragment and each fragment (or a subset of fragments) can be verified, in isolation, against the object ID. The security of the signature still derives from the full length of the signature rather than from the length of the fragment, since a forger cannot predict which fragment a user will randomly choose to verify.

Fragment verification requires fragment identification. Fragments may be explicitly numbered, or may by identified by the two-dimensional coordinate of their tag, modulo the repetition of the signature across continuous tiling of tags.

Note that a trusted authenticator can always perform fragment verification, so fragment verification is always possible when on-line access to a trusted authenticator is available.

Off-Line Public-Key-Based Authentication

An off-line authentication device utilises public-key signatures. The authentication device holds a number of public keys. The device may, optionally, retrieve additional public keys on demand, via a transient on-line connection when it encounters an object ID for which it has no corresponding public key signature.

For off-line authentication, the entire signature is needed. The authentication device is swiped over the tagged surface and a number of tags are read. From this, the object ID is acquired, as well as a number of signature fragments and their positions. The signature is then generated from these signature fragments. The public key is looked up, from the scanning device using the object ID. The signature is then decrypted using the public key, to give an object ID and padding. If the object ID obtained from the signature matches the object ID in the tag then the object is considered authentic.

The off-line authentication method can also be used on-line, with the trusted authenticator playing the role of authenticator.

On-Line Public-Key-Based Authentication

An on-line authentication device uses a trusted authenticator to verify the authenticity of an object. For on-line authentication a single tag can be all that is required to perform authentication. The authentication device scans the object and acquires one or more tags. From this, the object ID is acquired, as well as at least one signature fragment and its position. The fragment number is generated from the fragment position. The appropriate trusted authenticator is looked up by the object ID. The object ID, signature fragment, and fragment number are sent to the trusted authenticator.

The trusted authenticator receives the data and retrieves the signature from the authentication database by object ID. This signature is compared with the supplied fragment, and the authentication result is reported to the user.

On-Line Secret-Based Authentication

Alternatively or additionally, if a random signature or secret is included in each tag (or tag group), then this can be verified with reference to a copy of the secret accessible to a trusted authenticator. Database setup then includes allocating a secret for each object, and storing it in the authentication database, indexed by object ID.

The authentication device scans the object and acquires one or more tags. From this, the object ID is acquired, as well as the secret. The appropriate trusted authenticator is looked up by the object ID. The object ID and secret are sent to the trusted authenticator.

The trusted authenticator receives the data and retrieves the secret from the authentication database by object ID. This secret is compared with the supplied secret, and the authentication result is reported to the user.

Secret-based authentication can be used in conjunction with on-line fragment-based authentication is discussed in more detail above.

Netpage Clicker

Figure 140:
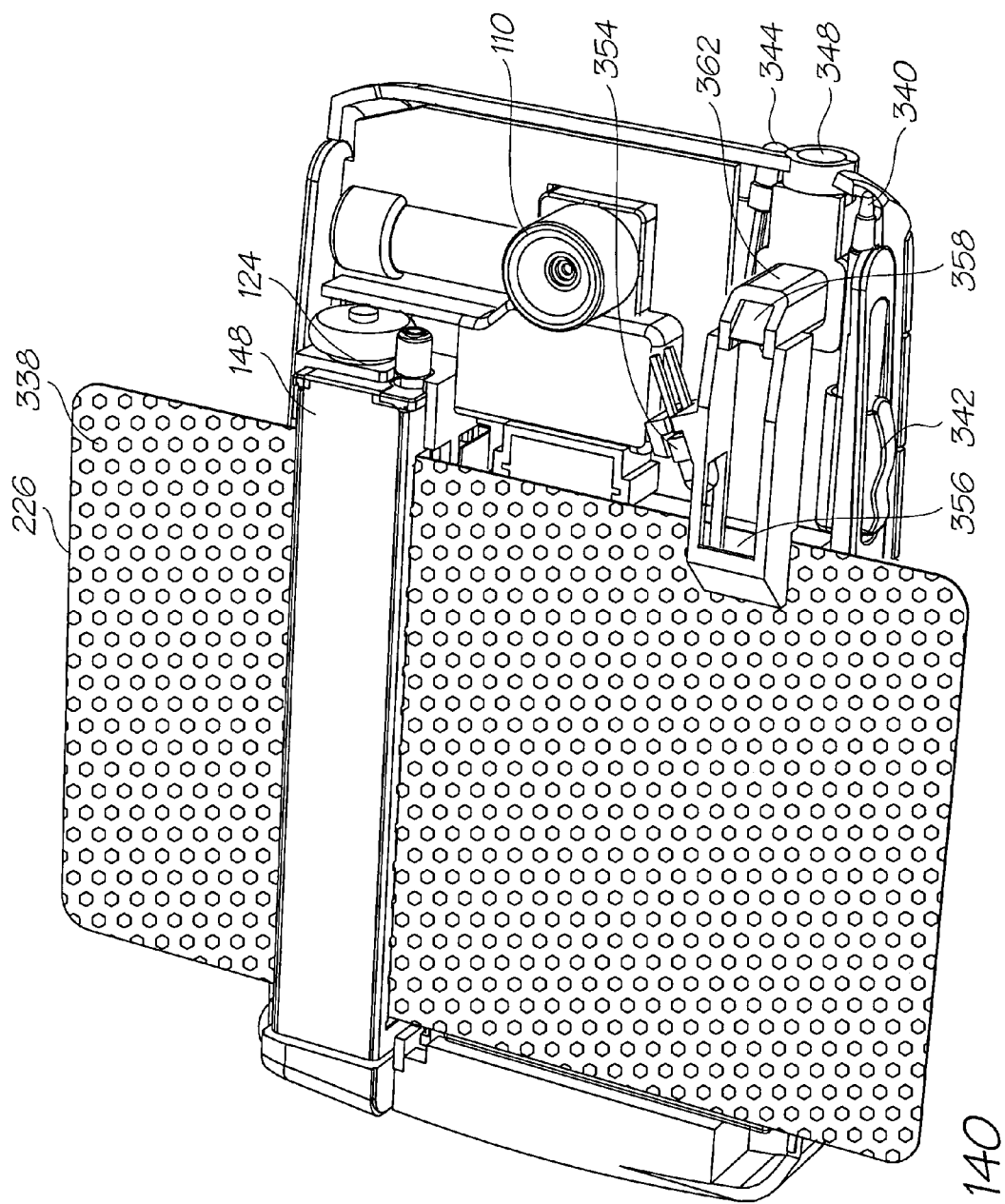
Figure 141:
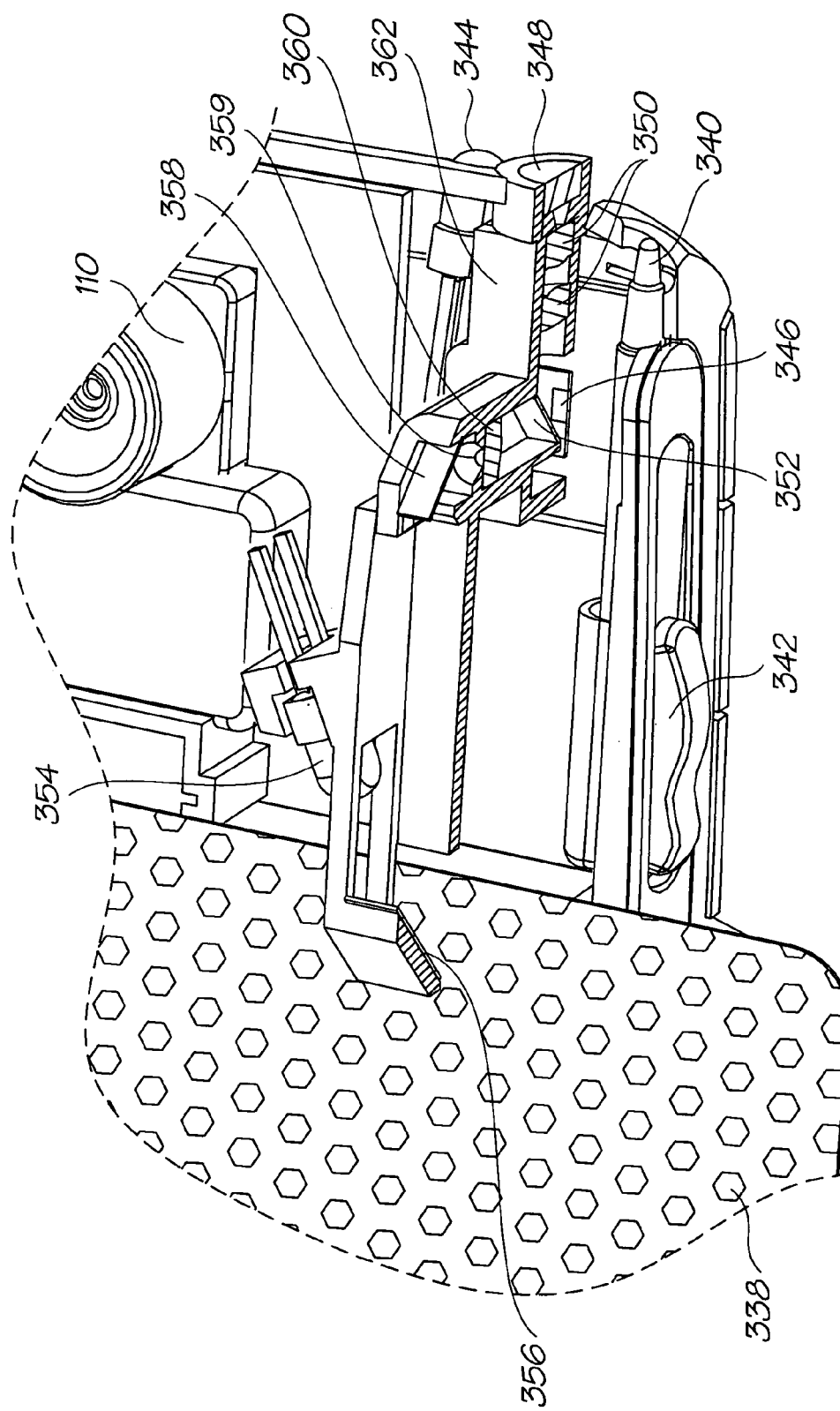

An alternative embodiment of the invention is shown in FIGS. 140 and 141, in which the mobile device includes a Netpage clicker module 362. This embodiment includes a printer and uses a dual optical pathway arrangement to sense coded data from media outside the mobile device as well as coded data pre-printed on media as it passes through the device for printing.

The Netpage clicker in the preferred embodiment forms part of a dual optical path Netpage sensing device. The first path is used in the Netpage clicker, and the second operates to read coded data from the card as it enters the mobile telecommunications device for printing. As described below, the coded data on the card is read to ensure that the card is of the correct type and quality to enable printing.

The Netpage clicker includes a non-marking nib 340 that exits the top of the mobile telecommunications device.

The nib 340 is slidably mounted to be selectively moveable between a retracted position, and an extended position by manual operation of a slider 342. The slider 342 is biased outwardly from the mobile telecommunications device, and includes a ratchet mechanism (not shown) for retaining the nib 340 in the extended position. To retract the nib 340, the user depresses the slider 342, which disengages the ratchet mechanism and enables the nib 340 to return to the retracted position. One end of the nib abuts a switch (not shown), which is operatively connected to circuitry on the PCB.

Working from one end of the first optical path to the other, a first infrared LED 344 is mounted to direct infrared light out of the mobile device via an aperture to illuminate an adjacent surface (not shown). Light reflected from the surface passes through an infrared filter 348, which improves the signal to noise ratio of the reflected light by removing most non-infrared ambient light. The reflected light is focused via a pair of lenses 350 and then strikes a plate beam splitter 352. It will be appreciated that the beam splitter 352 can include one or more thin-film optical coatings to improve its performance.

A substantial portion of the light is deflected downwardly by the plate splitter and lands on an image sensor 346 that is mounted on the PCB. The image sensor 346 in the preferred embodiment takes the form of the Jupiter image sensor and processor described in detail below. It will be appreciated that a variety of commercially available CCD and CMOS image sensors would also be suitable.

The particular position of the nib, and orientation and position of the first optical path within the casing enables a user to interact with Netpage interactive documents as described elsewhere in the detailed description. These Netpage documents can include media printed by the mobile device itself, as well as other media such as preprinted pages in books, magazines, newspapers and the like.

The second optical path starts with a second infrared LED 354, which is mounted to shine light onto a surface of a card 226 when it is inserted in the mobile telecommunications device for printing. The light is reflected from the card 226, and is turned along the optical path by a first turning mirror 356 and a second turning mirror 358. The light then passes through an aperture 359 a lens 360 and the beam splitter 352 and lands on the image sensor 346.

The mobile device is configured such that both LEDs 344 and 354 turned off when a card is not being printed and the nib is not being used to sense coded data on an external surface. However, once the nib is extended and pressed onto a surface with sufficient force to close the switch, the LED 344 is illuminated and the image sensor 346 commences capturing images.

Although a non-marking nib has been described, a marking nib, such as a ballpoint or felt-tip pen, can also be used. Where a marking nib is used, it is particularly preferable to provide the retraction mechanism to allow the nib to selectively be withdrawn into the casing. Alternatively, the nib can be fixed (ie, no retraction mechanism is provided).

In other embodiments, the switch is simply omitted (and the device operates continuously, preferably only when placed into a capture mode) or replaced with some other form of pressure sensor, such as a piezo-electric or semiconductor-based transducer. In one form, a multi-level or continuous pressure sensor is utilized, which enables capture of the actual force of the nib against the writing surface during writing. This information can be included with the position information that comprises the digital ink generated by the device, which can be used in a manner described in detail in many of the assignee's cross-referenced Netpage-related applications. However, this is an optional capability.

It will be appreciated that in other embodiments a simple Netpage sensing device can also be included in a mobile device that does not incorporate a printer. FIGS. 85 to 87 shows an example of such a clicker, albeit in the context of a mobile device having a printer. It will be appreciated that in the embodiment of FIGS. 85 to 87, the Netpage clicker is entirely concerned with sensing coded data from external Netpage documents.

In other embodiments, one or more of the turning mirrors can be replaced with one or more prisms that rely on boundary reflection or silvered (or half silvered) surfaces to change the course of light through the first or second optical paths. It is also possible to omit either of the first or second optical paths, with corresponding removal of the capabilities offered by those paths.

Image Sensor and Associated Processing Circuitry

In the preferred embodiment, the Netpage sensor is a monolithic integrated circuit that includes an image sensor, analog to digital converter (ADC), image processor and interface, which are configured to operate within a system including a host processor. The applicants have codenamed the monolithic integrated circuit "Jupiter". The image sensor and ADC are codenamed "Ganymede" and the image processor and interface are codenamed "Callisto".

In a preferred embodiment of the invention, the image sensor is incorporated in a Jupiter image sensor as described in co-pending application U.S. Ser. No. 10/778,056, filed on Feb. 17, 2004, the contents of which are incorporated herein by cross-reference.

Various alternative pixel designs suitable for incorporation in the Jupiter image sensor are described in PCT application PCT/AU/02/01573 entitled "Active Pixel Sensor", filed 22 Nov. 2002; and PCT application PCT/AU02/01572 entitled "Sensing Device with Ambient Light Minimisation", filed 22 Nov. 2002; the contents of which are incorporated herein by cross reference.

It should appreciated that the aggregation of particular components into functional or codenamed blocks is not necessarily an indication that such physical or even logical aggregation in hardware is necessary for the functioning of the present invention. Rather, the grouping of particular units into functional blocks is a matter of design convenience in the particular preferred embodiment that is described. The intended scope of the present invention embodied in the detailed description should be read as broadly as a reasonable interpretation of the appended claims allows.

Image Sensor

Jupiter comprises an image sensor array, ADC (Analog to Digital Conversion) function, timing and control logic, digital interface to an external microcontroller, and implementation of some of the computational steps of machine vision algorithms.

Figure 142:
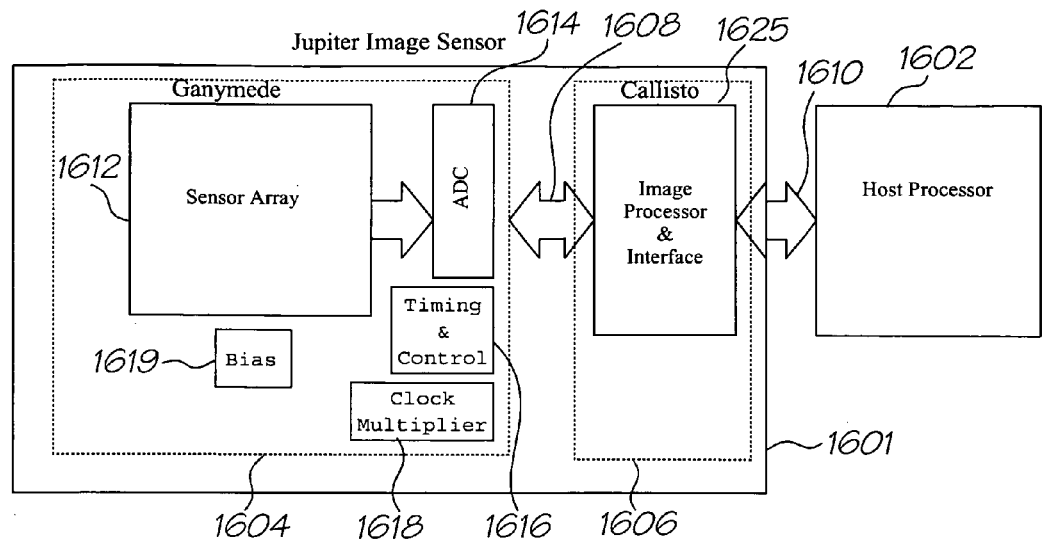

FIG. 142 shows a system-level diagram of the Jupiter monolithic integrated circuit 1601 and its relationship with a host processor 1602. Jupiter 1601 has two main functional blocks: Ganymede 1604 and Callisto 1606. As described below, Ganymede comprises a sensor array 1612, ADC 1614, timing and control logic 1616, clock multiplier PLL 1618, and bias control 1619. Callisto comprises the image processing, image buffer memory, and serial interface to a host processor. A parallel interface 1608 links Ganymede 4 with Callisto 6, and a serial interface 1610 links Callisto 1606 with the host processor 2.

The internal interfaces in Jupiter are used for communication among the different internal modules.

Ganymede Image Sensor

Figure 143:
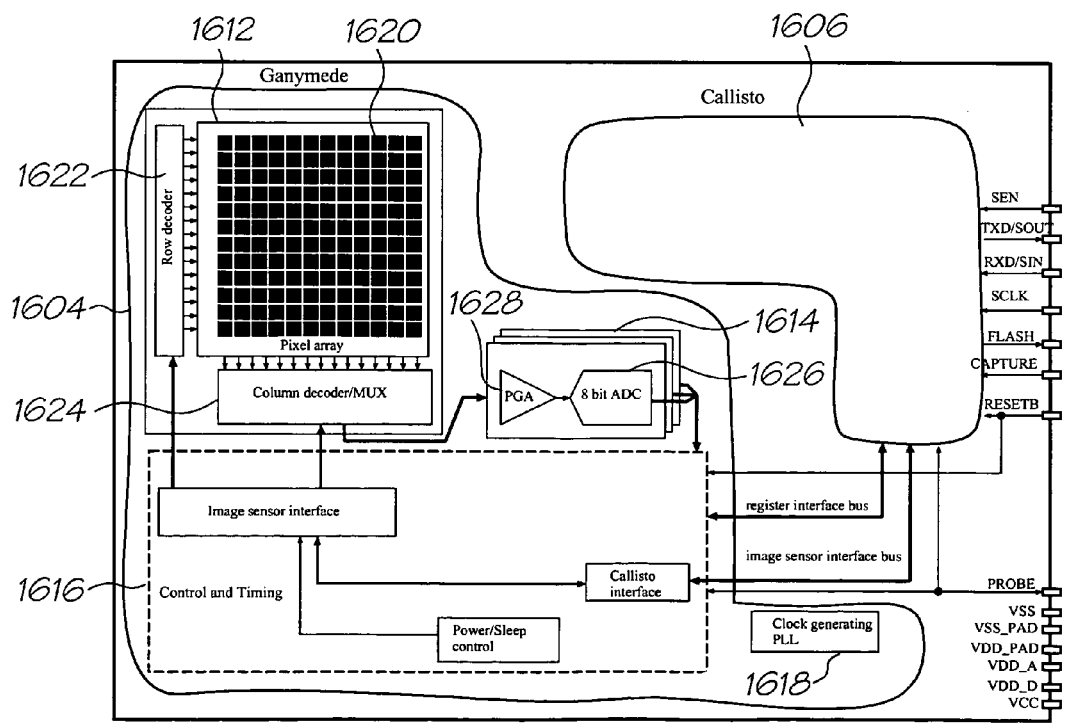

Features
  Sensor array
  8-bit digitisation of the sensor array output
  Ddigital image output to Callisto
  Clock multiplying PLL As shown in FIG. 143, Ganymede 1604 comprises a sensor array 1612, an ADC block 1614, a control and timing block 1616 and a clock-multiplying phase lock loop (PLL) 1618 for providing an internal clock signal. The sensor array 1612 comprises pixels 1620, a row decoder 1622, and a column decoder/MUX 1624. The ADC block 1614 includes an 8-bit ADC 26 and a programmable gain amplifier (PGA) 1628. The control and timing block 1616 controls the sensor array 1612, the ADC 1614, and the PLL 1618, and provides an interface to Callisto 1606.

Callisto

Callisto is an image processor 1625 designed to interface directly to a monochrome image sensor via a parallel data interface, optionally perform some image processing and pass captured images to an external device via a serial data interface.

Features
    Parallel interface to image sensor
    Frame store buffer to decouple parallel image sensor interface and external serial interface
    Double buffering of frame store data to eliminate buffer loading overhead
    Low pass filtering and sub-sampling of captured image
    Local dynamic range expansion of sub-sampled image
    Thresholding of the sub-sampled, range-expanded image
    Read-out of pixels within a defined region of the captured image, for both processed and unprocessed images
    Calculation of sub-pixel values
    Configurable image sensor timing interface
    Configurable image sensor size
    Configurable image sensor window
    Power management: auto sleep and wakeup modes
    External serial interface for image output and device management
    External register interface for register management on external devices.

Environment

Callisto interfaces to both an image sensor, via a parallel interface, and to an external device, such as a microprocessor, via a serial data interface. Captured image data is passed to Callisto across the parallel data interface from the image sensor. Processed image data is passed to the external device via the serial interface. Callisto's registers are also set via the external serial interface.

Function

The Callisto image processing core accepts image data from an image sensor and passes that data, either processed or unprocessed, to an external device using a serial data interface. The rate at which data is passed to that external device is decoupled from whatever data read-out rates are imposed by the image sensor.

The image sensor data rate and the image data rate over the serial interface are decoupled by using an internal RAM-based frame store. Image data from the sensor is written into the frame store at a rate to satisfy image sensor read-out requirements. Once in the frame store, data can be read out and transmitted over the serial interface at whatever rate is required by the device at the other end of that interface.

Callisto can optionally perform some image processing on the image stored in its frame store, as dictated by user configuration. The user may choose to bypass image processing and obtain access to the unprocessed image. Sub-sampled images are stored in a buffer but fully processed images are not persistently stored in Callisto; fully processed images are immediately transmitted across the serial interface. Callisto provides several image process related functions:
    Sub-sampling
    Local dynamic range expansion
    Thresholding
    Calculation of sub-pixel values
    Read-out of a defined rectangle from the processed and unprocessed image Sub-sampling, local dynamic range expansion and thresholding are typically used in conjunction with dynamic range expansion performed on sub-sampled images, and thresholding performed on sub-sampled, range-expanded images. Dynamic range expansion and thresholding are performed together, as a single operation, and can only be performed on sub-sampled images. Sub-sampling, however, may be performed without dynamic range expansion and thresholding. Retrieval of sub-pixel values and image region read-out are standalone functions.

Alternative Tag Sensor Arrangements

A number of specific alternative optics systems for implementing sensing of Netpage tags using the mobile device will now be described with reference to FIGS. 144 to 150.

Figure 144:
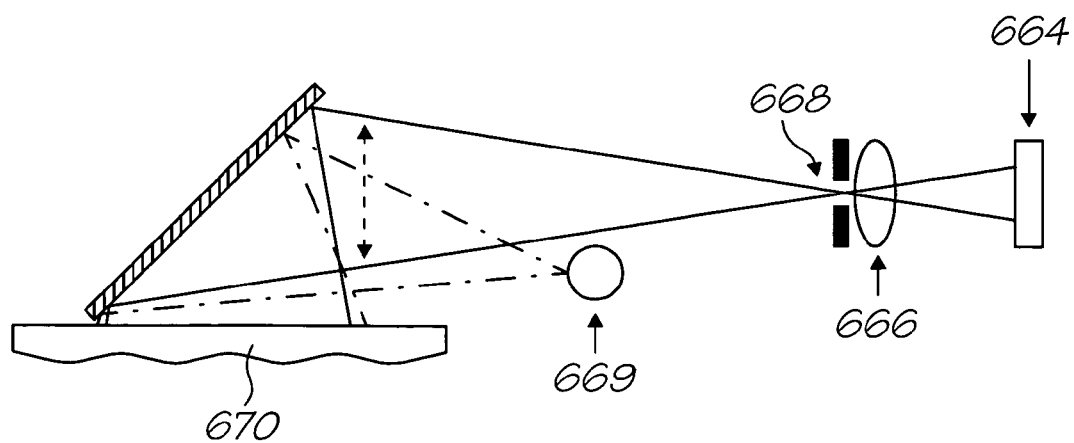

Basic Two Dimensional Tag Image Sensor: FIG. 144 shows the basic configuration of a two-dimensional tag sensor for sensing tags on a pre-tagged print medium prior to printing. A tag sensor ordinarily includes an image sensor 664, a focusing lens 666, an aperture 668 to ensure adequate depth of field, an infrared filter 670 to eliminate ambient light, and an infrared illumination source 669 that is strobed in synchrony with image capture. In the figure, the tag sensor is shown imaging the surface of a pre-tagged blank 670 to the left. The infrared filter is not included in the configuration, on the assumption that ambient light can be adequately excluded from the print path. Image capture can be triggered by the detection of a print medium in the print path.

Dual-Purpose 2D Tag Image Sensor: If the Netpage printer is incorporated in a device which already includes a Netpage tag sensor, such as a pen, PDA or mobile device such as a phone, then it can be convenient to multiplex the operation of the tag sensor between sensing tagged surfaces designated by the user, and tagged blanks presented to the printer. In the following discussion these two imaging modes are referred to as external and internal imaging respectively.

FIG. 145 shows one possible configuration of a multiplexed tag sensor, with dual optical paths and a single image sensor 664. The tag sensor is shown imaging an external tagged surface 671, and the surface of a pre-tagged blank print medium 672.

The internal optical path includes a first mirror 673 to allow it to point in the opposite direction to the external optical path, and a second mirror 674 (shown in plan) to allow it to image the print medium 672. In the FIG. 145, the second mirror 674 reflects the optical axis at a right angle to the print medium, i.e. the mirror is nominally mounted at 45 degrees to the surface of the print medium, as shown in FIG. 144.

Each optical path incorporates its own aperture and lens arrangements 675. The focal length of each lens can be selected according to the length of its corresponding optical path. A larger aperture can potentially be utilised in the internal optical path than in the external optical path, since shallower depth of field is acceptable.

Each optical path has its own infrared illumination source. When the first illumination source 677 is strobed in synchrony with exposure of the image sensor 664, the image sensor captures an image of the tagged surface 671 designated by the user. When the second illumination source 676 is strobed the image sensor captures an image of the pre-tagged blank print medium 672. External image capture can be triggered by a user-initiated "pen down" or "click" event. Internal image capture can be triggered by the detection of a print medium in the print path.

Since both optical paths impinge on the image sensor at an angle, some loss of focus may occur unless corrected by the lenses. The induced perspective distortion is automatically handled by the image processing and decoding algorithm.

Multiplexed tag sensor with beamsplitter: FIG. 146 shows a variation of the multiplexed tag sensor of FIG. 145, with a beam-splitter 678 for splitting the optical path. Although the beam-splitter 678 is shown downstream of the aperture 675, it can be placed upstream of the focusing lens if the two optical paths have substantially different lengths.

Multiplexed tag sensor with beamsplitter and inline illumination: FIG. 147 shows a variation of the multiplexed tag sensor of FIG. 146, with the infrared illumination projected inline with the imaging path via the beam-splitter 678. The IR filter 679 ideally has an anti-reflective coating to minimise reflection of the outgoing illumination.

Alternatively, the IR filter 679 can be placed upstream of the beamsplitter to avoid the problem of reflection altogether.

With a shared light source, selectively switching on one or the other light source can no longer be used to select one or the other imaging path. Instead, a shutter 680 is introduced into the external imaging path for this purpose.

Provided the print path is non-reflective in the absence of a print medium, there is no need to introduce a shutter into the internal imaging path.

The external imaging shutter 680 can be electronically controlled or mechanically controlled. A mechanical shutter can be sprung so that it is naturally open, and the print path can include a lever which engages with the print medium and is mechanically coupled to the shutter to close it when the medium is present. Conversely, the shutter can be sprung so that it is naturally closed, and the "nib" which the user presses to a tagged surface to initiate external imaging can be mechanically coupled to the shutter to open it when the nib is pressed to the surface. An electromechanical shutter can consist of a pivoting barrier or mirror mechanically coupled to an electromagnet. An electronic shutter can consist of a liquid-crystal device which can be electronically switched between transparent and opaque states, or a digital micromirror device which can be switched between reflecting and deflecting states.

Although illustrated as a pivoting barrier in FIG. 147, when the shutter utilises a mirror rather than a barrier, it is mounted in a normally reflecting position in the optical path.

If there is insufficient headroom above the print medium to accommodate the full field of view cone, then the two mirrors can be used to collimate and then re-expand the field of view cone. The first mirror can be concave in the direction normal to the surface of the print medium in order to collimate the field of view cone, and the second mirror can be convex in the same direction to re-expand it. The second IR illumination source can similarly have a lens that collimates the illumination cone in the same direction. The second mirror can also be tilted at less than 45 degrees to the surface of the print medium, and the first mirror can be similarly tilted to effect field-flattening, as illustrated in FIG. 148.

Tilted mirror to reduce headroom: The effect of ambient light entering the tag sensor via the external optical path during imaging of the print medium is a function of exposure time, the response of the IR filter, and the configuration of the external optical path in relation to its host device. For example, if the external optical path exits the top of the host device, then it may encounter a bright light source, such as the sun, in its field of view.

If ambient light is a problem, then the external optical path can be shuttered during imaging of the print medium. This can be achieved as described above. Alternatively, a pivoting mirror can be used to multiplex the optical path between external and internal imaging, as shown in FIGS. 149 and 150.

Multiplexed tag sensor with pivoting mirror, in external imaging mode: FIG. 149 shows the tag sensor with a pivoting mirror 681 positioned for external imaging, while FIG. 150 shows the tag sensor with the mirror positioned for internal imaging.

The mirror can be electronically or mechanically controlled. A mechanical mirror can be sprung so that it is naturally in the external imaging position, and the print path can include a lever that engages with the print medium and is mechanically coupled to the mirror to pivot it to the internal imaging position when a print medium is present. Conversely, the mirror can be sprung so that it is naturally in the internal imaging position, and the "nib" which the user presses to a tagged surface to initiate external imaging can be mechanically coupled to the mirror to pivot it to the external imaging position when the nib is pressed to the surface. The mirror can also be coupled to an electromagnet, which is activated to effect internal or external imaging. An electronic mirror can consist of a digital micromirror device which can be switched between internal imaging and external imaging reflecting states.

Multiplexed tag sensor with pivoting mirror in internal imaging mode: Although the figures show the same side of the pivoting mirror being used for both internal and external imaging, if, as discussed earlier, the pivoting mirror is required to collimate the field of view cone during internal imaging, then opposite sides of the pivoting mirror can be used for the two imaging modes, with external imaging mirror surface being planar and the internal imaging mirror surface being concave in the direction normal to the surface of the print medium.

Each of these configurations may utilise a monochrome CMOS image sensor with an electronic shutter, or an intrinsically-shuttered CCD image sensor.

ALTERNATIVE EMBODIMENT

Personal Digital Assistant

The invention can also be embodied in a number of other form factors, one of which is a PDA as shown in FIGS. 151 to 160. Whilst the increasing functionality of mobile phones means that there is convergence between PDAs and mobile phones, PDAs are still different enough, in general, from mobile phones to define a different market and a different set of requirements. For example, mobile phones are generally small enough to be carried around in a user's pocket and are used mainly for voice communication and short text messages. PDA-style functionality (such as contact and appointment management) may be provided, but small screen size (due to small form factor) and limited control interface options (again due to size issues) makes them less convenient than a full-size PDA with large screen and (often) touch-screen input functionality.

The present invention can be embodied in a PDA 300. The PDA 300 shares a number of features and components with the mobile phone described above, and shared elements are indicated with like reference numerals. A notable difference between the PDA 300 and the mobile phone 1 is that the print cartridge 148 is positioned horizontally near the top of the PDA (as best shown in FIGS. 154 and 158), rather than vertically along one side as in the mobile phone. The cartridge 148 can be identical to that used in the mobile phone, with the same media drive options. Alternatively, it may have a wider print width to take advantage of the additional width of the PDA (and the overall space advantages offered by the PDA's size).

Referring to FIG. 160, the PDA 300 also differs from the mobile phone in that it provides a replaceable cassette 302 that holds a stack 304 of the print media. The print media can be the same size and shape as that described for use with the mobile phone, or can be larger, smaller, of different width or material, or have different coded data or advertising material pre-printed on it. The present description will assume, however, that the media is the same as that described for use in the mobile phone embodiment.

As best shown in FIG. 160, the cassette 302 comprises a bottom moulding 306, a spring 308, the stack 304 of (in the preferred embodiment) 20 sheets of the print media and a top moulding 310. The bottom moulding 306 includes clip formations 312 that snap into complementary apertures 314 formed in the top moulding 310. The spring 308 includes fingers 316 that engage the floor of the bottom moulding 306 and a support section 318 that engages the media stack 304. The top moulding also includes an exit aperture 319 for allowing printed media to exit for printing.

The PDA has a larger display 138 than the mobile phone, and can use any suitable display technology, such as OLED or TFT. It is particularly preferred that the PDA incorporate a touch-sensitive display (or display overlay) that enables a user to interact with icons and other information displayed on the display.

Referring to FIGS. 155 and 156, the Netpage sensor in the PDA 300 is a modified version of the arrangement described in relation to FIG. 145, and like numerals have been used to designate corresponding features. The particular arrangement allows the mirrors 673 and 674 shown in FIG. 145 to be removed. When reading tags from the print media in the cassette, the images are captured from the print medium at the top of the stack which is next to be printed. Tags on each subsequent print medium are read as it is exposed by the preceding print medium being removed from the cartridge for printing.

Netpage Camera Phone

Printing a photo as a Netpage and a camera incorporating a Netpage printer are both claimed in WO 00/71353 (NPA035), Method and System for Printing a Photograph and WO 01/02905 (NPP019), Digital Camera with Interactive Printer, the contents of which are incorporated herein by way of cross-reference. When a photo is captured and printed using a Netpage digital camera, the camera also stores the photo image persistently on a network server. The printed photo, which is Netpage tagged, can then be used as a token to retrieve the photo image.

A camera-enabled smartphone can be viewed as a camera with an in-built wireless network connection. When the camera-enabled smartphone incorporates a Netpage printer, as described above, it becomes a Netpage camera.

When the camera-enabled smartphone also incorporates a Netpage pointer or pen, as described above, the pointer or pen can be used to designate a printed Netpage photo to request a printed copy of the photo. The phone retrieves the original photo image from the network and prints a copy of it using its in-built Netpage printer. This is done by sending at least the identity of the printed document to a Netpage server. This information alone may be enough to allow the photo to be retrieved for display or printing. However, in the preferred embodiment, the identity is sent along with at least a position of the pen/clicker as determined A mobile phone or smartphone Netpage camera can take the form of any of the embodiments described above that incorporate a printer and a mobile phone module including a camera.

Universal Pen

Further embodiments of the invention incorporate a stylus that has an inkjet printhead nib.

In a first embodiment shown in FIGS. 161 to 178, the mobile device includes a retractable stylus 1000 that includes an elongate body portion 1002. The body portion 1002 incorporates a recess 1004 for holding a coil sprint 1006. A raised nub 1008 is formed on one side of the body portion 1002, and a raised stop 1010 is formed on another side of the body portion 1002.

A nib cap 1152 is attached to one end of the body portion 1002 and includes ink galleries which communicate the ink to a printhead 1120, which is bonded to the free end of the cap 1126. The printhead is preferably an inkjet type printhead and more preferably a microelectromechanical system (MEMS) based inkjet such as that described in detail elsewhere in this specification. The preferred MEMS based inkjets expel ink using mechanical actuators rather than by heating of the ink, as currently used by most inkjet printers currently available. As such MEMS based inkjets have a lower power consumption compared to such printers, which makes them attractive for use in portable devices where available power is limited. Alternatively, a thermal inkjet printer such as that also described elsewhere in this specification can be used.

Whichever type of inkjet ejection technology is used, in the preferred form the ink ejection devices (ie, nozzles) are arranged into partial spirals 1370-1380, as best shown in FIGS. 183 and 184. This spiral arrangement produces more pleasing strokes than the linear arrangement disclosed in cross-referenced patent U.S. Ser. No. 10/309,185, filed on Dec. 4, 2002, since it generates ink dots which are more evenly spaced and which more fully cover the width of the stroke, no matter the orientation of the printhead with respect to the direction of motion of the pen. The linear arrangement is prone to produce strokes with visible striations when the direction of motion of the pen is substantially parallel to any of its radial lines of ink ejection devices, whereas in the spiral arrangement there are always lines of ink ejection devices perpendicular to the direction of motion across the full width of the device.

Striations due to uneven density can be further suppressed if the direction of motion is known, since ink ejection devices located along portions of the spirals which are substantially parallel to the direction of motion can be prevented from ejecting ink. The spiral arrangement includes a greater number of ink ejection devices in the same area as the linear arrangement, leading to better silicon utilization and greater stroke density, and includes, for two of the inks, additional ink ejection devices close to the axis of the printhead which allow still greater stroke density for selected inks, such as black and cyan.

Although the preferred form of the invention uses these spirally arranged rows of ink ejection devices, the stylus printhead 1120 will be described with reference to a different embodiment shown in FIGS. 169 to 178. These detailed drawings of the inner working and assembly of the stylus are based on a different embodiment of the invention designed to work with four colors (CMYK) rather than the three colors (CMY) used by the preferred embodiment of the present invention. As mentioned earlier, the particular number of colors, or the arrangement of nozzles in the printhead, are merely matters of design choice.

Referring to FIGS. 168 to 178, the printhead 1120 is bonded to the end cap 1126 but mounted on a flexible printed circuit board (PCB) 1144 which includes control and power contacts 1146.

A stylus nib 1118 is mounted on the end cap 1126 so as to be capable of a small amount of axial movement. Axial movement of the stylus nib 1118 is controlled by integral arms 1148 which extend laterally and axially away from the inner end of the stylus to bear against a land 1184 (see FIG. 170). In use, pressing the stylus against a substrate causes the arms 1148 to bend and allows the stylus to retract. The stylus is preferably formed by injection molding of a thermoplastic material, most preferably acetyl. This movement is typically a maximum of amount 0.5 mm and provides some feedback to the user. In addition the flexibility of the stylus nib accommodates a small amount of roughness in the substrate surface. If desired the stylus nib may be fixed with substantially no movement allowed.

A nib cap 1152 extends over the end cap 1126, printhead 1120, PCB 1144 and stylus nib 1118 and an aperture 1154 is provided through which the free end 1156 of the stylus nib 1118 projects. The aperture 1154 is oval in shape and allows the printhead 1120 to expel ink though the aperture below the stylus nib.

The nib cap 1152 is secured in place by one or more resilient snap action arms 1158 integrally formed adjacent its edge.

Control circuitry for the inkjet actuators can be positioned in any suitable combination of places within the device, such as within the print engine controller and/or the printhead itself. The on/off switch is preferably controlled so that ink is only ejected when the stylus nib is pressed on a substrate. Pressing the stylus against a substrate results in a compressive force in the stylus nib. In this embodiment this results in movement of the stylus and the on/off switch may be activated by the movement, by sensing the compressive force or by other means. Where the stylus is substantially fixed, movement of the stylus nib relative to the rest of the pen is not available.

The stylus is easiest to use in a particular orientation, but in use this is not particularly critical and the stylus is configured so that the nib will not obstruct the path of ink from the printhead to the paper at any orientation, as shown in FIG. 168.

FIG. 168 shows the stylus nib resting against paper at three different orientations, indicated by numbers 1164, 1166 & 1168. The path of ink from the printhead is indicated by line 1170. Paper sheet 1164 represents an orientation with the stylus nib above the printhead whilst paper sheet 1166 represents an orientation with the stylus nib below the printhead. Paper sheet 1168 represents an orientation with the stylus nib to the side of the printhead. As seen, the stylus nib does not obstruct the path of the ink to the paper at any orientation.

It will be appreciated that the print engine controller and/or other circuitry associated with the stylus can be designed to adjust one or more characteristics of the ink deposited by the printhead 1120. This may be the amount of ink deposited, the width of the line produced, the color of the ink deposited (in a color cartridge) or any other attribute.

Further information about this control is described in cross-referenced U.S. Ser. No. 10/309,185.

The printhead 1120 is mounted on PCB 1144 and is received in a recess 1176 in end cap 1126. Both the printhead and the recess are non-circular to aid in correct orientation.

The stylus nib 1118 is mounted in a slot 1184 of nib cap 1152 and held in place by surface 1190 of the end cap 1126. The cantilevered arms 1148 bear against land 1185 and bias the stylus nib outwards. The front portion 1186 of the stylus nib is circular in cross section but the back portion 1188 has a flat surface 1191 which slides over surface 1190 of end cap 1126.

The stylus nib includes a slot 1181 which extends obliquely along the flat surface 1191. In this embodiment of the invention, the printhead 1120 includes a rotary capper 1183. The capper is movable between first and second operative positions. In the first position the ink ejection nozzles of the printhead are covered and preferably sealed to prevent drying of the ink in the printhead and ingress of foreign material or both. In the second position the ink ejection nozzles of the printhead are not covered and the printhead may operate. The capper 1183 includes an arm 1185 which engages the slot 1181. Thus as the stylus nib moves in and out relative to the printhead the capper 1183 is caused to rotate. When the stylus nib is under no load and is fully extended the capper is in the first position and when the stylus nib is depressed the capper is in the second position. The capper 1183 may incorporate an on/off switch for the printhead 1120, so the printhead can only operate where the capper is in the second operative position. The slot may have an oblique portion to open and close the capper and then a portion extending axially where no movement of the capper occurs with stylus nib movement.

The construction and arrangement of the printhead 1120 and capper 1183 are shown in FIGS. 170 to 178 inclusive.

The printhead 1120 is an assembly of four layers 1302, 1304, 1306 and 1308 of a semiconductor material. Layer 1306 is a layer of electrically active semiconductor elements, including MEMS ink ejection devices 1310. Layer 1306 has been constructed using standard semiconductor fabrication techniques. Layers 1302 and 1304 are electrically inactive in the printhead and provide passageways to supply the ink to the ink ejection devices 1310 from the ink inlets 1182. The layer 1308 is also electrically inactive and forms a guard with apertures 1320 above each ink ejection device 1310 to allow ink to be ejected from the printhead. The layers 1302, 1304 and 1308 need not be the same material as the layer 1306 or even a semiconductor but by using the same material one avoids problems with material interfaces. Further, by using semiconductor material for all components the entire assembly may be manufactured using semiconductor fabrication techniques.

The printhead 1120 has three ink inlets 1182 and the ink ejection devices 1310 are arranged into twelve sets, each of which extends roughly radially outwards from the center 1300 of the printhead. Every fourth radial line of ink ejection devices 1310 is connected to the same ink inlet. Ink ejection devices connected to the same ink inlet constitute a set of ink ejection devices. The ink ejection devices 1310 are arranged on alternate sides of a radial line, which results in closer radial spacing of their centers. The twelve "lines" of ink ejection devices 1310 are arranged symmetrically about the center 1300 of the printhead, at a spacing of 30°. It will be appreciated that the number of "lines" of ink ejection devices 1310 may be more or less than twelve. Similarly there may be more or less than four ink inlets 1182. Preferably there are an equal number of lines for each ink inlet 1182. If a single ink is used the ink inlets need not feed equal numbers of "lines" of ink ejection devices. Also, different colors may have different numbers of nozzles. For example, black ink (where used) may have more nozzles than the other colors.

The layer 1306 includes a tab 1311 on which there are provided a number of sets of electrical control contacts 1312. For clarity only four contacts are shown; it will be appreciated that there may be more, depending on the number of different color inks used and the degree of control desired over each individual ink ejection device 1310 and other requirements. The printhead is mounted on the PCB 1144 by bonding the tab onto the PCB 1144. The electrical contacts 1312 engage corresponding contacts (not shown) on the PCB 1144. The layer 1306 includes control circuitry for each ink ejection device to control the device when turned on. However, generally, all higher level control, such as what color inks to print and in what relative quantities, is carried out externally of the printhead, and preferably in the MoPEC integrated circuit. These higher level controls are passed to the printhead 1120 via contacts 1312. There is preferably at least one set of contacts 1312 for each set of ink ejection devices. However each line or each individual ink ejection device may be addressable. At its simplest, each set may be merely turned on or off by the control signals.

As seen in FIGS. 177, in plan view the printhead 1120 has a substantially octagonal profile with tabs 1314 and 1316 extending from opposite faces of the octagon. It will be noted that tab 1314 is formed of layers 1302, 1304 and 1306 only, whilst tab 1316 is formed of all four layers 1302, 1304, 1306 and 1308. This enables the PCB 1144 to be bonded to the layer 1306 without extending above the top of layer 1308. The octagonal shape with tabs also aids in locating the printhead in the recess 1176 in the end cap 1126.

The capper 1183 is also preferably formed of the same semiconductor material as the print head and is mounted on the printhead for rotation about the printhead's center 1300. As with the non-electrically active layers, the capper need not be the same material as the print head or even be a semiconductor. The capper may be rotated between an open position (see FIG. 177) and a closed position (see FIG. 178). The open position is shown, with the closed position shown in dotted outline in FIGS. 173 and 176. The capper 1183 has twelve radially extending apertures 1318. These apertures are sized and arranged so that in the open position all of the ink ejection devices are free to eject ink through the apertures. In the closed position the apertures 1318 overlie material between the lines of ink ejection devices, and the material of the capper between the apertures 1318 overlies the apertures 1320 in the upper layer 1308. Thus ink cannot escape from the printhead and foreign material cannot enter into the apertures 1320 and the ink ejection devices to possibly cause a blockage.

The apertures 1318 are preferably formed in the capper 1183 using standard semiconductor etching methods. In the embodiment shown, each aperture is equivalent to a series of overlapping cylindrical bores, the diameter of which is a function of radial distance from the capper's center 1300. Alternatively, the apertures may be defined by two radially extending lines at a small angle to each other. It will be appreciated that the outside of the capper moves more than the inside when rotated so the apertures need to increase in width as the radial distance increases.

The capper is substantially planar with eight legs 1322 extending downwards from the periphery of the lower surface 1326. These legs are spaced equally about the circumference and engage in corresponding slots 1328 formed in the peripheral edge of the upper surface 1329 of the upper layer 1308. The slots are rectangular with rounded inner corners. The inner surface 1330 of the slots 1328 and the inner surface of the legs may be arcuate and centered on the printhead's center 1300 to aid in ensuring the capper rotates about the central axis 1300. However this is not essential. In the embodiment shown, each face of the octagon has a slot 1328 but this is not essential and, for instance, only alternate faces may have a slot therein. The symmetry of the legs 1322 and slots 1328 is also not essential.

Rotation of the capper is caused by engaging arm 1185 in the angled slot 1181 in the stylus nib. Rotation of the capper is ultimately limited by the legs 1322 and slots 1328. To prevent damage to the capper, printhead or the stylus nib, the arm 1185 has a narrowed portion 1334. In the event that the stylus nib is pushed in too far, the arm 1185 flexes about the narrowed portion 1334. In addition, guard arms 1336 are provided on either side of the arm 1185 and also serve to limit rotation. The recess 1176 into which the printhead is inserted has an opening in which the guard arms are located. If for some reason the capper is rotated too much, the guard arms contact the side of the opening and limit rotation before the legs 1322 contact the ends of the slots 1328.

It is desirable that the print head only actuate when the stylus nib is pressed against a substrate. The stylus nib may cause a simple on-off switch to close as it moves into the pen. Alternatively, a force sensor may measure the amount of force applied to the stylus nib. In this regard the cantilevered arms 1148 may be used directly as electrical force sensors. Alternatively, a discrete force sensor may be acted upon by the inner end of the stylus nib. Where a force sensor is utilized, it may be used merely to turn the printhead on or off or to (electronically) control the rate of ink ejection with a higher force resulting in a higher ejection rate, for instance. The force sensed may be used by a controller to control other attributes, such as the line width. Rotation of the capper may also cause an on/off switch to change state.

The printhead has the different color ink ejection devices arranged radially and this presents problems in supplying ink to the ejection devices where the different color ink ejection devices are interleaved. In conventional printers the ink ejection devices are arranged in parallel rows and so all the different inks may be supplied to each row from either or both ends of the row. In a radial arrangement this is not possible.

The rear surface of the bottom layer 1302 is provided with four ink inlets 1182. These inlets are oval shaped on the rear surface for approximately half the thickness of the layer 1302 and then continue as a circular aperture 1340 through to the upper surface. The rear surface of the layer 1302 also has four grooves 1342, 1344, 1346 and 1348 located in the central region. There are a number of holes that extend from the grooves through the layer 1302 (see FIGS. 175 and 176). The lower surface of the lower layer 1302 seals against the end cap 1126 so these grooves define sealed passageways.

Ink holes 1356, 1358, 1360, 1364 and 1366 supply ink to ink distribution grooves 1350, 1352, 1362, and 1368, which in turn distribute the inks to their respective rows 1370-1380 of ink ejection devices.

FIG. 184 shows a further alternative arrangement of ink ejection devices 1370-1381 to that shown in FIG. 183.

It consists of the same arrangement as that shown in FIG. 183, but with a 0.5 mm radius compared with the 0.8 mm radius of the arrangement of FIG. 183. It represents a more economical design when wider strokes are not required. Note, however, that if the direction of motion is known, then the arrangement of FIG. 183 can produce a more pleasing stroke than the arrangement of FIG. 184 even for stroke widths less than 0.5 mm, since ink ejection devices which are nominally further from the printhead axis than the stroke radius but which are still within the stroke boundary can be used to contribute to the stroke.

At the other end of the body portion 1002, a flexible data, power and ink conduit 1012 enters the stylus 1000. As best shown in FIG. 167, the conduit 1012 is based on a piece of flex film 1014 which includes copper traces 1016 on one side and formed film 1018 on the other. The copper traces 1016 include data and power supply traces. The formed film 1018 forms three ink channels 1020. The conduit 1012 is folded back on itself in serpentine fashion to enable extension and retraction of the body portion 1002 as described below.

The end of the conduit 1012 remote from the body portion is connected to the cartridge 148 such that ink, data and power are supplied to the printhead in the stylus.

The stylus 1000 is mounted for telescopic sliding movement within a holder 1022. The holder 1022 is an extension of the cradle 124, and includes an elongate hole 1024 through which the nub 1008 extends and a recess 1026 within which the stop 1010 is positioned. Both the hole 1024 and the recess 1026 extend along the holder 1022 so that the nub and stop respectively can slide within them as the stylus 1000 is extended and retracted.

A stylus retaining mechanism 1028 is attached to a snap-fit retainer 1030 formed on a side of the holder 1022. A complementary snap-in portion 1032 is generally circular in cross-section and snaps into the retainer 1030 during assembly. The retainer 1030 and snap-in portion 1032 are configured such that the stylus retaining mechanism 1028 is rotatable between an open position and a closed position, which are described in more detail below. A first end of the stylus retaining mechanism 1028 includes a stop-engaging portion 1034, whilst the other end includes a stylus release button 1036 and moulded bias spring 1038 that biases the stylus retaining mechanism, into the closed position.

As best shown in FIG. 161, tension in the coil spring 1006 holds the stylus 1000 in a retracted position within the device. In this position, the tip of the stylus is protected from snags and bumps it might otherwise encounter when not in use. The stop 1010 is within a recess in the stop-engaging portion 1034, which enables that end of the retaining mechanism 1028 to sit relatively flush with the exterior of the device.

When the stylus is to be extended, a user places a finger or thumb onto the nub 1008 and telescopically slides the stylus 1000 against the tension of the coil spring 1006 towards the extended position shown in FIGS. 163. As the stylus 1000 moves towards the extended position, the stop 1010 engages a ramped surface (not shown) within the stop-engaging portion 1034, which urges the stop-engaging portion 1034 to pivot away from the body portion 1002 against the bias of the bias spring 1038, as shown in FIG. 162.

Eventually, the edge of the stop-engaging portion 1034 clears the stop 1010, thereby allowing the stop-engaging portion 1034 to snap back against the body portion 1002. The user can then release the nub 1008, allowing the stylus 1000 to move in the retraction direction under the tension of the coil spring 1006 until the stop 1010 engages the stop-engaging portion 1034. The stylus is then retained in the extended position, as shown in FIG. 163 while the user uses the stylus to write or draw.

To retract the stylus 100, the user depresses the stylus release button 1036, which causes the retaining mechanism 1028 to pivot about the snap-in portion 1032. This cases the stop-engaging portion 1034 to lift clear of the stop 1010. The stylus 1000 is then free to retract under the coil spring's 1006 tension until it is back in the original position shown in FIG. 161.

The conduit 1012 provides a compact way of supplying ink, data and power to the stylus, whilst still enabling a functioning retraction mechanism.

In a second embodiment shown in FIGS. 179 to 181, in which like reference numerals indicate features corresponding with those from the previous embodiment, the stylus 1000 is mounted onto the cartridge 148. Unlike the previous embodiment, the stylus in FIGS. 179 to 181 does not feature a retraction mechanism. Instead, the stylus is mounted directly to the cartridge 148, which supplies it with ink and data.

As best shown in FIG. 181, the cartridge includes three side ducts 1040, 1041, 1042 that are in fluid communication with the ink reservoirs of the cartridge via channels 1043, 1044, 1045. Each side duct includes a bore 1046 which is filled by a plug 1048 of wicking compound that helps draw ink from the cartridge as required. A duct cover 1050 covers the side ducts to provide sealed pathways through which ink can flow from the cartridge towards the printhead chip.

The ink is distributed to the printhead chip in a similar manner to that described in relation to the previous embodiment, notwithstanding the fact that it is provided directly from the cartridge rather than along a conduit.

Power and data are provided to the printhead chip from the MoPEC integrated circuit via flexible PCB 1052.

In either embodiment, an optional modular Netpage device incorporating an infrared LED 1054, associated optics 1056 and CCD (not shown) can be included, as shown in FIG. 182. This Netpage device functions similarly to those described elsewhere in this specification, but has the advantage of being integrated with the cradle. This means that the entire assembly (cradle, stylus, Netpage device) can be provided to a manufacturer for insertion into a mobile device without the need for multiple additional assembly steps.

M-Print Applications

Printing cards from a mobile device using the M-Print system has a vast array of applications in many different fields. In the interests of brevity, this specification does not describe any of the applications in detail. However, to provide some overall context for the M-Print system, several of its areas of application are listed below. Of course, this is not an exhaustive list but merely illustrative of its diversity.

The target application may be remote to the phone. For example, an e-commerce application, as claimed in WO 00/72242 (NPA002), Method and System for Online Purchasing, can allow the user to add items to a shopping cart by designating entries in a printed catalogue or advertising using the preferred embodiment of the mobile phone. It can also print a receipt via the printer in the phone and allow the user to authorise the transaction by signing the receipt with a Netpage pen in the phone (or with a separate pen that can communicate with the mobile phone via, for example, Bluetooth™ wireless transmitters and receivers.

When the phone is aware of its own location, either via an in-built GPS receiver or via a mobile network mechanism, it can report its location to selected applications to allow those applications to provide a location-specific service. For example, when the user designates a printed advertising promotion, such as a movie discount offer printed on a product label, the phone can print a voucher which is valid at a nearby movie theatre. The word "voucher" is used very broadly, and can include any kind of commercial document. "Voucher" therefore includes printed media bearing advertising without any specific form of inducement, a discount coupon, a special offer coupon and so on.

For example, a user visiting a town they are not familiar with may decide that he wishes to visit an Italian restaurant. He consults his mobile device and brings up a web-page that enables him to search for restaurants by proximity to his location, price, cuisine and reviews. The web-page can be hosted remotely and browsed using a local browser application, or a local application can be run that searches a remote database of relevant information and presents it to the user. A local Italian restaurant running a promotion is selected, and a voucher for 10% off the meal bill is printed with the mobile device's inbuilt printer. Alternatively (or in addition) a map can be printed showing the address of the restaurant and directions from the user's present location.

The target application may also be local to the phone. For example, a dialing application, as claimed in WO 01/41413 (NPA060), Method and System for Telephone Control, can allow the user to dial numbers by designating entries in a printed address book or phone book. The Netpage clicker or sensor is used by a user to select a phone number or email address on a printed document (which can itself be a printed card produced by the phone or another user's phone). In the case of a phone number being selected, the mobile phone can either bring the number up on the display ready for confirmation that it is to be called, or can simply skip the confirmation step and ring the number directly. Alternatively, the user can be offered a choice of which type of communication to perform based on the number. For example, a choice may be given to send the user a short text message via SMS, to call the user, or to send a voicemail. Similarly, if an email address is designated using the mobile phone, then an email to that address can be opened, ready for the user to input text or add attachments. If the Netpage pen has been used to write text on a suitable surface (a Netpage notepad or sticky-note, for example), the last written text can be inserted automatically in the email to be sent to the selected email address.

A business card application, as claimed in WO 01/22358 (NPA024), Business Card as Electronic Mail Token and WO 01/22357 (NPA025), Business Card as Electronic Mail Authorization Token, can allow the user to print Netpage business cards for presentation to others and to scan Netpage business cards presented to others, with automatic insertion of contact details into the user's local or network-based address book. The business card application can be local or remote. If purely local, then a presented business card may be used simply as a single-use authorisation token for retrieving contact details directly from the presenter's phone, e.g. via a direct Bluetooth™ (or infrared) connection.

In related applications, schedule information stored in the phone or PDA memory, or on a remote server, can be printed onto a card. The user can choose from options such as, for example, a "Things To Do Today" list, a summary of all work related appointments in the next week, or a list of overdue tasks. All forms of tasks, reminders, calendar and related functions can be printed to a card. Moreover, the phone or PDA can be configured to print an input template for a day, week or month to enable schedule information to be input to the device using the built-in Netpage pointer in the device (or using a separate Netpage pen in communication with the device via, for example, Bluetooth™).

In all cases, data that is being printed by the printer in the device can either be stored locally on the device itself, or downloaded from a remote server. Moreover, where a Netpage pointer or pen is incorporated into the device (or is separately able to communicate via the device), cards printed by the device can be interacted with the Netpage pen or pointer.

Connection History

The mobile device with printer can be used to print out connection history associated with the device. Connection history includes any voice- or data-related information associated with the sending or receipt of voice, data, text, images or audio, and with the establishment of a connection associated with the communication of data any of these types.

For example, a user can cause the mobile device to print out a list of the 10 most voice calls initiated by the device.

Alternatively, the user can print the last calls received by the device, or all missed calls in the last 24 hours.

Where Netpage clicker or pen capability is provided in the mobile device (whether through a built-in clicker/pen or an external Netpage enabled device communicating with the device via a wired or wireless link), the printed connection history information can be interacted with in a useful way. For example, electing a listed missed call causes the phone number associated with the contact to be dialed, or at least brought up on the mobile device's display to enable the user to save the number or dial it. Alternatively, selecting a message from a printed "Sent messages" list causes the selected message to be displayed on the device's display, or even printed by the device for further review.

Netpage Tag Pattern Printing

The preferred embodiments shown in the accompanying figures operate on the basis that the cards may be pre-printed with a Netpage tag pattern. Pre-printing the tag pattern means that the printhead does not need nozzles or a reservoir for the IR ink. This simplifies the design and reduces the overall form factor. However, the M-Print system encompasses mobile telecommunication devices that print the Netpage tag pattern simultaneously with the visible images. This requires the printhead IC to have additional rows of nozzles for ejecting the IR ink. A great many of the Assignee's patents and co-pending applications have a detailed disclosure of full color printheads with IR ink nozzles (see for example Ser. No. 11/014,769, filed on Dec. 20, 2004).

To generate the bit-map image that forms the Netpage tag pattern for a card, there are many options for the mobile device to access the required tag data. In one option, the coding for individually identifying each of the tags in the pattern is downloaded from a remote server on-demand with each print job. As a variation of this, the remote Netpage server can provide the mobile telecommunication device with the minimum amount of data it needs to generate the codes for a tag pattern prior to each print job. This variant reduces the data transmitted between the mobile device and the server, thereby reducing delay before a print job.

In yet another alternative, each print cartridge includes a memory that contains enough page identifiers for its card printing capacity. This avoids any communication with the server prior to printing although the mobile will need to inform the server of any page identifiers that have been used. This can be done before, during or after printing. The device can inform the Netpage server of the graphic and/or interactive content that has been printed onto the media, thereby enabling subsequent reproduction of, and/or interaction with, the contents of the media.

There are other options such as periodic downloads of page identifiers, and the M-print system can be easily modified to print the Netpage tags with the visual bitmap image. However, pre-coding the cards is a convenient method of authenticating the media and avoids the need for an IR ink reservoir, enabling a more compact design.

CONCLUSION

The present invention has been described with reference to a number of specific embodiments. It will be understood that where the invention is claimed as a method, the invention can also be defined by way of apparatus or system claims, and vice versa. The assignee reserves the right to file further applications claiming these additional aspects of the invention.

Furthermore, various combinations of features not yet claimed are also aspects of the invention that the assignee reserves the right to make the subject of future divisional and continuation applications as appropriate.

The invention claimed is:

1. A mobile telecommunications device comprising:
a body;
a first receiver arranged in the body for receiving signals from a mobile telephony system;
a first transmitter arranged in the body for transmitting signals over the mobile telephony system; and a cradle arranged in the body for retractably housing a stylus incorporating a printhead tip, the stylus being moveable between a retracted non-operational position within the body to an extended operational position outside the body at which a user is able to handle the body of the mobile telecommunications device to mark a substrate surface using the extended stylus.

2. A mobile telecommunications device according to claim 1 further comprising:
a first sensor device for sensing coded data and for outputting raw data based on said sensed data; and
a transmitter controller operable to control the first transmitter to transmit output data based at least partially on said sensed data via the mobile telephony system to a computer system.

3. A mobile telecommunications device according to claim 2 wherein the first sensing device is postioned on the stylus.

4. A mobile telecommunications device according to claim 2 wherein the printhead tip has an array of nozzles to effect the writing or drawing.

5. A mobile telecommunications device according to claim 1 wherein the cradle remvoably houses a printing cartridge having a printer mechanism incorporating a pagewidth printhead for printing on a media substrate, the printhead positioned adjacent a media feed path through the device.

6. A mobile telecommunications device according to claim 5 wherein the printer mechanism is adapted to receive document data and to print an interface onto a surface, the interface being at least partially based on the document data, the document data including identity data indicative of at least one identity, the identity being associated with a region of the interface, the interface including coded data.

7. A mobile telecommunications device according to claim 5 wherein the printing cartridge has at least one ink reservoir, the printhead tip in the stylus and the printer mechanism sharing the at least one ink reservoir.

8. A mobile telecommunications device according to claim 5 further comprising a second transmitter and a second receiver adapted to transmit data to and to receive data from one or more sensor devices, the sensor devices transmitting data.

9. A mobile telecommunications device according to claim 5 further comprising a transmitter controller adapted to cause the mobile telephone unit to transmit data based on the first data to a computer system via the first transmitter.

10. A mobile telecommunications device according to claim 5 wherein the printer mechanism further comprises a capper assembly movable between a capped position covering the nozzles and an uncapped position spaced from the nozzles; wherein,
the capper assembly is held in the uncapped position by the media such that it moves to the capped position upon disengagement with the media.

11. A mobile telecommunications device according to claim 10 wherein the sheet of media substrate is encoded with the coded data and the print engine controller uses a sensor to determine the position of the sheet relative to the printhead.

12. A mobile telecommunications device according to claim 10 further comprising a media feed roller for feeding the media past the printhead.

13. A mobile telecommunications device according to claim 10 wherein the media substrate is a sheet and the trailing edge of the sheet disengages from the media feed roller before it is printed and is projected past the printhead by its momentum.

14. A mobile telecommunications device according to claim 13 wherein the capper assembly lightly grips the sheet after it has been printed so that it partially extends from the mobile telecommunications device in readiness for manual collection.

15. A mobile telecommunications device according to claim 10 wherein the capper assembly moves out of the capped position and toward the uncapped position upon engagement with the leading edge of the sheet.

16. A mobile telecommunications device according to claim 10 wherein the printing cartridge further comprises a print media feed path for directing the print media past the printhead in a feed direction during printing, and a drive mechanism for driving the print media past the printhead for printing.

17. A mobile telecommunications device according to claim 10 wherein the printhead has an array of ink ejection nozzles and is incorporated into a cartridge that further comprises at least one ink reservoir for supplying ink to the printhead for ejection by the nozzles, each of the at least one ink reservoirs including at least one absorbent structure for inducing a negative hydrostatic pressure in the ink at the nozzles, and a capping mechanism for capping the printhead when not in use.

18. A mobile telecommunications device according to claim 10 further comprising a drive shaft with a media engagement surface for feeding a media substrate along a feed path; and,
a media guide adjacent the drive shaft for biasing the media substrate against the media engagement surface.

19. A mobile telecommunications device according to claim 9 further comprising:
a drive shaft for feeding the sheet of media substrate past the printhead; wherein during use,
the sheet disengages from the drive shaft before completion of its printing such that the trailing edge of the sheet projects past the printhead by momentum to complete its printing.

* * * * *